United States Patent
Murakami et al.

(10) Patent No.: US 11,646,780 B2
(45) Date of Patent: *May 9, 2023

(54) SIGNAL GENERATING METHOD AND SIGNAL GENERATING DEVICE

(71) Applicant: Sun Patent Trust, New York, NY (US)

(72) Inventors: Yutaka Murakami, Kanagawa (JP); Tomohiro Kimura, Osaka (JP); Mikihiro Ouchi, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,882

(22) Filed: Dec. 20, 2021

(65) Prior Publication Data

US 2022/0116099 A1 Apr. 14, 2022

Related U.S. Application Data

(63) Continuation of application No. 17/104,328, filed on Nov. 25, 2020, now Pat. No. 11,245,461, which is a
(Continued)

(30) Foreign Application Priority Data

Apr. 19, 2011 (JP) .................................. 2011-093540
Jun. 24, 2011 (JP) .................................. 2011-140749

(51) Int. Cl.
*H04K 1/10* (2006.01)
*H04L 27/28* (2006.01)
(Continued)

(52) U.S. Cl.
CPC ........... *H04B 7/0697* (2013.01); *H04B 7/046* (2013.01); *H04B 7/0413* (2013.01);
(Continued)

(58) Field of Classification Search
CPC ................ H04B 7/0697; H04B 7/0413; H04B 7/0426; H04B 7/0682; H04B 7/046;
(Continued)

(56) References Cited

U.S. PATENT DOCUMENTS

| | | | |
|---|---|---|---|
| 7,881,395 | B2 | 2/2011 | Lee |
| 8,036,286 | B2 | 10/2011 | Lee |

(Continued)

FOREIGN PATENT DOCUMENTS

| | | |
|---|---|---|
| CN | 101374032 | 2/2009 |
| CN | 10163995 | 1/2010 |

(Continued)

OTHER PUBLICATIONS

International Search Report dated Jun. 26, 2012 in International (PCT) Application No. PCT/JP2012/002685.
(Continued)

*Primary Examiner* — Phuong Phu
(74) *Attorney, Agent, or Firm* — Wenderoth, Lind & Ponack, L.L.P.

(57) ABSTRACT

A transmission method for transmitting a first modulated signal and a second modulated signal in the same frequency at the same time. Each signal has been modulated according to a different modulation scheme. The transmission method applies precoding on both signals using a fixed precoding matrix, applies different power change to each signal, and regularly changes the phase of at least one of the signals, thereby improving received data signal quality for a reception device.

2 Claims, 109 Drawing Sheets

Related U.S. Application Data continuation of application No. 16/804,189, filed on Feb. 28, 2020, now Pat. No. 10,892,812, which is a continuation of application No. 16/163,960, filed on Oct. 18, 2018, now Pat. No. 10,630,369, which is a continuation of application No. 15/825,498, filed on Nov. 29, 2017, now Pat. No. 10,153,823, which is a continuation of application No. 15/452,970, filed on Mar. 8, 2017, now Pat. No. 9,866,306, which is a continuation of application No. 15/077,120, filed on Mar. 22, 2016, now Pat. No. 9,628,165, which is a continuation of application No. 14/567,314, filed on Dec. 11, 2014, now Pat. No. 9,325,396, which is a continuation of application No. 14/110,795, filed as application No. PCT/JP2012/002685 on Apr. 18, 2012, now Pat. No. 8,971,432.

(51) Int. Cl.

| | | |
|---|---|---|
| H04B 7/06 | (2006.01) | |
| H04W 52/42 | (2009.01) | |
| H04B 7/0413 | (2017.01) | |
| H04B 7/0426 | (2017.01) | |
| H04B 7/0456 | (2017.01) | |
| H04B 7/08 | (2006.01) | |
| H04L 25/03 | (2006.01) | |
| H04J 11/00 | (2006.01) | |

(52) U.S. Cl.
CPC ......... *H04B 7/0426* (2013.01); *H04B 7/0456* (2013.01); *H04B 7/0465* (2013.01); *H04B 7/0617* (2013.01); *H04B 7/0682* (2013.01); *H04B 7/0862* (2013.01); *H04L 25/0391* (2013.01); *H04W 52/42* (2013.01); *H04J 11/0033* (2013.01)

(58) Field of Classification Search
CPC ............... H04B 7/0617; H04B 7/0862; H04B 7/0456; H04B 7/0465; H04W 52/42; H04L 25/0391; H04J 11/0033
USPC ................ 375/260, 295, 316, 219, 220, 222
See application file for complete search history.

(56) References Cited

U.S. PATENT DOCUMENTS

| | | | |
|---|---|---|---|
| 8,068,555 B2 | 11/2011 | Jongren | |
| 8,213,530 B2 | 7/2012 | Lee et al. | |
| 8,254,476 B2 | 8/2012 | Ohwatari et al. | |
| 8,284,849 B2 | 10/2012 | Lee et al. | |
| 8,660,601 B2 | 2/2014 | Seo | |
| 8,929,473 B2 | 1/2015 | Ayach | |
| 8,971,432 B2 | 3/2015 | Murakami et al. | |
| 8,989,137 B2 | 3/2015 | Murakami et al. | |
| 9,225,406 B2 | 12/2015 | Murakami et al. | |
| 9,325,396 B2 | 4/2016 | Murakami et al. | |
| 9,628,165 B2 | 4/2017 | Murakami et al. | |
| 9,667,333 B2 | 5/2017 | Murakami | |
| 9,866,306 B2 | 1/2018 | Murakami et al. | |
| 10,009,207 B2 | 6/2018 | Murakami | |
| 10,153,823 B2 | 12/2018 | Murakami | |
| 10,476,720 B2 | 11/2019 | Murakami | |
| 10,630,369 B2 | 4/2020 | Murakami | |
| 10,892,812 B2* | 1/2021 | Murakami | H04B 7/0426 |
| 2004/0042439 A1 | 3/2004 | Menon et al. | |
| 2005/0249304 A1 | 11/2005 | Takano et al. | |
| 2007/0140377 A1 | 6/2007 | Murakami et al. | |
| 2007/0268977 A1 | 11/2007 | Wang et al. | |
| 2008/0080449 A1 | 4/2008 | Huang et al. | |
| 2008/0080634 A1 | 4/2008 | Kotecha et al. | |
| 2008/0080637 A1 | 4/2008 | Khan et al. | |
| 2008/0260058 A1 | 10/2008 | Li | |
| 2009/0052578 A1 | 2/2009 | Sawai | |
| 2010/0027696 A1 | 2/2010 | Lee et al. | |
| 2010/0046658 A1 | 2/2010 | Yosuku et al. | |
| 2010/0135432 A1 | 6/2010 | Miyoshi et al. | |
| 2010/0220681 A1 | 9/2010 | Obuchi et al. | |
| 2010/0254487 A1 | 10/2010 | Lee | |
| 2011/0019753 A1* | 1/2011 | Ko | H04L 27/2613 375/260 |
| 2011/0176624 A1 | 7/2011 | Armavajjala et al. | |
| 2011/0205966 A1 | 8/2011 | Iwai et al. | |
| 2011/0261894 A1 | 10/2011 | Yu et al. | |
| 2012/0082192 A1 | 4/2012 | Pelletier et al. | |
| 2012/0224651 A1 | 9/2012 | Murakami et al. | |
| 2012/0300877 A1 | 11/2012 | Murakami et al. | |
| 2013/0121269 A1 | 5/2013 | Nammi et al. | |
| 2013/0322566 A1 | 12/2013 | Murakami et al. | |
| 2014/0044218 A1 | 2/2014 | Murakami et al. | |
| 2015/0010104 A1 | 1/2015 | Park et al. | |
| 2015/0103941 A1 | 4/2015 | Murakami et al. | |
| 2016/0149624 A1 | 5/2016 | Murakami et al. | |
| 2016/0269215 A1 | 9/2016 | Choi et al. | |
| 2016/0374060 A1 | 12/2016 | Lim et al. | |
| 2017/0041053 A1 | 2/2017 | Murakami et al. | |
| 2017/0104518 A1 | 4/2017 | Murakami et al. | |
| 2017/0141834 A1 | 5/2017 | Yang et al. | |
| 2017/0195023 A1 | 7/2017 | Murakami et al. | |
| 2017/0366381 A1 | 12/2017 | Zoellner et al. | |
| 2019/0326967 A1 | 10/2019 | Murakami | |

FOREIGN PATENT DOCUMENTS

| | | |
|---|---|---|
| EP | 2 312 778 | 4/2011 |
| EP | 2 677 676 | 12/2013 |
| JP | 2005-123898 | 5/2005 |
| JP | 2005-192126 | 7/2005 |
| JP | 2005-354665 | 12/2005 |
| JP | 2008-543215 | 11/2008 |
| JP | 2009-171155 | 7/2009 |
| JP | 2009-525665 | 7/2009 |
| JP | 2010-514377 | 4/2010 |
| JP | 2010-518757 | 5/2010 |
| JP | 2010-518763 | 5/2010 |
| JP | 2010-519794 | 6/2010 |
| WO | 2005/050885 | 6/2005 |
| WO | 2006/129958 | 12/2006 |
| WO | 2007/089110 | 8/2007 |
| WO | 2008/035915 | 3/2008 |
| WO | 2008/077056 | 6/2008 |
| WO | 2008/088066 | 7/2008 |
| WO | 2008/098092 | 8/2008 |
| WO | 2008/098093 | 8/2008 |
| WO | 2008/098225 | 8/2008 |
| WO | 2008/100038 | 8/2008 |
| WO | 2008/114956 | 9/2008 |
| WO | 2009/038317 | 3/2009 |
| WO | 2009/061116 | 5/2009 |
| WO | 2009/153978 | 12/2009 |
| WO | 2010/016183 | 2/2010 |

OTHER PUBLICATIONS

Tareq Y. Al-Naffouri et al., "Opportunistic Beamforming with Precoding for Spatially Correlated Channels", Information Theory, 2009, CWIT 2009, 11th Canadian Workshop on, May 15, 2009, pp. 63-66.

Bertrand M. Hochwald et al., "Achieving Near-Capacity on a Multiple-Antenna Channel", IEEE Transactions on Communications, vol. 51, No. 3, pp. 389-399, Mar. 2003.

Ben Lu et al., "Performance Analysis and Design Optimization of LDPC-Coded MIMO OFDM Systems", IEEE Transactions on Signal Processing, vol. 52, No. 2, pp. 348-361, Feb. 2004.

Yutaka Murakami et al., "BER Performance Evaluation in 2x2 MIMO Spatial Multiplexing Systems under Rician Fading Channels", IEICE Trans. Fundamentals, vol. E91-A, No. 10, pp. 2798-2807, Oct. 2008.

(56) References Cited

OTHER PUBLICATIONS

Hangjun Chen et al., "Turbo Space-Time Codes with Time Varying Linear Transformations", IEEE Transactions on Wireless Communications, vol. 6, No. 2, pp. 486-493, Feb. 2007.

Hiroyuki Kawai et al., "Likelihood Function for QRM-MLD Suitable for Soft-Decision Turbo Decoding and Its Performance for OFCDM MIMO Multiplexing in Multipath Fading Channel", IEICE Trans. Commun., vol. E88-B, No. 1, pp. 47-57, Jan. 2005.

"Parallel concatenated (Turbo) coding", "Turbo (iterative) decoding" and related topics along with English abstract, The Institute of Electronics, Information and Communication Engineers, Technical Report of IEICE, IT98-51 (Dec. 1998), pp. 1-18.

S. Galli et al., "Advanced Signal Processing for PLCs: Wavelet-OFDM", Proc. of IEEE International Symposium on ISPLC 2008, pp. 187-192, 2008.

David J. Love et al., "Limited Feedback Unitary Precoding for Spatial Multiplexing Systems", IEEE Transactions on Information Theory, vol. 51, No. 8, pp. 2967-2976, Aug. 2005.

DVB Document A122, Frame structure, channel coding and modulation for a second generation digital terrestrial television broadcasting system (DVB-T2), Jun. 2008.

Lorenzo Vangelista et al., "Key Technologies for Next-Generation Terresuial Digital Television Standard DVB-T2", IEEE Communications Magazine, vol. 47, No. 10, pp. 146-153, Oct. 2009.

Takeo Ohgane et al., "Applications of Space Division Multiplexing and Those Performance in a MIMO Channel", IEICE Trans. Commun., vol. E88-B, No. 5, pp. 1843-1851, May 2005.

R. G. Gallager, "Low-Density Parity-Check Codes", IRE Transactions on Information Theory, IT-8, pp. 21-28, 1962.

David J. C. Mackay, "Good Error-Correcting Codes Based on Very Sparse Matrices", IEEE Transactions on Information Theory, vol. 45, No. 2, pp. 399-431, Mar. 1999.

ETSI EN 302 307, "Digital Video Broadcasting (DVB); Second generation framing suucture, channel coding and modulation systems for Broadcasting, Interactive Services, News Gathering and other broadband satellite applications", V1.1.2, Jun. 2006.

Yeong-Luh Ueng et al., "A Fast-Convergence Decoding Method and Memory-Efficient VLSI Decoder Architecture for Irregular LDPC Codes in the IEEE802.16e Standards", IEEE VTC-2007 Fall, pp. 1255-1259.

Siavash M. Alamouti, "A Simple Transmit Diversity Technique for Wireless Communications", IEEE Journal on Select Areas in Communications, vol. 16, No. 8, pp. 1451-1458, Oct. 1998.

Vahid Tarokh et al., "Space-Time Block Coding for Wireless Communications: Performance Results", IEEE Journal on Selected Areas in Communications, vol. 17, No. 3, pp. 451-460, Mar. 1999.

Magnus Sandell et al., "Pseudo-Random Scrambling for Quasi-Static MIMO Channels", The 18th Annual IEEE International Symposium on Personal, Indoor and Mobile Radio Communications (PIMRC'07), 2007, Sep. 7, 2007.

Kenichi Kobayashi et al., "MIMO System with Relative Phase Difference Time-Shift Modulation for Rician Fading Environment", IEICE Transactions on Communications, Communications Society, Tokyo, JP, vol. E91-B, No. 2, Feb. 1, 2008, pp. 459-465.

Kenichi Kobayashi et al., "MIMO System with Relative Phase Difference Time-Shift Modulation in Rician Fading Environments", IEEE International Conference on Communications, 2008: ICC 2008; May 19-23, 2008, Beijing, China, IEEE, Piscataway, NJ, USA, May 19, 2008 , pp. 732-736.

Yutaka Murakami et al., "Design of Transmission Technique Utilizing Linear Combination Diversity in Consideration of LOS Environments in MIMO Systems", IEICE Transactions on Fundamentals of Electronics, Communications and Computer Sciences, Engineering Sciences Society, Tokyo, JP, vol. E88-A, No. 11, Nov. 1, 2005, pp. 3127-3133.

J. Klutto Milleth et al., "Performance Enhancement of Space-Time Trellis Codes When Encountering AWGN and Ricean Channels", IEEE Transactions on Vehicular Technology, IEEE Service Center, Piscataway, NJ, US, vol. 54, No. 4, Jul. 1, 2005, pp. 1352-1360.

International Search Report dated Jul. 12, 2011 in International (PCT) Application No. PCT/JP2011/003384.

Supplementary European Search Report dated Mar. 15, 2012 in Application No. EP 11 79 5404.

Supplementary European Search Report dated Jul. 30, 2014 in European Application No. 12774322.7.

Wei Wang et al., "Taming Underlying Design for Energy Efficient Distributed Source Coding in Multirate Wireless Sensor Network", IEEEVTS Vehicular Technology Conference Proceedings, IEEE, US, Apr. 1, 2007, pp. 124-129.

Office Action dated Dec. 3, 2014 in Chinese Application No. 201180029416.0, with partial English translation.

Office Action dated Apr. 25, 2016 in corresponding Taiwanese Application No. 101113935, with partial English translation.

NTT DoCoMo et al., "Downlink MIMO Scheme for Shared Data Channel in E-UTRA", 3GPP TSG RAN WG1 Meeting #47 R1-063310, Nov. 6-10, 2006.

Notice of Allowance dated Sep. 28, 2018 in U.S. Appl. No. 15/804,209.

Notice of Allowance dated Dec. 18, 2018 in U.S. Appl. No. 15/804,209.

Office Action dated Sep. 18, 2019 in U.S. Appl. No. 16/353,208.

Office Action dated Apr. 5, 2021 in U.S. Appl. No. 16/872,874.

Office Action dated Oct. 14, 2022 in U.S. Appl. No. 17/481,657.

\* cited by examiner

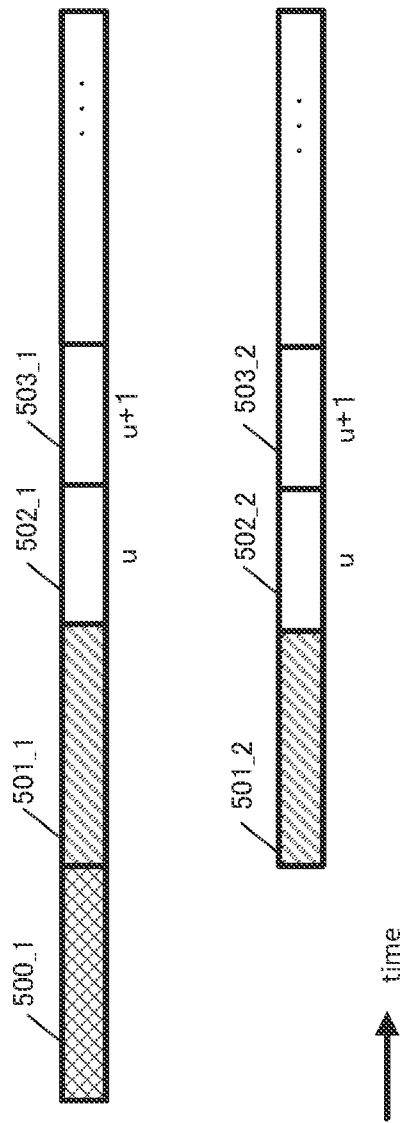
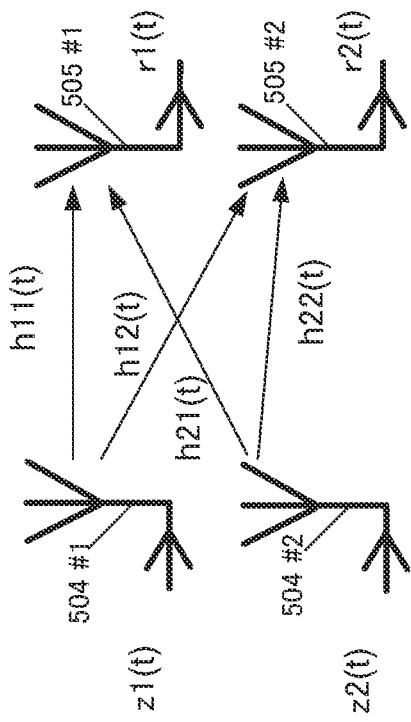
FIG. 5

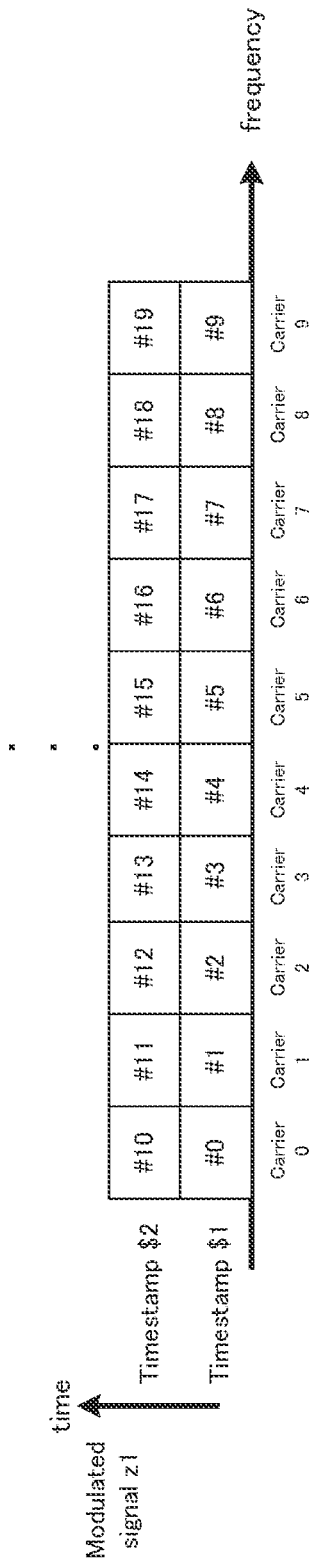
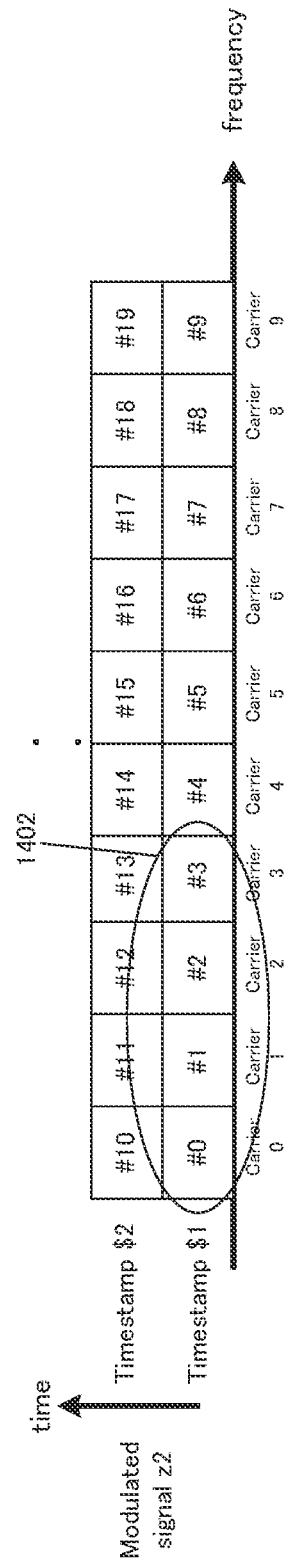

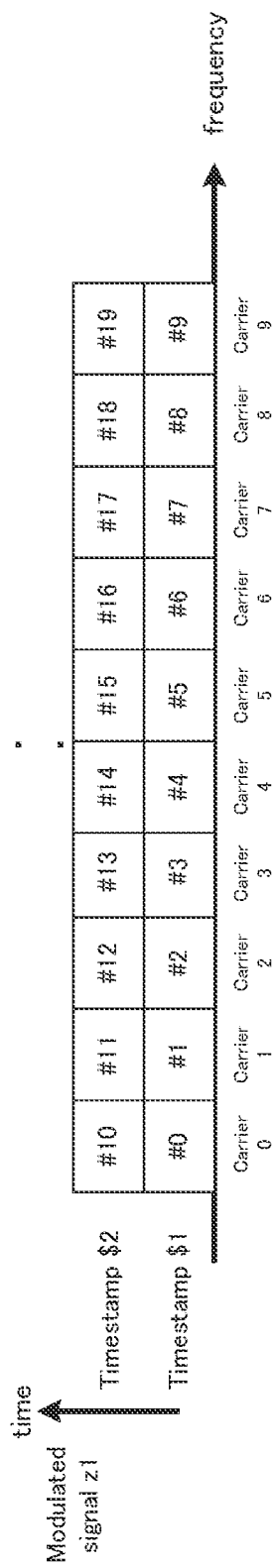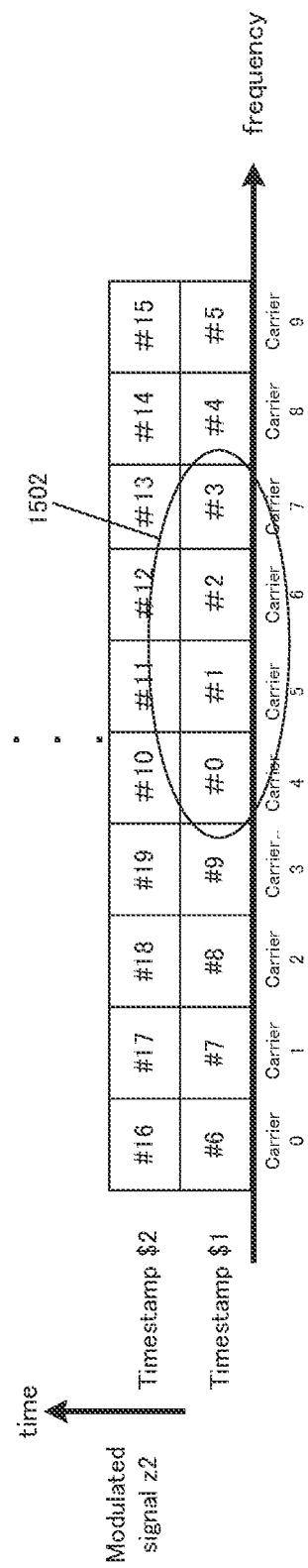

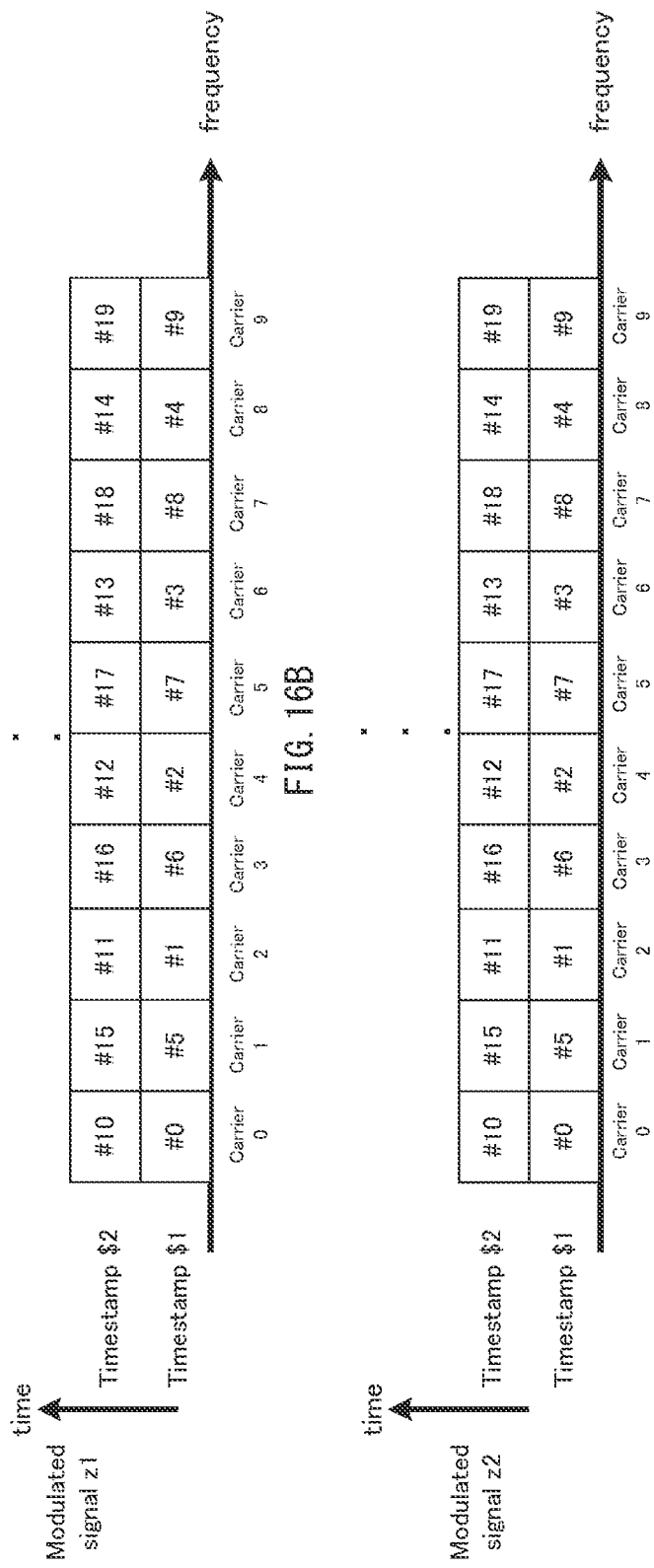

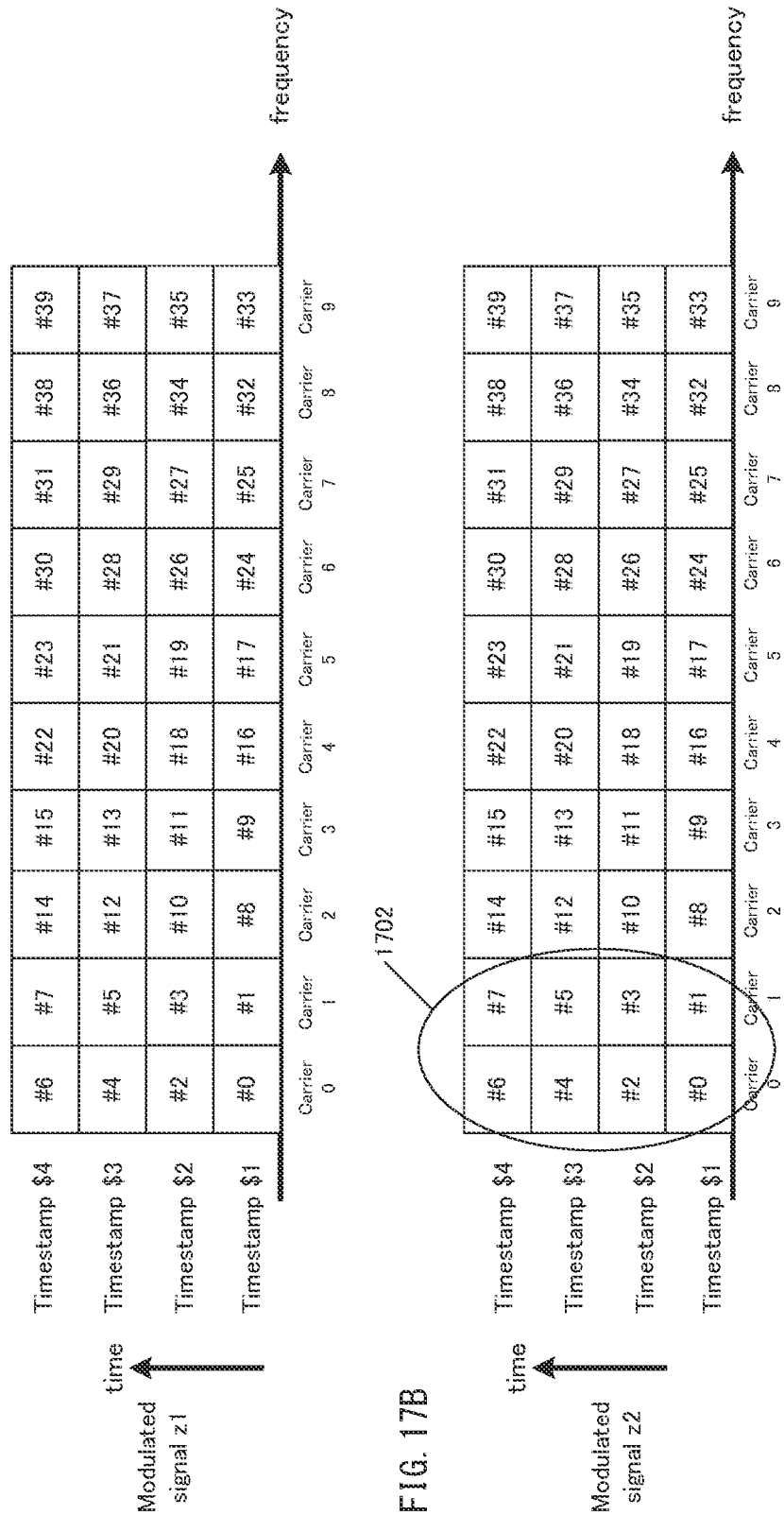

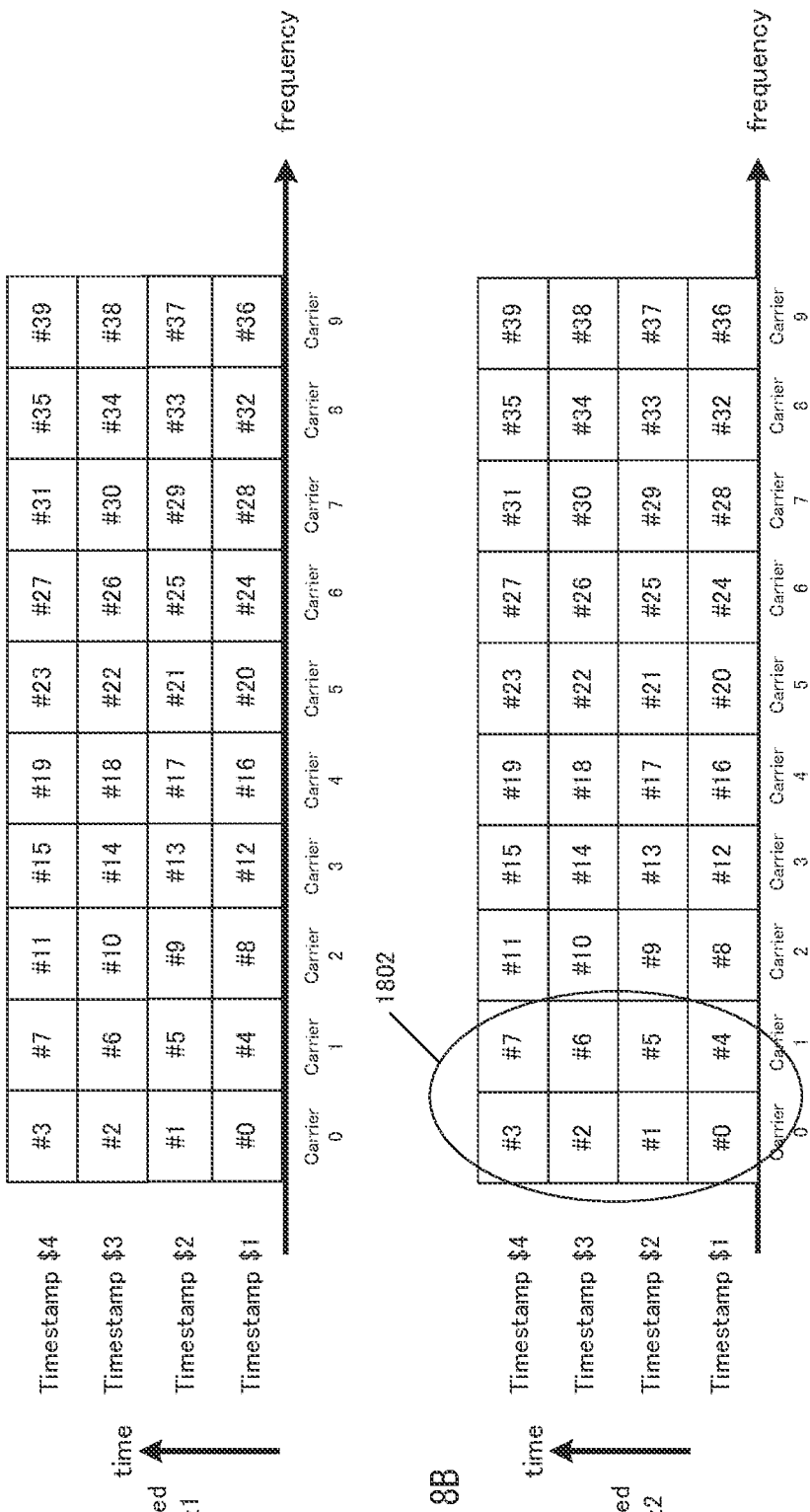

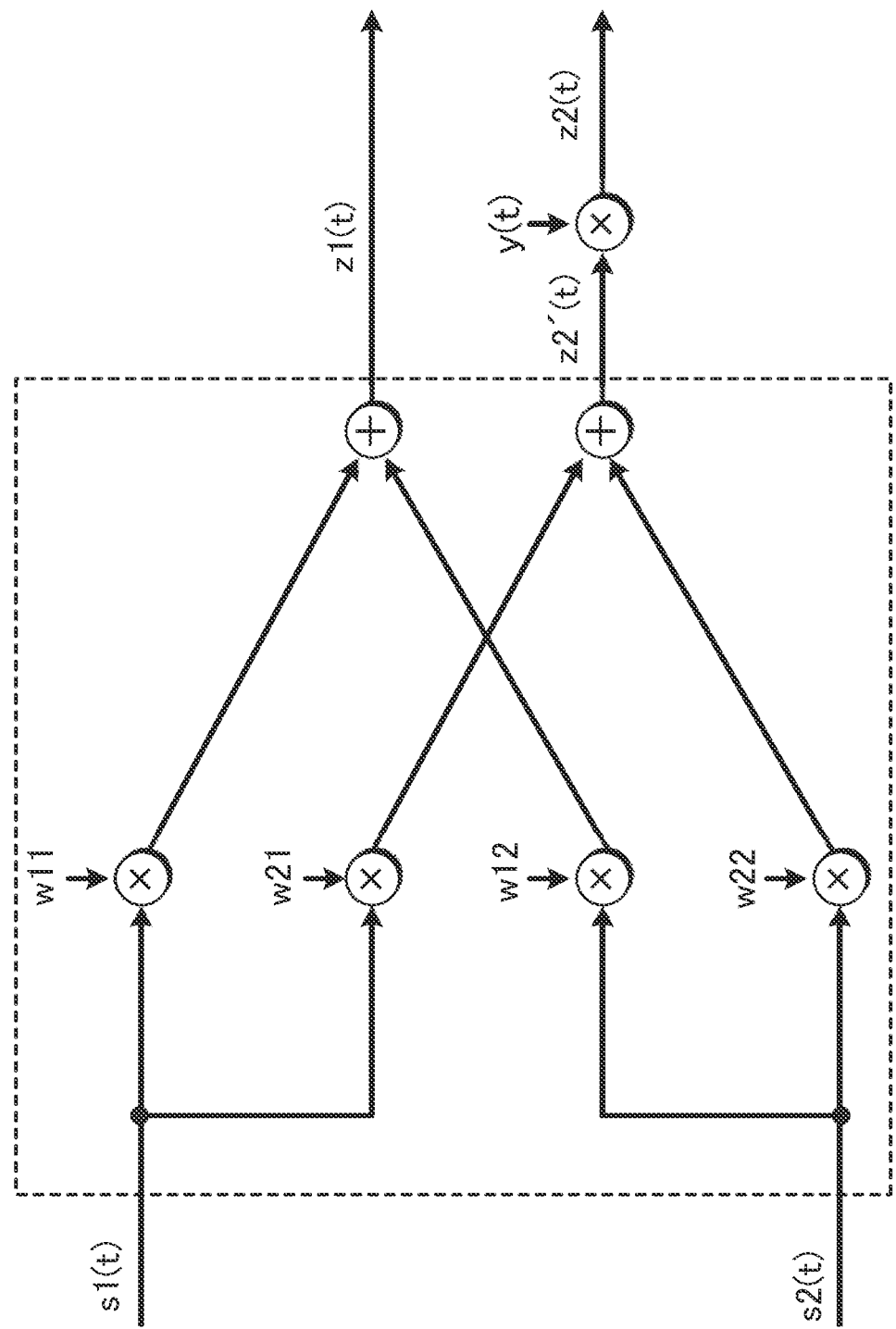

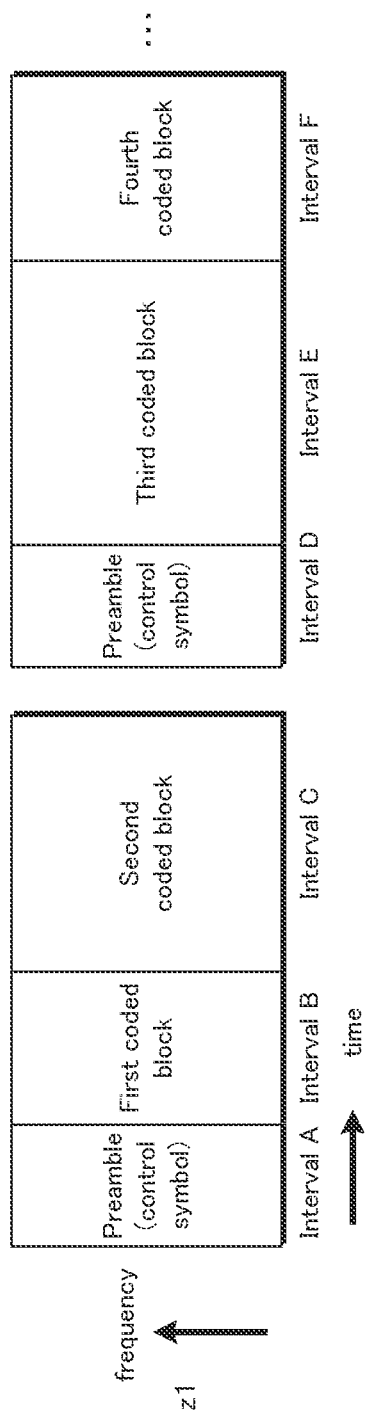
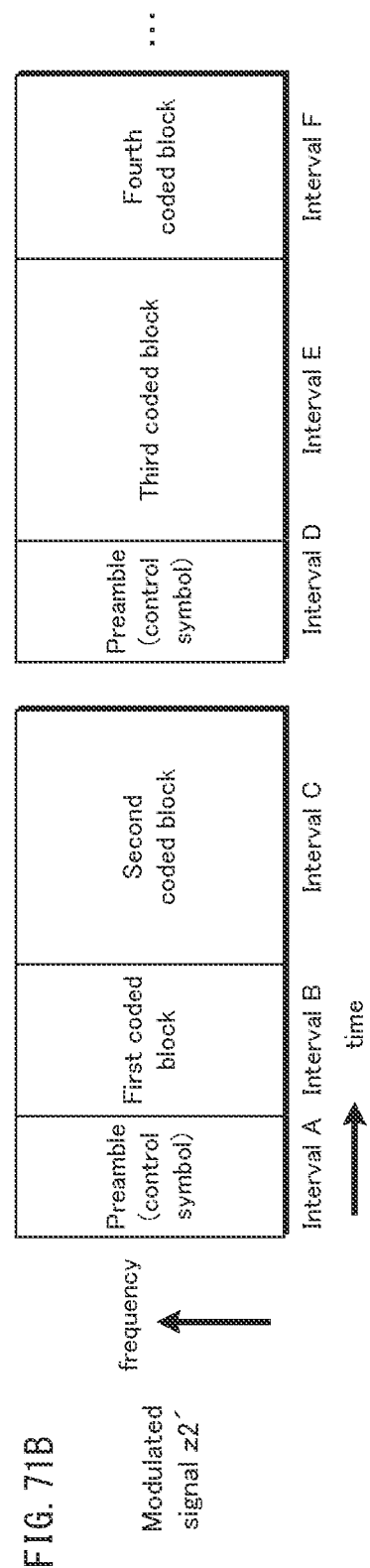
FIG. 71A
FIG. 71B

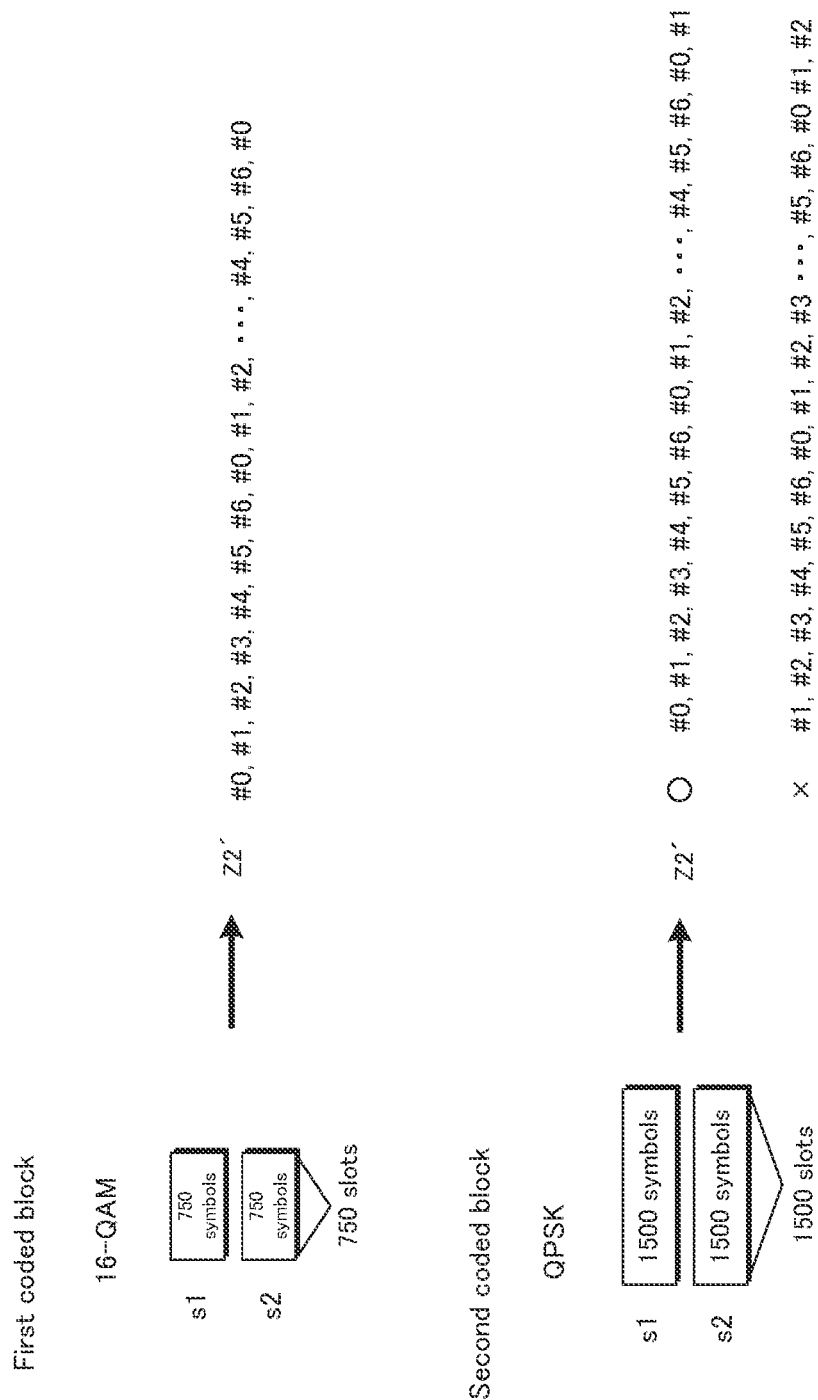

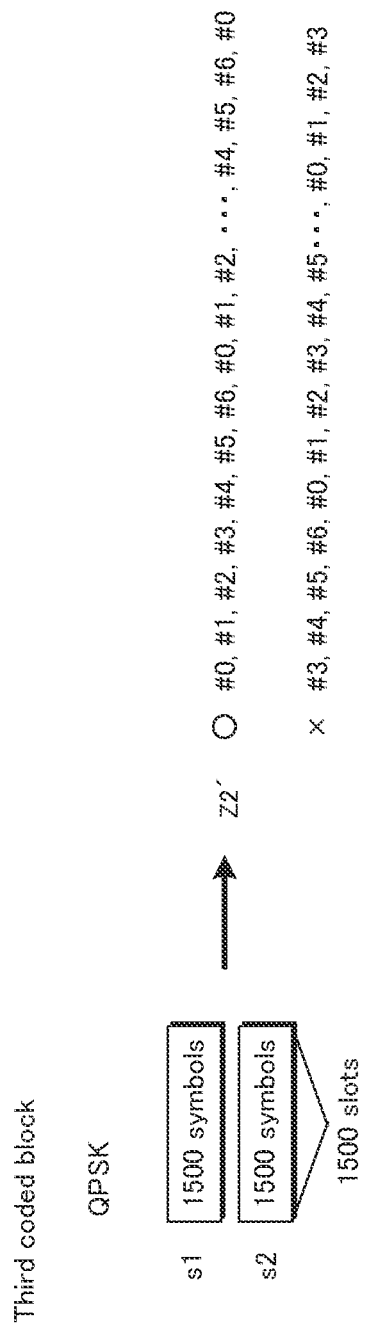

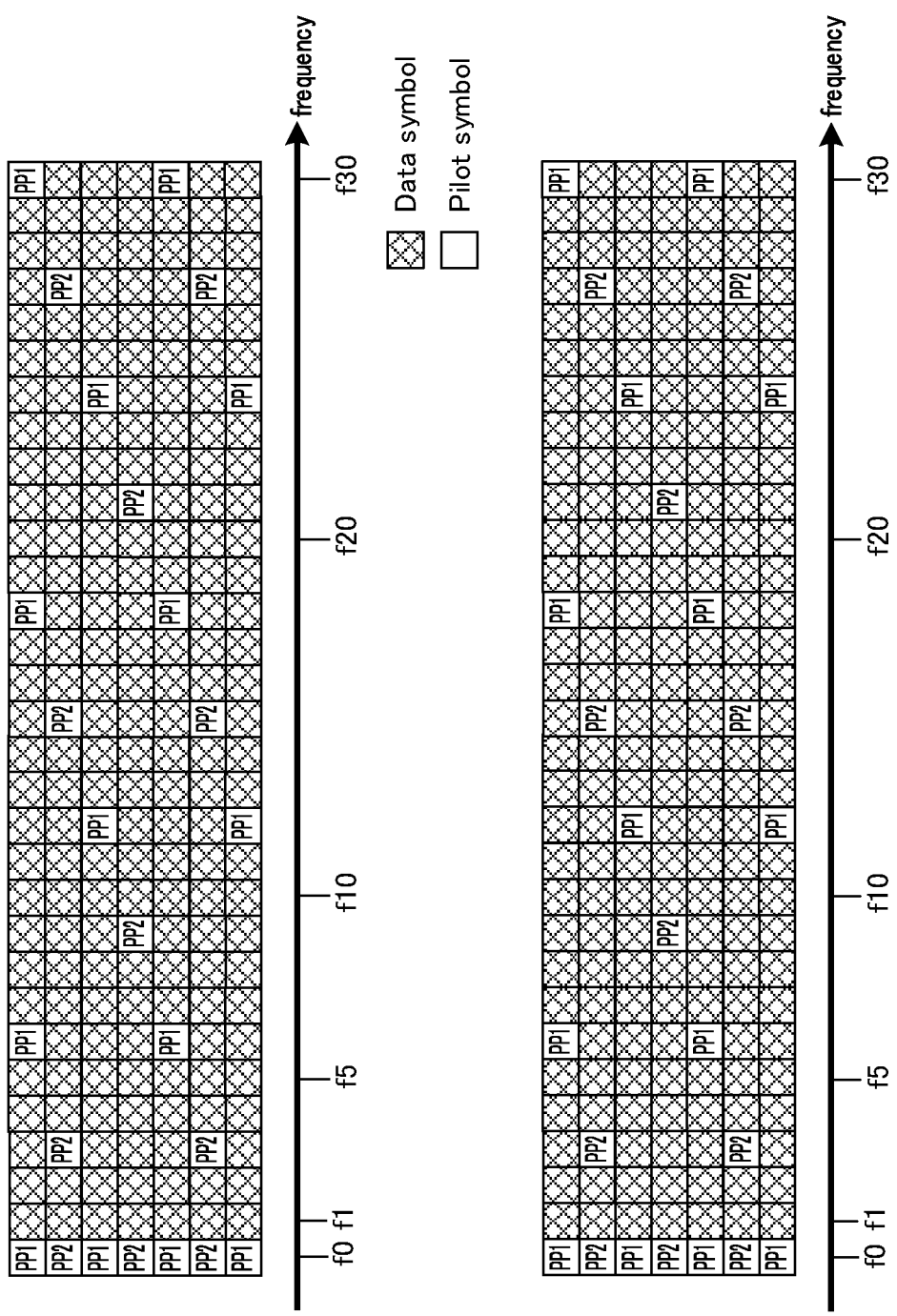
FIG. 89A Modulated signal z1
FIG. 89B Modulated signal z2

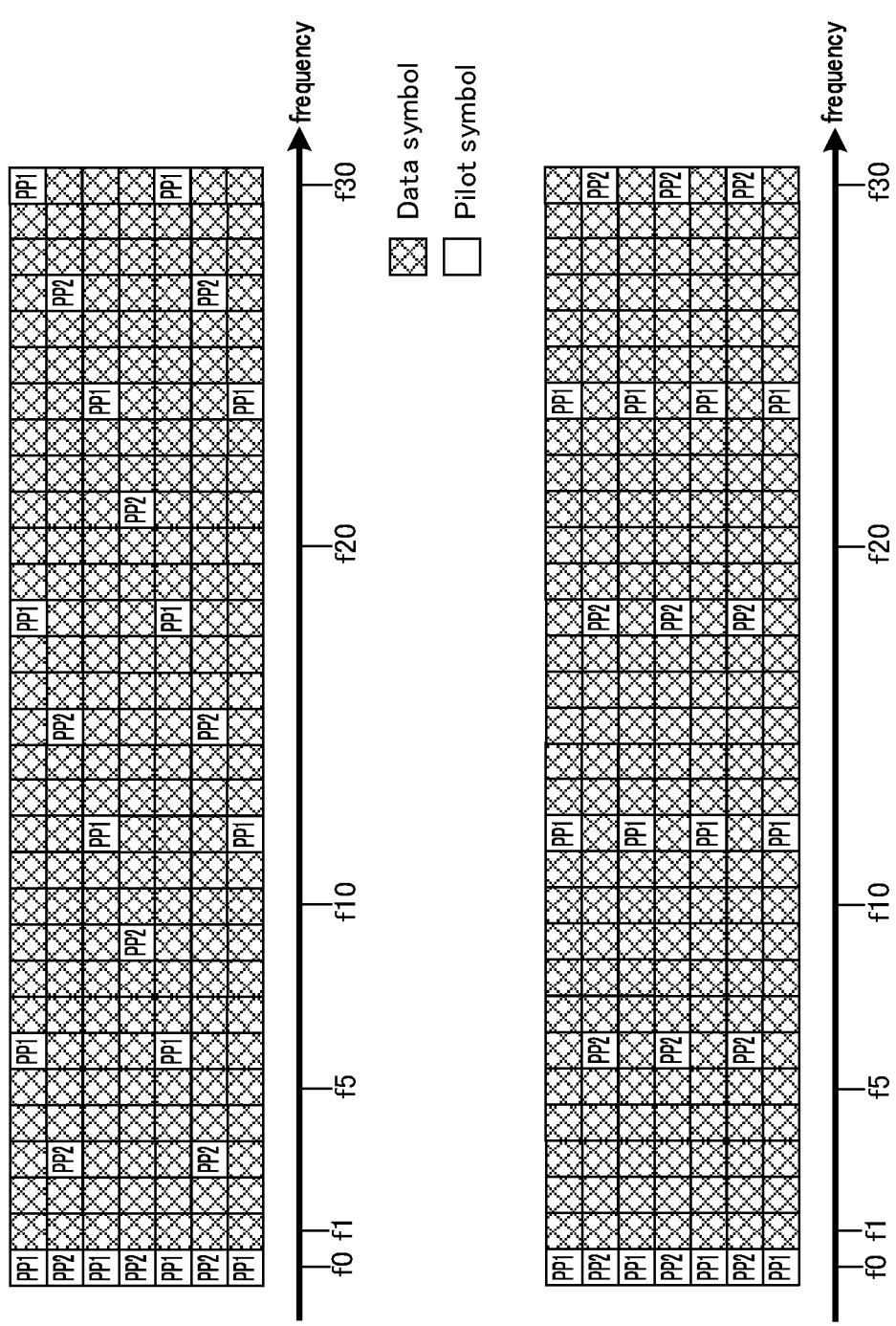
FIG. 90A Modulated signal z1
FIG. 90B Modulated signal z2

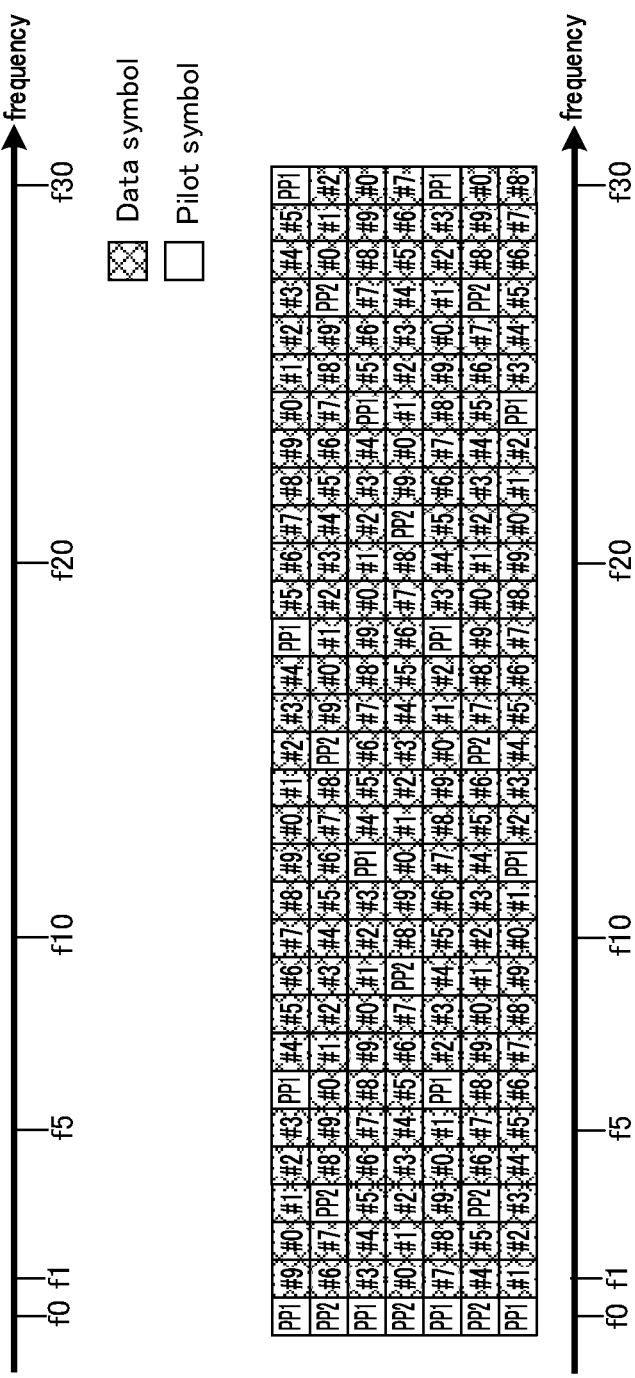
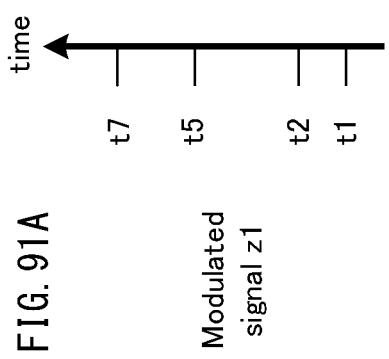
FIG. 91A Modulated signal z1
FIG. 91B Modulated signal z2

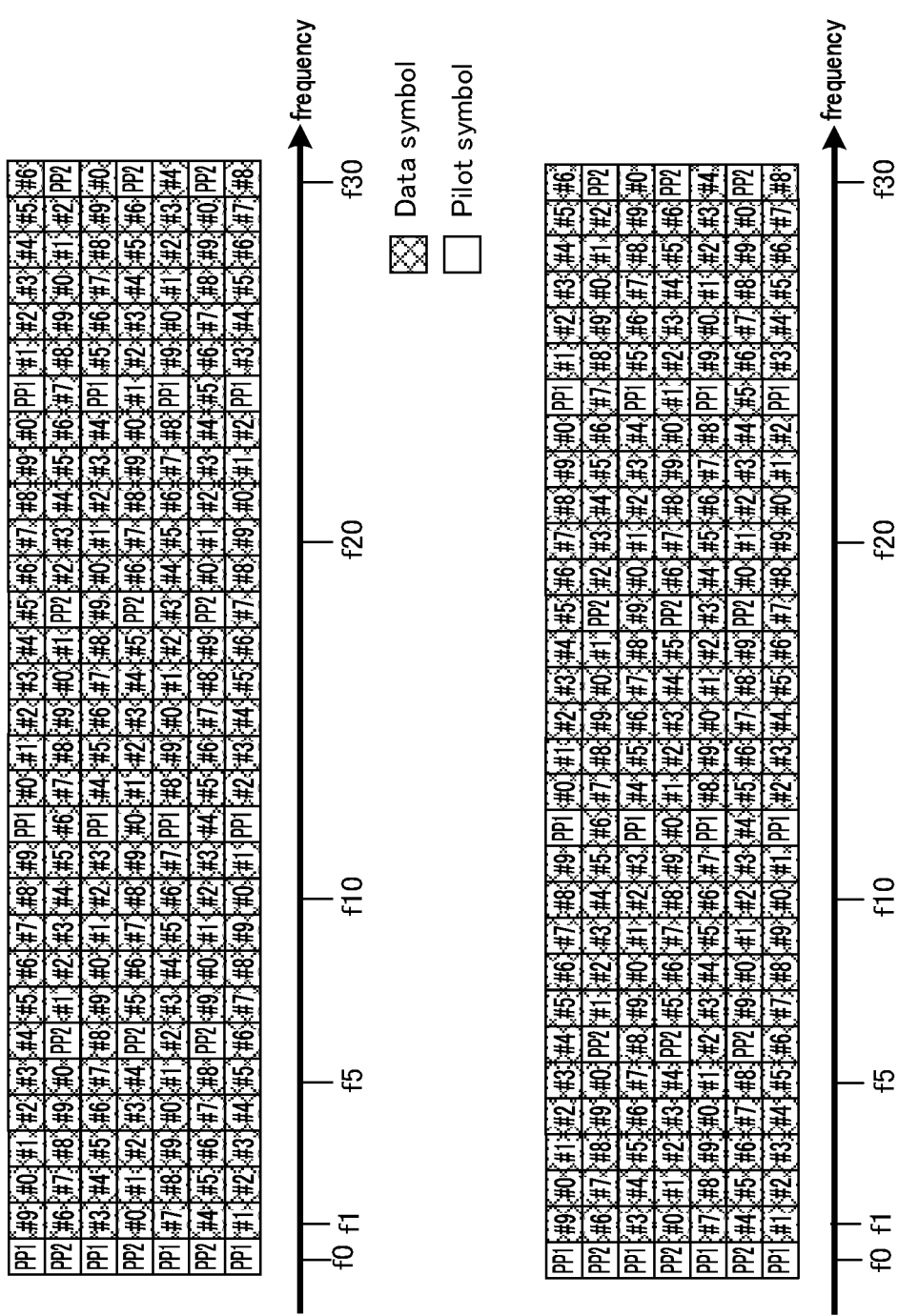
FIG. 92A Modulated signal z1
FIG. 92B Modulated signal z2

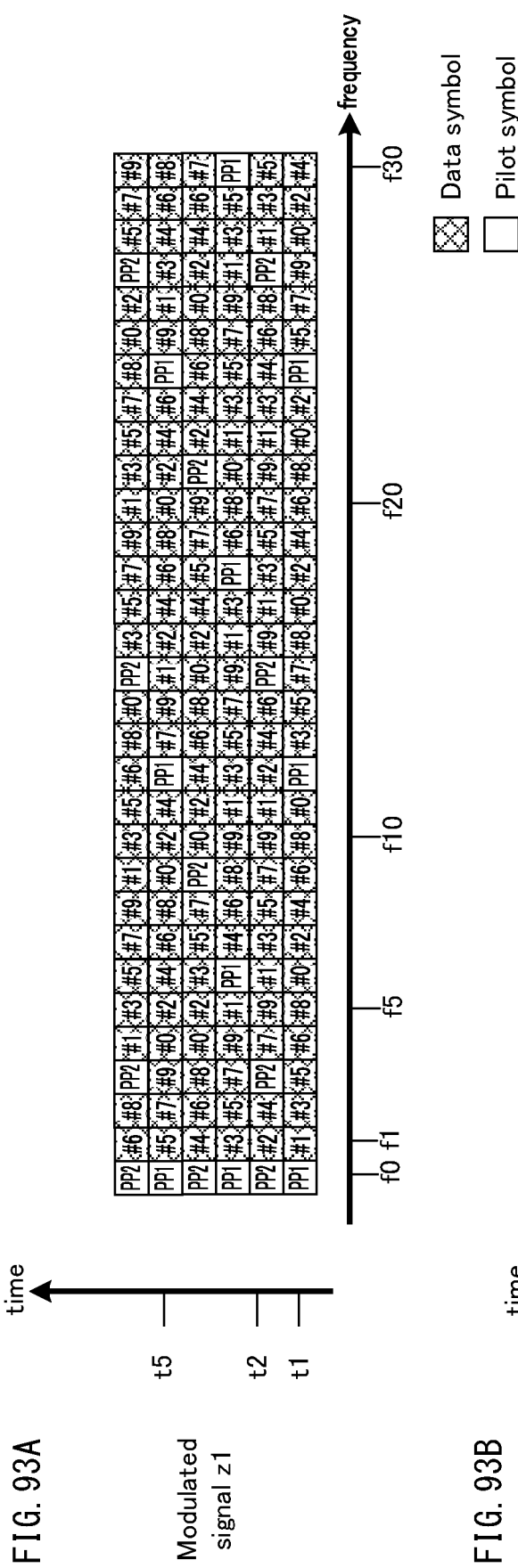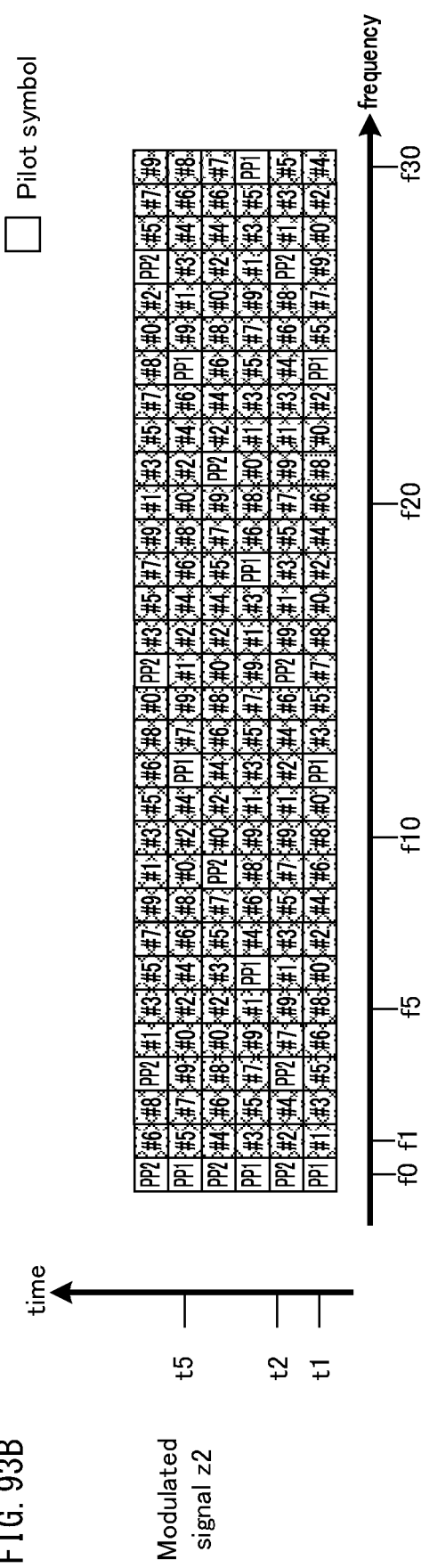
FIG. 93A
FIG. 93B

FIG. 103
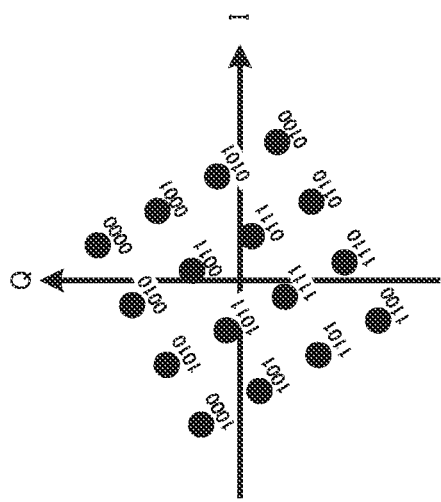
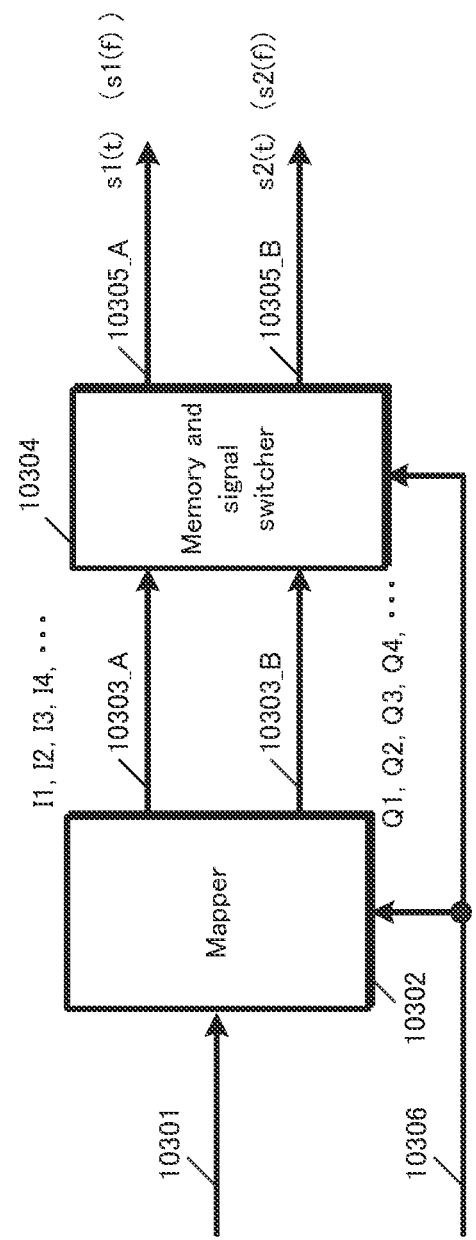

SIGNAL GENERATING METHOD AND SIGNAL GENERATING DEVICE

TECHNICAL FIELD

Cross Reference to Related Application

This application is based on applications No. 2011-093540 filed in Japan on Apr. 19, 2011 and No. 2011-140749 filed in Japan on Jun. 24, 2011 the contents of which are hereby incorporated by reference.

The present invention relates to a signal generating method and a signal generating device for communication using multiple antennas.

BACKGROUND ART

A MIMO (Multiple-Input, Multiple-Output) system is an example of a conventional communication system using multiple antennas. In multi-antenna communication, of which the MIMO system is typical, multiple transmission signals are each modulated, and each modulated signal is simultaneously transmitted from a different antenna in order to increase the transmission speed of the data.

FIG. 23 illustrates a sample configuration of a transmission and reception device having two transmit antennas and two receive antennas, and using two transmit modulated signals (transmit streams). In the transmission device, encoded data are interleaved, the interleaved data are modulated, and frequency conversion and the like are performed to generate transmission signals, which are then transmitted from antennas. In this case, the scheme for simultaneously transmitting different modulated signals from different transmit antennas at the same time and on a common frequency is a spatial multiplexing MIMO system.

In this context, Patent Literature 1 suggests using a transmission device provided with a different interleaving pattern for each transmit antenna. That is, the transmission device from FIG. 23 should use two distinct interleaving patterns performed by two interleavers ($\pi a$ and $\pi b$). As for the reception device, Non-Patent Literature 1 and Non-Patent Literature 2 describe improving reception quality by iteratively using soft values for the detection method (by the MIMO detector of FIG. 23).

As it happens, models of actual propagation environments in wireless communications include NLOS (Non Line-Of-Sight), typified by a Rayleigh fading environment, and LOS (Line-Of-Sight), typified by a Rician fading environment. When the transmission device transmits a single modulated signal, and the reception device performs maximal ratio combination on the signals received by a plurality of antennas and then demodulates and decodes the resulting signals, excellent reception quality can be achieved in a LOS environment, in particular in an environment where the Rician factor is large. The Rician factor represents the received power of direct waves relative to the received power of scattered waves. However, depending on the transmission system (e.g., a spatial multiplexing MIMO system), a problem occurs in that the reception quality deteriorates as the Rician factor increases (see Non-Patent Literature 3).

FIGS. 24A and 24B illustrate an example of simulation results of the BER (Bit Error Rate) characteristics (vertical axis: BER, horizontal axis: SNR (signal-to-noise ratio) for data encoded with LDPC (low-density parity-check) codes and transmitted over a 2×2 (two transmit antennas, two receive antennas) spatial multiplexing MIMO system in a Rayleigh fading environment and in a Rician fading environment with Rician factors of K=3, 10, and 16 dB. FIG. 24A gives the Max-Log approximation-based log-likelihood ratio (i.e., Max-log APP, where APP is the a posteriori probability) BER characteristics without iterative detection (see Non-Patent Literature 1 and Non-Patent Literature 2), while FIG. 24B gives the Max-log APP BER characteristic with iterative detection (see Non-Patent Literature 1 and Non-Patent Literature 2) (number of iterations: five). FIGS. 24A and 24B clearly indicate that, regardless of whether or not iterative detection is performed, reception quality degrades in the spatial multiplexing MIMO system as the Rician factor increases. Thus, the problem of reception quality degradation upon stabilization of the propagation environment in the spatial multiplexing MIMO system, which does not occur in a conventional single-modulation signal system, is unique to the spatial multiplexing MIMO system.

Broadcast or multicast communication is a service applied to various propagation environments. The radio wave propagation environment between the broadcaster and the receivers belonging to the users is often a LOS environment. When using a spatial multiplexing MIMO system having the above problem for broadcast or multicast communication, a situation may occur in which the received electric field strength is high at the reception device, but in which degradation in reception quality makes service reception impossible. In other words, in order to use a spatial multiplexing MIMO system in broadcast or multicast communication in both the NLOS environment and the LOS environment, a MIMO system that offers a certain degree of reception quality is desirable.

Non-Patent Literature 8 describes a method of selecting a codebook used in precoding (i.e. a precoding matrix, also referred to as a precoding weight matrix) based on feedback information from a communication party. However, Non-Patent Literature 8 does not at all disclose a method for precoding in an environment in which feedback information cannot be acquired from the other party, such as in the above broadcast or multicast communication.

On the other hand, Non-Patent Literature 4 discloses a method for switching the precoding matrix over time. This method is applicable when no feedback information is available. Non-Patent Literature 4 discloses using a unitary matrix as the precoding matrix, and switching the unitary matrix at random, but does not at all disclose a method applicable to degradation of reception quality in the above-described LOS environment. Non-Patent Literature 4 simply recites hopping between precoding matrices at random. Obviously, Non-Patent Literature 4 makes no mention whatsoever of a precoding method, or a structure of a precoding matrix, for remedying degradation of reception quality in a LOS environment.

CITATION LIST

Patent Literature

[Patent Literature 1]
International Patent Application Publication No. WO2005/050885

Non-Patent Literature

[Non-Patent Literature 1]
"Achieving near-capacity on a multiple-antenna channel" IEEE Transaction on communications, vol. 51, no. 3, pp. 389-399, March 2003

[Non-Patent Literature 2] "Performance analysis and design optimization of LDPC-coded MIMO OFDM systems" IEEE Trans. Signal Processing, vol. 52, no. 2, pp. 348-361, February 2004

[Non-Patent Literature 3]
"BER performance evaluation in 2×2 MIMO spatial multiplexing systems under Rician fading channels" IEICE Trans. Fundamentals, vol. E91-A, no. 10, pp. 2798-2807, October 2008

[Non-Patent Literature 4]
"Turbo space-time codes with time varying linear transformations" IEEE Trans. Wireless communications, vol. 6, no. 2, pp. 486-493, February 2007

[Non-Patent Literature 5]
"Likelihood function for QR-MLD suitable for soft-decision turbo decoding and its performance" IEICE Trans. Commun., vol. E88-B, no. 1, pp. 47-57, January 2004

[Non-Patent Literature 6]
"A tutorial on 'Parallel concatenated (Turbo) coding', 'Turbo (iterative) decoding' and related topics" IEICE, Technical Report IT98-51

[Non-Patent Literature 7]
"Advanced signal processing for PLCs: Wavelet-OFDM" Proc. of IEEE International symposium on ISPLC 2008, pp. 187-192, 2008

[Non-Patent Literature 8]
D. J. Love and R. W. Heath Jr., "Limited feedback unitary precoding for spatial multiplexing systems" IEEE Trans. Inf. Theory, vol. 51, no. 8, pp. 2967-2976, August 2005

[Non-Patent Literature 9]
DVB Document A122, Framing structure, channel coding and modulation for a second generation digital terrestrial television broadcasting system (DVB-T2), June 2008

[Non-Patent Literature 10]
L. Vangelista, N. Benvenuto, and S. Tomasin "Key technologies for next-generation terrestrial digital television standard DVB-T2," IEEE Commun. Magazine, vol. 47, no. 10, pp. 146-153, October 2009

[Non-Patent Literature 11]
T. Ohgane, T. Nishimura, and Y. Ogawa, "Application of space division multiplexing and those performance in a MIMO channel" IEICE Trans. Commun., vol. E88-B, no. 5, pp. 1843-1851, May 2005

[Non-Patent Literature 12]
R. G. Gallager "Low-density parity-check codes," IRE Trans. Inform. Theory, IT-8, pp. 21-28, 1962

[Non-Patent Literature 13]
D. J. C. Mackay, "Good error-correcting codes based on very sparse matrices," IEEE Trans. Inform. Theory, vol. 45, no. 2, pp. 399-431, March 1999.

[Non-Patent Literature 14]
ETSI EN 302 307, "Second generation framing structure, channel coding and modulation systems for broadcasting, interactive services, news gathering and other broadband satellite applications" v.1.1.2, June 2006

[Non-Patent Literature 15]
Y.-L. Ueng, and C.-C. Cheng "A fast-convergence decoding method and memory-efficient VLSI decoder architecture for irregular LDPC codes in the IEEE 802.16e standards" IEEE VTC-2007 Fall, pp. 1255-1259

[Non-Patent Literature 16]
S. M. Alamouti "A simple transmit diversity technique for wireless communications" IEEE J. Select. Areas Commun., vol. 16, no. 8, pp. 1451-1458, October 1998

[Non-Patent Literature 17]
V. Tarokh, H. Jafrkhani, and A. R. Calderbank "Space-time block coding for wireless communications: Performance results" IEEE J. Select. Areas Commun., vol. 17, no. 3, no. 3, pp. 451-460, March 1999

SUMMARY OF INVENTION

Technical Problem

An object of the present invention is to provide a MIMO system that improves reception quality in a LOS environment.

Solution to Problem

The present invention provides a signal generation method for generating, from a plurality of baseband signals, a plurality of signals for transmission on a common frequency band and at a common time, comprising: performing a change of phase on each of a first baseband signal s1 generated from a first set of bits according to a first modulation scheme and a second baseband signal s2 generated from a second set of bits according to a second modulation scheme, thus generating a first post-phase-change baseband signal s1' and a second post-phase-change baseband signal s2'; multiplying the first post-phase-change baseband signal s1' by u and multiplying the second post-phase-change baseband signal s2' by v, where u and v denote real numbers different from each other; and applying weighting according to a predetermined matrix F to the first post-phase-change baseband signal s1'×u and to the second post-phase-change baseband signal s2'×v, thus generating the plurality of signals for transmission on the common frequency band and at the common time as a first weighted signal z1 and a second weighted signal z2, wherein the first weighted signal z1 and the second weighted signal z2 satisfy the relation: $(z1, z2)^T = F(u \times s1', v \times s2')^T$, and the first modulation scheme is different from the second modulation scheme.

The present invention also provides a signal generation apparatus for generating, from a plurality of baseband signals, a plurality of signals for transmission on a common frequency band and at a common time, comprising: a phase changer performing a change of phase on each of a first baseband signal s1 generated from a first set of bits according to a first modulation scheme and a second baseband signal s2 generated from a second set of bits according to a second modulation scheme, thus generating a first post-phase-change baseband signal s1' and a second post-phase-change baseband signal s2'; a power changer multiplying the first post-phase-change baseband signal s1' by u and multiplying the second post-phase-change baseband signal s2' by v, where u and v denote real numbers different from each other; and a weighting unit applying weighting according to a predetermined matrix F to the first post-phase-change baseband signal s1'×u and to the second post-phase-change baseband signal s2'×v, thus generating the plurality of signals for transmission on the common frequency band and at the common time as a first weighted signal z1 and a second weighted signal z2, wherein the first weighted signal z1 and the second weighted signal z2 satisfy the relation: $(z1, z2)^T = F(u \times s1', v \times s2')^T$, and the first modulation scheme is different from the second modulation scheme.

Advantageous Effects of Invention

According to the above structure, the present invention provides a signal generation method and a signal generation apparatus that remedy degradation of reception quality in a LOS environment, thereby providing high-quality service to LOS users during broadcast or multicast communication.

BRIEF DESCRIPTION OF DRAWINGS

FIG. 5 illustrates another sample frame configuration.

FIGS. 14A and 14B illustrate another sample frame configuration.

FIGS. 15A and 15B illustrate another sample frame configuration.

FIGS. 16A and 16B illustrate another sample frame configuration.

FIGS. 17A and 17B illustrate another sample frame configuration.

FIGS. 18A and 18B illustrate another sample frame configuration.

FIG. 21 illustrates a sample configuration of a weighting unit.

FIGS. 71A and 71B illustrate another sample frame configuration.

FIG. 72 further illustrates the numbers of slots and phase changing values corresponding to a modulation scheme.

FIG. 73 further illustrates the numbers of slots and phase changing values corresponding to a modulation scheme.

FIGS. 89A and 89B illustrate further alternate sample frame configurations.

FIGS. 90A and 90B illustrate yet further alternate sample frame configurations.

FIGS. 91A and 91B illustrate more alternate sample frame configurations.

FIGS. 92A and 92B illustrate yet more alternate sample frame configurations.

FIGS. 93A and 93B illustrate still further alternate sample frame configurations.

FIG. 103 indicates a sample configuration for a signal generator when cyclic Q delay is applied.

DESCRIPTION OF EMBODIMENTS

Embodiments of the present invention are described below with reference to the accompanying drawings.

Embodiment 1

The following describes, in detail, a transmission method, a transmission device, a reception method, and a reception device pertaining to the present Embodiment.

Before beginning the description proper, an outline of transmission schemes and decoding schemes in a conventional spatial multiplexing MIMO system is provided.

Figure 1:
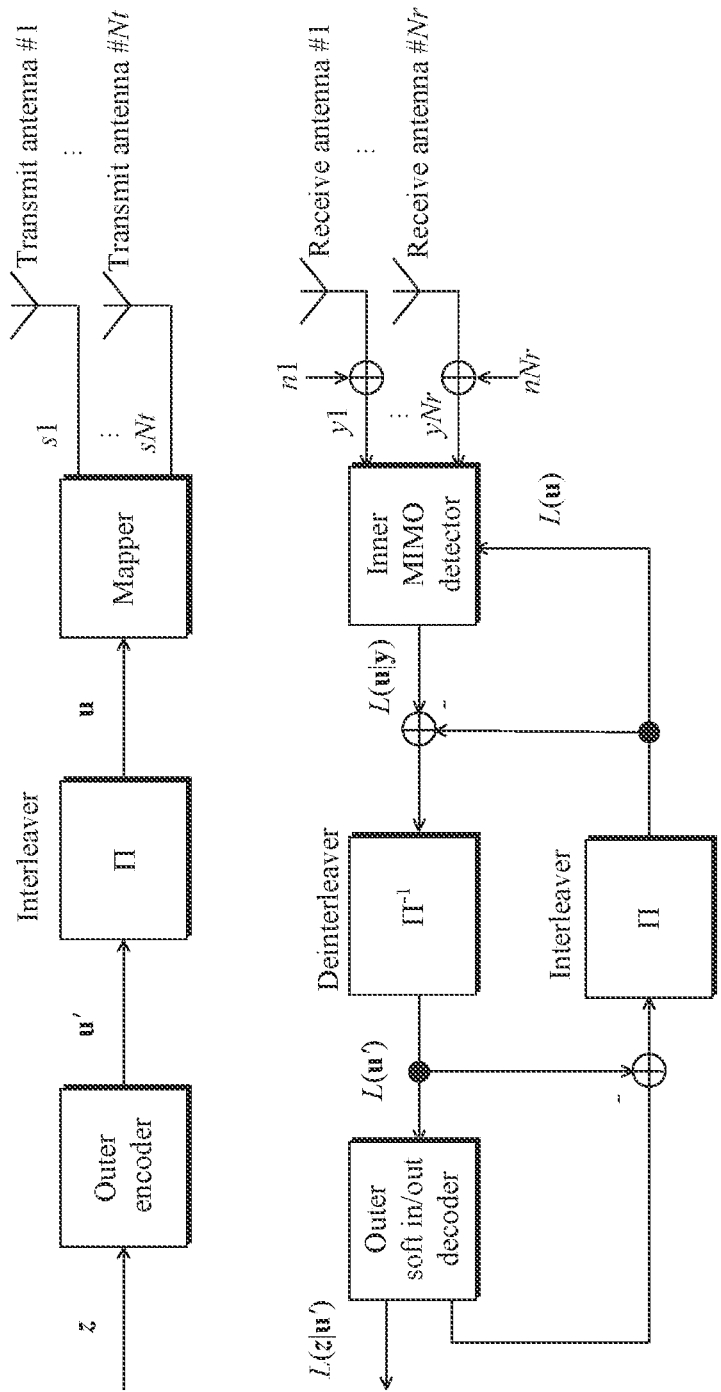
FIG. 1 illustrates an example of a transmission and reception device in a spatial multiplexing MIMO system.

FIG. 1 illustrates the structure of an Nt×Nr spatial multiplexing MIMO system. An information vector z is encoded and interleaved. The encoded bit vector $u=(u_1, \ldots, u_{Nt})$ is obtained as the interleave output. Here, $u_i = (u_{i1}, \ldots, u_{iM})$ (where M is the number of transmitted bits per symbol). For a transmit vector $s = (s_1, \ldots, S_{Nt})$, a received signal $s_i = map(u_i)$ is found for transmit antenna #i. Normalizing the transmit energy, this is expressible as $E\{|s_i|^2\} = E_s/Nt$ (where $E_s$ is the total energy per channel). The receive vector $y = (y_1, \ldots, y_{Nr})^T$ is expressed in Math. 1 (formula 1), below.

[Math. 1]

$$y = (y_1, \ldots, y_{Nr})^T \qquad \text{(formula 1)}$$
$$= H_{NtNr}s + n$$

Here, $H_{NtNr}$ is the channel matrix, $n = (n_1, \ldots, n_{Nr})$ is the noise vector, and the average value of $n_i$ is zero for independent and identically distributed (i.i.d) complex Gaussian noise of variance $\sigma^2$. Based on the relationship between transmitted symbols introduced into a receiver and the received symbols, the probability distribution of the received vectors can be expressed as Math. 2 (formula 2), below, for a multi-dimensional Gaussian distribution.

[Math. 2]

$$p(y|u) = \frac{1}{(2\pi\sigma^2)^{N_r}} \exp\left(-\frac{1}{2\sigma^2}\|y - Hs(u)\|^2\right) \qquad \text{(formula 2)}$$

Here, a receiver performing iterative decoding is considered. Such a receiver is illustrated in FIG. 1 as being made up of an outer soft-in/soft-out decoder and a MIMO detector. The log-likelihood ratio vector (L-value) for FIG. 1 is given by Math. 3 (formula 3) through Math. 5 (formula 5), as follows.

[Math. 3]

$$L(u) = (L(u_1), \ldots, L(u_{N_t}))^T \quad \text{(formula 3)}$$

[Math. 4]

$$L(u_i) = (L(u_{i1}), \ldots, L(u_{iM})) \quad \text{(formula 4)}$$

[Math. 5]

$$L(u_{ij}) = \ln\frac{P(u_{ij} = +1)}{P(u_{ij} = -1)} \quad \text{(formula 5)}$$

(Iterative Detection Method)

The following describes the MIMO signal iterative detection performed by the $N_t \times N_r$ spatial multiplexing MIMO system. The log-likelihood ratio of $u_{mn}$ is defined by Math. 6 (formula 6).

[Math. 6]

$$L(u_{mn} \mid y) = \ln\frac{P(u_{mn} = +1 \mid y)}{P(u_{mn} = -1 \mid y)} \quad \text{(formula 6)}$$

Through application of Bayes' theorem, Math. 6 (formula 6) can be expressed as Math. 7 (formula 7).

[Math. 7]

$$\begin{aligned}L(u_{mn} \mid y) &= \ln\frac{p(y \mid u_{mn} = +1)P(u_{mn} = +1)/p(y)}{p(y \mid u_{mn} = -1)P(u_{mn} = -1)/p(y)} \\ &= \ln\frac{P(u_{mn} = +1)}{P(u_{mn} = -1)} + \ln\frac{P(y \mid u_{mn} = +1)}{p(y \mid u_{mn} = -1)} \\ &= \ln\frac{P(u_{mn} = +1)}{P(u_{mn} = -1)} + \ln\frac{\Sigma_{U_{mn,+1}} p(y \mid u) p(u \mid u_{mn})}{\Sigma_{U_{mn,-1}} p(y \mid u) p(u \mid u_{mn})}\end{aligned} \quad \text{(formula 7)}$$

Note that $U_{mn, \pm 1} = \{u \mid u_{mn} = \pm 1\}$. Through the approximation $\ln \Sigma a_j \sim \max \ln a_j$, Math. 7 (formula 7) can be approximated as Math. 8 (formula 8). The symbol ~ is herein used to signify approximation.

[Math. 8]

$$\begin{aligned}L(u_{mn} \mid y) &\approx \ln\frac{P(u_{mn} = +1)}{P(u_{mn} = -1)} + \\ &\max_{U_{mn,+1}}\{\ln p(y \mid u) + P(u \mid u_{mn})\} - \max_{U_{mn,-1}}\{\ln p(y \mid u) + P(u \mid u_{mn})\}\end{aligned} \quad \text{(formula 8)}$$

In Math. 8 (formula 8), $P(u \mid u_{mn})$ and $\ln P(u \mid u_{mn})$ can be expressed as follows.

[Math. 9]

$$\begin{aligned}P(u \mid u_{mn}) &= \prod_{(ij) \neq (mn)} P(u_{ij}) \\ &= \prod_{(ij) \neq (mn)} \frac{\exp\left(\frac{u_{ij}L(u_{ij})}{2}\right)}{\exp\left(\frac{L(u_{ij})}{2}\right) + \exp\left(-\frac{L(u_{ij})}{2}\right)}\end{aligned} \quad \text{(formula 9)}$$

[Math. 10]

$$\ln P(u \mid u_{mn}) = \left(\sum_{ij} \ln P(u_{ij})\right) - \ln P(u_{mn}) \quad \text{(formula 10)}$$

[Math. 11]

$$\begin{aligned}\ln P(u_{ij}) &= \frac{1}{2} u_{ij} P(u_{ij}) - \ln\left(\exp\left(\frac{L(u_{ij})}{2}\right) + \exp\left(-\frac{L(u_{ij})}{2}\right)\right) \\ &\approx \frac{1}{2} u_{ij} L(u_{ij}) - \frac{1}{2}|L(u_{ij})| \text{ for } |L(u_{ij})| > 2 \\ &= \left|\frac{L(u_{ij})}{2}\right|(u_{ij}\text{sign}(L(u_{ij})) - 1)\end{aligned} \quad \text{(formula 11)}$$

Note that the log-probability of the equation given in Math. 2 (formula 2) can be expressed as Math. 12 (formula 12).

[Math. 12]

$$\ln P(y \mid u) = -\frac{N_r}{2}\ln(2\pi\sigma^2) - \frac{1}{2\sigma^2}\|y - Hs(u)\|^2 \quad \text{(formula 12)}$$

Accordingly, given Math. 7 (formula 7) and Math. 13 (formula 13), the posterior L-value for the MAP or APP (a posteriori probability) can be can be expressed as follows.

[Math. 13]

$$L(u_{mn} \mid y) = \ln\frac{\Sigma_{U_{mn,+1}} \exp\left\{-\frac{1}{2\sigma^2}\|y - Hs(u)\|^2 + \sum_{ij} \ln P(u_{ij})\right\}}{\Sigma_{U_{mn,-1}} \exp\left\{-\frac{1}{2\sigma^2}\|y - Hs(u)\|^2 + \sum_{ij} \ln P(u_{ij})\right\}} \quad \text{(formula 13)}$$

This is hereinafter termed iterative APP decoding. Also, given Math. 8 (formula 8) and Math. 12 (formula 12), the posterior L-value for the Max-log APP can be can be expressed as follows.

[Math. 14]

$$L(u_{mn} \mid y) \approx \max_{U_{mn,+1}}\{\Psi(u, y, L(u))\} - \max_{U_{mn,-1}}\{\Psi(u, y, L(u))\} \quad \text{(formula 14)}$$

[Math. 15]

$$\Psi(u, y, L(u)) = -\frac{1}{2\sigma^2}\|y - Hs(u)\|^2 + \sum_{ij} \ln P(u_{ij}) \quad \text{(formula 15)}$$

This is hereinafter referred to as iterative Max-log APP decoding. As such, the external information required by the iterative decoding system is obtainable by subtracting prior input from Math. 13 (formula 13) or from Math. 14 (formula 14).

(System Model)

Figure 23:
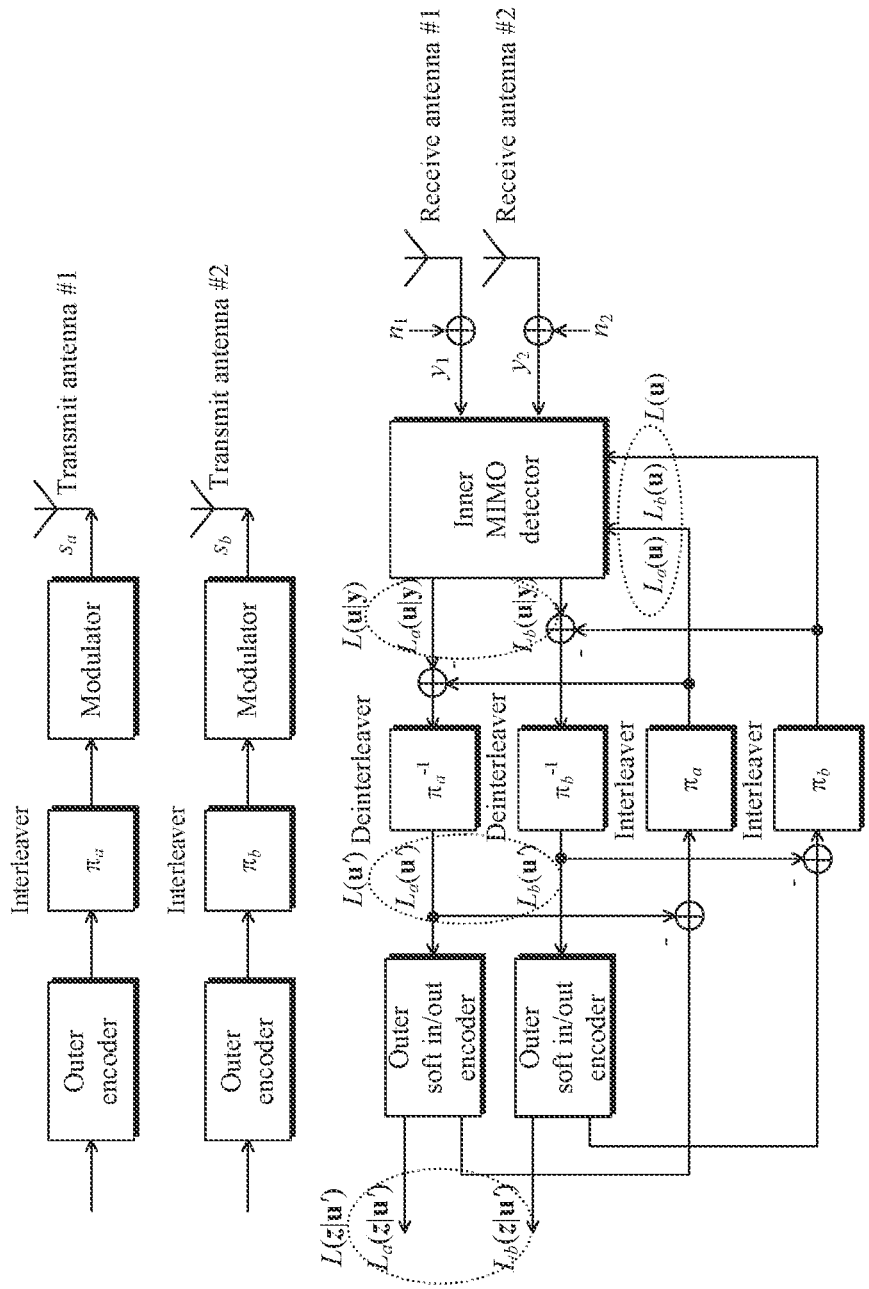
FIG. 23 illustrates another example of a transmission and reception device in a spatial multiplexing MIMO system.
Figure 24A:
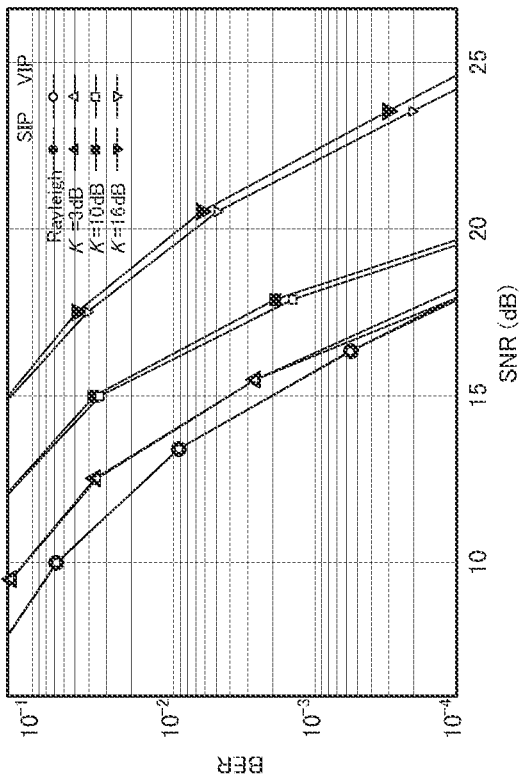
FIGS. 24A and 24B illustrate sample BER characteristics.
Figure 24B:
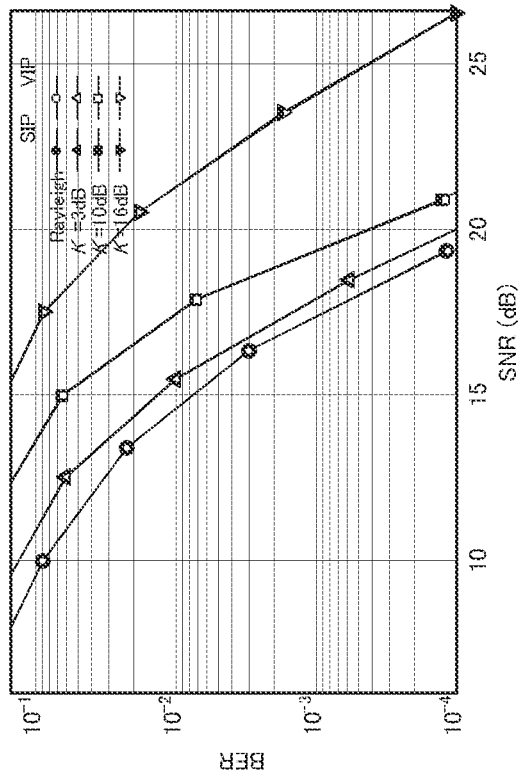

FIG. 23 illustrates the basic configuration of a system related to the following explanations. The illustrated system is a 2×2 spatial multiplexing MIMO system having an outer decoder for each of two streams A and B. The two outer decoders perform identical LDPC encoding. (Although the present example considers a configuration in which the outer encoders use LDPC codes, the outer encoders are not restricted to the use of LDPC as the error-correcting codes. The example may also be realized using other error-correcting codes, such as Turbo codes, convolutional codes, or LDPC convolutional codes. Further, while the outer encoders are presently described as individually configured for each transmit antenna, no limitation is intended in this regard. A single outer encoder may be used for a plurality of transmit antennas, or the number of outer encoders may be greater than the number of transmit antennas.) The system also has interleavers ($\pi_a$, $\pi_b$) for each of the streams A and B. Here, the modulation scheme is $2^h$-QAM (i.e., h bits transmitted per symbol).

The receiver performs iterative detection (iterative APP (or Max-log APP) decoding) of MIMO signals, as described above. The LDPC codes are decoded using, for example, sum-product decoding.

Figure 2:
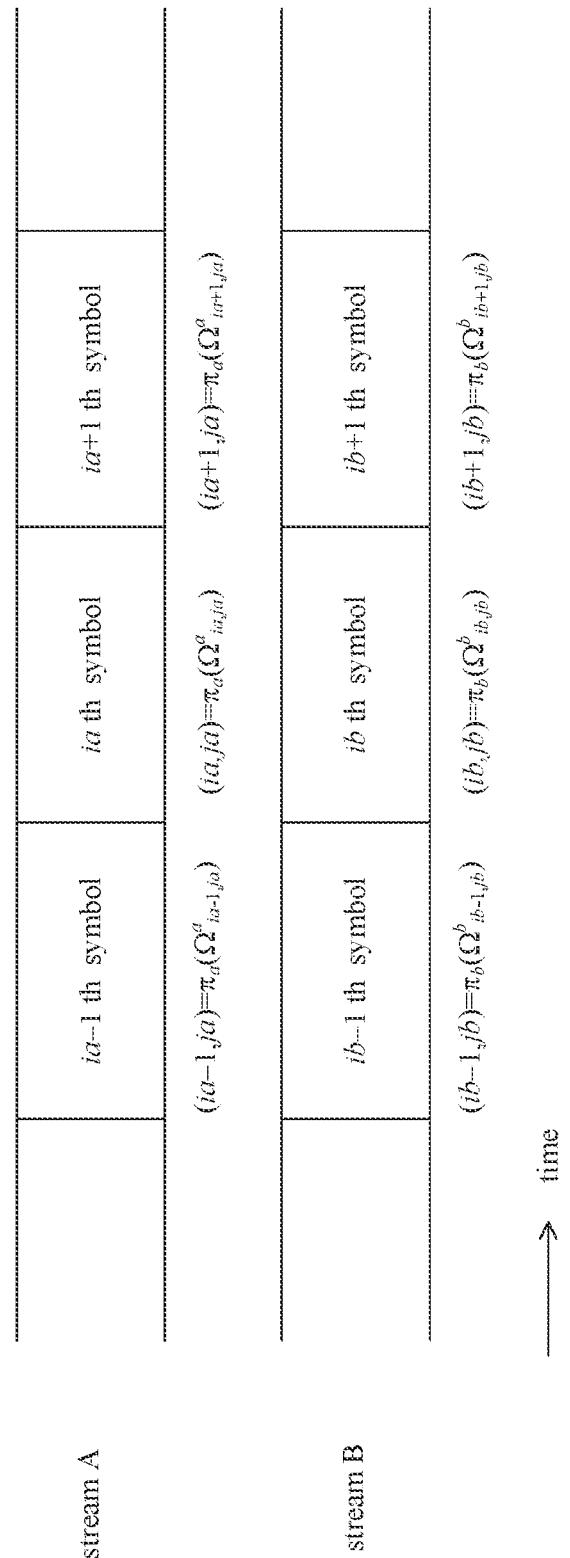
FIG. 2 illustrates a sample frame configuration.

FIG. 2 illustrates the frame configuration and describes the symbol order after interleaving. Here, ($i_a,j_a$) and ($i_b,j_b$) can be expressed as follows.

[Math. 16]

$$(i_a,j_a)=\pi_a(\Omega_{i_a,j_a}^a) \quad \text{(formula 16)}$$

[Math. 17]

$$(i_b,j_b)=\pi_b(\Omega_{i_b,j_b}^a) \quad \text{(formula 17)}$$

Here, $i_a$ and $i_b$ represent the symbol order after interleaving, $j_a$ and $j_b$ represent the bit position in the modulation scheme (where $j_a,j_b=1, \ldots, h$), $\pi_a$ and $\pi_b$ represent the interleavers of streams A and B, and $\Omega^a_{i_a,j_a}$ and $\Omega^b_{i_b,j_b}$ represent the data order of streams A and B before interleaving. Note that FIG. 2 illustrates a situation where $i_a=i_b$.

(Iterative Decoding)

The following describes, in detail, the sum-product decoding used in decoding the LDPC codes and the MIMO signal iterative detection algorithm, both used by the receiver.

Sum-Product Decoding

A two-dimensional M×N matrix H={$H_{mn}$} is used as the check matrix for LDPC codes subject to decoding. For the set [1,N]={1, 2 ... N}, the partial sets A(m) and B(n) are defined as follows.

[Math. 18]

$$A(m) \equiv \{n:H_{mn}=1\} \quad \text{(formula 18)}$$

[Math. 19]

$$B(n) \equiv \{m:H_{mn}=1\} \quad \text{(formula 19)}$$

Here, A(m) signifies the set of column indices equal to 1 for row m of check matrix H, while B(n) signifies the set of row indices equal to 1 for row n of check matrix H. The sum-product decoding algorithm is as follows.

Step A-1 (Initialization): For all pairs (m,n) satisfying $H_{mn}=1$, set the prior log ratio $\beta_{mn}=0$. Set the loop variable (number of iterations) $l_{sum}=1$, and set the maximum number of loops $l_{sum,max}$.

Step A-2 (Processing): For all pairs (m,n) satisfying $H_{mn}=1$ in the order m=1, 2, ... M, update the extrinsic value log ratio $\alpha_{mn}$ using the following update formula.

[Math. 20]

$$\alpha_{mn} = \left(\prod_{n' \in A(m) \backslash n} \text{sign}(\lambda_{n'} + \beta_{mn'})\right) \times f\left(\sum_{n' \in A(m) \backslash n} f(\lambda_{n'} + \beta_{mn'})\right) \quad \text{(formula 20)}$$

[Math. 21]

$$\text{sign}(x) \equiv \begin{cases} 1 & x \geq 0 \\ -1 & x < 0 \end{cases} \quad \text{(formula 21)}$$

[Math. 22]

$$f(x) \equiv \ln\frac{\exp(x)+1}{\exp(x)-1} \quad \text{(formula 22)}$$

where $f$ is the Gallager function. $\lambda_n$ can then be computed as follows.

Step A-3 (Column Operations): For all pairs (m,n) satisfying $H_{mn}=1$ in the order n=1, 2, ... N, update the extrinsic value log ratio $\beta_{mn}$ using the following update formula.

[Math. 23]

$$\beta_{mn} = \sum_{m' \in B(n) \backslash m} \alpha_{m'n} \quad \text{(formula 23)}$$

Step A-4 (Log-likelihood Ratio Calculation): For n∈[1,N], the log-likelihood ratio $L_n$ is computed as follows.

[Math. 24]

$$L_n = \sum_{m' \in B(n) \backslash m} \alpha_{m'n} + \lambda_n \quad \text{(formula 24)}$$

Step A-5 (Iteration Count): If $l_{sum} < l_{sum,max}$, then $l_{sum}$ is incremented and the process returns to step A-2. Sum-product decoding ends when $l_{sum} = l_{sum,max}$.

The above describes one iteration of sum-product decoding operations. Afterward, MIMO signal iterative detection is performed. The variables m, n, $\alpha_{mn}$, $\beta_{mn}$, $\lambda_n$, and $L_n$ used in the above explanation of sum-product decoding operations are expressed as $m_a$, $n_a$, $\alpha^a_{m_an_a}$, $\beta^a_{m_an_a}$, $\lambda_{na}$, and $L_{na}$ for stream A and as $m_b$, $n_b$, $\alpha^b_{m_bn_b}$, $\beta^b_{m_bn_b}$, $\lambda_{nb}$, and $L_{nb}$ for stream B.

(MIMO Signal Iterative Detection)

The following describes the calculation of $\lambda_n$ for MIMO signal iterative detection.

The following formula is derivable from Math. 1 (formula 1).

[Math. 25]

$$y(t) = (y_1(t), y_2(t))^T \quad \text{(formula 25)}$$
$$= H_{22}(t)s(t) + n(t)$$

Given the frame configuration illustrated in FIG. 2, the following functions are derivable from Math. 16 (formula 16) and Math. 17 (formula 17).

[Math. 26]

$$n_a = \Omega_{ia,ja}{}^a \qquad \text{(formula 26)}$$

[Math. 27]

$$n_b = \Omega_{ib,jb}{}^b \qquad \text{(formula 27)}$$

where $n_a, n_b \in [1,N]$. For iteration k of MIMO signal iterative detection, the variables $\lambda_{na}$, $L_{na}$, $\lambda_{nb}$, and $L_{nb}$ are expressed as $\lambda_{k,na}$, $L_{k,na}$, $\lambda_{k,nb}$, and $L_{k,nb}$.

Step B-1 (Initial Detection; k=0) For initial wave detection, $\lambda_{o,na}$ and $\lambda_{o,nb}$ are calculated as follows.

For iterative APP decoding:

[Math. 28]

$$\lambda_{0,n_X} = \ln \frac{\Sigma_{U_{0,n_X,+1}} \exp\left\{-\frac{1}{2\sigma^2}\|y(i_X) - H_{22}(i_X)s(u(i_X))\|^2\right\}}{\Sigma_{U_{0,n_X,-1}} \exp\left\{-\frac{1}{2\sigma^2}\|y(i_X) - H_{22}(i_X)s(u(i_X))\|^2\right\}} \qquad \text{(formula 28)}$$

For iterative Max-log APP decoding:

[Math. 29]

$$\lambda_{0,n_X} = \max_{U_{0,n_X,+1}} \{\Psi(u(i_X), y(i_X))\} - \max_{U_{0,n_X,-1}} \{\Psi(u(i_X), y(i_X))\} \qquad \text{(formula 29)}$$

[Math. 30]

$$\Psi(u(i_X), y(i_X)) = -\frac{1}{2\sigma^2}\|y(i_X) - H_{22}(i_X)s(u(i_X))\|^2 \qquad \text{(formula 30)}$$

where X=a,b. Next, the iteration count for the MIMO signal iterative detection is set to $l_{mimo}=0$, with the maximum iteration count being $l_{mimo,max}$.

Step B-2 (Iterative Detection; Iteration k): When the iteration count is k, Math. 11 (formula 11), Math. 13 (formula 13) through Math. 15 (formula 15), Math. 16 (formula 16), and Math. 17 (formula 17) can be expressed as Math. 31 (formula 31) through Math. 34 (formula 34), below. Note that (X,Y)=(a,b)(b,a).

For iterative APP decoding:

[Math. 31]

$$\lambda_{k,n_X} = L_{k-1,\Omega_{iX,jX}^X}\left(u_{\Omega_{iX,jX}^X}\right) + \ln \frac{\displaystyle\sum_{U_{k,n_X,+1}} \exp\left\{-\frac{1}{2\sigma^2}\left\|\begin{array}{c}y(i_X) - \\ H_{22}(i_X)s(u(i_X))\end{array}\right\|^2 + \rho\left(u_{\Omega_{iX,jX}^X}\right)\right\}}{\displaystyle\sum_{U_{k,n_X,-1}} \exp\left\{-\frac{1}{2\sigma^2}\left\|\begin{array}{c}y(i_X) - \\ H_{22}(i_X)s(u(i_X))\end{array}\right\|^2 + \rho\left(u_{\Omega_{iX,jX}^X}\right)\right\}} \qquad \text{(formula 31)}$$

[Math. 32]

$$\rho\left(u_{\Omega_{iX,jX}^X}\right) = \sum_{\substack{\gamma=1 \\ \gamma \neq jX}}^{h} \left|\frac{L_{k-1,\Omega_{iX,\gamma}^X}\left(u_{\Omega_{iX,\gamma}^X}\right)}{2}\right| \qquad \text{(formula 32)}$$

$$\left(u_{\Omega_{iX,\gamma}^X} \text{sign}\left(L_{k-1,\Omega_{iX,\gamma}^X}\left(u_{\Omega_{iX,\gamma}^X}\right)\right) - 1\right) +$$

$$\sum_{\gamma=1}^{h} \left|\frac{L_{k-1,\Omega_{iX,\gamma}^X}\left(u_{\Omega_{iX,\gamma}^X}\right)}{2}\right|$$

$$\left(u_{\Omega_{iX,\gamma}^X} \text{sign}\left(L_{k-1,\Omega_{iX,\gamma}^X}\left(u_{\Omega_{iX,\gamma}^X}\right)\right) - 1\right)$$

For iterative Max-log APP decoding:

[Math. 33]

$$\lambda_{k,n_X} = L_{k-1,\Omega_{iX,jX}^X}\left(u_{\Omega_{iX,jX}^X}\right) + \max_{U_{k,n_X,+1}} \left\{\Psi(u(i_X), y(i_X), \rho\left(u_{\Omega_{iX,jX}^X}\right))\right\} - \max_{U_{k,n_X,-1}} \left\{\Psi(u(i_X), y(i_X), \rho\left(u_{\Omega_{iX,jX}^X}\right))\right\} \qquad \text{(formula 33)}$$

[Math. 34]

$$\Psi(u(i_X), y(i_X), \rho\left(u_{\Omega_{iX,jX}^X}\right)) = -\frac{1}{2\sigma^2}\|y(i_X) - H_{22}(i_X)s(u(i_X))\|^2 + \rho\left(u_{\Omega_{iX,jX}^X}\right) \qquad \text{(formula 34)}$$

Step B-3 (Iteration Count and Codeword Estimation) If $l_{mimo} < l_{mimo,max}$, then $l_{mimo}$ is incremented and the process returns to step B-2. When $l_{mimo} = l_{mimo,max}$, an estimated codeword is found, as follows.

[Math. 35]

$$\hat{u}_{n_X} = \begin{cases} 1 & L_{l_{mimo},n_X} \geq 0 \\ -1 & L_{l_{mimo},n_X} < 0 \end{cases} \qquad \text{(formula 35)}$$

where X=a,b.

Figure 3:
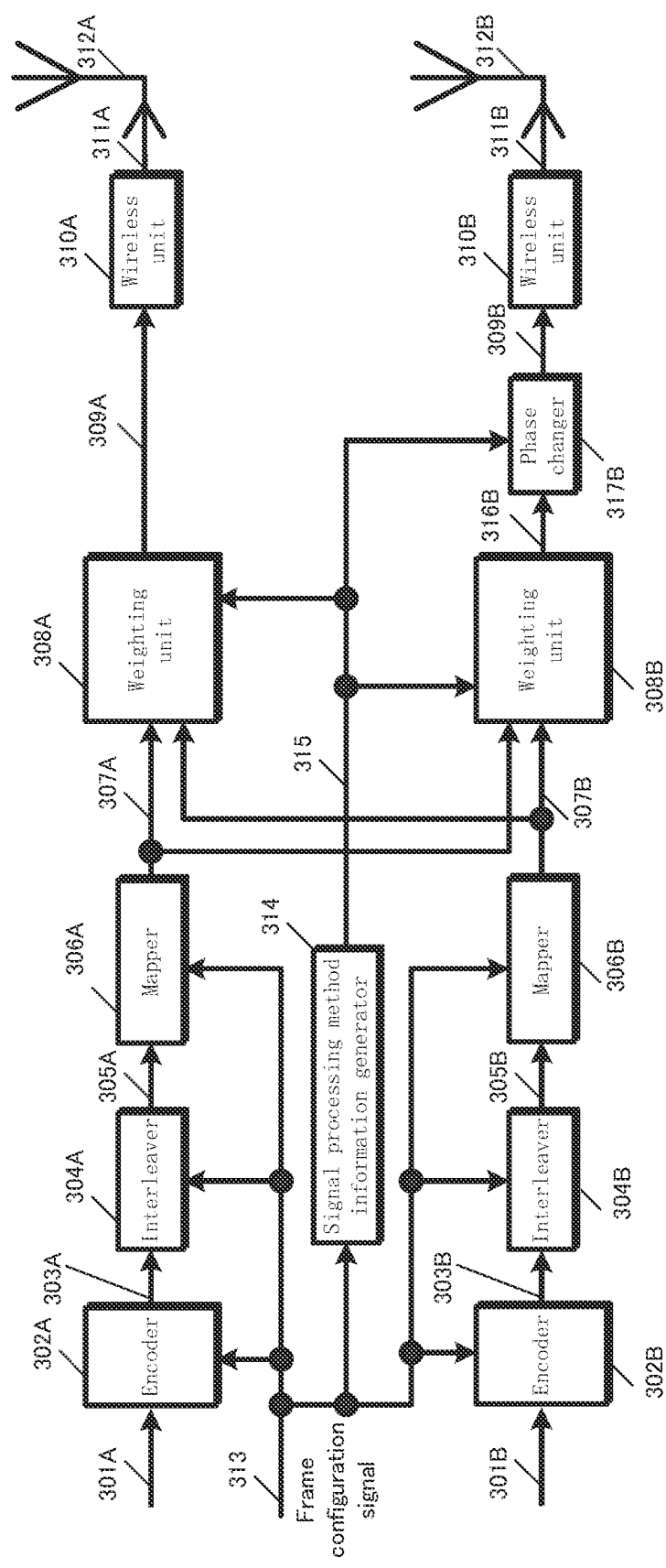
FIG. 3 illustrates an example of a transmission device applying a phase changing method.

FIG. 3 shows a sample configuration of a transmission device 300 pertaining to the present Embodiment. An encoder 302A takes information (data) 301A and a frame configuration signal 313 as input (which includes the error-correction method, coding rate, block length, and other information used by the encoder 302A in error-correction coding of the data, such that the method designated by the frame configuration signal 313 is used. The error-correction method may be switched). In accordance with the frame configuration signal 313, the encoder 302A performs error-correction coding, such as convolutional encoding, LDPC encoding, turbo encoding or similar, and outputs encoded data 303A.

An interleaver 304A takes the encoded data 303A and the frame configuration signal 313 as input, performs interleaving, i.e., rearranges the order thereof, and then outputs interleaved data 305A. (Depending on the frame configuration signal 313, the interleaving method may be switched.)

A mapper 306A takes the interleaved data 305A and the frame configuration signal 313 as input and performs modulation, such as (Quadrature Phase Shift Keying), 16-QAM (16-Quadrature Amplitude Modulation), or 64-QAM (64-Quadrature Amplitude Modulation) thereon, then outputs a baseband signal 307A. (Depending on the frame configuration signal 313, the modulation scheme may be switched.)

Figure 19B:
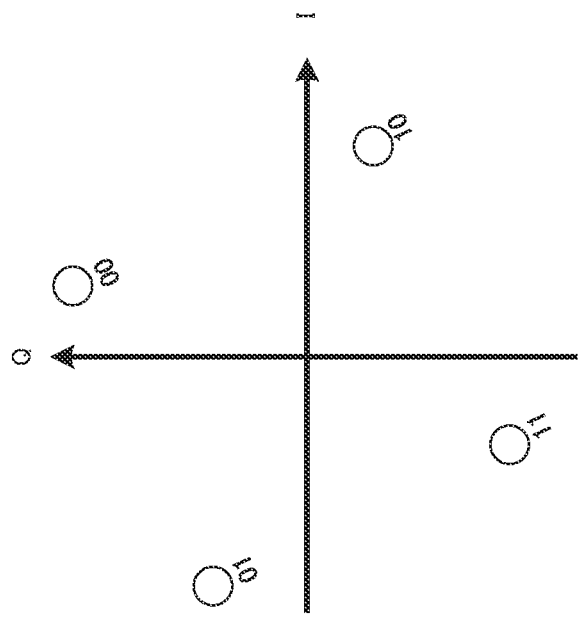
FIGS. 19A and 19B illustrate examples of a mapping method.
Figure 19A:
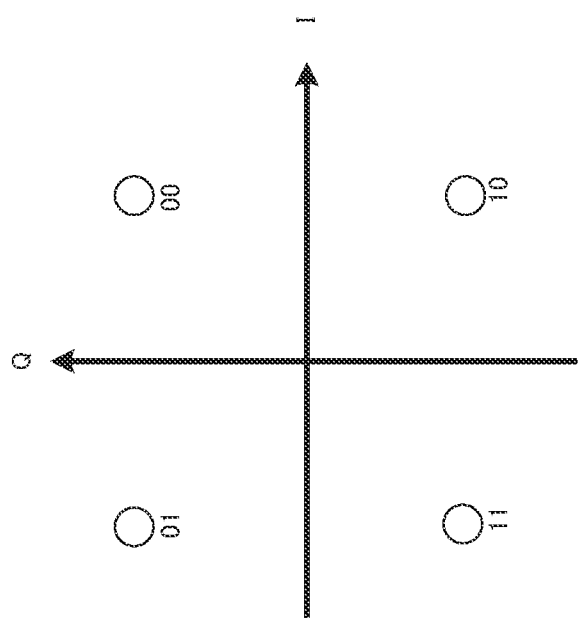
Figure 20B:
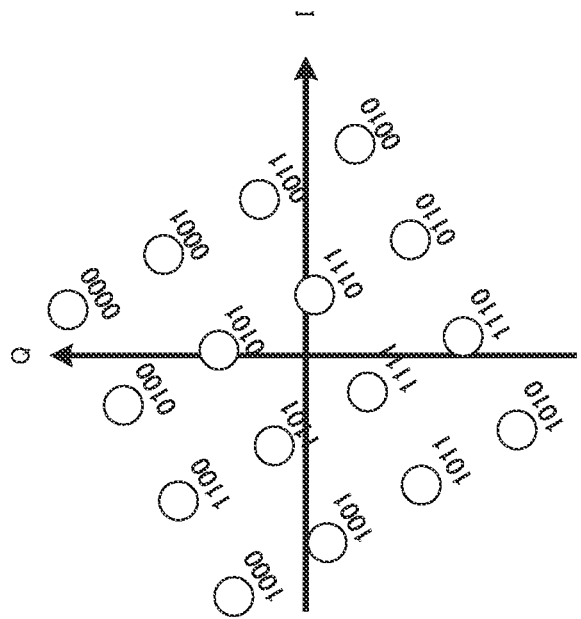
FIGS. 20A and 20B illustrate further examples of a mapping method.
Figure 20A:
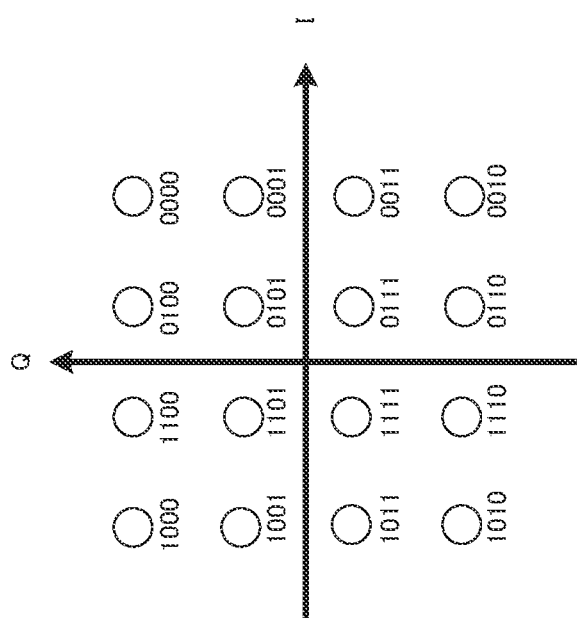

FIGS. 19A and 19B illustrate an example of a QPSK modulation mapping method for a baseband signal made up of an in-phase component I and a quadrature component Q in the I-Q plane. For example, as shown in FIG. 19A, when the input data are 00, then the output is I=1.0, Q=1.0. Similarly, when the input data are 01, the output is I=−1.0, Q=1.0, and so on. FIG. 19B illustrates an example of a QPSK modulation mapping method in the I-Q plane differing from FIG. 19A in that the signal points of FIG. 19A have been rotated about the origin to obtain the signal points of FIG. 19B. Non-Patent Literature 9 and Non-Patent Literature 10 describe such a constellation rotation method. Alternatively, the Cyclic Q Delay described in Non-Patent Literature 9 and Non-Patent Literature 10 may also be adopted. An alternate example, distinct from FIGS. 19A and 19B, is shown in FIGS. 20A and 20B, which illustrate signal point distribution for 16-QAM in the I-Q plane. The example of FIG. 20A corresponds to FIG. 19A, while that of FIG. 20B corresponds to FIG. 19B.

An encoder 302B takes information (data) 301B and the frame configuration signal 313 as input (which includes the error-correction method, coding rate, block length, and other information used by the encoder 302B in error-correction coding of the data, such that the method designated by the frame configuration signal 313 is used. The error-correction method may be switched). In accordance with the frame configuration signal 313, the encoder 302B performs error-correction coding, such as convolutional encoding, LDPC encoding, turbo encoding or similar, and outputs encoded data 303B.

An interleaver 304B takes the encoded data 303B and the frame configuration signal 313 as input, performs interleaving, i.e., rearranges the order thereof, and outputs interleaved data 305B. (Depending on the frame configuration signal 313, the interleaving method may be switched.)

A mapper 306B takes the interleaved data 305B and the frame configuration signal 313 as input and performs modulation, such as QPSK, 16-QAM, or 64-QAM thereon, then outputs a baseband signal 307B. (Depending on the frame configuration signal 313, the modulation scheme may be switched.)

A signal processing method information generator 314 takes the frame configuration signal 313 as input and accordingly outputs signal processing method information 315. The signal processing method information 315 designates the fixed precoding matrix to be used, and includes information on the pattern of phase changes used for changing the phase.

A weighting unit 308A takes baseband signal 307A, baseband signal 307B, and the signal processing method information 315 as input and, in accordance with the signal processing method information 315, performs weighting on the baseband signals 307A and 307B, then outputs a weighted signal 309A. The weighting method is described in detail, later.

A wireless unit 310A takes weighted signal 309A as input and performs processing such as quadrature modulation, band limitation, frequency conversion, amplification, and so on, then outputs transmit signal 311A. Transmit signal 311A is then output as radio waves by an antenna 312A.

A weighting unit 308B takes baseband signal 307A, baseband signal 307B, and the signal processing method information 315 as input and, in accordance with the signal processing method information 315, performs weighting on the baseband signals 307A and 307B, then outputs weighted signal 316B.

FIG. 21 illustrates the configuration of the weighting units 308A and 308B. The area of FIG. 21 enclosed in the dashed line represents one of the weighting units. Baseband signal 307A is multiplied by w11 to obtain w11·s1($t$), and multiplied by w21 to obtain w21·s1($t$). Similarly, baseband signal 307B is multiplied by w12 to obtain w12·s2($t$), and multiplied by w22 to obtain w22·s2($t$). Next, z1($t$)=w11·s1($t$)+w12·s2($t$) and z2($t$)=w21·s1($t$)+w22·s2($t$) are obtained. Here, as explained in Embodiment 1, s1($t$) and s2($t$) are baseband signals modulated according to a modulation scheme such as BPSK (Binary Phase Shift Keying), QPSK, 8-PSK (8-Phase Shift Keying), 16-QAM, 32-QAM (32-Quadrature Amplitude Modulation), 64-QAM, 256-QAM 16-APSK (16-Amplitude Phase Shift Keying) and so on.

Both weighting units perform weighting using a fixed precoding matrix. The precoding matrix uses, for example, the method of Math. 36 (formula 36), and satisfies the conditions of Math. 37 (formula 37) or Math. 38 (formula 38), all found below. However, this is only an example. The value of α is not restricted to Math. 37 (formula 37) and Math. 38 (formula 38), and may take on other values, e.g., α=1.

Here, the precoding matrix is

[Math. 36]

$$\begin{pmatrix} w11 & w12 \\ w21 & w22 \end{pmatrix} = \frac{1}{\sqrt{\alpha^2+1}} \begin{pmatrix} e^{j0} & \alpha \times e^{j0} \\ \alpha \times e^{j0} & e^{j\pi} \end{pmatrix} \quad \text{(formula 36)}$$

In Math. 36 (formula 36), above, α is given by:

[Math. 37]

$$\alpha = \frac{\sqrt{2}+4}{\sqrt{2}+2} \quad \text{(formula 37)}$$

Alternatively, in Math. 36 (formula 36), above, α may be given by:

[Math. 38]

$$\alpha = \frac{\sqrt{2}+3+\sqrt{5}}{\sqrt{2}+3-\sqrt{5}} \quad \text{(formula 38)}$$

The precoding matrix is not restricted to that of Math. 36 (formula 36), but may also be as indicated by Math. 39 (formula 39).

[Math. 39]

$$\begin{pmatrix} w11 & w12 \\ w21 & w22 \end{pmatrix} = \begin{pmatrix} a & b \\ c & d \end{pmatrix} \quad \text{(formula 39)}$$

In Math. 39 (formula 39), let $\alpha=Ae^{j\delta_{11}}$, $b=Be^{j\delta_{12}}$, $c=Ce^{j\delta_{21}}$, and $d=De^{j\delta_{22}}$. Further, one of a, b, c, and d may be equal to zero. For example, the following configurations are possible: (1) a may be zero while b, c, and d are non-zero, (2) b may be zero while a, c, and d are non-zero, (3) c may be zero while a, b, and d are non-zero, or (4) d may be zero while a, b, and c are non-zero.

When any of the modulation scheme, error-correcting codes, and the coding rate thereof are changed, the precoding matrix may also be set, changed, and fixed for use.

A phase changer 317B takes weighted signal 316B and the signal processing method information 315 as input, then regularly changes the phase of the signal 316B for output. This regular change is a change of phase performed according to a predetermined phase changing pattern having a predetermined period (cycle) (e.g., every n symbols (n being an integer, n≥1) or at a predetermined interval). The details of the phase changing pattern are explained below, in Embodiment 4.

Wireless unit 310B takes post-phase change signal 309B as input and performs processing such as quadrature modulation, band limitation, frequency conversion, amplification, and so on, then outputs transmit signal 311B. Transmit signal 311B is then output as radio waves by an antenna 312B.

Figure 4:
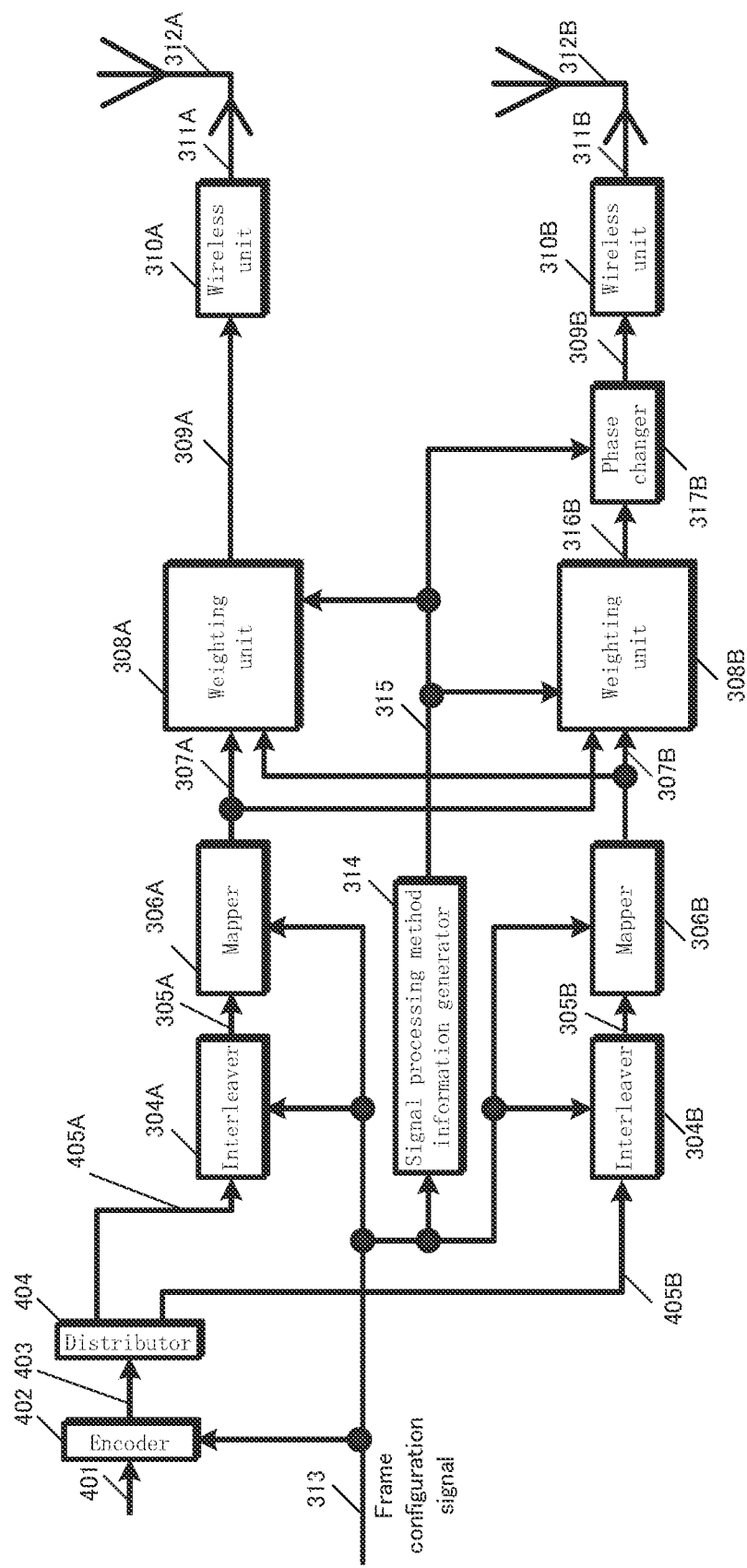
FIG. 4 illustrates another example of a transmission device applying a phase changing method.

FIG. 4 illustrates a sample configuration of a transmission device 400 that differs from that of FIG. 3. The points of difference of FIG. 4 from FIG. 3 are described next.

An encoder 402 takes information (data) 401 and the frame configuration signal 313 as input, and, in accordance with the frame configuration signal 313, performs error-correction coding and outputs encoded data 402.

A distributor 404 takes the encoded data 403 as input, performs distribution thereof, and outputs data 405A and data 405B. Although FIG. 4 illustrates only one encoder, the number of encoders is not limited as such. The present invention may also be realized using m encoders (m being an integer, m≥1) such that the distributor divides the encoded data created by each encoder into two groups for distribution.

FIG. 5 illustrates an example of a frame configuration in the time domain for a transmission device according to the present Embodiment. Symbol 500_1 is a symbol for notifying the reception device of the transmission scheme. For example, symbol 500_1 conveys information such as the error-correction method used for transmitting data symbols, the coding rate thereof, and the modulation scheme used for transmitting data symbols.

Symbol 501_1 is for estimating channel fluctuations for modulated signal z1(t) (where t is time) transmitted by the transmission device. Symbol 502_1 is a data symbol transmitted by modulated signal z1(t) as symbol number u (in the time domain). Symbol 503_1 is a data symbol transmitted by modulated signal z1(t) as symbol number u+1.

Symbol 501_2 is for estimating channel fluctuations for modulated signal z2(t) (where t is time) transmitted by the transmission device. Symbol 502_2 is a data symbol transmitted by modulated signal z2(t) as symbol number u. Symbol 503_2 is a data symbol transmitted by modulated signal z1(t) as symbol number u+1.

Here, the symbols of z1(t) and of z2(t) having the same timestamp (identical timing) are transmitted from the transmit antenna using the same (shared/common) frequency.

The following describes the relationships between the modulated signals z1(t) and z2(t) transmitted by the transmission device and the received signals r1(t) and r2(t) received by the reception device.

In FIGS. 5, 504 #1 and 504 #2 indicate transmit antennas of the transmission device, while 505 #1 and 505 #2 indicate receive antennas of the reception device. The transmission device transmits modulated signal z1(t) from transmit antenna 504 #1 and transmits modulated signal z2(t) from transmit antenna 504 #2. Here, modulated signals z1(t) and z2(t) are assumed to occupy the same (shared/common) frequency (bandwidth). The channel fluctuations in the transmit antennas of the transmission device and the antennas of the reception device are $h_{11}(t)$, $h_{12}(t)$, $h_{21}(t)$, and $h_{22}(t)$, respectively. Assuming that receive antenna 505 #1 of the reception device receives received signal r1(t) and that receive antenna 505 #2 of the reception device receives received signal r2(t), the following relationship holds.

[Math. 40]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \quad \text{(formula 40)}$$

Figure 6:
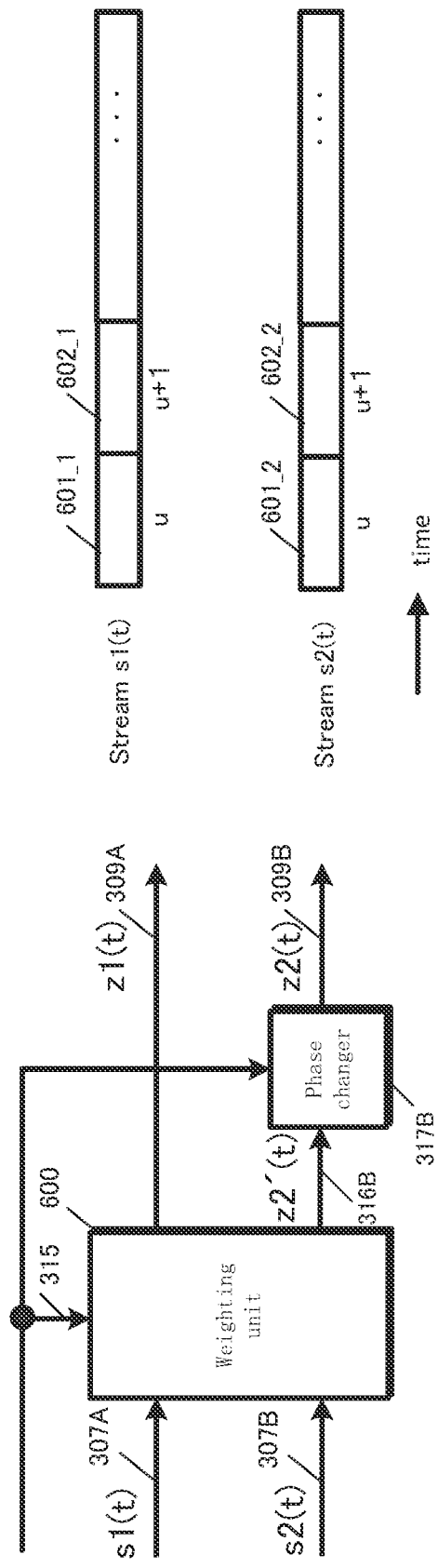
FIG. 6 illustrates another sample phase changing method.

FIG. 6 pertains to the weighting method (precoding method) and the phase changing method of the present Embodiment. A weighting unit 600 is a combined version of the weighting units 308A and 308B from FIG. 3. As shown, stream s1(t) and stream s2(t) correspond to the baseband signals 307A and 307B of FIG. 3. That is, the streams s1(t) and s2(t) are baseband signals made up of an in-phase component I and a quadrature component Q conforming to mapping by a modulation scheme such as QPSK, 16-QAM, and 64-QAM. As indicated by the frame configuration of FIG. 6, stream s1(t) is represented as s1(u) at symbol number u, as s1(u+1) at symbol number u+1, and so forth. Similarly, stream s2(t) is represented as s2(u) at symbol number u, as s2(u+1) at symbol number u+1, and so forth. The weighting unit 600 takes the baseband signals 307A (s1(t)) and 307B (s2(t)) as well as the signal processing method information 315 from FIG. 3 as input, performs weighting in accordance with the signal processing method information 315, and outputs the weighted signals 309A (z1(t)) and 316B(z2'(t)) from FIG. 3. The phase changer 317B changes the phase of weighted signal 316B(z2'(t)) and outputs post-phase change signal 309B(z2(t)).

Here, given vector W1=(w11,w12) from the first row of the fixed precoding matrix F, z1(t) is expressible as Math. 41 (formula 41), below.

[Math. 41]

$$z1 = W1 \times (s1(t), s2(t))^T \quad \text{(formula 41)}$$

Similarly, given vector W2=(w21,w22) from the second row of the fixed precoding matrix F, and letting the phase changing formula applied by the phase changer by y(t), then z2(t) is expressible as Math. 42 (formula 42), below.

[Math. 42]

$$z2(t) = y(t) \times W2 \times (s1(t), s2(t))^T \quad \text{(formula 42)}$$

Here, y(t) is a phase changing formula obeying a predetermined method. For example, given a period (cycle) of four and timestamp u, the phase changing formula may be expressed as Math. 43 (formula 43), below.

[Math. 43]

$$y(u) = e^{j0} \quad \text{(formula 43)}$$

Similarly, the phase changing formula for timestamp u+1 may be, for example, as given by Math. 44 (formula 44).

[Math. 44]

$$y(u+1) = e^{j\frac{\pi}{2}} \quad \text{(formula 44)}$$

That is, the phase changing formula for timestamp u+k generalizes to Math. 45 (formula 45).

[Math. 45]

$$y(u+k) = e^{j\frac{k\pi}{2}} \quad \text{(formula 45)}$$

Note that Math. 43 (formula 43) through Math. 45 (formula 45) are given only as an example of a regular change of phase.

The regular change of phase is not restricted to a period (cycle) of four. Improved reception capabilities (the error-correction capabilities, to be exact) may potentially be promoted in the reception device by increasing the period (cycle) number (this does not mean that a greater period (cycle) is better, though avoiding small numbers such as two is likely ideal).

Furthermore, although Math. 43 (formula 43) through Math. 45 (formula 45), above, represent a configuration in which a change in phase is carried out through rotation by consecutive predetermined phases (in the above formula, every $\pi/2$), the change in phase need not be rotation by a constant amount, but may also be random. For example, in accordance with the predetermined period (cycle) of y(t), the phase may be changed through sequential multiplication as shown in Math. 46 (formula 46) and Math. 47 (formula 47). The key point of the regular change of phase is that the phase of the modulated signal is regularly changed. The phase changing degree variance rate is preferably as even as possible, such as from $-\pi$ radians to $\pi$ radians. However, given that this concerns a distribution, random variance is also possible.

[Math. 46]

$$e^{j0} \to e^{j\frac{\pi}{5}} \to$$
$$e^{j\frac{2\pi}{5}} \to e^{j\frac{3\pi}{5}} \to e^{j\frac{4\pi}{5}} \to e^{j\pi} \to e^{j\frac{6\pi}{5}} \to e^{j\frac{7\pi}{5}} \to e^{j\frac{8\pi}{5}} \to e^{j\frac{9\pi}{5}} \quad \text{(formula 46)}$$

[Math. 47]

$$e^{j\frac{\pi}{2}} \to e^{j\pi} \to e^{j\frac{3\pi}{2}} \to e^{j2\pi} \to e^{j\frac{\pi}{4}} \to e^{j\frac{3}{4}\pi} \to e^{j\frac{5\pi}{4}} \to e^{j\frac{7\pi}{4}} \quad \text{(formula 47)}$$

As such, the weighting unit 600 of FIG. 6 performs precoding using fixed, predetermined precoding weights, and the phase changer 317B changes the phase of the signal input thereto while regularly varying the phase changing degree.

When a specialized precoding matrix is used in the LOS environment, the reception quality is likely to improve tremendously. However, depending on the direct wave conditions, the phase and amplitude components of the direct wave may greatly differ from the specialized precoding matrix, upon reception. The LOS environment has certain rules. Thus, data reception quality is tremendously improved through a regular change of transmit signal phase that obeys those rules. The present invention offers a signal processing method for improving the LOS environment.

Figure 7:
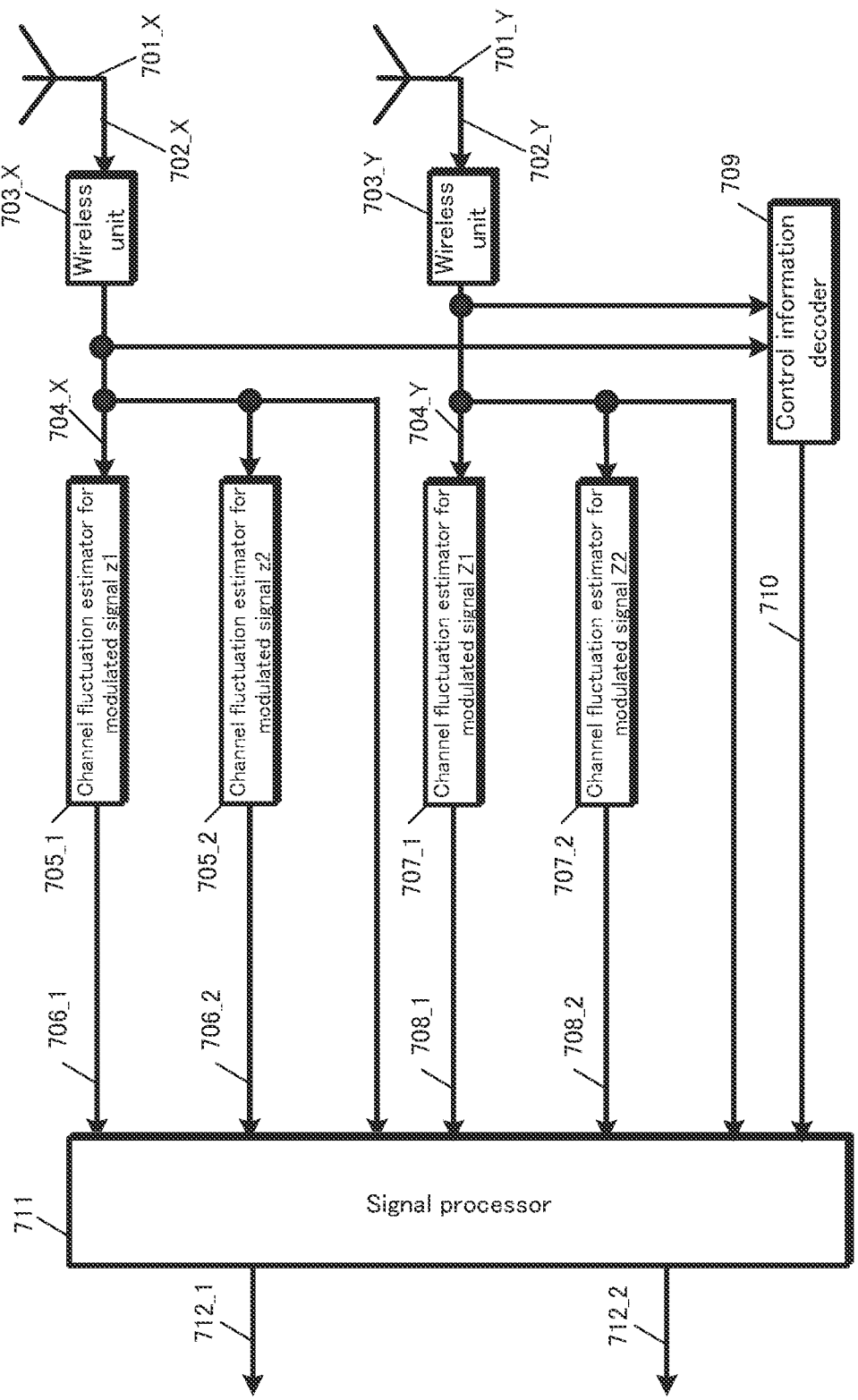
FIG. 7 illustrates a sample configuration of a reception device.

FIG. 7 illustrates a sample configuration of a reception device 700 pertaining to the present embodiment. Wireless unit 703_X receives, as input, received signal 702_X received by antenna 701_X, performs processing such as frequency conversion, quadrature demodulation, and the like, and outputs baseband signal 704_X.

Channel fluctuation estimator 705_1 for modulated signal z1 transmitted by the transmission device takes baseband signal 704_X as input, extracts reference symbol 501_1 for channel estimation from FIG. 5, estimates the value of $h_{11}$ from Math. 40 (formula 40), and outputs channel estimation signal 706_1.

Channel fluctuation estimator 705_2 for modulated signal z2 transmitted by the transmission device takes baseband signal 704_X as input, extracts reference symbol 502_2 for channel estimation from FIG. 5, estimates the value of $h_{12}$ from Math. 40 (formula 40), and outputs channel estimation signal 706_1.

Wireless unit 703_Y receives, as input, received signal 702_Y received by antenna 701_Y, performs processing such as frequency conversion, quadrature demodulation, and the like, and outputs baseband signal 704_Y.

Channel fluctuation estimator 707_1 for modulated signal z1 transmitted by the transmission device takes baseband signal 704_Y as input, extracts reference symbol 501_1 for channel estimation from FIG. 5, estimates the value of $h_{11}$ from Math. 40 (formula 40), and outputs channel estimation signal 708_1.

Channel fluctuation estimator 707_2 for modulated signal z2 transmitted by the transmission device takes baseband signal 704_Y as input, extracts reference symbol 502_2 for channel estimation from FIG. 5, estimates the value of $h_{11}$ from Math. 40 (formula 40), and outputs channel estimation signal 708_2.

A control information decoder 709 receives baseband signal 704_X and baseband signal 704_Y as input, detects symbol 500_1 that indicates the transmission scheme from FIG. 5, and outputs a transmission method information signal 710 for the transmission device.

A signal processor 711 takes the baseband signals 704_X and 704_Y, the channel estimation signals 706_1, 706_2, 708_1, and 708_2, and the transmission method information signal 710 as input, performs detection and decoding, and then outputs received data 712_1 and 712_2.

Figure 8:
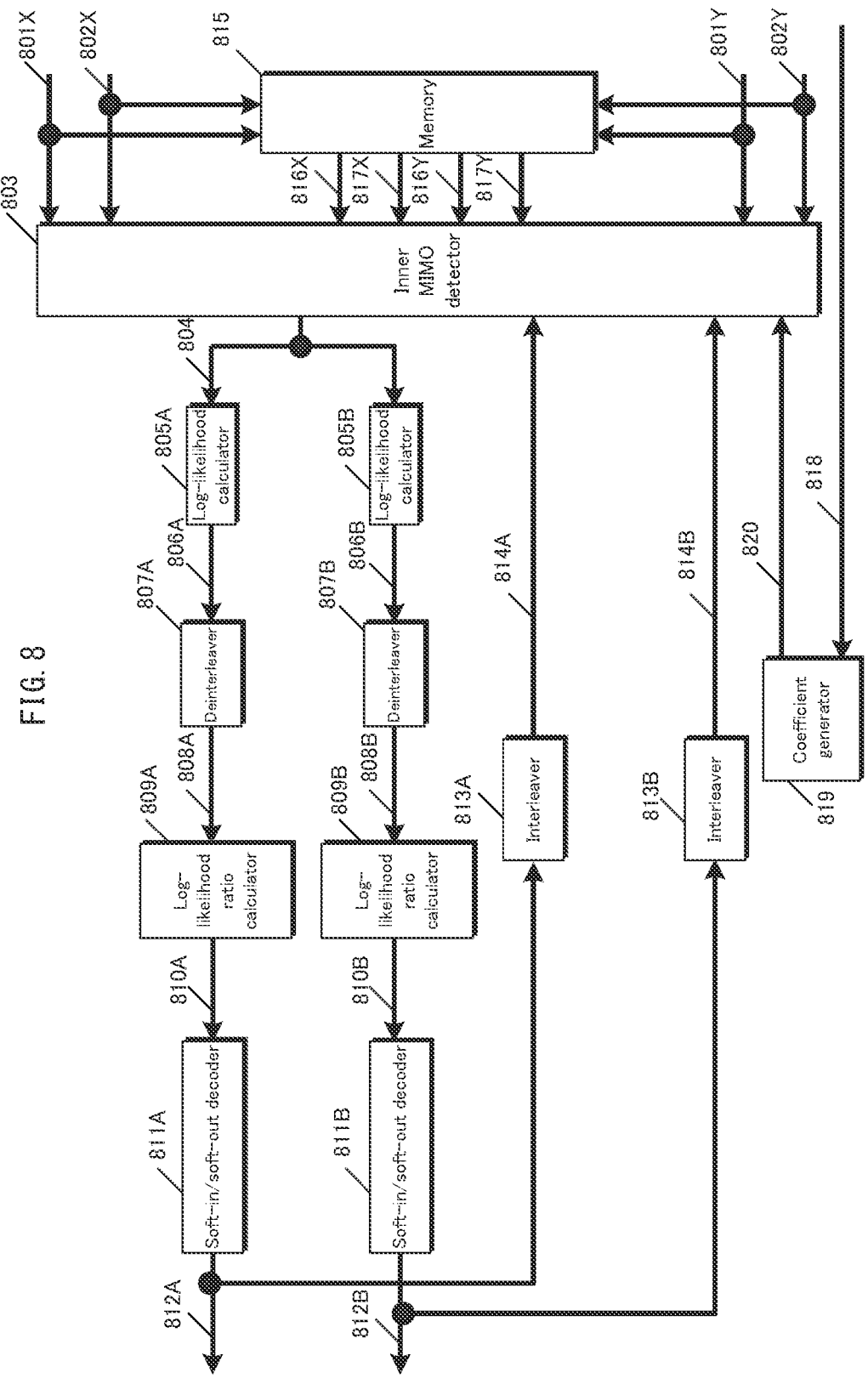
FIG. 8 illustrates a sample configuration of a signal processor in the reception device.

Next, the operations of the signal processor 711 from FIG. 7 are described in detail. FIG. 8 illustrates a sample configuration of the signal processor 711 pertaining to the present embodiment. As shown, the signal processor 711 is primarily made up of an inner MIMO detector, a soft-in/soft-out decoder, and a coefficient generator. Non-Patent Literature 2 and Non-Patent Literature 3 describe the method of iterative decoding with this structure. The MIMO system described in Non-Patent Literature 2 and Non-Patent Literature 3 is a spatial multiplexing MIMO system, while the present Embodiment differs from Non-Patent Literature 2 and Non-Patent Literature 3 in describing a MIMO system that regularly changes the phase over time, while using the precoding matrix. Taking the (channel) matrix H(t) of Math. 36 (formula 36), then by letting the precoding weight matrix from FIG. 6 be F (here, a fixed precoding matrix remaining unchanged for a given received signal) and letting the phase changing formula used by the phase changer from FIG. 6 be Y(t) (here, Y(t) changes over time t), then the receive vector $R(t)=(r1(t),r2(t))^T$ and the stream vector $S(t)=(s1(t),s2(t))^T$ the following function is derived:

[Math. 48]

$$R(t) = H(t) \times Y(t) \times F \times S(t) \text{ where } Y(t) = \begin{pmatrix} 1 & 0 \\ 0 & y(t) \end{pmatrix} \quad \text{(formula 48)}$$

Here, the reception device may use the decoding methods of Non-Patent Literature 2 and 3 on R(t) by computing H(t)×Y(t)×F.

Accordingly, the coefficient generator 819 from FIG. 8 takes a transmission method information signal 818 (corresponding to 710 from FIG. 7) indicated by the transmission device (information for specifying the fixed precoding matrix in use and the phase changing pattern used when the phase is changed) and outputs a signal processing method information signal 820.

The inner MIMO detector 803 takes the signal processing method information signal 820 as input and performs iterative detection and decoding using the signal and the relationship thereof to Math. 48 (formula 48). The operations thereof are described below.

Figure 10:
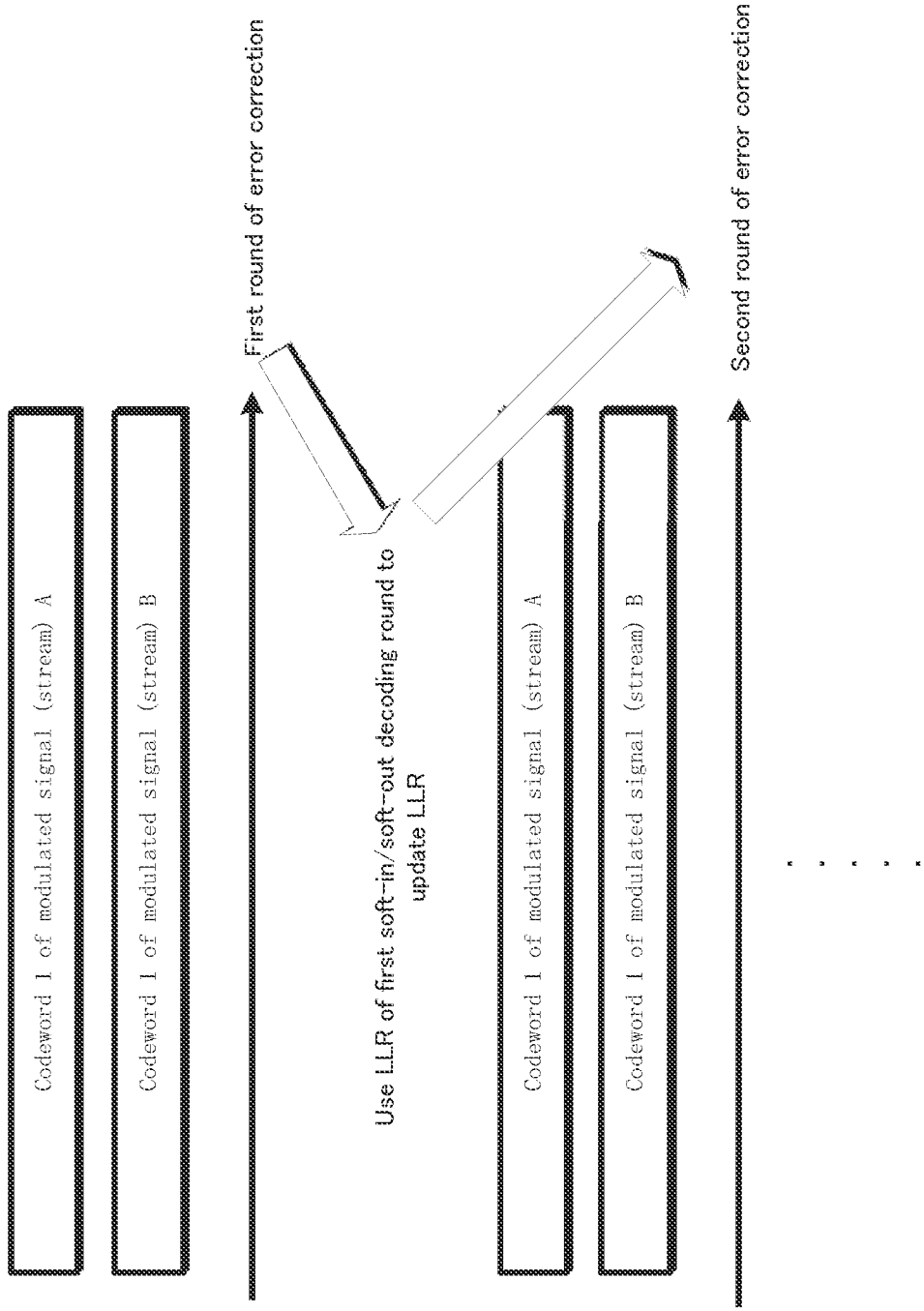
FIG. 10 illustrates an iterative decoding method.

The processing unit illustrated in FIG. 8 must use a processing method, as is illustrated in FIG. 10, to perform iterative decoding (iterative detection). First, detection of one codeword (or one frame) of modulated signal (stream) s1 and of one codeword (or one frame) of modulated signal (stream) s2 are performed. As a result, the soft-in/soft-out decoder obtains the log-likelihood ratio of each bit of the codeword (or frame) of modulated signal (stream) s1 and of the codeword (or frame) of modulated signal (stream) s2. Next, the log-likelihood ratio is used to perform a second round of detection and decoding. These operations (referred to as iterative decoding (iterative detection)) are performed multiple times. The following explanations centre on the creation method of the log-likelihood ratio of a symbol at a specific time within one frame.

In FIG. 8, a memory 815 takes baseband signal 801X (corresponding to baseband signal 704_X from FIG. 7), channel estimation signal group 802X (corresponding to channel estimation signals 706_1 and 706_2 from FIG. 7), baseband signal 801Y (corresponding to baseband signal 704_Y from FIG. 7), and channel estimation signal group 802Y (corresponding to channel estimation signals 708_1 and 708_2 from FIG. 7) as input, executes (computes) H(t)×Y(t)×F from Math. 48 (formula 48) in order to perform iterative decoding (iterative detection), and stores the resulting matrix as a transformed channel signal group. The memory 815 then outputs the above-described signals as needed, specifically as baseband signal 816X, transformed channel estimation signal group 817X, baseband signal 816Y, and transformed channel estimation signal group 817Y.

Subsequent operations are described separately for initial detection and for iterative decoding (iterative detection).

(Initial Detection)

The inner MIMO detector 803 takes baseband signal 801X, channel estimation signal group 802X, baseband signal 801Y, and channel estimation signal group 802Y as input. Here, the modulation scheme for modulated signal (stream) s1 and modulated signal (stream) s2 is described as 16-QAM.

Figure 11:
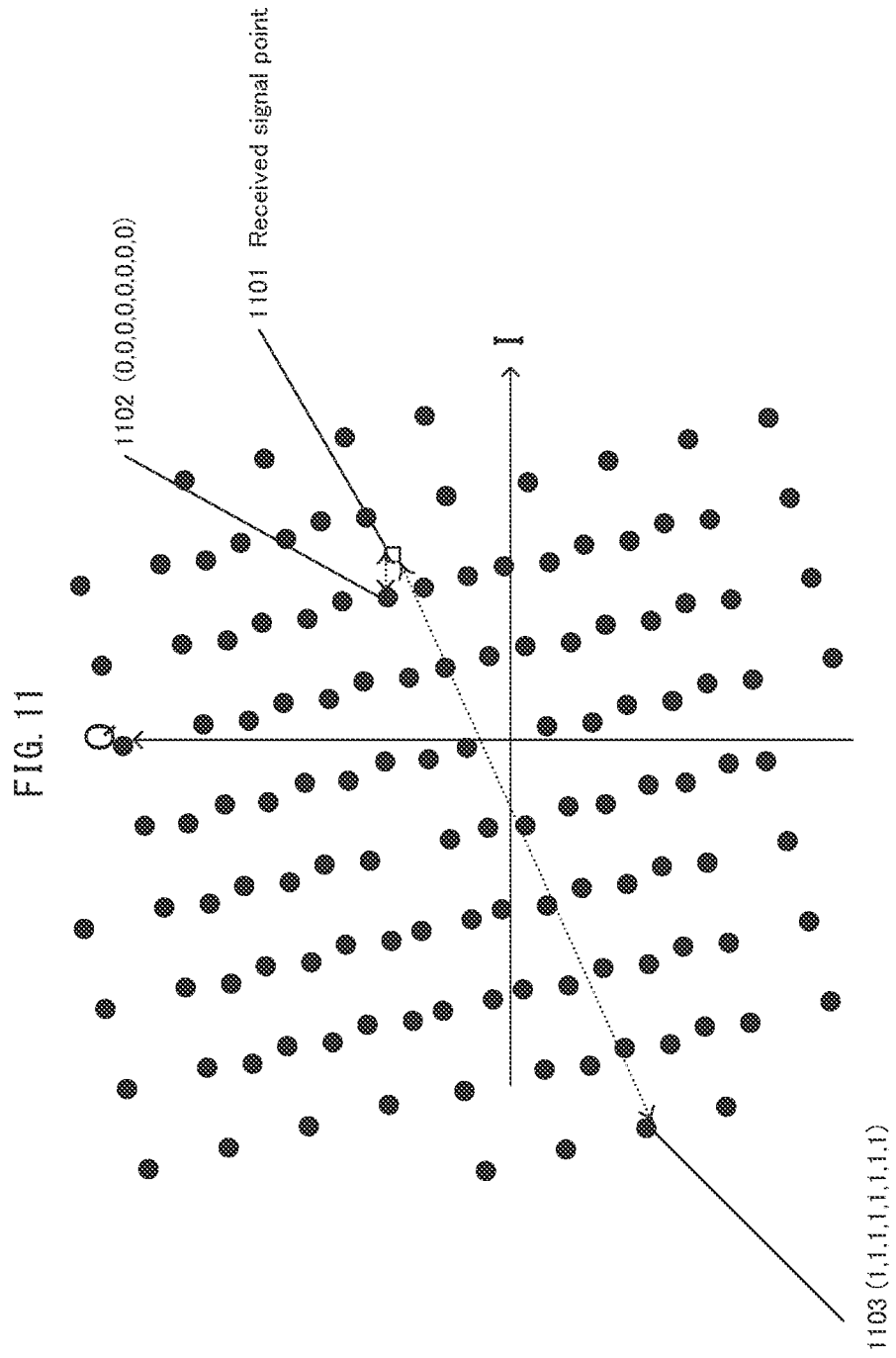
FIG. 11 illustrates sample reception conditions.

The inner MIMO detector 803 first computes H(t)×Y(t)×F from the channel estimation signal groups 802X and 802Y, thus calculating a candidate signal point corresponding to baseband signal 801X. FIG. 11 represents such a calculation. In FIG. 11, each black dot is a candidate signal point in the I-Q plane. Given that the modulation scheme is 16-QAM, 256 candidate signal points exist. (However, FIG. 11 is only a representation and does not indicate all 256 candidate signal points.) Letting the four bits transmitted in modulated signal s1 be b0, b1, b2, and b3 and the four bits transmitted in modulated signal s2 be b4, b5, b6, and b7, candidate signal points corresponding to (b0, b1, b2, b3, b4, b5, b6, b7) are found in FIG. 11. The Euclidean squared distance between each candidate signal point and each received signal point 1101 (corresponding to baseband signal 801X) is then computed. The Euclidian squared distance between each point is divided by the noise variance $\sigma^2$. Accordingly, $E_X$(b0, b1, b2, b3, b4, b5, b6, b7) is calculated. That is, the Euclidian squared distance between a candidate signal point corresponding to (b0, b1, b2, b3, b4, b5, b6, b7) and a received signal point is divided by the noise variance. Here, each of the baseband signals and the modulated signals s1 and s2 is a complex signal.

Similarly, the inner MIMO detector 803 computes H(t)×Y(t)×F from the channel estimation signal groups 802X and 802Y, calculates candidate signal points corresponding to baseband signal 801Y, computes the Euclidean squared distance between each of the candidate signal points and the received signal points (corresponding to baseband signal 801Y), and divides the Euclidean squared distance by the noise variance $\sigma^2$. Accordingly, $E_Y$(b0, b1, b2, b3, b4, b5, b6, b7) is calculated. That is, $E_Y$ is the Euclidean squared distance between a candidate signal point corresponding to (b0, b1, b2, b3, b4, b5, b6, b7) and a received signal point, divided by the noise variance.

Next, $E_X$(b0, b1, b2, b3, b4, b5, b6, b7)+$E_Y$(b0, b1, b2, b3, b4, b5, b6, b7)=E(b0, b1, b2, b3, b4, b5, b6, b7) is computed.

The inner MIMO detector 803 outputs E(b0, b1, b2, b3, b4, b5, b6, b7) as the signal 804.

The log-likelihood calculator 805A takes the signal 804 as input, calculates the log-likelihood of bits b0, b1, b2, and b3, and outputs the log-likelihood signal 806A. Note that this log-likelihood calculation produces the log-likelihood of a bit being 1 and the log-likelihood of a bit being 0. The calculation method is as shown in Math. 28 (formula 28), Math. 29 (formula 29), and Math. 30 (formula 30), and the details thereof are given by Non-Patent Literature 2 and 3.

Similarly, log-likelihood calculator 805B takes the signal 804 as input, calculates the log-likelihood of bits b4, b5, b6, and b7, and outputs log-likelihood signal 806B.

A deinterleaver (807A) takes log-likelihood signal 806A as input, performs deinterleaving corresponding to that of the interleaver (the interleaver (304A) from FIG. 3), and outputs deinterleaved log-likelihood signal 808A.

Similarly, a deinterleaver (807B) takes log-likelihood signal 806B as input, performs deinterleaving corresponding to that of the interleaver (the interleaver (304B) from FIG. 3), and outputs deinterleaved log-likelihood signal 808B.

Log-likelihood ratio calculator 809A takes deinterleaved log-likelihood signal 808A as input, calculates the log-likelihood ratio of the bits encoded by encoder 302A from FIG. 3, and outputs log-likelihood ratio signal 810A.

Similarly, log-likelihood ratio calculator 809B takes deinterleaved log-likelihood signal 808B as input, calculates the log-likelihood ratio of the bits encoded by encoder 302B from FIG. 3, and outputs log-likelihood ratio signal 810B.

Soft-in/soft-out decoder 811A takes log-likelihood ratio signal 810A as input, performs decoding, and outputs a decoded log-likelihood ratio 812A.

Similarly, soft-in/soft-out decoder 811B takes log-likelihood ratio signal 810B as input, performs decoding, and outputs decoded log-likelihood ratio 812B.

(Iterative Decoding (Iterative Detection), k Iterations)

The interleaver (813A) takes the k−1th decoded log-likelihood ratio 812A decoded by the soft-in/soft-out decoder as input, performs interleaving, and outputs an interleaved log-likelihood ratio 814A. Here, the interleaving pattern used by the interleaver (813A) is identical to that of the interleaver (304A) from FIG. 3.

Another interleaver (813B) takes the k−1th decoded log-likelihood ratio 812B decoded by the soft-in/soft-out decoder as input, performs interleaving, and outputs interleaved log-likelihood ratio 814B. Here, the interleaving pattern used by the interleaver (813B) is identical to that of the other interleaver (304B) from FIG. 3.

The inner MIMO detector 803 takes baseband signal 816X, transformed channel estimation signal group 817X, baseband signal 816Y, transformed channel estimation signal group 817Y, interleaved log-likelihood ratio 814A, and interleaved log-likelihood ratio 814B as input. Here, baseband signal 816X, transformed channel estimation signal group 817X, baseband signal 816Y, and transformed channel estimation signal group 817Y are used instead of baseband signal 801X, channel estimation signal group 802X, baseband signal 801Y, and channel estimation signal group 802Y because the latter cause delays due to the iterative decoding.

The iterative decoding operations of the inner MIMO detector 803 differ from the initial detection operations thereof in that the interleaved log-likelihood ratios 814A and 814B are used in signal processing for the former. The inner MIMO detector 803 first calculates E(b0, b1, b2, b3, b4, b5, b6, b7) in the same manner as for initial detection. In addition, the coefficients corresponding to Math. 11 (formula 11) and Math. 32 (formula 32) are computed from the interleaved log-likelihood ratios 814A and 814B. The value of E(b0, b1, b2, b3, b4, b5, b6, b7) is corrected using the coefficients so calculated to obtain E'(b0, b1, b2, b3, b4, b5, b6, b7), which is output as the signal 804.

The log-likelihood calculator 805A takes the signal 804 as input, calculates the log-likelihood of bits b0, b1, b2, and b3, and outputs the log-likelihood signal 806A. Note that this log-likelihood calculation produces the log-likelihood of a bit being 1 and the log-likelihood of a bit being 0. The calculation method is as shown in Math. 31 (formula 31) through Math. 35 (formula 35), and the details are given by Non-Patent Literature 2 and 3.

Similarly, log-likelihood calculator 805B takes the signal 804 as input, calculates the log-likelihood of bits b4, b5, b6, and b7, and outputs log-likelihood signal 806B. Operations performed by the deinterleaver onwards are similar to those performed for initial detection.

While FIG. 8 illustrates the configuration of the signal processor when performing iterative detection, this structure is not absolutely necessary as good reception improvements are obtainable by iterative detection alone. As long as the components needed for iterative detection are present, the configuration need not include the interleavers 813A and 813B. In such a case, the inner MIMO detector 803 does not perform iterative detection.

The key point for the present Embodiment is the calculation of H(t)×Y(t)×F. As shown in Non-Patent Literature 5 and the like, QR decomposition may also be used to perform initial detection and iterative detection.

Also, as indicated by Non-Patent Literature 11, MMSE (Minimum Mean-Square Error) and ZF (Zero-Forcing) linear operations may be performed based on H(t)×Y(t)×F when performing initial detection.

Figure 9:
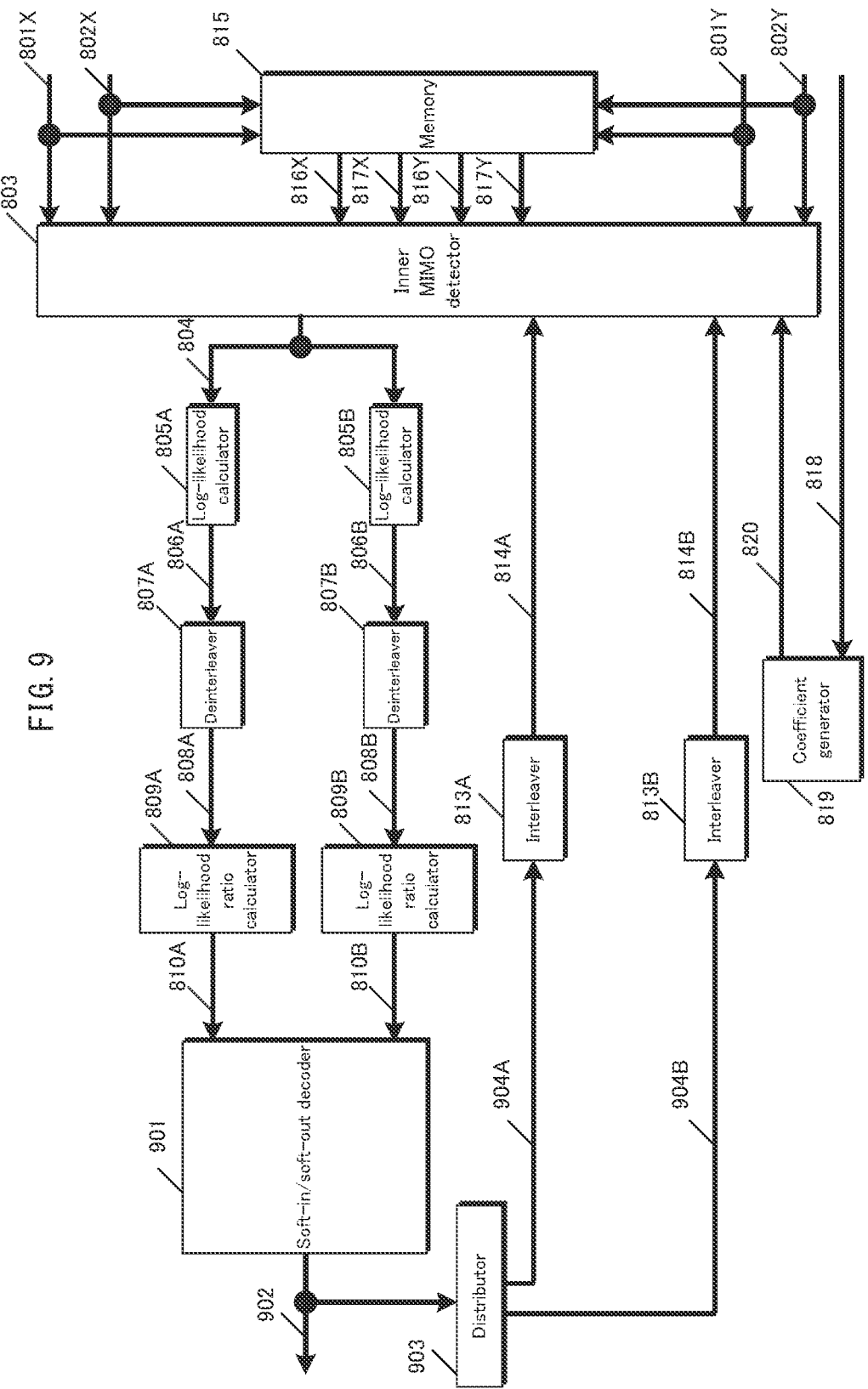
FIG. 9 illustrates another sample configuration of a signal processor in the reception device.

FIG. 9 illustrates the configuration of a signal processor, unlike that of FIG. 8, that serves as the signal processor for modulated signals transmitted by the transmission device from FIG. 4. The point of difference from FIG. 8 is the number of soft-in/soft-out decoders. A soft-in/soft-out decoder 901 takes the log-likelihood ratio signals 810A and 810B as input, performs decoding, and outputs a decoded log-likelihood ratio 902. A distributor 903 takes the decoded log-likelihood ratio 902 as input for distribution. Otherwise, the operations are identical to those explained for FIG. 8.

As described above, when a transmission device according to the present Embodiment using a MIMO system transmits a plurality of modulated signals from a plurality of antennas, changing the phase over time while multiplying by the precoding matrix so as to regularly change the phase results in improvements to data reception quality for a reception device in a LOS environment, where direct waves are dominant, compared to a conventional spatial multiplexing MIMO system.

In the present Embodiment, and particularly in the configuration of the reception device, the number of antennas is limited and explanations are given accordingly. However, the Embodiment may also be applied to a greater number of antennas. In other words, the number of antennas in the reception device does not affect the operations or advantageous effects of the present Embodiment.

Also, although LDPC codes are described as a particular example, the present Embodiment is not limited in this manner, Furthermore, the decoding method is not limited to the sum-product decoding example given for the soft-in/soft-out decoder. Other soft-in/soft-out decoding methods, such as the BCJR algorithm, SOVA, and the Max-Log-Map algorithm may also be used. Details are provided in Non-Patent Literature 6.

In addition, although the present Embodiment is described using a single-carrier method, no limitation is intended in this regard. The present Embodiment is also applicable to multi-carrier transmission. Accordingly, the present Embodiment may also be realized using, for example, spread-spectrum communications, OFDM, SC-FDMA (Single Carrier Frequency-Division Multiple Access), SC-OFDM, wavelet OFDM as described in Non-Patent Literature 7, and so on. Furthermore, in the present Embodiment, symbols other than data symbols, such as pilot symbols (preamble, unique word, and so on) or symbols transmitting control information, may be arranged within the frame in any manner.

The following describes an example in which OFDM is used as a multi-carrier method.

Figure 12:
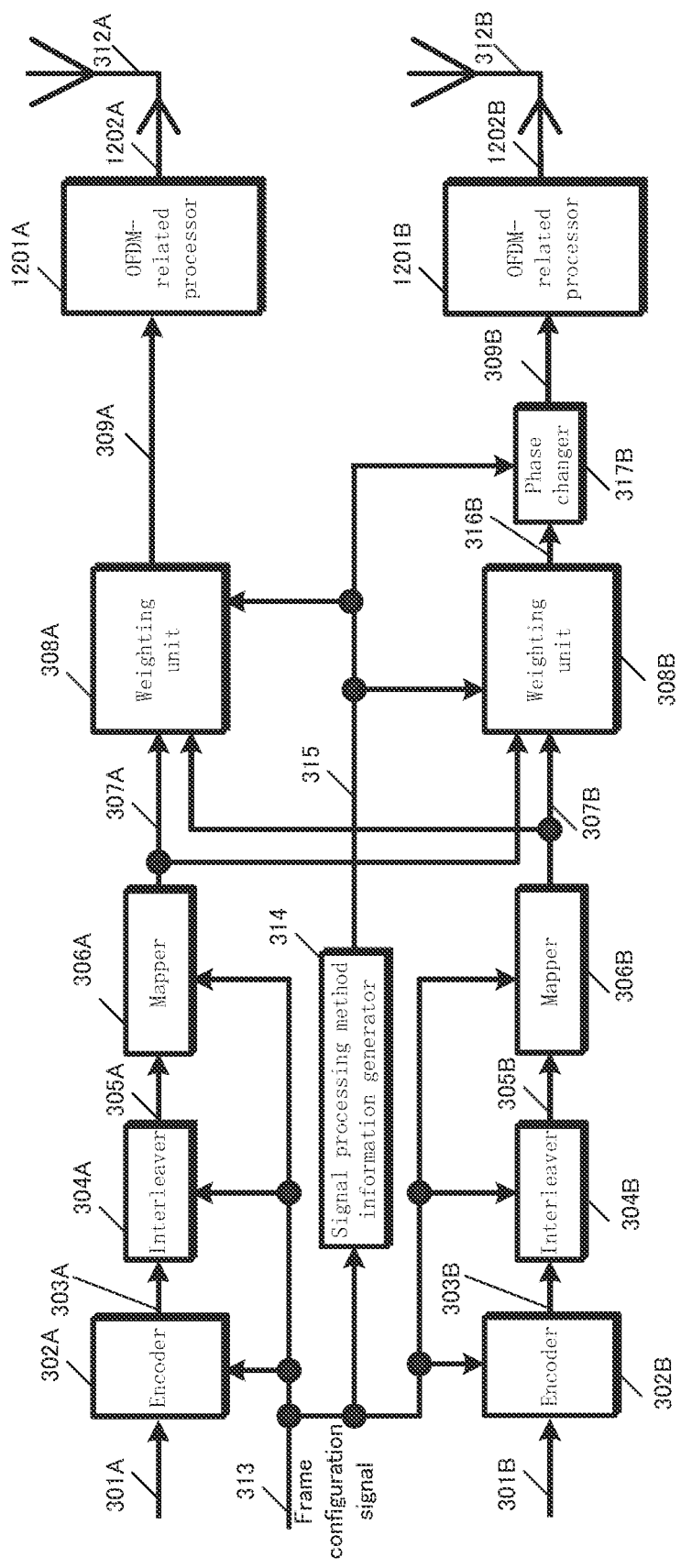
FIG. 12 illustrates a further example of a transmission device applying a phase changing method.

FIG. 12 illustrates the configuration of a transmission device using OFDM. In FIG. 12, components operating in the manner described for FIG. 3 use identical reference numbers.

An OFDM-related processor 1201A takes weighted signal 309A as input, performs OFDM-related processing thereon, and outputs transmit signal 1202A. Similarly, OFDM-related processor 1201B takes post-phase change signal 309B as input, performs OFDM-related processing thereon, and outputs transmit signal 1202B.

Figure 13:
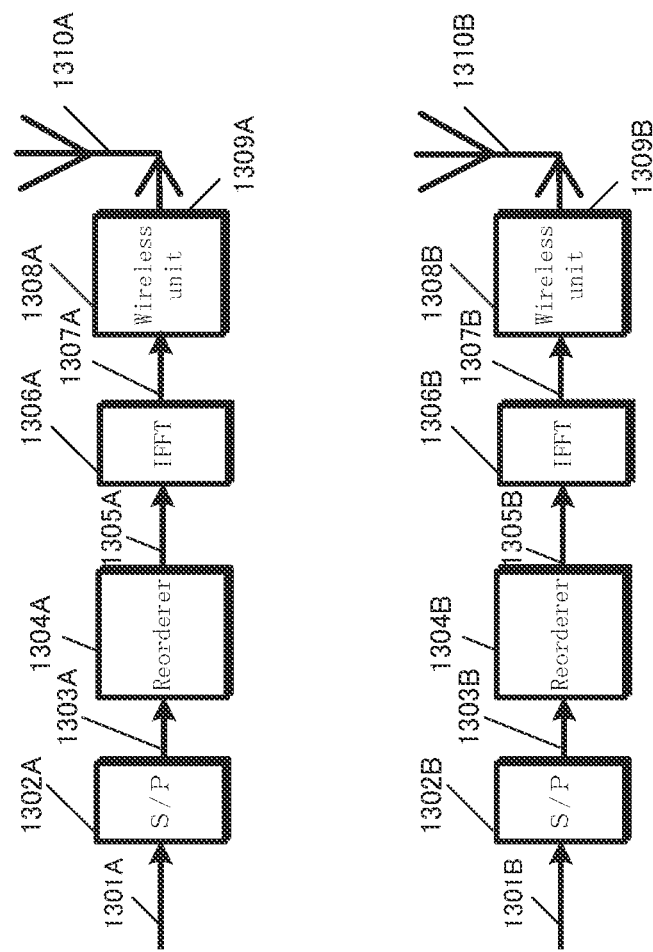
FIG. 13 illustrates yet a further example of a transmission device applying a phase changing method.

FIG. 13 illustrates a sample configuration of the OFDM-related processors 1201A and 1201B and onward from FIG. 12. Components 1301A through 1310A belong between 1201A and 312A from FIG. 12, while components 1301B through 1310B belong between 1201B and 312B.

Serial-to-parallel converter 1302A performs serial-to-parallel conversion on weighted signal 1301A (corresponding to weighted signal 309A from FIG. 12) and outputs parallel signal 1303A.

Reorderer 1304A takes parallel signal 1303A as input, performs reordering thereof, and outputs reordered signal 1305A. Reordering is described in detail later.

IFFT (Inverse Fast Fourier Transform) unit 1306A takes reordered signal 1305A as input, applies an IFFT thereto, and outputs post-IFFT signal 1307A.

Wireless unit 1308A takes post-IFFT signal 1307A as input, performs processing such as frequency conversion and amplification, thereon, and outputs modulated signal 1309A. Modulated signal 1309A is then output as radio waves by antenna 1310A.

Serial-to-parallel converter 1302B performs serial-to-parallel conversion on weighted signal 1301B (corresponding to post-phase change 309B from FIG. 12) and outputs parallel signal 1303B.

Reorderer 1304B takes parallel signal 1303B as input, performs reordering thereof, and outputs reordered signal 1305B. Reordering is described in detail later.

IFFT unit 1306B takes reordered signal 1305B as input, applies an IFFT thereto, and outputs post-IFFT signal 1307B.

Wireless unit 1308B takes post-IFFT signal 1307B as input, performs processing such as frequency conversion and amplification thereon, and outputs modulated signal 1309B. Modulated signal 1309B is then output as radio waves by antenna 1310A.

The transmission device from FIG. 3 does not use a multi-carrier transmission method. Thus, as shown in FIG. 6, a change of phase is performed to achieve a period (cycle) of four and the post-phase change symbols are arranged in the time domain. As shown in FIG. 12, when multi-carrier transmission, such as OFDM, is used, then, naturally, pre-coded post-phase change symbols may be arranged with respect to the time domain as in FIG. 3, and this applies to each (sub-)carrier. However, for multi-carrier transmission, the arrangement may also be in the frequency domain, or in both the frequency domain and the time domain. The following describes these arrangements.

FIGS. 14A and 14B indicate frequency on the horizontal axes and time on the vertical axes thereof, and illustrate an example of a symbol reordering method used by the reorderers 1301A and 1301B from FIG. 13. The frequency axes are made up of (sub-)carriers 0 through 9. The modulated signals z1 and z2 share common timestamps (timing) and use a common frequency band. FIG. 14A illustrates a reordering method for the symbols of modulated signal z1, while FIG. 14B illustrates a reordering method for the symbols of modulated signal z2. With respect to the symbols of weighted signal 1301A input to serial-to-parallel converter 1302A, the assigned ordering is #0, #1, #2, #3, and so on. Here, given that the example deals with a period (cycle) of four, #0, #1, #2, and #3 are equivalent to one period (cycle). Similarly, #4n, #4n+1, #4n+2, and #4n+3 (n being a non-zero positive integer) are also equivalent to one period (cycle).

As shown in FIG. 14A, symbols #0, #1, #2, #3, and so on are arranged in order, beginning at carrier 0. Symbols #0 through #9 are given timestamp $1, followed by symbols #10 through #19 which are given timestamp $2, and so on in a regular arrangement. Here, modulated signals z1 and z2 are complex signals.

Similarly, with respect to the symbols of weighted signal 1301B input to serial-to-parallel converter 1302B, the assigned ordering is #0, #1, #2, #3, and so on. Here, given that the example deals with a period (cycle) of four, a different change in phase is applied to each of #0, #1, #2, and #3, which are equivalent to one period (cycle). Similarly, a different change in phase is applied to each of #4n, #4n+1, #4n+2, and #4n+3 (n being a non-zero positive integer), which are also equivalent to one period (cycle).

As shown in FIG. 14B, symbols #0, #1, #2, #3, and so on are arranged in order, beginning at carrier 0. Symbols #0 through #9 are given timestamp $1, followed by symbols #10 through #19 which are given timestamp $2, and so on in a regular arrangement.

The symbol group 1402 shown in FIG. 14B corresponds to one period (cycle) of symbols when the phase changing method of FIG. 6 is used. Symbol #0 is the symbol obtained by using the phase at timestamp u in FIG. 6, symbol #1 is the symbol obtained by using the phase at timestamp u+1 in FIG. 6, symbol #2 is the symbol obtained by using the phase at timestamp u+2 in FIG. 6, and symbol #3 is the symbol obtained by using the phase at timestamp u+3 in FIG. 6. Accordingly, for any symbol #x, symbol #x is the symbol obtained by using the phase at timestamp u in FIG. 6 when x mod 4 equals 0 (i.e., when the remainder of x divided by 4 is 0, mod being the modulo operator), symbol #x is the symbol obtained by using the phase at timestamp u+1 in FIG. 6 when x mod 4 equals 1, symbol #x is the symbol obtained by using the phase at timestamp u+2 in FIG. 6 when x mod 4 equals 2, and symbol #x is the symbol obtained by using the phase at timestamp u+3 in FIG. 6 when x mod 4 equals 3.

In the present Embodiment, modulated signal z1 shown in FIG. 14A has not undergone a change of phase.

As such, when using a multi-carrier transmission method such as OFDM, and unlike single carrier transmission, symbols can be arranged in the frequency domain. Of course, the symbol arrangement method is not limited to those illustrated by FIGS. 14A and 14B. Further examples are shown in FIGS. 15A, 15B, 16A, and 16B.

FIGS. 15A and 15B indicate frequency on the horizontal axes and time on the vertical axes thereof, and illustrate an example of a symbol reordering method used by the reorderers 1301A and 1301B from FIG. 13 that differs from that of FIGS. 14A and 14B. FIG. 15A illustrates a reordering method for the symbols of modulated signal z1, while FIG. 15B illustrates a reordering method for the symbols of modulated signal z2. FIGS. 15A and 15B differ from FIGS. 14A and 14B in the reordering method applied to the symbols of modulated signal z1 and the symbols of modulated signal z2. In FIG. 15B, symbols #0 through #5 are arranged at carriers 4 through 9, symbols #6 though #9 are arranged at carriers 0 through 3, and this arrangement is repeated for symbols #10 through #19. Here, as in FIG. 14B, symbol group 1502 shown in FIG. 15B corresponds to one period (cycle) of symbols when the phase changing method of FIG. 6 is used.

FIGS. 16A and 16B indicate frequency on the horizontal axes and time on the vertical axes thereof, and illustrate an example of a symbol reordering method used by the reorderers 1301A and 1301B from FIG. 13 that differs from that of FIGS. 14A and 14B. FIG. 16A illustrates a reordering method for the symbols of modulated signal z1, while FIG. 16B illustrates a reordering method for the symbols of modulated signal z2. FIGS. 16A and 16B differ from FIGS. 14A and 14B in that, while FIGS. 14A and 14B showed symbols arranged at sequential carriers, FIGS. 16A and 16B do not arrange the symbols at sequential carriers. Obviously, for FIGS. 16A and 16B, different reordering methods may be applied to the symbols of modulated signal z1 and to the symbols of modulated signal z2 as in FIGS. 15A and 15B.

FIGS. 17A and 17B indicate frequency on the horizontal axes and time on the vertical axes thereof, and illustrate an example of a symbol reordering method used by the reorderers 1301A and 1301B from FIG. 13 that differs from those of FIGS. 14A through 16B. FIG. 17A illustrates a reordering method for the symbols of modulated signal z1 while FIG. 17B illustrates a reordering method for the symbols of modulated signal z2. While FIGS. 14A through 16B show symbols arranged with respect to the frequency axis, FIGS. 17A and 17B use the frequency and time axes together in a single arrangement.

While FIG. 6 describes an example where the change of phase is performed in a four slot period (cycle), the following example describes an eight slot period (cycle). In FIGS. 17A and 17B, the symbol group 1702 is equivalent to one period (cycle) of symbols when the phase changing scheme is used (i.e., to eight symbols) such that symbol #0 is the symbol obtained by using the phase at timestamp u, symbol #1 is the symbol obtained by using the phase at timestamp u+1, symbol #2 is the symbol obtained by using the phase at timestamp u+2, symbol #3 is the symbol obtained by using the phase at timestamp u+3, symbol #4 is the symbol obtained by using the phase at timestamp u+4, symbol #5 is the symbol obtained by using the phase at timestamp u+5, symbol #6 is the symbol obtained by using the phase at timestamp u+6, and symbol #7 is the symbol obtained by using the phase at timestamp u+7. Accordingly, for any symbol #x, symbol #x is the symbol obtained by using the phase at timestamp u when x mod 8 equals 0, symbol #x is the symbol obtained by using the phase at timestamp u+1 when x mod 8 equals 1, symbol #x is the symbol obtained by using the phase at timestamp u+2 when x mod 8 equals 2, symbol #x is the symbol obtained by using the phase at timestamp u+3 when x mod 8 equals 3, symbol #x is the symbol obtained by using the phase at timestamp u+4 when x mod 8 equals 4, symbol #x is the symbol obtained by using the phase at timestamp u+5 when x mod 8 equals 5, symbol #x is the symbol obtained by using the phase at timestamp u+6 when x mod 8 equals 6, and symbol #x is the symbol obtained by using the phase at timestamp u+7 when x mod 8 equals 7. In FIGS. 17A and 17B four slots along the time axis and two slots along the frequency axis are used for a total of 4×2=8 slots, in which one period (cycle) of symbols is arranged. Here, given m×n symbols per period (cycle) (i.e., m×n different phases are available for multiplication), then n slots (carriers) in the frequency domain and m slots in the time domain should be used to arrange the symbols of each period (cycle), such that m>n. This is because the phase of direct waves fluctuates slowly in the time domain relative to the frequency domain. Accordingly, the present Embodiment performs a regular change of phase that reduces the influence of steady direct waves. Thus, the phase changing period (cycle) should preferably reduce direct wave fluctuations. Accordingly, m should be greater than n. Taking the above into consideration, using the time and frequency domains together for reordering, as shown in FIGS. 17A and 17B, is preferable to using either of the frequency domain or the time domain alone due to the strong probability of the direct waves becoming regular. As a result, the effects of the present invention are more easily obtained. However, reordering in the frequency domain may lead to diversity gain due the fact that frequency-domain fluctuations are abrupt. As such, using the frequency and time domains together for reordering is not always ideal.

FIGS. 18A and 18B indicate frequency on the horizontal axes and time on the vertical axes thereof, and illustrate an example of a symbol reordering method used by the reorderers 1301A and 1301B from FIG. 13 that differs from that of FIGS. 17A and 17B. FIG. 18A illustrates a reordering method for the symbols of modulated signal z1, while FIG. 18B illustrates a reordering method for the symbols of modulated signal z2. Much like FIGS. 17A and 17B, FIGS. 18A and 18B illustrate the use of the time and frequency axes, together. However, in contrast to FIGS. 17A and 17B, where the frequency axis is prioritized and the time axis is used for secondary symbol arrangement, FIGS. 18A and 18B prioritize the rime axis and use the frequency axis for secondary symbol arrangement. In FIG. 18B, symbol group 1802 corresponds to one period (cycle) of symbols when the phase changing method is used.

In FIGS. 17A, 17B, 18A, and 18B, the reordering method applied to the symbols of modulated signal z1 and the symbols of modulated signal z2 may be identical or may differ as like in FIGS. 15A and 15B. Either approach allows good reception quality to be obtained. Also, in FIGS. 17A, 17B, 18A, and 18B, the symbols may be arranged non-sequentially as in FIGS. 16A and 16B. Either approach allows good reception quality to be obtained.

Figure 22:
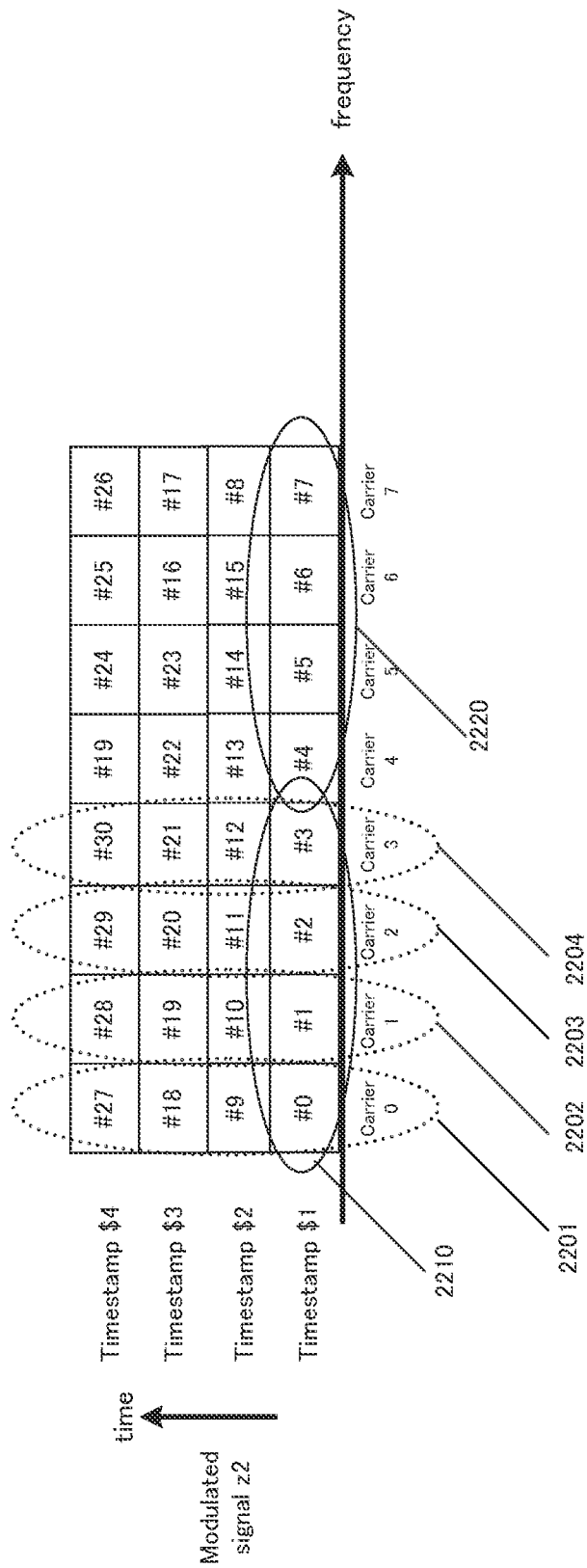
FIG. 22 illustrates a sample symbol rearrangement method.

FIG. 22 indicates frequency on the horizontal axis and time on the vertical axis thereof, and illustrates an example of a symbol reordering method used by the reorderers 1301A and 1301B from FIG. 13 that differs from the above. FIG. 22 illustrates a regular phase changing method using four slots, similar to timestamps u through u+3 from FIG. 6. The characteristic feature of FIG. 22 is that, although the symbols are reordered with respect the frequency domain, when read along the time axis, a periodic shift of n (n=1 in the example of FIG. 22) symbols is apparent. The frequency-domain symbol group 2210 in FIG. 22 indicates four symbols to which the change of phase is applied at timestamps u through u+3 from FIG. 6.

Here, symbol #0 is obtained through a change of phase at timestamp u, symbol #1 is obtained through a change of phase at timestamp u+1, symbol #2 is obtained through a change of phase at timestamp u+2, and symbol #3 is obtained through a change of phase at timestamp u+3.

Similarly, for frequency-domain symbol group 2220, symbol #4 is obtained through a change of phase at timestamp u, symbol #5 is obtained through a change of phase at timestamp u+1, symbol #6 is obtained through a change of phase at timestamp u+2, and symbol #7 is obtained through a change of phase at timestamp u+3.

The above-described change of phase is applied to the symbol at timestamp $1. However, in order to apply periodic shifting with respect to the time domain, the following change of phases are applied to symbol groups 2201, 2202, 2203, and 2204.

For time-domain symbol group 2201, symbol #0 is obtained through a change of phase at timestamp u, symbol #9 is obtained through a change of phase at timestamp u+1, symbol #18 is obtained through a change of phase at timestamp u+2, and symbol #27 is obtained through a change of phase at timestamp u+3.

For time-domain symbol group 2202, symbol #28 is obtained through a change of phase at timestamp u, symbol #1 is obtained through a change of phase at timestamp u+1, symbol #10 is obtained through a change of phase at timestamp u+2, and symbol #19 is obtained through a change of phase at timestamp u+3.

For time-domain symbol group 2203, symbol #20 is obtained through a change of phase at timestamp u, symbol

29 is obtained through a change of phase at timestamp u+1, symbol #2 is obtained through a change of phase at timestamp u+2, and symbol #11 is obtained through a change of phase at timestamp u+3.

For time-domain symbol group 2204, symbol #12 is obtained through a change of phase at timestamp u, symbol #21 is obtained through a change of phase at timestamp u+1, symbol #30 is obtained through a change of phase at timestamp u+2, and symbol #3 is obtained through a change of phase at timestamp u+3.

The characteristic feature of FIG. 22 is seen in that, taking symbol #11 as an example, the two neighbouring symbols thereof having the same timestamp in the frequency domain (#10 and #12) are both symbols changed using a different phase than symbol #11, and the two neighbouring symbols thereof having the same carrier in the time domain (#2 and #20) are both symbols changed using a different phase than symbol #11. This holds not only for symbol #11, but also for any symbol having two neighbouring symbols in the frequency domain and the time domain. Accordingly, the change of phase is effectively carried out. This is highly likely to improve data reception quality as influence from regularizing direct waves is less prone to reception.

Although FIG. 22 illustrates an example in which n=1, the invention is not limited in this manner. The same may be applied to a case in which n=3. Furthermore, although FIG. 22 illustrates the realization of the above-described effects by arranging the symbols in the frequency domain and advancing in the time domain so as to achieve the characteristic effect of imparting a periodic shift to the symbol arrangement order, the symbols may also be randomly (or regularly) arranged to the same effect.

Embodiment 2

In Embodiment 1, described above, phase changing is applied to a weighted (precoded with a fixed precoding matrix) signal z(t). The following Embodiments describe various phase changing methods by which the effects of Embodiment 1 may be obtained.

In the above-described Embodiment, as shown in FIGS. 3 and 6, phase changer 317B is configured to perform a change of phase on only one of the signals output by the weighting unit 600.

Figure 25:
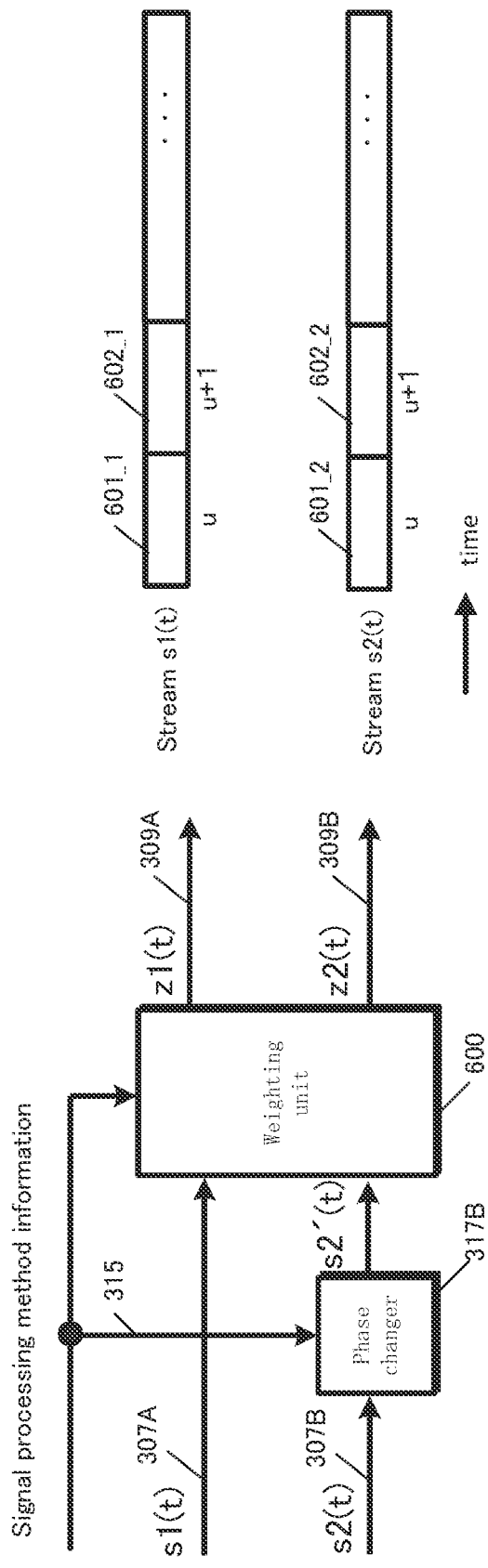
FIG. 25 illustrates another sample phase changing method.

However, phase changing may also be applied before precoding is performed by the weighting unit 600. In addition to the components illustrated in FIG. 6, the transmission device may also feature the weighting unit 600 before the phase changer 317B, as shown in FIG. 25.

In such circumstances, the following configuration is possible. The phase changer 317B performs a regular change of phase with respect to baseband signal $s2(t)$, on which mapping has been performed according to a selected modulation scheme, and outputs $s2'(t)=s2(t)y(t)$ (where y(t) varies over time t). The weighting unit 600 executes precoding on $s2't$, outputs $z2(t)=Ws2'(t)$ (see Math. 42 (formula 42)) and the result is then transmitted.

Alternatively, phase changing may be performed on both modulated signals $s1(t)$ and $s2(t)$. As such, the transmission device is configured so as to include a phase changer taking both signals output by the weighting unit 600, as shown in FIG. 26.

Like phase changer 317B, phase changer 317A performs regular a regular change of phase on the signal input thereto, and as such changes the phase of signal $z1'(t)$ precoded by the weighting unit. Post-phase change signal $z1(t)$ is then output to a transmitter.

Figure 26:
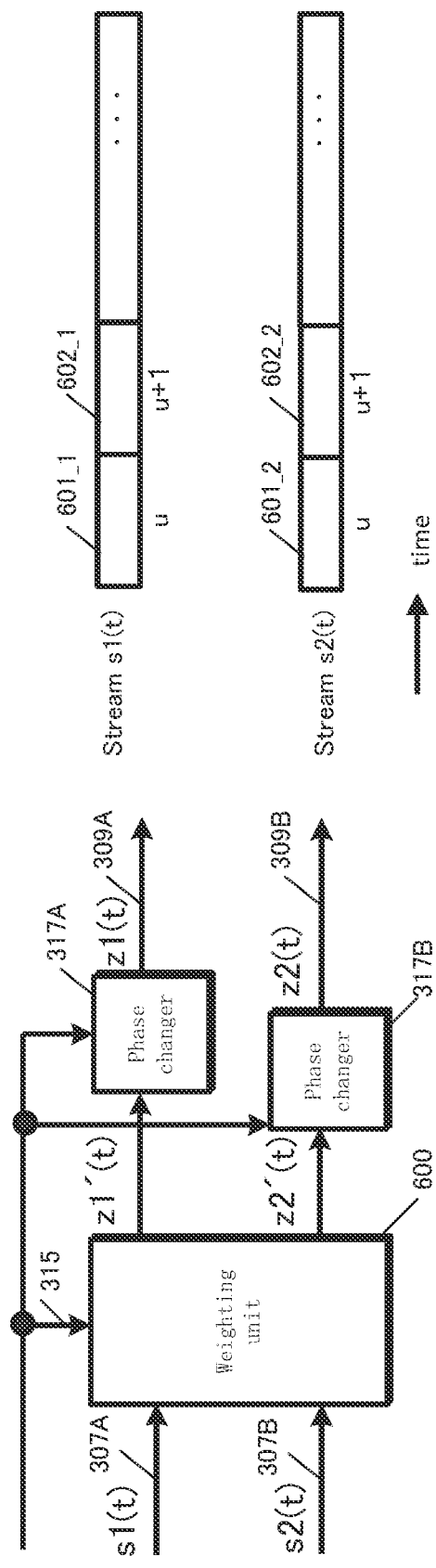
FIG. 26 illustrates another sample phase changing method.

However, the phase changing rate applied by the phase changers 317A and 317B varies simultaneously in order to perform the phase changing shown in FIG. 26. (The following describes a non-limiting example of the phase changing method.) For timestamp u, phase changer 317A from FIG. 26 performs the change of phase such that $z1(t)=y1(t)z1'(t)$, while phase changer 317B performs the change of phase such that $z2(t)=y2(t)z2'(t)$. For example, as shown in FIG. 26, for timestamp u, $y_1(u)=e^{j0}$ and $y_2(u)=e^{-j\pi/2}$, for timestamp u+1, $y_1(u+1)=e^{j\pi/4}$ and $y_2(u+1)=e^{-j3\pi/4}$, and for timestamp u+k, $y_1(u+k)=e^{jk\pi/4}$ and $y_2(u+k)=e^{j(k3\pi/4-\pi/2)}$. Here, the regular phase changing period (cycle) may be the same for both phase changers 317A and 317B, or may vary for each.

Figure 27:
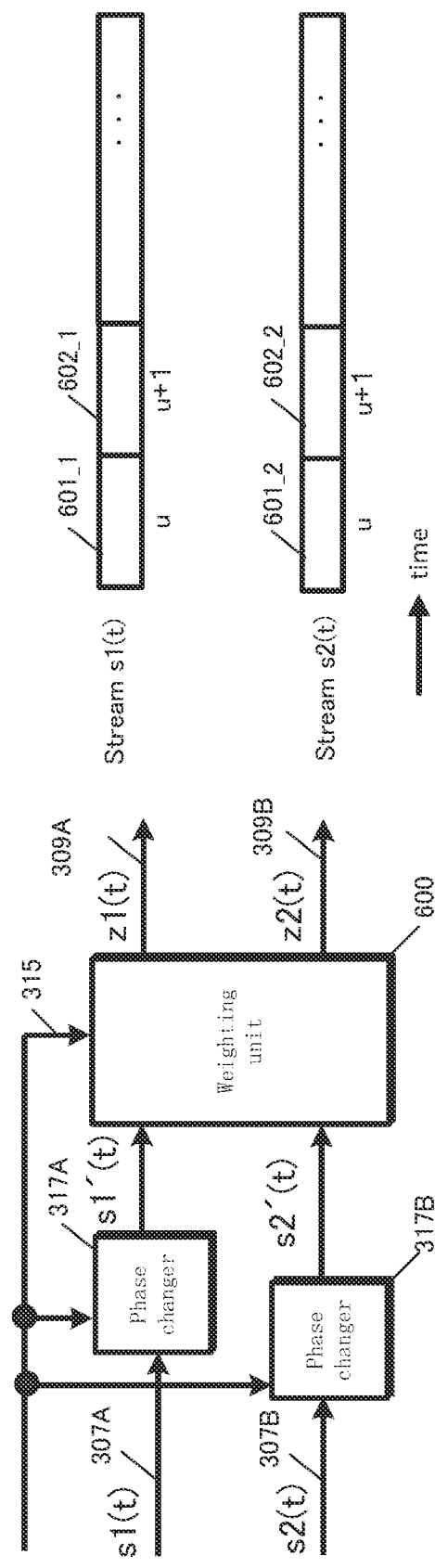
FIG. 27 illustrates another sample phase changing method.

Also, as described above, a change of phase may be performed before precoding is performed by the weighting unit. In such a case, the transmission device should be configured as illustrated in FIG. 27 rather than as illustrated in FIG. 26.

When a change of phase is carried out on both modulated signals, each of the transmit signals is, for example, control information that includes information about the phase changing pattern. By obtaining the control information, the reception device knows the phase changing method by which the transmission device regularly varies the change, i.e., the phase changing pattern, and is thus able to demodulate (decode) the signals correctly.

Figure 28:
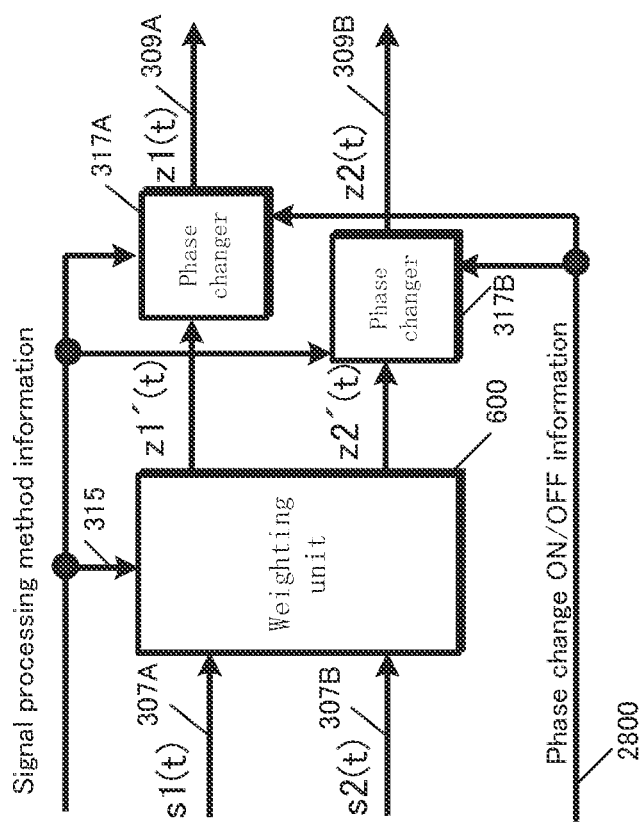
FIG. 28 illustrates another sample phase changing method.

Next, variants of the sample configurations shown in FIGS. 6 and 25 are described with reference to FIGS. 28 and 29. FIG. 28 differs from FIG. 6 in the inclusion of phase change ON/OFF information 2800 and in that the change of phase is performed on only one of $z1'(t)$ and $z2'(t)$ (i.e., performed on one of $z1'(t)$ and $z2'(t)$, which have identical timestamps or a common frequency). Accordingly, in order to perform the change of phase on one of $z1'(t)$ and $z2'(t)$, the phase changers 317A and 317B shown in FIG. 28 may each be ON, and performing the change of phase, or OFF, and not performing the change of phase. The phase change ON/OFF information 2800 is control information therefor. The phase change ON/OFF information 2800 is output by the signal processing method information generator 314 shown in FIG. 3.

Phase changer 317A of FIG. 28 changes the phase to produce $z1(t)=y_1(t)z1'(t)$, while phase changer 317B changes the phase to produce $z2(t)=y_2(t)z2'(t)$.

Here, a change of phase having a period (cycle) of four is, for example, applied to $z1'(t)$. (Meanwhile, the phase of $z2'(t)$ is not changed.) Accordingly, for timestamp u, $y_1(u)=e^{j0}$ and $y_2(u)=1$, for timestamp u+1, $y_1(u+1)=e^{j\pi/2}$ and $y_2(u+1)=1$, for timestamp u+2, $y_1(u+2)=e^{j\pi}$ and $y_2(u+2)=1$, and for timestamp u+3, $y_1(u+3)=e^{j3\pi/2}$ and $y_2(u+3)=1$.

Next, a change of phase having a period (cycle) of four is, for example, applied to $z2'(t)$. (Meanwhile, the phase of $z1'(t)$ is not changed.) Accordingly, for timestamp u+4, $y_1(u+4)=1$ and $y_2(u+4)=e^{j0}$, for timestamp u+5, $y_1(u+5)=1$ and $y_2(u+5)=e^{j\pi/2}$, for timestamp u+6, $y_1(u+6)=1$ and $y_2(u+6)=e^{j\pi}$, and for timestamp u+7, $y_1(u+7)=1$ and $y2(u+7)=e^{j3\pi/2}$.

Accordingly, given the above examples.
for any timestamp 8k, $y_1(8k)=e^{j0}$ and $y_2(8k)=1$,
for any timestamp 8k+1, $y_1(8k+1)=e^{j\pi/2}$ and $y_2(8k+1)=1$,
for any timestamp 8k+2, $y_1(8k+2)=e^{j\pi}$ and $y_2(8k+2)=1$,
for any timestamp 8k+3, $y_1(8k+3)=e^{j3\pi/2}$ and $y_2(8k+3)=1$,
for any timestamp 8k+4, $y_1(8k+4)=1$ and $y_2(8k+4)=e^{j0}$,
for any timestamp 8k+5, $y_1(8k+3)=1$ and $y_2(8k+5)=e^{j\pi/2}$,
for any timestamp 8k+6, $y_1(8k+6)=1$ and $y_2(8k+6)=e^{j\pi}$, and
for any timestamp 8k+7, $y_1(8k+7)=1$ and $y_2(8k+7)=e^{j3\pi/2}$.

As described above, there are two intervals, one where the change of phase is performed on z1'(t) only, and one where the change of phase is performed on z2'(t) only. Furthermore, the two intervals form a phase changing period (cycle). While the above explanation describes the interval where the change of phase is performed on z1'(t) only and the interval where the change of phase is performed on z2'(t) only as being equal, no limitation is intended in this manner. The two intervals may also differ. In addition, while the above explanation describes performing a change of phase having a period (cycle) of four on z1'(t) only and then performing a change of phase having a period (cycle) of four on z2'(t) only, no limitation is intended in this manner. The changes of phase may be performed on z1'(t) and on z2'(t) in any order (e.g., the change of phase may alternate between being performed on z1'(t) and on z2'(t), or may be performed in random order).

Figure 29:
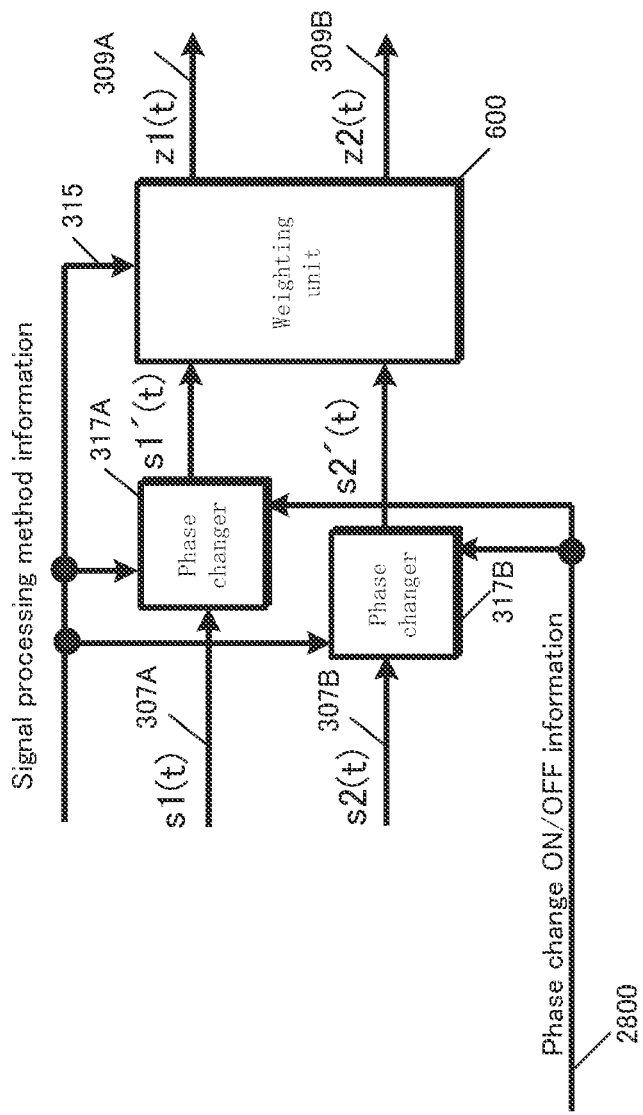
FIG. 29 illustrates another sample phase changing method.

Phase changer 317A of FIG. 29 changes the phase to produce s1'=$y_1(t)$s1(t), while phase changer 317B changes the phase to produce s2'(t)=$y_2(t)$s2(t).

Here, a change of phase having a period (cycle) of four is, for example, applied to s1(t). (Meanwhile, s2(t) remains unchanged). Accordingly, for timestamp u, $y_1(u)=e^{j0}$ and $y_2(u)=1$, for timestamp u+1, $y_1(u+1)=e^{j\pi/2}$ and $y_2(u+1)=1$, for timestamp u+2, $y_1(u+2)=e^{j\pi}$ and $y_2(u+2)=1$, and for timestamp u+3, $y_1(u+3)=e^{j3\pi/2}$ and $y_2(u+3)=1$.

Next, a change of phase having a period (cycle) of four is, for example, applied to s2(t). (Meanwhile, s1(t) remains unchanged). Accordingly, for timestamp u+4, $y_1(u+4)=1$ and $y_2(u+4)=e^{j0}$, for timestamp u+5, $y_1(u+5)=1$ and $y_2(u+5)=e^{j\pi/2}$, for timestamp u+6, $y_1(u+6)=1$ and $y_2(u+6)=e^{j\pi}$, and for timestamp u+7, $y_1(u+7)=1$ and $y_2(u+7)=e^{j3\pi/2}$.

Accordingly, given the above examples, for any timestamp 8k, $y_1(8k)=e^{j0}$ and $y_2(8k)=1$,
for any timestamp 8k+1, $y_1(8k+1)=e^{j\pi/2}$ and $y_2(8k+1)=1$,
for any timestamp 8k+2, $y_1(8k+2)=e^{j\pi}$ and $y_2(8k+2)=1$,
for any timestamp 8k+3, $y_1(8k+3)=e^{j3\pi/2}$ and $y_2(8k+3)=1$,
for any timestamp 8k+4, $y_1(8k+4)=1$ and $y_2(8k+4)=e^{j0}$,
for any timestamp 8k+5, $y_1(8k+5)=1$ and $y_2(8k+5)=e^{j\pi/2}$,
for any timestamp 8k+6, $y_1(8k+6)=1$ and $y_2(8k+6)=e^{j\pi}$, and
for any timestamp 8k+7, $y_1(8k+7)=1$ and $y_2(8k+7)=e^{j3\pi/2}$.

As described above, there are two intervals, one where the change of phase is performed on s1(t) only, and one where the change of phase is performed on s2(t) only. Furthermore, the two intervals form a phase changing period (cycle). Although the above explanation describes the interval where the change of phase is performed on s1(t) only and the interval where the change of phase is performed on s2(t) only as being equal, no limitation is intended in this manner. The two intervals may also differ. In addition, while the above explanation describes performing the change of phase having a period (cycle) of four on s1(t) only and then performing the change of phase having a period (cycle) of four on s2(t) only, no limitation is intended in this manner. The changes of phase may be performed on s1(t) and on s2(t) in any order (e.g., may alternate between being performed on s1(t) and on s2(t), or may be performed in random order).

Accordingly, the reception conditions under which the reception device receives each transmit signal z1(t) and z2(t) are equalized. By periodically switching the phase of the symbols in the received signals z1(t) and z2(t), the ability of the error corrected codes to correct errors may be improved, thus ameliorating received signal quality in the LOS environment.

Accordingly, Embodiment 2 as described above is able to produce the same results as the previously described Embodiment 1.

Although the present Embodiment used a single-carrier method, i.e., time domain phase changing, as an example, no limitation is intended in this regard. The same effects are also achievable using multi-carrier transmission. Accordingly, the present Embodiment may also be realized using, for example, spread-spectrum communications, OFDM, SC-FDMA (Single Carrier Frequency-Division Multiple Access), SC-OFDM, wavelet OFDM as described in Non-Patent Literature 7, and so on. As previously described, while the present Embodiment explains the change of phase as changing the phase with respect to the time domain t, the phase may alternatively be changed with respect to the frequency domain as described in Embodiment 1. That is, considering the phase changing method in the time domain t described in the present Embodiment and replacing t with f (f being the ((sub-) carrier) frequency) leads to a change of phase applicable to the frequency domain. Also, as explained above for Embodiment 1, the phase changing method of the present Embodiment is also applicable to a change of phase with respect to both the time domain and the frequency domain.

Accordingly, although FIGS. 6, 25, 26, and 27 illustrate changes of phase in the time domain, replacing time t with carrier f in each of FIGS. 6, 25, 26, and 27 corresponds to a change of phase in the frequency domain. In other words, replacing (t) with (t, f) where t is time and f is frequency corresponds to performing the change of phase on time-frequency blocks.

Furthermore, in the present Embodiment, symbols other than data symbols, such as pilot symbols (preamble, unique word, etc) or symbols transmitting control information, may be arranged within the frame in any manner.

Embodiment 3

Embodiments 1 and 2, described above, discuss regular changes of phase. Embodiment 3 describes a method of allowing the reception device to obtain good received signal quality for data, regardless of the reception device arrangement, by considering the location of the reception device with respect to the transmission device.

Embodiment 3 concerns the symbol arrangement within signals obtained through a change of phase.

Figure 31:
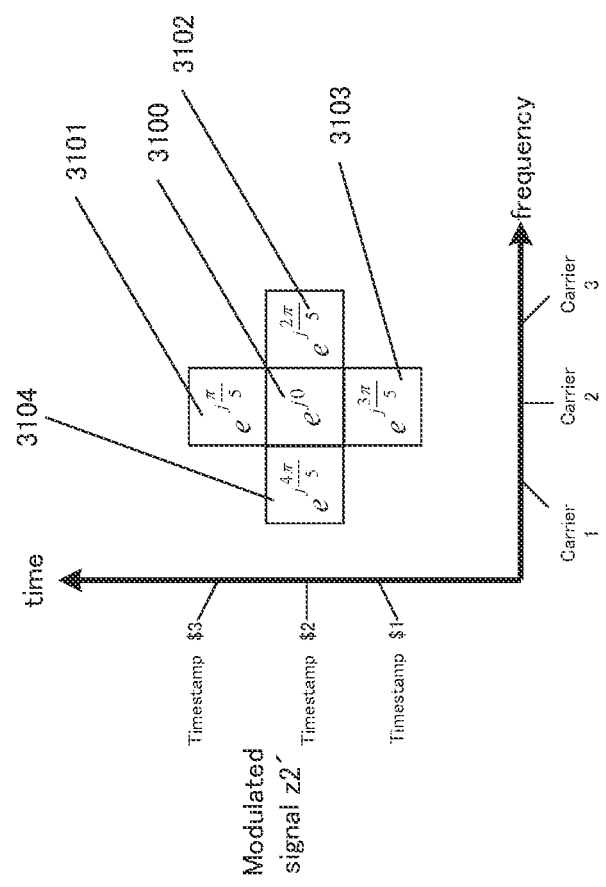
FIG. 31 illustrates a sample frame configuration for a modulated signal providing high received signal quality.

FIG. 31 illustrates an example of frame configuration for a portion of the symbols within a signal in the time-frequency domains, given a transmission method where a regular change of phase is performed for a multi-carrier method such as OFDM.

First, an example is explained in which the change of phase is performed one of two baseband signals, precoded as explained in Embodiment 1 (see FIG. 6).

(Although FIG. 6 illustrates a change of phase in the time domain, switching time t with carrier f in FIG. 6 corresponds to a change of phase in the frequency domain. In other words, replacing (t) with (t, f) where t is time and f is frequency corresponds to performing phase changes on time-frequency blocks.)

FIG. 31 illustrates the frame configuration of modulated signal z2', which is input to phase changer 317B from FIG. 12. Each square represents one symbol (although both signals s1 and s2 are included for precoding purposes, depending on the precoding matrix, only one of signals s1 and s2 may be used).

Consider symbol 3100 at carrier 2 and timestamp $2 of FIG. 31. The carrier here described may alternatively be termed a sub-carrier.

Within carrier 2, there is a very strong correlation between the channel conditions for symbol 3100A at carrier 2, timestamp $2 and the channel conditions for the time domain nearest-neighbour symbols to timestamp $2, i.e., symbol 3013 at timestamp $1 and symbol 3101 at timestamp $3 within carrier 2.

Similarly, for timestamp $2, there is a very strong correlation between the channel conditions for symbol 3100 at carrier 2, timestamp $2 and the channel conditions for the frequency-domain nearest-neighbour symbols to carrier 2, i.e., symbol 3104 at carrier 1, timestamp $2 and symbol 3104 at timestamp $2, carrier 3.

As described above, there is a very strong correlation between the channel conditions for symbol 3100 and the channel conditions for each symbol 3101, 3102, 3103, and 3104.

The present description considers N different phases (N being an integer, N≥2) for multiplication in a transmission method where the phase is regularly changed. The symbols illustrated in FIG. 31 are indicated as $e^{j0}$, for example. This signifies that this symbol is signal z2' from FIG. 6 having undergone a change in phase through multiplication by $e^{j0}$. That is, the values indicated in FIG. 31 for each of the symbols are the values of y(t) from Math. 42 (formula 42), which are also the values of $z2(t)=y2(t)z2'(t)$ described in Embodiment 2.

The present Embodiment takes advantage of the high correlation in channel conditions existing between neighbouring symbols in the frequency domain and/or neighbouring symbols in the time domain in a symbol arrangement enabling high data reception quality to be obtained by the reception device receiving the phase-changed symbols.

In order to achieve this high data reception quality, conditions #1 and #2 are necessary.
(Condition #1)

As shown in FIG. 6, for a transmission method involving a regular change of phase performed on precoded baseband signal z2' using multi-carrier transmission such as OFDM, time X, carrier Y is a symbol for transmitting data (hereinafter, data symbol), neighbouring symbols in the time domain, i.e., at time X−1, carrier Y and at time X+1, carrier Y are also data symbols, and a different change of phase should be performed on precoded baseband signal z2' corresponding to each of these three data symbols, i.e., on precoded baseband signal z2' at time X, carrier Y, at time X−1, carrier Y and at time X+1, carrier Y.
(Condition #2)

As shown in FIG. 6, for a transmission method involving a regular change of phase performed on precoded baseband signal z2' using multi-carrier transmission such as OFDM, time X, carrier Y is a data symbol, neighbouring symbols in the frequency domain, i.e., at time X, carrier Y−1 and at time X, carrier Y+1 are also data symbols, and a different change of phase should be performed on precoded baseband signal z2' corresponding to each of these three data symbols, i.e., on precoded baseband signal z2' at time X, carrier Y, at time X, carrier Y−1 and at time X, carrier Y+1.

Ideally, data symbols satisfying Condition #1 should be present. Similarly, data symbols satisfying Condition #2 should be present.

The reasons supporting Conditions #1 and #2 are as follows.

A very strong correlation exists between the channel conditions of given symbol of a transmit signal (hereinafter, symbol A) and the channel conditions of the symbols neighbouring symbol A in the time domain, as described above.

Accordingly, when three neighbouring symbols in the time domain each have different phases, then despite reception quality degradation in the LOS environment (poor signal quality caused by degradation in conditions due to phase relations despite high signal quality in terms of SNR) for symbol A, the two remaining symbols neighbouring symbol A are highly likely to provide good reception quality. As a result, good received signal quality is achievable after error correction and decoding.

Similarly, a very strong correlation exists between the channel conditions of given symbol of a transmit signal (hereinafter, symbol A) and the channel conditions of the symbols neighbouring symbol A in the frequency domain, as described above.

Accordingly, when three neighbouring symbols in the frequency domain each have different phases, then despite reception quality degradation in the LOS environment (poor signal quality caused by degradation in conditions due to direct wave phase relationships despite high signal quality in terms of SNR) for symbol A, the two remaining symbols neighbouring symbol A are highly likely to provide good reception quality. As a result, good received signal quality is achievable after error correction and decoding.

Combining Conditions #1 and #2, ever greater data reception quality is likely achievable for the reception device. Accordingly, the following Condition #3 can be derived.
(Condition #3)

As shown in FIG. 6, for a transmission method involving a regular change of phase performed on precoded baseband signal z2' using multi-carrier transmission such as OFDM, time X, carrier Y is a data symbol, neighbouring symbols in the time domain, i.e., at time X−1, carrier Y and at time X+1, carrier Y are also data symbols, and neighbouring symbols in the frequency domain, i.e., at time X, carrier Y−1 and at time X, carrier Y+1 are also data symbols, and a different change in phase is performed on precoded baseband signal z2' corresponding to each of these five data symbols, i.e., on precoded baseband signal z2' at time X, carrier Y, at time X, carrier Y−1, at time X, carrier Y+1, at a time X−1, carrier Y, and at time X+1, carrier Y.

Here, the different changes in phase are as follows. Phase changes are defined from 0 radians to $2\pi$ radians. For example, for time X, carrier Y, a phase change of $e^{j\theta_{X,Y}}$ is applied to precoded baseband signal z2' from FIG. 6, for time X−1, carrier Y, a phase change of $e^{j\theta_{X-1,Y}}$ is applied to precoded baseband signal z2' from FIG. 6, for time X+1, carrier Y, a phase change of $e^{j\theta_{X+1,Y}}$ is applied to precoded baseband signal z2' from FIG. 6, such that $0 \leq \theta_{X,Y} < 2\pi$, $0 \leq \theta_{X-1,Y} < 2\pi$, and $0 \leq \theta_{X+1,Y} < 2\pi$, all units being in radians. Accordingly, for Condition #1, it follows that $\theta_{X,Y} \neq \theta_{X-1,Y}$, $\theta_{X,Y} \neq \theta_{X+1,Y}$, and that $\theta_{X-1,Y} \neq \theta_{X+1,Y}$. Similarly, for Condition #2, it follows that $\theta_{X,Y} \neq \theta_{X,Y-1}$, $\theta_{X,Y} \neq \theta_{X,Y+1}$, and that $\theta_{X,Y-1} \neq \theta_{X,Y+1}$. And, for Condition #3, it follows that $\theta_{X,Y} \neq \theta_{X-1,Y}$, $\theta_{X,Y} \neq \theta_{X+1,Y}$, $\theta_{X,Y} \neq \theta_{X,Y-1}$, $\theta_{X,Y} \neq \theta_{X,Y-1}$, $\theta_{X-1,Y} \neq \theta_{X+1,Y}$, $\theta_{X-1,Y} \neq \theta_{X,Y-1}$, $\theta_{X-1,Y} \neq \theta_{X+1,Y}$, $\theta_{X+1,Y} \neq \theta_{X-1,Y}$, $\theta_{X+1,Y} \neq \theta_{X,Y+1}$, and that $\theta_{X,Y-1} \neq \theta_{X,Y+1}$.

Ideally, data symbols satisfying Condition #3 should be present.

FIG. 31 illustrates an example of Condition #3 where symbol A corresponds to symbol 3100. The symbols are arranged such that the phase by which precoded baseband signal z2' from FIG. 6 is multiplied differs for symbol 3100, for both neighbouring symbols thereof in the time domain 3101 and 3102, and for both neighbouring symbols thereof in the frequency domain 3102 and 3104. Accordingly, despite received signal quality degradation of symbol 3100 for the receiver, good signal quality is highly likely for the neighbouring signals, thus guaranteeing good signal quality after error correction.

Figure 32:
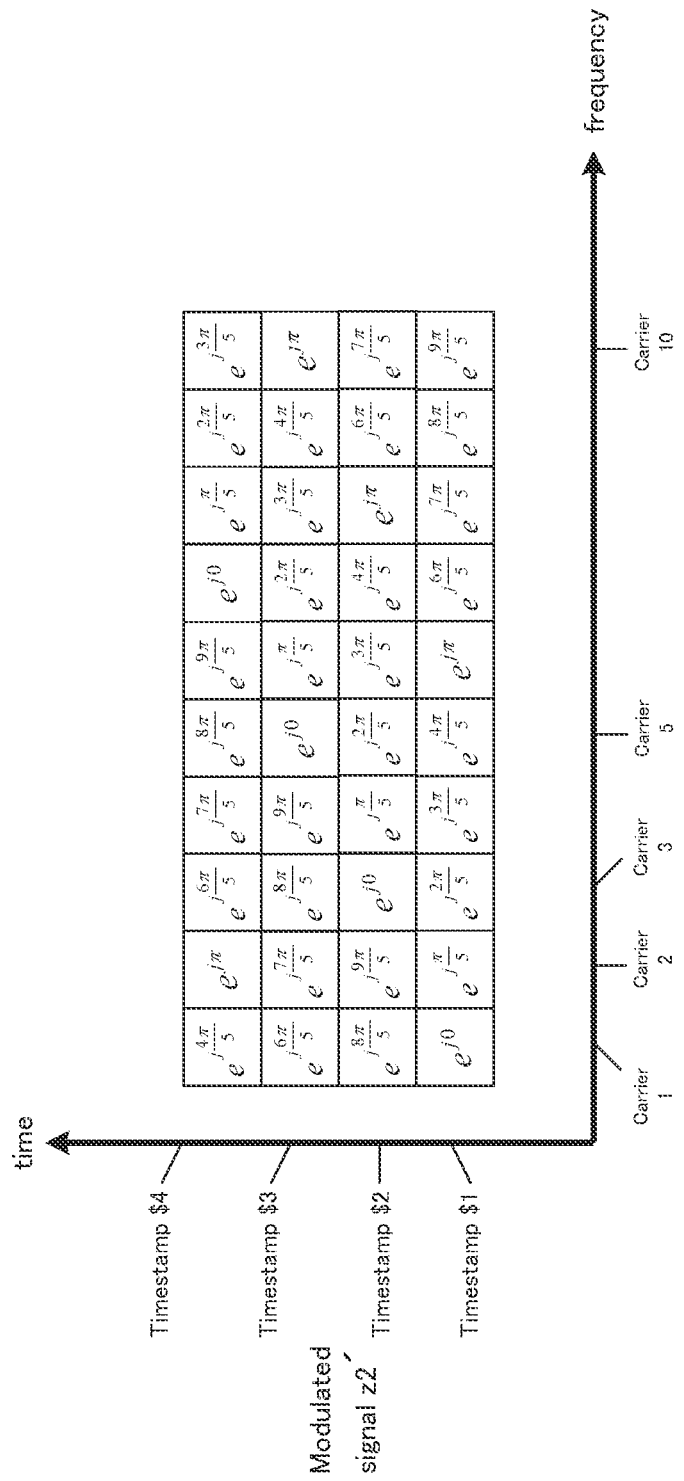
FIG. 32 illustrates a sample symbol arrangement for a modulated signal providing high received signal quality.

FIG. 32 illustrates a symbol arrangement obtained through phase changes under these conditions.

As evident from FIG. 32, with respect to any data symbol, a different change in phase is applied to each neighbouring symbol in the time domain and in the frequency domain. As such, the ability of the reception device to correct errors may be improved.

In other words, in FIG. 32, when all neighbouring symbols in the time domain are data symbols, Condition #1 is satisfied for all Xs and all Ys.

Similarly, in FIG. 32, when all neighbouring symbols in the frequency domain are data symbols, Condition #2 is satisfied for all Xs and all Ys.

Similarly, in FIG. 32, when all neighbouring symbols in the frequency domain are data symbols and all neighbouring symbols in the time domain are data symbols, Condition #3 is satisfied for all Xs and all Ys.

The following describes an example in which a change of phase is performed on two precoded baseband signals, as explained in Embodiment 2 (see FIG. 26).

When a change of phase is performed on precoded baseband signal z1' and precoded baseband signal z2' as shown in FIG. 26, several phase changing methods are possible. The details thereof are explained below.

Figure 33:
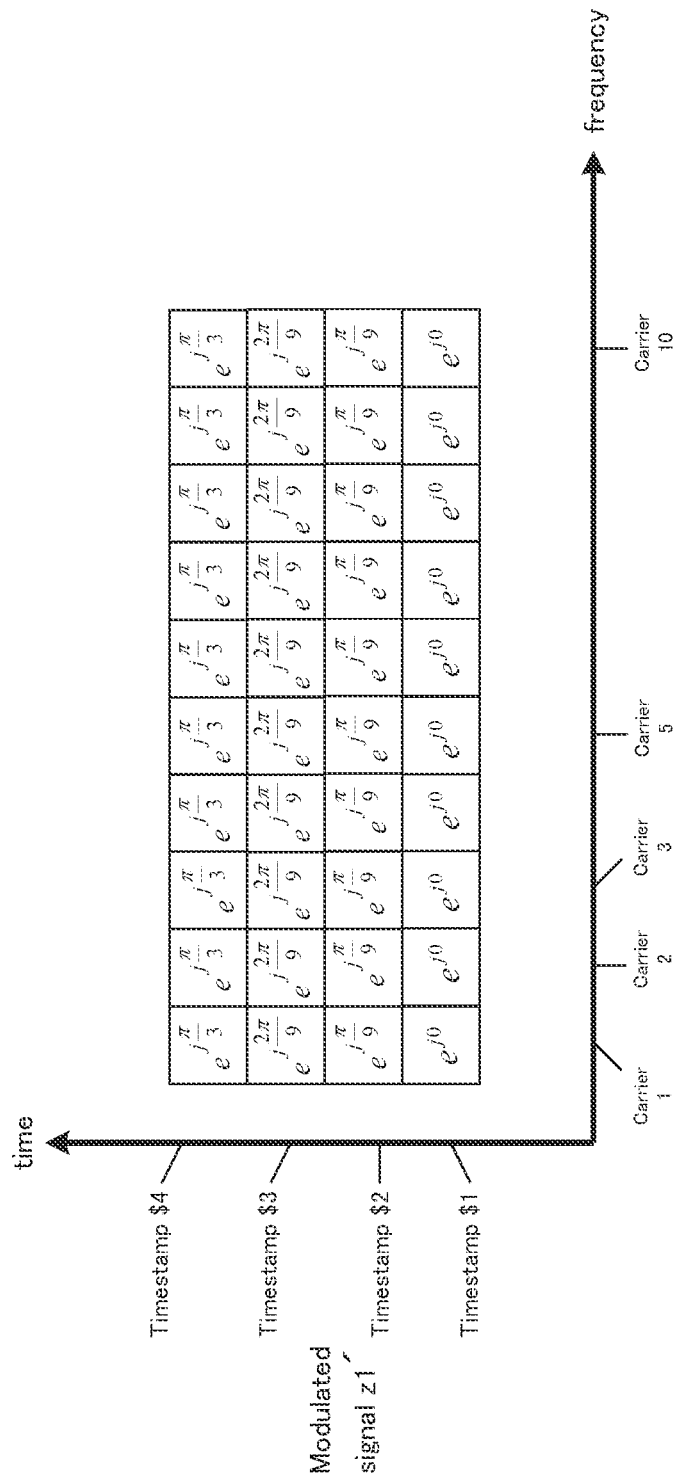
FIG. 33 illustrates a sample symbol arrangement for a modulated signal providing high received signal quality.

Scheme 1 involves a change in phase of precoded baseband signal z2' as described above, to achieve the change in phase illustrated by FIG. 32. In FIG. 32, a change of phase having a period (cycle) of ten is applied to precoded baseband signal z2'. However, as described above, in order to satisfy Conditions #1, #2, and #3, the change in phase applied to precoded baseband signal z2' at each (sub-)carrier varies over time. (Although such changes are applied in FIG. 32 with a period (cycle) of ten, other phase changing methods are also possible.) Then, as shown in FIG. 33, the change in phase performed on precoded baseband signal z1' produces a constant value that is one-tenth of that of the change in phase performed on precoded baseband signal z2'. In FIG. 33, for a period (cycle) (of change in phase performed on precoded baseband signal z2') including timestamp $1, the value of the change in phase performed on precoded baseband signal z1' is $e^{j0}$. Then, for the next period (cycle) (of change in phase performed on precoded baseband signal z2') including timestamp $2, the value of the change in phase performed on precoded baseband signal z1' is $e^{j\pi/9}$, and so on.

The symbols illustrated in FIG. 33 are indicated as $e^{j0}$, for example. This signifies that this symbol is signal z1' from FIG. 26 to which a change in phase has been applied through multiplication by $e^{j0}$. That is, the values indicated in FIG. 33 for each of the symbols are the values of $z1(t)=y_1(t)z1'(t)$ described in Embodiment 2 for $y_1(t)$.

As shown in FIG. 33, the change in phase performed on precoded baseband signal z1' produces a constant value that is one-tenth that of the change in phase performed on precoded baseband signal z2' such that the post-phase change value varies with the number of each period (cycle). (As described above, in FIG. 33, the value is $e^{j0}$ for the first period (cycle), $e^{j\pi/9}$ for the second period (cycle), and so on.)

As described above, the change in phase performed on precoded baseband signal z2' has a period (cycle) of ten, but the period (cycle) can be effectively made greater than ten by taking the change in phase applied to precoded baseband signal z1' and to precoded baseband signal z2' into consideration. Accordingly, data reception quality may be improved for the reception device.

Scheme 2 involves a change in phase of precoded baseband signal z2' as described above, to achieve the change in phase illustrated by FIG. 32. In FIG. 32, a change of phase having a period (cycle) of ten is applied to precoded baseband signal z2'. However, as described above, in order to satisfy Conditions #1, #2, and #3, the change in phase applied to precoded baseband signal z2' at each (sub-)carrier varies over time. (Although such changes are applied in FIG. 32 with a period (cycle) of ten, other phase changing methods are also possible.) Then, as shown in FIG. 30, the change in phase performed on precoded baseband signal z1' differs from that performed on precoded baseband signal z2' in having a period (cycle) of three rather than ten.

Figure 30:
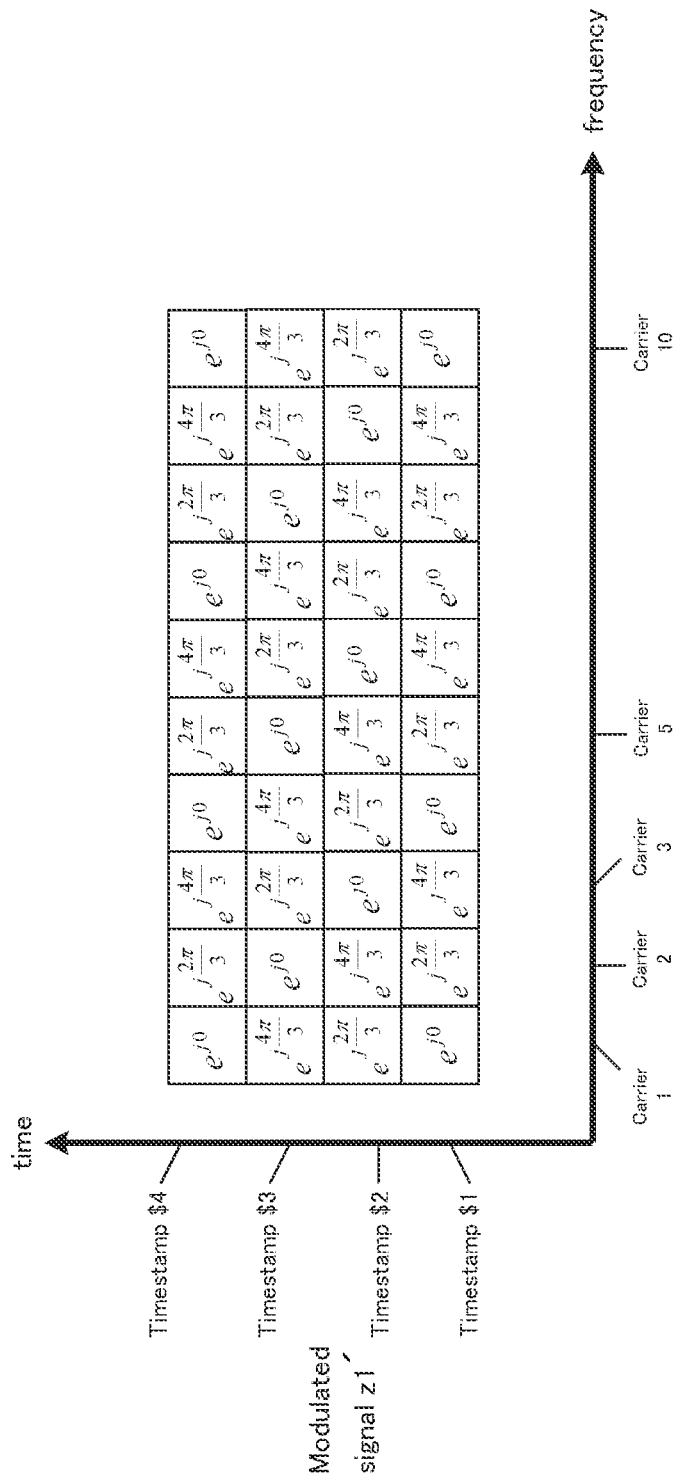
FIG. 30 illustrates a sample symbol arrangement for a modulated signal providing high received signal quality.

The symbols illustrated in FIG. 30 are indicated as $e^{j0}$, for example. This signifies that this symbol is signal z1' from FIG. 26 to which a change in phase has been applied through multiplication by $e^{j0}$. That is, the values indicated in FIG. 30 for each of the symbols are the values of $z1(t)=y_1(t)z1'(t)$ described in Embodiment 2 for $y_1(t)$.

As described above, the change in phase performed on precoded baseband signal z2' has a period (cycle) of ten, but by taking the changes in phase applied to precoded baseband signal z1' and precoded baseband signal z2' into consideration, the period (cycle) can be effectively made equivalent to 30 for both precoded baseband signals z1' and z2'. Accordingly, data reception quality may be improved for the reception device. An effective way of applying method 2 is to perform a change in phase on precoded baseband signal z1' with a period (cycle) of N and perform a change in phase on precoded baseband signal z2' with a period (cycle) of M such that N and M are coprime. As such, by taking both precoded baseband signals z1' and z2' into consideration, a period (cycle) of N×M is easily achievable, effectively making the period (cycle) greater when N and M are coprime.

The above describes an example of the phase changing method pertaining to Embodiment 3. The present invention is not limited in this manner. As explained for Embodiments 1 and 2, a change in phase may be performed with respect the frequency domain or the time domain, or on time-frequency blocks. Similar improvement to the data reception quality can be obtained for the reception device in all cases.

The same also applies to frames having a configuration other than that described above, where pilot symbols (SP symbols) and symbols transmitting control information are inserted among the data symbols. The details of the change in phase in such circumstances are as follows.

Figure 47:
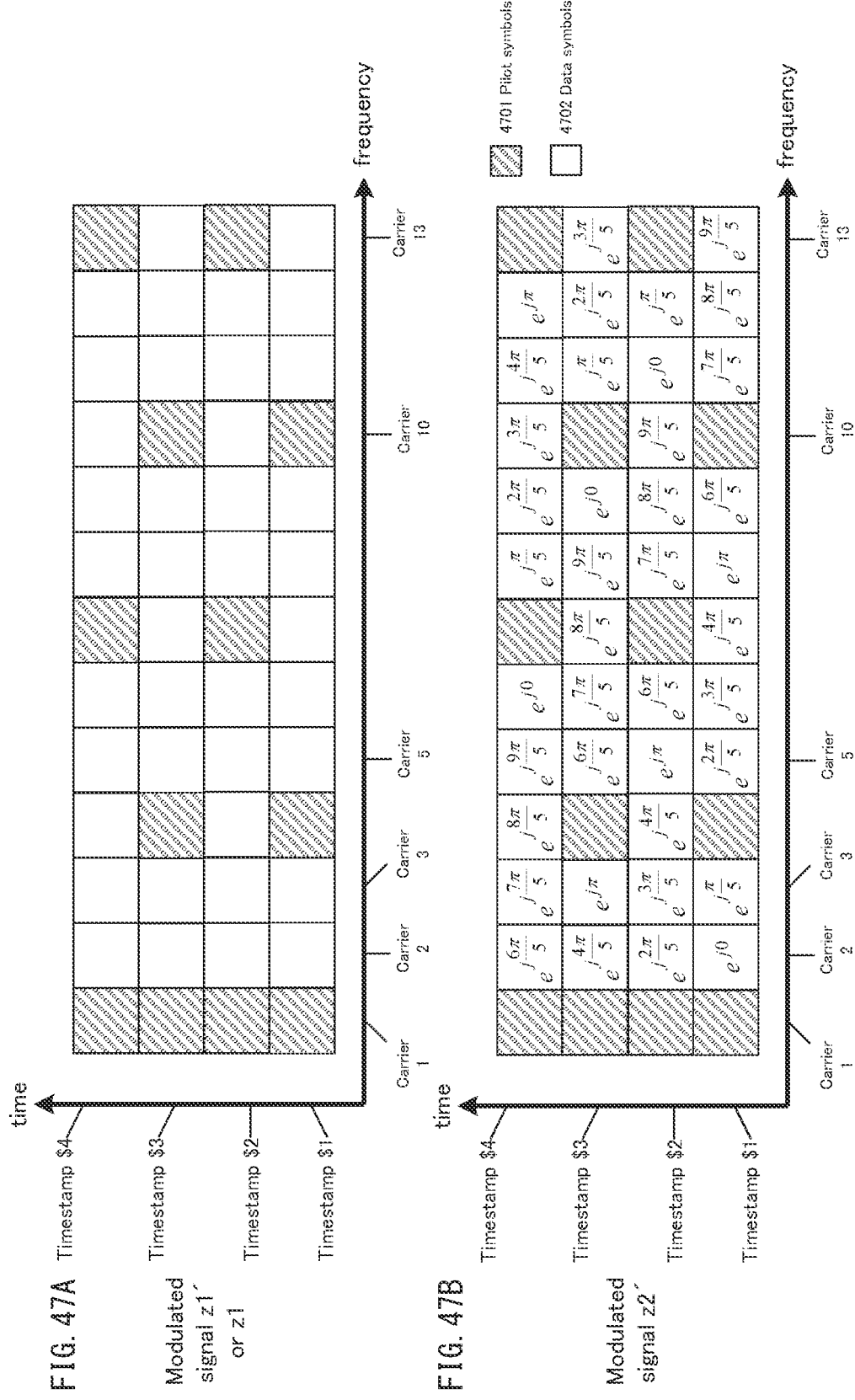
FIGS. 47A and 47B illustrate sample symbol arrangements for a modulated signal providing high received signal quality.

FIGS. 47A and 47B illustrate the frame configuration of modulated signals (precoded baseband signals) z1 or z1' and z2' in the time-frequency domain. FIG. 47A illustrates the frame configuration of modulated signal (precoded baseband signal) z1 or z1' while FIG. 47B illustrates the frame configuration of modulated signal (precoded baseband signal) z2'. In FIGS. 47A and 47B, 4701 marks pilot symbols while 4702 marks data symbols. The data symbols 4702 are symbols on which precoding or precoding and a change in phase have been performed.

FIGS. 47A and 47B, like FIG. 6, indicate the arrangement of symbols when a change in phase is applied to precoded baseband signal z2' (while no change of phase is performed on precoded baseband signal z1). (Although FIG. 6 illustrates a change in phase with respect to the time domain, switching time t with carrier f in FIG. 6 corresponds to a change in phase with respect to the frequency domain. In other words, replacing (*t*) with (t, f) where t is time and f is frequency corresponds to performing a change of phase on time-frequency blocks.) Accordingly, the numerical values indicated in FIGS. 47A and 47B for each of the symbols are the values of precoded baseband signal z2' after a change of phase is performed. No values are given for the symbols of precoded baseband signal z1' (z1) as no change of phase is performed thereon.

The key point of FIGS. 47A and 47B is that a change of phase is performed on the data symbols of precoded baseband signal z2', i.e., on precoded symbols. (The symbols under discussion, being precoded, actually include both symbols s1 and s2.) Accordingly, no change in phase is performed on the pilot symbols inserted in z2'.

Figure 48:
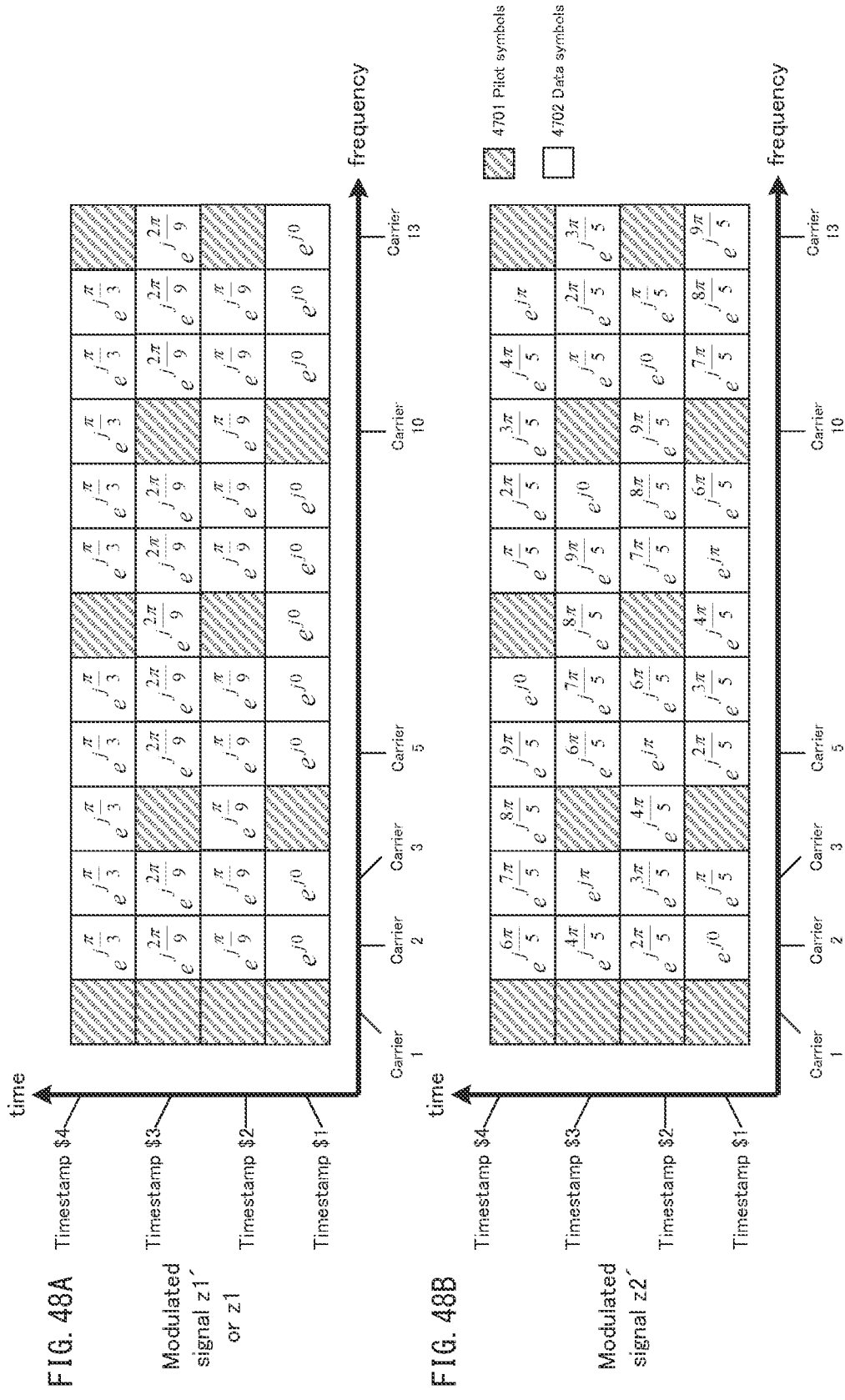
FIGS. 48A and 48B illustrate sample symbol arrangements for a modulated signal providing high received signal quality.

FIGS. 48A and 48B illustrate the frame configuration of modulated signals (precoded baseband signals) z1 or z1' and z2' in the time-frequency domain. FIG. 48A illustrates the frame configuration of modulated signal (precoded baseband signal) z1 or z1' while FIG. 48B illustrates the frame configuration of modulated signal (precoded baseband signal) z2'. In FIGS. 48A and 48B, 4701 marks pilot symbols while 4702 marks data symbols. The data symbols 4702 are symbols on which precoding or precoding and a change in phase have been performed.

FIGS. 48A and 48B, like FIG. 26, indicate the arrangement of symbols when a change of phase is applied to precoded baseband signal z1' and to precoded baseband signal z2'. (Although FIG. 26 illustrates a change in phase with respect to the time domain, switching time t with carrier f in FIG. 26 corresponds to a change in phase with respect to the frequency domain. In other words, replacing (*t*) with (t, f) where t is time and f is frequency corresponds to performing a change of phase on time-frequency blocks.) Accordingly, the numerical values indicated in FIGS. 48A and 48B for each of the symbols are the values of precoded baseband signal z1' and z2' after a change of phase.

The key point of FIGS. 48A and 48B is that a change of phase is performed on the data symbols of precoded baseband signal z1', that is, on the precoded symbols thereof, and on the data symbols of precoded baseband signal z2', that is, on the precoded symbols thereof. (The symbols under discussion, being precoded, actually include both symbols s1 and s2.) Accordingly, no change in phase is performed on the pilot symbols inserted in z1', nor on the pilot symbols inserted in z2'.

Figure 49:
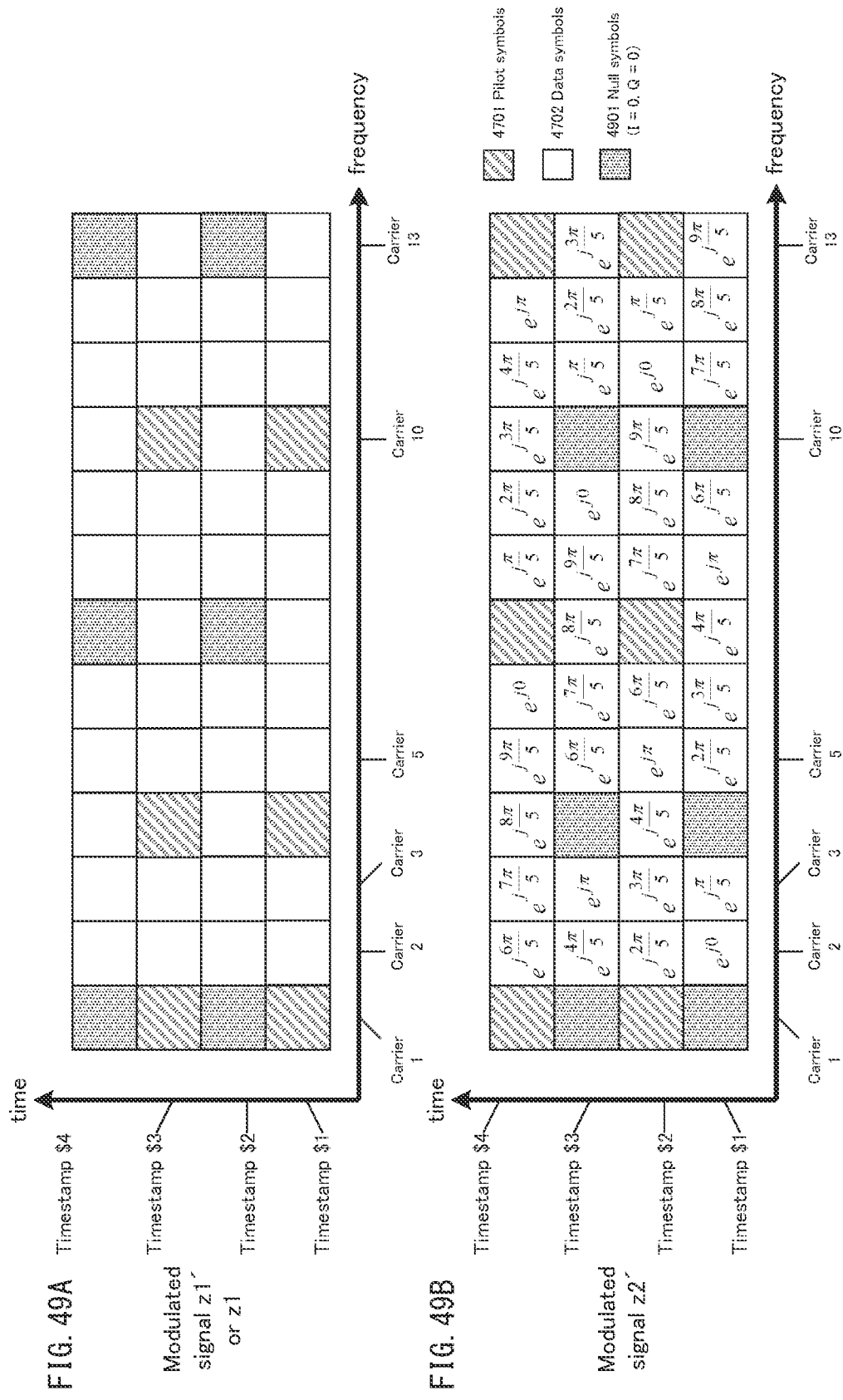
FIGS. 49A and 49B illustrate sample symbol arrangements for a modulated signal providing high received signal quality.

FIGS. 49A and 49B illustrate the frame configuration of modulated signals (precoded baseband signals) z1 or z1' and z2' in the time-frequency domain. FIG. 49A illustrates the frame configuration of modulated signal (precoded baseband signal) z1 or z1' while FIG. 49B illustrates the frame configuration of modulated signal (precoded baseband signal) z2'. In FIGS. 49A and 49B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 49A and 49B differ from FIGS. 47A and 47B in the configuration method for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 49A and 49B, like FIG. 6, indicate the arrangement of symbols when a change in phase is applied to precoded baseband signal z2' (while no change of phase is performed on precoded baseband signal z1). (Although FIG. 6 illustrates a change in phase with respect to the time domain, switching time t with carrier f in FIG. 6 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 49A and 49B for each of the symbols are the values of precoded baseband signal z2' after a change of phase is performed. No values are given for the symbols of precoded baseband signal z1' (z1) as no change of phase is performed thereon.

The key point of FIGS. 49A and 49B is that a change of phase is performed on the data symbols of precoded baseband signal z2', i.e., on precoded symbols. (The symbols under discussion, being precoded, actually include both symbols s1 and s2.) Accordingly, no change in phase is performed on the pilot symbols inserted in z2'.

Figure 50:
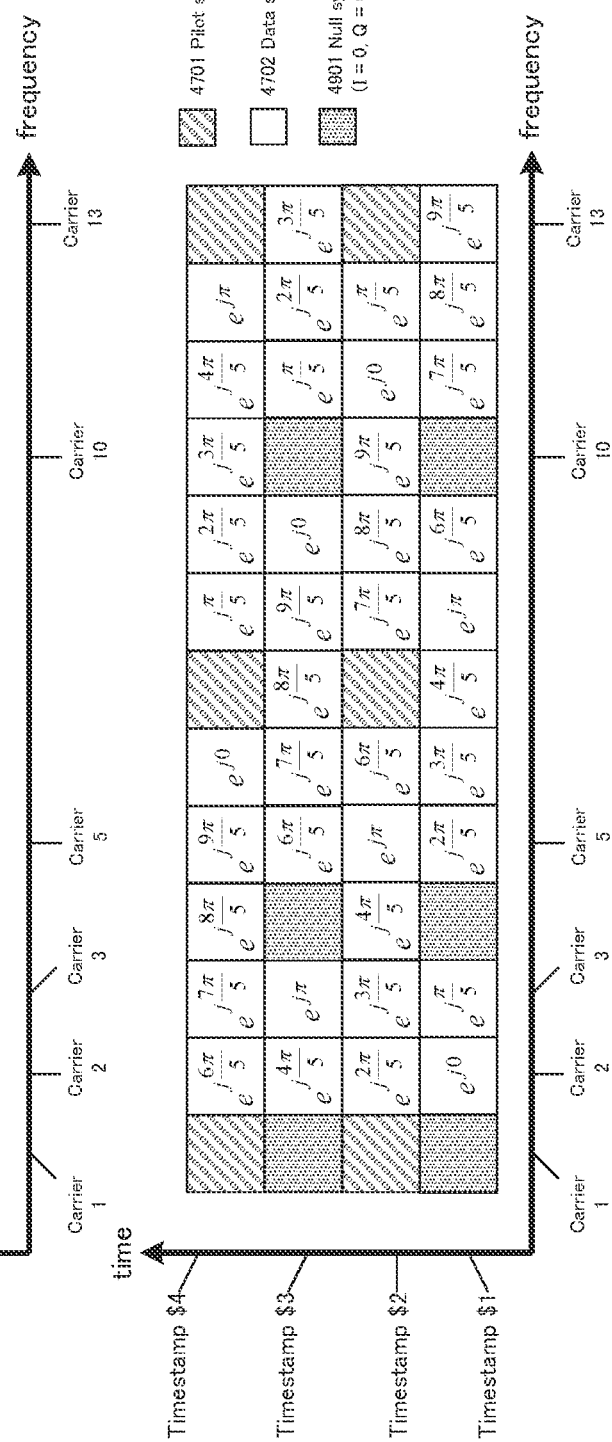
FIGS. 50A and 50B illustrate sample symbol arrangements for a modulated signal providing high received signal quality.

FIGS. 50A and 50B illustrate the frame configuration of modulated signals (precoded baseband signals) z1 or z1' and z2' in the time-frequency domain. FIG. 50A illustrates the frame configuration of modulated signal (precoded baseband signal) z1 or z1' while FIG. 50B illustrates the frame configuration of modulated signal (precoded baseband signal) z2'. In FIGS. 50A and 50B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 50A and 50B differ from FIGS. 48A and 48B in the configuration method for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 50A and 50B, like FIG. 26, indicate the arrangement of symbols when a change of phase is applied to precoded baseband signal z1' and to precoded baseband signal z2'. (Although FIG. 26 illustrates a change in phase with respect to the time domain, switching time t with carrier f in FIG. 26 corresponds to a change in phase with respect to the frequency domain. In other words, replacing (*t*) with (t, f) where t is time and f is frequency corresponds to performing a change of phase on time-frequency blocks.) Accordingly, the numerical values indicated in FIGS. 50A and 50B for each of the symbols are the values of precoded baseband signal z1' and z2' after the change in phase.

The key point of FIGS. 50A and 50B is that a change of phase is performed on the data symbols of precoded baseband signal z1', that is, on the precoded symbols thereof, and on the data symbols of precoded baseband signal z2', that is, on the precoded symbols thereof. (The symbols under discussion, being precoded, actually include both symbols s1 and s2.) Accordingly, no change in phase is performed on the pilot symbols inserted in z1', nor on the pilot symbols inserted in z2'.

Figure 51:
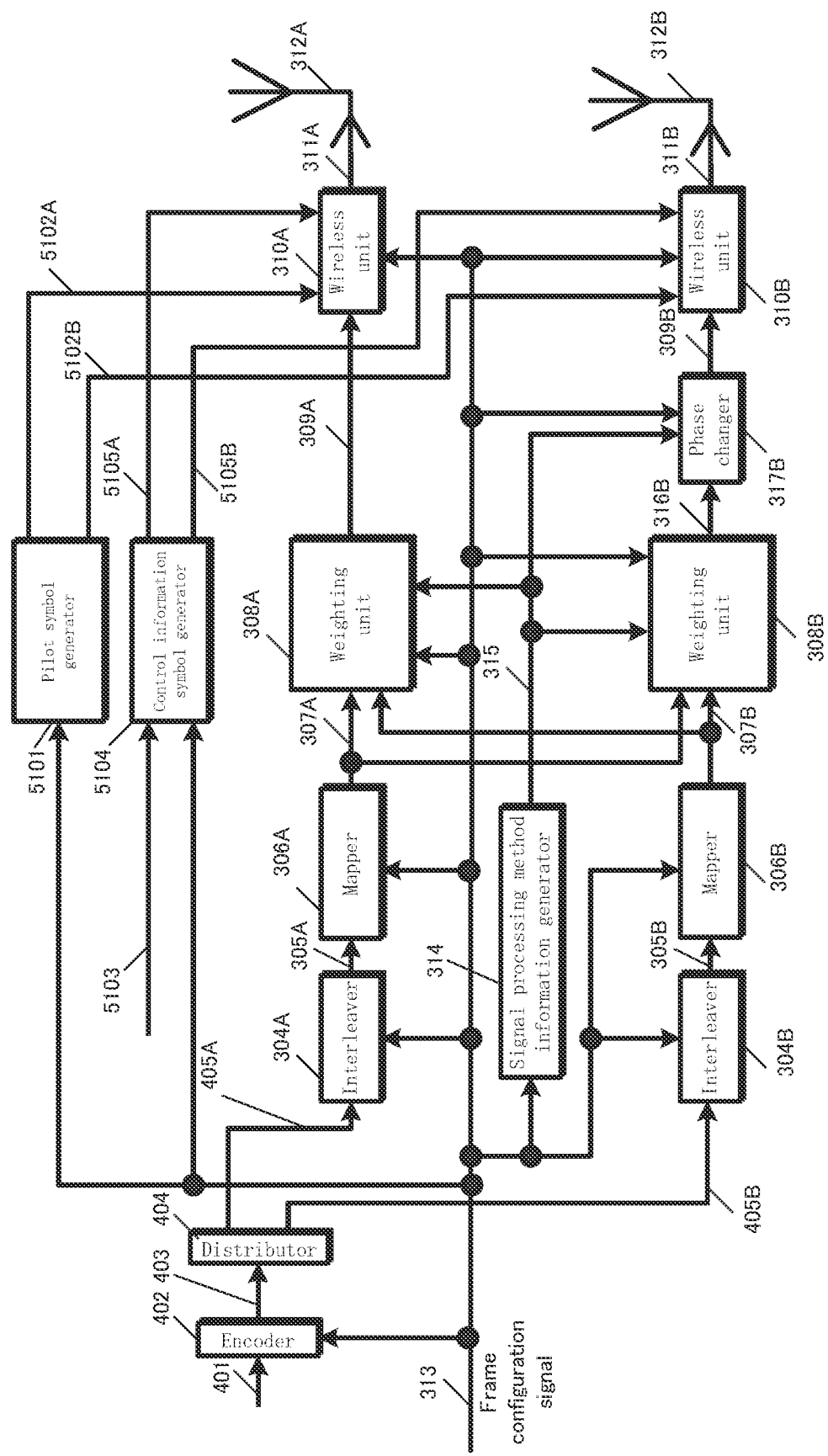
FIG. 51 illustrates a sample configuration of a transmission device.

FIG. 51 illustrates a sample configuration of a transmission device generating and transmitting modulated signal having the frame configuration of FIGS. 47A, 47B, 49A, and 49B. Components thereof performing the same operations as those of FIG. 4 use the same reference symbols thereas.

In FIG. 51, the weighting units 308A and 308B and phase changer 317B only operate at times indicated by the frame configuration signal 313 as corresponding to data symbols.

In FIG. 51, a pilot symbol generator 5101 (that also generates null symbols) outputs baseband signals 5102A and 5102B for a pilot symbol whenever the frame configuration signal 313 indicates a pilot symbol (and a null symbol).

Although not indicated in the frame configurations from FIGS. 47A through 50B, when precoding (or phase rotation) is not performed, such as when transmitting a modulated signal using only one antenna (such that the other antenna transmits no signal) or when using a space-time coding transmission method (particularly, space-time block coding) to transmit control information symbols, then the frame configuration signal 313 takes control information symbols 5104 and control information 5103 as input. When the frame configuration signal 313 indicates a control information symbol, baseband signals 5102A and 5102B thereof are output.

Wireless units 310A and 310B of FIG. 51 take a plurality of baseband signals as input and select a desired baseband signal according to the frame configuration signal 313. The wireless units 310A and 310B then apply OFDM signal processing and output modulated signals 311A and 311B conforming to the frame configuration.

Figure 52:
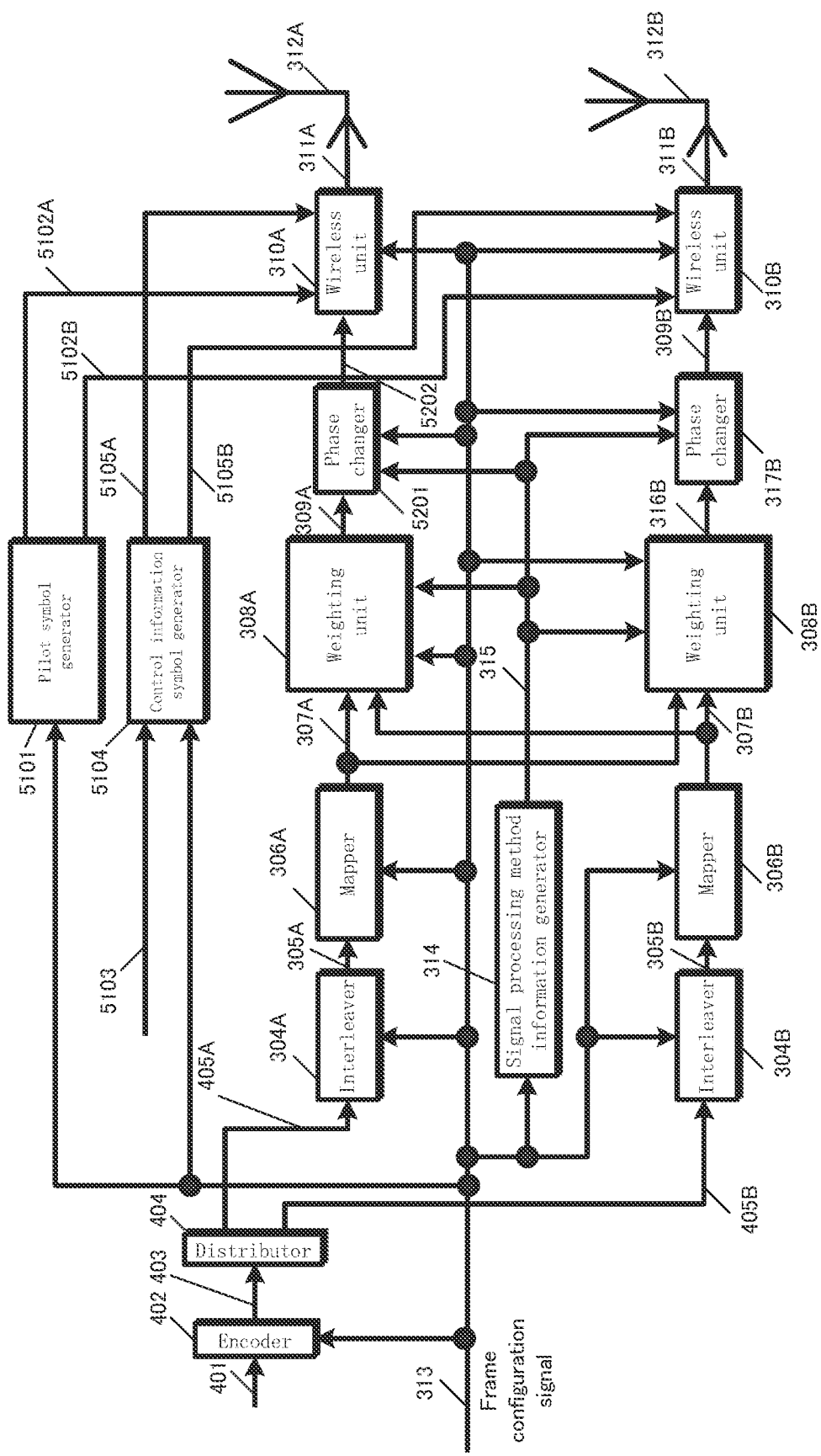
FIG. 52 illustrates another sample configuration of a transmission device.

FIG. 52 illustrates a sample configuration of a transmission device generating and transmitting modulated signal having the frame configuration of FIGS. 48A, 48B, 50A, and 50B. Components thereof performing the same operations as those of FIGS. 4 and 51 use the same reference symbols thereas. FIG. 51 features an additional phase changer 317A that only operates when the frame configuration signal 313 indicates a data symbol. At all other times, the operations are identical to those explained for FIG. 51.

Figure 53:
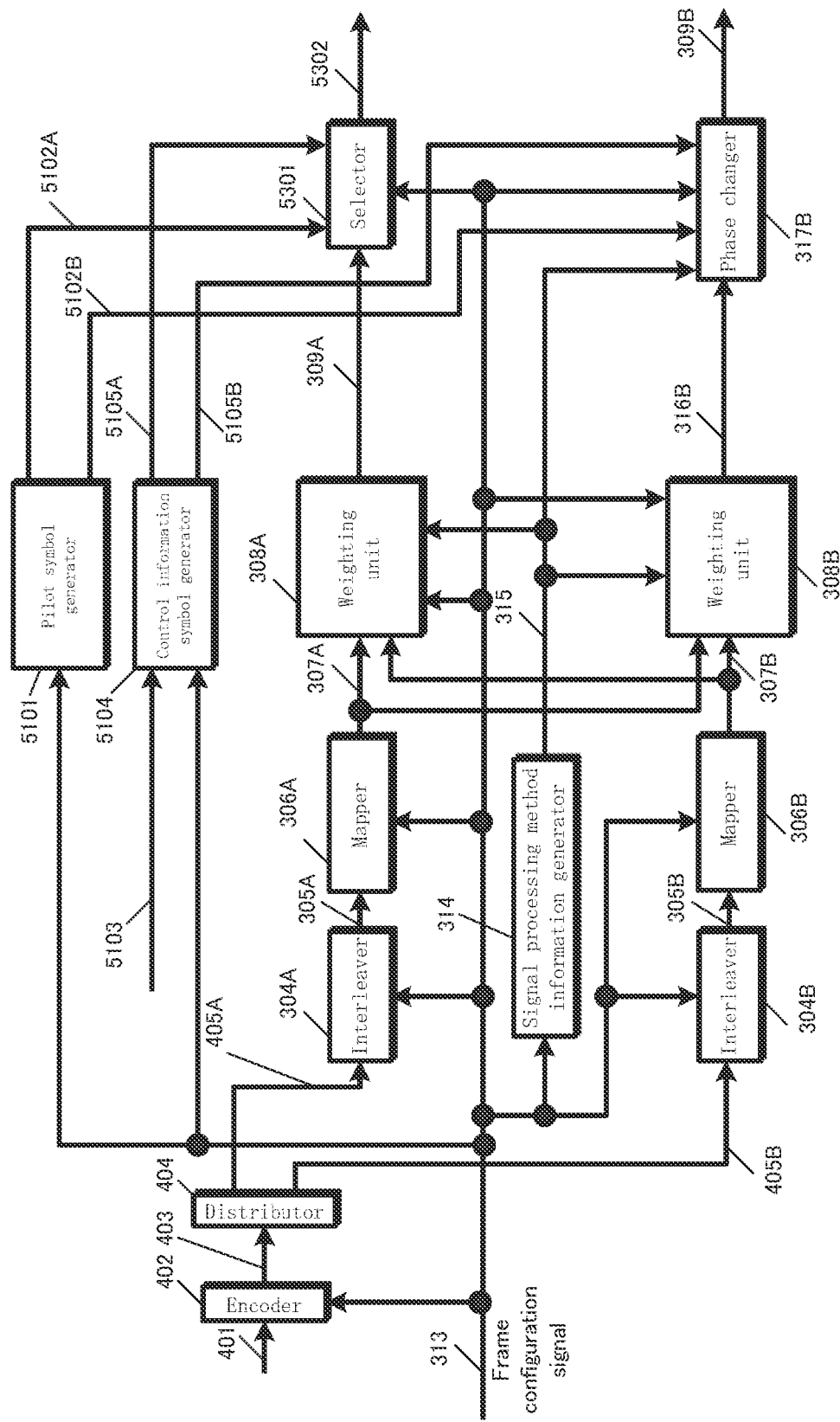
FIG. 53 illustrates a further sample configuration of a transmission device.

FIG. 53 illustrates a sample configuration of a transmission device that differs from that of FIG. 51. The following describes the points of difference. As shown in FIG. 53, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

A selector 5301 takes the plurality of baseband signals as input and selects a baseband signal having a symbol indicated by the frame configuration signal 313 for output.

Figure 54:
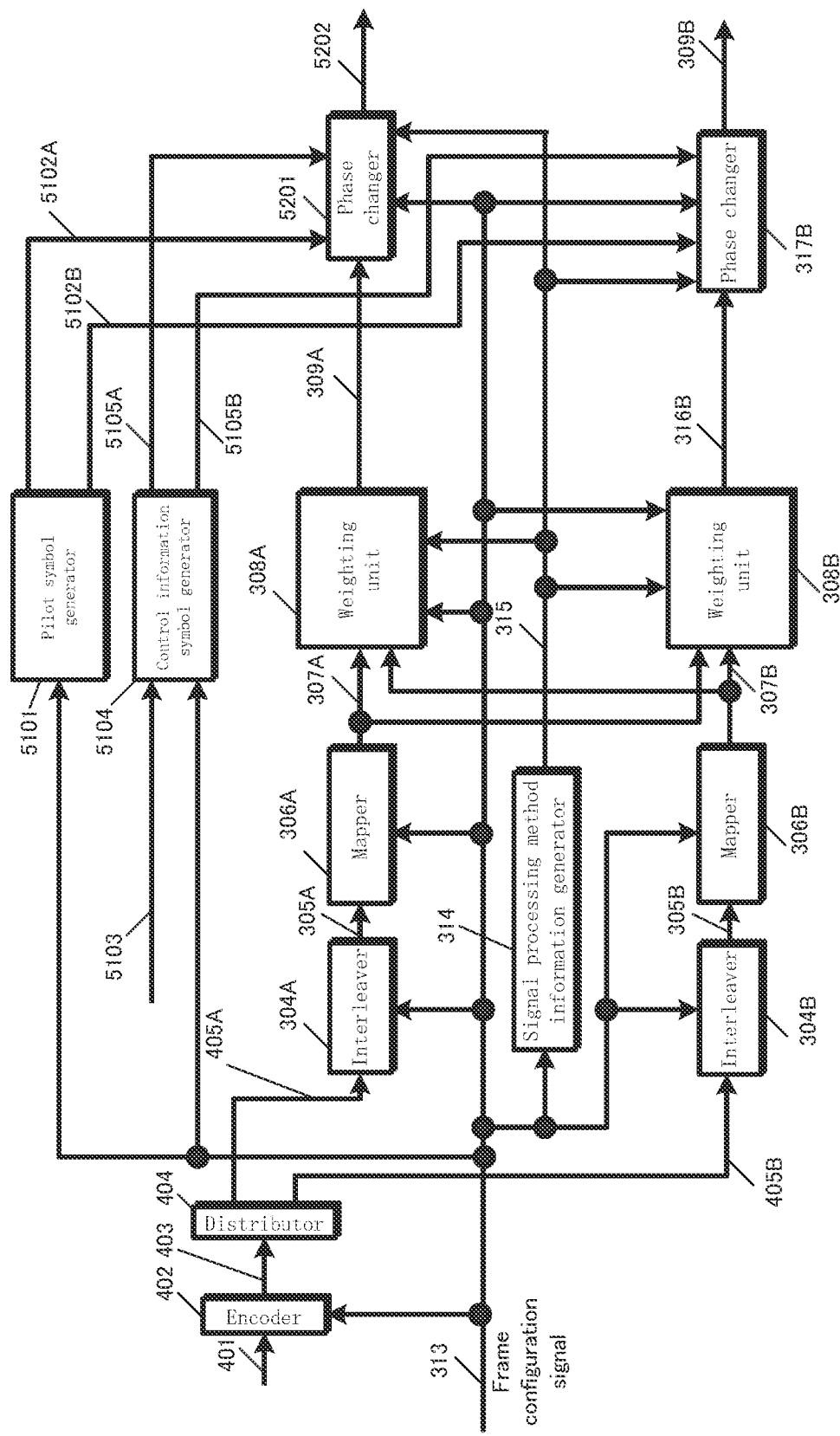
FIG. 54 illustrates yet a further sample configuration of a transmission device.

FIG. 54 illustrates a sample configuration of a transmission device that differs from that of FIG. 52. The following describes the points of difference. As shown in FIG. 54, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

Similarly, as shown in FIG. 54, phase changer 5201 takes a plurality of baseband signals as input. Then, when the frame configuration signal 313 indicates a data symbol, phase changer 5201 performs the change in phase on precoded baseband signal 309A. When frame configuration signal 313 indicates a pilot symbol (or null symbol) or a control information symbol, phase changer 5201 pauses phase changing operations such that the symbols of the baseband signal are output as-is. (This may be interpreted as performing forced rotation corresponding to $e^{j0}$.)

The above explanations are given using pilot symbols, control symbols, and data symbols as examples. However, the present invention is not limited in this manner. When symbols are transmitted using methods other than precoding, such as single-antenna transmission or transmission using space-time block coding, not performing a change of phase is important. Conversely, performing a change of phase on symbols that have been precoded is the key point of the present invention.

Accordingly, a characteristic feature of the present invention is that the change of phase is not performed on all symbols within the frame configuration in the time-frequency domain, but only performed on signals that have been precoded.

Embodiment 4

Embodiments 1 and 2, described above, discuss a regular change of phase. Embodiment 3, however, discloses performing a different change of phase on neighbouring symbols.

The present Embodiment describes a phase changing method that varies according to the modulation scheme and the coding rate of the error-correcting codes used by the transmission device.

Table 1, below, is a list of phase changing method settings corresponding to the settings and parameters of the transmission device.

TABLE 1

| No. of Modulated Transmission Signals | Modulation Scheme | Coding Rate | Phase Changing Pattern |
|---|---|---|---|
| 2 | #1: QPSK, #2: QPSK | #1: 1/2, #2 2/3 | #1: —, #2: A |
| 2 | #1: QPSK, #2: QPSK | #1: 1/2, #2: 3/4 | #1: A, #2: B |
| 2 | #1: QPSK, #2: QPSK | #1: 2/3, #2: 3/5 | #1: A, #2: C |
| 2 | #1: QPSK, #2: QPSK | #1: 2/3, #2: 2/3 | #1: C, #2: — |
| 2 | #1: QPSK, #2: QPSK | #1: 3/3, #2: 5/6 | #1: D, #2: E |
| 2 | #1: QPSK, #2: 16-QAM | #1: 1/2, #2: 2/3 | #1: B, #2: A |
| 2 | #1: QPSK, #2: 16-QAM | #1: 1/2, #2: 3/4 | #1: A, #2: C |
| 2 | #1: QPSK, #2: 16-QAM | #1: 1/2, #2: 3/5 | #1: —, #2: E |
| 2 | #1: QPSK, #2: 16-QAM | #1: 2/3, #2: 3/4 | #1: D, #2: — |
| 2 | #1: QPSK, #2: 16-QAM | #1: 2/3, #2: 5/6 | #1: D, #2: B |
| 2 | #1: 16-QAM, #2: 16-QAM | #1: 1/2, #2: 2/3 | #1: —, #2: E |
| . | . | . | . |
| . | . | . | . |
| . | . | . | . |

In Table 1, #1 denotes modulated signal s1 from Embodiment 1 described above (baseband signal s1 modulated with the modulation scheme set by the transmission device) and #2 denotes modulated signal s2 (baseband signal s2 modulated with the modulation scheme set by the transmission device). The coding rate column of Table 1 indicates the coding rate of the error-correcting codes for modulation schemes #1 and #2. The phase changing pattern column of Table 1 indicates the phase changing method applied to precoded baseband signals z1 (z1') and z2 (z2'), as explained in Embodiments 1 through 3. Although the phase changing patterns are labelled A, B, C, D, E, and so on, this refers to the phase change degree applied, for example, in a phase changing pattern given by Math. 46 (formula 46) and Math.

47 (formula 47), above. In the phase changing pattern column of Table 1, the dash signifies that no change of phase is applied.

The combinations of modulation scheme and coding rate listed in Table 1 are examples. Other modulation schemes (such as 128-QAM and 256-QAM) and coding rates (such as ⅞) not listed in Table 1 may also be included. Also, as described in Embodiment 1, the error-correcting codes used for s1 and s2 may differ (Table 1 is given for cases where a single type of error-correcting codes is used, as in FIG. 4). Furthermore, the same modulation scheme and coding rate may be used with different phase changing patterns. The transmission device transmits information indicating the phase changing patterns to the reception device. The reception device specifies the phase changing pattern by cross-referencing the information and Table 1, then performs demodulation and decoding. When the modulation scheme and error-correction method determine a unique phase changing pattern, then as long as the transmission device transmits the modulation scheme and information regarding the error-correction method, the reception device knows the phase changing pattern by obtaining that information. As such, information pertaining to the phase changing pattern is not strictly necessary.

In Embodiments 1 through 3, the change of phase is applied to precoded baseband signals. However, the amplitude may also be modified along with the phase in order to apply periodical, regular changes. Accordingly, an amplification modification pattern regularly modifying the amplitude of the modulated signals may also be made to conform to Table 1. In such circumstances, the transmission device should include an amplification modifier that modifies the amplification after weighting unit 308A or weighting unit 308B from FIG. 3 or 4. In addition, amplification modification may be performed on only one of or on both of the precoded baseband signals z1(*t*) and z2(*t*) (in the former case, the amplification modifier is only needed after one of weighting unit 308A and 308B).

Furthermore, although not indicated in Table 1 above, the mapping scheme may also be regularly modified by the mapper, without a regular change of phase.

That is, when the mapping method for modulated signal s1(*t*) is 16-QAM and the mapping method for modulated signal s2(*t*) is also 16-QAM, the mapping method applied to modulated signal s2(*t*) may be regularly changed as follows: from 16-QAM to 16-APSK, to 16-QAM in the I-Q plane, to a first mapping method producing signal point distribution unlike 16-APSK, to 16-QAM in the I-Q plane, to a second mapping method producing signal point distribution unlike 16-APSK, and so on. As such, the data reception quality can be improved for the reception device, much like the results obtained by a regular change of phase described above.

In addition, the present invention may use any combination of methods for a regular change of phase, mapping method, and amplitude, and the transmit signal may transmit with all of these taken into consideration.

The present Embodiment may be realized using single-carrier methods as well as multi-carrier methods. Accordingly, the present Embodiment may also be realized using, for example, spread-spectrum communications, OFDM, SC-FDM, SC-OFDM, wavelet OFDM as described in Non-Patent Literature 7, and so on. As described above, the present Embodiment describes changing the phase, amplitude, and mapping methods by performing phase, amplitude, and mapping method modifications with respect to the time domain t. However, much like Embodiment 1, the same changes may be carried out with respect to the frequency domain. That is, considering the phase, amplitude, and mapping method modification in the time domain t described in the present Embodiment and replacing t with f (f being the ((sub-) carrier) frequency) leads to phase, amplitude, and mapping method modification applicable to the frequency domain. Also, the phase, amplitude, and mapping method modification of the present Embodiment is also applicable to phase, amplitude, and mapping method modification in both the time domain and the frequency domain.

Furthermore, in the present Embodiment, symbols other than data symbols, such as pilot symbols (preamble, unique word, etc) or symbols transmitting control information, may be arranged within the frame in any manner.

Embodiment A1

The present Embodiment describes a method of regularly changing the phase when encoding is performed using block codes as described in Non-Patent Literature 12 through 15, such as QC (Quasi-Cyclic) LDPC Codes (not only QC-LDPC but also LDPC codes may be used), concatenated LDPC and BCH (Bose-Chaudhuri-Hocquenghem) codes, Turbo codes or Duo-Binary Turbo codes using tail-biting, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

Figure 34:
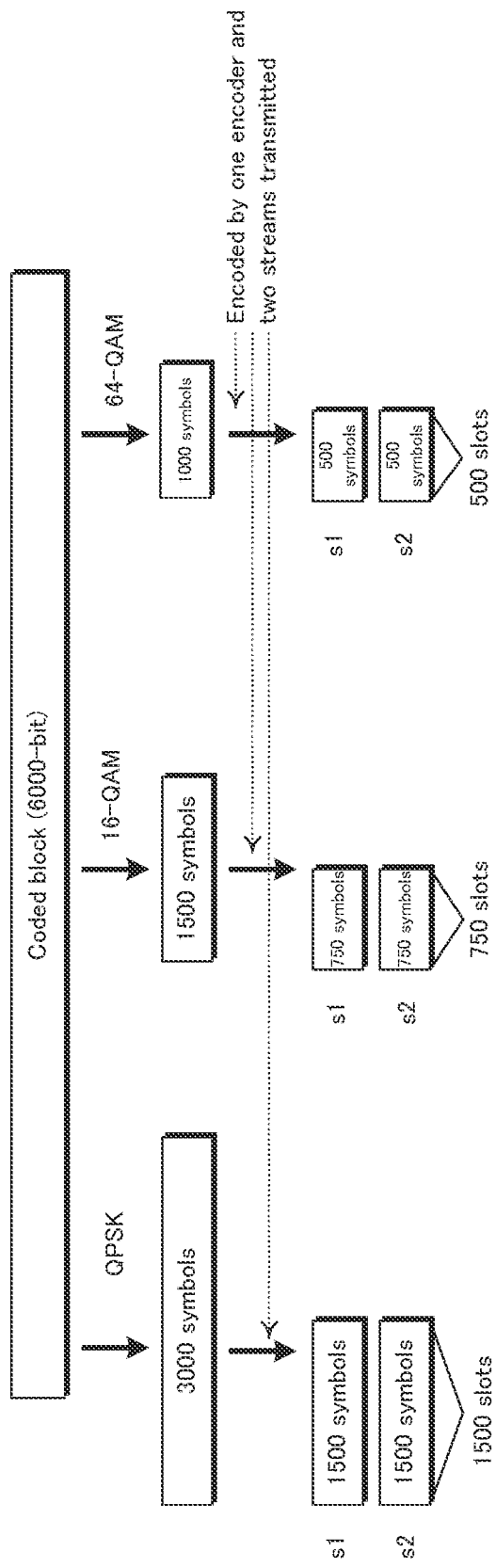
FIG. 34 illustrates a variation in numbers of symbols and slots needed per pair of coded blocks when block codes are used.

FIG. 34 illustrates the varying numbers of symbols and slots needed in each coded block when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission method may be any single-carrier method or multi-carrier method such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up each coded block, and when the modulation scheme is 64-QAM, 500 slots are needed to transmit all of the bits making up each coded block.

The following describes the relationship between the above-defined slots and the phase of multiplication, as pertains to methods for a regular change of phase.

Here, five different phase changing values (or phase changing sets) are assumed as having been prepared for use in the method for a regular change of phase. That is, five different phase changing values (or phase changing sets) have been prepared for the phase changer of the transmission device from FIG. 4 (equivalent to the period (cycle) from Embodiments 1 through 4) (As in FIG. 6, five phase changing values are needed in order to perform a change of phase with a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). These five phase changing values (or phase changing sets) are expressed as PHASE[0], PHASE[1], PHASE[2], PHASE[3], and PHASE[4].

For the above-described 1500 slots needed to transmit the 6000 bits making up a single coded block when the modulation scheme is QPSK, PHASE[0] is used on 300 slots, PHASE[1] is used on 300 slots, PHASE[2] is used on 300 slots, PHASE[3] is used on 300 slots, and PHASE[4] is used on 300 slots. This is due to the fact that any bias in phase usage causes great influence to be exerted by the more frequently used phase, and that the reception device is dependent on such influence for data reception quality.

Further still, for the above-described 500 slots needed to transmit the 6000 bits making up a single coded block when the modulation scheme is 64-QAM, PHASE[0] is used on 150 slots, PHASE[1] is used on 150 slots, PHASE[2] is used on 150 slots, PHASE[3] is used on 150 slots, and PHASE[4] is used on 150 slots.

Further still, for the above-described 500 slots needed to transmit the 6000 bits making up a single coded block when the modulation scheme is 64-QAM, PHASE[0] is used on 100 slots, PHASE[1] is used on 100 slots, PHASE[2] is used on 100 slots, PHASE[3] is used on 100 slots, and PHASE[4] is used on 100 slots.

As described above, a method for a regular change of phase requires the preparation of N phase changing values (or phase changing sets) (where the N different phases are expressed as PHASE[0], PHASE[1], PHASE[2] ... PHASE[N−2], PHASE[N−1]). As such, in order to transmit all of the bits making up a single coded block, PHASE[0] is used on $K_0$ slots, PHASE[1] is used on $K_1$ slots, PHASE[i] is used on $K_i$ slots (where i=0, 1, 2 ... N−1), and PHASE[N−1] is used on $K_{N-1}$ slots, such that Condition #A01 is met.
(Condition #A01)

$K_0 = K_1 \ldots = K_i = K_{N-1}$. That is, $K_a = K_b (\forall a$ and $\forall b$ where a, b,=0, 1, 2 ... N−1; (a and b being integers between 0 and N−1), a≠b).

Then, when a communication system that supports multiple modulation schemes selects one such supported modulation scheme for use, Condition #A01 is met for the supported modulation scheme.

However, when multiple modulation schemes are supported, each such modulation scheme typically uses symbols transmitting a different number of bits per symbols (though some may happen to use the same number), Condition #A01 may not be satisfied for some modulation schemes. In such a case, the following condition applies instead of Condition #A01.
(Condition #A02)

The difference between $K_a$ and $K_b$ is 0 or 1. That is, $|K_a - K_b|$ is 0 or 1($\forall a$, $\forall b$, where a, b=0, 1, 2 ... N−1(a and b being integers between 0 and N−1), a≠b)

Figure 35:
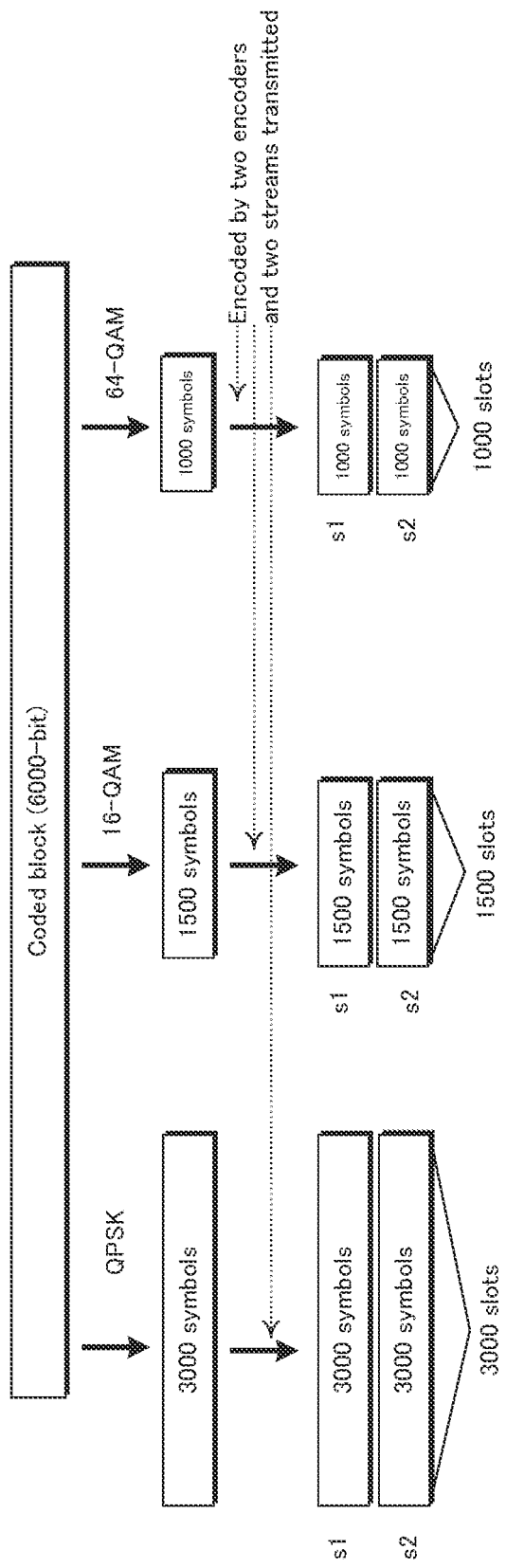
FIG. 35 illustrates another variation in numbers of symbols and slots needed per pair of coded blocks when block codes are used.

FIG. 35 illustrates the varying numbers of symbols and slots needed in each coded block when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission method may be any single-carrier method or multi-carrier method such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up the two coded blocks, and when the modulation scheme is 64-QAM, 1000 slots are needed to transmit all of the bits making up the two coded blocks The following describes the relationship between the above-defined slots and the phase of multiplication, as pertains to methods for a regular change of phase.

Here, five different phase changing values (or phase changing sets) are assumed as having been prepared for use in the method for a regular change of phase. That is, five different phase changing values (or phase changing sets) have been prepared for the phase changer of the transmission device from FIGS. 3 and 12 (equivalent to the period (cycle) from Embodiments 1 through 4) (As in FIG. 6, five phase changing values are needed in order to perform a change of phase with a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). These five phase changing values (or phase changing sets) are expressed as PHASE[0], PHASE[1], PHASE[2], PHASE[3], and PHASE[4].

For the above-described 3000 slots needed to transmit the 6000×2 bits making up the two coded blocks when the modulation scheme is QPSK, PHASE[0] is used on 600 slots, PHASE[1] is used on 600 slots, PHASE[2] is used on 600 slots, PHASE[3] is used on 600 slots, and PHASE[4] is used on 600 slots. This is due to the fact that any bias in phase usage causes great influence to be exerted by the more frequently used phase, and that the reception device is dependent on such influence for data reception quality.

Furthermore, in order to transmit the first coded block, PHASE[0] is used on slots 600 times, PHASE[1] is used on slots 600 times, PHASE[2] is used on slots 600 times, PHASE[3] is used on slots 600 times, and PHASE[4] is used on slots 600 times. Furthermore, in order to transmit the second coded block, PHASE[0] is used on slots 600 times, PHASE[1] is used on slots 600 times, PHASE[2] is used on slots 600 times, PHASE[3] is used on slots 600 times, and PHASE[4] is used on slots 600 times.

Similarly, for the above-described 1500 slots needed to transmit the 6000×2 bits making up the two coded blocks when the modulation scheme is 16-QAM, PHASE[0] is used on 300 slots, PHASE[1] is used on 300 slots, PHASE[2] is used on 300 slots, PHASE[3] is used on 300 slots, and PHASE[4] is used on 300 slots.

Furthermore, in order to transmit the first coded block, PHASE[0] is used on slots 300 times, PHASE[1] is used on slots 300 times, PHASE[2] is used on slots 300 times, PHASE[3] is used on slots 300 times, and PHASE[4] is used on slots 300 times. Furthermore, in order to transmit the second coded block, PHASE[0] is used on slots 300 times, PHASE[1] is used on slots 300 times, PHASE[2] is used on slots 300 times, PHASE[3] is used on slots 300 times, and PHASE[4] is used on slots 300 times.

Similarly, for the above-described 1000 slots needed to transmit the 6000×2 bits making up the two coded blocks when the modulation scheme is 64-QAM, PHASE[0] is used on 200 slots, PHASE[1] is used on 200 slots, PHASE[2] is used on 200 slots, PHASE[3] is used on 200 slots, and PHASE[4] is used on 200 slots.

Furthermore, in order to transmit the first coded block, PHASE[0] is used on slots 200 times, PHASE[1] is used on slots 200 times, PHASE[2] is used on slots 200 times, PHASE[3] is used on slots 200 times, and PHASE[4] is used on slots 200 times. Furthermore, in order to transmit the second coded block, PHASE[0] is used on slots 200 times, PHASE[1] is used on slots 200 times, PHASE[2] is used on slots 200 times, PHASE[3] is used on slots 200 times, and PHASE[4] is used on slots 200 times.

As described above, a method for regularly changing the phase requires the preparation of phase changing values (or phase changing sets) expressed as PHASE[0], PHASE[1], PHASE[2] . . . PHASE[N−2], PHASE[N−1]. As such, in order to transmit all of the bits making up two coded blocks, PHASE[0] is used on $K_0$ slots, PHASE[1] is used on $K_1$ slots, PHASE[i] is used on $K_i$ slots (where i=0, 1, 2 . . . N−1), and PHASE[N−1] is used on $K_{N-1}$ slots, such that Condition #A03 is met.
(Condition #A03)
$K_0=K_1 \ldots =K_i= \ldots K_{N-1}$. That is, $K_a=K_b$ ($\forall$a and $\forall$b where a, b=0, 1, 2 . . . N−1 (a and b being integers between 0 and N−1), a≠b).
Further, in order to transmit all of the bits making up the first coded block, PHASE[0] is used $K_{0,1}$ times, PHASE[1] is used $K_{1,1}$ times, PHASE[i] is used $K_{i,1}$ times (where i=0, 1, 2 . . . N−1), and PHASE[N−1] is used $K_{N-1,1}$ times, such that Condition #A04 is met.
(Condition #A04)
$K_{0,1}=K_{1,1}= \ldots K_{N-1,1}$. That is, $K_{a,1}=K_{b,1}$ ($\forall$a and $\forall$b where a, b,=0, 1, 2 . . . N−1(a and b being integers between 0 and N−1),a≠b).

Furthermore, in order to transmit all of the bits making up the second coded block, PHASE[0] is used $K_{0,2}$ times, PHASE[1] is used $K_{1,2}$ times, PHASE[i] is used $K_{1,2}$ times (where i=0, 1, 2 . . . N−1), and PHASE[N−1] is used $K_{N-1,2}$ times, such that Condition #A05 is met.
(Condition #A05)
$K_{0,2}=K_{1,2}= \ldots K_{1,2}= \ldots K_{N-1,2}$. That is, $K_{a,2}=K_{b,2}$ ($\forall$a and $\forall$b where a, b,=0, 1, 2 . . . N−1(a and b being integers between 0 and N−1), a≠b).

Then, when a communication system that supports multiple modulation schemes selects one such supported modulation scheme for use, Condition #A03, #A04, and #A05 is met for the supported modulation scheme.

However, when multiple modulation schemes are supported, each such modulation scheme typically uses symbols transmitting a different number of bits per symbol (though some may happen to use the same number), Conditions #A03, #A04, and #A05 may not be satisfied for some modulation schemes. In such a case, the following conditions apply instead of Condition #A03, #A04, and #A05.
(Condition #A06)
The difference between $K_a$ and $K_b$ satisfies 0 or 1. That is, $|K_a-K_b|$ satisfies 0 or 1 ($\forall$a, $\forall$b, where a, b=0, 1, 2 . . . N−1(a and b being integers between 0 and N−1), a≠b)
(Condition #A07)
The difference between $K_{a,1}$ and $K_{b,1}$ satisfies 0 or 1. That is, $|K_{a,1}-K_{b,1}|$ satisfies 0 or 1 ($\forall$a, $\forall$b, where a, b=0, 1, 2 . . . N−1(a and b being integers between 0 and N−1), a≠b)
(Condition #A08)
The difference between $K_{a,2}$ and $K_{b,2}$ satisfies 0 or 1. That is, $|K_{a,2}-K_{b,2}|$ satisfies 0 or 1 ($\forall$a, $\forall$b, where a, b=0, 1, 2 . . . N−1(a and b being integers between 0 and N−1), a≠b)

As described above, bias among the phases being used to transmit the coded blocks is removed by creating a relationship between the coded block and the phase of multiplication. As such, data reception quality may be improved for the reception device.

In the present Embodiment, N phase changing values (or phase changing sets) are needed in order to perform a change of phase having a period (cycle) of N with the method for a regular change of phase. As such, N phase changing values (or phase changing sets) PHASE[0], PHASE[1], PHASE[2] . . . PHASE[N−2], and PHASE[N−1] are prepared. However, schemes exist for reordering the phases in the stated order with respect to the frequency domain. No limitation is intended in this regard. The N phase changing values (or phase changing sets) may also change the phases of blocks in the time domain or in the time-frequency domain to obtain a symbol arrangement as described in Embodiment 1. Although the above examples discuss a phase changing method with a period (cycle) of N, the same effects are obtainable using N phase changing values (or phase changing sets) at random. That is, the N phase changing values (or phase changing sets) need not always have regular periodicity. As long as the above-described conditions are satisfied, great quality data reception improvements are realizable for the reception device.

Furthermore, given the existence of modes for spatial multiplexing MIMO schemes, MIMO schemes using a fixed precoding matrix, space-time block coding schemes, single-stream transmission, and schemes using a regular change of phase (the transmission schemes described in Embodiments 1 through 4), the transmission device (broadcaster, base station) may select any one of these transmission schemes.

As described in Non-Patent Literature 3, spatial multiplexing MIMO methods involve transmitting signals s1 and s2, which are mapped using a selected modulation scheme, on each of two different antennas. As described in Embodiments 1 through 4, MIMO methods using a fixed precoding matrix involve performing precoding only (with no change of phase). Further, space-time block coding methods are described in Non-Patent Literature 9, 16, and 17. Single-stream transmission methods involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present Embodiment.

When a change of phase is performed, then for example, a phase changing value for PHASE[i] of X radians is performed on only one precoded baseband signal, the phase changers of FIGS. 3, 4, 5, 12, 25, 29, 51, and 53 multiplies precoded baseband signal z2' by $e^{jX}$. Then, when a change of phase by, for example, a phase changing set for PHASE[i] of X radians and Y radians is performed on both precoded baseband signals, the phase changers from FIGS. 26, 27, 28, 52, and 54 multiply precoded baseband signal z2' by $e^{jX}$ and multiply precoded baseband signal z1' by $e^{jY}$.

Embodiment B1

The following describes a sample configuration of an application of the transmission methods and reception methods discussed in the above embodiments and a system using the application.

Figure 36:
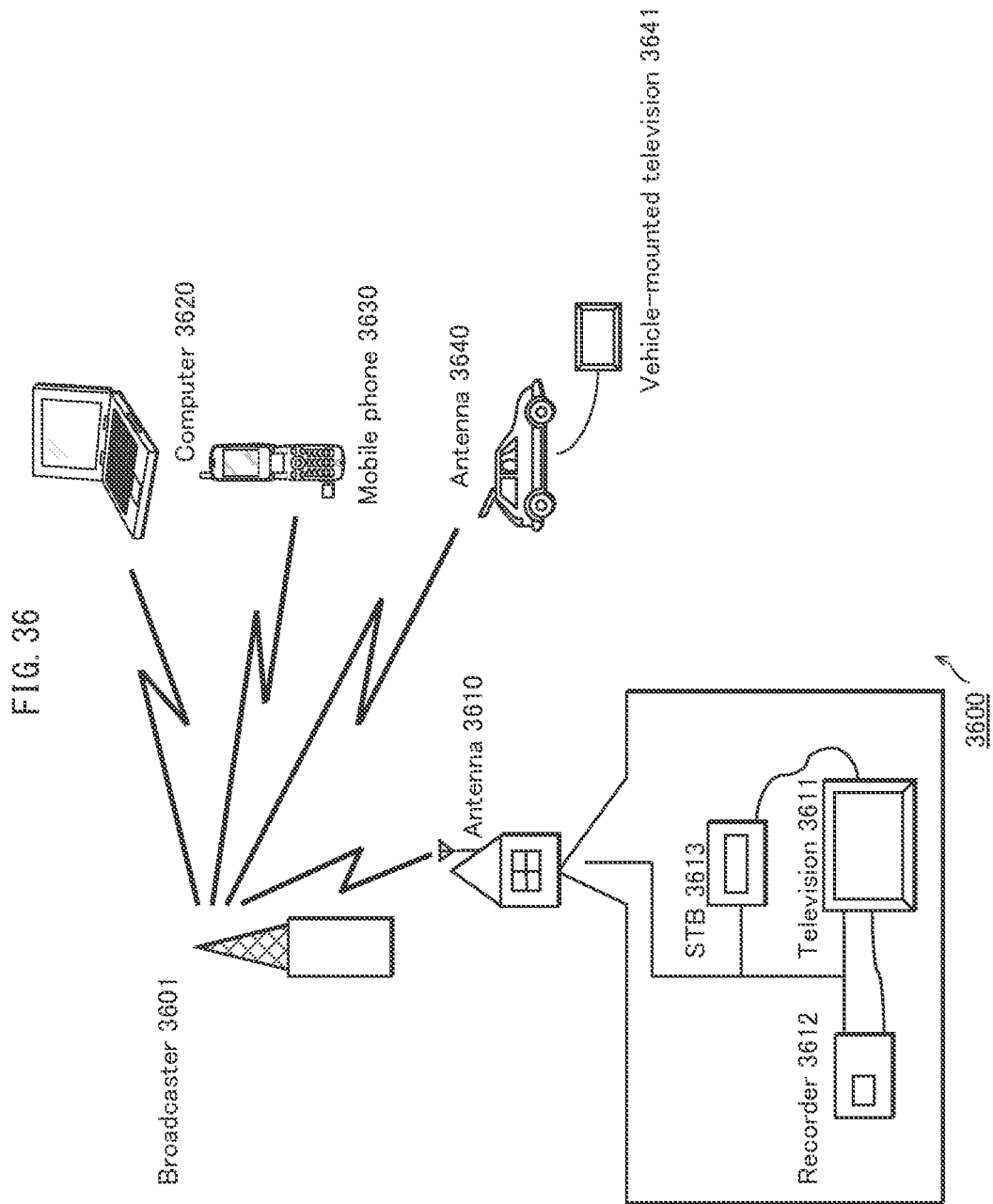
FIG. 36 illustrates an overall configuration of a digital broadcasting system.

FIG. 36 illustrates the configuration of a system that includes devices executing transmission methods and reception methods described in the above Embodiments. As shown in FIG. 36, the devices executing transmission methods and reception methods described in the above Embodiments include various receivers such as a broadcaster, a television 3611, a DVD recorder 3612, a STB (set-top box) 3613, a computer 3620, a vehicle-mounted television 3641, a mobile phone 3630 and so on within a digital broadcasting system 3600. Specifically, the broadcaster 3601 uses a transmission method discussed in the above-described Embodiments to transmit multiplexed data, in which video, audio, and other data are multiplexed, over a predetermined transmission band.

The signals transmitted by the broadcaster 3601 are received by an antenna (such as antenna 3660 or 3640) embedded within or externally connected to each of the receivers. Each receiver obtains the multiplexed data by using reception methods discussed in the above-described Embodiments to demodulate the signals received by the antenna. Accordingly, the digital broadcasting system 3600 is able to realize the effects of the present invention, as discussed in the above-described Embodiments.

The video data included in the multiplexed data are coded with a video coding method compliant with a standard such as MPEG-2 (Moving Picture Experts Group), MPEG4-AVC (Advanced Video Coding), VC-1, or the like. The audio data included in the multiplexed data are encoded with an audio coding method compliant with a standard such as Dolby AC-3 (Audio Coding), Dolby Digital Plus, MLP (Meridian Lossless Packing), DTS (Digital Theatre Systems), DTS-HD, Linear PCM (Pulse-Code Modulation), or the like.

Figure 37:
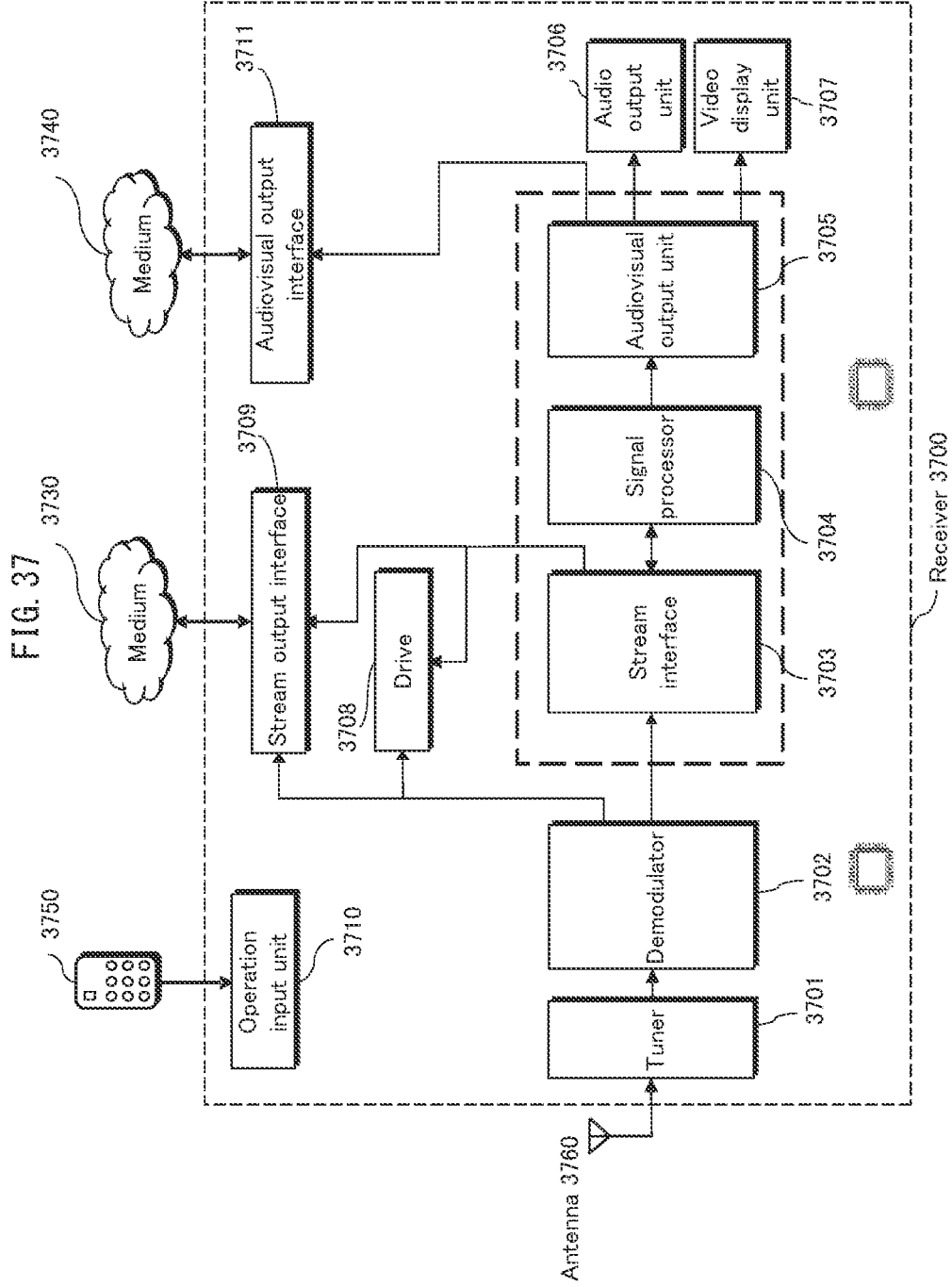
FIG. 37 is a block diagram illustrating a sample receiver.

FIG. 37 illustrates the configuration of a receiver 7900 that executes a reception method described in the above-described Embodiments. The receiver 3700 corresponds to a receiver included in one of the television 3611, the DVD recorder 3612, the STB 3613, the computer 3620, the vehicle-mounted television 3641, the mobile phone 3630 and so on from FIG. 36. The receiver 3700 includes a tuner 3701 converting a high-frequency signal received by an antenna 3760 into a baseband signal, and a demodulator 3702 demodulating the baseband signal so converted to obtain the multiplexed data. The demodulator 3702 executes a reception method discussed in the above-described Embodiments, and thus achieves the effects of the present invention as explained above.

The receiver 3700 further includes a stream interface 3720 that demultiplexes the audio and video data in the multiplexed data obtained by the demodulator 3702, a signal processor 3704 that decodes the video data obtained from the demultiplexed video data into a video signal by applying a video decoding method corresponding thereto and decodes the audio data obtained from the demultiplexed audio data into an audio signal by applying an audio decoding method corresponding thereto, an audio output unit 3706 that outputs the decoded audio signal through a speaker or the like, and a video display unit 3707 that outputs the decoded video signal on a display or the like.

When, for example, a user uses a remote control 3750, information for a selected channel (selected (television) program or audio broadcast) is transmitted to an operation input unit 3710. Then, the receiver 3700 performs processing on the received signal received by the antenna 3760 that includes demodulating the signal corresponding to the selected channel, performing error-correcting decoding, and so on, in order to obtain the received data. At this point, the receiver 3700 obtains control symbol information that includes information on the transmission method (the transmission method, modulation scheme, error-correction method, and so on from the above-described Embodiments) (as described using FIGS. 5 and 41) from control symbols included the signal corresponding to the selected channel. As such, the receiver 3700 is able to correctly set the reception operations, demodulation scheme, error-correction method and so on, thus enabling the data included in the data symbols transmitted by the broadcaster (base station) to be obtained. Although the above description is given for an example of the user using the remote control 3750, the same operations apply when the user presses a selection key embedded in the receiver 3700 to select a channel.

According to this configuration, the user is able to view programs received by the receiver 3700.

The receiver 3700 pertaining to the present Embodiment further includes a drive 3708 that may be a magnetic disk, an optical disc, a non-volatile semiconductor memory, or a similar recording medium. The receiver 3700 stores data included in the demultiplexed data obtained through demodulation by the demodulator 3702 and error-correcting decoding (in some circumstances, the data obtained through demodulation by the demodulator 3702 may not be subject to error correction. Also, the receiver 3700 may perform further processing after error correction. The same hereinafter applies to similar statements concerning other components), data corresponding to such data (e.g., data obtained through compression of such data), data obtained through audio and video processing, and so on, on the drive 3708. Here, an optical disc is a recording medium, such as DVD (Digital Versatile Disc) or BD (Blu-ray Disc), that is readable and writable with the use of a laser beam. A magnetic disk is a floppy disk, a hard disk, or similar recording medium on which information is storable through the use of magnetic flux to magnetize a magnetic body. A non-volatile semiconductor memory is a recording medium, such as flash memory or ferroelectric random access memory, composed of semiconductor element(s). Specific examples of non-volatile semiconductor memory include an SD card using flash memory and a Flash SSD (Solid State Drive). Naturally, the specific types of recording media mentioned herein are merely examples. Other types of recording mediums may also be used.

According to this structure, the user is able to record and store programs received by the receiver 3700, and is thereby able to view programs at any given time after broadcasting by reading out the recorded data thereof.

Although the above explanations describe the receiver 3700 storing multiplexed data obtained through demodulation by the demodulator 3702 and error-correcting decoding on the drive 3708, a portion of the data included in the multiplexed data may instead be extracted and recorded. For example, when data broadcasting services or similar content is included along with the audio and video data in the multiplexed data obtained through demodulation by the demodulator 3702 and error-correcting decoding, the audio and video data may be extracted from the multiplexed data demodulated by the demodulator 3702 and stored as new multiplexed data. Furthermore, the drive 3708 may store either the audio data or the video data included in the multiplexed data obtained through demodulation by the demodulator 3702 and error-correcting decoding as new multiplexed data. The aforementioned data broadcasting service content included in the multiplexed data may also be stored on the drive 3708.

Furthermore, when a television, recording device (e.g., a DVD recorder, BD recorder HDD recorder, SD card, or similar), or mobile phone incorporating the receiver 3700 of the present invention receives multiplexed data obtained through demodulation by the demodulator 3702 and error-correcting decoding that includes data for correcting bugs in software used to operate the television or recording device, for correcting bugs in software for preventing personal information and recorded data from being leaked, and so on, such software bugs may be corrected by installing the data on the television or recording device. As such, bugs in the receiver 3700 are corrected through the inclusion of data for correcting bugs in the software of the receiver 3700. Accordingly, the television, recording device, or mobile phone incorporating the receiver 3700 may be made to operate more reliably.

Here, the process of extracting a portion of the data included in the multiplexed data obtained through demodulation by the demodulator 3702 and error-correcting decoding is performed by, for example, the stream interface 3703. Specifically, the stream interface 3703, demultiplexes the various data included in the multiplexed data demodulated by the demodulator 3702, such as audio data, video data, data broadcasting service content, and so on, as instructed by a non-diagrammed controller such as a CPU. The stream interface 3703 then extracts and multiplexes only the indicated demultiplexed data, thus generating new multiplexed data. The data to be extracted from the demultiplexed data may be determined by the user or may be determined in advance according to the type of recording medium.

According to such a structure, the receiver 3700 is able to extract and record only the data needed in order to view the recorded program. As such, the amount of data to be recorded can be reduced.

Although the above explanation describes the drive 3708 as storing multiplexed data obtained through demodulation by the demodulator 3702 and error-correcting decoding, the video data included in the multiplexed data so obtained may be converted by using a different video coding method than the original video coding method applied thereto, so as to reduce the amount of data or the bit rate thereof. The drive 3708 may then store the converted video data as new multiplexed data. Here, the video coding method used to generate the new video data may conform to a different standard than that used to generate the original video data. Alternatively, the same video coding method may be used with different parameters. Similarly, the audio data included in the multiplexed data obtained through demodulation by the demodulator 3702 and error-correcting decoding may be converted by using a different audio coding method than the original audio coding method applied thereto, so as to reduce the amount of data or the bit rate thereof. The drive 3708 may then store the converted audio data as new multiplexed data.

Here, the process by which the audio or video data included in the multiplexed data obtained through demodulation by the demodulator 3702 and error-correcting decoding is converted so as to reduce the amount of data or the bit rate thereof is performed by, for example, the stream interface 3703 or the signal processor 3704. Specifically, the stream interface 3703 demultiplexes the various data included in the multiplexed data demodulated by the demodulator 3702, such as audio data, video data, data broadcasting service content, and so on, as instructed by an undiagrammed controller such as a CPU. The signal processor 3704 then performs processing to convert the video data so demultiplexed by using a different video coding method than the original video coding method applied thereto, and performs processing to convert the audio data so demultiplexed by using a different video coding method than the original audio coding method applied thereto. As instructed by the controller, the stream interface 3703 then multiplexes the converted audio and video data, thus generating new multiplexed data. The signal processor 3704 may, in accordance with instructions from the controller, performing conversion processing on either the video data or the audio data, alone, or may perform conversion processing on both types of data. In addition, the amounts of video data and audio data or the bit rate thereof to be obtained by conversion may be specified by the user or determined in advance according to the type of recording medium.

According to such a structure, the receiver 3700 is able to modify the amount of data or the bitrate of the audio and video data for storage according to the data storage capacity of the recording medium, or according to the data reading or writing speed of the drive 3708. Therefore, programs can be stored on the drive despite the storage capacity of the recording medium being less than the amount of multiplexed data obtained through demodulation by the demodulator 3702 and error-correcting decoding, or the data reading or writing speed of the drive being lower than the bit rate of the demultiplexed data obtained through demodulation by the demodulator 3702. As such, the user is able to view programs at any given time after broadcasting by reading out the recorded data.

The receiver 3700 further includes a stream output interface 3709 that transmits the multiplexed data demultiplexed by the demodulator 3702 to external devices through a communications medium 3730. The stream output interface 3709 may be, for example, a wireless communication device transmitting modulated multiplexed data to an external device using a wireless transmission method conforming to a wireless communication standard such as Wi-Fi™ (IEEE 802.11a, IEEE 802.11b, IEEE 802.11g, IEEE 802.11n, and so on), WiGiG, WirelessHD, Bluetooth™, ZigBee™, and so on through a wireless medium (corresponding to the communications medium 3730). The stream output interface 3709 may also be a wired communication device transmitting modulated multiplexed data to an external device using a communication method conforming to a wired communication standard such as Ethernet™, USB (Universal Serial Bus), PLC (Power Line Communication), HDMI (High- Definition Multimedia Interface) and so on through a wired transmission path (corresponding to the communications medium 3730) connected to the stream output interface 3709.

According to this configuration, the user is able to use an external device with the multiplexed data received by the receiver 3700 using the reception method described in the above-described Embodiments. The usage of multiplexed data by the user here includes use of the multiplexed data for real-time viewing on an external device, recording of the multiplexed data by a recording unit included in an external device, and transmission of the multiplexed data from an external device to a yet another external device.

Although the above explanations describe the receiver 3700 outputting multiplexed data obtained through demodulation by the demodulator 3702 and error-correcting decoding through the stream output interface 3709, a portion of the data included in the multiplexed data may instead be extracted and output. For example, when data broadcasting services or similar content is included along with the audio and video data in the multiplexed data obtained through demodulation by the demodulator 3702 and error-correcting decoding, the audio and video data may be extracted from the multiplexed data obtained through demodulation by the demodulator 3702 and error-correcting decoding, multiplexed and output by the stream output interface 3709 as new multiplexed data. In addition, the stream output interface 3709 may store either the audio data or the video data included in the multiplexed data obtained through demodulation by the demodulator 3702 and error-correcting decoding as new multiplexed data.

Here, the process of extracting a portion of the data included in the multiplexed data obtained through demodulation by the demodulator 3702 and error-correcting decoding is performed by, for example, the stream interface 3703. Specifically, the stream interface 3703 demultiplexes the various data included in the multiplexed data demodulated by the demodulator 3702, such as audio data, video data, data broadcasting service content, and so on, as instructed by an undiagrammed controller such as a CPU. The stream interface 3703 then extracts and multiplexes only the indicated demultiplexed data, thus generating new multiplexed data. The data to be extracted from the demultiplexed data may be determined by the user or may be determined in advance according to the type of stream output interface 3709.

According to this structure, the receiver 3700 is able to extract and output only the required data to an external device. As such, fewer multiplexed data are output using less communication bandwidth.

Although the above explanation describes the stream output interface 3709 as outputting multiplexed data obtained through demodulation by the demodulator 3702 and error-correcting decoding, the video data included in the multiplexed data so obtained may be converted by using a different video coding method than the original video coding method applied thereto, so as to reduce the amount of data or the bit rate thereof. The stream output interface 3709 may then output the converted video data as new multiplexed data. Here, the video coding method used to generate the new video data may conform to a different standard than that used to generate the original video data. Alternatively, the same video coding method may be used with different parameters. Similarly, the audio data included in the multiplexed data obtained through demodulation by the demodulator 3702 and error-correcting decoding may be converted by using a different audio coding method than the original audio coding method applied thereto, so as to reduce the amount of data or the bit rate thereof. The stream output interface 3709 may then output the converted audio data as new multiplexed data.

Here, the process by which the audio or video data included in the multiplexed data obtained through demodulation by the demodulator 3702 and error-correcting decoding is converted so as to reduce the amount of data or the bit rate thereof is performed by, for example, the stream interface 3703 or the signal processor 3704. Specifically, the stream interface 3703 demultiplexes the various data included in the multiplexed data demodulated by the demodulator 3702, such as audio data, video data, data broadcasting service content, and so on, as instructed by an undiagrammed controller. The signal processor 3704 then performs processing to convert the video data so demultiplexed by using a different video coding method than the original video coding method applied thereto, and performs processing to convert the audio data so demultiplexed by using a different video coding method than the original audio coding method applied thereto. As instructed by the controller, the stream interface 3703 then multiplexes the converted audio and video data, thus generating new multiplexed data. The signal processor 3704 may, in accordance with instructions from the controller, performing conversion processing on either the video data or the audio data, alone, or may perform conversion processing on both types of data. In addition, the amounts of video data and audio data or the bit rate thereof to be obtained by conversion may be specified by the user or determined in advance according to the type of stream output interface 3709.

According to this structure, the receiver 3700 is able to modify the bit rate of the video and audio data for output according to the speed of communication with the external device. Thus, despite the speed of communication with an external device being slower than the bit rate of the multiplexed data obtained through demodulation by the demodulator 3702 and error-correcting decoding, by outputting new multiplexed data from the stream output interface to the external device, the user is able to use the new multiplexed data with other communication devices.

The receiver 3700 further includes an audiovisual output interface 3711 that outputs audio and video signals decoded by the signal processor 3704 to the external device through an external communications medium. The audiovisual output interface 3711 may be, for example, a wireless communication device transmitting modulated audiovisual data to an external device using a wireless transmission method conforming to a wireless communication standard such as Wi-Fi™ (IEEE 802.11a, IEEE 802.11b, IEEE 802.11g, IEEE 802.11n, and so on), WiGig, WirelessHD, Bluetooth™, ZigBee™, and so on through a wireless medium. The stream output interface 3709 may also be a wired communication device transmitting modulated audiovisual data to an external device using a communication method conforming to a wired communication standard such as Ethernet™, USB, PLC, HDMI, and so on through a wired transmission path connected to the stream output interface 3709. Furthermore, the stream output interface 3709 may be a terminal for connecting a cable that outputs analogue audio signals and video signals as-is.

According to such a structure, the user is able to use the audio signals and video signals decoded by the signal processor 3704 with an external device.

Further, the receiver 3700 includes an operation input unit 3710 that receives user operations as input. The receiver 3700 behaves in accordance with control signals input by the operation input unit 3710 according to user operations, such as by switching the power supply ON or OFF, changing the channel being received, switching subtitle display ON or OFF, switching between languages, changing the volume output by the audio output unit 3706, and various other operations, including modifying the settings for receivable channels and the like.

The receiver 3700 may further include functionality for displaying an antenna level representing the received signal quality while the receiver 3700 is receiving a signal. The antenna level may be, for example, a index displaying the received signal quality calculated according to the RSSI (Received Signal Strength Indicator), the received signal magnetic field strength, the C/N (carrier-to-noise) ratio, the BER, the packet error rate, the frame error rate, the channel state information, and so on, received by the receiver 3700 and indicating the level and the quality of a received signal. In such circumstances, the demodulator 3702 includes a signal quality calibrator that measures the RSSI, the received signal magnetic field strength, the C/N ratio, the BER, the packet error rate, the frame error rate, the channel state information, and so on. In response to user operations, the receiver 3700 displays the antenna level (signal level, signal quality) in a user-recognizable format on the video display unit 3707. The display format for the antenna level (signal level, signal quality) may be a numerical value displayed according to the RSSI, the received signal magnetic field strength, the C/N ratio, the BER, the packet error rate, the frame error rate, the channel state information, and so on, or may be an image display that varies according to the RSSI, the received signal magnetic field strength, the C/N ratio, the BER, the packet error rate, the frame error rate, the channel state information, and so on. The receiver 3700 may display multiple antenna level (signal level, signal quality) calculated for each stream s1, s2, and so on demultiplexed using the reception method discussed in the above-described Embodiments, or may display a single antenna level (signal level, signal quality) calculated for all such streams. When the video data and audio data composing a program are transmitted hierarchically, the signal level (signal quality) may also be displayed for each hierarchical level.

According to the above structure, the user is given an understanding of the antenna level (signal level, signal quality) numerically or visually during reception using the reception methods discussed in the above-described Embodiments.

Although the above example describes the receiver 3700 as including the audio output unit 3706, the video display unit 3707, the drive 3708, the stream output interface 3709, and the audiovisual output interface 3711, all of these components are not strictly necessary. As long as the receiver 3700 includes at least one of the above-described components, the user is able to use the multiplexed data obtained through demodulation by the demodulator 3702 and error-correcting decoding. Any receiver may be freely combined with the above-described components according to the usage method.

(Multiplexed Data)

The following is a detailed description of a sample configuration of multiplexed data. The data configuration typically used in broadcasting is an MPEG-2 transport stream (TS). Therefore the following description describes an example related to MPEG2-TS. However, the data configuration of the multiplexed data transmitted by the transmission and reception methods discussed in the above-described Embodiments is not limited to MPEG2-TS. The advantageous effects of the above-described Embodiments are also achievable using any other data structure.

Figure 38:
FIG. 38 illustrates multiplexed data configuration.

FIG. 38 illustrates a sample configuration for multiplexed data. As shown, the multiplexed data are elements making up programmes (or events, being a portion thereof) currently provided by various services. For example, one or more video streams, audio streams, presentation graphics (PG) streams, interactive graphics (IG) streams, and other such element streams are multiplexed to obtain the multiplexed data. When a broadcast program provided by the multiplexed data is a movie, the video streams represent main video and sub video of the movie, the audio streams represent main audio of the movie and sub-audio to be mixed with the main audio, and the presentation graphics streams represent subtitles for the movie. Main video refers to video images normally presented on a screen, whereas sub-video refers to video images (for example, images of text explaining the outline of the movie) to be presented in a small window inserted within the video images. The interactive graphics streams represent an interactive display made up of GUI (Graphical User Interface) components presented on a screen.

Each stream included in the multiplexed data is identified by an identifier, termed a PID, uniquely assigned to the stream. For example, PID 0x1011 is assigned to the video stream used for the main video of the movie, PIDs 0x1100 through 0x111F are assigned to the audio streams, PIDs 0x1200 through 0x121F are assigned to the presentation graphics, PIDs 0x1400 through 0x141F are assigned to the interactive graphics, PIDs 0x1B00 through 0x1B1F are assigned to the video streams used for the sub-video of the movie, and PIDs 0x1A00 through 0x1A1F are assigned to the audio streams used as sub-audio to be mixed with the main audio of the movie.

Figure 39:
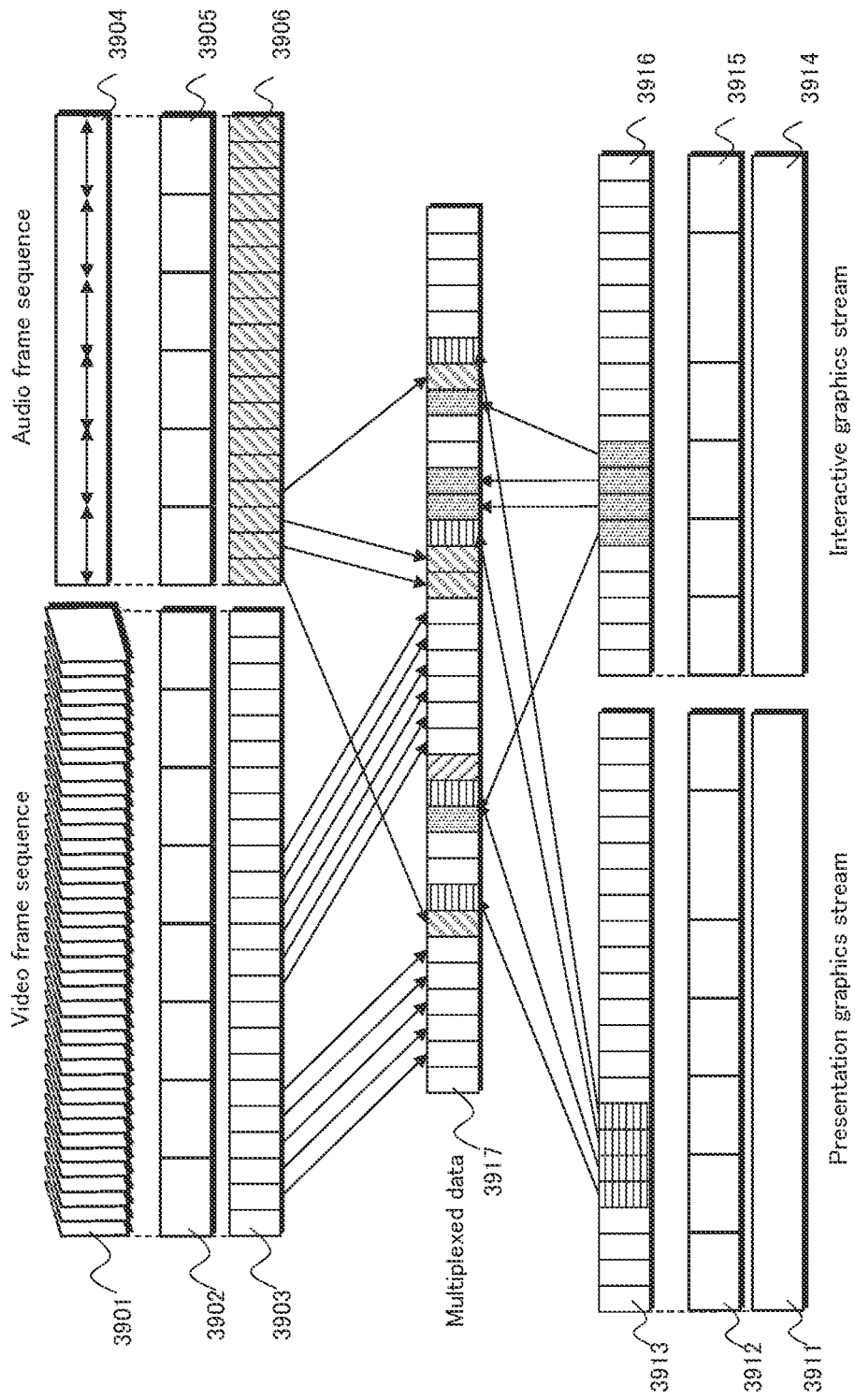
FIG. 39 is a schematic diagram illustrating multiplexing of encoded data into streams.

FIG. 39 is a schematic diagram illustrating an example of the multiplexed data being multiplexed. First, a video stream 3901, made up of a plurality of frames, and an audio stream 3904, made up of a plurality of audio frames, are respectively converted into PES packet sequence 3902 and 3905, then further converted into TS packets 3903 and 3906. Similarly, a presentation graphics stream 3911 and an interactive graphics stream 3914 are respectively converted into PES packet sequence 3912 and 3915, then further converted into TS packets 3913 and 3916. The multiplexed data 3917 is made up of the TS packets 3903, 3906, 3913, and 3916 multiplexed into a single stream.

Figure 40:
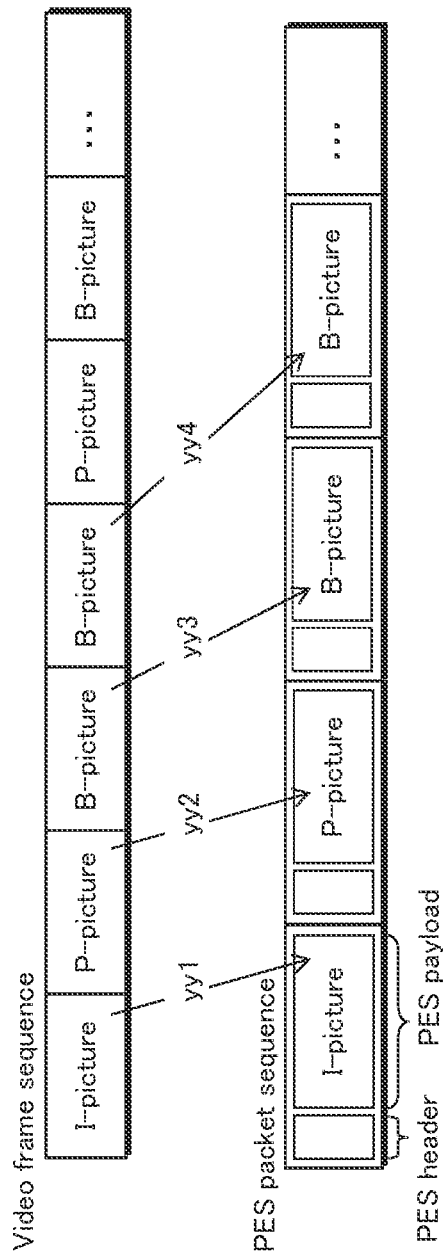
FIG. 40 is a detailed diagram illustrating a video stream as contained in a PES packet sequence.

FIG. 40 illustrates further details of a PES packet sequence as contained in the video stream. The first tier of FIG. 40 shows a video frame sequence in the video stream. The second tier shows a PES packet sequence. Arrows yy1, yy2, yy3, and yy4 indicate the plurality of Video Presentation Units, which are I-pictures, B-pictures, and P-pictures, in the video stream as divided and individually stored as the payload of a PES packet. Each PES packet has a PES header. A PES header contains a PTS (Presentation Time Stamp) at which the picture is to be displayed, a DTS (Decoding Time Stamp) at which the picture is to be decoded, and so on.

Figure 41:
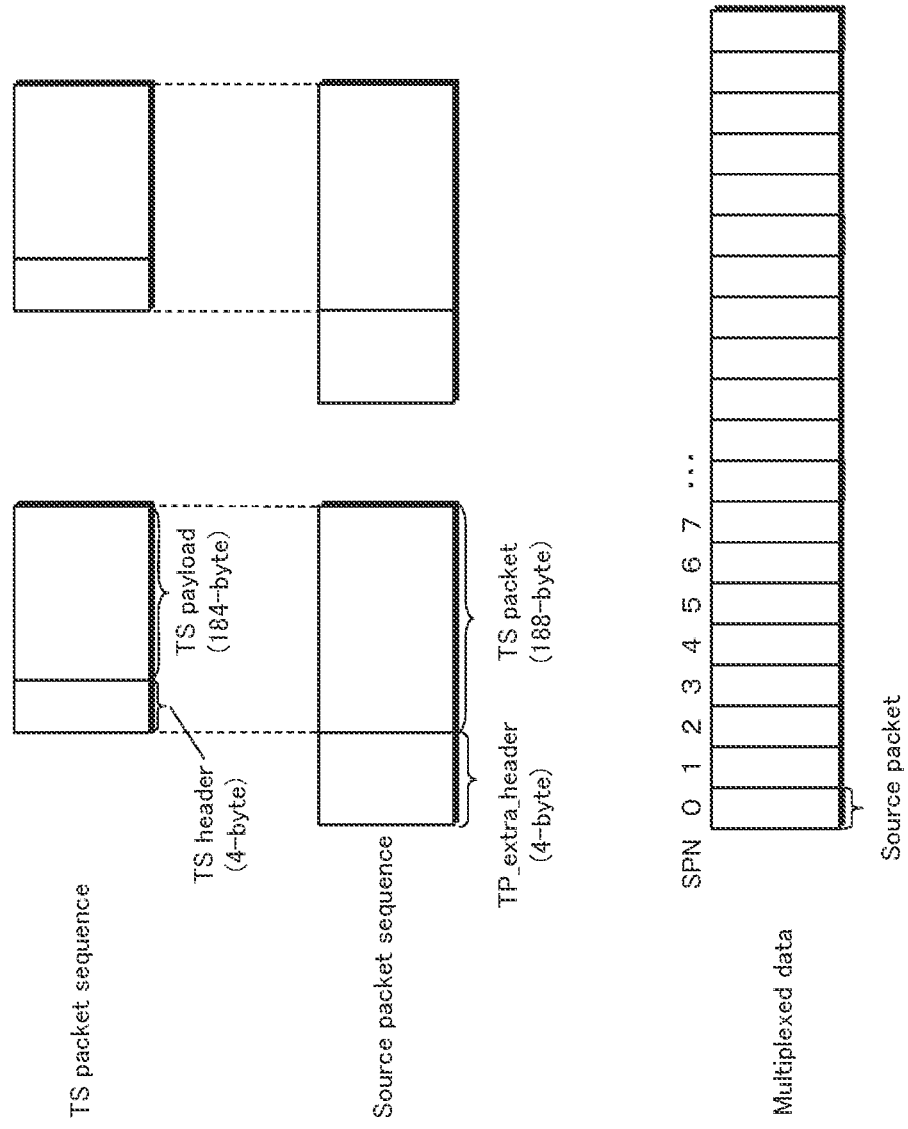
FIG. 41 is a structural diagram of TS packets and source packets in the multiplexed data.

FIG. 41 illustrates the structure of a TS packet as ultimately written into the multiplexed data. A TS packet is a 188-byte fixed-length packet made up of a 4-byte PID identifying the stream and of a 184-byte TS payload containing the data. The above-described PES packets are divided and individually stored as the TS payload. For a BD-ROM, each TS packet has a 4-byte TP_Extra_Header affixed thereto to build a 192-byte source packet, which is to be written as the multiplexed data. The TP_Extra_Header contains information such as an Arrival_Time_Stamp (ATS). The ATS indicates a time for starring transfer of the TS packet to the PID filter of a decoder. The multiplexed data are made up of source packets arranged as indicated in the bottom tier of FIG. 41. A SPN (source packet number) is incremented for each packet, beginning at the head of the multiplexed data.

In addition to the video streams, audio streams, presentation graphics streams, and the like, the TS packets included in the multiplexed data also include a PAT (Program Association Table), a PMT (Program Map Table), a PCR (Program Clock Reference) and so on. The PAT indicates the PID of a PMT used in the multiplexed data, and the PID of the PAT itself is registered as 0. The PMT includes PIDs identifying the respective streams, such as video, audio and subtitles, contained in the multiplexed data and attribute information (frame rate, aspect ratio, and the like) of the streams identified by the respective PIDs. In addition, the PMT includes various types of descriptors relating to the multiplexed data. One such descriptor may be copy control information indicating whether or not copying of the multiplexed data is permitted. The PCR includes information for synchronizing the ATC (Arrival Time Clock) serving as the chronological axis of the ATS to the STC (System Time Clock) serving as the chronological axis of the PTS and DTS. Each PCR packet includes an STC time corresponding to the ATS at which the packet is to be transferred to the decoder.

Figure 42:
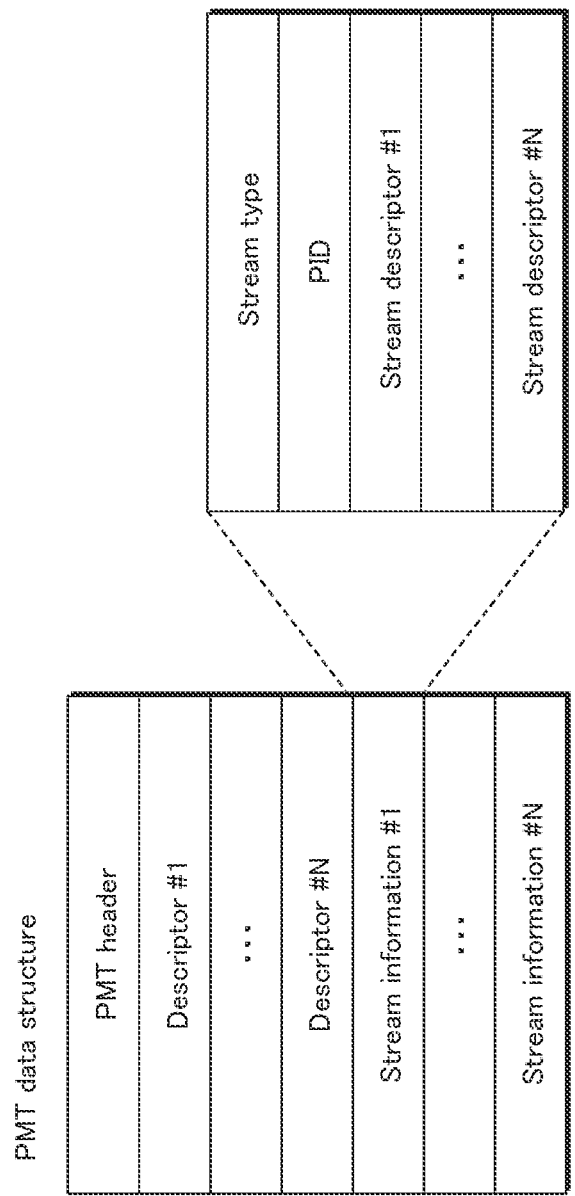
FIG. 42 illustrates PMT data configuration.

FIG. 42 illustrates the detailed data configuration of a PMT. The PMT starts with a PMT header indicating the length of the data contained in the PMT. Following the PMT header, descriptors pertaining to the multiplexed data are arranged. One example of a descriptor included in the PMT is the copy control information described above. Following the descriptors, stream information pertaining to the respective streams included in the multiplexed data is arranged. Each piece of stream information is composed of stream descriptors indicating a stream type identifying a compression codec employed for a corresponding stream, a PID for the stream, and attribute information (frame rate, aspect ratio, and the like) of the stream. The PMT includes the same number of stream descriptors as the number of streams included in the multiplexed data.

When recorded onto a recoding medium or the like, the multiplexed data are recorded along with a multiplexed data information file.

Figure 43:
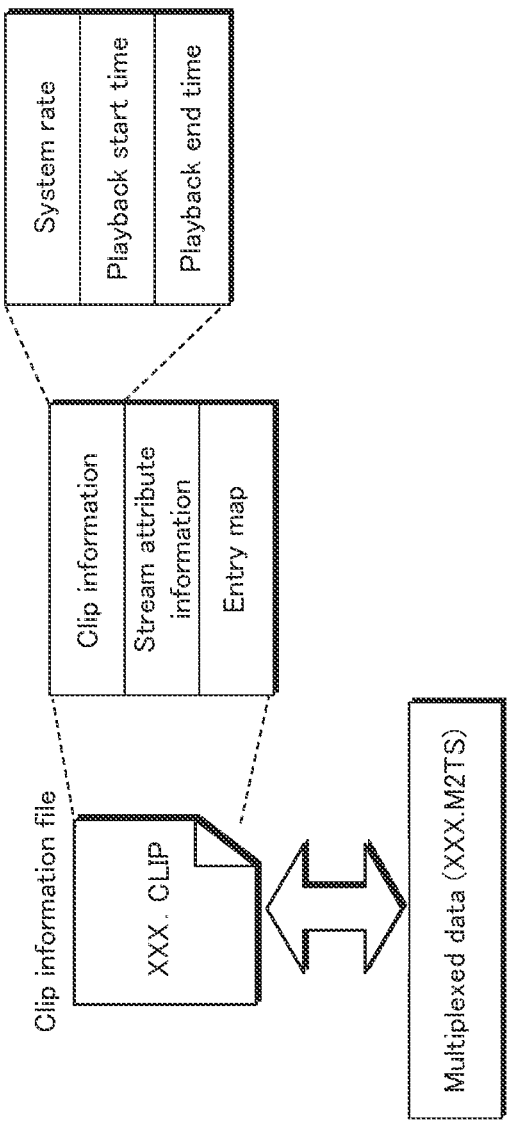
FIG. 43 illustrates information as configured in the multiplexed data.

FIG. 43 illustrates a sample configuration for the multiplexed data information file. As shown, the multiplexed data information file is management information for the multiplexed data, is provided in one-to-one correspondence with the multiplexed data, and is made up of multiplexed data information, stream attribute information, and an entry map.

The multiplexed data information is made up of a system rate, a playback start time, and a playback end time. The system rate indicates the maximum transfer rate of the multiplexed data to the PID filter of a later-described system target decoder. The multiplexed data includes ATS at an interval set so as not to exceed the system rate. The playback start time is set to the time specified by the PTS of the first video frame in the multiplexed data, whereas the playback end time is set to the time calculated by adding the playback duration of one frame to the PTS of the last video frame in the multiplexed data.

Figure 44:
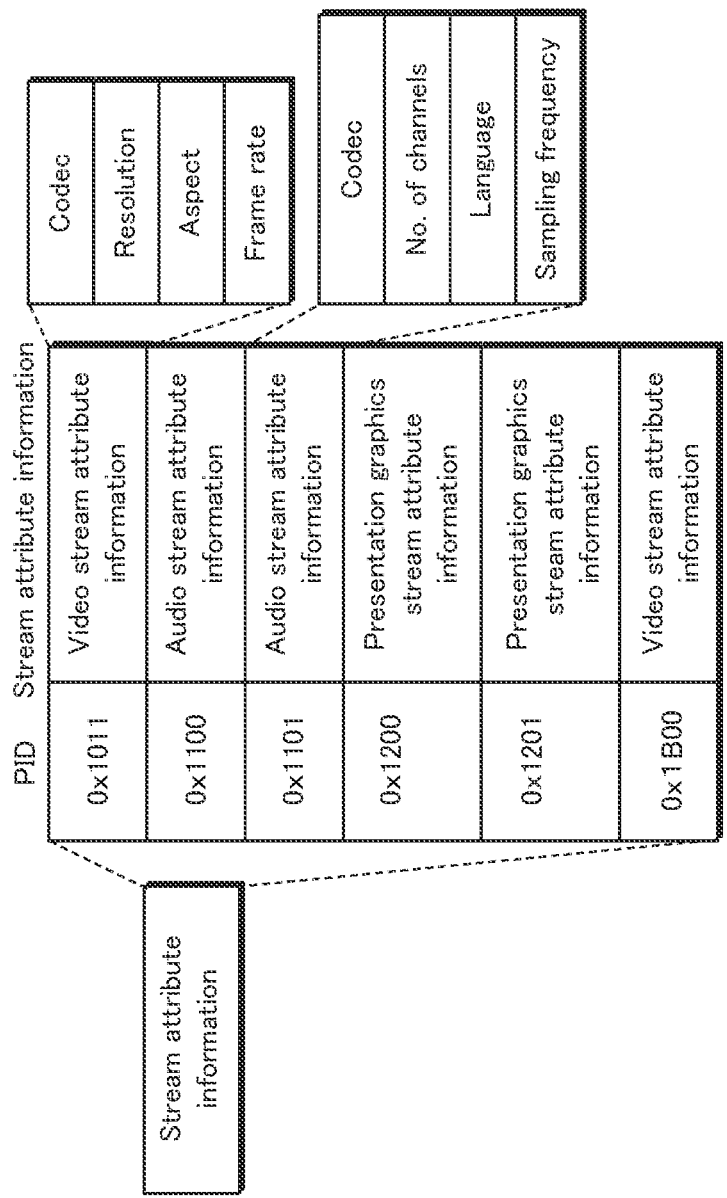
FIG. 44 illustrates the configuration of stream attribute information.

FIG. 44 illustrates a sample configuration for the stream attribute information included in the multiplexed data information file. As shown, the stream attribute information is attribute information for each stream included in the multiplexed data, registered for each PID. That is, different pieces of attribute information are provided for different streams, namely for the video streams, the audio streams, the presentation graphics streams, and the interactive graphics streams. The video stream attribute information indicates the compression codec employed to compress the video stream, the resolution of individual pictures constituting the video stream, the aspect ratio, the frame rate, and so on. The audio stream attribute information indicates the compression codec employed to compress the audio stream, the number of channels included in the audio stream, the language of the audio stream, the sampling frequency, and so on. This information is used to initialize the decoder before playback by a player.

In the present Embodiment, the stream type included in the PMT is used among the information included in the multiplexed data. When the multiplexed data are recorded on a recording medium, the video stream attribute information included in the multiplexed data information file is used. Specifically, the video coding method and device described in any of the above Embodiments may be modified to additionally include a step or unit of setting a specific piece of information in the stream type included in the PMT or in the video stream attribute information. The specific piece of information is for indicating that the video data are generated by the video coding method and device described in the Embodiment. According to such a structure, video data generated by the video coding method and device described in any of the above Embodiments is distinguishable from video data compliant with other standards.

Figure 45:
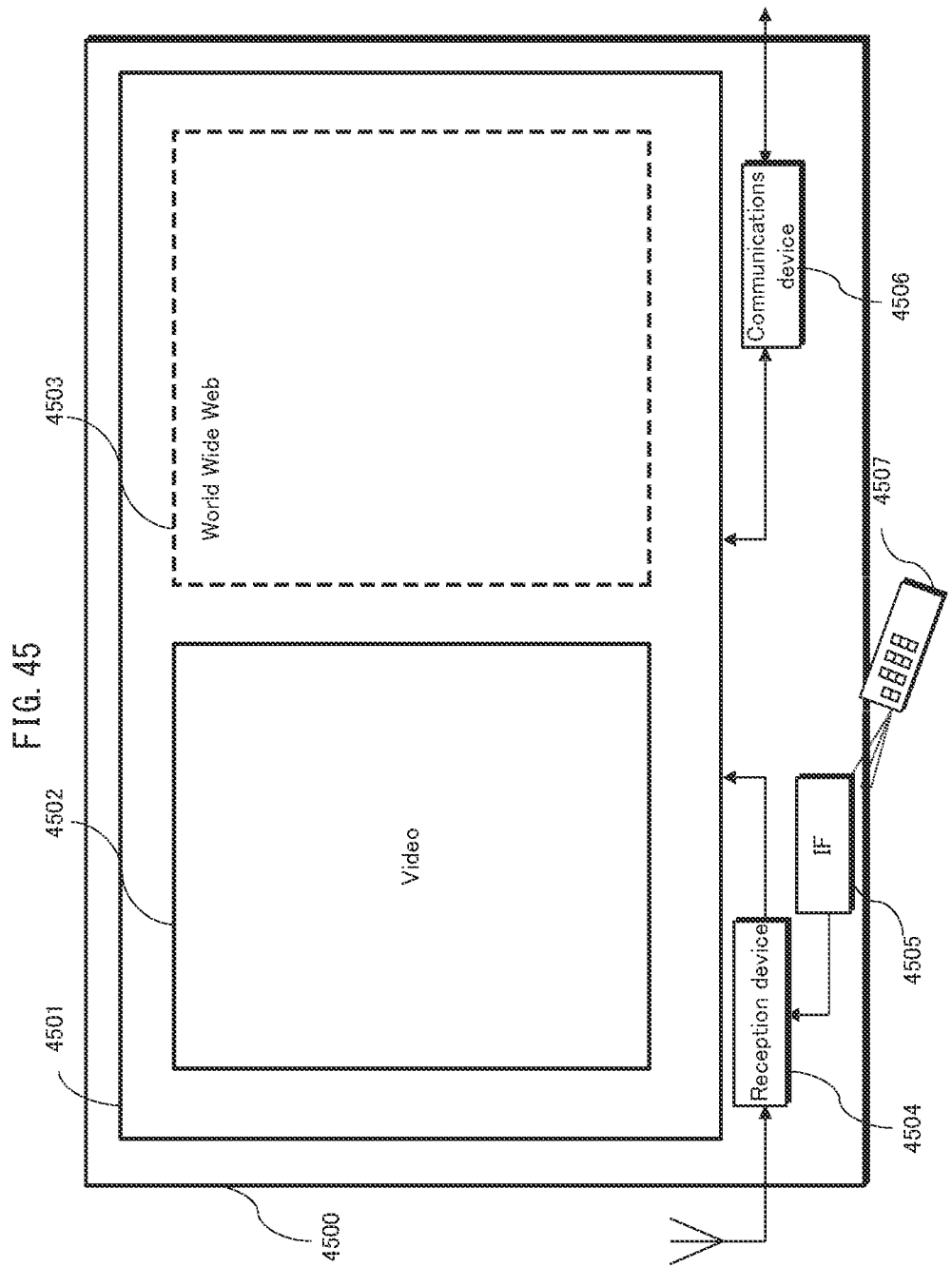
FIG. 45 illustrates the configuration of a video display and audio output device.

FIG. 45 illustrates a sample configuration of an audiovisual output device 4500 that includes a reception device 4504 receiving a modulated signal that includes audio and video data transmitted by a broadcaster (base station) or data intended for broadcasting. The configuration of the reception device 4504 corresponds to the reception device 3700 from FIG. 37. The audiovisual output device 4500 incorporates, for example, an OS (Operating System), or incorporates a communication device 4506 for connecting to the Internet (e.g., a communication device intended for a wireless LAN (Local Area Network) or for Ethernet™). As such, a video display unit 4501 is able to simultaneously display audio and video data, or video in video data for broadcast 4502, and hypertext 4503 (from the World Wide Web) provided over the Internet. By operating a remote control 4507 (alternatively, a mobile phone or keyboard), either of the video in video data for broadcast 4502 and the hypertext 4503 provided over the Internet may be selected to change operations. For example, when the hypertext 4503 provided over the Internet is selected, the website displayed may be changed by remote control operations. When audio and video data, or video in video data for broadcast 4502 is selected, information from a selected channel (selected (television) program or audio broadcast) may be transmitted by the remote control 4507. As such, an interface 4505 obtains the information transmitted by the remote control. The reception device 4504 performs processing such as demodulation and error-correction corresponding to the selected channel, thereby obtaining the received data. At this point, the reception device 4504 obtains control symbol information that includes information on the transmission method (as described using FIG. 5) from control symbols included the signal corresponding to the selected channel. As such, the reception device 4504 is able to correctly set the reception operations, demodulation scheme, error-correction method and so on, thus enabling the data included in the data symbols transmitted by the broadcaster (base station) to be obtained. Although the above description is given for an example of the user using the remote control 4507, the same operations apply when the user presses a selection key embedded in the audiovisual output device 4500 to select a channel.

In addition, the audiovisual output device 4500 may be operated using the Internet. For example, the audiovisual output device 4500 may be made to record (store) a program through another terminal connected to the Internet. (Accordingly, the audiovisual output device 4500 should include the drive 3708 from FIG. 37.) The channel is selected before recording begins. As such, the reception device 4504 performs processing such as demodulation and error-correction corresponding to the selected channel, thereby obtaining the received data. At this point, the reception device 4504 obtains control symbol information that includes information on the transmission method (the transmission method, modulation scheme, error-correction method, and so on from the above-described Embodiments) (as described using FIG. 5) from control symbols included the signal corresponding to the selected channel. As such, the reception device 4504 is able to correctly set the reception operations, demodulation scheme, error-correction method and so on, thus enabling the data included in the data symbols transmitted by the broadcaster (base station) to be obtained.

(Supplement)

The present description considers a communications/broadcasting device such as a broadcaster, a base station, an access point, a terminal, a mobile phone, or the like provided with the transmission device, and a communications device such as a television, radio, terminal, personal computer, mobile phone, access point, base station, or the like provided with the reception device. The transmission device and the reception device pertaining to the present invention are communication devices in a form able to execute applications, such as a television, radio, personal computer, mobile phone, or similar, through connection to some sort of interface (e.g., USB).

Furthermore, in the present Embodiment, symbols other than data symbols, such as pilot symbols (namely preamble, unique word, postamble, reference symbols, scattered pilot symbols and so on), symbols intended for control information, and so on may be freely arranged within the frame. Although pilot symbols and symbols intended for control information are presently named, such symbols may be freely named otherwise as the function thereof remains the important consideration.

Provided that a pilot symbol, for example, is a known symbol modulated with PSK modulation in the transmitter and receiver (alternatively, the receiver may be synchronized such that the receiver knows the symbols transmitted by the transmitter), the receiver is able to use this symbol for frequency synchronization, time synchronization, channel estimation (CSI (Channel State Information) estimation for each modulated signal), signal detection, and the like.

The symbols intended for control information are symbols transmitting information (such as the modulation scheme, error-correcting coding method, coding rate of error-correcting codes, and setting information for the top layer used in communications) that is transmitted to the receiving party in order to execute transmission of non-data (i.e., applications).

The present invention is not limited to the Embodiments, but may also be realized in various other ways. For example, while the above Embodiments describe communication devices, the present invention is not limited to such devices and may be implemented as software for the corresponding communications method.

Although the above-described Embodiments describe phase changing methods for methods of transmitting two modulated signals from two antennas, no limitation is intended in this regard. Precoding and a change of phase may be performed on four signals that have been mapped to generate four modulated signals transmitted using four antennas. That is, the present invention is applicable to performing a change of phase on N signals that have been mapped and precoded to generate N modulated signals transmitted using N antennas.

Although the above-described Embodiments describe examples of systems where two modulated signals are transmitted from two antennas and received by two respective antennas in a MIMO communications system, the present invention is not limited in this regard and is also applicable to MISO (Multiple Input Single Output) communications systems. In a MISO system, the reception device does not include antenna 701_Y, wireless unit 703_Y, channel fluctuation estimator 707_1 for modulated signal z1, and channel fluctuation estimator 707_2 for modulated signal z2 from FIG. 7. However, the processing described in Embodiment 1 may still be executed to estimate r1 and r2. Technology for receiving and decoding a plurality of signals transmitted simultaneously at a common frequency are received by a single antenna is widely known. The present invention is additional processing supplementing conventional technology for a signal processor reverting a phase changed by the transmitter.

Although the present invention describes examples of systems where two modulated signals are transmitted from two antennas and received by two respective antennas in a MIMO communications system, the present invention is not limited in this regard and is also applicable to MISO systems. In a MISO system, the transmission device performs precoding and change of phase such that the points described thus far are applicable. However, the reception device does not include antenna 701_Y, wireless unit 703_Y, channel fluctuation estimator 707_1 for modulated signal z1, and channel fluctuation estimator 707_2 for modulated signal z2 from FIG. 7. However, the processing described in the present description may still be executed to estimate the data transmitted by the transmission device. Technology for receiving and decoding a plurality of signals transmitted simultaneously at a common frequency are received by a single antenna is widely known (a single-antenna receiver may apply ML operations (Max-log APP or similar)). The present invention may have the signal processor 711 from FIG. 7 perform demodulation (detection) by taking the precoding and change of phase applied by the transmitter into consideration.

The present description uses terms such as precoding, precoding weights, precoding matrix, and so on. The terminology itself may be otherwise (e.g., may be alternatively termed a codebook) as the key point of the present invention is the signal processing itself.

Furthermore, although the present description discusses examples mainly using OFDM as the transmission method, the invention is not limited in this manner. Multi-carrier methods other than OFDM and single-carrier methods may all be used to achieve similar Embodiments. Here, spread-spectrum communications may also be used. When single-carrier methods are used, the change of phase is performed with respect to the time domain.

In addition, although the present description discusses the use of ML operations, APP, Max-log APP, ZF, MMSE and so on by the reception device, these operations may all be generalized as wave detection, demodulation, detection, estimation, and demultiplexing as the soft decision results (log-likelihood and log-likelihood ratio) and the hard decision results (zeroes and ones) obtained thereby are the individual bits of data transmitted by the transmission device.

Different data may be transmitted by each stream $s1(t)$ and $s2(t)$ ($s1(i)$, $s2(i)$), or identical data may be transmitted thereby.

The two stream baseband signals $s1(i)$ and $s2(i)$ (where i indicates sequence (with respect to time or (carrier) frequency)) undergo precoding and a regular change of phase (the order of operations may be freely reversed) to generate two post-processing baseband signals $z1(i)$ and $z2(i)$. For post-processing baseband signal $z1(i)$, the in-phase component I is $I_1(i)$ while the quadrature component is $Q_1(i)$, and for post processing baseband signal $z2(i)$, the in-phase component is $I_1(i)$ while the quadrature component is $Q_2(i)$. The baseband components may be switched, as long as the following holds.

Let the in-phase component and the quadrature component of switched baseband signal $r1(i)$ be $I_1(i)$ and $Q_2(i)$, and the in-phase component and the quadrature component of switched baseband signal $r2(i)$ be $I_2(i)$ and $Q_1(i)$.
The modulated signal corresponding to switched baseband signal $r1(i)$ is transmitted by transmit antenna 1 and the modulated signal corresponding to switched baseband signal $r2(i)$ is transmitted from transmit antenna 2, simultaneously on a common frequency. As such, the modulated signal corresponding to switched baseband signal $r1(i)$ and the modulated signal corresponding to switched baseband signal $r2(i)$ are transmitted from different antennas, simultaneously on a common frequency. Alternatively, For switched baseband signal $r1(i)$, the in-phase component may be $I_1(i)$ while the quadrature component may be $I_2(i)$, and for switched baseband signal $r2(i)$, the in-phase component may be $Q_1(i)$ while the quadrature component may be $Q_2(i)$.

For switched baseband signal $r1(i)$, the in-phase component may be $I_2(i)$ while the quadrature component may be $I_1(i)$, and for switched baseband signal $r2(i)$, the in-phase component may be $Q_1(i)$ while the quadrature component may be $Q_2(i)$.

For switched baseband signal $r1(i)$, the in-phase component may be $I_1(i)$ while the quadrature component may be $I_2(i)$, and for switched baseband signal $r2(i)$, the in-phase component may be $Q_2(i)$ while the quadrature component may be $Q_1(i)$.

For switched baseband signal $r1(i)$, the in-phase component may be $I_2(i)$ while the quadrature component may be $I_1(i)$, and for switched baseband signal $r2(i)$, the in-phase component may be $Q_2(i)$ while the quadrature component may be $Q_1(i)$.

For switched baseband signal $r1(i)$, the in-phase component may be $I_1(i)$ while the quadrature component may be $Q_2(i)$, and for switched baseband signal $r2(i)$, the in-phase component may be $Q_1(i)$ while the quadrature component may be $I_2(i)$.

For switched baseband signal $r1(i)$, the in-phase component may be $Q_2(i)$ while the quadrature component may be $I_1(i)$, and for switched baseband signal $r2(i)$, the in-phase component may be $I_2(i)$ while the quadrature component may be $Q_1(i)$.

For switched baseband signal $r1(i)$, the in-phase component may be $Q_2(i)$ while the quadrature component may be $I_1(i)$, and for switched baseband signal $r2(i)$, the in-phase component may be $Q_1(i)$ while the quadrature component may be $I_2(i)$.

For switched baseband signal $r2(i)$, the in-phase component may be $I_1(i)$ while the quadrature component may be $I_2(i)$, and for switched baseband signal $r1(i)$, the in-phase component may be $Q_1(i)$ while the quadrature component may be $Q_2(i)$.

For switched baseband signal $r2(i)$, the in-phase component may be $I_2(i)$ while the quadrature component may be $I_1(i)$, and for switched baseband signal $r1(i)$, the in-phase component may be $Q_1(i)$ while the quadrature component may be $Q_2(i)$.

For switched baseband signal $r2(i)$, the in-phase component may be $I_1(i)$ while the quadrature component may be $I_2(i)$, and for switched baseband signal $r1(i)$, the in-phase component may be $Q_2(i)$ while the quadrature component may be $Q_1(i)$.

For switched baseband signal $r2(i)$, the in-phase component may be $I_2(i)$ while the quadrature component may be $I_1(i)$, and for switched baseband signal $r1(i)$, the in-phase component may be $Q_2(i)$ while the quadrature component may be $Q_1(i)$.

For switched baseband signal $r2(i)$, the in-phase component may be $I_1(i)$ while the quadrature component may be $Q_2(i)$, and for switched baseband signal $r1(i)$, the in-phase component may be $I_2(i)$ while the quadrature component may be $Q_1(i)$.

For switched baseband signal $r2(i)$, the in-phase component may be $I_1(i)$ while the quadrature component may be $Q_2(i)$, and for switched baseband signal $r1(i)$, the in-phase component may be $Q_1(i)$ while the quadrature component may be $I_2(i)$.

For switched baseband signal $r2(i)$, the in-phase component may be $Q_2(i)$ while the quadrature component may be $I_1(i)$, and for switched baseband signal $r1(i)$, the in-phase component may be $I_2(i)$ while the quadrature component may be $Q_1(i)$.

For switched baseband signal $r2(i)$, the in-phase component may be $Q_2(i)$ while the quadrature component may be $I_1(i)$, and for switched baseband signal $r1(i)$, the in-phase component may be $Q_1(i)$ while the quadrature component may be $I_2(i)$.

Alternatively, although the above description discusses performing two types of signal processing on both stream signals so as to switch the in-phase component and quadrature component of the two signals, the invention is not limited in this manner. The two types of signal processing may be performed on more than two streams, so as to switch the in-phase component and quadrature component thereof.

Alter, while the above examples describe switching performed on baseband signals having a common timestamp (common (sub-)carrier) frequency), the baseband signals being switched need not necessarily have a common timestamp (common (sub-)carrier) frequency). For example, any of the following are possible.

For switched baseband signal $r1(i)$, the in-phase component may be $I_1(i+v)$ while the quadrature component may be $Q_2(i+w)$, and for switched baseband signal $r2(i)$, the in-phase component may be $I_2(i+w)$ while the quadrature component may be $Q_1(i+v)$.

For switched baseband signal $r1(i)$, the in-phase component may be $I_1(i+v)$ while the quadrature component may be $Q_2(i+w)$, and for switched baseband signal $r2(i)$, the in-phase component may be $Q_1(i+v)$ while the quadrature component may be $Q_2(i+w)$.

For switched baseband signal $r1(i)$, the in-phase component may be $I_2(i+v)$ while the quadrature component may be $Q_1(i+w)$, and for switched baseband signal r2(i), the in-phase component may be $Q_1(i+v)$ while the quadrature component may be $Q_2(i+w)$.

For switched baseband signal r1(i), the in-phase component may be $I_1(i+v)$ while the quadrature component may be $Q_2(i+w)$, and for switched baseband signal r2(i), the in-phase component may be $Q_2(i+w)$ while the quadrature component may be $Q_1(i+v)$.

For switched baseband signal r1(i), the in-phase component may be $I_2(i+v)$ while the quadrature component may be $Q_1(i+w)$, and for switched baseband signal r2(i), the in-phase component may be $Q_2(i+w)$ while the quadrature component may be $Q_1(i+v)$.

For switched baseband signal r1(i), the in-phase component may be $I_1(i+v)$ while the quadrature component may be $Q_2(i+w)$, and for switched baseband signal r2(i), the in-phase component may be $Q_1(i+v)$ while the quadrature component may be $I_2(i+w)$.

For switched baseband signal r1(i), the in-phase component may be $Q_2(i+w)$ while the quadrature component may be $I_1(i+v)$, and for switched baseband signal r2(i), the in-phase component may be $I_2(i+w)$ while the quadrature component may be $Q_1(i+v)$.

For switched baseband signal r1(i), the in-phase component may be $Q_2(i+w)$ while the quadrature component may be $I_1(i+v)$, and for switched baseband signal r2(i), the in-phase component may be $Q_1(i+v)$ while the quadrature component may be $I_2(i+w)$.

For switched baseband signal r2(i), the in-phase component may be $I_1(i+v)$ while the quadrature component may be $Q_2(i+w)$, and for switched baseband signal r1(i), the in-phase component may be $Q_1(i+v)$ while the quadrature component may be $Q_2(i+w)$.

For switched baseband signal r2(i), the in-phase component may be $I_2(i+v)$ while the quadrature component may be $Q_1(i+w)$, and for switched baseband signal r1(i), the in-phase component may be $Q_1(i+v)$ while the quadrature component may be $Q_2(i+w)$.

For switched baseband signal r2(i), the in-phase component may be $I_1(i+v)$ while the quadrature component may be $Q_2(i+w)$, and for switched baseband signal r1(i), the in-phase component may be $Q_2(i+w)$ while the quadrature component may be $Q_1(i+v)$.

For switched baseband signal r2(i), the in-phase component may be $I_2(i+v)$ while the quadrature component may be $Q_1(i+w)$, and for switched baseband signal r1(i), the in-phase component may be $Q_2(i+w)$ while the quadrature component may be $Q_1(i+v)$.

For switched baseband signal r2(i), the in-phase component may be $I_1(i+v)$ while the quadrature component may be $Q_2(i+w)$, and for switched baseband signal r1(i), the in-phase component may be $Q_1(i+v)$ while the quadrature component may be $I_2(i+w)$.

For switched baseband signal r2(i), the in-phase component may be $Q_2(i+w)$ while the quadrature component may be $I_1(i+v)$, and for switched baseband signal r1(i), the in-phase component may be $I_2(i+w)$ while the quadrature component may be $Q_1(i+v)$.

For switched baseband signal r2(i), the in-phase component may be $Q_2(i+w)$ while the quadrature component may be $I_1(i+v)$, and for switched baseband signal r1(i), the in-phase component may be $Q_1(i+v)$ while the quadrature component may be $I_2(i+w)$.

Figure 55:
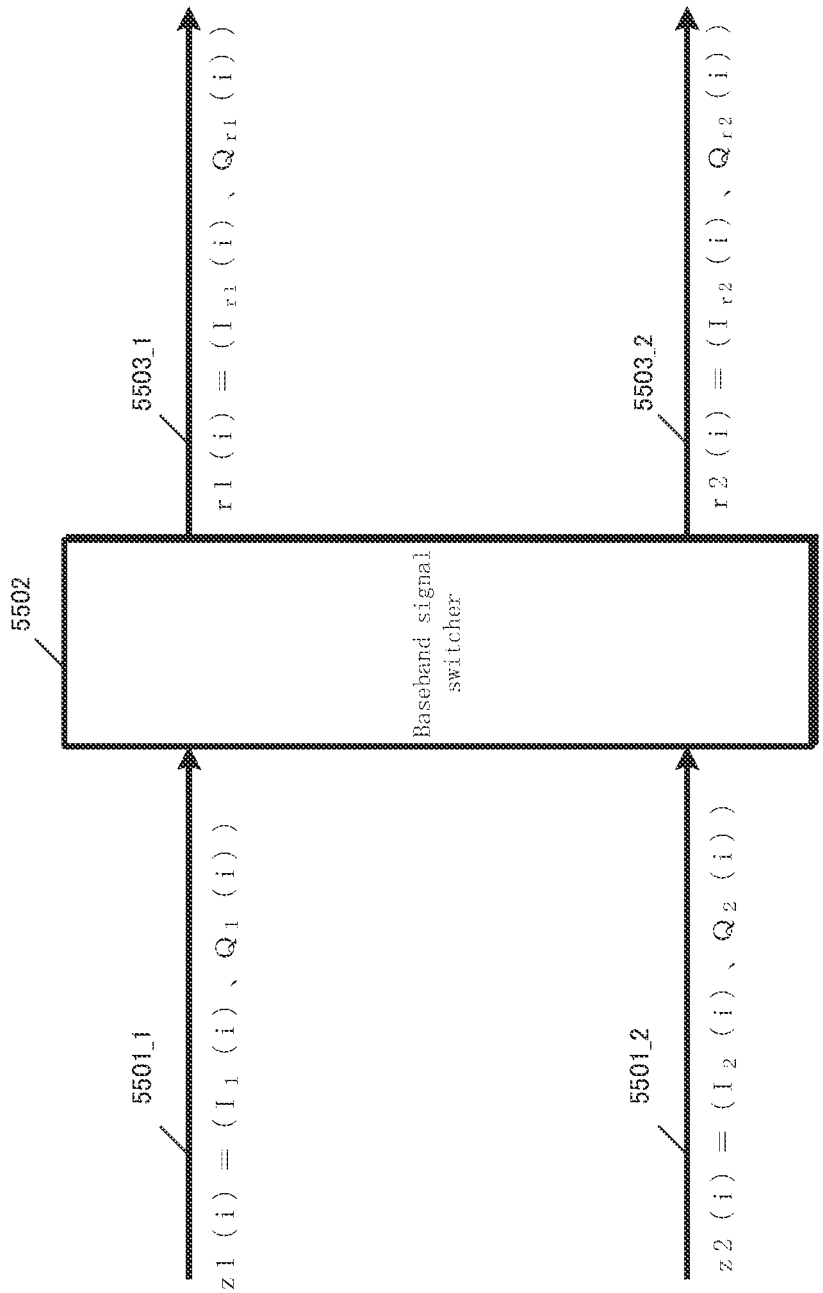
FIG. 55 illustrates a baseband signal switcher.

FIG. 55 illustrates a baseband signal switcher 5502 explaining the above. As shown, of the two processed baseband signals z1(i) 5501_1 and z2(i) 5501_2, processed baseband signal z1(i) 5501_1 has in-phase component $I_1(i)$ and quadrature component $Q_1(i)$, while processed baseband signal z2(i) 5501_2 has in-phase component $I_2(i)$ and quadrature component $Q_2(i)$. Then, after switching, switched baseband signal r1(i) 5503_1 has in-phase component $I_{r1}(i)$ and quadrature component $Q_{r1}(i)$, while switched baseband signal r2(i) 5503_2 has in-phase component $I_{r2}(i)$ and quadrature component $Q_{r2}(i)$. The in-phase component $I_{r1}(i)$ and quadrature component $Q_{r1}(i)$ of switched baseband signal r1(i) 5503_1 and the in-phase component $I_{r2}(i)$ and quadrature component $Q_{r2}(i)$ of switched baseband signal r2(i) 5503_2 may be expressed as any of the above. Although this example describes switching performed on baseband signals having a common timestamp (common ((sub-)carrier) frequency) and having undergone two types of signal processing, the same may be applied to baseband signals having undergone two types of signal processing but having different timestamps (different ((sub-)carrier) frequencies).

Each of the transmit antennas of the transmission device and each of the receive antennas of the reception device shown in the figures may be formed by a plurality of antennas.

The present description uses the symbol ∀, which is the universal quantifier, and the symbol ∃, which is the existential quantifier.

Furthermore, the present description uses the radian as the unit of phase in the complex plane, e.g., for the argument thereof.

When dealing with the complex plane, the coordinates of complex numbers are expressible by way of polar coordinates. For a complex number z=a+jb (where a and b are real numbers and j is the imaginary unit), the corresponding point (a, b) on the complex plane is expressed with the polar coordinates [r, θ], converted as follows:

$$a = r \times \cos\theta$$

$$b = r \times \sin\theta$$

[Math. 49]

$$r = \sqrt{a^2 + b^2} \quad \text{(formula 49)}$$

where r is the absolute value of z (r=|z|), and θ is the argument thereof. As such, z=a+jb is expressible as $re^{j\theta}$.

In the present invention, the baseband signals s1, s2, z1, and z2 are described as being complex signals. A complex signal made up of in-phase signal I and quadrature signal Q is also expressible as complex signal I+jQ. Here, either of I and Q may be equal to zero.

Figure 46:
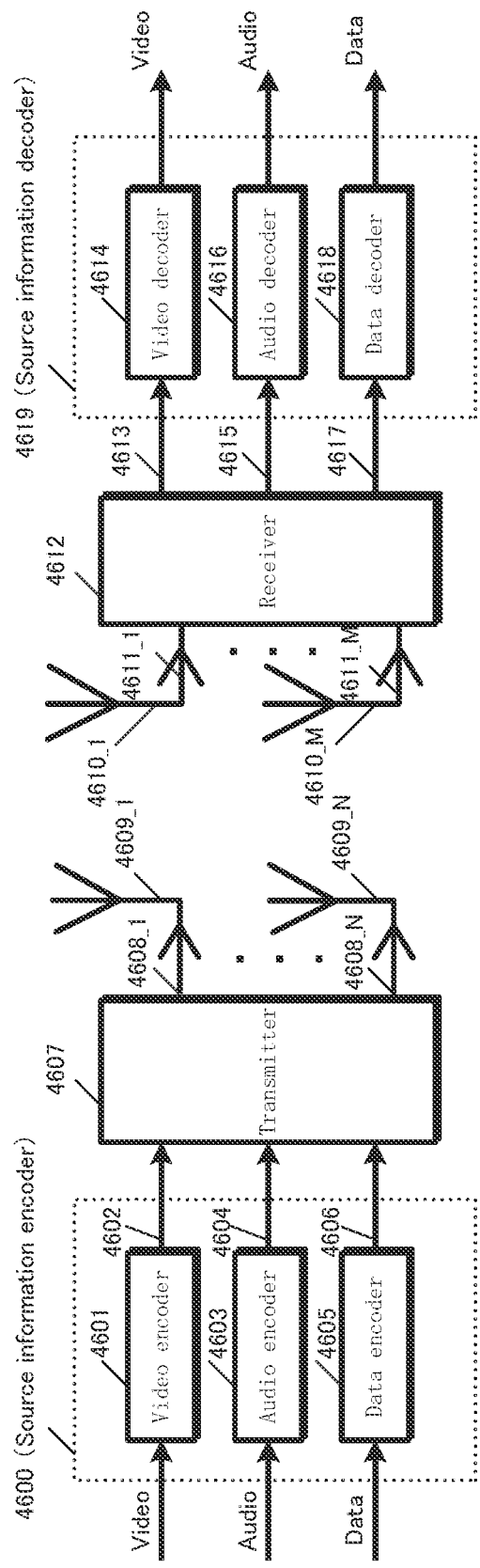
FIG. 46 illustrates a sample configuration of a communications system.

FIG. 46 illustrates a sample broadcasting system using the phase changing method described in the present description. As shown, a video encoder 4601 takes video as input, performs video encoding, and outputs encoded video data 4602. An audio encoder 4603 takes audio as input, performs audio encoding, and outputs encoded audio data 4604. A data encoder 4605 takes data as input, performs data encoding (e.g., data compression), and outputs encoded data 4606. Taken as a whole, these components form a source information encoder 4600.

A transmitter 4607 takes the encoded video data 4602, the encoded audio data 4604, and the encoded data 4606 as input, performs error-correcting coding, modulation, precoding, and phase changing (e.g., the signal processing by the transmission device from FIG. 3) on a subset of or on the entirety of these, and outputs transmit signals 4608_1 through 4608_N. Transmit signals 4608_1 through 4608_N are then transmitted by antennas 4609_1 through 4609_N as radio waves.

A receiver 4612 takes received signals 4611_1 through 4611_M received by antennas 4610_1 through 4610_M as input, performs processing such as frequency conversion, change of phase, decoding of the precoding, log-likelihood ratio calculation, and error-correcting decoding (e.g., the processing by the reception device from FIG. 7), and outputs received data 4613, 4615, and 4617. A source information decoder 4619 takes the received data 4613, 4615, and 4617 as input. A video decoder 4614 takes received data 4613 as input, performs video decoding, and outputs a video signal. The video is then displayed on a television display. An audio decoder 4616 takes received data 4615 as input. The audio decoder 4616 performs audio decoding and outputs an audio signal. the audio is then played through speakers. A data decoder 4618 takes received data 4617 as input, performs data decoding, and outputs information.

In the above-described Embodiments pertaining to the present invention, the number of encoders in the transmission device using a multi-carrier transmission method such as OFDM may be any number, as described above. Therefore, as in FIG. 4, for example, the transmission device may have only one encoder and apply a method of distributing output to the multi-carrier transmission method such as OFDM. In such circumstances, the wireless units 310A and 310B from FIG. 4 should replace the OFDM-related processors 1301A and 1301B from FIG. 12. The description of the OFDM-related processors is as given for Embodiment 1.

Although Embodiment 1 gives Math. 36 (formula 36) as an example of a precoding matrix, another precoding matrix may also be used, when the following method is applied.

[Math. 50]

$$\begin{pmatrix} w11 & w12 \\ w21 & w22 \end{pmatrix} = \frac{1}{\sqrt{\alpha^2 + 1}} \begin{pmatrix} e^{j0} & \alpha \times e^{j\pi} \\ \alpha \times e^{j0} & e^{j0} \end{pmatrix} \quad \text{(formula 50)}$$

In the precoding matrices of Math. 36 (formula 36) and Math. 50 (formula 50), the value of $\alpha$ is set as given by Math. 37 (formula 37) and Math. 38 (formula 38). However, no limitation is intended in this manner. A simple precoding matrix is obtainable by setting $\alpha=1$, which is also a valid value.

In Embodiment A1, the phase changers from FIGS. 3, 4, 6, 12, 25, 29, 51, and 53 are indicated as having a phase changing value of PHASE[i] (where i=0, 1, 2, ..., N−2, N−1 (i being an integer between 0 and N−1)) to achieve a period (cycle) of N (value reached given that FIGS. 3, 4, 6, 12, 25, 29, 51, and 53 perform a change of phase on only one baseband signal). The present description discusses performing a change of phase on one precoded baseband signal (i.e., in FIGS. 3, 4, 6, 12, 25, 29, 51 and 53) namely on precoded baseband signal z2'. Here, PHASE[k] is calculated as follows.

[Math. 51]

$$\text{PHASE}[k] = \frac{2k\pi}{N} \text{ radians} \quad \text{(formula 51)}$$

where k=0, 1, 2, ..., N−2, N−1 (k being an integer between 0 and N−1). When N=5, 7, 9, 11, or 15, the reception device is able to obtain good data reception quality.

Although the present description discusses the details of phase changing methods involving two modulated signals transmitted by a plurality of antennas, no limitation is intended in this regard. Precoding and a change of phase may be performed on three or more baseband signals on which mapping has been performed according to a modulation scheme, followed by predetermined processing on the post-phase change baseband signals and transmission using a plurality of antennas, to realize the same results.

Programs for executing the above transmission method may, for example, be stored in advance in ROM (Read-Only Memory) and be read out for operation by a CPU.

Furthermore, the programs for executing the above transmission method may be stored on a computer-readable recording medium, the programs stored in the recording medium may be loaded in the RAM (Random Access Memory) of the computer, and the computer may be operated in accordance with the programs.

The components of the above-described Embodiments may be typically assembled as an LSI (Large Scale Integration), a type of integrated circuit. Individual components may respectively be made into discrete chips, or a subset or entirety of the components may be made into a single chip. Although an LSI is mentioned above, the terms IC (Integrated Circuit), system LSI, super LSI, or ultra LSI may also apply, depending on the degree of integration. Furthermore, the method of integrated circuit assembly is not limited to LSI. A dedicated circuit or a general-purpose processor may be used. After LSI assembly, a FPGA (Field Programmable Gate Array) or reconfigurable processor may be used.

Furthermore, should progress in the field of semiconductors or emerging technologies lead to replacement of LSI with other integrated circuit methods, then such technology may of course be used to integrate the functional blocks. Applications to biotechnology are also plausible.

Embodiment C1

Embodiment 1 explained that the precoding matrix in use may be switched when transmission parameters change. The present Embodiment describes a detailed example of such a case, where, as described above (in the supplement), the transmission parameters change such that streams s1($t$) and s2($t$) switch between transmitting different data and transmitting identical data, and the precoding matrix and phase changing method being used are switched accordingly.

The example of the present Embodiment describes a situation where two modulated signals transmitted from two different transmit antenna alternate between having the modulated signals include identical data and having the modulated signals each include different data.

Figure 56:
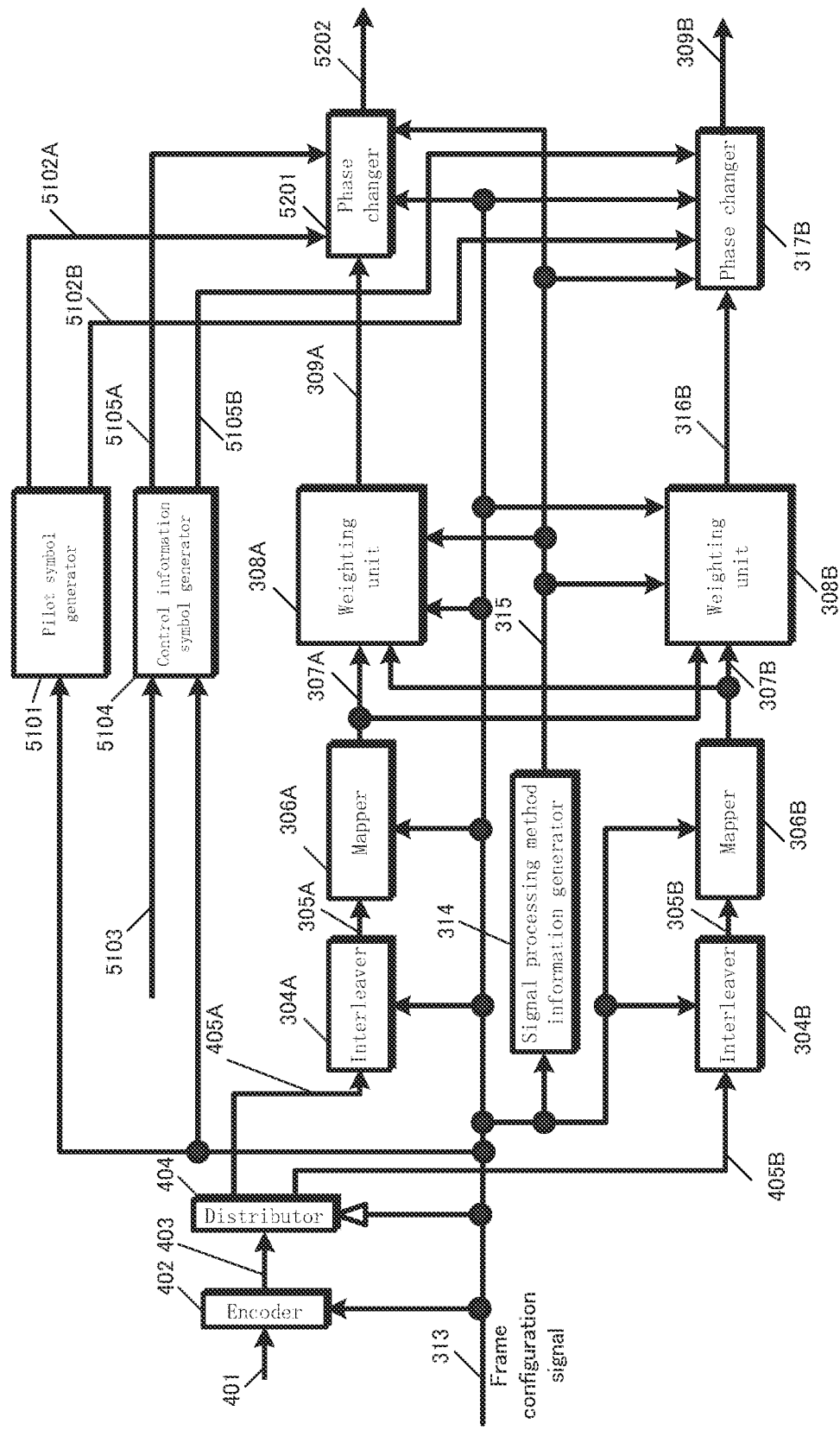
FIG. 56 illustrates yet still a further sample configuration of a transmission device.

FIG. 56 illustrates a sample configuration of a transmission device switching between transmission methods, as described above. In FIG. 56, components operating in the manner described for FIG. 54 use identical reference numbers. As shown, FIG. 56 differs from FIG. 54 in that a distributor 404 takes the frame configuration signal 313 as input. The operations of the distributor 404 are described using FIG. 57.

Figure 57:
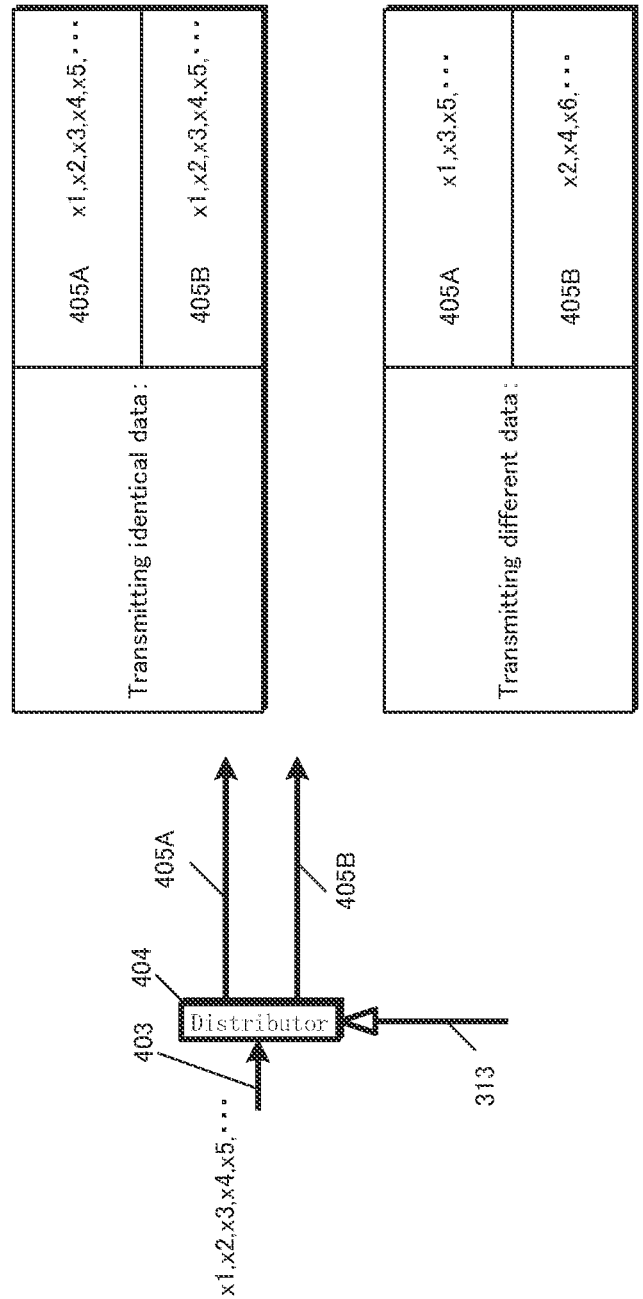
FIG. 57 illustrates sample operations of a distributor.

FIG. 57 illustrates the operations of the distributor 404 when transmitting identical data and when transmitting different data. As shown, given encoded data x1, x2, x3, x4, x5, x6, and so on, when transmitting identical data, distributed data 405 is given as x1, x2, x3, x4, x5, x6, and so on, while distributed data 405B is similarly given as x1, x2, x3, x4, x5, x6, and so on.

On the other hand, when transmitting different data, distributed data 405A are given as x1, x3, x5, x7, x9, and so on, while distributed data 405B are given as x2, x4, x6, x8, x10, and so on.

The distributor 404 determines, according to the frame configuration signal 313 taken as input, whether the transmission mode is identical data transmission or different data transmission.

Figure 58:
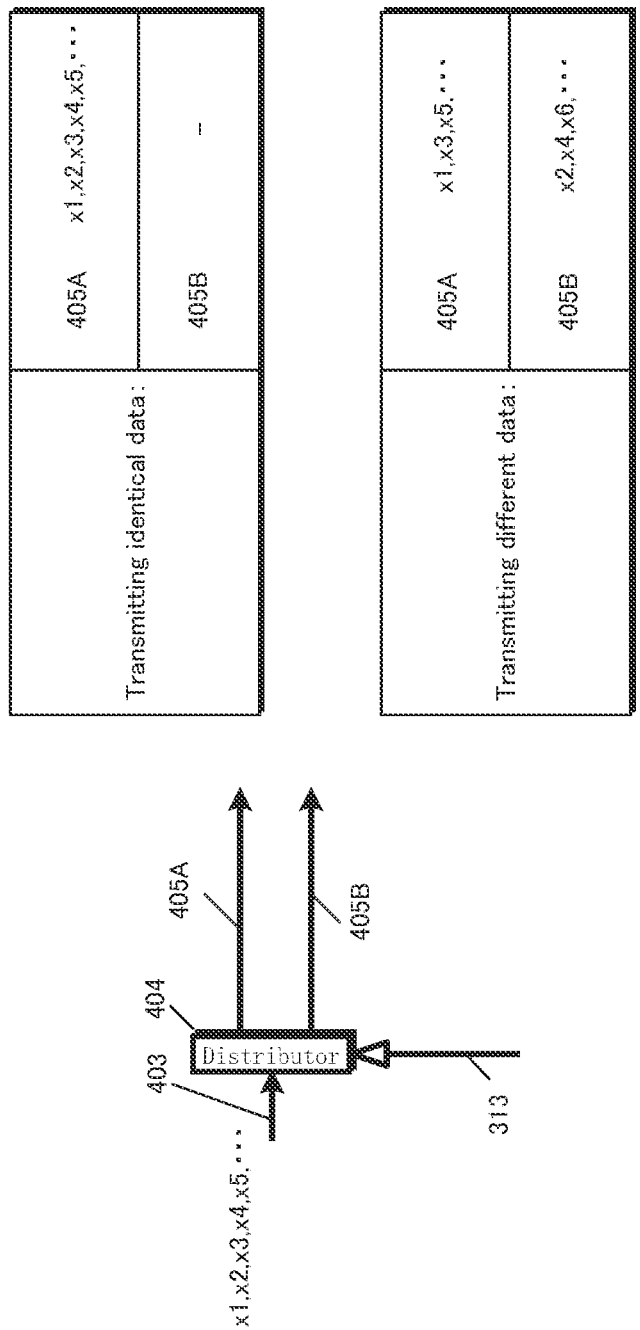
FIG. 58 illustrates further sample operations of a distributor.

An alternative method to the above is shown in FIG. 58. As shown, when transmitting identical data, the distributor 404 outputs distributed data 405A as x1, x2, x3, x4, x5, x6, and so on, while outputting nothing as distributed data 405B. Accordingly, when the frame configuration signal 313 indicates identical data transmission, the distributor 404 operates as described above, while interleaver 304B and mapper 306B from FIG. 56 do not operate. Thus, only baseband signal 307A output by mapper 306A from FIG. 56 is valid, and is taken as input by both weighting unit 308A and 308B.

One characteristic feature of the present Embodiment is that, when the transmission mode switches from identical data transmission to different data transmission, the precoding matrix may also be switched. As indicated by Math. 36 (formula 36) and Math. 39 (formula 39) in Embodiment 1, given a matrix made up of w11, w12, w21, and w22, the precoding matrix used to transmit identical data may be as follows.

[Math. 52]

$$\begin{pmatrix} w11 & w12 \\ w21 & w22 \end{pmatrix} = \begin{pmatrix} a & 0 \\ 0 & a \end{pmatrix} \quad \text{(formula 52)}$$

where a is a real number (a may also be a complex number, but given that the baseband signal input as a result of precoding undergoes a change of phase, a real number is preferable for considerations of circuit size and complexity reduction). Also, when a is equal to one, the weighting units 308A and 308B do not perform weighting and output the input signal as-is.

Accordingly, when transmitting identical data, the weighted baseband signals 309A and 316B are identical signals output by the weighting units 308A and 308B.

When the frame configuration signal 313 indicates identical transmission mode, a phase changer 5201 performs a change of phase on weighted baseband signal 309A and outputs post-phase change baseband signal 5202. Similarly, when the frame configuration signal indicates identical transmission mode, phase changer 317B performs a change of phase on weighted baseband signal 316B and outputs post-phase change baseband signal 309B. The change of phase performed by phase changer 5201 is of $e^{jA(t)}$ (alternatively, $e^{jA(f)}$ or $e^{jA(t,f)}$) (where t is time and f is frequency) (accordingly, $e^{jA(t)}$ (alternatively, $e^{jA(f)}$ or $e^{jA(t,f)}$) is the value by which the input baseband signal is multiplied), and the change of phase performed by phase changer 317B is of $e^{jB(t)}$ (alternatively, $e^{jB(f)}$ or $e^{jB(t,f)}$) (where t is time and f is frequency) (accordingly, $e^{jB(t)}$ (alternatively, $e^{jB(f)}$ or $e^{jB(t,f)}$) is the value by which the input baseband signal is multiplied). As such, the following condition is satisfied.

[Math. 53]

Some time t satisfies $$e^{jA(t)} \neq e^{jB(t)}$$

(Or, some (carrier) frequency f satisfies $e^{jA(f)} \neq e^{jB(f)}$)

(Or, some (carrier) frequency f and time t satisfy $e^{jA(t,f)} \neq e^{jB(t,f)}$)

As such, the transmit signal is able to reduce multi-path influence and thereby improve data reception quality for the reception device. (However, the change of phase may also be performed by only one of the weighted baseband signals 309A and 316B.)

In FIG. 56, when OFDM is used, processing such as IFFT and frequency conversion is performed on post-phase change baseband signal 5202, and the result is transmitted by a transmit antenna. (See FIG. 13) (Accordingly, post-phase change baseband signal 5202 may be considered the same as signal 1301A from FIG. 13.) Similarly, when OFDM is used, processing such as IFFT and frequency conversion is performed on post-phase change baseband signal 309B, and the result is transmitted by a transmit antenna. (See FIG. 13) (Accordingly, post-phase change baseband signal 309B may be considered the same as signal 1301B from FIG. 13.)

When the selected transmission mode indicates different data transmission, then any of Math. 36 (formula 36), Math. 39 (formula 39), and Math. 50 (formula 50) given in Embodiment 1 may apply. Significantly, the phase changers 5201 and 317B from FIG. 56 use a different phase changing method than when transmitting identical data. Specifically, as described in Embodiment 1, for example, phase changer 5201 performs the change of phase while phase changer 317B does not, or phase changer 317B performs the change of phase while phase changer 5201 does not. Only one of the two phase changers performs the change of phase. As such, the reception device obtains good data reception quality in the LOS environment as well as the NLOS environment.

When the selected transmission mode indicates different data transmission, the precoding matrix may be as given in Math. 52 (formula 52), or as given in any of Math. 36 (formula 36), Math. 50 (formula 50), and Math. 39 (formula 39), or may be a precoding matrix unlike that given in Math. 52 (formula 52). Thus, the reception device is especially likely to experience improvements to data reception quality in the LOS environment.

Furthermore, although the present Embodiment discusses examples using OFDM as the transmission method, the invention is not limited in this manner. Multi-carrier methods other than OFDM and single-carrier methods may all be used to achieve similar Embodiments. Here, spread-spectrum communications may also be used. When single-carrier methods are used, the change of phase is performed with respect to the time domain.

As explained in Embodiment 3, when the transmission method involves different data transmission, the change of phase is carried out on the data symbols, only. However, as described in the present Embodiment, when the transmission method involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C2

The present Embodiment describes a configuration method for a base station corresponding to Embodiment C1.

Figure 59:
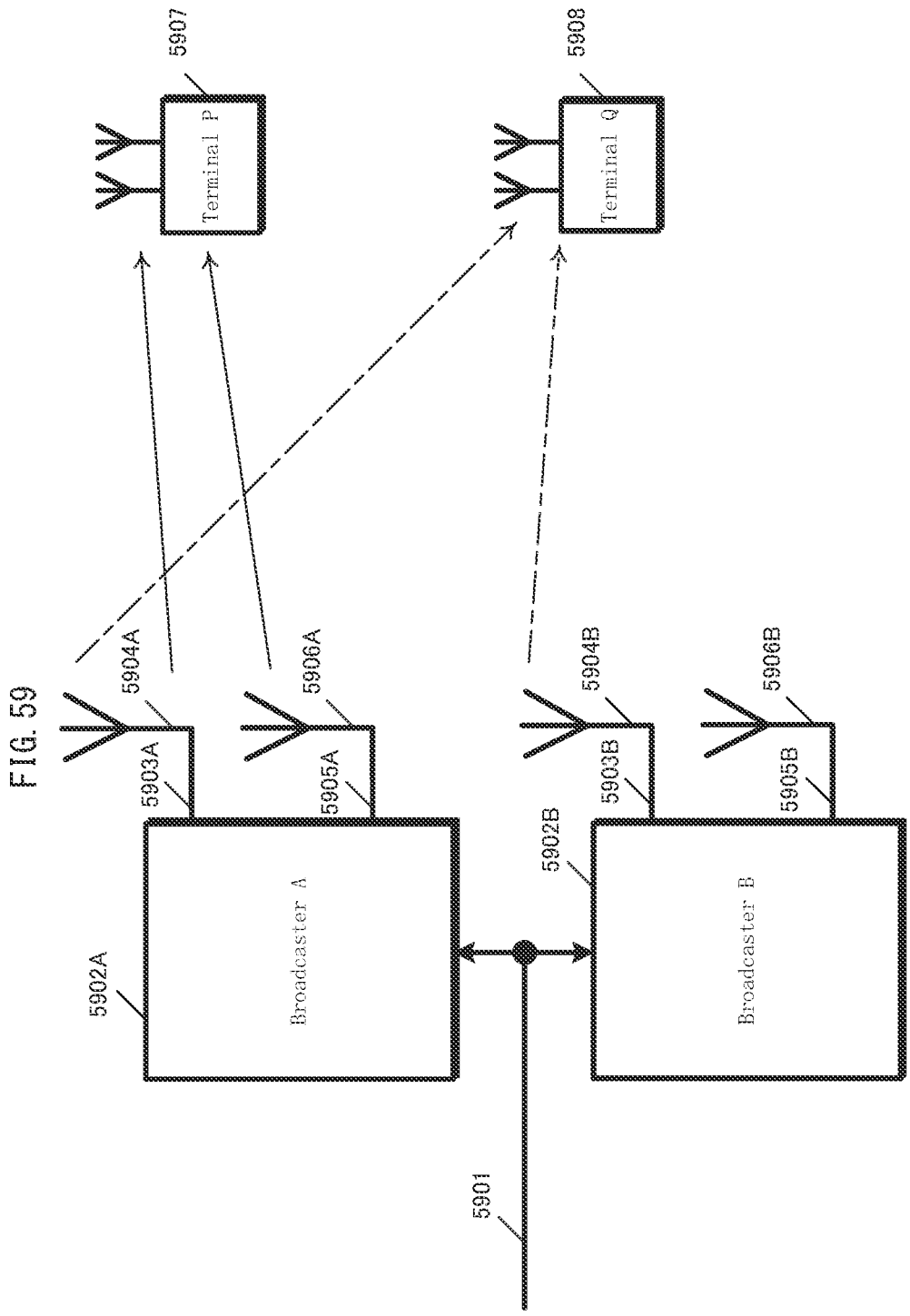
FIG. 59 illustrates a sample communications system indicating the relationship between base stations and terminals.

FIG. 59 illustrates the relationship of a base stations (broadcasters) to terminals. A terminal P (5907) receives transmit signal 5903A transmitted by antenna 5904A and transmit signal 5905A transmitted by antenna 5906A of broadcaster A (5902A), then performs predetermined processing thereon to obtained received data.

A terminal Q (5908) receives transmit signal 5903A transmitted by antenna 5904A of base station A (5902A) and transmit signal 593B transmitted by antenna 5904B of base station B (5902B), then performs predetermined processing thereon to obtained received data.

Figure 60:
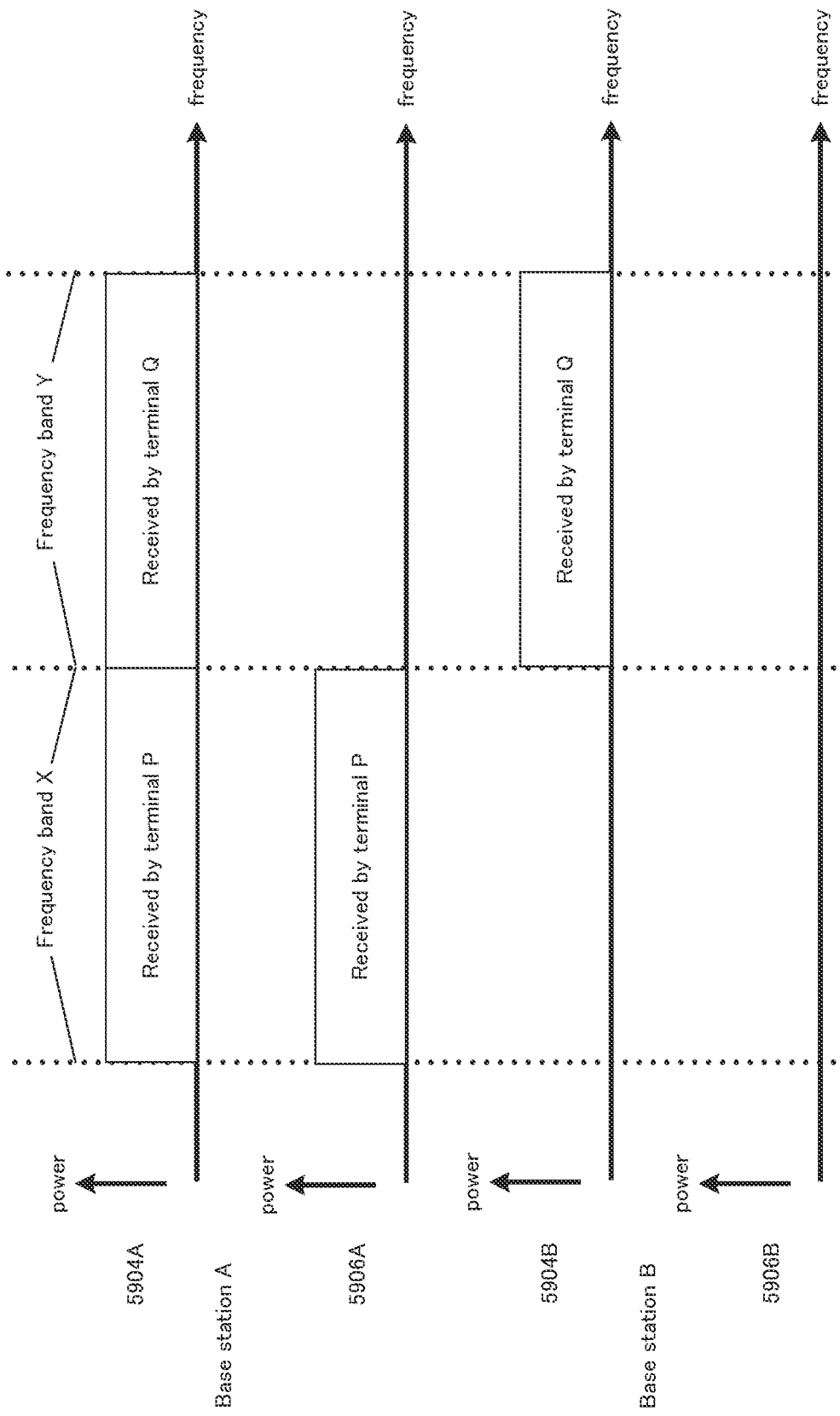
FIG. 60 illustrates an example of transmit signal frequency allocation.
Figure 61:
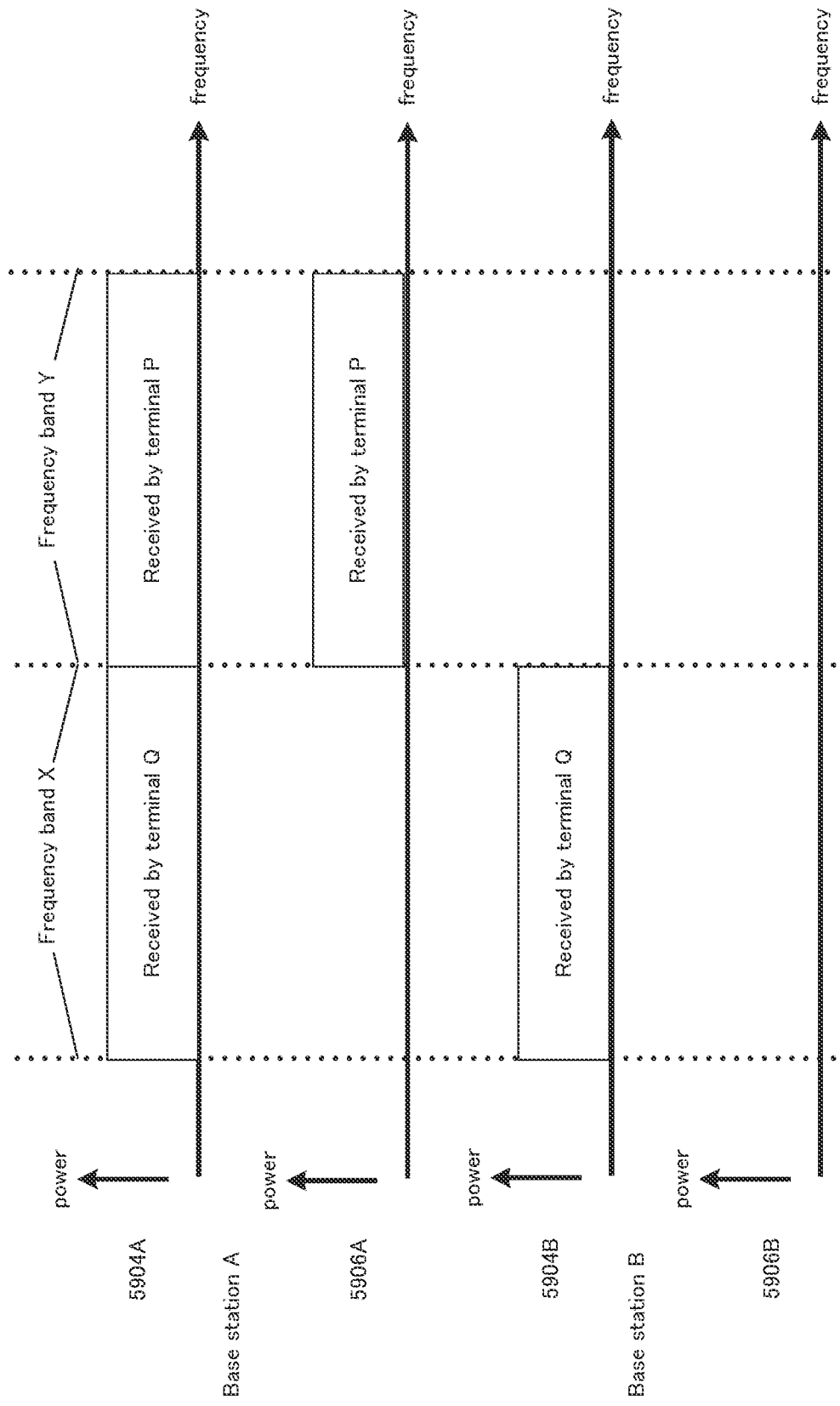
FIG. 61 illustrates another example of transmit signal frequency allocation.

FIGS. 60 and 61 illustrate the frequency allocation of base station A (5902A) for transmit signals 5903A and 5905A transmitted by antennas 5904A and 5906A, and the frequency allocation of base station B (5902B) for transmit signals 5903B and 5905B transmitted by antennas 5904B and 5906B. In FIGS. 60 and 61, frequency is on the horizontal axis and transmission power is on the vertical axis.

As shown, transmit signals 5903A and 5905A transmitted by base station A (5902A) and transmit signals 5903B and 5905B transmitted by base station B (5902B) use at least frequency band X and frequency band Y. Frequency band X is used to transmit data of a first channel, and frequency band Y is used to transmit data of a second channel.

Accordingly, terminal P (5907) receives transmit signal 5903A transmitted by antenna 5904A and transmit signal 5905A transmitted by antenna 5906A of base station A (5902A), extracts frequency band X therefrom, performs predetermined processing, and thus obtains the data of the first channel. Terminal Q (5908) receives transmit signal 5903A transmitted by antenna 5904A of base station A (5902A) and transmit signal 5903B transmitted by antenna 5904B of base station B (5902B), extracts frequency band Y therefrom, performs predetermined processing, and thus obtains the data of the second channel.

The following describes the configuration and operations of base station A (5902A) and base station B (5902B).

As described in Embodiment C1, both base station A (5902A) and base station B (5902B) incorporate a transmission device configured as illustrated by FIGS. 56 and 13. When transmitting as illustrated by FIG. 60, base station A (5902A) generates two different modulated signals (on which precoding and a change of phase are performed) with respect to frequency band X as described in Embodiment C1. The two modulated signals are respectively transmitted by the antennas 5904A and 5906A. With respect to frequency band Y, base station A (5902A) operates interleaver 304A, mapper 306A, weighting unit 308A, and phase changer from FIG. 56 to generate modulated signal 5202. Then, a transmit signal corresponding to modulated signal 5202 is transmitted by antenna 1310A from FIG. 13, i.e., by antenna 5904A from FIG. 59. Similarly, base station B (5902B) operates interleaver 304A, mapper 306A, weighting unit 308A, and phase changer 5201 from FIG. 56 to generate modulated signal 5202. Then, a transmit signal corresponding to modulated signal 5202 is transmitted by antenna 1310A from FIG. 13, i.e., by antenna 5904B from FIG. 59.

The creation of encoded data in frequency band Y may involve, as shown in FIG. 56, generating encoded data in individual base stations, or may involve having one of the base stations generate such encoded data for transmission to other base stations. As an alternative method, one of the base stations may generate modulated signals and be configured to pass the modulated signals so generated to other base stations.

Also, in FIG. 59, signal 5901 includes information pertaining to the transmission mode (identical data transmission or different data transmission). The base stations obtain this signal and thereby switch between generation methods for the modulated signals in each frequency band. Here, signal 5901 is indicated in FIG. 59 as being input from another device or from a network. However, configurations where, for example, base station A (5902) is a master station passing a signal corresponding to signal 5901 to base station B (5902B) are also possible.

As explained above, when the base station transmits different data, the precoding matrix and phase changing method are set according to the transmission method to generate modulated signals.

On the other hand, to transmit identical data, two base stations respectively generate and transmit modulated signals. In such circumstances, base stations each generating modulated signals for transmission from a common antenna may be considered to be two combined base stations using the precoding matrix given by Math. 52 (formula 52). The phase changing method is as explained in Embodiment C1, for example, and satisfies the conditions of Math. 53 (formula 53).

In addition, the transmission method of frequency band X and frequency band Y may vary over time. Accordingly, as illustrated in FIG. 61, as time passes, the frequency allocation changes from that indicated in FIG. 60 to that indicated in FIG. 61.

According to the present Embodiment, not only can the reception device obtain improved data reception quality for identical data transmission as well as different data transmission, but the transmission devices can also share a phase changer.

Furthermore, although the present Embodiment discusses examples using OFDM as the transmission method, the invention is not limited in this manner. Multi-carrier methods other than OFDM and single-carrier methods may all be used to achieve similar Embodiments. Here, spread-spectrum communications may also be used. When single-carrier methods are used, the change of phase is performed with respect to the time domain.

As explained in Embodiment 3, when the transmission method involves different data transmission, the change of phase is carried out on the data symbols, only. However, as described in the present Embodiment, when the transmission method involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C3

The present Embodiment describes a configuration method for a repeater corresponding to Embodiment C1. The repeater may also be termed a repeating station.

Figure 62:
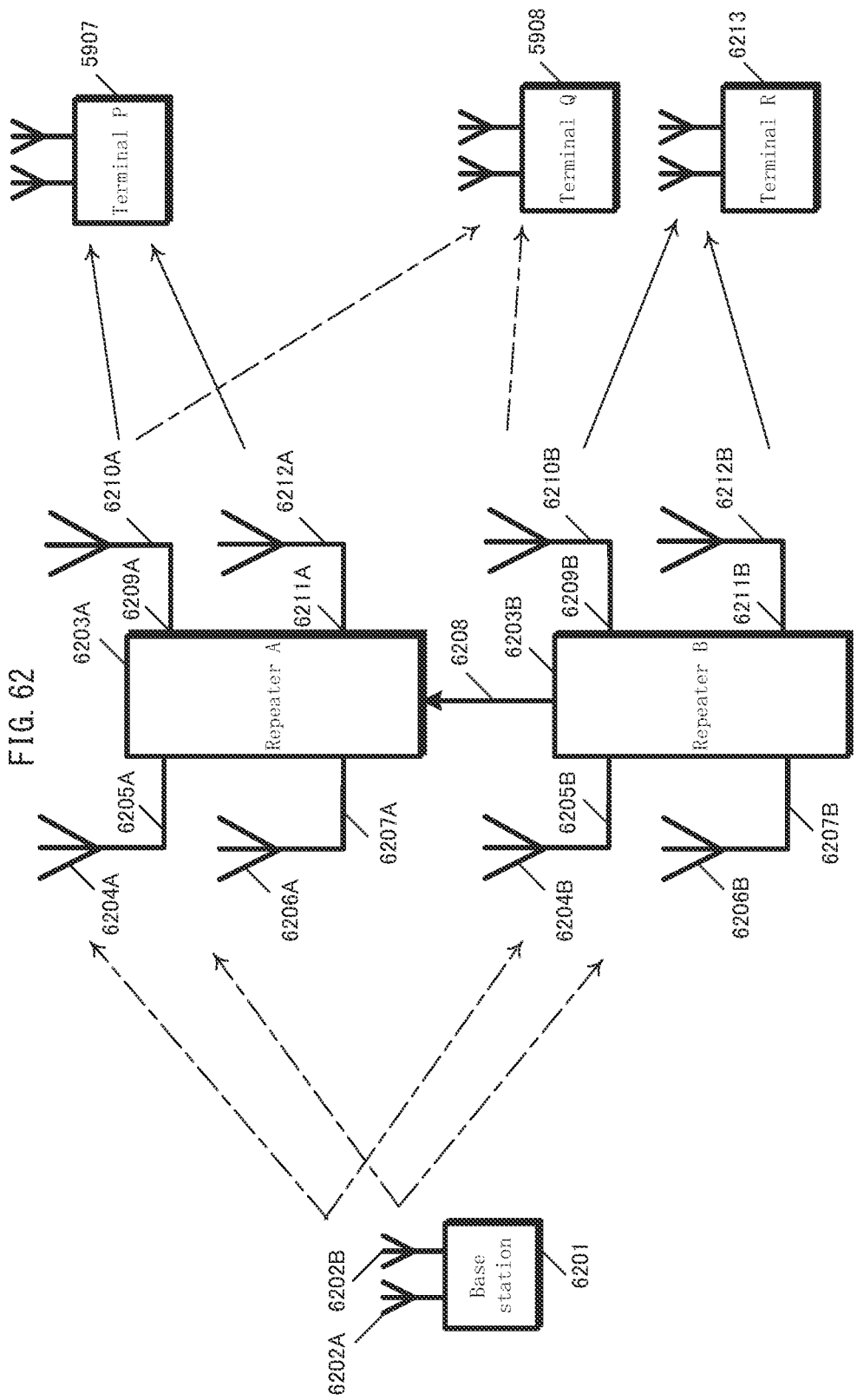
FIG. 62 illustrates a sample communications system indicating the relationship between a base station, repeaters, and terminals.
Figure 63:
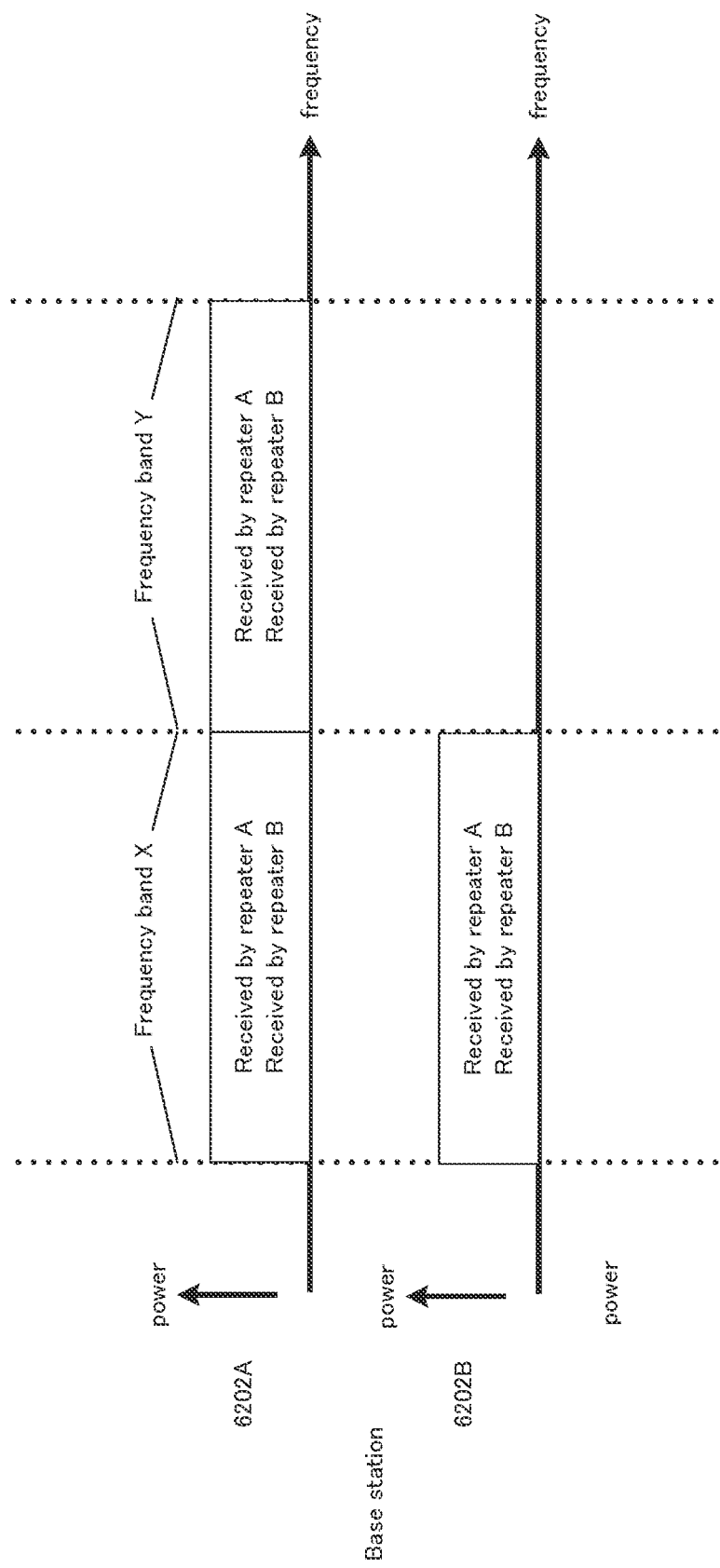
FIG. 63 illustrates an example of transmit signal frequency allocation with respect to the base station.

FIG. 62 illustrates the relationship of a base stations (broadcasters) to repeaters and terminals. As shown in FIG. 63, base station 6201 at least transmits modulated signals on frequency band X and frequency band Y. Base station 6201 transmits respective modulated signals on antenna 6202A and antenna 6202B. The transmission method here used is described later, with reference to FIG. 63.

Repeater A (6203A) performs processing such as demodulation on received signal 6205A received by receive antenna 6204A and on received signal 6207A received by receive antenna 6206A, thus obtaining received data. Then, in order to transmit the received data to a terminal, repeater A (6203A) performs transmission processing to generate modulated signals 6209A and 6211A for transmission on respective antennas 6210A and 6212A.

Similarly, repeater B (6203B) performs processing such as demodulation on received signal 6205B received by receive antenna 6204B and on received signal 6207B received by receive antenna 6206B, thus obtaining received data. Then, in order to transmit the received data to a terminal, repeater B (6203B) performs transmission processing to generate modulated signals 6209B and 6211B for transmission on respective antennas 6210B and 6212B. Here, repeater B (6203B) is a master repeater that outputs a control signal 6208. repeater A (6203A) takes the control signal as input. A master repeater is not strictly necessary. Base station 6201 may also transmit individual control signals to repeater A (6203A) and to repeater B (6203B).

Terminal P (5907) receives modulated signals transmitted by repeater A (6203A), thereby obtaining data. Terminal Q (5908) receives signals transmitted by repeater A (6203A) and by repeater B (6203B), thereby obtaining data. Terminal R (6213) receives modulated signals transmitted by repeater B (6203B), thereby obtaining data.

FIG. 63 illustrates the frequency allocation for a modulated signal transmitted by antenna 6202A among transmit signals transmitted by the base station, and the frequency allocation of modulated signals transmitted by antenna 6202B. In FIG. 63, frequency is on the horizontal axis and transmission power is on the vertical axis.

As shown, the modulated signals transmitted by antenna 6202A and by antenna 6202B use at least frequency band X and frequency band Y. Frequency band X is used to transmit data of a first channel, and frequency band Y is used to transmit data of a second channel.

As described in Embodiment C1, the data of the first channel is transmitted using frequency band X in different data transmission mode. Accordingly, as shown in FIG. 63, the modulated signals transmitted by antenna 6202A and by antenna 6202B include components of frequency band X. These components of frequency band X are received by repeater A and by repeater B. Accordingly, as described in Embodiment 1 and in Embodiment C1, modulated signals in frequency band X are signals on which mapping has been performed, and to which precoding (weighting) and the change of phase are applied.

As shown in FIG. 62, the data of the second channel is transmitted by antenna 6202A of FIG. 2 and transmits data in components of frequency band Y. These components of frequency band Y are received by repeater A and by repeater B.

Figure 64:
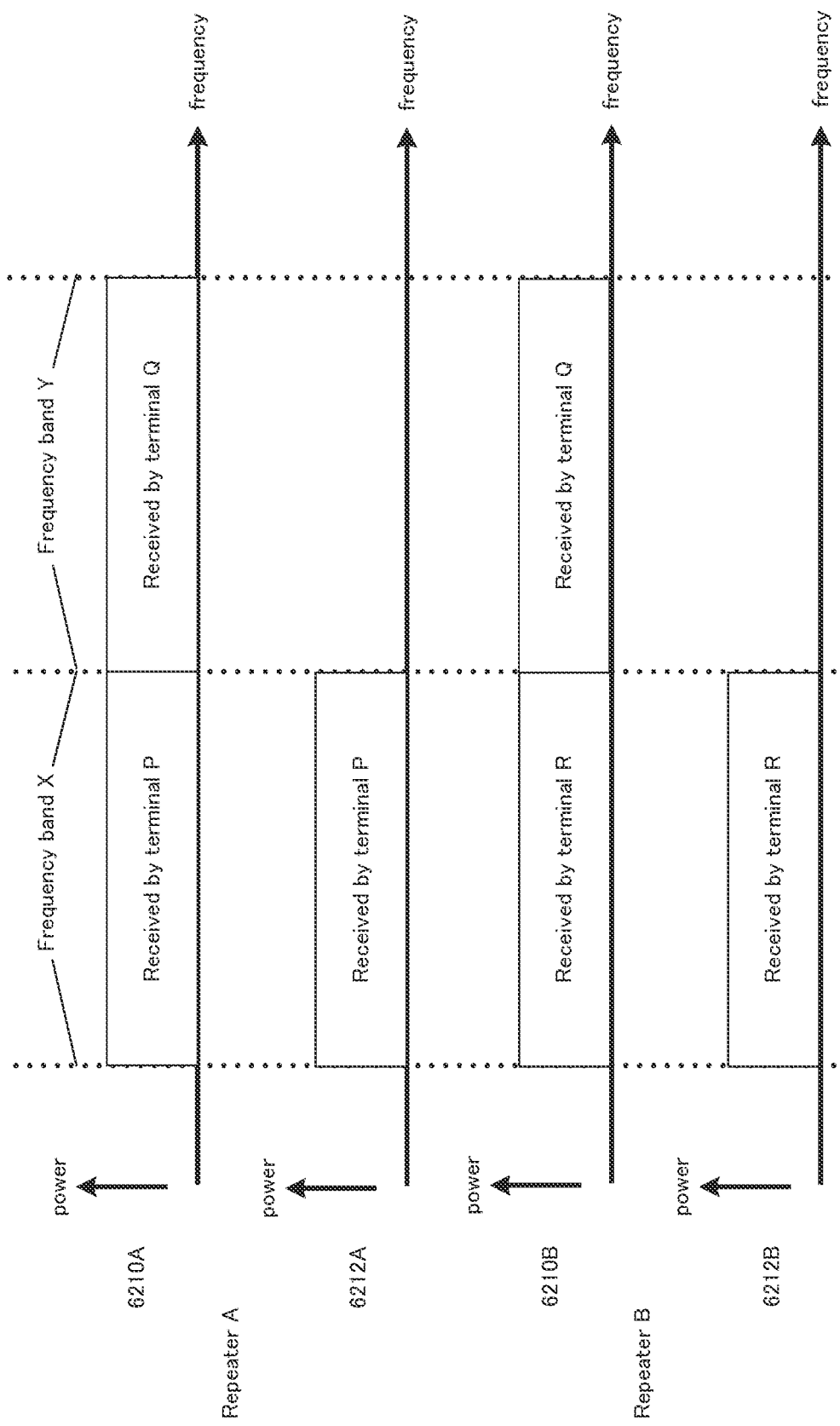
FIG. 64 illustrates an example of transmit signal frequency allocation with respect to the repeaters.

FIG. 64 illustrate the frequency allocation for transmit signals transmitted by repeater A and repeater B, specifically for modulated signal 6209A transmitted by antenna 6210A and modulated signal 6211A transmitted by antenna 6212A of repeater 6210A, and for modulated signal 6209B transmitted by antenna 6210B and modulated signal 6211B transmitted by antenna 6212B of repeater B. In FIG. 64, frequency is on the horizontal axis and transmission power is on the vertical axis.

As shown, modulated signal 6209A transmitted by antenna 6210A and modulated signal 6211A transmitted by antenna 6212A use at least frequency band X and frequency band Y. Also, modulated signal 6209B transmitted by antenna 6210B and modulated signal 6211B transmitted by antenna 6212B similarly use at least frequency band X and frequency band Y. Frequency band X is used to transmit data of a first channel, and frequency band Y is used to transmit data of a second channel.

As described in Embodiment C1, the data of the first channel is transmitted using frequency band X in different data transmission mode. Accordingly, as shown in FIG. 64, modulated signal 6209A transmitted by antenna 6210A and modulated signal 6211A transmitted by antenna 6212B include components of frequency band X. These components of frequency band X are received by terminal P. Similarly, as shown in FIG. 64, modulated signal 6209B transmitted by antenna 6210B and modulated signal 6211B transmitted by antenna 6212B include components of frequency band X. These components of frequency band X are received by terminal R. Accordingly, as described in Embodiment 1 and in Embodiment C1, modulated signals in frequency band X are signals on which mapping has been performed, and to which precoding (weighting) and the change of phase are applied.

As shown in FIG. 64, the data of the second channel is carried by the modulated signals transmitted by antenna 6210A of repeater A (6203A) and by antenna 6210B of repeater B (6203) from FIG. 62 and transmits data in components of frequency band Y. Here, the components of frequency band Y in modulated signal 6209A transmitted by antenna 6210A of repeater A (6203A) and those in modulated signal 6209B transmitted by antenna 6210B of repeater B (6203B) are used in a transmission mode that involves identical data transmission, as explained in Embodiment C1. These components of frequency band Y are received by terminal Q.

Figure 65:
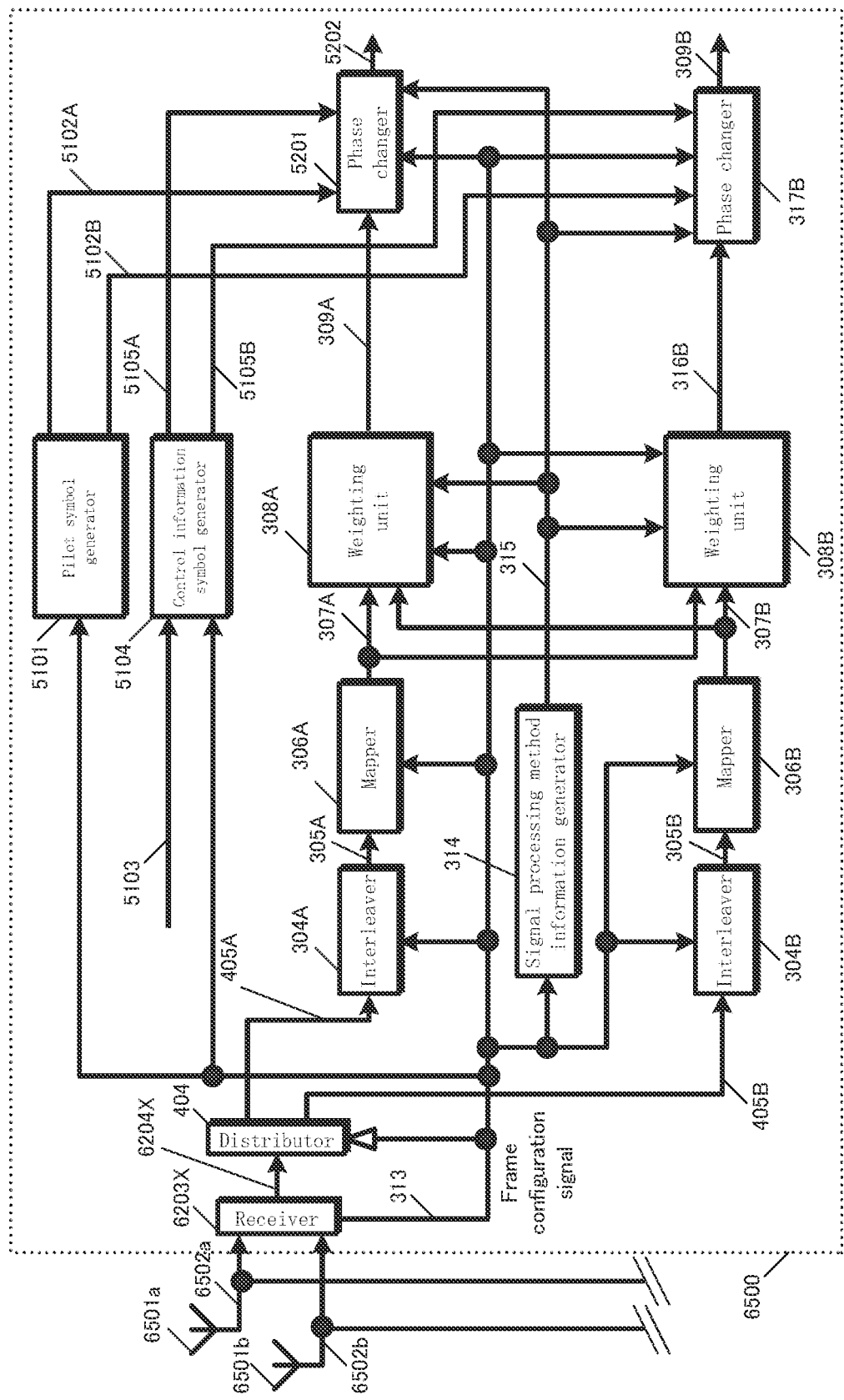
FIG. 65 illustrates a sample configuration of a receiver and transmitter in the repeater.

The following describes the configuration of repeater A (6203A) and repeater B (6203B) from FIG. 62, with reference to FIG. 65.

FIG. 65 illustrates a sample configuration of a receiver and transmitter in a repeater. Components operating identically to those of FIG. 56 use the same reference numbers thereas. Receiver 6203X takes received signal 6502A received by receive antenna 6501A and received signal 6502B received by receive antenna 6501B as input, performs signal processing (signal demultiplexing or compositing, error-correction decoding, and so on) on the components of frequency band X thereof to obtain data 6204X transmitted by the base station using frequency band X, outputs the data to the distributor 404 and obtains transmission method information included in control information (and transmission method information when transmitted by a repeater), and outputs the frame configuration signal 313.

Receiver 6203X and onward constitute a processor for generating a modulated signal for transmitting frequency band X. Further, the receiver here described is not only the receiver for frequency band X as shown in FIG. 65, but also incorporates receivers for other frequency bands. Each receiver forms a processor for generating modulated signals for transmitting a respective frequency band.

The overall operations of the distributor 404 are identical to those of the distributor in the base station described in Embodiment C2.

When transmitting as indicated in FIG. 64, repeater A (6203A) and repeater B (6203B) generate two different modulated signals (on which precoding and change of phase are performed) in frequency band X as described in Embodiment C1. The two modulated signals are respectively transmitted by antennas 6210A and 6212A of repeater A (6203) from FIG. 62 and by antennas 6210B and 6212B of repeater B (6203B) from FIG. 62.

As for frequency band Y, repeater A (6203A) operates a processor 6500 pertaining to frequency band Y and corresponding to the signal processor 6500 pertaining to frequency band X shown in FIG. 65 (the signal processor 6500 is the signal processor pertaining to frequency band X, but given that an identical signal processor is incorporated for frequency band Y, this description uses the same reference numbers), interleaver 304A, mapper 306A, weighting unit 308A, and phase changer 5201 to generate modulated signal 5202. A transmit signal corresponding to modulated signal 5202 is then transmitted by antenna 1301A from FIG. 13, that is, by antenna 6210A from FIG. 62. Similarly, repeater B (6203 B) operates interleaver 304A, mapper 306A, weighting unit 308A, and phase changer 5201 from FIG. 62 pertaining to frequency band Y to generate modulated signal 5202. Then, a transmit signal corresponding to modulated signal 5202 is transmitted by antenna 1310A from FIG. 13, i.e., by antenna 6210B from FIG. 62.

Figure 66:
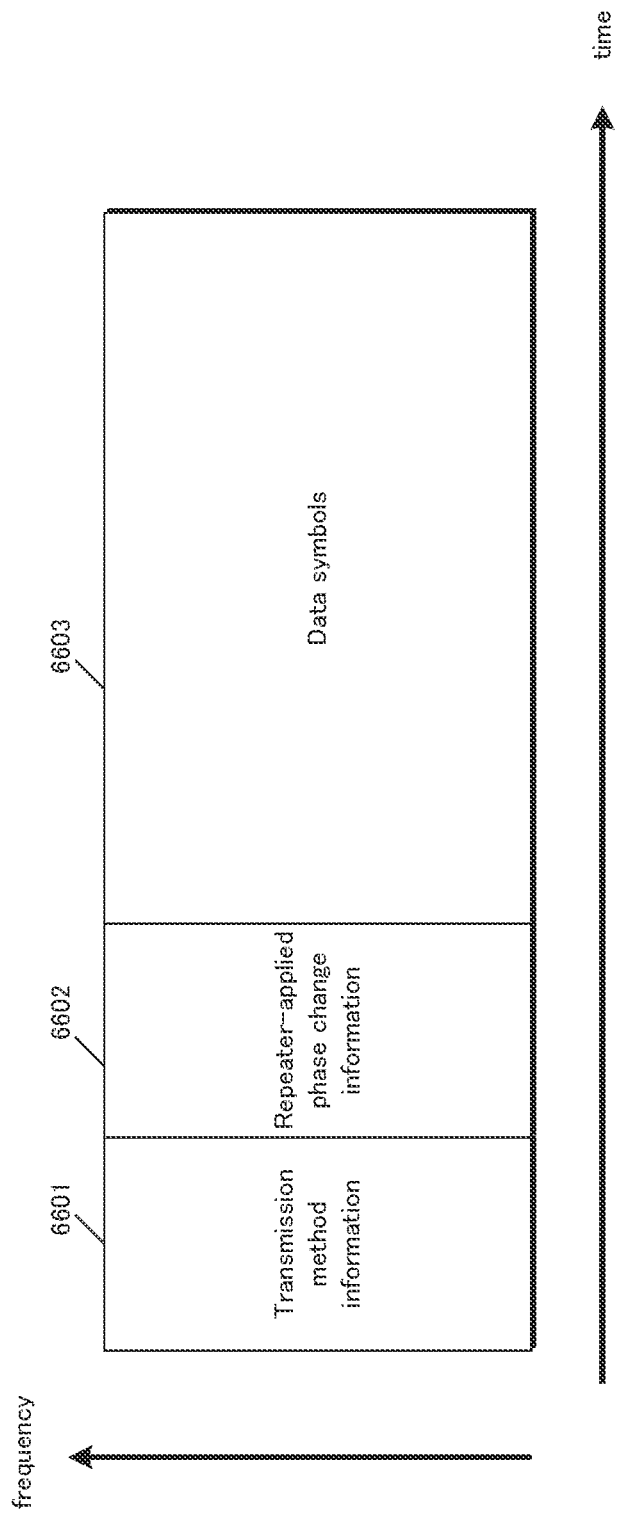
FIG. 66 illustrates a signal data format used for transmission by the base station.

As shown in FIG. 66 (FIG. 66 illustrates the frame configuration of the modulated signal transmitted by the base station, with time on the horizontal axis and frequency on the vertical axis), the base station transmits transmission method information 6601, repeater-applied phase change information 6602, and data symbols 6603. The repeater obtains and applies the transmission method information 6601, the repeater-applied phase change information 6602, and the data symbols 6603 to the transmit signal, thus determining the phase changing method. When the repeater-applied phase change information 6602 from FIG. 66 is not included in the signal transmitted by the base station, then as shown in FIG. 62, repeater B (6203B) is the master and indicates the phase changing method to repeater A (6203A).

As explained above, when the repeater transmits different data, the precoding matrix and phase changing method are set according to the transmission method to generate modulated signals.

On the other hand, to transmit identical data, two repeaters respectively generate and transmit modulated signals. In such circumstances, repeaters each generating modulated signals for transmission from a common antenna may be considered to be two combined repeaters using the precoding matrix given by Math. 52 (formula 52). The phase changing method is as explained in Embodiment C1, for example, and satisfies the conditions of Math. 53 (formula 53).

Also, as explained in Embodiment C1 for frequency band X, the base station and repeater may each have two antennas that transmit respective modulated signals and two antennas that receive identical data. The operations of such a base station or repeater are as described for Embodiment C1.

According to the present Embodiment, not only can the reception device obtain improved data reception quality for identical data transmission as well as different data transmission, but the transmission devices can also share a phase changer.

Furthermore, although the present Embodiment discusses examples using OFDM as the transmission method, the invention is not limited in this manner. Multi-carrier methods other than OFDM and single-carrier methods may all be used to achieve similar Embodiments. Here, spread-spectrum communications may also be used. When single-carrier methods are used, the change of phase is performed with respect to the time domain.

As explained in Embodiment 3, when the transmission method involves different data transmission, the change of phase is carried out on the data symbols, only. However, as described in the present Embodiment, when the transmission method involves identical data transmission, then the change of phase need not be limited to the data symbols but may also be performed on pilot symbols, control symbols, and other such symbols inserted into the transmission frame of the transmit signal. (The change of phase need not always be performed on symbols such as pilot symbols and control symbols, though doing so is preferable in order to achieve diversity gain.)

Embodiment C4

The present Embodiment concerns a phase changing method different from the phase changing methods described in Embodiment 1 and in the Supplement.

In Embodiment 1, Math. 36 (formula 36) is given as an example of a precoding matrix, and in the Supplement, Math. 50 (formula 50) is similarly given as another such example. In Embodiment A1, the phase changers from FIGS. 3, 4, 6, 12, 25, 29, 51, and 53 are indicated as having a phase changing value of PHASE[i] (where i=0, 1, 2, . . . , N−2, N−1 (i being an integer between 0 and N−1)) to achieve a period (cycle) of N (value reached given that FIGS. 3, 4, 6, 12, 25, 29, 51, and 53 perform a change of phase on only one baseband signal). The present description discusses performing a change of phase on one precoded baseband signal (i.e., in FIGS. 3, 4, 6, 12, 25, 29, 51 and 53) namely on precoded baseband signal z2'. Here, PHASE[k] is calculated as follows.

[Math. 54]

$$\text{PHASE}[k] = \frac{k\pi}{N} \text{ radians} \qquad \text{(formula 54)}$$

where k=0, 1, 2, . . . , N−2, N−1 (k being an integer between 0 and N−1).

Accordingly, the reception device is able to achieve improvements in data reception quality in the LOS environment, and especially in a radio wave propagation environment. In the LOS environment, when the change of phase has not been performed, a regular phase relationship occurs. However, when the change of phase is performed, the phase relationship is modified, in turn avoiding poor conditions in a burst-like propagation environment. As an alternative to Math. 54 (formula 54), PHASE[k] may be calculated as follows.

[Math. 55]

$$\text{PHASE}[k] = -\frac{k\pi}{N} \text{ radians} \qquad \text{(formula 55)}$$

where k=0, 1, 2, . . . , N−2, N−1 (k being an integer between 0 and N−1).

As a further alternative phase changing method, PHASE [k] may be calculated as follows.

[Math. 56]

$$\text{PHASE}[k] = \frac{k\pi}{N} + Z \text{ radians} \qquad \text{(formula 56)}$$

where k=0, 1, 2, . . . , N−2, N−1 (k being an integer between 0 and N−1).

As a further alternative phase changing method, PHASE [k] may be calculated as follows.

[Math. 57]

$$\text{PHASE}[k] = -\frac{k\pi}{N} + Z \text{ radians} \qquad \text{(formula 57)}$$

where k=0, 1, 2, . . . , N−2, N−1 (k being an integer between 0 and N−1).

As such, by performing the change of phase according to the present Embodiment, the reception device is made more likely to obtain good reception quality.

The change of phase of the present Embodiment is applicable not only to single-carrier methods but also to multi-carrier methods. Accordingly, the present Embodiment may also be realized using, for example, spread-spectrum communications, OFDM, SC-FDMA, SC-OFDM, wavelet OFDM as described in Non-Patent Literature 7, and so on. As previously described, while the present Embodiment explains the change of phase as a change of phase with respect to the time domain t, the phase may alternatively be changed with respect to the frequency domain as described in Embodiment 1. That is, considering the change of phase with respect to the time domain t described in the present Embodiment and replacing t with f (f being the ((sub-)carrier) frequency) leads to a change of phase applicable to the frequency domain. Also, as explained above for Embodiment 1, the phase changing method of the present Embodiment is also applicable to a change of phase with respect to both the time domain and the frequency domain. Further, when the phase changing method described in the present Embodiment satisfies the conditions indicated in Embodiment A1, the reception device is highly likely to obtain good data quality.

Embodiment C5

The present Embodiment concerns a phase changing method different from the phase changing methods described in Embodiment 1, in the Supplement, and in Embodiment C4.

In Embodiment 1, Math. 36 (formula 36) is given as an example of a precoding matrix, and in the Supplement, Math. 50 (formula 50) is similarly given as another such example. In Embodiment A1, the phase changers from FIGS. 3, 4, 6, 12, 25, 29, 51, and 53 are indicated as having a phase changing value of PHASE[i] (where i=0, 1, 2, . . . , N−2, N−1 (i being an integer between 0 and N−1)) to achieve a period (cycle) of N (value reached given that FIGS. 3, 4, 6, 12, 25, 29, 51, and 53 perform a change of phase on only one baseband signal). The present description discusses performing a change of phase on one precoded baseband signal (i.e., in FIGS. 3, 4, 6, 12, 25, 29, 51 and 53) namely on precoded baseband signal z2'.

The characteristic feature of the phase changing method pertaining to the present Embodiment is the period (cycle) of N=2π+1. To achieve the period (cycle) of N=2π+1, n+1 different phase changing values are prepared. Among these n+1 different phase changing values, n phase changing values are used twice per period (cycle), and one phase changing value is used only once per period (cycle), thus achieving the period (cycle) of N=2π+1. The following describes these phase changing values in detail.

The n+1 different phase changing values required to achieve a phase changing method in which the phase changing value is regularly switched in a period (cycle) of N=2π+1 are expressed as PHASE[0], PHASE[1], PHASE[i] . . . PHASE[n−1], PHASE[n] (where i=0, 1, 2 . . . n−2, n−1, n (i being an integer between 0 and n)). Here, the n+1 different phase changing values of PHASE[0], PHASE[1], PHASE[i] . . . PHASE[n−1], PHASE[n] are expressed as follows.

[Math. 58]

$$\text{PHASE}[k] = \frac{2k\pi}{2n+1} \text{ radians} \qquad \text{(formula 58)}$$

where k=0, 1, 2, . . . , n−2, n−1, n (k being an integer between 0 and n). The n+1 different phase changing values PHASE[0], PHASE[1] . . . PHASE[i] PHASE[n−1], PHASE [n] are given by Math. 58 (formula 58). PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing method in which the phase changing value is regularly switched in a period (cycle) of N=2n+1, a phase changing method is realized in which the phase changing value is regularly switched between fewer phase changing values. Thus, the reception device is able to achieve better data reception quality. As the phase changing values are smaller, the effect thereof on the transmission device and reception device may be reduced. According to the above, the reception device is able to achieve improvements in data reception quality in the LOS environment, and especially in a radio wave propagation environment. In the LOS environment, when the change of phase has not been performed, a regular phase relationship occurs. However, when the change of phase is performed, the phase relationship is modified, in turn avoiding poor conditions in a burst-like propagation environment. As an alternative to Math. 58 (formula 58), PHASE[k] may be calculated as follows.

[Math. 59]

$$\text{PHASE}[k] = -\frac{2k\pi}{2n+1} \text{ radians} \qquad \text{(formula 59)}$$

where k=0, 1, 2, . . . , n−2, n−1, n (k being an integer between 0 and n).

The n+1 different phase changing values PHASE[0], PHASE[1] PHASE[i] . . . PHASE[n−1], PHASE[n] are given by Math. 59 (formula 59). PHASE[0] is used once, while PHASE[1] through PHASE[n] are each used twice (i.e., PHASE[1] is used twice, PHASE[2] is used twice, and so on, until PHASE[n−1] is used twice and PHASE[n] is used twice). As such, through this phase changing method in which the phase changing value is regularly switched in a period (cycle) of N=2n+1, a phase changing method is realized in which the phase changing value is regularly switched between fewer phase changing values. Thus, the reception device is able to achieve better data reception quality. As the phase changing values are smaller, the effect thereof on the transmission device and reception device may be reduced.

As a further alternative, PHASE[k] may be calculated as follows.

[Math. 60]

$$\text{PHASE}[k] = \frac{2k\pi}{2n+1} + Z \text{ radians} \quad \text{(formula 60)}$$

where k=0, 1, 2, . . . , N–2, N–1 (k being an integer between 0 and N–1).

The n+1 different phase changing values PHASE[0], PHASE[1] . . . PHASE[i] . . . PHASE[n–1], PHASE[n] are given by Math. 60 (formula 60). PHASE[0] is used once, while PHASE[1] through PHASE[n] are each used twice (i.e., PHASE[1] is used twice, PHASE[2] is used twice, and so on, until PHASE[n–1] is used twice and PHASE[n] is used twice). As such, through this phase changing method in which the phase changing value is regularly switched in a period (cycle) of N=2n+1, a phase changing method is realized in which the phase changing value is regularly switched between fewer phase changing values. Thus, the reception device is able to achieve better data reception quality. As the phase changing values are smaller, the effect thereof on the transmission device and reception device may be reduced.

As a further alternative, PHASE[k] may be calculated as follows.

[Math. 61]

$$\text{PHASE}[k] = -\frac{2k\pi}{2n+1} + Z \text{ radians} \quad \text{(formula 61)}$$

where k=0, 1, 2, . . . , n–2, n–1, n (k being an integer between 0 and n).

The n+1 different phase changing values PHASE[0], PHASE[1] . . . PHASE[i] . . . PHASE[n–1], PHASE[n] are given by Math. 61 (formula 61). PHASE[0] is used once, while PHASE[1] through PHASE[n] are each used twice (i.e., PHASE[1] is used twice, PHASE[2] is used twice, and so on, until PHASE[n–1] is used twice and PHASE[n] is used twice). As such, through this phase changing method in which the phase changing value is regularly switched in a period (cycle) of N=2n+1, a phase changing method is realized in which the phase changing value is regularly switched between fewer phase changing values. Thus, the reception device is able to achieve better data reception quality. As the phase changing values are smaller, the effect thereof on the transmission device and reception device may be reduced.

As such, by performing the change of phase according to the present Embodiment, the reception device is made more likely to obtain good reception quality.

The change of phase of the present Embodiment is applicable not only to single-carrier methods but also to transmission using multi-carrier methods. Accordingly, the present Embodiment may also be realized using, for example, spread-spectrum communications, OFDM, SC-FDMA, SC-OFDM, wavelet OFDM as described in Non-Patent Literature 7, and so on. As previously described, while the present Embodiment explains the change of phase as a change of phase with respect to the time domain t, the phase may alternatively be changed with respect to the frequency domain as described in Embodiment 1. That is, considering the change of phase with respect to the time domain t described in the present Embodiment and replacing t with f (f being the ((sub-) carrier) frequency) leads to a change of phase applicable to the frequency domain. Also, as explained above for Embodiment 1, the phase changing method of the present Embodiment is also applicable to a change of phase with respect to both the time domain and the frequency domain.

Embodiment C6

The present Embodiment describes a method of regularly changing the phase, specifically that of Embodiment C5, when encoding is performed using block codes as described in Non-Patent Literature 12 through 15, such as QC LDPC Codes (not only QC-LDPC but also LDPC codes may be used), concatenated LDPC (blocks) and BCH codes, Turbo codes or Duo-Binary Turbo codes using tail-biting, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in each coded block when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission method may be any single-carrier method or multi-carrier method such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up each coded block, and when the modulation scheme is 64-QAM, 500 slots are needed to transmit all of the bits making up each coded block.

The following describes the relationship between the above-defined slots and the phase, as pertains to methods for a regular change of phase.

Here, five different phase changing values (or phase changing sets) are assumed as having been prepared for use in the method for a regular change of phase, which has a period (cycle) of five. That is, the phase changer of the transmission device from FIG. 4 uses five phase changing values (or phase changing sets) to achieve the period (cycle) of five. However, as described in Embodiment C5, three different phase changing values are present. Accordingly, some of the five phase changing values needed for the period (cycle) of five are identical. (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

The following describes the relationship between the above-defined slots and the phase, as pertains to methods for a regular change of phase.

For the above-described 1500 slots needed to transmit the 6000 bits making up a single coded block when the modulation scheme is QPSK, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots. This is due to the fact that any bias in phase changing value usage causes great influence to be exerted by the more frequently used phase changing value, and that the reception device is dependent on such influence for data reception quality.

Similarly, for the above-described 1500 slots needed to transmit the 6000 bits making up the pair of coded blocks when the modulation scheme is 16-QAM, phase changing value P[0] is used on 150 slots, phase changing value P[1] is used on 150 slots, phase changing value P[2] is used on 150 slots, phase changing value P[3] is used on 150 slots, and phase changing value P[4] is used on 150 slots.

Further, for the above-described 500 slots needed to transmit the 6000 bits making up a single coded block when the modulation scheme is 64-QAM, phase changing value P[0] is used on 100 slots, phase changing value P[1] is used on 100 slots, phase changing value P[2] is used on 100 slots, phase changing value P[3] is used on 100 slots, and phase changing value P[4] is used on 100 slots.

As described above, a phase changing method for regularly varying the phase changing value as given in Embodiment C5 requires the preparation of N=2n+1 phase changing values P[0], P[1] . . . P[2n−1], P[2n] (where P[0], P[1] . . . P[2n−1], P[2n] are expressed as PHASE[0], PHASE[1], PHASE[2] . . . PHASE[n−1], PHASE[n] (see Embodiment C5)). As such, in order to transmit all of the bits making up the coded block, phase changing value P[0] is used on $K_0$ slots, phase changing value P[1] is used on $K_1$ slots, phase changing value P[i] is used on Ki slots (where i=0, 1, 2, . . . , 2n−1, 2n (i being an integer between 0 and 2n)), and phase changing value P[2n] is used on $K_{2n}$ slots, such that Condition #C01 is met.

(Condition #C01)
$K_0=K_1 \ldots =K_i=K_{2n}$. That is, $K_a=K_b$ ($\forall a$ and $\forall b$ where a, b,=0, 1, 2 . . . 2n−1, 2n (a and b being integers between 0 and 2n), a≠b).

A phase changing method for a regular change of phase changing value as given in Embodiment C5 having a period (cycle) of N=2n+1 requires the preparation of phase changing values PHASE[0], PHASE[1], PHASE[2] PHASE[n−1], PHASE[n]. As such, in order to transmit all of the bits making up a single coded block, phase changing value PHASE[0] is used on $G_0$ slots, phase changing value PHASE[1] is used on $G_1$ slots, phase changing value PHA-SE[i] is used on G slots (where i=0, 1, 2, . . . , n−1, n (i being an integer between 0 and n)), and phase changing value PHASE[n] is used on $G_n$ slots, such that Condition #C01 is met. Condition #C01 may be modified as follows.

(Condition #C02)
$2 \times G_0 = G_i = \ldots G_n$. That is, $2 \times G_0 = G_a$ ($\forall a$ where α=1, 2 . . . n−1, n (a being an integer between 1 and n).

Then, when a communication system that supports multiple modulation schemes selects one such supported method for use, Condition #C01 (or Condition #C02) is met for the supported modulation scheme.

However, when multiple modulation schemes are supported, each such modulation scheme typically uses symbols transmitting a different number of bits per symbols (though some may happen to use the same number), Condition #C01 (or Condition #C02) may not be satisfied for some modulation schemes. In such a case, the following condition applies instead of Condition #C01.

(Condition #C03)
The difference between $K_a$ and $K_b$ satisfies 0 or 1. That is, $|K_a-K_b|$ satisfies 0 or 1 ($\forall a$, $\forall b$, where a, b=0, 1, 2 . . . 2n−1, 2n(a and b being integers between 0 and 2n), a≠b).

Alternatively, Condition #C03 may be expressed as follows.

(Condition #C04)
The difference between $G_a$ and $G_b$ satisfies 0, 1, or 2. That is, $|G_a-G_b|$ satisfies 0, 1, or 2($\forall a$, $\forall b$, where a, b=1, 2 . . . n−1, n (a and b being integers between 1 and n), a≠b)
and
The difference between $2 \times G_0$ and $G_a$ satisfies 0, 1, or 2. That is, $|2 \times G_0 - G_a|$ satisfies 0, 1, or 2($\forall a$, where a=1, 2 . . . n−1, n(a being an integer between 1 and n)).

FIG. 35 illustrates the varying numbers of symbols and slots needed in two coded blocks when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission method may be any single-carrier method or multi-carrier method such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up two coded blocks, and when the modulation scheme is 64-QAM, 1000 slots are needed to transmit all of the bits making up the two coded blocks.

The following describes the relationship between the above-defined slots and the phase, as pertains to methods for a regular change of phase.

Here, five different phase changing values (or phase changing sets) are assumed as having been prepared for use in the method for a regular change of phase, which has a period (cycle) of five. That is, the phase changer of the transmission device from FIG. 4 uses five phase changing values (or phase changing sets) to achieve the period (cycle) of five. However, as described in Embodiment C5, three different phase changing values are present. Accordingly, some of the five phase changing values needed for the period (cycle) of five are identical. (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

For the above-described 3000 slots needed to transmit the 6000×2 bits making up the pair of coded blocks when the modulation scheme is QPSK, phase changing value P[0] is used on 600 slots, phase changing value P[1] is used on 600 slots, phase changing value P[2] is used on 600 slots, phase changing value P[3] is used on 600 slots, and phase changing value P[4] is used on 600 slots. This is due to the fact that any bias in phase changing value usage causes great influence to be exerted by the more frequently used phase changing value, and that the reception device is dependent on such influence for data reception quality.

Further, in order to transmit the first coded block, phase changing value P[0] is used on slots 600 times, phase changing value P[1] is used on slots 600 times, phase changing value P[2] is used on slots 600 times, phase changing value P[3] is used on slots 600 times, and phase changing value PHASE[4] is used on slots 600 times. Furthermore, in order to transmit the second coded block, phase changing value P[0] is used on slots 600 times, phase changing value P[1] is used on slots 600 times, phase changing value P[2] is used on slots 600 times, phase changing value P[3] is used on slots 600 times, and phase changing value P[4] is used on slots 600 times.

Similarly, for the above-described 1500 slots needed to transmit the 6000×2 bits making up the pair of coded blocks when the modulation scheme is 16-QAM, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots.

Furthermore, in order to transmit the first coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times. Furthermore, in order to transmit the second coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times.

Similarly, for the above-described 1000 slots needed to transmit the 6000×2 bits making up the pair of coded blocks when the modulation scheme is 64-QAM, phase changing value P[0] is used on 200 slots, phase changing value P[1] is used on 200 slots, phase changing value P[2] is used on 200 slots, phase changing value P[3] is used on 200 slots, and phase changing value P[4] is used on 200 slots.

Furthermore, in order to transmit the first coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times. Furthermore, in order to transmit the second coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times.

As described above, a phase changing method for regularly varying the phase changing value as given in Embodiment C5 requires the preparation of N=2n+1 phase changing values P[0], P[1] ... P[2n-1], P[2n] (where P[0], P[1] ... P[2n-1], P[2n] are expressed as PHASE[0], PHASE[1], PHASE[2] ... PHASE[n-1], PHASE[n] (see Embodiment C5)). As such, in order to transmit all of the bits making up the two coded blocks, phase changing value P[0] is used on $K_0$ slots, phase changing value P[1] is used on $K_1$ slots, phase changing value P[i] is used on $K_i$ slots (where i=0, 1, 2 ... 2n-1, 2n (i being an integer between 0 and 2n)), and phase changing value P[2n] is used on $K_{2n}$ slots.

(Condition #C05)

$K_0 = K_1 ... = K_i = ... K_{2n}$. That is, $K_a = K_b$ ($\forall$a and $\forall$b where a, b, =0, 1, 2 ... 2n-1, 2n (a and b being integers between 0 and 2n), a≠b).

In order to transmit all of the bits making up the first coded block, phase changing value P[0] is used $K_{0,1}$ times, phase changing value P[1] is used $K_{1,1}$ times, phase changing value P[i] is used $K_{i,1}$ (where i=0, 1, 2 ... 2n-1, 2n (i being an integer between 0 and 2n)), and phase changing value P[2n] is used $K_{2n,1}$ times.

(Condition #C06)

$K_{0,1} = K_{1,1} ... = K_{i,1} = ... K_{2n,1}$. That is, $K_{a,1} = K_{b,1}$ ($\forall$a and $\forall$b where a, b, =0, 1, 2 ... 2n-1, 2n (a and b being integers between 0 and 2n), a≠b).

In order to transmit all of the bits making up the second coded block, phase changing value P[0] is used $K_{0,2}$ times, phase changing value P[1] is used $K_{1,2}$ times, phase changing value P[i] is used $K_{i,2}$ (where i=0, 1, 2 ... 2n-1, 2n (i being an integer between 0 and 2n)), and phase changing value P[2n] is used $K_{2n,2}$ times.

(Condition #C07)

$K_{0,2} = K_{1,2} ... = K_{i,2} = ... K_{2n,2}$. That is, $K_{a,2} = K_{b,2}$ ($\forall$a and $\forall$b where a, b, =0, 1, 2 ... 2n-1, 2n (a and b being integers between 0 and 2n), a≠b).

A phase changing method for regularly varying the phase changing value as given in Embodiment C5 having a period (cycle) of N=2n+1 requires the preparation of phase changing values PHASE[0], PHASE[1], PHASE[2] ... PHASE[n-1], PHASE[n]. As such, in order to transmit all of the bits making up the two coded blocks, phase changing value PHASE[0] is used on $G_0$ slots, phase changing value PHASE[1] is used on $G_1$ slots, phase changing value PHASE[i] is used on G slots (where i=0, 1, 2 ... n-1, n (i being an integer between 0 and n)), and phase changing value PHASE[n] is used on $G_n$ slots, such that Condition #C05 is met.

(Condition #C08)

$2 \times G_0 = G_1 ... = G_i = ... G_n$. That is, $2 \times G_0 = G_a$ ($\forall$a where a=1, 2 ... n-1, n (a being an integer between 1 and n)).

In order to transmit all of the bits making up the first coded block, phase changing value PHASE[0] is used $G_{0,1}$ times, phase changing value PHASE[1] is used $G_{1,1}$ times, phase changing value PHASE[i] is used $G_{i,1}$ (where i=0, 1, 2 ... n−1, n (i being an integer between 0 and n)), and phase changing value PHASE[n] is used $G_{n,1}$ times.
(Condition #C09)
$2 \times G_{0,1} = G_{1,1} \ldots = G_{i,1} = \ldots G_{n,1}$. That is, $2 \times G_{0,1} = G_{a,1}$ ($\forall$a where $\alpha$=1, 2 ... n−1, n (a being an integer between 1 and n)).

In order to transmit all of the bits making up the second coded block, phase changing value PHASE[0] is used $G_{0,2}$ times, phase changing value PHASE[1] is used $G_{1,2}$ times, phase changing value PHASE[i] is used $G_{i,2}$ (where i=0, 1, 2 ... n−1, n (i being an integer between 0 and n)), and phase changing value PHASE[n] is used $G_{n,1}$ times.
(Condition #C10)
$2 \times G_{0,2} = G_{1,2} \ldots = G_{i,2} = \ldots G_{n,2}$. That is, $2 \times G_{0,2} = G_{a,2}$ ($\forall$a where a=1, 2 ... n−1, n (a being an integer between 1 and n)).

Then, when a communication system that supports multiple modulation schemes selects one such supported method for use, Condition #C05, Condition #C06, and Condition #C07 (or Condition #C08, Condition #C09, and Condition #C10) is met for the supported modulation scheme.

However, when multiple modulation schemes are supported, each such modulation scheme typically uses symbols transmitting a different number of bits per symbols (though some may happen to use the same number), Condition #C05, Condition #C06, and Condition #C07 (or Condition #C08, Condition #C09, and Condition #C10) may not be satisfied for some modulation schemes. In such a case, the following conditions apply instead of Condition #C05, Condition #C06, and Condition #C07.
(Condition #C11)
The difference between $K_a$ and $K_b$ satisfies 0 or 1. That is, $|K_a - K_b|$ satisfies 0 or 1 ($\forall$a, $\forall$b, where a, b=0, 1, 2 ... 2n−1, 2n (a and b being integers between 0 and 2n), a≠b).
(Condition #C12)
The difference between $K_{a,1}$ and $K_{b,1}$ satisfies 0 or 1. That is, $|K_{a,1} - K_{b,1}|$ satisfies 0 or 1($\forall$a, $\forall$b, where a, b=0, 1, 2 ... 2n−1, 2n (a and b being integers between 0 and 2n), a≠b).
(Condition #C13)
The difference between $K_{a,2}$ and $K_{b,2}$ satisfies 0 or 1. That is, $|K_{a,2} - K_{b,2}|$ satisfies 0 or 1($\forall$a, $\forall$b, where a, b=0, 1, 2 ... 2n−1, 2n (a and b being integers between 0 and 2n), a≠b).
Alternatively, Condition #C11, Condition #C12, and Condition #C13 may be expressed as follows.
(Condition #C14)
The difference between $G_a$ and $G_b$ satisfies 0, 1, or 2. That is, $|G_a - G_b|$ satisfies 0, 1, or 2($\forall$a, $\forall$b, where a, b=1, 2 ... n−1, n (a and b being integers between 1 and n), a≠b)
and
The difference between $2 \times G_0$ and $G_a$ satisfies 0, 1, or 2. That is, $|2 \times G_0 - G_a|$ satisfies 0, 1, or 2 ($\forall$a, where a=1, 2 ... n−1, n (a being an integer between 1 and n)).
(Condition #C15)
The difference between $G_{a,1}$ and $G_{b,1}$ satisfies 0, 1, or 2. That is, $|G_{a,1} - G_{b,1}|$ satisfies 0, 1, or 2 ($\forall$a, $\forall$b, where a, b=1, 2 ... n−1, n (a and b being integers between 1 and n), a≠b)
and
The difference between $2 \times G_{0,1}$ and $G_{a,1}$ satisfies 0, 1, or 2. That is, $|2 \times G_{0,1} - G_{a,1}|$ satisfies 0, 1, or 2 ($\forall$a, where a=1, 2 ... n−1, n (a being an integer between 1 and n))
(Condition #C16)
The difference between $G_{a,2}$ and $G_{b,2}$ satisfies 0, 1, or 2. That is, $|G_{a,2} - G_{b,2}|$ satisfies 0, 1, or 2 ($\forall$a, $\forall$b, where a, b=1, 2 ... n−1, n (a and b being integers between 1 and n), a≠b)
and The difference between $2 \times G_{0,2}$ and $G_{a,2}$ satisfies 0, 1, or 2. That is, $|2 \times G_{0,2} - G_{a,2}|$ satisfies 0, 1, or 2 ($\forall$a, where a=1, 2 ... n−1, n (a being an integer between 1 and n))

As described above, bias among the phase changing values being used to transmit the coded blocks is removed by creating a relationship between the coded block and the phase changing values. As such, data reception quality can be improved for the reception device.

In the present Embodiment, N phase changing values (or phase changing sets) are needed in order to perform a change of phase having a period (cycle) of N with the method for a regular change of phase. As such, N phase changing values (or phase changing sets) P[0], P[1], P[2] ... P[N−2], and P[N−1] are prepared. However, schemes exist for ordering the phases in the stated order with respect to the frequency domain. No limitation is intended in this regard. The N phase changing values (or phase changing sets) P[0], P[1], P[2] ... P[N−2], and P[N−1] may also change the phases of blocks in the time domain or in the time-frequency domain to obtain a symbol arrangement as described in Embodiment 1. Although the above examples discuss a phase changing scheme with a period (cycle) of N, the same effects are obtainable using N phase changing values (or phase changing sets) at random. That is, the N phase changing values (or phase changing sets) need not always have regular periodicity. As long as the above-described conditions are satisfied, quality data reception improvements are realizable for the reception device.

Furthermore, given the existence of modes for spatial multiplexing MIMO methods, MIMO methods using a fixed precoding matrix, space-time block coding methods, single-stream transmission, and methods using a regular change of phase, the transmission device (broadcaster, base station) may select any one of these transmission methods.

As described in Non-Patent Literature 3, spatial multiplexing MIMO methods involve transmitting signals s1 and s2, which are mapped using a selected modulation scheme, on each of two different antennas. MIMO methods using a fixed precoding matrix involve performing precoding only (with no change in phase). Further, space-time block coding methods are described in Non-Patent Literature 9, 16, and 17. Single-stream transmission methods involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present Embodiment.

When a change of phase by, for example, a phase changing value for P[i] of X radians is performed on only one precoded baseband signal, the phase changers of FIGS. 3, 4, 6, 12, 25, 29, 51, and 53 multiply precoded baseband signal z2' by $e^{jX}$. Then, when a change of phase by, for example, a phase changing set for P[i] of X radians and Y radians is performed on both precoded baseband signals, the phase changers from FIGS. 26, 27, 28, 52, and 54 multiply precoded baseband signal z2' by $e^{jX}$ and multiply precoded baseband signal z1' by $e^{jY}$.

Embodiment C7

The present Embodiment describes a method of regularly changing the phase, specifically as done in Embodiment A1 and Embodiment C6, when encoding is performed using block codes as described in Non-Patent Literature 12 through 15, such as QC LDPC Codes (not only QC-LDPC but also LDPC (block) codes may be used), concatenated LDPC and BCH codes, Turbo codes or Duo-Binary Turbo codes, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in one coded block when block codes are used. FIG. 34 illustrates the varying numbers of symbols and slots needed in each coded block when block codes are used when, for example, two streams s1 and s2 are transmitted as indicated by the transmission device from FIG. 4, and the transmission device has only one encoder. (Here, the transmission method may be any single-carrier method or multi-carrier method such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the transmission device from FIG. 4 transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up two coded blocks, and when the modulation scheme is 64-QAM, 500 slots are needed to transmit all of the bits making up the two coded blocks.

The following describes the relationship between the above-defined slots and the phase, as pertains to methods for a regular change of phase.

Here, five different phase changing values (or phase changing sets) are assumed as having been prepared for use in the method for a regular change of phase, which has a period (cycle) of five. The phase changing values (or phase changing sets) prepared in order to regularly change the phase with a period (cycle) of five are P[0], P[1], P[2], P[3], and P[4]. However, P[0], P[1], P[2], P[3], and P[4] should include at least two different phase changing values (i.e., P[0], P[1], P[2], P[3], and P[4] may include identical phase changing values). (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances).

For the above-described 1500 slots needed to transmit the 6000 bits making up a single coded block when the modulation scheme is QPSK, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots. This is due to the fact that any bias in phase changing value usage causes great influence to be exerted by the more frequently used phase changing value, and that the reception device is dependent on such influence for data reception quality.

Further, for the above-described 750 slots needed to transmit the 6000 bits making up a single coded block when the modulation scheme is 16-QAM, phase changing value P[0] is used on 150 slots, phase changing value P[1] is used on 150 slots, phase changing value P[2] is used on 150 slots, phase changing value P[3] is used on 150 slots, and phase changing value P[4] is used on 150 slots.

Further, for the above-described 500 slots needed to transmit the 6000 bits making up a single coded block when the modulation scheme is 64-QAM, phase changing value P[0] is used on 100 slots, phase changing value P[1] is used on 100 slots, phase changing value P[2] is used on 100 slots, phase changing value P[3] is used on 100 slots, and phase changing value P[4] is used on 100 slots.

As described above, the phase changing values used in the phase changing method regularly switching between phase changing values with a period (cycle) of N are expressed as P[0], P[1] ... P[N−2], P[N−1]. However, P[0], P[1] ... P[N−2], P[N−1] should include at least two different phase changing values (i.e., P[0], P[1] ... P[N−2], P[N−1] may include identical phase changing values). In order to transmit all of the bits making up a single coded block, phase changing value P[0] is used on $K_0$ slots, phase changing value P[1] is used on $K_1$ slots, phase changing value P[i] is used on $K_i$ slots (where i=0, 1, 2 ... N−1 (i being an integer between 0 and N−1)), and phase changing value P[N−1] is used on $K_{N-1}$ slots, such that Condition #C17 is met.
(Condition #C17)
$K_0 = K_1 ... = K_i = ... K_{N-1}$. That is, $K_a = K_b$ ($\forall a$ and $\forall b$ where a, b, =0, 1, 2 ... N−1 (a and b being integers between 0 and N−1), a≠b).

Then, when a communication system that supports multiple modulation schemes selects one such supported method for use, Condition #C17 is met for the supported modulation scheme.

However, when multiple modulation schemes are supported, each such modulation scheme typically uses symbols transmitting a different number of bits per symbols (though some may happen to use the same number), Condition #C17 may not be satisfied for some modulation schemes. In such a case, the following condition applies instead of Condition #C17.
(Condition #C18)
The difference between $K_a$ and $K_b$ satisfies 0 or 1. That is, $|K_a - K_b|$ satisfies 0 or 1 ($\forall a$, $\forall b$, where a, b=0, 1, 2 ... N−1 (a and b being integers between 0 and N−1), a≠b).

FIG. 35 illustrates the varying numbers of symbols and slots needed in two coded blocks when block codes are used. FIG. 35 illustrates the varying numbers of symbols and slots needed in each coded block when block codes are used when, for example, two streams s1 and s2 are transmitted as indicated by the transmission device from FIG. 3 and FIG. 12, and the transmission device has two encoders. (Here, the transmission method may be any single-carrier method or multi-carrier method such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 3 and the transmission device from FIG. 12 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up two coded blocks, and when the modulation scheme is 64-QAM, 1000 slots are needed to transmit all of the bits making up the two coded blocks.

The following describes the relationship between the above-defined slots and the phase, as pertains to methods for a regular change of phase.

Here, five different phase changing values (or phase changing sets) are assumed as having been prepared for use in the method for a regular change of phase, which has a period (cycle) of five. That is, the phase changer of the transmission device from FIG. 4 uses five phase changing values (or phase changing sets) P[0], P[1], P[2], P[3], and P[4] to achieve the period (cycle) of five. However, P[0], P[1], P[2], P[3], and P[4] should include at least two different phase changing values (i.e., P[0], P[1], P[2], P[3], and P[4] may include identical phase changing values). (As in FIG. 6, five phase changing values are needed in order to perform a change of phase having a period (cycle) of five on precoded baseband signal z2' only. Also, as in FIG. 26, two phase changing values are needed for each slot in order to perform the change of phase on both precoded baseband signals z1' and z2'. These two phase changing values are termed a phase changing set. Accordingly, five phase changing sets should ideally be prepared in order to perform a change of phase having a period (cycle) of five in such circumstances). The five phase changing values (or phase changing sets) needed for the period (cycle) of five are expressed as P[0], P[1], P[2], P[3], and P[4].

For the above-described 3000 slots needed to transmit the 6000×2 bits making up the pair of coded blocks when the modulation scheme is QPSK, phase changing value P[0] is used on 600 slots, phase changing value P[1] is used on 600 slots, phase changing value P[2] is used on 600 slots, phase changing value P[3] is used on 600 slots, and phase changing value P[4] is used on 600 slots. This is due to the fact that any bias in phase changing value usage causes great influence to be exerted by the more frequently used phase changing value, and that the reception device is dependent on such influence for data reception quality.

Further, in order to transmit the first coded block, phase changing value P[0] is used on slots 600 times, phase changing value P[1] is used on slots 600 times, phase changing value P[2] is used on slots 600 times, phase changing value P[3] is used on slots 600 times, and phase changing value PHASE[4] is used on slots 600 times. Furthermore, in order to transmit the second coded block, phase changing value P[0] is used on slots 600 times, phase changing value P[1] is used on slots 600 times, phase changing value P[2] is used on slots 600 times, phase changing value P[3] is used on slots 600 times, and phase changing value P[4] is used on slots 600 times.

Similarly, for the above-described 1500 slots needed to transmit the 6000×2 bits making up the pair of coded blocks when the modulation scheme is 16-QAM, phase changing value P[0] is used on 300 slots, phase changing value P[1] is used on 300 slots, phase changing value P[2] is used on 300 slots, phase changing value P[3] is used on 300 slots, and phase changing value P[4] is used on 300 slots.

Furthermore, in order to transmit the first coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times. Furthermore, in order to transmit the second coded block, phase changing value P[0] is used on slots 300 times, phase changing value P[1] is used on slots 300 times, phase changing value P[2] is used on slots 300 times, phase changing value P[3] is used on slots 300 times, and phase changing value P[4] is used on slots 300 times.

Furthermore, for the above-described 1000 slots needed to transmit the 6000×2 bits making up the two coded blocks when the modulation scheme is 64-QAM, phase changing value P[0] is used on 200 slots, phase changing value P[1] is used on 200 slots, phase changing value P[2] is used on 200 slots, phase changing value P[3] is used on 200 slots, and phase changing value P[4] is used on 200 slots.

Furthermore, in order to transmit the first coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times. Furthermore, in order to transmit the second coded block, phase changing value P[0] is used on slots 200 times, phase changing value P[1] is used on slots 200 times, phase changing value P[2] is used on slots 200 times, phase changing value P[3] is used on slots 200 times, and phase changing value P[4] is used on slots 200 times.

As described above, the phase changing values used in the phase changing method regularly switching between phase changing values with a period (cycle) of N are expressed as P[0], P[1] . . . P[N−2], P[N−1]. However, P[0], P[1] . . . P[N−2], P[N−1] should include at least two different phase changing values (i.e., P[0], P[1] . . . P[N−2], P[N−1] may include identical phase changing values). In order to transmit all of the bits making up a single coded block, phase changing value P[0] is used on $K_0$ slots, phase changing value P[1] is used on $K_1$ slots, phase changing value P[i] is used on $K_i$ slots (where i=0, 1, 2 . . . N−1 (i being an integer between 0 and N−1)), and phase changing value P[N−1] is used on $K_{N-1}$ slots, such that Condition #C19 is met.

(Condition #C19)

$K_0 = K_1 \ldots = K_i = \ldots K_{N-1}$. That is, $K_a = K_b$ ($\forall a$ and $\forall b$ where a, b,=0, 1, 2 . . . N−1 (a and b being integers between 0 and N−1), a≠b).

In order to transmit all of the bits making up the first coded block, phase changing value P[0] is used $K_{0,1}$ times, phase changing value P[1] is used $K_1$, 1 times, phase changing value P[i] is used $K_{i,1}$ (where i=0, 1, 2 . . . N−1 (i being an integer between 0 and N−1)), and phase changing value P[N−1] is used $K_{N-1,1}$ times.

(Condition #C20)

$K_{0,1}=K_{1,1}=\ldots K_{i,1}=\ldots K_{N-1,1}$. That is, $K_{a,1}=K_{b,1}$ ($\forall$a and $\forall$b where a, b,=0, 1, 2 ... N−1 (a and b being integers between 0 and N−1), a≠b).

In order to transmit all of the bits making up the second coded block, phase changing value P[0] is used $K_{0,2}$ times, phase changing value P[1] is used $K_{1,2}$ times, phase changing value P[i] is used $K_{i,2}$ (where i=0, 1, 2 ... N−1 (i being an integer between 0 and N−1)), and phase changing value P[N−1] is used $K_{N-1,2}$ times.

(Condition #C21)

$K_{0,2}=K_{1,2}=\ldots K_{i,2}=\ldots K_{N-1,2}$. That is, $K_{a,2}=K_{b,2}$ ($\forall$a and $\forall$b where a, b,=0, 1, 2 ... N−1, a≠b).

Then, when a communication system that supports multiple modulation schemes selects one such supported method for use, Condition #C19, Condition #C20, and Condition #C21 are preferably met for the supported modulation scheme.

However, when multiple modulation schemes are supported, each such modulation scheme typically uses symbols transmitting a different number of bits per symbols (though some may happen to use the same number), Condition #C19, Condition #C20, and Condition #C21 may not be satisfied for some modulation schemes. In such a case, the following conditions apply instead of Condition #C19, Condition #C20, and Condition #C21.

(Condition #C22)

The difference between $K_a$ and $K_b$ satisfies 0 or 1. That is, $|K_a K_b|$ satisfies 0 or 1 ($\forall$a, $\forall$b, where a, b=0, 1, 2 ... N−1 (a and b being integers between 0 and N−1), a≠b).

(Condition #C23)

The difference between $K_{a,1}$ and $K_{b,1}$ satisfies 0 or 1. That is, $|K_{a,1}-K_{b,1}|$ satisfies 0 or 1 ($\forall$a, $\forall$b, where a, b=0, 1, 2 ... N−1(a and b being integers between 0 and N−1), a≠b).

(Condition #C24)

The difference between $K_{a,2}$ and $K_{b,2}$ satisfies 0 or 1. That is, $|K_{a,2}-K_{b,2}|$ satisfies 0 or 1 ($\forall$a, $\forall$b, where a, b=0, 1, 2 ... N−1(a and b being integers between 0 and N−1), a≠b).

As described above, bias among the phase changing values being used to transmit the coded blocks is removed by creating a relationship between the coded block and the phase changing values. As such, data reception quality can be improved for the reception device.

In the present Embodiment, N phase changing values (or phase changing sets) are needed in order to perform a change of phase having a period (cycle) of N with the method for a regular change of phase. As such, N phase changing values (or phase changing sets) P[0], P[1], P[2] ... P[N−2], and P[N−1] are prepared. However, methods exist for ordering the phases in the stated order with respect to the frequency domain. No limitation is intended in this regard. The N phase changing values (or phase changing sets) P[0], P[1], P[2] ... P[N−2], and P[N−1] may also change the phases of blocks in the time domain or in the time-frequency domain to obtain a symbol arrangement as described in Embodiment 1. Although the above examples discuss a phase changing method with a period (cycle) of N, the same effects are obtainable using N phase changing values (or phase changing sets) at random. That is, the N phase changing values (or phase changing sets) need not always have regular periodicity. As long as the above-described conditions are satisfied, great quality data reception improvements are realizable for the reception device.

Furthermore, given the existence of modes for spatial multiplexing MIMO methods, MIMO methods using a fixed precoding matrix, space-time block coding methods, single-stream transmission, and methods using a regular change of phase, the transmission device (broadcaster, base station) may select any one of these transmission methods.

As described in Non-Patent Literature 3, spatial multiplexing MIMO methods involve transmitting signals s1 and s2, which are mapped using a selected modulation scheme, on each of two different antennas. MIMO methods using a fixed precoding matrix involve performing precoding only (with no change in phase). Further, space-time block coding methods are described in Non-Patent Literature 9, 16, and 17. Single-stream transmission methods involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO schemes, MIMO schemes using a fixed precoding matrix, space-time block coding schemes, single-stream transmission, and schemes using a regular change of phase may be used. In particular, schemes using a regular change of phase on a selected (sub-)carrier group are preferably used to realize the present Embodiment.

When a change of phase by, for example, a phase changing value for P[i] of X radians is performed on only one precoded baseband signal, the phase changers of FIGS. 3, 4, 6, 12, 25, 29, 51, and 53 multiply precoded baseband signal z2' by $e^{jX}$. Then, when a change of phase by, for example, a phase changing set for P[i] of X radians and Y radians is performed on both precoded baseband signals, the phase changers from FIGS. 26, 27, 28, 52, and 54 multiply precoded baseband signal z2' by $e^{jX}$ and multiply precoded baseband signal z1' by $e^{jY}$.

Embodiment D1

Figure 67:
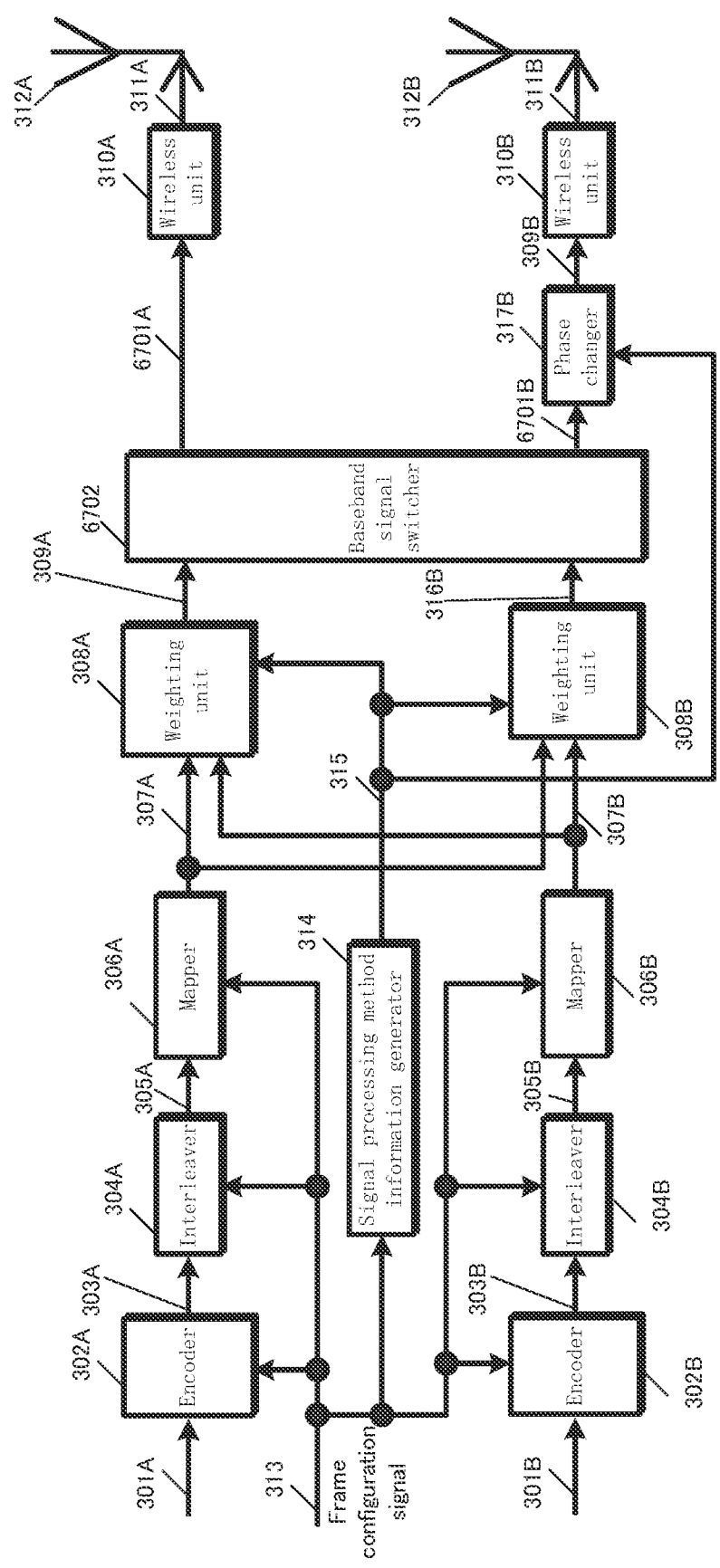
FIG. 67 illustrates yet still another sample configuration of a transmission device.

The present Embodiment is first described as a variation of Embodiment 1. FIG. 67 illustrates a sample transmission device pertaining to the present Embodiment. Components thereof operating identically to those of FIG. 3 use the same reference numbers thereas, and the description thereof is omitted for simplicity, below. FIG. 67 differs from FIG. 3 in the insertion of a baseband signal switcher 6702 directly following the weighting units. Accordingly, the following explanations are primarily centred on the baseband signal switcher 6702.

FIG. 21 illustrates the configuration of the weighting units 308A and 308B. The area of FIG. 21 enclosed in the dashed line represents one of the weighting units. Baseband signal 307A is multiplied by w11 to obtain w11·s1(t), and multiplied by w21 to obtain w21·s1(t). Similarly, baseband signal 307B is multiplied by w12 to obtain w12·s2(t), and multiplied by w22 to obtain w22·s2(t). Next, z1(t)=w11·s1(t)+w12·s2(t) and z2(t)=w21·s1(t)+w22·s22(t) are obtained. Here, as explained in Embodiment 1, s1(t) and s2(t) are baseband signals modulated according to a modulation scheme such as BPSK, QPSK, 8-PSK, 16-QAM, 32-QAM, 64-QAM, 256-QAM, 16-APSK and so on. Both weighting units perform weighting using a fixed precoding matrix. The precoding matrix uses, for example, the method of Math. 62 (formula 62), and satisfies the conditions of Math. 63 (formula 63) or Math. 64 (formula 64), all found below. However, this is only an example. The value of α is not limited to Math. 63 (formula 63) and Math. 64 (formula 64), and may, for example, be 1, or may be 0 (a is preferably a real number greater than or equal to 0, but may be also be an imaginary number).

Here, the precoding matrix is

[Math. 62]

$$\begin{pmatrix} w11 & w12 \\ w21 & w22 \end{pmatrix} = \frac{1}{\sqrt{\alpha^2+1}} \begin{pmatrix} e^{j0} & \alpha \times e^{j0} \\ \alpha \times e^{j0} & e^{j\pi} \end{pmatrix} \quad \text{(formula 62)}$$

In Math. 62 (formula 62), above, a is given by:

[Math. 63]

$$\alpha = \frac{\sqrt{2}+4}{\sqrt{2}+2} \quad \text{(formula 63)}$$

Alternatively, in Math. 62 (formula 62), above, a may be given by:

[Math. 64]

$$\alpha = \frac{\sqrt{2}+3+\sqrt{5}}{\sqrt{2}+3-\sqrt{5}} \quad \text{(formula 64)}$$

Alternatively, the precoding matrix is not restricted to that of Math. 62 (formula 62), but may also be:

[Math. 65]

$$\begin{pmatrix} w11 & w12 \\ w21 & w22 \end{pmatrix} = \begin{pmatrix} a & b \\ c & d \end{pmatrix} \quad \text{(formula 65)}$$

where $a=Ae^{j\delta 11}$, $b=Be^{j\delta 12}$, $c=Ce^{j\delta 21}$, and $d=De^{j\delta 22}$. Further, one of a, b, c, and d may be equal to zero. For example: (1) a may be zero while b, c, and d are non-zero, (2) b may be zero while a, c, and d are non-zero, (3) c may be zero while a, b, and d are non-zero, or (4) d may be zero while a, b, and c are non-zero.

Alternatively, any two of a, b, c, and d may be equal to zero. For example, (1) a and d may be zero while b and c are non-zero, or (2) b and c may be zero while a and d are non-zero.

When any of the modulation scheme, error-correcting codes, and the coding rate thereof are changed, the precoding matrix in use may also be set and changed, or the same precoding matrix may be used as-is.

Next, the baseband signal switcher 6702 from FIG. 67 is described. The baseband signal switcher 6702 takes weighted signal 309A and weighted signal 316B as input, performs baseband signal switching, and outputs switched baseband signal 6701A and switched baseband signal 6701B. The details of baseband signal switching are as described with reference to FIG. 55. The baseband signal switching performed in the present Embodiment differs from that of FIG. 55 in terms of the signal used for switching. The following describes the baseband signal switching of the present Embodiment with reference to FIG. 68.

Figure 68:
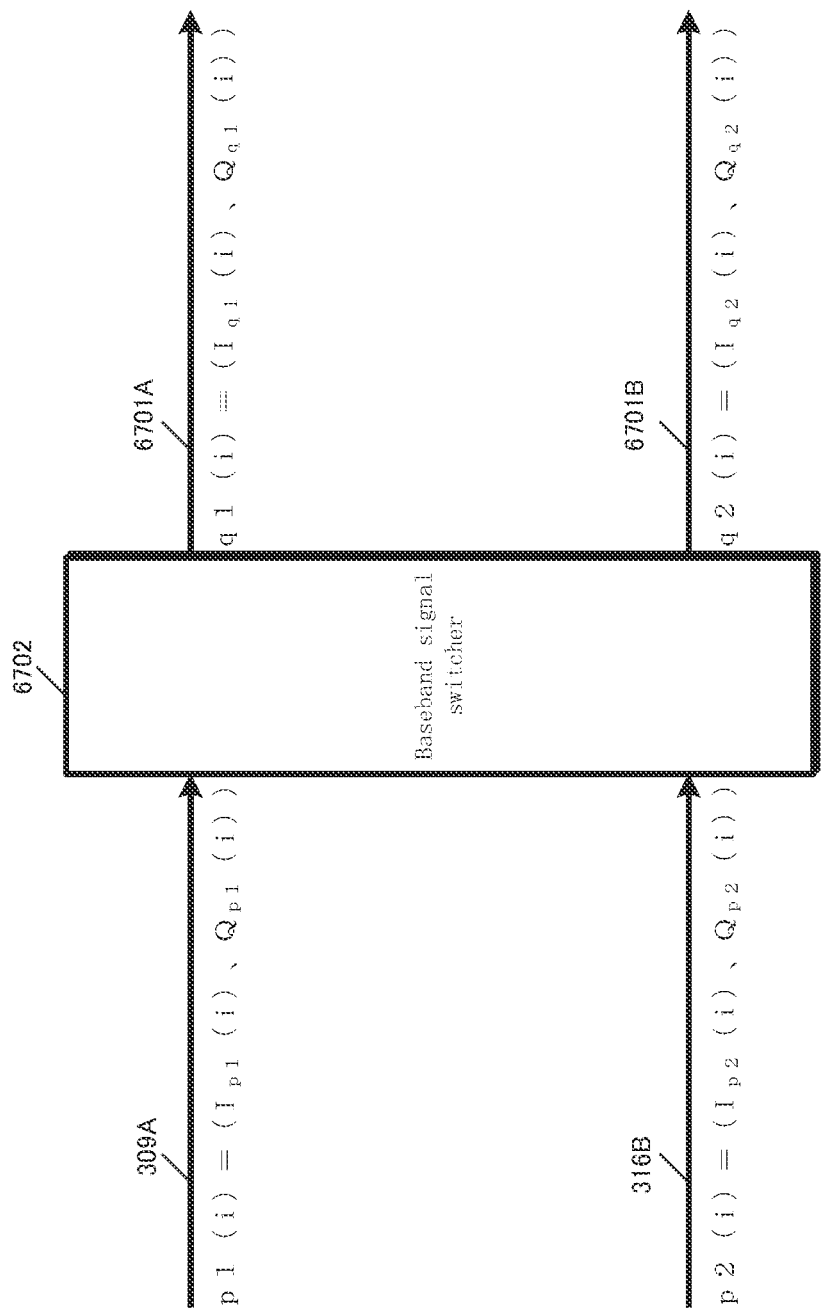
FIG. 68 illustrates another baseband signal switcher.

In FIG. 68, weighted signal 309A(p1($i$)) has an in-phase component I of $I_{p1}(i)$ and a quadrature component Q of $Q_{p1}(i)$, while weighted signal 316B(p2($i$)) has an in-phase component I of $I_{p2}(i)$ and a quadrature component Q of $Q_{p2}(i)$. In contrast, switched baseband signal 6701A(q1($i$)) has an in-phase component I of $I_{q1}(i)$ and a quadrature component Q of $Q_{q1}(i)$, while switched baseband signal 6701B(q2($i$)) has an in-phase component I of $I_{q2}(i)$ and a quadrature component Q of $Q_{q2}(i)$. (Here, i represents (time or (carrier) frequency order. In the example of FIG. 67, i represents time, though i may also represent (carrier) frequency when FIG. 67 is applied to an OFDM scheme, as in FIG. 12. These points are elaborated upon below.)

Here, the baseband components are switched by the baseband signal switcher 6702, such that:

For switched baseband signal q1($i$), the in-phase component I may be $I_{p1}(i)$ while the quadrature component Q may be $Q_{p2}(i)$, and for switched baseband signal q2($i$), the in-phase component I may be $I_{p2}(i)$ while the quadrature component q may be $Q_{p1}(i)$. The modulated signal corresponding to switched baseband signal q1($i$) is transmitted by transmit antenna 1 and the modulated signal corresponding to switched baseband signal q2($i$) is transmitted from transmit antenna 2, simultaneously on a common frequency. As such, the modulated signal corresponding to switched baseband signal q1($i$) and the modulated signal corresponding to switched baseband signal q2($i$) are transmitted from different antennas, simultaneously on a common frequency. Alternatively, For switched baseband signal q1($i$), the in-phase component may be $I_{p1}(i)$ while the quadrature component may be $I_{p2}(i)$, and for switched baseband signal q2($i$), the in-phase component may be $Q_{p1}(i)$ while the quadrature component may be $Q_{p2}(i)$.

For switched baseband signal q1($i$), the in-phase component may be $I_{p2}(i)$ while the quadrature component may be $I_{p1}(i)$, and for switched baseband signal q2($i$), the in-phase component may be $Q_{p1}(i)$ while the quadrature component may be $Q_{p2}(i)$.

For switched baseband signal q1($i$), the in-phase component may be $I_{p1}(i)$ while the quadrature component may be $I_{p2}(i)$, and for switched baseband signal q2($i$), the in-phase component may be $Q_{p2}(i)$ while the quadrature component may be $Q_{p1}(i)$.

For switched baseband signal q1($i$), the in-phase component may be $I_{p2}(i)$ while the quadrature component may be $I_{p1}(i)$, and for switched baseband signal q2($i$), the in-phase component may be $Q_{p2}(i)$ while the quadrature component may be $Q_{p1}(i)$.

For switched baseband signal q1($i$), the in-phase component may be $I_{p1}(i)$ while the quadrature component may be $Q_{p2}(i)$, and for switched baseband signal q2($i$), the in-phase component may be $Q_{p1}(i)$ while the quadrature component may be $I_{p2}(i)$.

For switched baseband signal q1($i$), the in-phase component may be $Q_{p2}(i)$ while the quadrature component may be $I_{p1}(i)$, and for switched baseband signal q2($i$), the in-phase component may be $I_{p2}(i)$ while the quadrature component may be $Q_{p1}(i)$.

For switched baseband signal q1($i$), the in-phase component may be $Q_{p2}(i)$ while the quadrature component may be $I_{p1}(i)$, and for switched baseband signal q2($i$), the in-phase component may be $Q_{p1}(i)$ while the quadrature component may be $I_{p2}(i)$.

For switched baseband signal q2($i$), the in-phase component may be $I_{p1}(i)$ while the quadrature component may be $I_{p2}(i)$, and for switched baseband signal q1($i$), the in-phase component may be $Q_{p1}(i)$ while the quadrature component may be $Q_{p2}(i)$.

For switched baseband signal q2($i$), the in-phase component may be $I_{p2}(i)$ while the quadrature component may be $I_{p1}(i)$, and for switched baseband signal q1($i$), the in-phase component may be $Q_{p1}(i)$ while the quadrature component may be $Q_{p2}(i)$.

For switched baseband signal q2($i$), the in-phase component may be $I_{p1}(i)$ while the quadrature component may be $I_{p2}(i)$, and for switched baseband signal q1($i$), the in-phase component may be $Q_{p2}(i)$ while the quadrature component may be $Q_{p1}(i)$.

For switched baseband signal q2($i$), the in-phase component may be $I_{p2}(i)$ while the quadrature component may be $I_{p1}(i)$, and for switched baseband signal q1($i$), the in-phase component may be $Q_{p2}(i)$ while the quadrature component may be $Q_{p1}(i)$.

For switched baseband signal q2($i$), the in-phase component may be $I_{p1}(i)$ while the quadrature component may be $Q_{p2}(i)$, and for switched baseband signal q1($i$), the in-phase component may be $I_{p2}(i)$ while the quadrature component may be $Q_{p1}(i)$.

For switched baseband signal q2($i$), the in-phase component may be $I_{p1}(i)$ while the quadrature component may be $Q_{p2}(i)$, and for switched baseband signal q1($i$), the in-phase component may be $Q_{p1}(i)$ while the quadrature component may be $I_{p2}(i)$.

For switched baseband signal q2($i$), the in-phase component may be $Q_{p2}(i)$ while the quadrature component may be $I_{p1}(i)$, and for switched baseband signal q1($i$), the in-phase component may be $I_{p2}(i)$ while the quadrature component may be $Q_{p1}(i)$.

For switched baseband signal q2($i$), the in-phase component may be $Q_{p2}(i)$ while the quadrature component may be $I_{p1}(i)$, and for switched baseband signal q1($i$), the in-phase component may be $Q_{p1}(i)$ while the quadrature component may be $I_{p2}(i)$.

Alternatively, the weighted signals 309A and 316B are not limited to the above-described switching of in-phase component and quadrature component. Switching may be performed on in-phase components and quadrature components greater than those of the two signals.

Also, while the above examples describe switching performed on baseband signals having a common timestamp (common (sub-)carrier) frequency), the baseband signals being switched need not necessarily have a common timestamp (common (sub-)carrier) frequency). For example, any of the following are possible.

For switched baseband signal q1($i$), the in-phase component may be $I_{p1}(i+v)$ while the quadrature component may be $Q_{p2}(i+w)$, and for switched baseband signal q2($i$), the in-phase component may be $I_{p2}(i+w)$ while the quadrature component may be $Q_{p1}(i+v)$.

For switched baseband signal q1($i$), the in-phase component may be $I_{p1}(i+v)$ while the quadrature component may be $I_{p2}(i+w)$, and for switched baseband signal q2($i$), the in-phase component may be $Q_{p1}(i+v)$ while the quadrature component may be $Q_{p2}(i+w)$.

For switched baseband signal q1($i$), the in-phase component may be $I_{p2}(i+w)$ while the quadrature component may be $I_{p1}(i+v)$, and for switched baseband signal q2($i$), the in-phase component may be $Q_{p1}(i+v)$ while the quadrature component may be $Q_{p2}(i+w)$.

For switched baseband signal q1($i$), the in-phase component may be $I_{p1}(i+v)$ while the quadrature component may be $I_{p2}(i+w)$, and for switched baseband signal q2($i$), the in-phase component may be $Q_{p2}(i+w)$ while the quadrature component may be $Q_{p1}(i+v)$.

For switched baseband signal q1($i$), the in-phase component may be $I_{p2}(i+w)$ while the quadrature component may be $I_{p1}(i+v)$, and for switched baseband signal q2($i$), the in-phase component may be $Q_{p2}(i+w)$ while the quadrature component may be $Q_{p1}(i+v)$.

For switched baseband signal q1($i$), the in-phase component may be $I_{p1}(i+v)$ while the quadrature component may be $Q_{p2}(i+w)$, and for switched baseband signal q2($i$), the in-phase component may be $Q_{p1}(i+v)$ while the quadrature component may be $I_{p2}(i+w)$.

For switched baseband signal q1($i$), the in-phase component may be $Q_{p2}(i+w)$ while the quadrature component may be $I_{p1}(i+v)$, and for switched baseband signal q2($i$), the in-phase component may be $I_{p2}(i+w)$ while the quadrature component may be $Q_{p1}(i+v)$.

For switched baseband signal q1($i$), the in-phase component may be $Q_{p2}(i+w)$ while the quadrature component may be $I_{p1}(i+v)$, and for switched baseband signal q2($i$), the in-phase component may be $Q_{p1}(i+v)$ while the quadrature component may be $I_{p2}(i+w)$.

For switched baseband signal q2($i$), the in-phase component may be $I_{p1}(i+v)$ while the quadrature component may be $I_{p2}(i+w)$, and for switched baseband signal q1($i$), the in-phase component may be $Q_{p1}(i+v)$ while the quadrature component may be $Q_{p2}(i+w)$.

For switched baseband signal q2($i$), the in-phase component may be $I_{p2}(i+w)$ while the quadrature component may be $I_{p1}(i+v)$, and for switched baseband signal q1($i$), the in-phase component may be $Q_{p1}(i+v)$ while the quadrature component may be $Q_{p2}(i+w)$.

For switched baseband signal q2($i$), the in-phase component may be $I_{p1}(i+v)$ while the quadrature component may be $I_{p2}(i+w)$, and for switched baseband signal q1($i$), the in-phase component may be $Q_{p2}(i+w)$ while the quadrature component may be $Q_{p1}(i+v)$.

For switched baseband signal q2($i$), the in-phase component may be $I_{p2}(i+w)$ while the quadrature component may be $I_{p1}(i+v)$, and for switched baseband signal q1($i$), the in-phase component may be $Q_{p2}(i+w)$ while the quadrature component may be $Q_{p1}(i+v)$.

For switched baseband signal q2($i$), the in-phase component may be $I_{p1}(i+v)$ while the quadrature component may be $Q_{p2}(i+w)$, and for switched baseband signal q1($i$), the in-phase component may be $I_{p2}(i+w)$ while the quadrature component may be $Q_{p1}(i+v)$.

For switched baseband signal q2($i$), the in-phase component may be $I_{p1}(i+v)$ while the quadrature component may be $Q_{p2}(i+w)$, and for switched baseband signal q1($i$), the in-phase component may be $Q_{p1}(i+v)$ while the quadrature component may be $I_{p2}(i+w)$.

For switched baseband signal q2($i$), the in-phase component may be $Q_{p2}(i+w)$ while the quadrature component may be $I_{p1}(i+v)$, and for switched baseband signal q1($i$), the in-phase component may be $I_{p2}(i+w)$ while the quadrature component may be $Q_{p1}(i+v)$.

For switched baseband signal q2($i$), the in-phase component may be $Q_{p2}(i+w)$ while the quadrature component may be $I_{p1}(i+v)$, and for switched baseband signal q1($i$), the in-phase component may be $Q_{p1}(i+v)$ while the quadrature component may be $I_{p2}(i+w)$.

Here, weighted signal 309A(p1($i$)) has an in-phase component I of $I_{p1}(i)$ and a quadrature component Q of $Q_{p1}(i)$, while weighted signal 316B(p2($i$)) has an in-phase component I of $I_{p2}(i)$ and a quadrature component Q of $Q_{p2}(i)$. In contrast, switched baseband signal 6701A(q1($i$)) has an in-phase component I of $I_{q1}(i)$ and a quadrature component Q of $Q_{q1}(i)$, while switched baseband signal 6701B(q2(*i*)) has an in-phase component $I_{q2}(i)$ and a quadrature component Q of $Q_{q2}(i)$.

In FIG. 68, as described above, weighted signal 309A(p1 (*i*)) has an in-phase component I of $I_{p1}(i)$ and a quadrature component Q of $Q_{p1}(i)$, while weighted signal 316B(p2(*i*)) has an in-phase component I of $I_{p2}$ (*i*) and a quadrature component Q of $Q_{p2}$ (*i*). In contrast, switched baseband signal 6701A(q1(*i*)) has an in-phase component I of LAO and a quadrature component Q of $Q_{q1}(i)$, while switched baseband signal 6701B(q2(*i*)) has an in-phase component LAO and a quadrature component Q of $Q_{q2}(i)$.

As such, in-phase component I of $I_{q1}(i)$ and quadrature component Q of $Q_{q1}(i)$ of switched baseband signal 6701A (q1(*i*)) and in-phase component $I_{q2}(i)$ and quadrature component Q of $Q_{q2}(i)$ of baseband signal 6701B(q2(*i*)) are expressible as any of the above.

As such, the modulated signal corresponding to switched baseband signal 6701A(q1(*i*)) is transmitted from transmit antenna 312A, while the modulated signal corresponding to switched baseband signal 6701B(q2(*i*)) is transmitted from transmit antenna 312B, both being transmitted simultaneously on a common frequency. Thus, the modulated signals corresponding to switched baseband signal 6701A(q1(*i*)) and switched baseband signal 6701B(q2(*i*)) are transmitted from different antennas, simultaneously on a common frequency.

Phase changer 317B takes switched baseband signal 6701B and signal processing method information 315 as input and regularly changes the phase of switched baseband signal 6701B for output. This regular change is a change of phase performed according to a predetermined phase changing pattern having a predetermined period (cycle) (e.g., every n symbols (n being an integer, n≥1) or at a predetermined interval). The phase changing pattern is described in detail in Embodiment 4.

Wireless unit 310B takes post-phase change signal 309B as input and performs processing such as quadrature modulation, band limitation, frequency conversion, amplification, and so on, then outputs transmit signal 311B. Transmit signal 311B is then output as radio waves by an antenna 312B.

FIG. 67, much like FIG. 3, is described as having a plurality of encoders. However, FIG. 67 may also have an encoder and a distributor like FIG. 4. In such a case, the signals output by the distributor are the respective input signals for the interleaver, while subsequent processing remains as described above for FIG. 67, despite the changes required thereby.

FIG. 5 illustrates an example of a frame configuration in the time domain for a transmission device according to the present Embodiment. Symbol 500_1 is a symbol for notifying the reception device of the transmission method. For example, symbol 500_1 conveys information such as the error-correction method used for transmitting data symbols, the coding rate thereof, and the modulation scheme used for transmitting data symbols.

Symbol 501_1 is for estimating channel fluctuations for modulated signal z1(*t*) (where t is time) transmitted by the transmission device. Symbol 502_1 is a data symbol transmitted by modulated signal z1(*t*) as symbol number u (in the time domain). Symbol 503_1 is a data symbol transmitted by modulated signal z1(*t*) as symbol number u+1.

Symbol 501_2 is for estimating channel fluctuations for modulated signal z2(*t*) (where t is time) transmitted by the transmission device. Symbol 502_2 is a data symbol transmitted by modulated signal z2(*t*) as symbol number u. Symbol 503_2 is a data symbol transmitted by modulated signal z1(*t*) as symbol number u+1.

Here, the symbols of z1(*t*) and of z2(*t*) having the same timestamp (identical timing) are transmitted from the transmit antenna using the same (shared/common) frequency.

The following describes the relationships between the modulated signals z1(*t*) and z2(*t*) transmitted by the transmission device and the received signals r1(*t*) and r2(*t*) received by the reception device.

In FIGS. 5, 504 #1 and 504 #2 indicate transmit antennas of the transmission device, while 505 #1 and 505 #2 indicate receive antennas of the reception device. The transmission device transmits modulated signal z1(*t*) from transmit antenna 504 #1 and transmits modulated signal z2(*t*) from transmit antenna 504 #2. Here, modulated signals z1(*t*) and z2(*t*) are assumed to occupy the same (shared/common) frequency (bandwidth). The channel fluctuations in the transmit antennas of the transmission device and the antennas of the reception device are $h_{11}(t)$, $h_{12}(t)$, $h_{21}(t)$, and $h_{22}(t)$, respectively. Assuming that receive antenna 505 #1 of the reception device receives received signal r1(*t*) and that receive antenna 505 #2 of the reception device receives received signal r2(*t*), the following relationship holds.

[Math. 66]

$$\begin{pmatrix} r1(t) \\ r2(t) \end{pmatrix} = \begin{pmatrix} h_{11}(t) & h_{12}(t) \\ h_{21}(t) & h_{22}(t) \end{pmatrix} \begin{pmatrix} z1(t) \\ z2(t) \end{pmatrix} \quad \text{(formula 66)}$$

Figure 69:
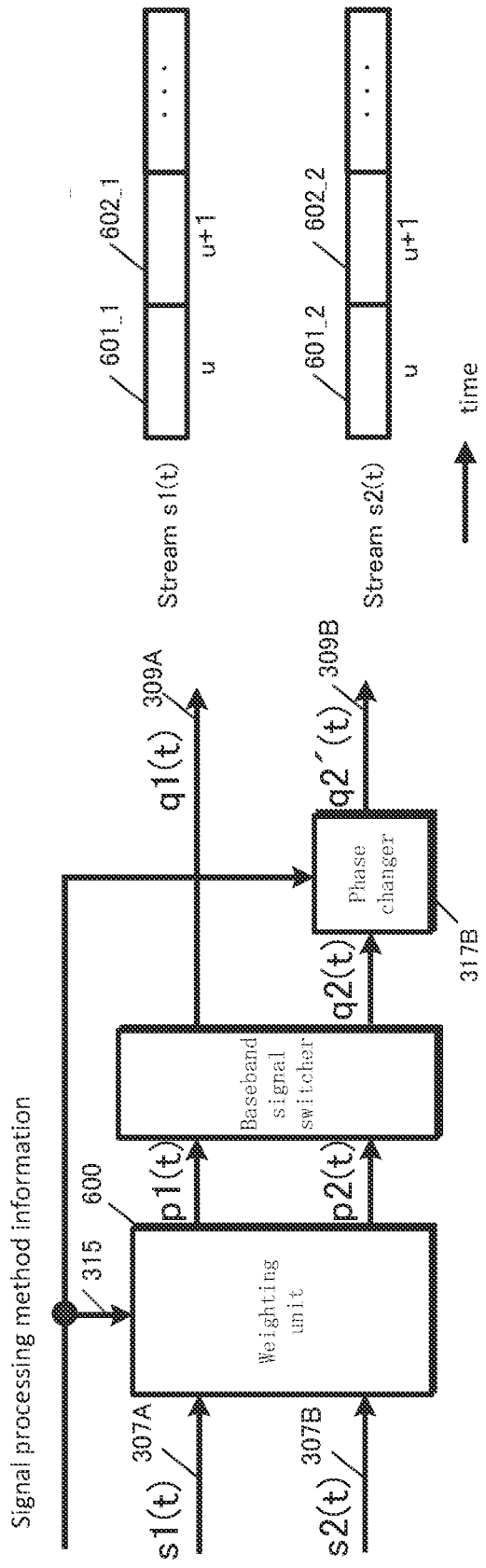
FIG. 69 illustrates a sample weighting, baseband signal switching, and phase changing method.

FIG. 69 pertains to the weighting method (precoding method), the baseband switching method, and the phase changing method of the present Embodiment. The weighting unit 600 is a combined version of the weighting units 308A and 308B from FIG. 67. As shown, stream s1(*t*) and stream s2(*t*) correspond to the baseband signals 307A and 307B of FIG. 3. That is, the streams s1(*t*) and s2(*t*) are baseband signals made up of an in-phase component I and a quadrature component Q conforming to mapping by a modulation scheme such as QPSK, 16-QAM, and 64-QAM. As indicated by the frame configuration of FIG. 69, stream s1(*t*) is represented as s1(*u*) at symbol number u, as s1(*u*+1) at symbol number u+1, and so forth. Similarly, stream s2(*t*) is represented as s2(*u*) at symbol number u, as s2(*u*+1) at symbol number u+1, and so forth. The weighting unit 600 takes the baseband signals 307A (s1(*t*)) and 307B (s2(*t*)) as well as the signal processing method information 315 from FIG. 67 as input, performs weighting in accordance with the signal processing method information 315, and outputs the weighted signals 309A ($p_1(t)$) and 316B($p_2(t)$) from FIG. 67.

Here, given vector W1=(w11, w12) from the first row of the fixed precoding matrix F, $p_1(t)$ can be expressed as Math. 67 (formula 67), below.

[Math. 67]

$$p1(t) = W1 s1(t) \quad \text{(formula 67)}$$

Here, given vector W2=(w21,w22) from the first row of the fixed precoding matrix F, $p_2(t)$ can be expressed as Math. 68 (formula 68), below.

[Math. 68]

$$p2(t) = W2 s2(t) \quad \text{(formula 68)}$$

Accordingly, precoding matrix F may be expressed as follows.

[Math. 69]

$$F = \begin{pmatrix} w11 & w12 \\ w21 & w22 \end{pmatrix} \quad \text{(formula 69)}$$

After the baseband signals have been switched, switched baseband signal 6701A($q_1(i)$) has an in-phase component I of $Iq_1(i)$ and a quadrature component Q of $Qp_1(i)$, and switched baseband signal 6701B($q_2(i)$) has an in-phase component I of $Iq_2(i)$ and a quadrature component Q of $Qq_2(i)$. The relationships between all of these are as stated above. When the phase changer uses phase changing formula y(t), the post-phase change baseband signal 309B(q'2(i)) is given by Math. 70 (formula 70), below.

[Math. 70]

$$q2'(t) = y(t)q2(t) \quad \text{(formula 70)}$$

Here, y(t) is a phase changing formula obeying a predetermined method. For example, given a period (cycle) of four and timestamp u, the phase changing formula may be expressed as Math. 71 (formula 71), below.

[Math. 71]

$$y(u) = e^{j0} \quad \text{(formula 71)}$$

Similarly, the phase changing formula for timestamp u+1 may be, for example, as given by Math. 72 (formula 72).

[Math. 72]

$$y(u+1) = e^{j\frac{\pi}{2}} \quad \text{(formula 72)}$$

That is, the phase changing formula for timestamp u+k generalizes to Math. 73 (formula 73).

[Math. 73]

$$y(u+k) = e^{j\frac{k\pi}{2}} \quad \text{(formula 73)}$$

Note that Math. 71 (formula 71) through Math. 73 (formula 73) are given only as an example of a regular change of phase.

The regular change of phase is not restricted to a period (cycle) of four. Improved reception capabilities (the error-correction capabilities, to be exact) may potentially be promoted in the reception device by increasing the period (cycle) number (this does not mean that a greater period (cycle) is better, though avoiding small numbers such as two is likely ideal).

Furthermore, although Math. 71 (formula 71) through Math. 73 (formula 73), above, represent a configuration in which a change of phase is carried out through rotation by consecutive predetermined phases (in the above formula, every π/2), the change of phase need not be rotation by a constant amount but may also be random. For example, in accordance with the predetermined period (cycle) of y(t), the phase may be changed through sequential multiplication as shown in Math. 74 (formula 74) and Math. 75 (formula 75).

The key point of the regular change of phase is that the phase of the modulated signal is regularly changed. The phase changing degree variance rate is preferably as even as possible, such as from −π radians to π radians. However, given that this concerns a distribution, random variance is also possible.

[Math. 74]

$$e^{j0} \to e^{j\frac{\pi}{5}} \to e^{j\frac{2\pi}{5}} \to e^{j\frac{3\pi}{5}} \to e^{j\frac{4\pi}{5}} \quad \text{(formula 74)}$$
$$\to e^{j\pi} \to e^{j\frac{6\pi}{5}} \to e^{j\frac{7\pi}{5}} \to e^{j\frac{8\pi}{5}} \to e^{j\frac{9\pi}{5}}$$

[Math. 75]

$$e^{j\frac{\pi}{2}} \to e^{j\pi} \to e^{j\frac{3\pi}{2}} \to e^{j2\pi} \to e^{j\frac{\pi}{4}} \quad \text{(formula 75)}$$
$$\to e^{j\frac{3\pi}{4}} \to e^{j\frac{5\pi}{4}} \to e^{j\frac{7\pi}{4}}$$

As such, the weighting unit 600 of FIG. 6 performs precoding using fixed, predetermined precoding weights, the baseband signal switcher performs baseband signal switching as described above, and the phase changer changes the phase of the signal input thereto while regularly varying the degree of change.

When a specialized precoding matrix is used in the LOS environment, the reception quality is likely to improve tremendously. However, depending on the direct wave conditions, the phase and amplitude components of the direct wave may greatly differ from the specialized precoding matrix, upon reception. The LOS environment has certain rules. Thus, data reception quality is tremendously improved through a regular change of transmit signal phase that obeys those rules. The present invention offers a signal processing method for improving the LOS environment.

FIG. 7 illustrates a sample configuration of a reception device 700 pertaining to the present embodiment. Wireless unit 703_X receives, as input, received signal 702_X received by antenna 701_X, performs processing such as frequency conversion, quadrature demodulation, and the like, and outputs baseband signal 704_X.

Channel fluctuation estimator 705_1 for modulated signal z1 transmitted by the transmission device takes baseband signal 704_X as input, extracts reference symbol 501_1 for channel estimation from FIG. 5, estimates the value of $h_{11}$ from Math. 66 (formula 66), and outputs channel estimation signal 706_1.

Channel fluctuation estimator 705_2 for modulated signal z2 transmitted by the transmission device takes baseband signal 704_X as input, extracts reference symbol 501_2 for channel estimation from FIG. 5, estimates the value of $h_{12}$ from Math. 66 (formula 66), and outputs channel estimation signal 706_2.

Wireless unit 703_Y receives, as input, received signal 702_Y received by antenna 701_X, performs processing such as frequency conversion, quadrature demodulation, and the like, and outputs baseband signal 704_Y.

Channel fluctuation estimator 707_1 for modulated signal z1 transmitted by the transmission device takes baseband signal 704_Y as input, extracts reference symbol 501_1 for channel estimation from FIG. 5, estimates the value of $h_{21}$ from Math. 66 (formula 66), and outputs channel estimation signal 708_1.

Channel fluctuation estimator 707_2 for modulated signal z2 transmitted by the transmission device takes baseband signal 704_Y as input, extracts reference symbol 501_2 for channel estimation from FIG. 5, estimates the value of $h_{22}$ from Math. 66 (formula 66), and outputs channel estimation signal 708_2.

A control information decoder 709 receives baseband signal 704_X and baseband signal 704_Y as input, detects symbol 500_1 that indicates the transmission method from FIG. 5, and outputs a transmission device transmission method information signal 710.

A signal processor 711 takes the baseband signals 704_X and 704_Y, the channel estimation signals 706_1, 706_2, 708_1, and 708_2, and the transmission method information signal 710 as input, performs detection and decoding, and then outputs received data 712_1 and 712_2.

Next, the operations of the signal processor 711 from FIG. 7 are described in detail. FIG. 8 illustrates a sample configuration of the signal processor 711 pertaining to the present embodiment. As shown, the signal processor 711 is primarily made up of an inner MIMO detector, a soft-in/soft-out decoder, and a coefficient generator. Non-Patent Literature 2 and Non-Patent Literature 3 describe the method of iterative decoding with this structure. The MIMO system described in Non-Patent Literature 2 and Non-Patent Literature 3 is a spatial multiplexing MIMO system, while the present Embodiment differs from Non-Patent Literature 2 and Non-Patent Literature 3 in describing a MIMO system that regularly changes the phase over time, while using the precoding matrix and performing baseband signal switching. Taking the (channel) matrix H(t) of Math. 66 (formula 66), then by letting the precoding weight matrix from FIG. 69 be F (here, a fixed precoding matrix remaining unchanged for a given received signal) and letting the phase changing formula used by the phase changer from FIG. 69 be Y(t) (here, Y(t) changes over time t), then given the baseband signal switching, the receive vector $R(t)=(r1(t), r2(t))^T$ and the stream vector $S(t)=(s1(t), s2(t))^T$ lead to the decoding method of Non-Patent Literature 2 and Non-Patent Literature 3, thus enabling MIMO detection.

Accordingly, the coefficient generator 819 from FIG. 8 takes a transmission method information signal 818 (corresponding to 710 from FIG. 7) indicated by the transmission device (information for specifying the fixed precoding matrix in use and the phase changing pattern used when the phase is changed) and outputs a signal processing method information signal 820.

The inner MIMO detector 803 takes the signal processing method information signal 820 as input and performs iterative detection and decoding using the signal. The operations are described below.

The processing unit illustrated in FIG. 8 must use a processing method, as is illustrated in FIG. 10, to perform iterative decoding (iterative detection). First, detection of one codeword (or one frame) of modulated signal (stream) s1 and of one codeword (or one frame) of modulated signal (stream) s2 are performed. As a result, the soft-in/soft-out decoder obtains the log-likelihood ratio of each bit of the codeword (or frame) of modulated signal (stream) s1 and of the codeword (or frame) of modulated signal (stream) s2. Next, the log-likelihood ratio is used to perform a second round of detection and decoding. These operations (referred to as iterative decoding (iterative detection)) are performed multiple times. The following explanations centre on the creation method of the log-likelihood ratio of a symbol at a specific time within one frame.

In FIG. 8, a memory 815 takes baseband signal 801X (corresponding to baseband signal 704_X from FIG. 7), channel estimation signal group 802X (corresponding to channel estimation signals 706_1 and 706_2 from FIG. 7), baseband signal 801Y (corresponding to baseband signal 704_Y from FIG. 7), and channel estimation signal group 802Y (corresponding to channel estimation signals 708_1 and 708_2 from FIG. 7) as input, performs iterative decoding (iterative detection), and stores the resulting matrix as a transformed channel signal group. The memory 815 then outputs the above-described signals as needed, specifically as baseband signal 816X, transformed channel estimation signal group 817X, baseband signal 816Y, and transformed channel estimation signal group 817Y.

Subsequent operations are described separately for initial detection and for iterative decoding (iterative detection).

(Initial Detection)

The inner MIMO detector 803 takes baseband signal 801X, channel estimation signal group 802X, baseband signal 801Y, and channel estimation signal group 802Y as input. Here, the modulation scheme for modulated signal (stream) s1 and modulated signal (stream) s2 is described as 16-QAM.

The inner MIMO detector 803 first computes a candidate signal point corresponding to baseband signal 801X from the channel estimation signal groups 802X and 802Y. FIG. 11 represents such a calculation. In FIG. 11, each black dot is a candidate signal point in the I-Q plane. Given that the modulation scheme is 16-QAM, 256 candidate signal points exist. (However, FIG. 11 is only a representation and does not indicate all 256 candidate signal points.) Letting the four bits transmitted in modulated signal s1 be b0, b1, b2, and b3 and the four bits transmitted in modulated signal s2 be b4, b5, b6, and b7, candidate signal points corresponding to (b0, b1, b2, b3, b4, b5, b6, b7) are found in FIG. 11. The Euclidean squared distance between each candidate signal point and each received signal point 1101 (corresponding to baseband signal 801X) is then computed. The Euclidian squared distance between each point is divided by the noise variance $\sigma^2$. Accordingly, $E_X$(b0, b1, b2, b3, b4, b5, b6, b7) is calculated. That is, the Euclidian squared distance between a candidate signal point corresponding to (b0, b1, b2, b3, b4, b5, b6, b7) and a received signal point is divided by the noise variance. Here, each of the baseband signals and the modulated signals s1 and s2 is a complex signal.

Similarly, the inner MIMO detector 803 calculates candidate signal points corresponding to baseband signal 801Y from channel estimation signal group 802X and channel estimation signal group 802Y, computes the Euclidean squared distance between each of the candidate signal points and the received signal points (corresponding to baseband signal 801Y), and divides the Euclidean squared distance by the noise variance $\sigma 2$. Accordingly, $E_Y$(b0, b1, b2, b3, b4, b5, b6, b7) is calculated. That is, $E_Y$ is the Euclidian squared distance between a candidate signal point corresponding to (b0, b1, b2, b3, b4, b5, b6, b7) and a received signal point, divided by the noise variance.

Next, $E_X$(b0, b1, b2, b3, b4, b5, b6, b7)+$E_Y$(b0, b1, b2, b3, b4, b5, b6, b7)=E(b0, b1, b2, b3, b4, b5, b6, b7) is computed.

The inner MIMO detector 803 outputs E(b0, b1, b2, b3, b4, b5, b6, b7) as the signal 804.

Log-likelihood calculator 805A takes the signal 804 as input, calculates the log-likelihood of bits b0, b1, b2, and b3, and outputs a log-likelihood signal 806A. Note that this log-likelihood calculation produces the log-likelihood of a bit being 1 and the log-likelihood of a bit being 0. The calculation method is as shown in Math. 28 (formula 28), Math. 29 (formula 29), and Math. 30 (formula 30), and the details are given by Non-Patent Literature 2 and 3.

Similarly, log-likelihood calculator 805B takes the signal 804 as input, calculates the log-likelihood of bits b4, b5, b6, and b7, and outputs log-likelihood signal 806B.

A deinterleaver (807A) takes log-likelihood signal 806A as input, performs deinterleaving corresponding to that of the interleaver (the interleaver (304A) from FIG. 67), and outputs deinterleaved log-likelihood signal 808A.

Similarly, a deinterleaver (807B) takes log-likelihood signal 806B as input, performs deinterleaving corresponding to that of the interleaver (the interleaver (6704B) from FIG. 67), and outputs deinterleaved log-likelihood signal 808B.

Log-likelihood ratio calculator 809A takes deinterleaved log-likelihood signal 808A as input, calculates the log-likelihood ratio of the bits encoded by encoder 6702A from FIG. 67, and outputs log-likelihood ratio signal 810A.

Similarly, log-likelihood ratio calculator 809B takes deinterleaved log-likelihood signal 808B as input, calculates the log-likelihood ratio of the bits encoded by encoder 302B from FIG. 67, and outputs log-likelihood ratio signal 810B.

Soft-in/soft-out decoder 811A takes log-likelihood ratio signal 810A as input, performs decoding, and outputs a decoded log-likelihood ratio 812A.

Similarly, soft-in/soft-out decoder 811B takes log-likelihood ratio signal 810B as input, performs decoding, and outputs decoded log-likelihood ratio 812B.

(Iterative Decoding (Iterative Detection), k Iterations)

The interleaver (813A) takes the k−1th decoded log-likelihood ratio 812A decoded by the soft-in/soft-out decoder as input, performs interleaving, and outputs interleaved log-likelihood ratio 814A. Here, the interleaving pattern used by the interleaver (813A) is identical to that of the interleaver (304A) from FIG. 67.

Another interleaver (813B) takes the k−1th decoded log-likelihood ratio 812B decoded by the soft-in/soft-out decoder as input, performs interleaving, and outputs interleaved log-likelihood ratio 814B. Here, the interleaving pattern used by the interleaver (813B) is identical to that of the other interleaver (304B) from FIG. 67.

The inner MIMO detector 803 takes baseband signal 816X, transformed channel estimation signal group 817X, baseband signal 816Y, transformed channel estimation signal group 817Y, interleaved log-likelihood ratio 814A, and interleaved log-likelihood ratio 814B as input. Here, baseband signal 816X, transformed channel estimation signal group 817X, baseband signal 816Y, and transformed channel estimation signal group 817Y are used instead of baseband signal 801X, channel estimation signal group 802X, baseband signal 801Y, and channel estimation signal group 802Y because the latter cause delays due to the iterative decoding.

The iterative decoding operations of the inner MIMO detector 803 differ from the initial detection operations thereof in that the interleaved log-likelihood ratios 814A and 814B are used in signal processing for the former. The inner MIMO detector 803 first calculates E(b0, b1, b2, b3, b4, b5, b6, b7) in the same manner as for initial detection. In addition, the coefficients corresponding to Math. 11 (formula 11) and Math. 32 (formula 32) are computed from the interleaved log-likelihood ratios 814A and 914B. The value of E(b0, b1, b2, b3, b4, b5, b6, b7) is corrected using the coefficients so calculated to obtain E'(b0, b1, b2, b3, b4, b5, b6, b7), which is output as the signal 804.

The log-likelihood calculator 805A takes the signal 804 as input, calculates the log-likelihood of bits b0, b1, b2, and b3, and outputs the log-likelihood signal 806A. Note that this log-likelihood calculation produces the log-likelihood of a bit being 1 and the log-likelihood of a bit being 0. The calculation method is as shown in Math. 31 (formula 31) through Math. 35 (formula 35), and the details are given by Non-Patent Literature 2 and 3.

Similarly, log-likelihood calculator 805B takes the signal 804 as input, calculates the log-likelihood of bits b4, b5, b6, and b7, and outputs log-likelihood signal 806B. Operations performed by the deinterleaver onwards are similar to those performed for initial detection.

While FIG. 8 illustrates the configuration of the signal processor when performing iterative detection, this structure is not absolutely necessary as good reception improvements are obtainable by iterative detection alone. As long as the components needed for iterative detection are present, the configuration need not include the interleavers 813A and 813B. In such a case, the inner MIMO detector 803 does not perform iterative detection.

As shown in Non-Patent Literature 5 and the like, QR decomposition may also be used to perform initial detection and iterative detection. Also, as indicated by Non-Patent Literature 11, MMSE and ZF linear operations may be performed when performing initial detection.

FIG. 9 illustrates the configuration of a signal processor unlike that of FIG. 8, that serves as the signal processor for modulated signals transmitted by the transmission device from FIG. 4 as used in FIG. 67. The point of difference from FIG. 8 is the number of soft-in/soft-out decoders. A soft-in/soft-out decoder 901 takes the log-likelihood ratio signals 810A and 810B as input, performs decoding, and outputs a decoded log-likelihood ratio 902. A distributor 903 takes the decoded log-likelihood ratio 902 as input for distribution. Otherwise, the operations are identical to those explained for FIG. 8.

As described above, when a transmission device according to the present Embodiment using a MIMO system transmits a plurality of modulated signals from a plurality of antennas, changing the phase over time while multiplying by the precoding matrix so as to regularly change the phase results in improvements to data reception quality for a reception device in a LOS environment, where direct waves are dominant, compared to a conventional spatial multiplexing MIMO system.

In the present Embodiment, and particularly in the configuration of the reception device, the number of antennas is limited and explanations are given accordingly. However, the Embodiment may also be applied to a greater number of antennas. In other words, the number of antennas in the reception device does not affect the operations or advantageous effects of the present Embodiment.

Further, in the present Embodiments, the encoding is not particularly limited to LDPC codes. Similarly, the decoding method is not limited to implementation by a soft-in/soft-out decoder using sum-product decoding. The decoding method used by the soft-in/soft-out decoder may also be, for example, the BCJR algorithm, S OVA, and the Max-Log-Map algorithm. Details are provided in Non-Patent Literature 6.

In addition, although the present Embodiment is described using a single-carrier method, no limitation is intended in this regard. The present Embodiment is also applicable to multi-carrier transmission. Accordingly, the present Embodiment may also be realized using, for example, spread-spectrum communications, OFDM, SC-FDMA, SC-OFDM, wavelet OFDM as described in Non-Patent Literature 7, and so on. Furthermore, in the present Embodiment, symbols other than data symbols, such as pilot symbols (preamble, unique word, and so on) or symbols transmitting control information, may be arranged within the frame in any manner.

The following describes an example in which OFDM is used as a multi-carrier method.

Figure 70:
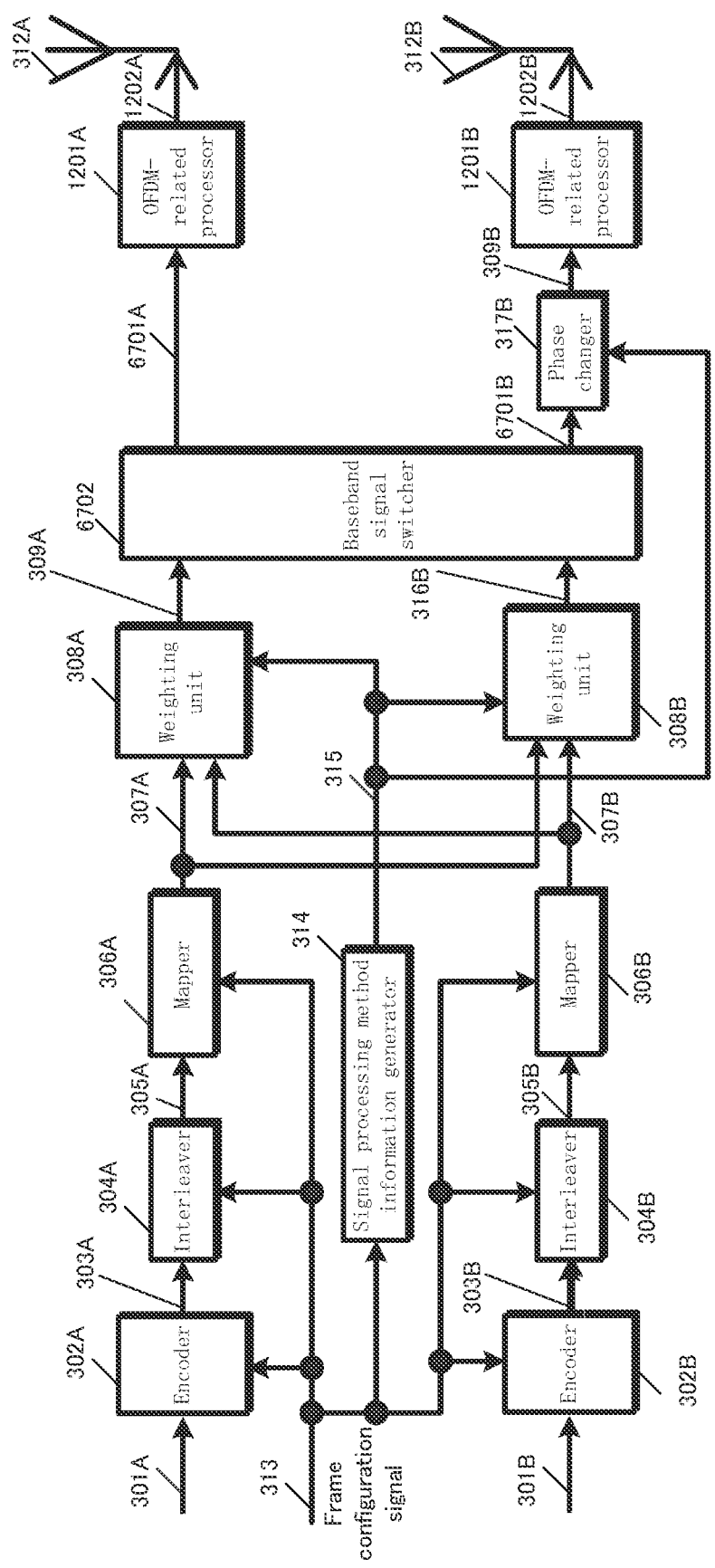
FIG. 70 illustrates a sample configuration of a transmission device using an OFDM method.

FIG. 70 illustrates the configuration of a transmission device using OFDM. In FIG. 70, components operating in the manner described for FIGS. 3, 12, and 67 use identical reference numbers.

An OFDM-related processor 1201A takes weighted signal 309A as input, performs OFDM-related processing thereon, and outputs transmit signal 1202A. Similarly, OFDM-related processor 1201B takes post-phase change signal 309B as input, performs OFDM-related processing thereon, and outputs transmit signal 1202B.

FIG. 13 illustrates a sample configuration of the OFDM-related processors 1201A and 1201B and onward from FIG. 70. Components 1301A through 1310A belong between 1201A and 312A from FIG. 70, while components 1301B through 1310B belong between 1201B and 312B.

Serial-to-parallel converter 1302A performs serial-to-parallel conversion on switched baseband signal 1301A (corresponding to switched baseband signal 6701A from FIG. 70) and outputs parallel signal 1303A.

Reorderer 1304A takes parallel signal 1303A as input, performs reordering thereof, and outputs reordered signal 1305A. Reordering is described in detail later.

IFFT unit 1306A takes reordered signal 1305A as input, applies an IFFT thereto, and outputs post-IFFT signal 1307A.

Wireless unit 1308A takes post-IFFT signal 1307A as input, performs processing such as frequency conversion and amplification, thereon, and outputs modulated signal 1309A. Modulated signal 1309A is then output as radio waves by antenna 1310A.

Serial-to-parallel converter 1302B performs serial-to-parallel conversion on post-phase change 1301B (corresponding to post-phase change 309B from FIG. 12) and outputs parallel signal 1303B.

Reorderer 1304B takes parallel signal 1303B as input, performs reordering thereof, and outputs reordered signal 1305B. Reordering is described in detail later.

IFFT unit 1306B takes reordered signal 1305B as input, applies an IFFT thereto, and outputs post-IFFT signal 1307B.

Wireless unit 1308B takes post-IFFT signal 1307B as input, performs processing such as frequency conversion and amplification thereon, and outputs modulated signal 1309B. Modulated signal 1309B is then output as radio waves by antenna 1310A.

The transmission device from FIG. 67 does not use a multi-carrier transmission method. Thus, as shown in FIG. 69, a change of phase is performed to achieve a period (cycle) of four and the post-phase change symbols are arranged in the time domain. As shown in FIG. 70, when multi-carrier transmission, such as OFDM, is used, then, naturally, symbols in precoded baseband signals having undergone switching and phase changing may be arranged in the time domain as in FIG. 67, and this may be applied to each (sub-)carrier. However, for multi-carrier transmission, the arrangement may also be in the frequency domain, or in both the frequency domain and the time domain. The following describes these arrangements.

FIGS. 14A and 14B indicate frequency on the horizontal axes and time on the vertical axes thereof, and illustrate an example of a symbol reordering method used by the reorderers 1301A and 1301B from FIG. 13. The frequency axes are made up of (sub-)carriers 0 through 9. The modulated signals z1 and z2 share common timestamps (timing) and use a common frequency band. FIG. 14A illustrates a reordering method for the symbols of modulated signal z1, while FIG. 14B illustrates a reordering method for the symbols of modulated signal z2. With respect to the symbols of switched baseband signal 1301A input to serial-to-parallel converter 1302A, the ordering is #0, #1, #2, #3, and so on. Here, given that the example deals with a period (cycle) of four, #0, #1, #2, and #3 are equivalent to one period (cycle). Similarly, #4n, #4n+1, #4n+2, and #4n+3 (n being a non-zero positive integer) are also equivalent to one period (cycle).

As shown in FIG. 14A, symbols #0, #1, #2, #3, and so on are arranged in order, beginning at carrier 0. Symbols #0 through #9 are given timestamp $1, followed by symbols #10 through #19 which are given timestamp #2, and so on in a regular arrangement. Here, modulated signals z1 and z2 are complex signals.

Similarly, with respect to the symbols of weighted signal 1301B input to serial-to-parallel converter 1302B, the assigned ordering is #0, #1, #2, #3, and so on. Here, given that the example deals with a period (cycle) of four, a different change in phase is applied to each of #0, #1, #2, and #3, which are equivalent to one period (cycle). Similarly, a different change in phase is applied to each of #4n, #4n+1, #4n+2, and #4n+3 (n being a non-zero positive integer), which are also equivalent to one period (cycle).

As shown in FIG. 14B, symbols #0, #1, #2, #3, and so on are arranged in order, beginning at carrier 0. Symbols #0 through #9 are given timestamp $1, followed by symbols #10 through #19 which are given timestamp $2, and so on in a regular arrangement.

The symbol group 1402 shown in FIG. 14B corresponds to one period (cycle) of symbols when the phase changing method of FIG. 69 is used. Symbol #0 is the symbol obtained by using the phase at timestamp u in FIG. 69, symbol #1 is the symbol obtained by using the phase at timestamp u+1 in FIG. 69, symbol #2 is the symbol obtained by using the phase at timestamp u+2 in FIG. 69, and symbol #3 is the symbol obtained by using the phase at timestamp u+3 in FIG. 69. Accordingly, for any symbol #x, symbol #x is the symbol obtained by using the phase at timestamp u in FIG. 69 when x mod 4 equals 0 (i.e., when the remainder of x divided by 4 is 0, mod being the modulo operator), symbol #x is the symbol obtained by using the phase at timestamp x+1 in FIG. 69 when x mod 4 equals 1, symbol #x is the symbol obtained by using the phase at timestamp x+2 in FIG. 69 when x mod 4 equals 2, and symbol #x is the symbol obtained by using the phase at timestamp x+3 in FIG. 69 when x mod 4 equals 3.

In the present Embodiment, modulated signal z1 shown in FIG. 14A has not undergone a change of phase.

As such, when using a multi-carrier transmission method such as OFDM, and unlike single carrier transmission, symbols can be arranged in the frequency domain. Of course, the symbol arrangement method is not limited to those illustrated by FIGS. 14A and 14B. Further examples are shown in FIGS. 15A, 15B, 16A, and 16B.

FIGS. 15A and 15B indicate frequency on the horizontal axes and time on the vertical axes thereof, and illustrate an example of a symbol reordering scheme used by the reorderers 1301A and 1301B from FIG. 13 that differs from that of FIGS. 14A and 14B. FIG. 15A illustrates a reordering scheme for the symbols of modulated signal z1, while FIG. 15B illustrates a reordering scheme for the symbols of modulated signal z2. FIGS. 15A and 15B differ from FIGS.

14A and 14B in that different reordering methods are applied to the symbols of modulated signal z1 and to the symbols of modulated signal z2. In FIG. 15B, symbols #0 through #5 are arranged at carriers 4 through 9, symbols #6 though #9 are arranged at carriers 0 through 3, and this arrangement is repeated for symbols #10 through #19. Here, as in FIG. 14B, symbol group 1502 shown in FIG. 15B corresponds to one period (cycle) of symbols when the phase changing method of FIG. 6 is used.

FIGS. 16A and 16B indicate frequency on the horizontal axes and time on the vertical axes thereof, and illustrate an example of a symbol reordering method used by the reorderers 1301A and 1301B from FIG. 13 that differs from that of FIGS. 14A and 14B. FIG. 16A illustrates a reordering method for the symbols of modulated signal z1, while FIG. 16B illustrates a reordering method for the symbols of modulated signal z2. FIGS. 16A and 16B differ from FIGS. 14A and 14B in that, while FIGS. 14A and 14B showed symbols arranged at sequential carriers, FIGS. 16A and 16B do not arrange the symbols at sequential carriers. Obviously, for FIGS. 16A and 16B, different reordering methods may be applied to the symbols of modulated signal z1 and to the symbols of modulated signal z2 as in FIGS. 15A and 15B.

FIGS. 17A and 17B indicate frequency on the horizontal axes and time on the vertical axes thereof, and illustrate an example of a symbol reordering method used by the reorderers 1301A and 1301B from FIG. 13 that differs from those of FIGS. 14A through 16B. FIG. 17A illustrates a reordering method for the symbols of modulated signal z1 and FIG. 17B illustrates a reordering method for the symbols of modulated signal z2. While FIGS. 14A through 16B show symbols arranged with respect to the frequency axis, FIGS. 17A and 17B use the frequency and time axes together in a single arrangement.

While FIG. 69 describes an example where the change of phase is performed in a four slot period (cycle), the following example describes an eight slot period (cycle). In FIGS. 17A and 17B, the symbol group 1702 is equivalent to one period (cycle) of symbols when the phase changing scheme is used (i.e., to eight symbols) such that symbol #0 is the symbol obtained by using the phase at timestamp u, symbol #1 is the symbol obtained by using the phase at timestamp u+1, symbol #2 is the symbol obtained by using the phase at timestamp u+2, symbol #3 is the symbol obtained by using the phase at timestamp u+3, symbol #4 is the symbol obtained by using the phase at timestamp u+4, symbol #5 is the symbol obtained by using the phase at timestamp u+5, symbol #6 is the symbol obtained by using the phase at timestamp u+6, and symbol #7 is the symbol obtained by using the phase at timestamp u+7. Accordingly, for any symbol #x, symbol #x is the symbol obtained by using the phase at timestamp u when x mod 8 equals 0, symbol #x is the symbol obtained by using the phase at timestamp u+1 when x mod 8 equals 1, symbol #x is the symbol obtained by using the phase at timestamp u+2 when x mod 8 equals 2, symbol #x is the symbol obtained by using the phase at timestamp u+3 when x mod 8 equals 3, symbol #x is the symbol obtained by using the phase at timestamp u+4 when x mod 8 equals 4, symbol #x is the symbol obtained by using the phase at timestamp u+5 when x mod 8 equals 5, symbol #x is the symbol obtained by using the phase at timestamp u+6 when x mod 8 equals 6, and symbol #x is the symbol obtained by using the phase at timestamp u+7 when x mod 8 equals 7. In FIGS. 17A and 17B four slots along the time axis and two slots along the frequency axis are used for a total of 4×2=8 slots, in which one period (cycle) of symbols is arranged. Here, given m×n symbols per period (cycle) (i.e., m×n different phases are available for multiplication), then n slots (carriers) in the frequency domain and m slots in the time domain should be used to arrange the symbols of each period (cycle), such that m>n. This is because the phase of direct waves fluctuates slowly in the time domain relative to the frequency domain. Accordingly, the present Embodiment performs a regular change of phase that reduces the influence of steady direct waves. Thus, the phase changing period (cycle) should preferably reduce direct wave fluctuations. Accordingly, m should be greater than n. Taking the above into consideration, using the time and frequency domains together for reordering, as shown in FIGS. 17A and 17B, is preferable to using either of the frequency domain or the time domain alone due to the strong probability of the direct waves becoming regular. As a result, the effects of the present invention are more easily obtained. However, reordering in the frequency domain may lead to diversity gain due the fact that frequency-domain fluctuations are abrupt. As such, using the frequency and time domains together for reordering is not always ideal.

FIGS. 18A and 18B indicate frequency on the horizontal axes and time on the vertical axes thereof, and illustrate an example of a symbol reordering method used by the reorderers 1301A and 1301B from FIG. 13 that differs from that of FIGS. 17A and 17B. FIG. 18A illustrates a reordering method for the symbols of modulated signal z1, while FIG. 18B illustrates a reordering method for the symbols of modulated signal z2. Much like FIGS. 17A and 17B, FIGS. 18A and 18B illustrate the use of the time and frequency domains, together. However, in contrast to FIGS. 17A and 17B, where the frequency domain is prioritized and the time domain is used for secondary symbol arrangement, FIGS. 18A and 18B prioritize the time domain and use the frequency domain for secondary symbol arrangement. In FIG. 18B, symbol group 1802 corresponds to one period (cycle) of symbols when the phase changing method is used.

In FIGS. 17A, 17B, 18A, and 18B, the reordering method applied to the symbols of modulated signal z1 and the symbols of modulated signal z2 may be identical or may differ as like in FIGS. 15A and 15B. Either approach allows good reception quality to be obtained. Also, in FIGS. 17A, 17B, 18A, and 18B, the symbols may be arranged non-sequentially as in FIGS. 16A and 16B. Either approach allows good reception quality to be obtained.

FIG. 22 indicates frequency on the horizontal axis and time on the vertical axis thereof, and illustrates an example of a symbol reordering method used by the reorderers 1301A and 1301B from FIG. 13 that differs from the above. FIG. 22 illustrates a regular phase changing method using four slots, similar to timestamps u through u+3 from FIG. 69. The characteristic feature of FIG. 22 is that, although the symbols are reordered with respect to the frequency domain, when read along the time axis, a periodic shift of n (n=1 in the example of FIG. 22) symbols is apparent. The frequency-domain symbol group 2210 in FIG. 22 indicates four symbols to which are applied the changes of phase at timestamps u through u+3 from FIG. 69.

Here, symbol #0 is obtained through a change of phase at timestamp u, symbol #1 is obtained through a change of phase at timestamp u+1, symbol #2 is obtained through a change of phase at timestamp u+2, and symbol #3 is obtained through a change of phase at timestamp u+3.

Similarly, for frequency-domain symbol group 2220, symbol #4 is obtained through a change of phase at timestamp u, symbol #5 is obtained through a change of phase at timestamp u+1, symbol #6 is obtained through a change of phase at timestamp u+2, and symbol #7 is obtained through a change of phase at timestamp u+3.

The above-described change of phase is applied to the symbol at timestamp $1. However, in order to apply periodic shifting with respect to the time domain, the following change of phases are applied to symbol groups 2201, 2202, 2203, and 2204.

For time-domain symbol group 2201, symbol #0 is obtained through a change of phase at timestamp u, symbol #9 is obtained through a change of phase at timestamp u+1, symbol #18 is obtained through a change of phase at timestamp u+2, and symbol #27 is obtained through a change of phase at timestamp u+3.

For time-domain symbol group 2202, symbol #28 is obtained through a change of phase at timestamp u, symbol #1 is obtained through a change of phase at timestamp u+1, symbol #10 is obtained through a change of phase at timestamp u+2, and symbol #19 is obtained through a change of phase at timestamp u+3.

For time-domain symbol group 2203, symbol #20 is obtained through a change of phase at timestamp u, symbol #29 is obtained through a change of phase at timestamp u+1, symbol #2 is obtained through a change of phase at timestamp u+2, and symbol #11 is obtained through a change of phase at timestamp u+3.

For time-domain symbol group 2204, symbol #12 is obtained through a change of phase at timestamp u, symbol #21 is obtained through a change of phase at timestamp u+1, symbol #30 is obtained through a change of phase at timestamp u+2, and symbol #3 is obtained through a change of phase at timestamp u+3.

The characteristic feature of FIG. 22 is seen in that, taking symbol #11 as an example, the two neighbouring symbols thereof having the same timestamp in the frequency domain (#10 and #12) are both symbols changed using a different phase than symbol #11, and the two neighbouring symbols thereof having the same carrier in the time domain (#2 and #20) are both symbols changed using a different phase than symbol #11. This holds not only for symbol #11, but also for any symbol having two neighbouring symbols in the frequency domain and the time domain. Accordingly, the change of phase is effectively carried out. This is highly likely to improve data reception quality as influence from regularizing direct waves is less prone to reception.

Although FIG. 22 illustrates an example in which n=1, the invention is not limited in this manner. The same may be applied to a case in which n=3. Furthermore, although FIG. 22 illustrates the realization of the above-described effects by arranging the symbols in the frequency domain and advancing in the time domain so as to achieve the characteristic effect of imparting a periodic shift to the symbol arrangement order, the symbols may also be randomly (or regularly) arranged to the same effect.

Although the present Embodiment describes a variation of Embodiment 1 in which a baseband signal switcher is inserted before the change of phase, the present Embodiment may also be realized as a combination with Embodiment 2, such that the baseband signal switcher is inserted before the change of phase in FIGS. 26 and 28. Accordingly, in FIG. 26, phase changer 317A takes switched baseband signal 6701A($q_1(i)$) as input, and phase changer 317B takes switched baseband signal 6701B($q_2(i)$) as input. The same applies to the phase changers 317A and 317B from FIG. 28.

The following describes a method of allowing the reception device to obtain good received signal quality for data, regardless of the reception device arrangement, by considering the location of the reception device with respect to the transmission device.

FIG. 31 illustrates an example of frame configuration for a portion of the symbols within a signal in the time-frequency domains, given a transmission method where a regular change of phase is performed for a multi-carrier method such as OFDM.

FIG. 31 illustrates the frame configuration of modulated signal z2' corresponding to the switched baseband signal input to phase changer 317B from FIG. 67. Each square represents one symbol (although both signals s1 and s2 are included for precoding purposes, depending on the precoding matrix, only one of signals s1 and s2 may be used).

Consider symbol 3100 at carrier 2 and timestamp $2 of FIG. 31. The carrier here described may alternatively be termed a sub-carrier.

Within carrier 2, there is a very strong correlation between the channel conditions for symbol 3100A at carrier 2, timestamp $2 and the channel conditions for the time domain nearest-neighbour symbols to timestamp $2, i.e., symbol 3013 at timestamp $1 and symbol 3101 at timestamp $3 within carrier 2.

Similarly, for timestamp $2, there is a very strong correlation between the channel conditions for symbol 3100 at carrier 2, timestamp $2 and the channel conditions for the frequency-domain nearest-neighbour symbols to carrier 2, i.e., symbol 3104 at carrier 1, timestamp $2 and symbol 3104 at timestamp $2, carrier 3.

As described above, there is a very strong correlation between the channel conditions for symbol 3100 and the channel conditions for each symbol 3101, 3102, 3103, and 3104.

The present description considers N different phases (N being an integer, N≥2) for multiplication in a transmission method where the phase is regularly changed. The symbols illustrated in FIG. 31 are indicated as $e^{j0}$, for example. This signifies that this symbol is signal z2' from FIG. 6 having undergone a change in phase through multiplication by $e^{j0}$. That is, the values given for the symbols in FIG. 31 are the value of y(t) as given by Math. 70 (formula 70).

The present Embodiment takes advantage of the high correlation in channel conditions existing between neighbouring symbols in the frequency domain and/or neighbouring symbols in the time domain in a symbol arrangement enabling high data reception quality to be obtained by the reception device receiving the post-phase change symbols.

In order to achieve this high data reception quality, conditions #D1-1 and #D1-2 are met.

(Condition #D1-1)

As shown in FIG. 69, for a transmission method involving a regular change of phase performed on switched baseband signal q2 using a multi-carrier method such as OFDM, time X, carrier Y is a symbol for transmitting data (hereinafter, data symbol), neighbouring symbols in the time domain, i.e., at time X−1, carrier Y and at time X+1, carrier Y are also data symbols, and a different change of phase should be performed on switched baseband signal q2 corresponding to each of these three data symbols, i.e., on switched baseband signal q2 at time X, carrier Y, at time X−1, carrier Y and at time X+1, carrier Y.

(Condition #D1-2)

As shown in FIG. 69, for a transmission method involving a regular change of phase performed on switched baseband signal q2 using a multi-carrier method such as OFDM, time X, carrier Y is a symbol for transmitting data (hereinafter, data symbol), neighbouring symbols in the time domain, i.e., at time X, carrier Y+1 and at time X, carrier Y−1 are also data symbols, and a different change of phase should be performed on switched baseband signal q2 corresponding to each of these three data symbols, i.e., on switched baseband signal q2 at time X, carrier Y, at time X, carrier Y−1 and at time X, carrier Y+1.

Ideally, a data symbol should satisfy Condition #D1-1. Similarly, the data symbols should satisfy Condition #D1-2.

The reasons supporting Conditions #D1-1 and #D1-2 are as follows.

A very strong correlation exists between the channel conditions of given symbol of a transmit signal (hereinafter, symbol A) and the channel conditions of the symbols neighbouring symbol A in the time domain, as described above.

Accordingly, when three neighbouring symbols in the time domain each have different phases, then despite reception quality degradation in the LOS environment (poor signal quality caused by degradation in conditions due to phase relations despite high signal quality in terms of SNR) for symbol A, the two remaining symbols neighbouring symbol A are highly likely to provide good reception quality. As a result, good received signal quality is achievable after error correction and decoding.

Similarly, a very strong correlation exists between the channel conditions of given symbol of a transmit signal (symbol A) and the channel conditions of the symbols neighbouring symbol A in the frequency domain, as described above.

Accordingly, when three neighbouring symbols in the frequency domain each have different phases, then despite reception quality degradation in the LOS environment (poor signal quality caused by degradation in conditions due to direct wave phase relationships despite high signal quality in terms of SNR) for symbol A, the two remaining symbols neighbouring symbol A are highly likely to provide good reception quality. As a result, good received signal quality is achievable after error correction and decoding.

By combining Conditions #D1-1 and #D1-2, ever greater data reception quality is likely achievable for the reception device. Accordingly, the following Condition #D1-3 can be derived.

(Condition #D1-3)

As shown in FIG. 69, for a transmission method involving a regular change of phase performed on switched baseband signal q2 using a multi-carrier method such as OFDM, time X, carrier Y is a symbol for transmitting data (data symbol), neighbouring symbols in the time domain, i.e., at time X−1, carrier Y and at time X+1, carrier Y are also data symbols, and neighbouring symbols in the frequency domain, i.e., at time X, carrier Y−1 and at time X, carrier Y+1 are also data symbols, such that a different change of phase should be performed on switched baseband signal q2 corresponding to each of these five data symbols, i.e., on switched baseband signal q2 at time X, carrier Y, at time X, carrier Y−1, at time X, carrier Y+1, at time X−1, carrier Y and at time X+1, carrier Y.

Here, the different changes in phase are as follows. Phase changes are defined from 0 radians to $2\pi$ radians. For example, for time X, carrier Y, a phase change of $e^{j\theta_{X,Y}}$ is applied to precoded baseband signal $q_2$ from FIG. 69, for time X−1, carrier Y, a phase change of $e^{j\theta_{X-1,Y}}$ is applied to precoded baseband signal q2 from FIG. 69, for time X+1, carrier Y, a phase change of $e^{j\theta_{X+1,Y}}$ is applied to precoded baseband signal q2 from FIG. 69, such that $0 \leq \theta_{X,Y} < 2\pi$, $0 \leq \theta_{X-1,Y} \leq 2\pi$, and $0 \leq \theta_{X+1,Y} < 2\pi$, all units being in radians. Accordingly, for Condition #D1-1, it follows that $\theta_{X,Y} \neq \theta_{X,Y-1}$, $\theta_{X,Y} \neq \theta_{X,Y+1}$, and that $\theta_{X,Y-1} \neq \theta_{X,Y+1}$. Similarly, for Condition #D1-2, it follows that $\theta_{X,Y} \neq \theta_{X-1,Y}$, $\theta_{X,Y} \neq \theta_{X+1}$, and that $\theta_{X,Y-1} \neq \theta_{X,Y+1}$. And, for Condition #D1-3, it follows that $\theta_{X,Y} \neq \theta_{X-1,Y}$, $\theta_{X,Y} \neq \theta_{X+1,Y}$, $\theta_{X,Y} \neq \theta_{X,Y-1}$, $\theta_{X,Y} \neq \theta_{X,Y+1}$, $\theta_{X-1,Y} \neq \theta_{X+1,Y}$, $\theta_{X-1,Y} \neq \theta_{X-1,Y}$, $\theta_{X-1,Y} \neq \theta_{X,Y+1}$, $\theta_{X+1,Y} \neq \theta_{X,Y-1}$, $\theta_{X+1,Y} \neq \theta_{X,Y+1}$, and that $\theta_{X,Y-1} \neq \theta_{X,Y+1}$.

Ideally, a data symbol should satisfy Condition #D1-3.

FIG. 31 illustrates an example of Condition #D1-3, where symbol A corresponds to symbol 3100. The symbols are arranged such that the phase by which switched baseband signal $q_2$ from FIG. 69 is multiplied differs for symbol 3100, for both neighbouring symbols thereof in the time domain 3101 and 3102, and for both neighbouring symbols thereof in the frequency domain 3102 and 3104. Accordingly, despite received signal quality degradation of symbol 3100 for the receiver, good signal quality is highly likely for the neighbouring signals, thus guaranteeing good signal quality after error correction.

FIG. 32 illustrates a symbol arrangement obtained through phase changes under these conditions.

As evident from FIG. 32, with respect to any data symbol, a different change in phase is applied to each neighbouring symbol in the time domain and in the frequency domain. As such, the ability of the reception device to correct errors may be improved.

In other words, in FIG. 32, when all neighbouring symbols in the time domain are data symbols, Condition #D1-1 is satisfied for all Xs and all Ys.

Similarly, in FIG. 32, when all neighbouring symbols in the frequency domain are data symbols, Condition #D1-2 is satisfied for all Xs and all Ys.

Similarly, in FIG. 32, when all neighbouring symbols in the frequency domain are data symbols and all neighbouring symbols in the time domain are data symbols, Condition #D1-3 is satisfied for all Xs and all Ys.

The following discusses the above-described example for a case where the change of phase is performed on two switched baseband signals q1 and q2 (see FIG. 68).

Several phase changing methods are applicable to performing a change of phase on two switched baseband signals q1 and q2. The details thereof are explained below.

Scheme 1 involves a change in phase of switched baseband signal q2 as described above, to achieve the change in phase illustrated by FIG. 32. In FIG. 32, a change of phase having a period (cycle) of ten is applied to switched baseband signal q2. However, as described above, in order to satisfy Conditions #D1-1, #D1-2, and #D1-3, the change in phase applied to switched baseband signal q2 at each (sub-)carrier changes over time. (Although such changes are applied in FIG. 32 with a period (cycle) of ten, other phase changing methods are also applicable.) Then, as shown in FIG. 33, the phase change degree performed on switched baseband signal q2 produce a constant value that is one-tenth that of the change in phase performed on switched baseband signal q2. In FIG. 33, for a period (cycle) (of phase change performed on switched baseband signal q2) including timestamp $1, the value of the change in phase performed on switched baseband signal q1 is $e^{j0}$. Then, for the next period (cycle) (of change in phase performed on switched baseband signal q2) including timestamp $2, the value of the phase changing degree performed on precoded baseband signal q1 is $e^{j\pi/9}$, and so on.

The symbols illustrated in FIG. 33 are indicated as $e^{j0}$, for example. This signifies that this symbol is signal q1 from FIG. 26 having undergone a change of phase through multiplication by $e^{j0}$.

As shown in FIG. 33, the change in phase applied to switched baseband signal q1 produces a constant value that is one-tenth that of the change in phase performed on precoded, switched baseband signal q2 such that the post-phase change value varies with the number of each period (cycle). (As described above, in FIG. 33, the value is $e^{j0}$ for the first period (cycle), $e^{j\pi/9}$ for the second period (cycle), and so on.)

As described above, the change in phase performed on switched baseband signal q2 has a period (cycle) of ten, but the period (cycle) can be effectively made greater than ten by taking the degree of phase change applied to switched baseband signal q1 and to switched baseband signal q2 into consideration. Accordingly, data reception quality may be improved for the reception device.

Scheme 2 involves a change in phase of switched baseband signal q2 as described above, to achieve the change in phase illustrated by FIG. 32. In FIG. 32, a change of phase having a period (cycle) of ten is applied to switched baseband signal q2. However, as described above, in order to satisfy Conditions #D1-1, #D1-2, and #D1-3, the change in phase applied to switched baseband signal q2 at each (sub-)carrier changes over time. (Although such changes are applied in FIG. 32 with a period (cycle) of ten, other phase changing methods are also applicable.) Then, as shown in FIG. 33, the change in phase performed on switched baseband signal q2 produces a constant value that is one-tenth of that performed on switched baseband signal q2.

The symbols illustrated in FIG. 30 are indicated as $e^{j0}$, for example. This signifies that this symbol is switched baseband signal q1 having undergone a change of phase through multiplication by $e^{j0}$.

As described above, the change in phase performed on switched baseband signal q2 has a period (cycle) of ten, but the period (cycle) can be effectively made greater than ten by taking the changes in phase applied to switched baseband signal q1 and to switched baseband signal q2 into consideration. Accordingly, data reception quality may be improved for the reception device. An effective way of applying method 2 is to perform a change in phase on switched baseband signal q1 with a period (cycle) of N and perform a change in phase on precoded baseband signal q2 with a period (cycle) of M such that N and M are coprime. As such, by taking both switched baseband signals q1 and q2 into consideration, a period (cycle) of N×M is easily achievable, effectively making the period (cycle) greater when N and M are coprime.

While the above discusses an example of the above-described phase changing method, the present invention is not limited in this manner. The change in phase may be performed with respect to the frequency domain, the time domain, or on time-frequency blocks. Similar improvement to the data reception quality can be obtained for the reception device in all cases.

The same also applies to frames having a configuration other than that described above, where pilot symbols (SP symbols) and symbols transmitting control information are inserted among the data symbols. The details of the change in phase in such circumstances are as follows.

FIGS. 47A and 47B illustrate the frame configuration of modulated signals (switched baseband signals q1 and q2) z1 or z1' and z2' in the time-frequency domain. FIG. 47A illustrates the frame configuration of modulated signal (switched baseband signal q1) z1 or z1' while FIG. 47B illustrates the frame configuration of modulated signal (switched baseband signal q2) z2'. In FIGS. 47A and 47B, 4701 marks pilot symbols while 4702 marks data symbols. The data symbols 4702 are symbols on which switching or switching and change in phase have been performed.

FIGS. 47A and 47B, like FIG. 69, indicate the arrangement of symbols when a change in phase is applied to switched baseband signal q2 (while no change in phase is performed on switched baseband signal q1). (Although FIG. 69 illustrates a change in phase with respect to the time domain, switching time t with carrier f in FIG. 69 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 47A and 47B for each of the symbols are the values of switched baseband signal q2 after the change in phase. No values are given for the symbols of switched baseband signal q1 (z1) from FIGS. 47A and 47B as no change in phase is performed thereon.

The important point of FIGS. 47A and 47B is that the change in phase performed on the data symbols of switched baseband signal q2, i.e., on symbols having undergone precoding or precoding and switching. (The symbols under discussion, being precoded, actually include both symbols s1 and s2.) Accordingly, no change in phase is performed on the pilot symbols inserted in z2'.

FIGS. 48A and 48B illustrate the frame configuration of modulated signals (switched baseband signals q1 and q2) z1 or z1' and z2' in the time-frequency domain. FIG. 48A illustrates the frame configuration of modulated signal (switched baseband signal q1) z1 or z1' while FIG. 48B illustrates the frame configuration of modulated signal (switched baseband signal q2) z2'. In FIGS. 48A and 48B, 4701 marks pilot symbols while 4702 marks data symbols. The data symbols 4702 are symbols on which precoding or precoding and a change in phase have been performed.

FIGS. 48A and 48B indicate the arrangement of symbols when a change in phase is applied to switched baseband signal q1 and to switched baseband signal q2. Accordingly, the numerical values indicated in FIGS. 48A and 48B for each of the symbols are the values of switched baseband signals q1 and q2 after a change in phase.

The important point of FIGS. 48A and 48B is that the change in phase is performed on the data symbols of switched baseband signal q1, that is, on the precoded or precoded and switched symbols thereof, and on the data symbols of switched baseband signal q2, that is, on the precoded or precoded and switched symbols thereof. (The symbols under discussion, being precoded, actually include both symbols s1 and s2.) Accordingly, no change in phase is performed on the pilot symbols inserted in z1', nor on the pilot symbols inserted in z2'.

FIGS. 49A and 49B illustrate the frame configuration of modulated signals (switched baseband signals q1 and q2) z1 or z1' and z2' in the time-frequency domain. FIG. 49A illustrates the frame configuration of modulated signal (switched baseband signal q1) z1 or z1' while FIG. 49B illustrates the frame configuration of modulated signal (switched baseband signal q2) z2'. In FIGS. 49A and 49B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 49A and 49B differ from FIGS. 47A and 47B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 49A and 49B, like FIG. 69, indicate the arrangement of symbols when a change in phase is applied to switched baseband signal q2 (while no change in phase is performed on switched baseband signal q1). (Although FIG. 69 illustrates a change in phase with respect to the time domain, switching time t with carrier f in FIG. 6 corresponds to a change in phase with respect to the frequency domain. In other words, replacing (t) with (t, f) where t is time and f is frequency corresponds to performing a change of phase on time-frequency blocks.) Accordingly, the numerical values indicated in FIGS. 49A and 49B for each of the symbols are the values of switched baseband signal q2 after the change in phase. No values are given for the symbols of switched baseband signal q1 from FIGS. 49A and 49B as no change in phase is performed thereon.

The important point of FIGS. 49A and 49B is that the change in phase performed on the data symbols of switched baseband signal q2, i.e., on symbols having undergone precoding or precoding and switching. (The symbols under discussion, being precoded, actually include both symbols s1 and s2.) Accordingly, no change in phase is performed on the pilot symbols inserted in z2'.

FIGS. 50A and 50B illustrate the frame configuration of modulated signals (switched baseband signals q1 and q2) z1 or z1' and z2' in the time-frequency domain. FIG. 50A illustrates the frame configuration of modulated signal (switched baseband signal q1) z1 or z1' while FIG. 50B illustrates the frame configuration of modulated signal (switched baseband signal q2) z2'. In FIGS. 50A and 50B, 4701 marks pilot symbols, 4702 marks data symbols, and 4901 marks null symbols for which the in-phase component of the baseband signal I=0 and the quadrature component Q=0. As such, data symbols 4702 are symbols on which precoding or precoding and a change in phase have been performed. FIGS. 50A and 50B differ from FIGS. 48A and 48B in the configuration scheme for symbols other than data symbols. The times and carriers at which pilot symbols are inserted into modulated signal z1' are null symbols in modulated signal z2'. Conversely, the times and carriers at which pilot symbols are inserted into modulated signal z2' are null symbols in modulated signal z1'.

FIGS. 50A and 50B indicate the arrangement of symbols when a change in phase is applied to switched baseband signal q1 and to switched baseband signal q2. Accordingly, the numerical values indicated in FIGS. 50A and 50B for each of the symbols are the values of switched baseband signals q1 and q2 after a change in phase.

The important point of FIGS. 50A and 50B is that a change in phase is performed on the data symbols of switched baseband signal q1, that is, on the precoded or precoded and switched symbols thereof, and on the data symbols of switched baseband signal q2, that is, on the precoded or precoded and switched symbols thereof. (The symbols under discussion, being precoded, actually include both symbols s1 and s2.) Accordingly, no change in phase is performed on the pilot symbols inserted in z1', nor on the pilot symbols inserted in z2'.

FIG. 51 illustrates a sample configuration of a transmission device generating and transmitting modulated signal having the frame configuration of FIGS. 47A, 47B, 49A, and 49B. Components thereof performing the same operations as those of FIG. 4 use the same reference symbols thereas. FIG. 51 does not include a baseband signal switcher as illustrated in FIGS. 67 and 70. However, FIG. 51 may also include a baseband signal switcher between the weighting unit and phase changer, much like FIGS. 67 and 70.

In FIG. 51, the weighting units 308A and 308B, phase changer 317B, and baseband signal switcher only operate at times indicated by the frame configuration signal 313 as corresponding to data symbols.

In FIG. 51, a pilot symbol generator 5101 (that also generates null symbols) outputs baseband signals 5102A and 5102B for a pilot symbol whenever the frame configuration signal 313 indicates a pilot symbol (and a null symbol).

Although not indicated in the frame configurations from FIGS. 47A through 50B, when precoding (and phase rotation) is not performed, such as when transmitting a modulated signal using only one antenna (such that the other antenna transmits no signal) or when using a space-time coding transmission method (particularly, space-time block coding) to transmit control information symbols, then the frame configuration signal 313 takes control information symbols 5104 and control information 5103 as input. When the frame configuration signal 313 indicates a control information symbol, baseband signals 5102A and 5102B thereof are output.

Wireless units 310A and 310B of FIG. 51 take a plurality of baseband signals as input and select a desired baseband signal according to the frame configuration signal 313. The wireless units 310A and 310B then apply OFDM signal processing and output modulated signals 311A and 311B conforming to the frame configuration.

FIG. 52 illustrates a sample configuration of a transmission device generating and transmitting modulated signal having the frame configuration of FIGS. 48A, 48B, 50A, and 50B. Components thereof performing the same operations as those of FIGS. 4 and 51 use the same reference symbols thereas. FIG. 52 features an additional phase changer 317A that only operates when the frame configuration signal 313 indicates a data symbol. At all other times, the operations are identical to those explained for FIG. 51. FIG. 52 does not include a baseband signal switcher as illustrated in FIGS. 67 and 70. However, FIG. 52 may also include a baseband signal switcher between the weighting unit and phase changer, much like FIGS. 67 and 70.

FIG. 53 illustrates a sample configuration of a transmission device that differs from that of FIG. 51. FIG. 53 does not include a baseband signal switcher as illustrated in FIGS. 67 and 70. However, FIG. 53 may also include a baseband signal switcher between the weighting unit and phase changer, much like FIGS. 67 and 70. The following describes the points of difference. As shown in FIG. 53, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

A selector 5301 takes the plurality of baseband signals as input and selects a baseband signal having a symbol indicated by the frame configuration signal 313 for output.

FIG. 54 illustrates a sample configuration of a transmission device that differs from that of FIG. 52. FIG. 54 does not include a baseband signal switcher as illustrated in FIGS. 67 and 70. However, FIG. 54 may also include a baseband signal switcher between the weighting unit and phase changer, much like FIGS. 67 and 70. The following describes the points of difference. As shown in FIG. 54, phase changer 317B takes a plurality of baseband signals as input. Then, when the frame configuration signal 313 indicates a data symbol, phase changer 317B performs the change in phase on precoded baseband signal 316B. When frame configuration signal 313 indicates a pilot symbol (or null symbol) or a control information symbol, phase changer 317B pauses phase changing operations such that the symbols of the baseband signal are output as-is. (This may be interpreted as performing forced rotation corresponding to $e^{j0}$.)

Similarly, as shown in FIG. 54, phase changer 5201 takes a plurality of baseband signals as input. Then, when the frame configuration signal 313 indicates a data symbol, phase changer 5201 performs the change in phase on precoded baseband signal 309A. When frame configuration signal 313 indicates a pilot symbol (or null symbol) or a control information symbol, phase changer 5201 pauses phase changing operations such that the symbols of the baseband signal are output as-is. (This may be interpreted as performing forced rotation corresponding to $e^{j0}$.)

The above explanations are given using pilot symbols, control symbols, and data symbols as examples. However, the present invention is not limited in this manner. When symbols are transmitted using methods other than precoding, such as single-antenna transmission or transmission using space-time block coding, the absence of change in phase is important. Conversely, performing the change of phase on symbols that have been precoded is the key point of the present invention.

Accordingly, a characteristic feature of the present invention is that the change in phase is not performed on all symbols within the frame configuration in the time-frequency domain, but only performed on baseband signals that have been precoded and have undergone switching.

The following describes a scheme for regularly changing the phase when encoding is performed using block codes as described in Non-Patent Literature 12 through 15, such as QC LDPC Codes (not only QC-LDPC but also LDPC codes may be used), concatenated LDPC and BCH codes, Turbo codes or Duo-Binary Turbo codes using tail-biting, and so on. The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in two coded blocks when block codes are used. Unlike FIGS. 69 and 70, for example, FIG. 34 illustrates the varying numbers of symbols and slots needed in each coded block when block codes are used when, for example, two streams s1 and s2 are transmitted as indicated in FIG. 4, with an encoder and distributor. (Here, the transmission method may be any single-carrier method or multi-carrier method such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the above-described transmission device transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up two coded blocks, and when the modulation scheme is 64-QAM, 500 slots are needed to transmit all of the bits making up the two coded blocks.

The following describes the relationship between the above-defined slots and the phase of multiplication, as pertains to methods for a regular change of phase.

Here, five different phase changing values (or phase changing sets) are assumed as having been prepared for use in the method for a regular change of phase. That is, the phase changer of the above-described transmission device uses five phase changing values (or phase changing sets) to achieve the period (cycle) of five. (As in FIG. 69, five phase changing values are needed in order to perform a change of phase having a period (cycle) of five on switched baseband signal q2 only. Similarly, in order to perform the change in phase on both switched baseband signals q1 and q2, two phase changing values are needed for each slot. These two phase changing values are termed a phase changing set. Accordingly, here, in order to perform a change of phase having a period (cycle) of five, five such phase changing sets should be prepared). The five phase changing values (or phase changing sets) are expressed as PHASE[0], PHASE [1], PHASE[2], PHASE[3], and PHASE [4].

For the above-described 1500 slots needed to transmit the 6000 bits making up a single coded block when the modulation scheme is QPSK, PHASE[0] is used on 300 slots, PHASE[1] is used on 300 slots, PHASE[2] is used on 300 slots, PHASE[3] is used on 300 slots, and PHASE[4] is used on 300 slots. This is due to the fact that any bias in phase usage causes great influence to be exerted by the more frequently used phase, and that the reception device is dependent on such influence for data reception quality.

Furthermore, for the above-described 750 slots needed to transmit the 6000 bits making up a single coded block when the modulation scheme is 16-QAM, PHASE[0] is used on 150 slots, PHASE[1] is used on 150 slots, PHASE[2] is used on 150 slots, PHASE[3] is used on 150 slots, and PHASE[4] is used on 150 slots.

Further still, for the above-described 500 slots needed to transmit the 6000 bits making up a single coded block when the modulation scheme is 64-QAM, PHASE[0] is used on 100 slots, PHASE[1] is used on 100 slots, PHASE[2] is used on 100 slots, PHASE[3] is used on 100 slots, and PHASE[4] is used on 100 slots.

As described above, a scheme for a regular change of phase requires the preparation of N phase changing values (or phase changing sets) (where the N different phases are expressed as PHASE[0], PHASE[1], PHASE[2] . . . PHASE [N−2], PHASE[N−1]). As such, in order to transmit all of the bits making up a single coded block, PHASE[0] is used on $K_0$ slots, PHASE[1] is used on $K_1$ slots, PHASE[i] is used on $K_i$ slots (where i=0, 1, 2 . . . N−1 (i being an integer between 0 and N−1)), and PHASE[N−1] is used on $K_{N-1}$ slots, such that Condition #D1-4 is met.
(Condition #D1-4)
$K_0 = K_1 \ldots = K_i = \ldots K_{N-1}$. That is, $K_a = K_b$ (for $\forall a$ and $\forall b$ where a, b, = 0, 1, 2 . . . N−1 (a and b being integers between 0 and N−1), a≠b).

Then, when a communication system that supports multiple modulation schemes selects one such supported method for use, Conditions #D1-4 is preferably met for the supported modulation scheme.

However, when multiple modulation schemes are supported, each such modulation scheme typically uses symbols transmitting a different number of bits per symbols (though some may happen to use the same number), Condition #D1-4 may not be satisfied for some modulation schemes. In such a case, the following condition applies instead of Condition #D1-4.

(Condition #D1-5)

The difference between $K_a$ and $K_b$ satisfies 0 or 1. That is, $|K_a - K_b|$ satisfies 0 or 1 ($\forall a, \forall b$, where a, b=0, 1, 2 ... N−1 (a and b being integers between 0 and N−1), a≠b)

FIG. 35 illustrates the varying numbers of symbols and slots needed in two coded blocks when block codes are used. FIG. 35 illustrates the varying numbers of symbols and slots needed in each coded block when block codes are used when, for example, two streams s1 and s2 are transmitted as indicated by the transmission device from FIG. 67 and FIG. 70, and the transmission device has two encoders. (Here, the transmission method may be any single-carrier method or multi-carrier method such as OFDM.)

As shown in FIG. 35, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

The transmission device from FIG. 67 and the transmission device from FIG. 70 each transmit two streams at once, and have two encoders. As such, the two streams each transmit different code blocks. Accordingly, when the modulation scheme is QPSK, two coded blocks drawn from s1 and s2 are transmitted within the same interval, e.g., a first coded block drawn from s1 is transmitted, then a second coded block drawn from s2 is transmitted. As such, 3000 slots are needed in order to transmit the first and second coded blocks.

By the same reasoning, when the modulation scheme is 16-QAM, 1500 slots are needed to transmit all of the bits making up the two coded blocks, and when the modulation scheme is 64-QAM, 1000 slots are needed to transmit all of the bits making up the two coded blocks The following describes the relationship between the above-defined slots and the phase of multiplication, as pertains to methods for a regular change of phase.

Here, five different phase changing values (or phase changing sets) are assumed as having been prepared for use in the method for a regular change of phase. That is, the phase changer of the transmission device from FIG. 67 and FIG. 70 uses five phase changing values (or phase changing sets) to achieve the period (cycle) of five. (As in FIG. 69, five phase changing values are needed in order to perform a change of phase having a period (cycle) of five on switched baseband signal q2 only. Similarly, in order to perform the change in phase on both switched baseband signals q1 and q2, two phase changing values are needed for each slot. These two phase changing values are termed a phase changing set. Accordingly, here, in order to perform a change of phase having a period (cycle) of five, five such phase changing sets should be prepared). The five phase changing values (or phase changing sets) are expressed as PHASE[0], PHASE[1], PHASE[2], PHASE[3], and PHASE [4].

For the above-described 3000 slots needed to transmit the 6000×2 bits making up the two coded blocks when the modulation scheme is QPSK, PHASE[0] is used on 600 slots, PHASE[1] is used on 600 slots, PHASE[2] is used on 600 slots, PHASE[3] is used on 600 slots, and PHASE[4] is used on 600 slots. This is due to the fact that any bias in phase usage causes great influence to be exerted by the more frequently used phase, and that the reception device is dependent on such influence for data reception quality.

Furthermore, in order to transmit the first coded block, PHASE[0] is used on slots 600 times, PHASE[1] is used on slots 600 times, PHASE[2] is used on slots 600 times, PHASE[3] is used on slots 600 times, and PHASE[4] is used on slots 600 times. Furthermore, in order to transmit the second coded block, PHASE[0] is used on slots 600 times, PHASE[1] is used on slots 600 times, PHASE[2] is used on slots 600 times, PHASE[3] is used on slots 600 times, and PHASE[4] is used on slots 600 times.

Similarly, for the above-described 1500 slots needed to transmit the 6000×2 bits making up the two coded blocks when the modulation scheme is 16-QAM, PHASE[0] is used on 300 slots, PHASE[1] is used on 300 slots, PHASE[2] is used on 300 slots, PHASE[3] is used on 300 slots, and PHASE[4] is used on 300 slots.

Furthermore, in order to transmit the first coded block, PHASE[0] is used on slots 300 times, PHASE[1] is used on slots 300 times, PHASE[2] is used on slots 300 times, PHASE[3] is used on slots 300 times, and PHASE[4] is used on slots 300 times. Furthermore, in order to transmit the second coded block, PHASE[0] is used on slots 300 times, PHASE[1] is used on slots 300 times, PHASE[2] is used on slots 300 times, PHASE[3] is used on slots 300 times, and PHASE[4] is used on slots 300 times.

Similarly, for the above-described 1000 slots needed to transmit the 6000×2 bits making up the two coded blocks when the modulation scheme is 64-QAM, PHASE[0] is used on 200 slots, PHASE[1] is used on 200 slots, PHASE[2] is used on 200 slots, PHASE[3] is used on 200 slots, and PHASE[4] is used on 200 slots.

Furthermore, in order to transmit the first coded block, PHASE[0] is used on slots 200 times, PHASE[1] is used on slots 200 times, PHASE[2] is used on slots 200 times, PHASE[3] is used on slots 200 times, and PHASE[4] is used on slots 200 times. Furthermore, in order to transmit the second coded block, PHASE[0] is used on slots 200 times, PHASE[1] is used on slots 200 times, PHASE[2] is used on slots 200 times, PHASE[3] is used on slots 200 times, and PHASE[4] is used on slots 200 times.

As described above, a method for a regular change of phase requires the preparation of N phase changing values (or phase changing sets) (where the N different phases are expressed as PHASE[0], PHASE[1], PHASE[2] ... PHASE[N−2], PHASE[N−2]). As such, in order to transmit all of the bits making up a single coded block, PHASE[0] is used on $K_0$ slots, PHASE[1] is used on $K_1$ slots, PHASE[i] is used on $K_i$ slots (where i=0, 1, 2 ... N−1 (i being an integer between 0 and N−1)), and PHASE[N−1] is used on $K_{N-1}$ slots, such that Condition #D1-6 is met.

(Condition #D1-6)

$K_0 = K_1 ... = K_i = ... K_{N-1}$. That is, $K_a = K_b$ (for $\forall a$ and $\forall b$ where a, b,=0, 1, 2 ... N−1 (a and b being integers between 0 and N−1), a≠b).

Further, in order to transmit all of the bits making up the first coded block, PHASE[0] is used $K_{0,1}$ times, PHASE[1] is used $K_{1,1}$ times, PHASE[i] is used $K_{i,1}$ times (where i=0, 1, 2 ... N−1 (i being an integer between 0 and N−1)), and PHASE[N−1] is used $K_{N-1,1}$ times, such that Condition #D1-7 is met.

(Condition #D1-7)

$K_{0,1}=K_{1,1}=\ldots K_{i,1}=\ldots K_{N-1,1}$. That is, $K_{a,1}=K_{b,1}$ ($\forall$a and $\forall$b where a, b,=0, 1, 2 ... N-1 (a and b being integers between 0 and N-1), a≠b).

Furthermore, in order to transmit all of the bits making up the second coded block, PHASE[0] is used $K_{0,2}$ times, PHASE[1] is used $K_{1,2}$ times, PHASE[i] is used $K_{i,2}$ times (where i=0, 1, 2 ... N-1 (i being an integer between 0 and N-1)), and PHASE[N-1] is used $K_{N-1,2}$ times, such that Condition #D1-8 is met.

(Condition #D1-8)

$K_{0,2}=K_{1,2}=\ldots K_{i,2}=\ldots K_{N-1,2}$. That is, $K_{a,2}=K_{b,2}$ ($\forall$a and $\forall$b where a, b,=0, 1, 2 ... N-1 (a and b being integers between 0 and N-1), a≠b).

Then, when a communication system that supports multiple modulation schemes selects one such supported method for use, Condition #D1-6 Condition #D1-7, and Condition #D1-8 is met for the supported modulation scheme.

However, when multiple modulation schemes are supported, each such modulation scheme typically uses symbols transmitting a different number of bits per symbols (though some may happen to use the same number), Condition #D1-6 Condition #D1-7, and Condition #D1-8 may not be satisfied for some modulation schemes. In such a case, the following conditions apply instead of Condition #D1-6 Condition #D1-7, and Condition #D1-8.

(Condition #D1-9)

The difference between Ka and Kb satisfies 0 or 1. That is, $|K_a-K_b|$ satisfies 0 or 1 ($\forall$a, $\forall$b, where a, b=0, 1, 2 ... N-1 (a and b being integers between 0 and N-1), a≠b)

(Condition #D1-10)

The difference between $K_{a,1}$ and $K_{b,1}$ satisfies 0 or 1. That is, $|K_{a,1}-K_{b,1}|$ satisfies 0 or 1 ($\forall$a, $\forall$b, where a, b=0, 1, 2 ... N-1 (a and b being integers between 0 and N-1), a≠b)

(Condition #D1-11)

The difference between $K_{a,2}$ and $K_{b,2}$ satisfies 0 or 1. That is, $|K_{a,2}-K_{b,2}|$ satisfies 0 or 1 ($\forall$a, $\forall$b, where a, b=0, 1, 2 ... N-1 (a and b being integers between 0 and N-1), a≠b)

As described above, bias among the phases being used to transmit the coded blocks is removed by creating a relationship between the coded block and the phase of multiplication. As such, data reception quality may be improved for the reception device.

As described above, N phase changing values (or phase changing sets) are needed in order to perform a change of phase having a period (cycle) of N with the method for the regular change of phase. As such, N phase changing values (or phase changing sets) PHASE[0], PHASE[1], PHASE[2] ... PHASE[N-2], and PHASE[N-1] are prepared. However, schemes exist for ordering the phases in the stated order with respect to the frequency domain. No limitation is intended in this regard. The N phase changing values (or phase changing sets) PHASE[0], PHASE[1], PHASE[2] ... PHASE[N-2], and PHASE[N-1] may also change the phases of blocks in the time domain or in the time-frequency domain to obtain a symbol arrangement. Although the above examples discuss a phase changing method with a period (cycle) of N, the same effects are obtainable using N phase changing values (or phase changing sets) at random. That is, the N phase changing values (or phase changing sets) need not always have regular periodicity. As long as the above-described conditions are satisfied, great quality data reception improvements are realizable for the reception device.

Furthermore, given the existence of modes for spatial multiplexing MIMO methods, MIMO methods using a fixed precoding matrix, space-time block coding methods, single-stream transmission, and methods using a regular change of phase, the transmission device (broadcaster, base station) may select any one of these transmission methods.

As described in Non-Patent Literature 3, spatial multiplexing MIMO methods involve transmitting signals s1 and s2, which are mapped using a selected modulation scheme, on each of two different antennas. MIMO methods using a fixed precoding matrix involve performing precoding only (with no change in phase). Further, space-time block coding methods are described in Non-Patent Literature 9, 16, and 17. Single-stream transmission methods involve transmitting signal s1, mapped with a selected modulation scheme, from an antenna after performing predetermined processing.

Schemes using multi-carrier transmission such as OFDM involve a first carrier group made up of a plurality of carriers and a second carrier group made up of a plurality of carriers different from the first carrier group, and so on, such that multi-carrier transmission is realized with a plurality of carrier groups. For each carrier group, any of spatial multiplexing MIMO methods, MIMO methods using a fixed precoding matrix, space-time block coding methods, single-stream transmission, and methods using a regular change of phase may be used. In particular, methods using a regular change of phase on a selected (sub-)carrier group are preferably used to realize the above.

Although the present description describes the present Embodiment as a transmission device applying precoding, baseband switching, and change in phase, all of these may be variously combined. In particular, the phase changer discussed for the present Embodiment may be freely combined with the change in phase discussed in all other Embodiments.

Embodiment D2

The present Embodiment describes a phase change initialization method for the regular change of phase described throughout the present description. This initialization method is applicable to the transmission device from FIG. 4 when using a multi-carrier method such as OFDM, and to the transmission devices of FIGS. 67 and 70 when using a single encoder and distributor, similar to FIG. 4.

The following is also applicable to a method of regularly changing the phase when encoding is performed using block codes as described in Non-Patent Literature 12 through 15, such as QC LDPC Codes (not only QC-LDPC but also LDPC codes may be used), concatenated LDPC and BCH codes, Turbo codes or Duo-Binary Turbo codes using tail-biting, and so on.

The following example considers a case where two streams s1 and s2 are transmitted. When encoding has been performed using block codes and control information and the like is not necessary, the number of bits making up each coded block matches the number of bits making up each block code (control information and so on described below may yet be included). When encoding has been performed using block codes or the like and control information or the like (e.g., CRC transmission parameters) is required, then the number of bits making up each coded block is the sum of the number of bits making up the block codes and the number of bits making up the information.

FIG. 34 illustrates the varying numbers of symbols and slots needed in each coded block when block codes are used. FIG. 34 illustrates the varying numbers of symbols and slots needed in each coded block when block codes are used when, for example, two streams s1 and s2 are transmitted as indicated by the above-described transmission device, and the transmission device has only one encoder. (Here, the transmission method may be any single-carrier method or multi-carrier method such as OFDM.)

As shown in FIG. 34, when block codes are used, there are 6000 bits making up a single coded block. In order to transmit these 6000 bits, the number of required symbols depends on the modulation scheme, being 3000 for QPSK, 1500 for 16-QAM, and 1000 for 64-QAM.

Then, given that the above-described transmission device transmits two streams simultaneously, 1500 of the aforementioned 3000 symbols needed when the modulation scheme is QPSK are assigned to s1 and the other 1500 symbols are assigned to s2. As such, 1500 slots for transmitting the 1500 symbols (hereinafter, slots) are required for each of s1 and s2.

By the same reasoning, when the modulation scheme is 16-QAM, 750 slots are needed to transmit all of the bits making up each coded block, and when the modulation scheme is 64-QAM, 500 slots are needed to transmit all of the bits making up each coded block.

The following describes a transmission device transmitting modulated signals having a frame configuration illustrated by FIGS. 71A and 71B. FIG. 71A illustrates a frame configuration for modulated signal z1' or z1 (transmitted by antenna 312A) in the time and frequency domains. Similarly, FIG. 71B illustrates a frame configuration for modulated signal z2 (transmitted by antenna 312B) in the time and frequency domains. Here, the frequency (band) used by modulated signal z1' or z1 and the frequency (band) used for modulated signal z2 are identical, carrying modulated signals z1' or z1 and z2 at the same time.

As shown in FIG. 71A, the transmission device transmits a preamble (control symbol) during interval A. The preamble is a symbol transmitting control information for another party. In particular, this preamble includes information on the modulation scheme used to transmit a first and a second coded block. The transmission device transmits the first coded block during interval B. The transmission device then transmits the second coded block during interval C.

Further, the transmission device transmits a preamble (control symbol) during interval D. The preamble is a symbol transmitting control information for another party. In particular, this preamble includes information on the modulation scheme used to transmit a third or fourth coded block and so on. The transmission device transmits the third coded block during interval E. The transmission device then transmits the fourth coded block during interval D.

Also, as shown in FIG. 71B, the transmission device transmits a preamble (control symbol) during interval A. The preamble is a symbol transmitting control information for another party. In particular, this preamble includes information on the modulation scheme used to transmit a first and a second coded block. The transmission device transmits the first coded block during interval B. The transmission device then transmits the second coded block during interval C.

Further, the transmission device transmits a preamble (control symbol) during interval D. The preamble is a symbol transmitting control information for another party. In particular, this preamble includes information on the modulation scheme used to transmit a third or fourth coded block and so on. The transmission device transmits the third coded block during interval E. The transmission device then transmits the fourth coded block during interval D.

FIG. 72 indicates the number of slots used when transmitting the coded blocks from FIG. 34, specifically using 16-QAM as the modulation scheme for the first coded block. Here, 750 slots are needed to transmit the first coded block.

Similarly, FIG. 72 also indicates the number of slots used to transmit the second coded block, using QPSK as the modulation scheme therefor. Here, 1500 slots are needed to transmit the second coded block.

FIG. 73 indicates the slots used when transmitting the coded blocks from FIG. 34, specifically using QPSK as the modulation scheme for the third coded block. Here, 1500 slots are needed to transmit the coded block.

As explained throughout this description, modulated signal z1, i.e., the modulated signal transmitted by antenna 312A, does not undergo a change in phase, while modulated signal z2, i.e., the modulated signal transmitted by antenna 312B, does undergo a change in phase. The following phase changing method is used for FIGS. 72 and 73.

Before the change in phase can occur, seven different phase changing values must prepared. The seven phase changing values are labelled #0, #1, #2, #3, #4, #5, and #6. The change in phase is regular and periodic. In other words, the phase changing values are applied regularly and periodically, such that the order is #0, #1, #2, #3, #4, #5, #6, #0, #1, #2, #3, #4, #5, #6, #0, #1, #2, #3, #4, #5, #6 and so on.

As shown in FIG. 72, given that 750 slots are needed for the first coded block, phase changing value #0 is used initially, such that #0, #1, #2, #3, #4, #5, #6, #0, #1, #2 . . . #3, #4, #5, #6 are used in succession, with the 750th slot using #0 at the final position.

The change in phase is then applied to each slot for the second coded block. The present description assumes multicast transmission and broadcasting applications. As such, a receiving terminal may have no need for the first coded block and extract only the second coded block. In such circumstances, given that the final slot used for the first coded block uses phase changing value #0, the initial phase changing value used for the second coded block is #1. As such, the following methods are conceivable:

(a): The aforementioned terminal monitors the transmission of the first coded block, i.e., monitors the pattern of the phase changing values through the final slot used to transmit the first coded block, and then estimates the phase changing value used for the initial slot of the second coded block;

(b): (a) does not occur, and the transmission device transmits information on the phase changing values in use at the initial slot of the second coded block.

Scheme (a) leads to greater energy consumption by the terminal due to the need to monitor the transmission of the first coded block. However, scheme (b) leads to reduced data transmission efficiency.

Accordingly, there is a need to improve the phase changing value allocation described above. Consider a method in which the phase changing value used to transmit the initial slot of each coded block is fixed. Thus, as indicated in FIG. 72, the phase changing value used to transmit the initial slot of the second coded block and the phase changing value used to transmit the initial slot of the first coded block are identical, being #0.

Similarly, as indicated in FIG. 73, the phase changing value used to transmit the initial slot of the third coded block is not #3, but is instead identical to the phase changing value used to transmit the initial slot of the first and second coded blocks, being #0.

As such, the problems accompanying both methods (a) and (b) described above can be constrained while retaining the effects thereof.

In the present Embodiment, the method used to initialize the phase changing value for each coded block, i.e., the phase changing value used for the initial slot of each coded block, is fixed so as to be #0. However, other methods may also be used for single-frame units. For example, the phase changing value used for the initial slot of a symbol transmitting information after the preamble or control symbol has been transmitted may be fixed at #0.

Embodiment D3

The above-described Embodiments discuss a weighting unit using a precoding matrix expressed in complex numbers for precoding. However, the precoding matrix may also be expressed in real numbers.

That is, suppose that two baseband signals s1($i$) and s2($i$) (where i is time or frequency) have been mapped (using a modulation scheme), and precoded to obtained precoded baseband signals z1($i$) and z2($i$). As such, mapped baseband signal s1($i$) has an in-phase component of $I_{s1}(i)$ and a quadrature component of $Q_{s1}(i)$, and mapped baseband signal s2($i$) has an in-phase component of $I_{s2}(i)$ and a quadrature component of $Q_{s2}(i)$, while precoded baseband signal z1($i$) has an in-phase component of $Iz1(i)$ and a quadrature component of $Q_{z1}(i)$, and precoded baseband signal z2($i$) has an in-phase component of $I_2(i)$ and a quadrature component of $Q_{z2}(i)$, which gives the following precoding matrix $H_r$ when all values are real numbers.

[Math. 76]

$$\begin{pmatrix} I_{z1}(i) \\ Q_{z1}(i) \\ I_{z2}(i) \\ Q_{z2}(i) \end{pmatrix} = H_r \begin{pmatrix} I_{s1}(i) \\ Q_{s1}(i) \\ I_{s2}(i) \\ Q_{s2}(i) \end{pmatrix} \quad \text{(formula 76)}$$

Precoding matrix $H_r$ may also be expressed as follows, where all values are real numbers.

[Math. 77]

$$H_r = \begin{pmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{pmatrix} \quad \text{(formula 77)}$$

where $a_{11}$, $a_{12}$, $a_{13}$, $a_{14}$, $a_{21}$, $a_{22}$, $a_{23}$, $a_{24}$, $a_{31}$, $a_{32}$, $a_{33}$, $a_{34}$, $a_{41}$, $a_{42}$, $a_{43}$, and $a_{44}$ are real numbers. However, none of the following may hold: $\{a_{11}=0, a_{12}=0, a_{13}=0, \text{and } a_{14}=0\}$, $\{a_{21}=0, a_{22}=0, a_{23}=0, \text{and } a_{24}=0\}$, $\{a_{31}=0, a_{32}=0, a_{33}=0, \text{and } a_{34}=0\}$, and $\{a_{41}=0, a_{42}=0, a_{43}=0, \text{and } a_{44}=0\}$. Also, none of the following may hold: $\{a_{11}=0, a_{21}=0, a_{31}=0, \text{and } a_{41}=0\}$, $\{a_{12}=0, a_{22}=0, a_{32}=0, \text{and } a_{42}=0\}$, $\{a_{13}=0, a_{23}=0, a_{33}=0, \text{and } a_{43}=0\}$, and $\{a_{14}=0, a_{24}=0, a_{34}=0, \text{and } a_{44}=0\}$.

Embodiment E1

The present Embodiment describes a transmission scheme as an application of the change in phase to precoded signals (or precoded signals having switched basebands) for a broadcasting system using the DVB-T2 (Digital Video Broadcasting for a second generation digital terrestrial television broadcasting system) standard. First, the configuration of a frame in a broadcasting system using the DVB-T2 standard is described.

Figure 74:
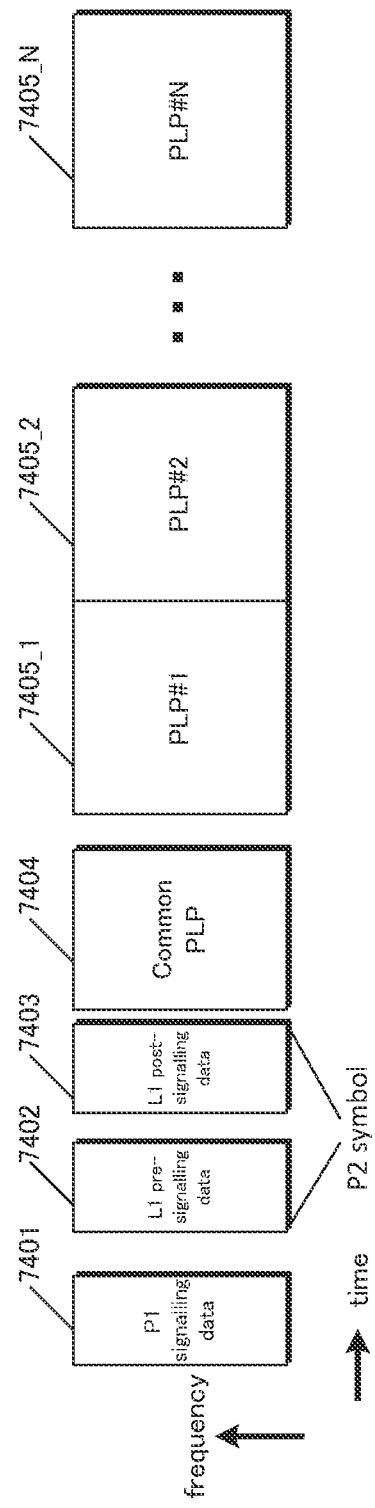
FIG. 74 illustrates the overall frame configuration of a signal transmitted by a broadcaster using DVB-T2.

FIG. 74 illustrates the overall frame configuration of a signal transmitted by a broadcaster using the DVB-T2 standard. Given that DVB-T2 uses an OFDM method, the frame is configured in the time-frequency domain. Thus, FIG. 74 illustrates frame configuration in the time-frequency domain. The frame includes P1 signalling data (7401), L1 pre-signalling data (7402), L1 post-signalling data (7403), a common PLP (Physical Layer Pipe) (7404), and PLPs #1 through #N (7405_1 through 7405_N). (Here, L1 pre-signalling data (7402) and L1 post-signalling data (7403) are termed P2 symbols.) As such, the P1 signalling data (7401), L1 pre-signalling data (7402), L1 post-signalling data (7403), a common PLP (Physical Layer Pipe) (7404), and PLPs #1 through #N (7405_1 through 7405_N) form a frame, which is termed a T2 frame, thus constituting a frame configuration unit.

The P1 signalling data (7401) is a symbol used by the reception device for signal detection and frequency synchronization (including frequency offset estimation), that simultaneously serves to transmit information such as the FFT size and whether the modulated signal is transmitted by a SISO or MISO method. (With SISO methods, only one modulated signal is transmitted, while with MISO methods, a plurality of modulated signals are transmitted. In addition, the space-time blocks described in Non-Patent Literature 9, 16, and 17 may be used.)

The L1 pre-signalling data (7402) is used to transmit information regarding the methods used to transmit the frame, concerning the guard interval, the signal processing method information used to reduce the PAPR (Peak-to-Average Power Ratio), the modulation scheme used to transmit the L1 post-signalling data, the FEC method, the coding rate thereof, the length and size of the L1 post-signalling data, them the payload pattern, the cell (frequency region)-specific numbers, and whether normal mode or extended mode is in use (where normal mode and extended mode differ in terms of sub-carrier numbers used to transmit data).

The L1 post-signalling data (7403) is used to transmit such information as the number of PLPs, the frequency region in use, the PLP-specific numbers, the modulation scheme used to transmit the PLPs, the FEC method, the coding rate thereof, the number of blocks transmitted by each PLP, and so on.

The common PLP (7404) and the PLPs #1 through #N (7405_1 through 7405_N) are areas used for data transmission.

Figure 75:
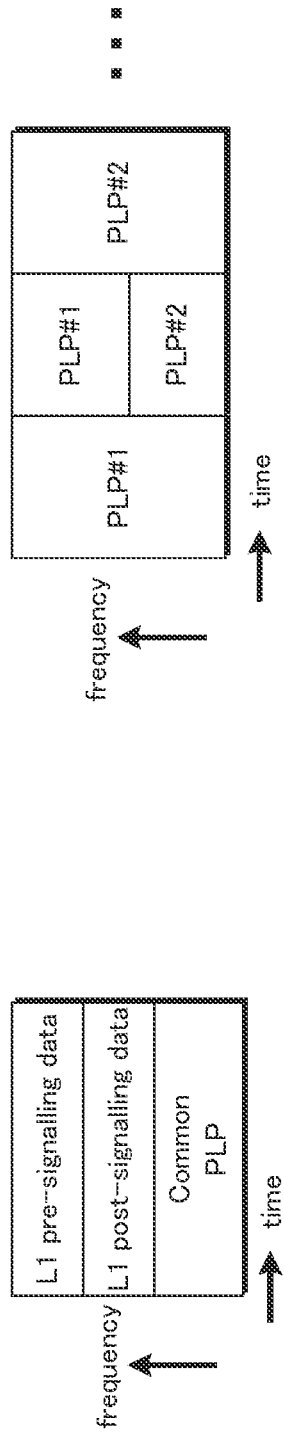
FIG. 75 illustrates two or more types of signals at the same timestamp.

The frame configuration from FIG. 74 illustrates the P1 signalling data (7401), L1 pre-signalling data (7402), L1 post-signalling data (7403), the common PLP (Physical Layer Pipe) (7404), and the PLPs #1 through #N (7405_1 through 7405_N) divided with respect to the time domain for transmission. However, two or more of these signals may occur simultaneously. FIG. 75 illustrates such a case. As shown, the L1 pre-signalling data, L1 post-signalling data, and common PLP occur at the same timestamp, while PLP #1 and PLP #2 occur simultaneously at another timestamp. That is, each signal may coexist at the same point with respect to the time or frequency domain within the frame configuration.

Figure 76:
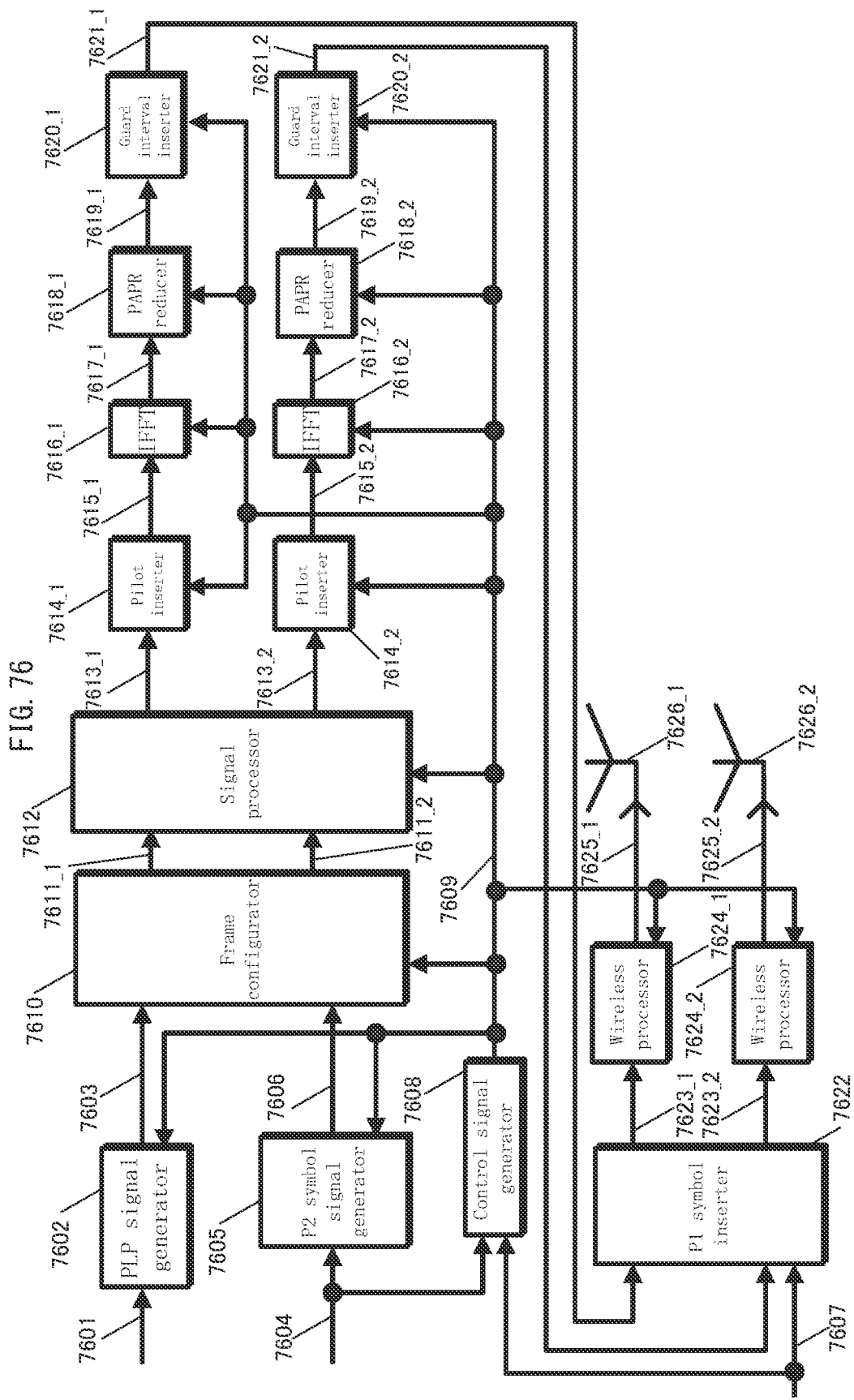
FIG. 76 illustrates still a further sample configuration of a transmission device.

FIG. 76 illustrates a sample configuration of a transmission device (e.g., a broadcaster) applying a transmission method in which a change in phase is performed on precoded (or precoded and switched) signals conforming to the DVB-T2 standard.

A PLP signal generator 7602 takes PLP transmit data 7601 (data for the PLPs) and a control signal 7609 as input, performs error-correcting coding according to the error-correcting code information for the PLPs included in the control signal 7609 and performs mapping according to the modulation scheme similarly included in the control signal 7609, and then outputs a PLP (quadrature) baseband signal 7603.

A P2 symbol signal generator 7605 takes P2 symbol transmit data 7604 and the control signal 7609 as input, performs error-correcting coding according to the error-correcting code information for the P2 symbol included in the control signal 7609 and performs mapping according to the modulation scheme similarly included in the control signal 7609, and then outputs a P2 symbol (quadrature) baseband signal 7606.

A control signal generator 7608 takes P1 symbol transmit data 7607 and the P2 symbol transmit data 7604 as input and outputs the control signal 7609 for the group of symbols from FIG. 74 (the P1 signalling data (7401), the L1 pre-signalling data (7402), the L1 post-signalling data (7403), the common PLP (7404), and PLPs #1 through #N (7405_1 through 7405_N)). The control signal 7609 is made up of transmission method information (such as the error-correcting codes and coding rate therefor, the modulation scheme, the block length, the frame configuration, the selected transmission method in which the precoding matrix is regularly changed, the pilot symbol insertion method, IFFT/FFT information, the PAPR reduction method, and the guard interval insertion method) for the symbol group.

A frame configurator 7610 takes a PLP baseband signal 7603, the P2 symbol baseband signal 7606, and the control signal 7609 as input, performs reordering with respect to the time and frequency domains according to the frame configuration information included in the control signal, and accordingly outputs (quadrature) baseband signal 7611_1 for stream 1 (a mapped signal, i.e., a baseband signal on which the modulation scheme has been used) and (quadrature) baseband signal 7611_2 for stream 2 (also a mapped signal, i.e., a baseband signal on which the modulation scheme has been used).

A signal processor 7612 takes the baseband signal for stream 1 7611_1, the baseband signal for stream 2 7611_2, and the control signal 7609 as input, and then outputs modulated signals 1 (7613_1) and 2 (7613_2), processed according to the transmission method included in the control signal 7609.

Here, the characteristic feature is that when the transmission method for performing the change of phase on precoded (or precoded and switched) signals is selected, the signal processor performs the change in phase on the precoded (or precoded and switched) signals as indicated in FIGS. 6, 25 through 29, and 69. The signals so processed are output as processed modulated signal 1 (7613_1) and processed modulated signal 2 (7613_2).

A pilot inserter 7614_1 takes processed modulated signal 1 (7613_1) and control signal 7609 as input, inserts pilot symbols into processed modulated signal 1 (7613_1) according to the pilot symbol insertion method information included in the control signal 7609, and outputs a post-pilot symbol insertion modulated signal 7615_1.

Another pilot inserter 7614_2 takes processed modulated signal 2 (7613_2) and control signal 7609 as input, inserts pilot symbols into processed modulated signal 2 (7613_2) according to the pilot symbol insertion method information included in the control signal 7609, and outputs a post-pilot symbol insertion modulated signal 7615_2.

An IFFT unit 7616_1 takes post-pilot symbol insertion modulated signal 7615_1 and the control signal 7609 as input, applies an IFFT according to the IFFT method information included in the control signal 7609, and outputs post-IFFT signal 7617_1.

Another IFFT unit 7616_2 takes post-pilot symbol insertion modulated signal 7615_2 and the control signal 7609 as input, applies an IFFT according to the IFFT method information included in the control signal 7609, and outputs post-IFFT signal 7617_2.

PAPR reducer 7618_1 takes post-IFFT signal 7617_1 and control signal 7609 as input, applies PAPR-reducing processing to post-IFFT signal 7617_1 according to the PAPR reduction information included in the control signal 7609, and outputs post-PAPR reduction signal 7619_1.

PAPR reducer 7618_2 takes post-IFFT signal 7617_2 and control signal 7609 as input, applies PAPR-reducing processing to post-IFFT signal 7617_2 according to the PAPR reduction information included in the control signal 7609, and outputs post-PAPR reduction signal 7619_2.

Guard interval inserter 7620_1 takes post-PAPR reduction signal 7619_1 and the control signal 7609 as input, inserts guard intervals into post-PAPR reduction 7619_1 according to the guard interval insertion method information included in the control signal 7609, and outputs post-guard interval insertion signal 7621_1.

Guard interval inserter 7620_2 takes post-PAPR reduction signal 7619_2 and the control signal 7609 as input, inserts guard intervals into post-PAPR reduction 7619_2 according to the guard interval insertion method information included in the control signal 7609, and outputs post-guard interval insertion signal 7621_2.

A P1 symbol inserter 7622 takes the P1 symbol transmit data 7607 and the post-guard interval insertion signals 7621_1 and 7621_2 as input, generates P1 symbol signals from the P1 symbol transmit data 7607, adds the P1 symbols to the respective post-guard interval insertion signals 7621_1 and 7621_2, and outputs post-P1 symbol addition signals 7623_1 and 7623_2. The P1 symbol signals may be added to one or both of post-guard interval insertion signals 7621_1 and 7621_2. In the former case, the signal to which nothing is added has zero signals as the baseband signal in the interval to which the symbols are added to the other signal.

Wireless processor 7624_1 takes post-P1 symbol addition signal 7623_1 as input, performs processing such as frequency conversion and amplification thereon, and outputs transmit signal 7625_1. Transmit signal 7625_1 is then output as radio waves by antenna 7626_1.

Wireless processor 7624_2 takes post-P1 symbol addition signal 7623_2 as input, performs processing such as frequency conversion and amplification thereon, and outputs transmit signal 7625_2. Transmit signal 7625_2 is then output as radio waves by antenna 7626_2.

Figure 77:
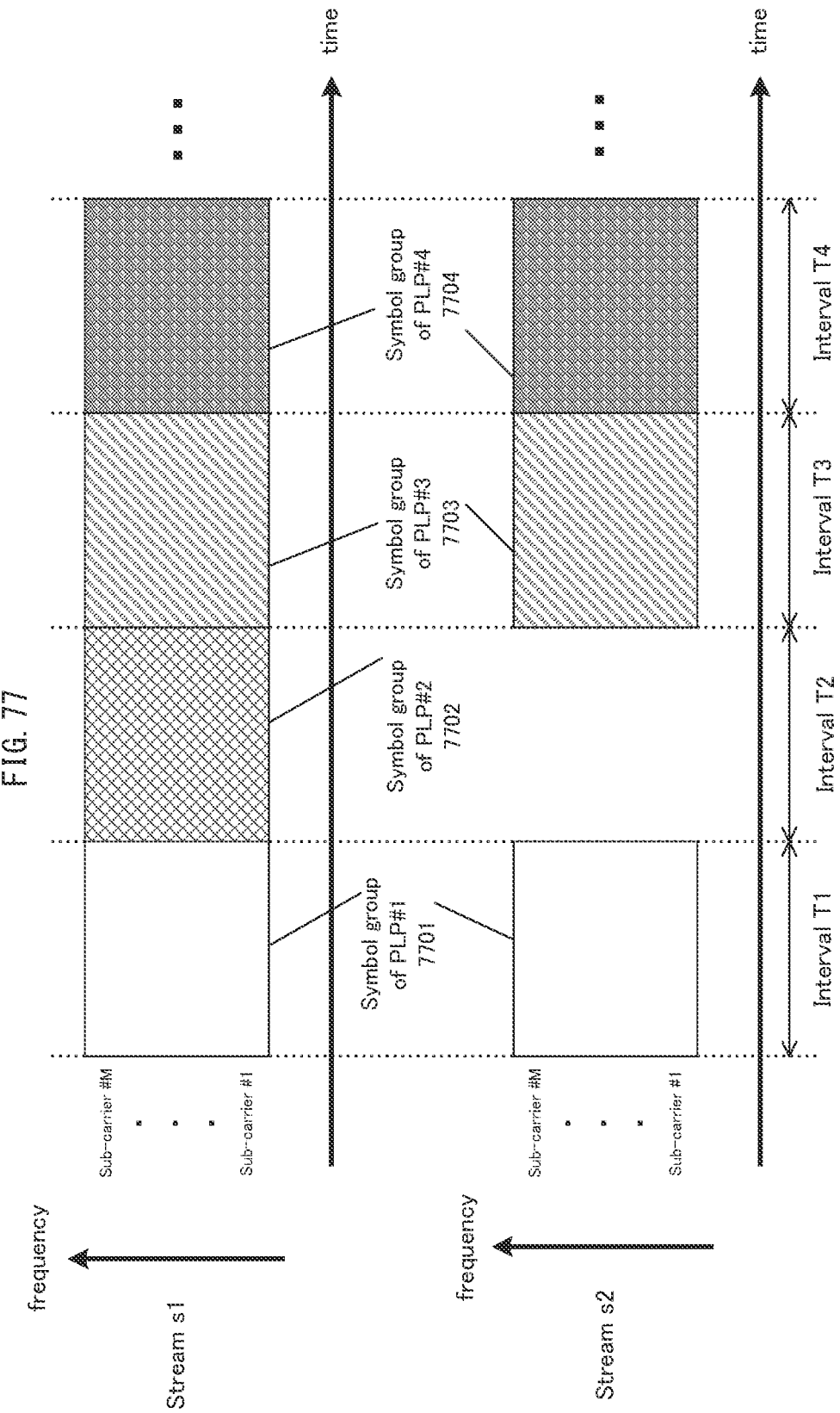
FIG. 77 illustrates an alternate sample frame configuration.

FIG. 77 illustrates a sample frame configuration in the time-frequency domain where a plurality of PLPs are transmitted after the P1 symbol, P2 symbol, and Common PLP have been transmitted. As shown, with respect to the frequency domain, stream 1 (a mapped signal, i.e., a baseband signal on which the modulation scheme has been used) uses sub-carriers #1 through #M, as does stream 2 (also a mapped signal, i.e., a baseband signal on which the modulation scheme has been used). Accordingly, when both s1 and s2 have a symbol on the same sub-carrier at the same timestamp, a symbol from each of the two streams is present at a single frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As shown in FIG. 77, interval 1 is used to transmit symbol group 7701 of PLP #1 using stream s1 and stream s2. Data are transmitted using a spatial multiplexing MIMO system as illustrated by FIG. 23, or by using a MIMO system with a fixed precoding matrix (where no change in phase performed).

Interval 2 is used to transmit symbol group 7702 of PLP #2 using stream s1. Data are transmitted using one modulated signal.

Interval 3 is used to transmit symbol group 7703 of PLP #3 using stream s1 and stream s2. Data are transmitted using a transmission method in which a change in phase is performed on precoded (or precoded and switched) signals.

Interval 4 is used to transmit symbol group 7704 using stream s1 and stream s2. Data are transmitted using the time-space block codes described in Non-Patent Literature 9, 16, and 17.

When a broadcaster transmits PLPs as illustrated by FIG. 77, the reception device from FIG. 77 receiving the transmit signals needs to know the transmission method of each PLP. Accordingly, as described above, the L1 post-signalling data (7403 from FIG. 74), being the P2 symbol, should transmit the transmission scheme for each PLP. The following describes an example of a configuration method for P1 and P2 symbols in such circumstances.

Table 2 lists specific examples of control information carried by the P1 symbol.

TABLE 2

| S1 (3-bit) | Control Information |
|---|---|
| 000 | T2_SISO (transmission of one modulated signal in the DVB-T2 standard) |
| 001 | T2_MISO (transmission using time-space block codes in the DVB-T2 standard) |
| 010 | NOT_T2 (using a standard other than DVB-T2) |

In the DVB-T2 standard, S1 control information (three bits of data) is used by the reception device to determine whether or not DVB-T2 is being used, and in the affirmative case, to determine the transmission method.

As indicated in Table 2, above, the 3-bit S1 data are set to 000 to indicate that the modulated signals being transmitted conform to transmission of one modulated signal in the DVB-T2 standard.

Alternatively, the 3-bit S1 data are set to 001 to indicate that the modulated signals being transmitted conform to the use of time-space block codes in the DVB-T2 standard.

In DVB-T2, 010 through 111 are reserved for future use. In order to apply the present invention while maintaining compatibility with DVB-T2, the 3-bit S1 data should be set to 010, for example (anything other than 000 and 001 may be used), and should indicate that a standard other than DVB-T2 is being used for the modulated signals. Thus, the reception device or terminal is able to determine that the broadcaster is transmitting using modulated signals conforming to a standard other than DVB-T2 by detecting that the data read 010.

The following describes an example of a configuration method for a P2 symbol used when the modulated signals transmitted by the broadcaster conform to a standard other than DVB-T2. In the first example, a scheme of using the P2 symbol within the DVB-T2 standard.

Table 3 lists a first example of control information transmitted by the L1 post-signalling data in the P2 symbol.

TABLE 3

| PLP_MODE (2-bits) | Control Information |
|---|---|
| 00 | SISO/SIMO |
| 01 | MISO/MIMO (space-time block codes) |
| 10 | MIMO (performing a change of phase on precoded signals (or precoded signals having switched basebands)) |
| 11 | MIMO (using a fixed precoding matrix, or using spatial multiplexing) |

The above-given tables use the following abbreviations.

SISO: Single-Input Single-Output (one modulated signal transmitted and received by one antenna)

SIMO: Single-Input Multiple-Output (one modulated signal transmitted and received by multiple antennas)

MISO: Multiple-Input Single-Output (multiple modulated signals transmitted by multiple antennas and received by a single antenna)

MIMO: Multiple-Input Multiple-Output (multiple modulated signals transmitted and received by multiple antennas)

The two-bit data listed in Table 3 are the PLP_MODE information. As shown in FIG. 77, this information is control information for informing the terminal of the transmission method (symbol group of PLP #1 through #4 in FIG. 77; hereinafter, symbol group). The PLP_MODE information is present in each PLP. That is, in FIG. 77, the PLP_MODE information for PLP #1, for PLP #2, for PLP #3, for PLP #4, and so on, is transmitted by the broadcaster. Naturally, the terminal acknowledges the transmission method used by the broadcaster for the PLPs by demodulating (or by performing error-correcting decoding on) this information.

When the PLP_MODE is set to 00, data are transmitted by that PLP using a method in which a single modulated signal is transmitted. When the PLP_MODE is set to 01, data are transmitted by that PLP using a method in which multiple modulated signals are transmitted using space-time block codes. When the PLP_MODE is set to 10, data are transmitted by that PLP using a method in which a change in phase is performed on precoded (or precoded and switched) signals. When the PLP_MODE is set to 11, data are transmitted by that PLP using a method in which a fixed precoding matrix is used, or in which a spatial multiplexing MIMO system, is used.

When the PLP_MODE is set to any of 01 through 11, the broadcaster must transmit the specific processing (e.g., the specific transmission method by which the change in phase is applied to precoded (or precoded and switched) signals, the encoding method of time-space block codes, or the configuration of the precoding matrix) to the terminal. The following describes an alternative to Table 3, as a configuration method for control information that includes the control information necessitated by such circumstances.

Table 4 lists a second example of control information transmitted by the L1 post-signalling data in the P2 symbol, different from that of Table 3.

TABLE 4

| Name | No. of bits | Control Information |
| --- | --- | --- |
| PLP_MODE (1-bit) | 0 | SISO/SIMO |
| | 1 | MISO/MIMO, using one of (i) space-time block codes; (ii) change in phase performed on precoded signals (or precoded signals having switched basebands); (iii) a fixed precoding matrix; and (iv) spatial multiplexing |
| MIMO_MODE (1-bit) | 0 | change in phase on precoded signals (or precoded signals having switched basebands) is OFF |
| | 1 | change in phase on precoded signals (or precoded signals having switched basebands) is ON |
| MIMO_PATTERN#1 (2-bit) | 00 | space-time block codes |
| | 01 | fixed precoding matrix #1 |
| | 10 | fixed precoding matrix #2 |
| | 11 | spatial multiplexing |
| MIMO_PATTERN#2 (2-bit) | 00 | change in phase on precoded signals (or precoded signals having switched basebands), version #1 |
| | 01 | change in phase on precoded signals (or precoded signals having switched basebands), version #2 |
| | 10 | change in phas on precoded signals (or precoded signals having switched basebands), version #3 |
| | 11 | change in phase on precoded signals (or precoded signals having switched basebands), version #4 |

As indicated in Table 4, four types of control information are possible: 1-bit PLP_MODE information, 1-bit MIMO_MODE information, 2-bit MIMO_PATTERN #1 information, and 2-bit MIMO_PATTERN #2 information. As shown in FIG. 77, the terminal is notified of the transmission method for each PLP (namely PLP #1 through #4) by this information. The four types of control information are present in each PLP. That is, in FIG. 77, the PLP_MODE information, MIMO_MODE information, MIMO_PATTERN #1 information, and MIMO_PATTERN #2 information for PLP #1, for PLP #2, for PLP #3, for PLP #4, and so on, is transmitted by the broadcaster. Naturally, the terminal acknowledges the transmission method used by the broadcaster for the PLPs by demodulating (or by performing error-correcting decoding on) this information.

When the PLP_MODE is set to 0, data are transmitted by that PLP using a method in which a single modulated signal is transmitted. When the PLP_MODE is set to 1, data are transmitted by that PLP using a method in which any one of the following applies: (i) space-time block codes are used; (ii) a MIMO system is used where a change in phase is performed on precoded (or precoded and switched) signals; (iii) a MIMO system is used where a fixed precoding matrix is used; and (iv) spatial multiplexing is used.

When the PLP_MODE is set to 1, the MIMO_MODE information is valid. When the MIMO_MODE information is set to 0, data are transmitted without using a change in phase performed on precoded (or precoded and switched) signals. When the MIMO_MODE information is set to 1, data are transmitted using a change in phase performed on precoded (or precoded signals having switched basebands).

When the PLP_MODE is set to 1 and the MIMO_MODE information is set to 0, the MIMO_PATTERN #1 information is valid. When the MIMO_PATTERN #1 information is set to 00, data are transmitted using space-time block codes. When the MIMO_PATTERN #1 information is set to 01, data are transmitted using fixed precoding matrix #1 for weighting. When the MIMO_PATTERN #1 information is set to 10, data are transmitted using fixed precoding matrix #2 for weighting. (Precoding matrix #1 and precoding matrix #2 are different matrices.) When the MIMO_PATTERN #1 information is set to 11, data are transmitted using spatial multiplexing MIMO.

When the PLP_MODE is set to 1 and the MIMO_MODE information is set to 1, the MIMO_PATTERN #2 information is valid. When the MIMO_PATTERN #2 information is set to 00, data are transmitted using version #1 of a change in phase on precoded (or precoded signals having switched basebands). When the MIMO_PATTERN #2 information is set to 01, data are transmitted using version #2 of a change in phase on precoded (or precoded signals having switched basebands). When the MIMO_PATTERN #2 information is set to 10, data are transmitted using version #3 of a change in phase on precoded (or precoded signals having switched basebands). When the MIMO_PATTERN #2 information is set to 11, data are transmitted using version #4 of a change in phase on precoded (or precoded signals having switched basebands). Although the change in phase is performed in four different versions #1 through 4, the following three approaches are possible, given two different methods #A and #B:

Phase changes performed using method #A and performed using method #B include identical and different changes.
A phase changing value included in method #A is not included in method #B; and
Multiple phase changes used in method #A are not included in method #B.

Figure 78:
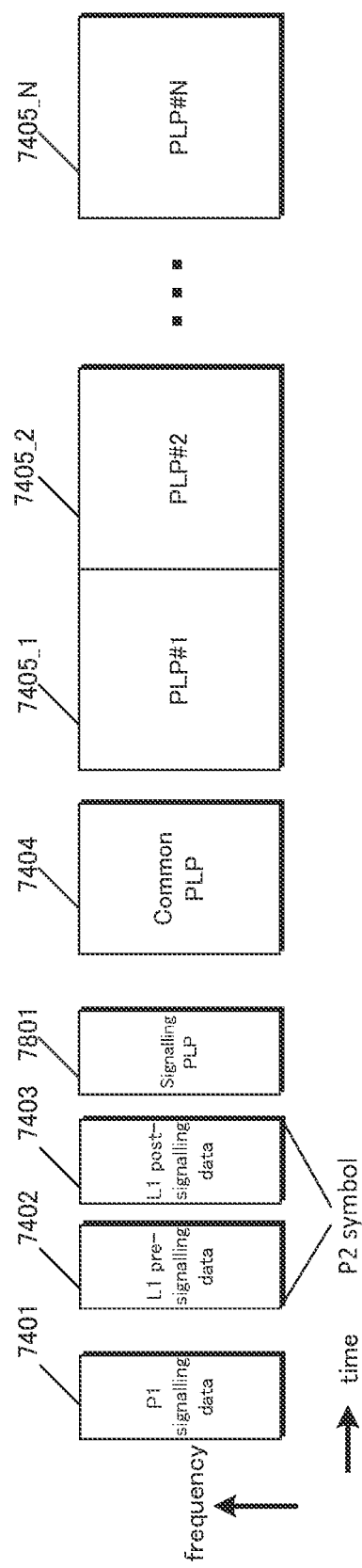
FIG. 78 illustrates another alternate sample frame configuration.

The control information listed in Table 3 and Table 4, above, is transmitted by the L1 post-signalling data in the P2 symbol. However, in the DVB-T2 standard, the amount of information transmittable as a P2 symbol is limited. Accordingly, the information listed in Tables 3 and 4 is added to the information transmitted by the P2 symbol in the DVB-T2 standard. When this leads to exceeding the limit on information transmittable as the P2 symbol, then as shown in FIG. 78, a signalling PLP (7801) may be prepared in order to transmit necessary control information (at least partially, i.e., transmitting the L1 post-signalling data and the signalling PLP) not included in the DVB-T2 specification. While FIG. 78 illustrates a frame configuration identical to that of FIG. 74, no limitation is intended in this regard. A specific time and specific carrier region may also be allocated in the time-frequency domain for the signalling PLP, as in FIG. 75. That is, the signalling PLP may be freely allocated in the time-frequency domain.

As described above, selecting a transmission method that uses a multi-carrier method such as OFDM and preserves compatibility with the DVB-T2 standard, and in which the change in phase is performed on precoded (or precoded and switched) signals has the merits of leading to better reception quality in the LOS environment and to greater transmission speeds. While the present invention describes the possible transmission methods for the carriers as being spatial multiplexing MIMO, MIMO using a fixed precoding matrix, a transmission method performing a change of phase on precoded (or on precoded and switched) signals, space-time block codes, and transmission methods transmitting only stream s1, no limitation is intended in this manner.

Also, although the description indicates that the broadcaster selects one of the aforementioned transmission methods, these are not the only transmission methods available for selection. Other options include:

MIMO using a fixed precoding matrix, a transmission method performing a change of phase on precoded (or on precoded and switched) signals, space-time block codes, and transmission methods transmitting only stream s1;
MIMO using a fixed precoding matrix, a transmission method performing a change of phase on precoded (or on precoded and switched) signals, and space-time block codes;
MIMO using a fixed precoding matrix, a transmission method performing a change of phase on precoded (or on precoded and switched) signals, and transmission methods transmitting only stream s1;
A transmission method performing a change of phase on precoded (or on precoded and switched) signals, space-time block codes, and transmission methods transmitting only stream s1;
MIMO using a fixed precoding matrix and a transmission method performing a change of phase on precoded (or on precoded and switched) signals; A transmission method performing a change of phase on precoded (or on precoded and switched) signals and space-time block codes;
A transmission method performing a change of phase on precoded (or on precoded and switched) signals and transmission methods transmitting only stream s1.
As such, by including a transmission method performing a change of phase on precoded (or on precoded and switched) signals, the merits of leading to greater data transmission speeds in the LOS environment and better reception quality for the reception device are achieved.

Here, given that, as described above, S1 needs to be set for the P1 symbol, another configuration method for the control information (regarding the transmission method for each PLP), different from that of Table 3, is possible. For example, Table 5, below.

TABLE 5

| PLP_MODE (2-bit) | Control Information |
| --- | --- |
| 00 | SISO/SIMO |
| 01 | MISO/MIMO (space-time block codes) |
| 10 | MIMO (change in phase on precoded signals (or precoded signals having switched basebands)) |
| 11 | Reserved |

Table 5 differs from Table 3 in that setting the PLP_MODE information to 11 is reserved. As such, when the transmission method for the PLPs is as described in one of the above examples, the number of bits forming the PLP_MODE information as in the examples of Tables 3 and 5 may be made greater or smaller according to the transmission methods available for selection.

Similarly, for Table 4, when, for example, a MIMO method is used with a transmission method that does not support changing the phase of precoded signals (or precoded signals having switched basebands), the MIMO_MODE control information is not necessary. Also, when, for example, MIMO schemes using a fixed precoding matrix are not supported, then the MIMO_PATTERN #1 is not necessary. Also, when multiple precoding matrices are not necessary, 1-bit information may be used instead of 2-bit information. Furthermore, two or more bits may be used when a plurality of precoding matrices are available.

The same principles apply to the MIMO_PATTERN #2 information. When the transmission method does not require a plurality of methods of performing a change of phase on precoded (or precoded and switched) signals, 1-bit information may be used instead of 2-bit information. Furthermore, two or more bits may be used when a plurality of phase changing schemes are available.

Furthermore, although the present Embodiment describes a transmission device having two antennas, no limitation is intended in this regard. The control information may also be transmitted using more than two antennas. In such circumstances, the number of bits in each type of control information may be increased as required in order to realize transmission using four antennas. The above description control information transmission in the P1 and P2 symbol also applies to such cases.

While FIG. 77 illustrates the frame configuration for the PLP symbol groups transmitted by the broadcaster as being divided with respect to the time domain, the following variation is also possible.

Figure 79:
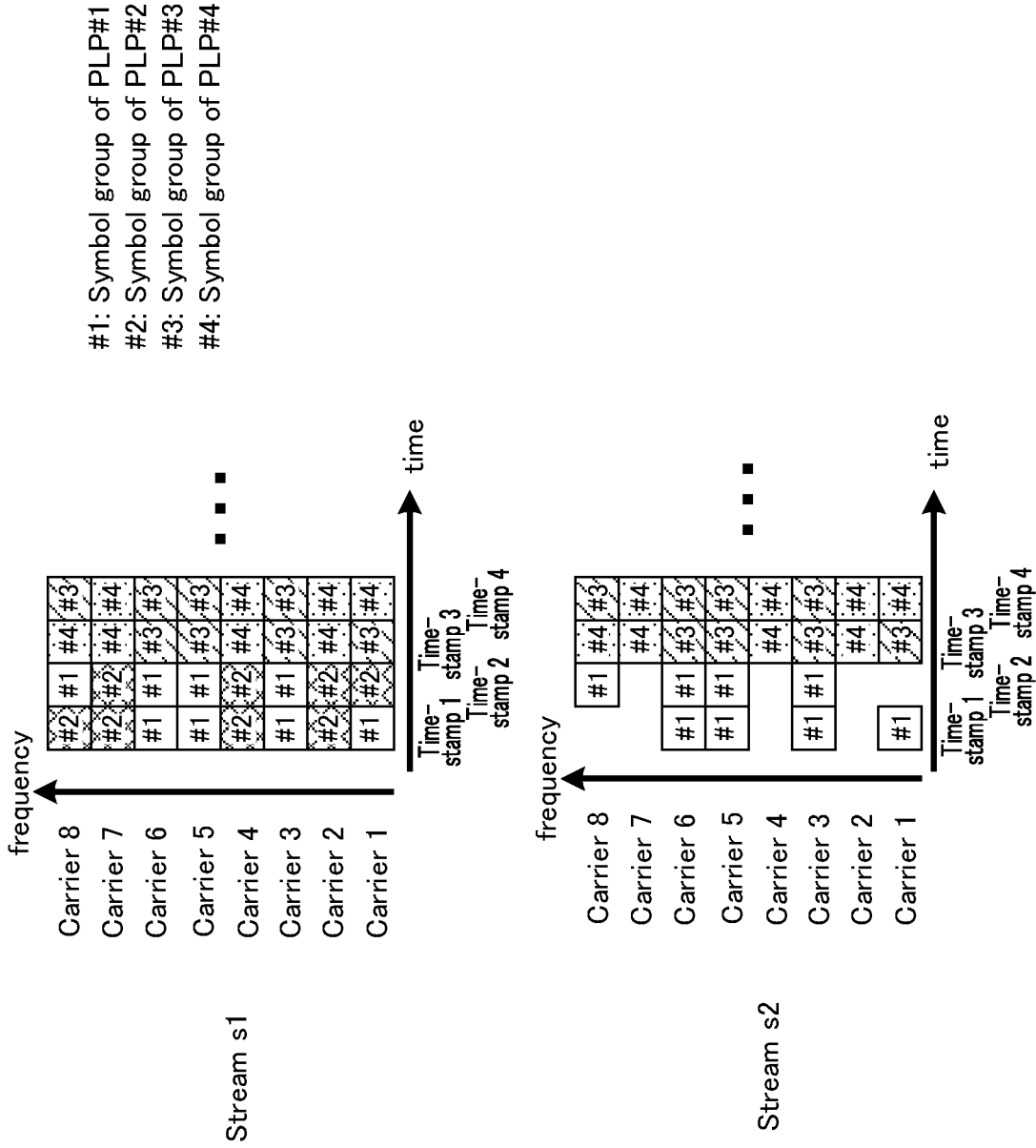
FIG. 79 illustrates a further alternate sample frame configuration.

Unlike FIG. 77, FIG. 79 illustrates an example of a method for arranging the symbols stream s1 and stream 2 in the time-frequency domain, after the P1 symbol, the P2 symbol, and the Common PLP have been transmitted. In FIG. 79, the symbols labelled #1 are symbols of the symbol group of PLP #1 from FIG. 77. Similarly, the symbols labelled #2 are symbols of the symbol group of PLP #2, the symbols labelled #3 are symbols of the symbol group of PLP #3, and the symbols labelled #4 are symbols of the symbol group of PLP #4, all from FIG. 77. As in FIG. 77, PLP #1 is used to transmit data using a spatial multiplexing MIMO system as illustrated by FIG. 23, or by using a MIMO system with a fixed precoding matrix. PLP #2 is used to transmit data using only one modulated signal. PLP #3 is used to transmit data using a transmission method in which a change in phase is performed on precoded (or precoded and switched) signals. PLP #4 is used to transmit data using space-time block codes.

In FIG. 79, when both s1 and s2 have a symbol on the same sub-carrier (given as carrier in FIG. 79) at the same timestamp, a symbol from each of the two streams is present at the common frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As described above, FIG. 79 differs from FIG. 77 in that the PLPs are divided with respect to the time domain. In addition, FIG. 79 has a plurality of PLPs arranged with respect to the time and frequency domains. That is, for example, the symbols of PLP #1 and PLP #2 are at timestamp 1, while the symbols of PLP #3 and PLP #4 are at timestamp 3. As such, PLP symbols having a different index (#X, where X=1, 2, and so on) may be allocated to each symbol (made up of a timestamp and a sub-carrier).

Although, for the sake of simplicity, FIG. 79 lists only #1 and #2 at timestamp 1, no limitation is intended in this regard. Indices of PLP symbols other than #1 and #2 may be at timestamp #1. Furthermore, the relationship between PLP indices and sub-carriers at timestamp 1 is not limited to that illustrated by FIG. 79. The indices of any PLP symbols may be assigned to any sub-carrier. The same applies to other timestamps, in that the indices of any PLP symbols may be assigned thereto.

Figure 80:
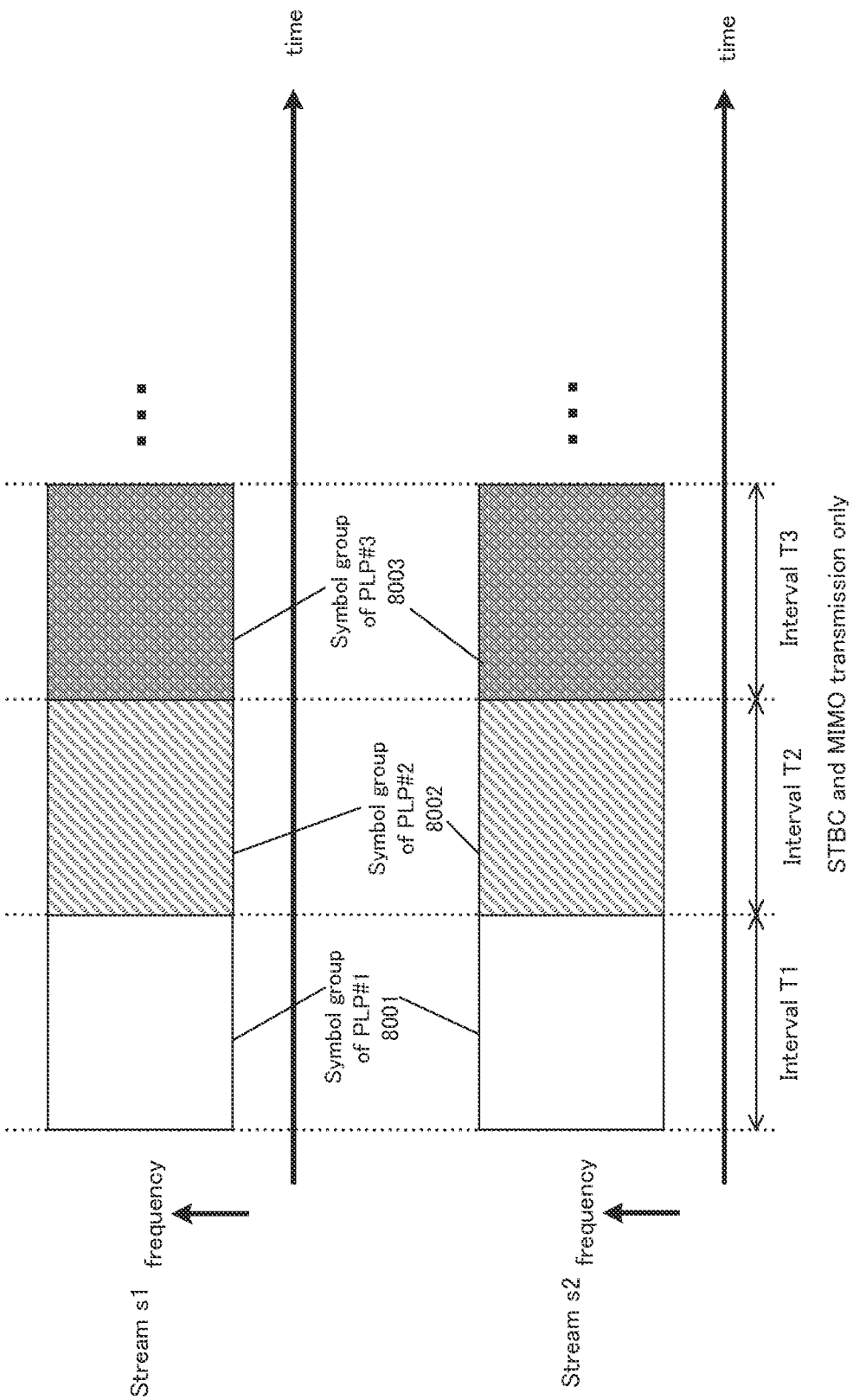
FIG. 80 illustrates yet a further alternate sample frame configuration.

Unlike FIG. 77, FIG. 80 illustrates an example of a method for arranging the symbols stream s1 and stream 2 in the time-frequency domain, after the P1 symbol, the P2 symbol, and the Common PLP have been transmitted. The characteristic feature of FIG. 80 is that, assuming that using a plurality of antennas for transmission is the basis of the PLP transmission method, then transmission using only stream 1 is not an option for the T2 frame.

Accordingly, in FIG. 80, PLP symbol group 8001 transmits data using a spatial multiplexing MIMO system, or a MIMO system using a fixed precoding matrix. Also, symbol group 8002 of PLP #2 transmits data using a transmission method performing a change of phase on precoded (or on precoded and switched) signals. Further, symbol group 8003 of PLP #3 transmits data using space-time block code. PLP symbol groups following symbol group 8003 of PLP #3 transmit data using one of these methods, namely using a spatial multiplexing MIMO system, or a MIMO system using a fixed precoding matrix, using a transmission method performing a change of phase on precoded (or on precoded and switched) signals, or using space-time block codes.

Figure 81:
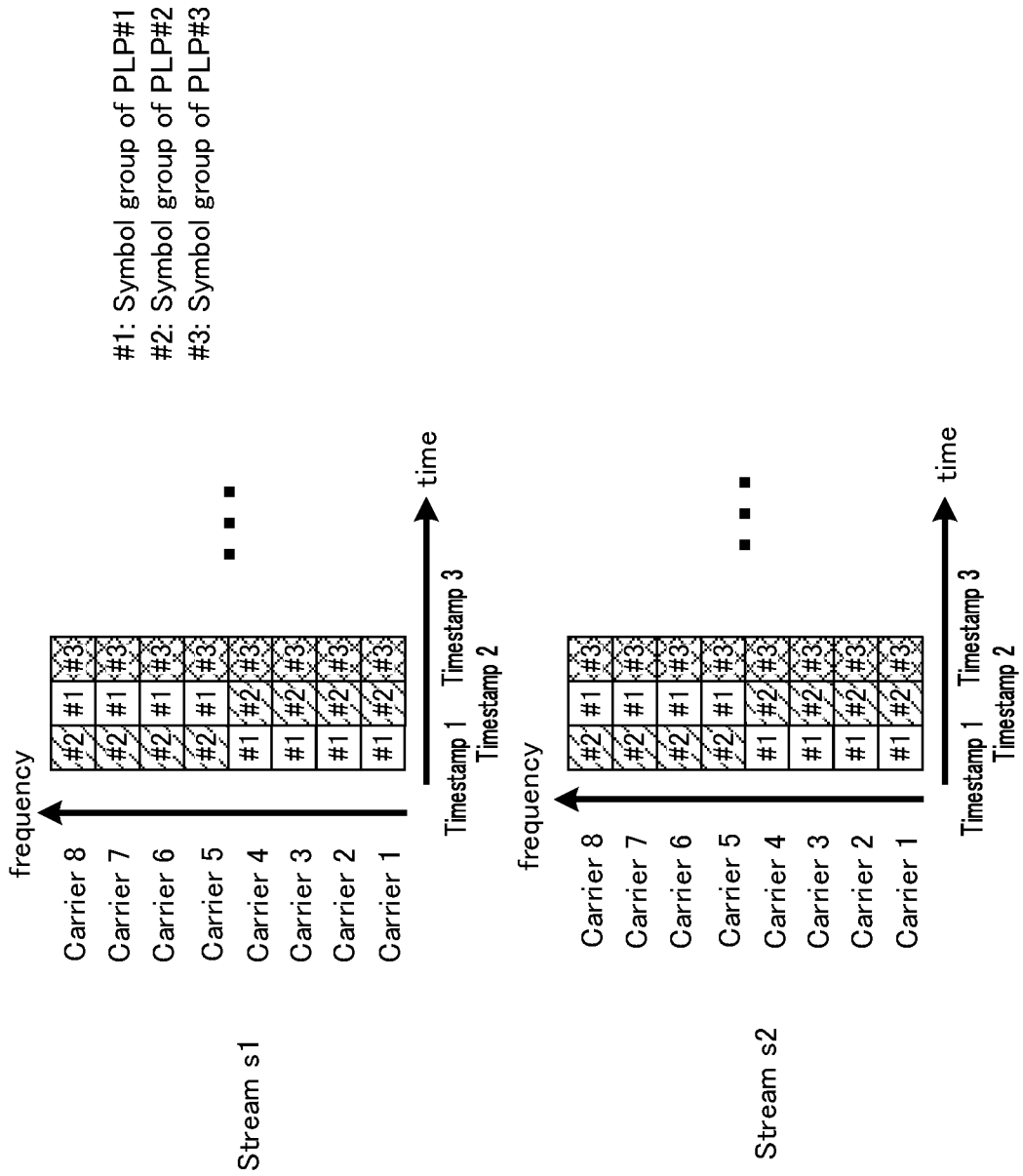
FIG. 81 illustrates yet another alternate sample frame configuration.

Unlike FIG. 79, FIG. 81 illustrates an example of a method for arranging the symbols stream s1 and stream 2 in the time-frequency domain, after the P1 symbol, the P2 symbol, and the Common PLP have been transmitted. In FIG. 81, the symbols labelled #1 are symbols of the symbol group of PLP #1 from FIG. 80. Similarly, the symbols labelled #2 are symbols of the symbol group of PLP #2, the symbols labelled #3 are symbols of the symbol group of PLP #3, and the symbols labelled #4 are symbols of the symbol group of PLP #4, all from FIG. 80. As in FIG. 80, PLP #1 is used to transmit data using a spatial multiplexing MIMO system as illustrated by FIG. 23, or by using a MIMO system with a fixed precoding matrix. PLP #2 is used to transmit data using a transmission method in which a change of phase is performed on precoded (or precoded and switched) signals. PLP #3 is used to transmit data using space-time block codes.

In FIG. 81, when both s1 and s2 have a symbol on the same sub-carrier (given as carrier in FIG. 81) at the same timestamp, a symbol from each of the two streams is present at the common frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

FIG. 81 differs from FIG. 80 in that the PLPs are divided with respect to the time and frequency domains. That is, for example, the symbols of PLP #1 and of PLP #2 are both at timestamp 1. As such, PLP symbols having a different index (#X, where X=1, 2, and so on) may be allocated to each symbol (made up of a timestamp and a sub-carrier).

Although, for the sake of simplicity, FIG. 81 lists only #1 and #2 at timestamp 1, no limitation is intended in this regard. Indices of PLP symbols other than #1 and #2 may be at timestamp #1. Furthermore, the relationship between PLP indices and sub-carriers at timestamp 1 is not limited to that illustrated by FIG. 81. The indices of any PLP symbols may be assigned to any sub-carrier. The same applies to other timestamps, in that the indices of any PLP symbols may be assigned thereto. On the other hand, one timestamp may also have symbols of only one PLP assigned thereto, as is the case for timestamp 3. In other words, any assignment of PLP symbols in the time-frequency domain is allowable.

Thus, given that the T2 frame includes no PLPs using transmission methods transmitting only stream s1, the dynamic range of the signals received by the terminal may be constrained, which is likely to lead to improved received signal quality.

Although FIG. 81 is described using examples of selecting one of transmitting data using a spatial multiplexing MIMO system, or a MIMO system using a fixed precoding matrix, transmitting data using a transmission method performing a change of phase on precoded (or on precoded and switched) signals, and transmitting data using space-time block codes, the selection of transmission method is not limited as such. Other possibilities include:

selecting one of transmitting data using a transmission method performing a change of phase on precoded (or on precoded and switched) signals, transmitting data using space-time block codes, and transmitting data using a MIMO system using a fixed precoding matrix;

selecting one of transmitting data using a transmission method performing a change of phase on precoded (or on precoded and switched) signals, and transmitting data using space-time block codes; and selecting one of transmitting data using a transmission method performing a change of phase on precoded (or on precoded and switched) signals and transmitting data using a MIMO system using a fixed precoding matrix.

While the above explanation is given for a T2 frame having multiple PLPs, the following describes a T2 frame having only one PLP.

Figure 82:
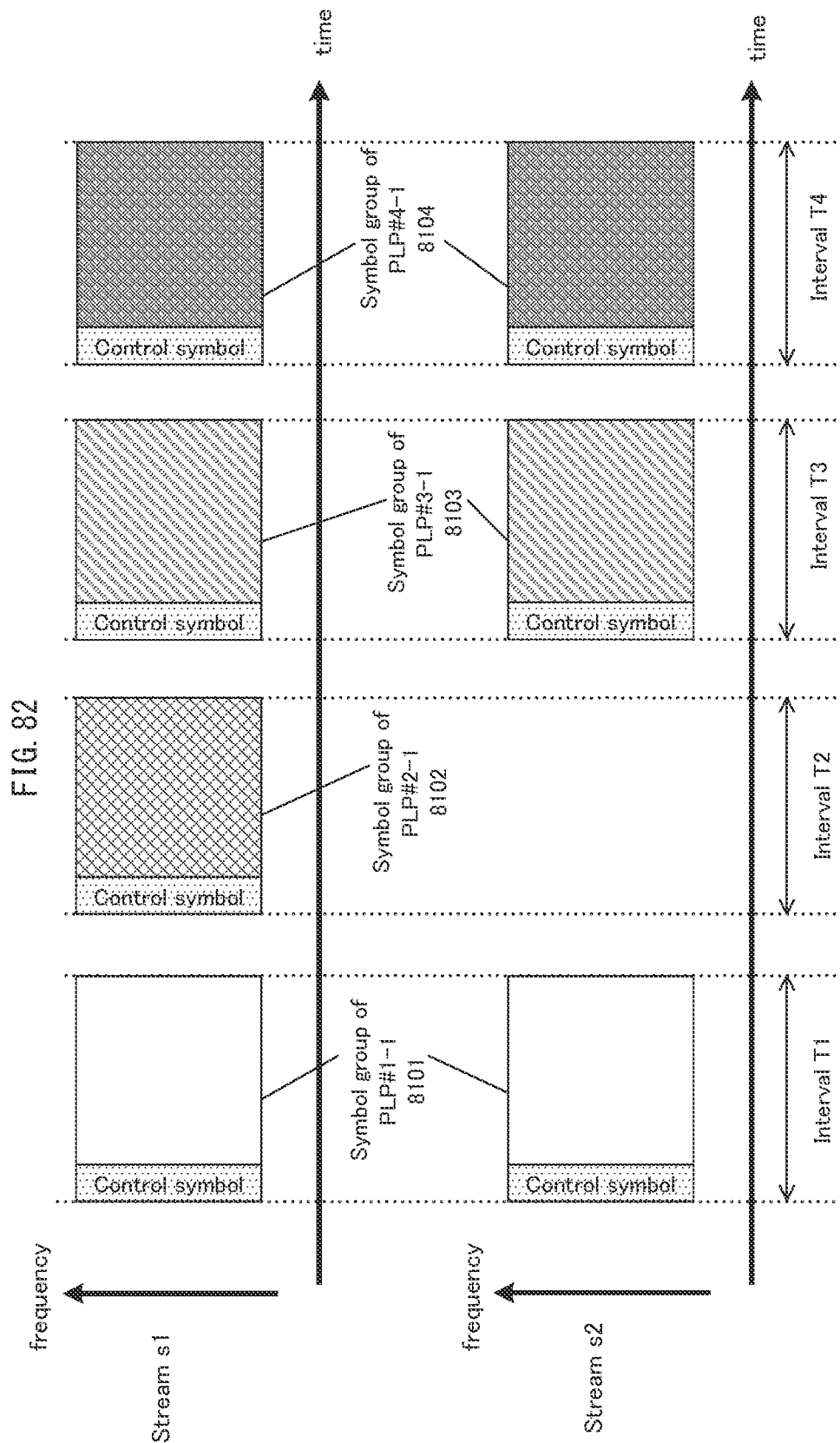
FIG. 82 illustrates still another alternate sample frame configuration.

FIG. 82 illustrates a sample frame configuration for stream s1 and stream s2 in the time-frequency domain where the T2 frame has only one PLP. Although FIG. 82 indicates control symbols, these are equivalent to the above-described symbols, such as P1 and P2 symbols. In FIG. 82, interval 1 is used to transmit a first T2 frame, interval 2 is used to transmit a second T2 frame, interval 3 is used to transmit a third T2 frame, and interval 4 is used to transmit a fourth T2 frame.

Furthermore, the first T2 frame in FIG. 82 transmits symbol group 8101 of PLP #1-1. The selected transmission method is spatial multiplexing MIMO or MIMO using a fixed precoding matrix.

The second T2 frame transmits symbol group 8102 of PLP #2-1. The transmission method is transmission using a single modulated signal.

The third T2 frame transmits symbol group 8103 of PLP #3-1. The transmission method is transmission performing a change of phase on precoded (or on precoded and switched) signals.

The fourth T2 frame transmits symbol group 8104 of PLP #4-1. The transmission method is transmission using space-time block codes.

In FIG. 82, when both s1 and s2 have a symbol on the same sub-carrier at the same timestamp, a symbol from each of the two streams is present at the common frequency. As explained in other Embodiments, when using a transmission method that involves performing a change of phase on precoded signals (or precoded signals having switched basebands), the change in phase may be performed in addition to weighting using the precoding matrix (and, where applicable, after switching the baseband signal). Accordingly, signals z1 and z2 are obtained. The signals z1 and z2 are each output by a different antenna.

As such, the transmission method may be set by taking the data transmission speed and the data reception speed of the terminal into consideration for each PLP. This has the dual merits of allowing the data transmission speed to be enhanced and ensuring high data reception quality. The configuration method for the control information pertaining to the transmission method and so on for the P1 and P2 symbols (and the signalling PLP, where applicable) may be as given by Tables 2 through 5, thus obtaining the same effects. FIG. 82 differs from FIG. 77 in that, while the frame configuration from FIG. 77 and the like includes multiple PLPs in a single T2 frame, thus necessitating control information pertaining to the transmission method and so on of each PLP, the frame configuration of FIG. 82 includes only one PLP per T2 frame. As such, the only control information needed is for the transmission information and so on pertaining the one PLP.

Although the above description discusses methods of transmitting information pertaining to the transmission method of PLPs using P1 and P2 symbols (and the signalling PLP, where applicable), the following describes a method of transmitting information pertaining to the transmission method of PLPs without using the P2 symbol.

Figure 83:
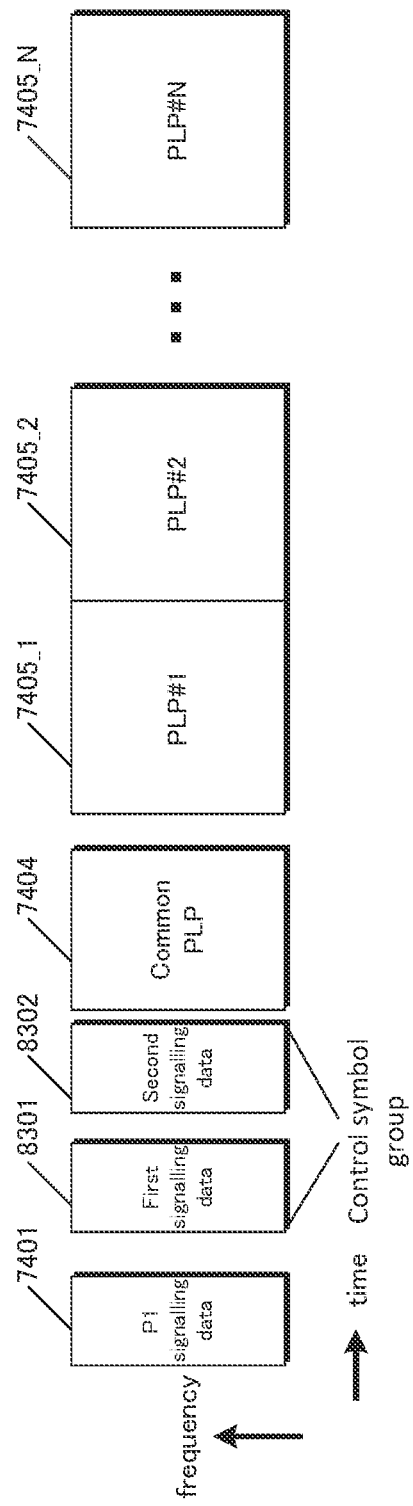
FIG. 83 illustrates still a further alternate sample frame configuration.

FIG. 83 illustrates a frame configuration in the time-frequency domain applicable when a terminal receiving data transmitted by a broadcaster is not compatible with the DVB-T2 standard. In FIG. 83, components operating in the manner described for FIG. 74 use identical reference numbers. The frame of FIG. 83 includes P1 signalling data (7401), first signalling data (8301), second signalling data (8302), a common PLP (7404), and PLPs #1 through #N (7405_1 through 7405_N). As such, the P1 signalling data (7401), the first signalling data (8301), the second signalling data (8302), the common PLP (7404), and the PLPs #1 through #N (7405_1 through 7405_N) form a frame, thus constituting a frame unit.

The P1 signalling data (7401) are a symbol used for signal reception by the reception device and for frequency synchronization (including frequency offset estimation). In addition, these data transmit identification regarding whether or not the frame conforms to the DVB-T2 standard, e.g., using the S1 data as indicated in Table 2 for this purpose.

The first signalling data (8301) are used to transmit information regarding the methods used to transmit the frame, concerning the guard interval, the signal processing method information used to reduce the PAPR, the modulation scheme used to transmit the L1 post-signalling data, the FEC method, the coding rate thereof, the length and size of the L1 post-signalling data, them the payload pattern, the cell (frequency region)-specific numbers, and whether normal mode or extended mode is in use, and other such information. Here, the first signalling data (8301) need not necessarily be data conforming to the DVB-T2 standard.

The second signalling data (8302) is used to transmit such information as the number of PLPs, the frequency region in use, the PLP-specific numbers, the modulation scheme used to transmit the PLPs, the FEC method, the coding rate thereof, the number of blocks transmitted by each PLP, and so on.

Figure 84:
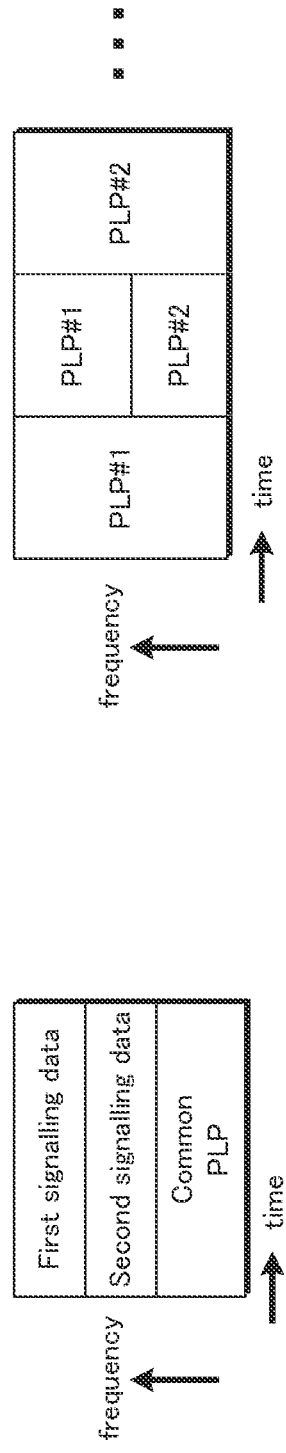
FIG. 84 further illustrates two or more types of signals at the same timestamp.

The frame configuration from FIG. 83 illustrates the first signalling data (8301), the second signalling data (8302), the L1 post-signalling data (7403), the common PLP (7404), and the PLPs #1 through #N (7405_1 through 7405_N) divided with respect to the time domain for transmission. However, two or more of these signals may occur simultaneously. FIG. 84 illustrates such a case. As shown in FIG. 84, the first signalling data, the second signalling data, and the common PLP share a common timestamp, while PLP #1 and PLP #2 share a different common timestamp. That is, each signal may coexist at the same point with respect to the time or frequency domain within the frame configuration.

Figure 85:
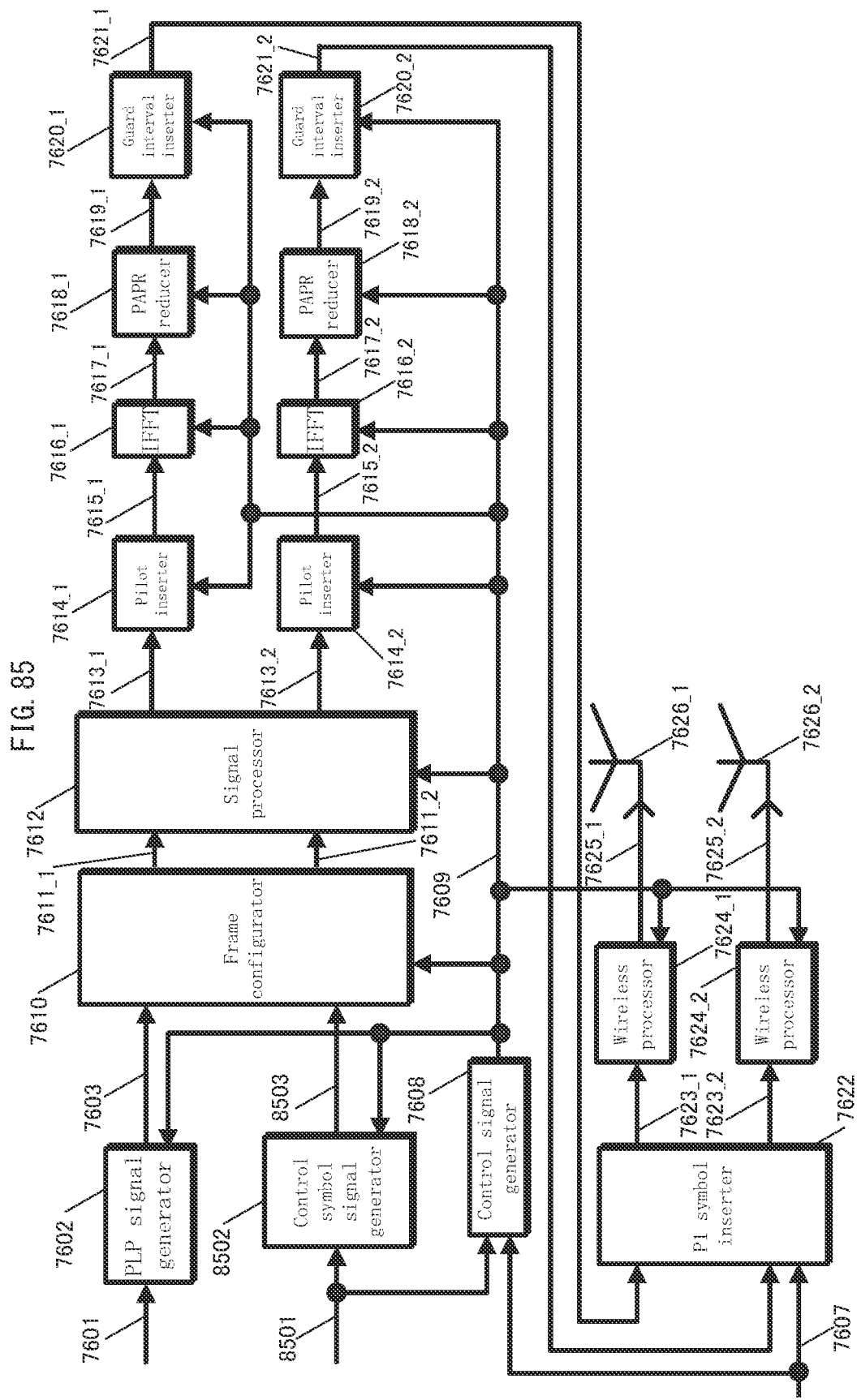
FIG. 85 illustrates an alternate sample configuration of a transmission device.

FIG. 85 illustrates a sample configuration of a transmission device (e.g., a broadcaster) applying a transmission method in which a change in phase is performed on precoded (or precoded and switched) signals as explained thus far, but conforming to a standard other than the DVB-T2 standard. In FIG. 85, components operating in the manner described for FIG. 76 use identical reference numbers and invoke the above descriptions.

A control signal generator 7608 takes first and second signalling data 8501 and P1 symbol transmit data 7607 as input, and outputs the control signal 7609 (made up of such information as the error-correcting codes and coding rate therefor, the modulation scheme, the block length, the frame configuration, the selected transmission method in which the precoding matrix is regularly changed, the pilot symbol insertion method, IFFT/FFT information, the PAPR reduction method, and the guard interval insertion method) for the transmission method of each symbol group of FIG. 83.

A control symbol signal generator 8502 takes the first and second signalling data transmit data 8501 and the control signal 7609 as input, performs error-correcting coding according to the error-correcting code information for the first and second signalling data included in the control signal 7609 and performs mapping according to the modulation scheme similarly included in the control signal 7609, and then outputs a first and second signalling data (quadrature) baseband signal 8503.

In FIG. 85, the frame configurator 7610 takes the baseband signal 8503 generated by the control symbol signal generator 8502 as input, rather than the baseband signal 7606 generated by the P2 symbol signal generator 7605 from FIG. 76.

The following describes, with reference to FIG. 77, a transmission method for control information (information transmitted by the P1 symbol and by the first and second signalling data) and for the frame configuration of the transmit signal for a broadcaster (base station) applying a transmission method in which a change in phase is performed on precoded (or on precoded and switched) signals in a system not conforming to the DVB-T2 standard.

FIG. 77 illustrates a sample frame configuration in the time-frequency domain where a plurality of PLPs are transmitted after the first and second signalling data and the Common PLP have been transmitted. In FIG. 77, stream s1 uses sub-carrier #1 through sub-carrier #M in the frequency domain. Similarly, stream s2 also uses sub-carrier #1 through sub-carrier #M in the frequency domain. Accordingly, when both s1 and s2 have a symbol on the same sub-carrier at the same timestamp, a symbol from each of the two streams is present at a single frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As shown in FIG. 77, interval 1 is used to transmit symbol group 7701 of PLP #1 using stream s1 and stream s2. Data are transmitted using a spatial multiplexing MIMO system as illustrated by FIG. 23, or by using a MIMO system with a fixed precoding matrix.

Interval 2 is used to transmit symbol group 7702 of PLP #2 using stream s1. Data are transmitted using one modulated signal.

Interval 3 is used to transmit symbol group 7703 of PLP #3 using stream s1 and stream s2. Data are transmitted using a transmission method in which a change in phase is performed on precoded (or precoded and switched) signals.

Interval 4 is used to transmit symbol group 7704 of PLP #4 using stream s1 and stream s2. Data are transmitted using the time-space block codes.

When a broadcaster transmits PLPs as illustrated by FIG. 77, the reception device from FIG. 64 receiving the transmit signals needs to know the transmission method of each PLP. Accordingly, as described above, the first and second signalling data are used to transmit the transmission method for each PLP. The following describes an example of a configuration method for the P1 symbol and for the first and second signalling data in such circumstances. A specific example of control information carried by the P1 symbol is given in Table 2.

In the DVB-T2 standard, S1 control information (three bits of data) is used by the reception device to determine whether or not DVB-T2 is being used, and in the affirmative case, to determine the transmission method. The 3-bit S1 data are set to 000 to indicate that the modulated signals being transmitted conform to transmission of one modulated signal in the DVB-T2 standard.

Alternatively, the 3-bit S1 data are set to 001 to indicate that the modulated signals being transmitted conform to the use of time-space block codes in the DVB-T2 standard.

In DVB-T2, 010 through 111 are reserved for future use. In order to apply the present invention while maintaining compatibility with DVB-T2, the 3-bit S1 data should be set to 010, for example (anything other than 000 and 001 may be used), and should indicate that a standard other than DVB-T2 is being used for the modulated signals. Thus, the reception device or terminal is able to determine that the broadcaster is transmitting using modulated signals conforming to a standard other than DVB-T2 by detecting that the data read 010.

The following describes a configuration method for the first and second signalling data used when the modulated signals transmitted by the broadcaster do not conform to the DVB-T2 standard. A second example of control information for the first and second signalling data is given by Table 3.

The two-bit data listed in Table 3 are the PLP_MODE information. As shown in FIG. 77, this information is control information for informing the terminal of the transmission method for each PLP (PLP #1 through #4 in FIG. 77). The PLP_MODE information is present in each PLP. That is, in FIG. 77, the PLP_MODE information for PLP #1, for PLP #2, for PLP #3, for PLP #4, and so on, is transmitted by the broadcaster. Naturally, the terminal acknowledges the transmission method used by the broadcaster for the PLPs by demodulating (or by performing error-correcting decoding on) this information.

When the PLP_MODE is set to 00, data are transmitted by that PLP using a method in which a single modulated signal is transmitted. When the PLP_MODE is set to 01, data are transmitted by that PLP using a method in which multiple modulated signals are transmitted using space-time block codes. When the PLP_MODE is set to 10, data are transmitted by that PLP using a method in which a change in phase is performed on precoded (or precoded and switched) signals. When the PLP_MODE is set to 11, data are transmitted by that PLP using a method in which a fixed precoding matrix is used, or in which a spatial multiplexing MIMO system, is used.

When the PLP_MODE is set to any of 01 through 11, the broadcaster must transmit the specific processing (e.g., the specific transmission method by which a change in phase is applied to precoded (or precoded and switched) signals, the encoding method of time-space block codes, or the configuration of the precoding matrix) to the terminal. The following describes an alternative to Table 3, as a configuration method for control information that includes the control information necessitated by such circumstances.

A second example of control information for the first and second signalling data is given by Table 4.

As indicated in Table 4, four types of control information are possible: 1-bit PLP_MODE information, 1-bit MIMO_MODE information, 2-bit MIMO_PATTERN #1 information, and 2-bit MIMO_PATTERN #2 information. As shown in FIG. 77, the terminal is notified of the transmission method for each PLP (namely PLP #1 through #4) by this information. The four types of control information are present in each PLP. That is, in FIG. 77, the PLP_MODE information, MIMO_MODE information, MIMO_PATTERN #1 information, and MIMO_PATTERN #2 information for PLP #1, for PLP #2, for PLP #3, for PLP #4, and so on, is transmitted by the broadcaster. Naturally, the terminal acknowledges the transmission method used by the broadcaster for the PLPs by demodulating (or by performing error-correcting decoding on) this information.

When the PLP_MODE is set to 0, data are transmitted by that PLP using a method in which a single modulated signal is transmitted. When the PLP_MODE is set to 1, data are transmitted by that PLP using a method in which any one of the following applies: (i) space-time block codes are used; (ii) a MIMO system is used where a change in phase is performed on precoded (or precoded and switched) signals; (iii) a MIMO system is used where a fixed precoding matrix is used; and (iv) spatial multiplexing is used.

When the PLP_MODE is set to 1, the MIMO_MODE information is valid. When the MIMO_MODE information is set to 0, data are transmitted without using a change in phase performed on recoded signals (or precoded signals having switched basebands). When the MIMO_MODE information is set to 1, data are transmitted using a change in phase performed on recoded signals (or precoded signals having switched basebands).

When the PLP_MODE information is set to 1 and the MIMO_MODE information is set to 0, the MIMO_PATTERN #1 information is valid. As such, when the MIMO_PATTERN #1 information is set to 00, data are transmitted using space-time block codes. When the MIMO_PATTERN #1 information is set to 01, data are transmitted using fixed precoding matrix #1 for weighting. When the MIMO_PATTERN #1 information is set to 10, data are transmitted using fixed precoding matrix #2 for weighting. (Precoding matrix #1 and precoding matrix #2 are different matrices.) When the MIMO_PATTERN #1 information is set to 11, data are transmitted using spatial multiplexing MIMO.

When the PLP_MODE information is set to 1 and the MIMO_MODE information is set to 1, the MIMO_PATTERN #2 information is valid. When the MIMO_PATTERN #2 information is set to 00, data are transmitted using version #1 of a change in phase on precoded (or precoded and switched) signals. When the MIMO_PATTERN #2 information is set to 01, data are transmitted using version #2 of a change in phase on precoded (or precoded signals having switched basebands). When the MIMO_PATTERN #2 information is set to 10, data are transmitted using version #3 of a change in phase on precoded (or precoded signals having switched basebands). When the MIMO_PATTERN #2 information is set to 11, data are transmitted using version #4 of a change in phase on precoded (or precoded signals having switched basebands). Although the change in phase is performed in four different versions #1 through 4, the following three approaches are possible, given two different methods #A and #B:

Phase changes performed using method #A and performed using method #B include identical and different changes.

Some phase changing values are included in method #A but are not included in method #B; and Multiple phase changes used in method #A are not included in method #B.

The control information listed in Table 3 and Table 4, above, is transmitted by the first and second signalling data. In such circumstances, there is no particular need to use the PLPs to transmit the control information.

As described above, selecting a transmission method that uses a multi-carrier method such as OFDM while being identifiable as differing from the DVB-T2 standard, and in which a change of phase is performed on precoded (or precoded and switched) signals has the merits of leading to better reception quality in the LOS environment and to greater transmission speeds. While the present invention describes the possible transmission methods for the carriers as being spatial multiplexing MIMO, MIMO using a fixed precoding matrix, a transmission method performing a change of phase on precoded (or on precoded and switched) signals, space-time block codes, and transmission methods transmitting only stream s1, no limitation is intended in this manner.

Also, although the description indicates that the broadcaster selects one of the aforementioned transmission methods, these are not the only transmission methods available for selection. Other options include:

MIMO using a fixed precoding matrix, a transmission method performing a change of phase on precoded (or on precoded and switched) signals, space-time block codes, and transmission methods transmitting only stream s1;

MIMO using a fixed precoding matrix, a transmission method performing a change of phase on precoded (or on precoded and switched) signals, and space-time block codes;

MIMO using a fixed precoding matrix, a transmission method performing a change of phase on precoded (or on precoded and switched) signals, and transmission methods transmitting only stream s1;

A transmission method performing a change of phase on precoded (or on precoded and switched) signals, space-time block codes, and transmission methods transmitting only stream s1;

MIMO using a fixed precoding matrix and a transmission method performing a change of phase on precoded (or on precoded and switched) signals;

A transmission method performing a change of phase on precoded (or on precoded and switched) signals and space-time block codes; and A transmission method performing a change of phase on precoded (or on precoded and switched) signals and transmission methods transmitting only stream s1.

As such, by including a transmission method performing a change of phase on precoded (or on precoded and switched) signals, the merits of leading to greater data transmission speeds in the LOS environment and better reception quality for the reception device are achieved.

Here, given that, as described above, the S1 data is set for the P1 symbol, another configuration method for the control information (regarding the transmission method for each PLP) transmitted as the first and second signalling data, different from that of Table 3, is possible. For example, see Table 5, above.

Table 5 differs from Table 3 in that setting the PLP_MODE information to 11 is reserved. As such, when the transmission method for the PLPs is as described in one of the above examples, the number of bits forming the PLP_MODE information as in the examples of Tables 3 and 5 may be made greater or smaller according to the transmission methods available for selection.

Similarly, for Table 4, when, for example, a MIMO method is used with a transmission method that does not support changing the phase of precoded (or precoded and switched) signals, the MIMO_MODE control information is not necessary. Also, when, for example, MIMO schemes using a fixed precoding matrix are not supported, then the MIMO_PATTERN #1 is not necessary. Also, when multiple precoding matrices are not necessary, 1-bit information may be used instead of 2-bit information. Furthermore, two or more bits may be used when a plurality of precoding matrices are available.

The same principles apply to the MIMO_PATTERN #2 information. When the transmission schemes does not require a plurality of methods of performing a change of phase on precoded (or precoded and switched) signals, 1-bit information may be used instead of 2-bit information. Furthermore, two or more bits may be used when a plurality of phase changing schemes are available.

Furthermore, although the present Embodiment describes a transmission device having two antennas, no limitation is intended in this regard. The control information may also be transmitted using more than two antennas. In such circumstances, the number of bits in each type of control information may be increased as required in order to realize transmission using four antennas. The above description control information transmission in the P1 symbol and in the first and second signalling data also applies to such cases.

While FIG. 77 illustrates the frame configuration for the PLP symbol groups transmitted by the broadcaster as being divided with respect to the time domain, the following variation is also possible.

Unlike FIG. 77, FIG. 79 illustrates an example of a method for arranging the symbols stream s1 and stream 2 in the time-frequency domain, after the P1 symbol, the first and second signalling data, and the Common PLP have been transmitted.

In FIG. 79, the symbols labelled #1 are symbols of the symbol group of PLP #1 from FIG. 77. Similarly, the symbols labelled #2 are symbols of the symbol group of PLP #2, the symbols labelled #3 are symbols of the symbol group of PLP #3, and the symbols labelled #4 are symbols of the symbol group of PLP #4, all from FIG. 77. As in FIG. 77, PLP #1 is used to transmit data using a spatial multiplexing MIMO system as illustrated by FIG. 23, or by using a MIMO system with a fixed precoding matrix. PLP #2 is used to transmit data using only one modulated signal. PLP #3 is used to transmit data using a transmission method in which a change in phase is performed on precoded (or precoded and switched) signals. PLP #4 is used to transmit data using space-time block codes.

In FIG. 79, when both s1 and s2 have a symbol on the same sub-carrier at the same timestamp, a symbol from each of the two streams is present at the common frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As described above, FIG. 79 differs from FIG. 77 in that the PLPs are divided with respect to the time domain. In addition, FIG. 79 has a plurality of PLPs arranged with respect to the time and frequency domains. That is, for example, the symbols of PLP #1 and PLP #2 are at timestamp 1, while the symbols of PLP #3 and PLP #4 are at timestamp 3. As such, PLP symbols having a different index (#X, where X=1, 2, and so on) may be allocated to each symbol (made up of a timestamp and a sub-carrier).

Although, for the sake of simplicity, FIG. 79 lists only #1 and #2 at timestamp 1, no limitation is intended in this regard. Indices of PLP symbols other than #1 and #2 may be at timestamp #1. Furthermore, the relationship between PLP indices and sub-carriers at timestamp 1 is not limited to that illustrated by FIG. 79. The indices of any PLP symbols may be assigned to any sub-carrier. The same applies to other timestamps, in that the indices of any PLP symbols may be assigned thereto.

Unlike FIG. 77, FIG. 80 illustrates an example of a method for arranging the symbols stream s1 and stream s2 in the time-frequency domain, after the P1 symbol, the first and second signalling data, and the Common PLP have been transmitted. The characteristic feature of FIG. 80 is that, assuming that using a plurality of antennas for transmission is the basis of the PLP transmission method, then transmission using only stream 1 is not an option for the T2 frame.

Accordingly, in FIG. 80, PLP symbol group 8001 transmits data using a spatial multiplexing MIMO system, or a MIMO system using a fixed precoding matrix. Also, symbol group 8002 of PLP #2 transmits data using a transmission method performing a change of phase on precoded (or on precoded and switched) signals. Further, symbol group 8003 of PLP #3 transmits data using space-time block code. PLP symbol groups following symbol group 8003 of PLP #3 transmit data using one of these methods, namely using a spatial multiplexing MIMO system, or a MIMO system using a fixed precoding matrix, using a transmission method performing a change of phase on precoded (or on precoded and switched) signals, or using space-time block codes.

Unlike FIG. 79, FIG. 81 illustrates an example of a method for arranging the symbols stream s1 and stream s2 in the time-frequency domain, after the P1 symbol, the first and second signalling data, and the Common PLP have been transmitted.

In FIG. 81, the symbols labelled #1 are symbols of the symbol group of PLP #1 from FIG. 80. Similarly, the symbols labelled #2 are symbols of the symbol group of PLP #2, the symbols labelled #3 are symbols of the symbol group of PLP #3, and the symbols labelled #4 are symbols of the symbol group of PLP #4, all from FIG. 80. As in FIG. 80, PLP #1 is used to transmit data using a spatial multiplexing MIMO system as illustrated by FIG. 23, or by using a MIMO system with a fixed precoding matrix. PLP #2 is used to transmit data using a transmission method in which a change of phase is performed on precoded (or precoded and switched) signals. PLP #3 is used to transmit data using space-time block codes.

In FIG. 81, when both s1 and s2 have a symbol on the same sub-carrier at the same timestamp, a symbol from each of the two streams is present at the common frequency. As explained in other Embodiments, when using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As described above, FIG. 81 differs from FIG. 80 in that the PLPs are divided with respect to the time domain. In addition, FIG. 81 has a plurality of PLPs arranged with respect to the time and frequency domains. That is, for example, the symbols of PLP #1 and of PLP #2 are both at timestamp 1. As such, PLP symbols having a different index (#X, where X=1, 2, and so on) may be allocated to each symbol (made up of a timestamp and a sub-carrier).

Although, for the sake of simplicity, FIG. 81 lists only #1 and #2 at timestamp 1, no limitation is intended in this regard. Indices of PLP symbols other than #1 and #2 may be at timestamp #1. Furthermore, the relationship between PLP indices and sub-carriers at timestamp 1 is not limited to that illustrated by FIG. 81. The indices of any PLP symbols may be assigned to any sub-carrier. The same applies to other timestamps, in that the indices of any PLP symbols may be assigned thereto. On the other hand, one timestamp may also have symbols of only one PLP assigned thereto, as is the case for timestamp 3. In other words, any assignment of PLP symbols in the time-frequency domain is allowable.

Thus, given that the frame unit includes no PLPs using transmission methods transmitting only stream s1, the dynamic range of the signals received by the terminal may be constrained, which is likely to lead to improved received signal quality Although FIG. 81 is described using examples of selecting one of transmitting data using a spatial multiplexing MIMO system, or a MIMO system using a fixed precoding matrix, transmitting data using a transmission method performing a change of phase on precoded (or on precoded and switched) signals, and transmitting data using space-time block codes, the selection of transmission method is not limited as such. Other possibilities include:

selecting one of transmitting data using a transmission method performing a change of phase on precoded (or on precoded and switched) signals, transmitting data using space-time block codes, and transmitting data using a MIMO system using a fixed precoding matrix;

selecting one of transmitting data using a transmission method performing a change of phase on precoded (or on precoded and switched) signals, and transmitting data using space-time block codes; and selecting one of transmitting data using a transmission method performing a change of phase on precoded (or on precoded and switched) signals and transmitting data using a MIMO system using a fixed precoding matrix.

While the above explanation is given for a frame unit having multiple PLPs, the following describes a frame unit having only one PLP.

FIG. 82 illustrates a sample frame configuration for stream s1 and stream s2 in the time-frequency domain where the frame unit has only one PLP.

Although FIG. 82 indicates control symbols, these are equivalent to the above-described P1 symbol and to the first and second signalling data. In FIG. 82, interval 1 is used to transmit a first frame unit, interval 2 is used to transmit a second frame unit, interval 3 is used to transmit a third frame unit, and interval 4 is used to transmit a fourth frame unit.

Furthermore, the first frame unit in FIG. 82 transmits symbol group 8101 of PLP #1-1. The transmission method is spatial multiplexing MIMO or MIMO using a fixed precoding matrix.

The second frame unit transmits symbol group 8102 of PLP #2-1. The transmission method is transmission using a single modulated signal.

The third frame unit transmits symbol group 8103 of PLP #3-1. The transmission method is a transmission method performing a change of phase on precoded (or on precoded and switched) signals.

The fourth frame unit transmits symbol group 8104 of PLP #4-1. The transmission method is transmission using space-time block codes.

In FIG. 82, when both s1 and s2 have a symbol on the same sub-carrier at the same timestamp, a symbol from each of the two streams is present at the common frequency. When using a transmission method that involves performing a change of phase on precoded (or precoded and switched) signals, the change in phase may be performed in addition to weighting using the precoding matrix (and, where applicable, after switching the baseband signal). Accordingly, signals z1 and z2 are obtained. The signals z1 and z2 are each output by a different antenna.

As such, the transmission method may be set by taking the data transmission speed and the data reception speed of the terminal into consideration for each PLP. This has the dual merits of allowing the data transmission speed to be enhanced and ensuring high data reception quality. The configuration method for the control information pertaining to the transmission method and so on for the P1 symbol and for the first and second signalling data may be as given by Tables 2 through 5, thus obtaining the same effects. The frame configuration of FIG. 82 differs from that of FIG. 77 and the like, where each frame unit has multiple PLPs, and control information pertaining to the transmission method for each of the PLPs is required. In FIG. 82, each frame unit has only one PLP, and thus, the only control information needed is for the transmission information and so on pertaining to that single PLP.

The present Embodiment describes a method applicable to a system using a DVB standard and in which the transmission method involves performing a change of phase on precoded (or precoded and switched) signals. The transmission method involving performing a change of phase on precoded signals (or precoded signals having switched basebands) is described in the present description. Although the present Embodiment uses "control symbol" as a term of art, this term has no influence on the present invention.

The following describes the space-time block codes discussed in the present description and included in the present Embodiment.

Figure 94:
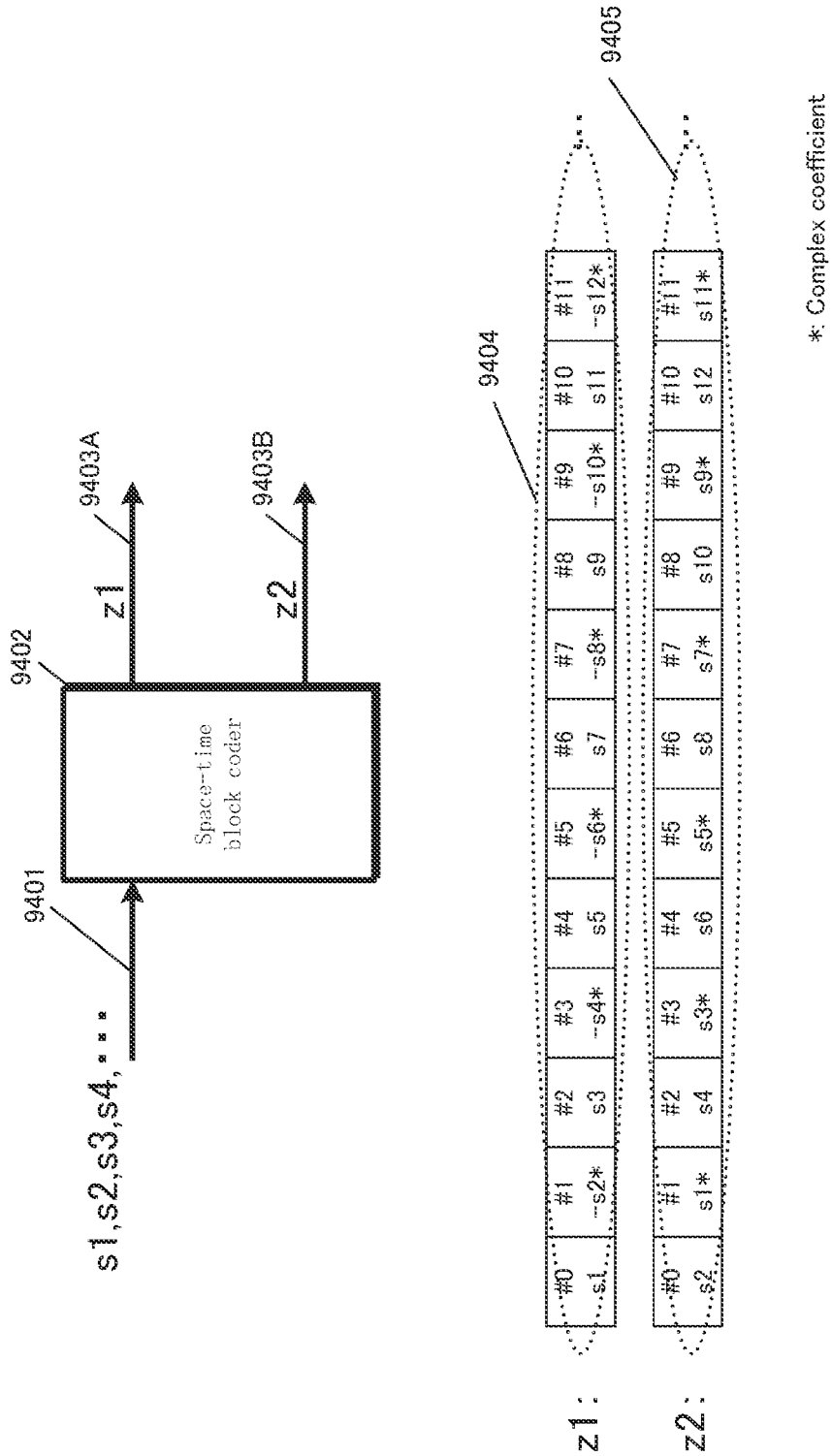
FIG. 94 illustrates a sample frame configuration used when space-time block codes are employed.

FIG. 94 illustrates the configuration of a modulated signal using space-time block codes. As shown, a space-time block coder (9402) takes a baseband signal based on a modulated signal as input. For example, the space-time block coder (9402) takes symbol s1, symbol s2, and so on as input. Then, as shown in FIG. 94, space-time block coding is performed, resulting in z1 (9403A) taking s1 as symbol #0, −s2* as symbol #1, s3 as symbol #2, −s4* as symbol #3, and so on, and z2 (9403B) taking s2 as symbol #0, s1* as symbol #1, s4 as symbol #2, s3* as symbol #3, and so on. Here, symbol #X of z1 and symbol #X of z2 are simultaneous signals on a common frequency, each broadcast from a different antenna. The arrangement of symbols in the space-time block codes is not restricted to the time domain. A group of symbols may also be arranged in the frequency domain, or in the time-frequency domain, as required. Furthermore, the space-time block coding method of FIG. 94 is given as an example of space-time block codes. Other space-time block codes may also be applied to each Embodiment discussed in the present description.

Embodiment E2

The present Embodiment describes a reception method and a reception device applicable to a communication system using the DVB-T2 standard when the transmission method described in Embodiment E1, which involves performing a change of phase on precoded (or on precoded and switched) signals, is used.

Figure 86:
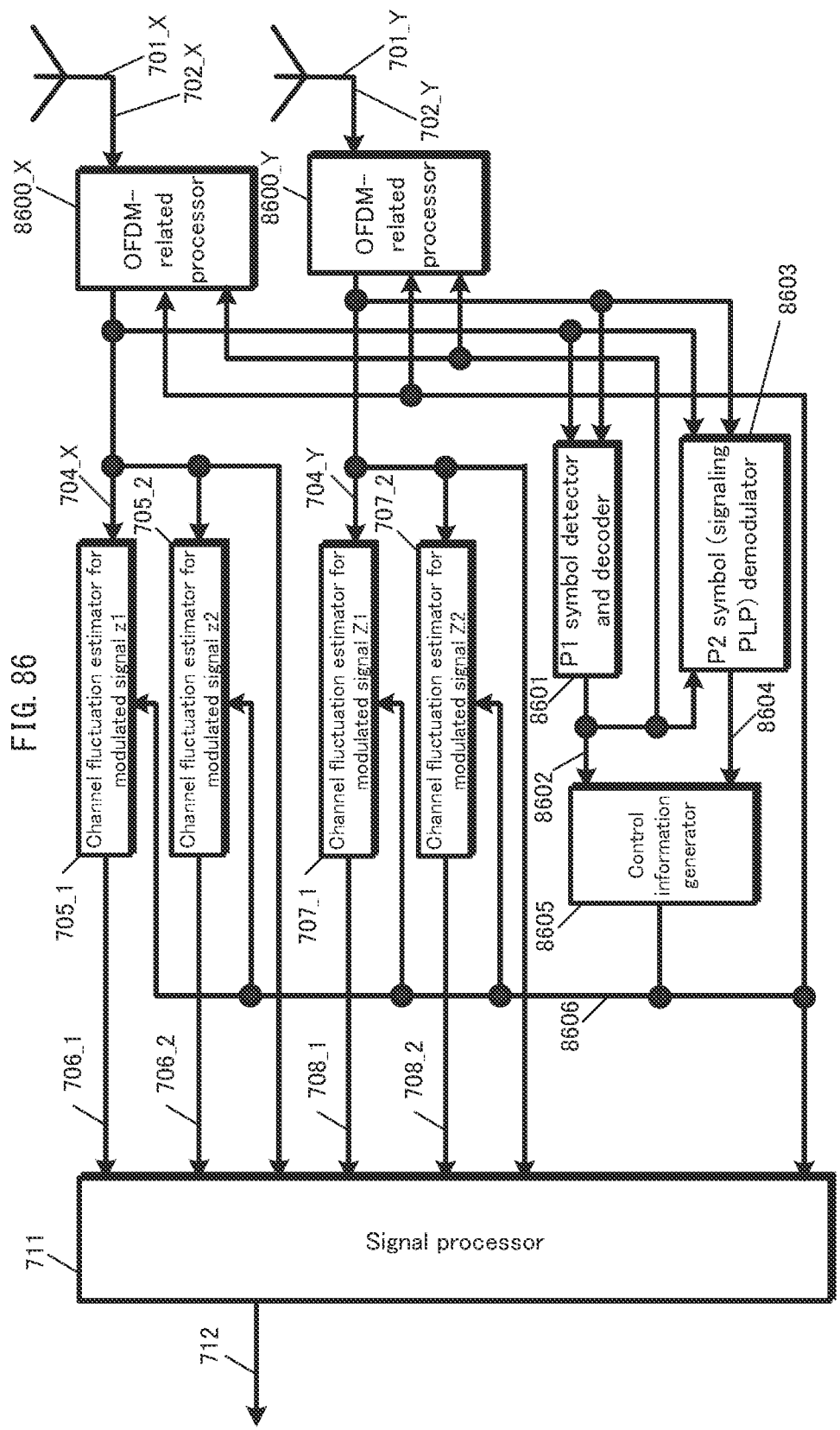
FIG. 86 illustrates an alternate sample configuration of a reception device.

FIG. 86 illustrates a sample configuration for a reception device in a terminal, for use when the transmission device of the broadcaster from FIG. 76 applies a transmission method involving a change in phase of precoded (or precoded and switched) signals. Components thereof operating identically to those of FIG. 7 use the same reference numbers thereas.

In FIG. 86, a P1 symbol detector and decoder 8601 receives the signal transmitted by the broadcaster and takes baseband signals 704_X and 704_Y as input, thereby performing signal detection and frequency synchronization. The P1 symbol detector and decoder 8601 simultaneously obtains the control information included in the P1 symbol (by performing demodulation and error-correcting decoding thereon) and outputs the P1 symbol control information 8602 so obtained.

OFDM-related processors 8600_X and 8600_Y take the P1 symbol control information 8602 as input and modify the OFDM signal processing method (such as the Fourier transform) accordingly. (This is possible because, as described in Embodiment E1, the signals transmitted by the broadcaster include transmission method information in the P1 symbol.) The OFDM-related processors 8600_X and 8600_Y then output the baseband signals 704_X and 704_Y after performing demodulation thereon according to the signal processing method.

A P2 symbol demodulator 8603 (which may also apply to the signalling PLP) takes the baseband signals 704_X and 704_Y and the P1 symbol control information 8602 as input, performs signal processing and demodulation (including error-correcting decoding) in accordance with the P1 symbol control information, and outputs P2 symbol control information 8604.

A control information generator 8605 takes the P1 symbol control information 8602 and the P2 symbol control information 8604 as input, bundles the control information (pertaining to reception operations), and outputs a control signal 8606. Then, as shown in FIG. 86, the control signal 8606 is input to each component.

A signal processor 711 takes signals 706_1, 706_2, 708_1, 708_2, 704_X, and 704_Y, as well as control signal 8606, as input, performs demodulation an decoding according to the information included in the control signal 8606, and outputs received data 712. The information included in the control signal pertains to the transmission method, modulation scheme, error-correcting coding method and coding rate thereof, error-correcting code block size, and so on used for each PLP.

When the transmission method used for the PLPs is one of spatial multiplexing MIMO, MIMO using a fixed precoding matrix, and a transmission method performing a change of phase on precoded (or on precoded and switched) signals, demodulation is performed by obtaining received (baseband) signals using the output of the channel estimators (705_1, 705_2, 707_1, and 707_2) and the relationship of the received (baseband) signals to the transmit signals.

When the transmission method involves performing a change of phase on precoded (or precoded and switched) signals, demodulation is performed using the output of the channel estimators (705_1, 705_2, 707_1, and 707_2), the received (baseband) signals, and the relationship given by Math. 48 (formula 48).

Figure 87:
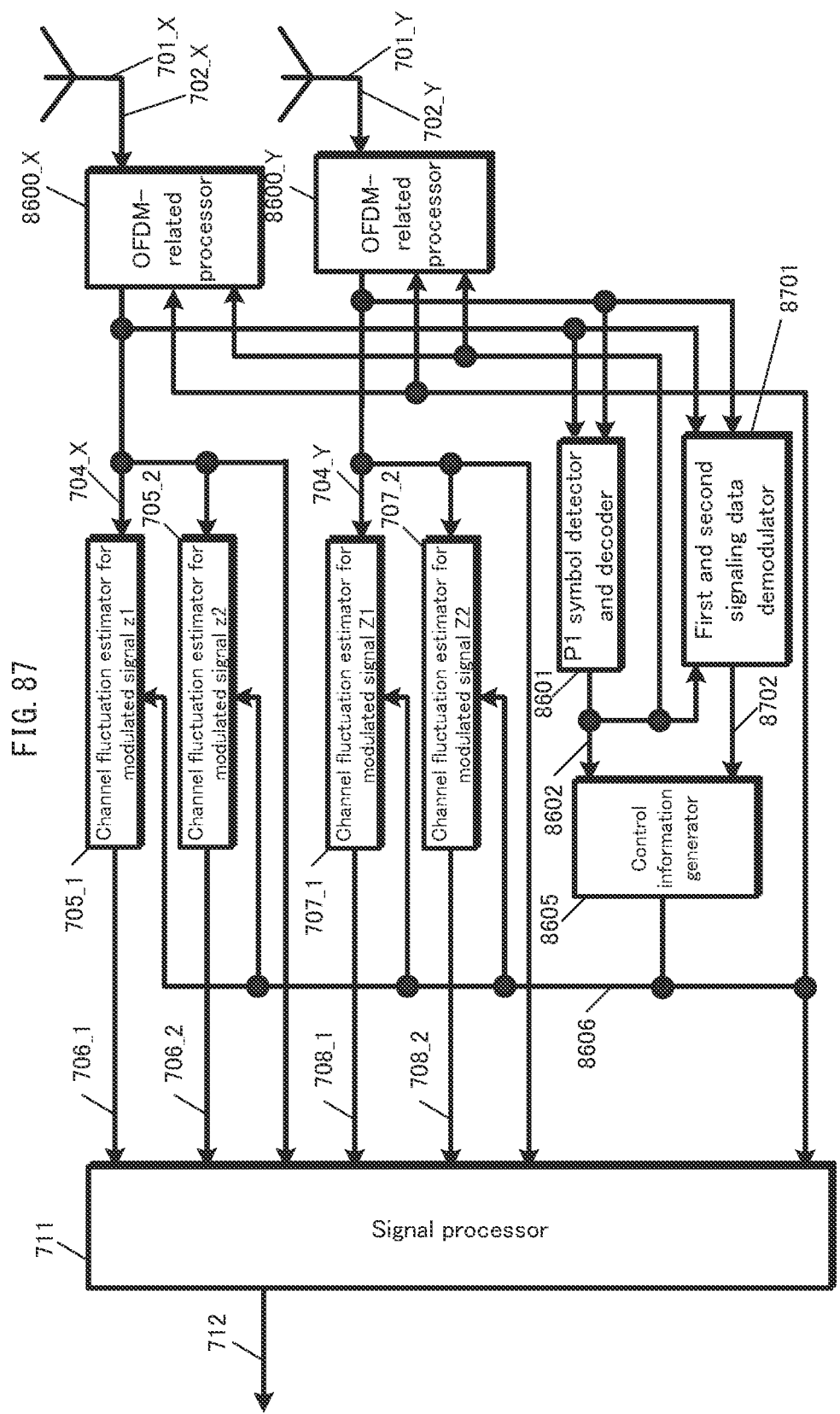
FIG. 87 illustrates another alternate sample configuration of a reception device.

FIG. 87 illustrates a sample configuration for a reception device in a terminal, for use when the transmission device of the broadcaster from FIG. 85 applies a transmission method involving a change in phase of precoded (or precoded and switched) signals. Components thereof operating identically to those of FIGS. 7 and 86 use the same reference numbers thereas.

The reception device from FIG. 87 differs from that of FIG. 86 in that, while the latter receives data from signals conforming to the DVB-T2 standard and to other standards, the former receives data only from signals conforming to a standard other than DVB-T2.

In FIG. 87, a P1 symbol detector and decoder 8601 receives the signal transmitted by the broadcaster and takes baseband signals 704_X and 704_Y as input, thereby performing signal detection and frequency synchronization. The P1 symbol detector and decoder 8601 simultaneously obtains the control information included in the P1 symbol (by performing demodulation and error-correcting decoding thereon) and outputs the P1 symbol control information 8602 so obtained.

OFDM-related processors 8600_X and 8600_Y take the P1 symbol control information 8602 as input and modify the OFDM signal processing method accordingly. (This is possible because, as described in Embodiment E1, the signals transmitted by the broadcaster include transmission method information in the P1 symbol.) The OFDM-related processors 8600_X and 8600_Y then output the baseband signals 704_X and 704_Y after performing demodulation thereon according to the signal processing method.

A first and second signalling data demodulator 8701 (which may also apply to the signalling PLP) takes the baseband signals 704_X and 704_Y and the P1 symbol control information 8602 as input, performs signal processing and demodulation (including error-correcting decoding) in accordance with the P1 symbol control information, and outputs first and second signalling data control information 8702.

A control information generator 8605 takes the P1 symbol control information 8602 and the first and second signalling data control information 8702 as input, bundles the control information (pertaining to reception operations), and outputs a control signal 8606. Then, as shown in FIG. 86, the control signal 8606 is input to each component.

A signal processor 711 takes signals 706_1, 706_2, 708_1, 708_2, 704_X, and 704_Y, as well as control signal 8606, as input, performs demodulation an decoding according to the information included in the control signal 8606, and outputs received data 712. The information included in the control signal pertains to the transmission method, modulation scheme, error-correcting coding method and coding rate thereof, error-correcting code block size, and so on used for each PLP.

When the transmission method used for the PLPs is one of spatial multiplexing MIMO, MIMO using a fixed precoding matrix, and a transmission method performing a change of phase on precoded (or on precoded and switched) signals, demodulation is performed by obtaining received (baseband) signals using the output of the channel estimators (705_1, 705_2, 707_1, and 707_2) and the relationship of the received (baseband) signals to the transmit signals.

When the transmission method involves performing a change of phase on precoded (or precoded and switched) signals, demodulation is performed using the output of the channel estimators (705_1, 705_2, 707_1, and 707_2), the received (baseband) signals, and the relationship given by Math. 48 (formula 48).

Figure 88:
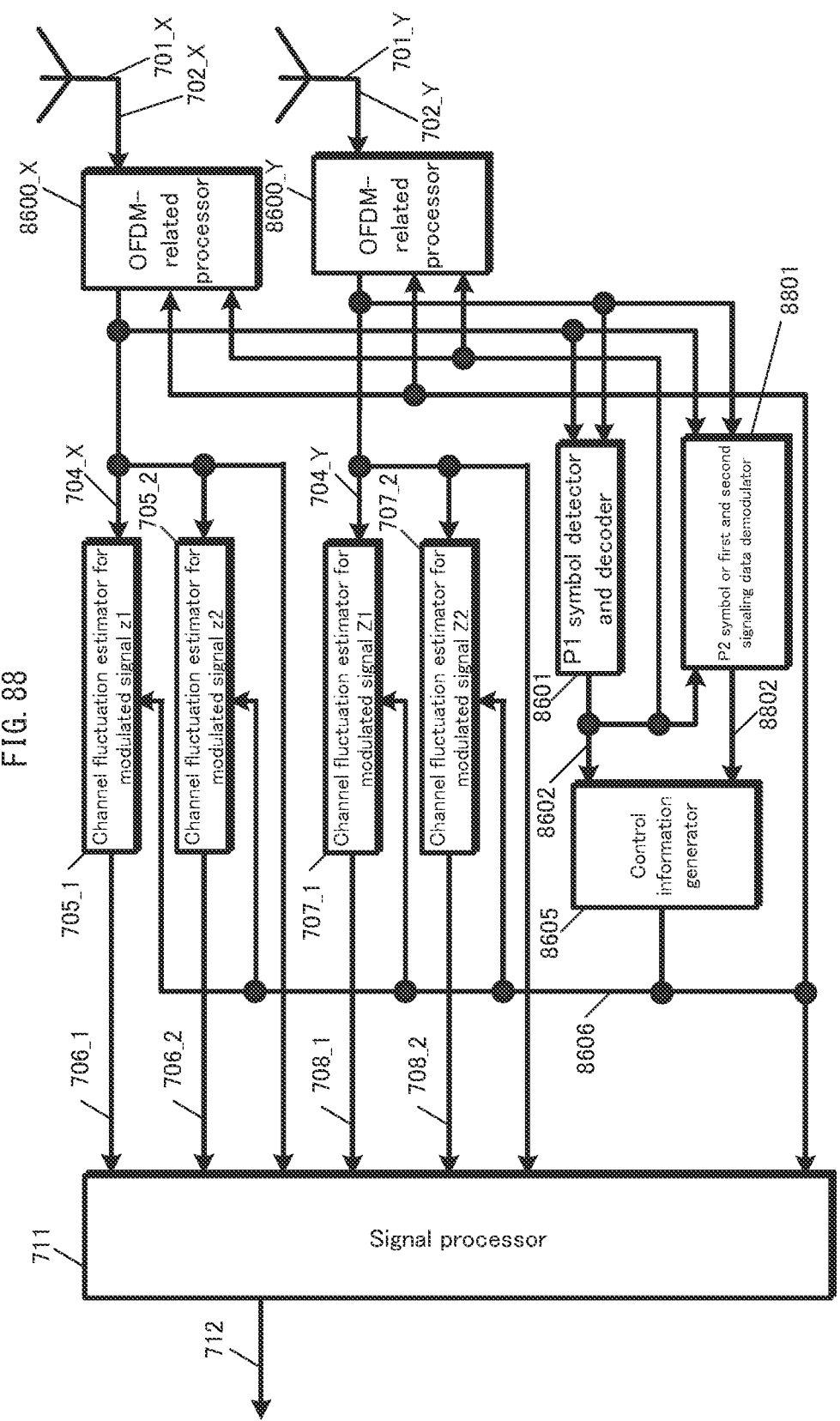
FIG. 88 illustrates yet another alternate sample configuration of a reception device.

FIG. 88 illustrates the configuration of a reception device for a terminal compatible with the DVB-T2 standard and with standards other than DVB-T2. Components thereof operating identically to those of FIGS. 7 and 86 use the same reference numbers thereas.

FIG. 88 differs from FIGS. 86 and 87 in that the reception device of the former is compatible with signals conforming to the DVB-T2 standard as well as signals conforming to other standards. As such, the reception device includes a P2 symbol or first and second signalling data demodulator 8801, in order to enable demodulation.

The P2 symbol or first and second signalling data demodulator 8801 takes the baseband signals 704_X and 704_Y, as well as the P1 symbol control information 8602, as input, uses the P1 symbol control information to determine whether the received signals conform to the DVB-T2 standard or to another standard (e.g., using Table in such a determination), performs signal processing and demodulation (including error-correcting decoding), and outputs control information 8802, which includes information indicating the standard to which the received signals conform. Otherwise, the operations are identical to those explained for FIGS. 86 and 87.

A reception device configured as described in the above Embodiment and receiving signals transmitted by a broadcaster having the transmission device described in Embodiment E1 provides higher received data quality by applying appropriate signal processing. In particular, when receiving signals transmitted using a transmission method that involves a change in phase applied to precoded (or precoded and switched) signals, data transmission effectiveness as well as signal quality are both improved in the LOS environment.

Although the present Embodiment is described as a reception device compatible with the transmission method described in Embodiment E1, and therefore having two antennas, no limitation is intended in this regard. The reception device may also have three or more antennas. In such cases, the data reception quality may be further improved by enhancing the diversity gain. Also, the transmission device of the broadcaster may have three or more transmit antennas and transmit three or more modulated signals. The same effects are achievable by accordingly increasing the number of antennas on the reception device of the terminal. Alternatively, the reception device may have only one antenna and apply maximum likelihood detection or approximate maximum likelihood detection. In such circumstances, the transmission method is preferably one that involves a change in phase of precoded (or precoded and switched) signals.

The transmission method need not be limited to the specific methods explained in the present description. As long as precoding occurs and is preceded or followed by a change in phase, the same results are obtainable for the present Embodiment.

Embodiment E3

The system of Embodiment E1, which applies, to the DVB-T2 standard, a transmission method involving a change in phase performed on precoded (or precoded and switched) signals, includes control information indicating the pilot insertion method in the L1 pre-signalling information. The present Embodiment describes a method of applying a transmission method that involves a change in phase performed on precoded signals (or precoded signals having switched basebands) when the pilot insertion method in the L1 pre-signalling information is changed.

FIGS. 89A, 89B, 90A, and 90B illustrate sample frame configurations conforming to the DVB-T2 standard in the time-frequency domain in which a common frequency region is used in a transmission method by which a plurality of modulated signals are transmitted from a plurality of antennas. Here, the horizontal axes represent frequency, i.e., the carrier numbers, while the vertical axes represent time. FIGS. 89A and 90A illustrate frame configurations for modulated signal z1 while FIGS. 89B and 90B illustrate frame configurations for modulated signal z2, both of which are as explained in the above Embodiments. The carrier numbers are labelled f0, f1, f2, and so on, while time is labelled t1, t2, t3 and so on. Also, symbols indicated at the same carrier and time are simultaneous symbols at a common frequency.

FIGS. 89A, 89B, 90A, and 90B illustrate examples of pilot symbol insertion positions conforming to the DVB-T2 standard. (In DVB-T2, eight methods of pilot insertion are possible when a plurality of antennas are used to transmit a plurality of modulated signals. Two of these are presently illustrated.) Two types of symbols are indicated, namely pilot symbols and data symbols. As described for other Embodiments, when the transmission method involves performing a change of phase on precoded signals (or precoded signals having switched basebands), or involves precoding using a fixed precoding matrix, then the data symbols of modulated signal z1 are symbols of stream s1 and stream s2 that have undergone weighting, as are the data symbols of modulated signal z2. (However, a change in phase is also performed when the transmission scheme involves doing so) When space-time block codes or a spatial multiplexing MIMO system are used, the data symbols of modulated signal z1 are the symbols of either stream s1 or of stream s2, as are the symbols of modulated signal z2. In FIGS. 89A, 89B, 90A, and 90B, the pilot symbols are labelled with an index, which is either PP1 or PP2. These represent pilot symbols using different configuration methods. As described above, eight methods of pilot insertion are possible in DVB-T2 (varying in terms of the frequency at which pilot symbols are inserted in the frame), one of which is indicated by the broadcaster. FIGS. 89A, 89B, 90A, and 90B illustrate two pilot insertion methods among these eight. As described in Embodiment E1, information pertaining to the pilot insertion method selected by the broadcaster is transmitted to the receiving terminal as the L1 pre-signalling data in the P2 symbol.

The following describes a method of applying a transmission method involving a change in phase performed on precoded signals (or precoded signals having switched basebands) complementing the pilot insertion method. In this example, the transmission method involves preparing ten different phase changing values, namely F[0], F[1], F[2], F[3], F[4], F[5], F[6], F[7], F[8], and F[9]. FIGS. 91A and 91B illustrate the allocation of these phase changing values in the time-frequency domain frame configuration of FIGS. 89A and 89B when a transmission method involving a change in phase performed on precoded (or precoded and switched) signals is applied. Similarly, FIGS. 92A and 92B illustrate the allocation of these phase changing values in the time-frequency domain frame configuration of FIGS. 90A and 90B when a transmission method involving a change in phase performed on precoded (or precoded and switched) signals is applied. For example, FIG. 91A illustrates the frame configuration of modulated signal z1 while FIG. 91B illustrates the frame configuration of modulated signal z2. In both cases, symbol #1 at f1, t1 is a symbol on which frequency modification has been performed using phase changing value F[1]. Accordingly, in FIGS. 91A, 91B, 92A, and 92B, a symbol at carrier fx (where x=0, 1, 2, and so on), and time ty (where y=1, 2, 3, and so on) is labelled #Z to indicate that frequency modification has been performed using phase changing value F[Z] on the symbol fx, ty.

Naturally, the insertion method (insertion interval) for the frequency-time frame configuration of FIGS. 91A and 91B differs from that of FIGS. 92A and 92B. The transmission method in which a change of phase is performed on precoded signals (or precoded signals having switched basebands) is not applied to the pilot symbols. Therefore, although the same transmission method involving a change in phase performed on the same synchronized precoded (or precoded and switched) signals (for which a different number of phase changing values may have been prepared), the phase changing value assigned to a single symbol at a given carrier and time in FIGS. 91A and 91B may be different in FIGS. 92A and 92B. This is made clear by reference to the drawings. For example, the symbol at f5, t2 in FIGS. 91A and 91B is labelled #7, indicating that a change in phase has been performed thereon using phase changing value F[7]. On the other hand, the symbol at f5, t2 in FIGS. 92A and 92B is labelled #8, indicating that a change in phase has been performed thereon using phase changing value F[8].

Accordingly, although the broadcaster transmits control information indicating the pilot pattern (pilot insertion method) in the L1 pre-signalling information, when the transmission method selected by the broadcaster method involves a change in phase performed on precoded signals (or precoded signals having switched basebands), the control information may additionally indicate the phase changing value allocation method used in the selected method through the control information given by Table 3 or Table 4. Thus, the reception device of the terminal receiving the modulated signals transmitted by the broadcaster is able to determine the phase changing value allocation method by obtaining the control information indicating the pilot pattern in the L1 pre-signalling data. (This presumes that the transmission method selected by the broadcaster for PLP transmission from Table 3 or Table 4 is one that involves a change in phase on precoded signals (or precoded signals having switched basebands)). Although the above description uses the example of L1 pre-signalling data, the above-described control information may also be included in the first and second signalling data when, as described for FIG. 83, no P2 symbols are used.

The following describes further variant examples. Table 6 lists sample phase changing patterns and corresponding modulation schemes.

TABLE 6

| No. of Modulated Signals | Modulation Scheme | Phase Changing Pattern |
|---|---|---|
| 2 | #1: QPSK, #2: QPSK | #1: —, #2: A |
| 2 | #1: QPSK, #2: 16-QAM | #1: —, #2: B |
| 2 | #1: 16-QAM, #2: 16-QAM | #1: —, #2: C |
| . | . | . |
| . | . | . |
| . | . | . |

For example, as shown in Table 6, when the modulation scheme is indicated and the phase changing values to be used in the transmission method involving a change in phase performed on precoded signals (or precoded signals having switched basebands) have been determined, the above-described principles apply. That is, transmitting only the control information pertaining to the pilot pattern, the PLP transmission method, and the modulation scheme suffices to enable the reception device of the terminal to estimate the phase changing value allocation method (in the time-frequency domain) by obtaining this control information. In Table 6, the Phase Changing Method column lists a dash to indicate that no change in phase is performed, and lists #A, #B, or #C to indicate phase changing methods #A, #B, and #C. Similarly, as shown in Table 1, when the modulation scheme and the error-correcting coding method are indicated and the phase changing values to be used in the transmission method involving a change in phase of precoded signals (or precoded signals having switched basebands) have been determined, then transmitting only the control information pertaining to the pilot pattern, the PLP transmission method, the modulation scheme, and the error-correcting codes in the P2 symbol suffices to enable the reception device of the terminal to estimate the phase changing value allocation method (in the time-frequency domain) by obtaining this control information.

However, unlike Table 1 and Table 6, two or more different types of transmission scheme involving a change in phase performed on precoded signals (or precoded signals having switched basebands) may be selected, despite the modulation scheme having been determined (For example, the transmission schemes may have a different period (cycle), or use different phase changing values). Alternatively, two or more different types of transmission scheme involving a change in phase performed on precoded signals (or precoded signals having switched basebands) may be selected, despite the modulation scheme and the error-correction scheme having been determined. Furthermore, two or more different types of transmission scheme involving a change in phase performed on precoded signals (or precoded signals having switched basebands) may be selected, despite the error-correction scheme having been determined. In such cases, as shown in Table 4, the transmission scheme involves switching between phase changing values. However, information pertaining to the allocation scheme of the phase changing values (in the time-frequency domain) may also be transmitted.

Table 7 lists control information configuration examples for information pertaining to such allocation methods.

TABLE 7

| PHASE_FRAME_ARRANGEMENT (2-bit) | Control Information |
|---|---|
| 00 | allocation scheme #1 |
| 01 | allocation scheme #2 |
| 10 | allocation scheme #3 |
| 11 | allocation scheme #4 |

For example, suppose that the transmission device of the broadcaster selects FIGS. 89A and 89B as the pilot pattern insertion method, and selects transmission method A, which involves a change in phase on precoded signals (or precoded signals having switched basebands). Thus, the transmission device may select FIGS. 91A and 91B or FIGS. 93A and 93B as the phase changing value allocation method (in the time-frequency domain). For example, when the transmission device selects FIGS. 91A and 91B, the PHASE FRAME ARRANGEMENT information of Table 7 is set to 00. When the transmission device selects FIGS. 93A and 93B, the PHASE FRAME ARRANGEMENT information is set to 01. As such, the reception device is able to determine the phase changing value allocation method (in the time-frequency domain) by obtaining the control information of Table 7. The control information of Table 7 is also applicable to transmission by the P2 symbol, and to transmission by the first and second signalling data.

As described above, a phase changing value allocation method for the transmission method involving a change in phase performed on precoded (or precoded and switched) signals may be realized through the pilot insertion method. In addition, by reliably transmitting such allocation method information to the receiving party, the reception device derives the dual benefits of improved data transmission efficiency and enhanced received signal quality.

Although the present Embodiment describes a broadcaster using two transmit signals, the same applies to broadcasters using a transmission device having three or more transmit antennas transmitting three or more signals. The transmission method need not be limited to the specific methods explained in the present description. As long as precoding occurs and is preceded or followed by a change in phase, the same results are obtainable for the present Embodiment.

The pilot signal configuration method is not limited to the present Embodiment. When the transmission method involves performing a change of phase on precoded (or precoded and switched) signals, the reception device need only implement the relationship given by Math. 48 (formula 48) (e.g., the reception device may know the pilot pattern signals transmitted by the transmission device in advance). This applies to all Embodiments discussed in the present description.

The transmission devices pertaining to the present invention, as illustrated by FIGS. 3, 4, 12, 13, 51, 52, 67, 70, 76, 85, and so on transmit two modulated signals, namely modulated signal #1 and modulated signal #2, on two different transmit antennas. The average transmission power of the modulated signals #1 and #2 may be set freely. For example, when the two modulated signals each have a different average transmission power, conventional transmission power control technology used in wireless transmission systems may be applied thereto. Therefore, the average transmission power of modulated signals #1 and #2 may differ. In such circumstances, transmission power control may be applied to the baseband signals (e.g., when mapping is performed using the modulation scheme), or may be performed by a power amplifier immediately before the antenna.

Embodiment F1

The schemes for regularly performing phase change on the modulated signal after precoding described in Embodiments 1 through 4, Embodiment A1, Embodiments C1 through C7, Embodiments D1 through D3 and Embodiments E1 through E3 are applicable to any baseband signals s1 and s2 mapped in the I-Q plane. Therefore, in Embodiments 1 through 4, Embodiment A1, Embodiments C1 through C7, Embodiments D1 through D3 and Embodiments E1 through E3, the baseband signals s1 and s2 have not been described in detail. On the other hand, when the scheme for regularly performing phase change on the modulated signal after precoding is applied to the baseband signals s1 and s2 generated from the error correction coded data, excellent reception quality can be achieved by controlling average power (average value) of the baseband signals s1 and s2. In the present embodiment, the following describes a scheme of setting the average power of s1 and s2 when the scheme for regularly performing phase change on the modulated signal after precoding is applied to the baseband signals s1 and s2 generated from the error correction coded data.

As an example, the modulation schemes for the baseband signal s1 and the baseband signal s2 are described as QPSK and 16QAM, respectively.

Since the modulation scheme for s1 is QPSK, s1 transmits two bits per symbol. Let the two bits to be transmitted be referred to as b0 and b1. On the other hand, since the modulation scheme for s2 is 16QAM, s2 transmits four bits per symbol. Let the four bits to be transmitted be referred to as b2, b3, b4 and b5. The transmission device transmits one slot composed of one symbol for s1 and one symbol for s2, i.e. six bits b0, b1, b2, b3, b4 and b5 per slot.

Figure 95:
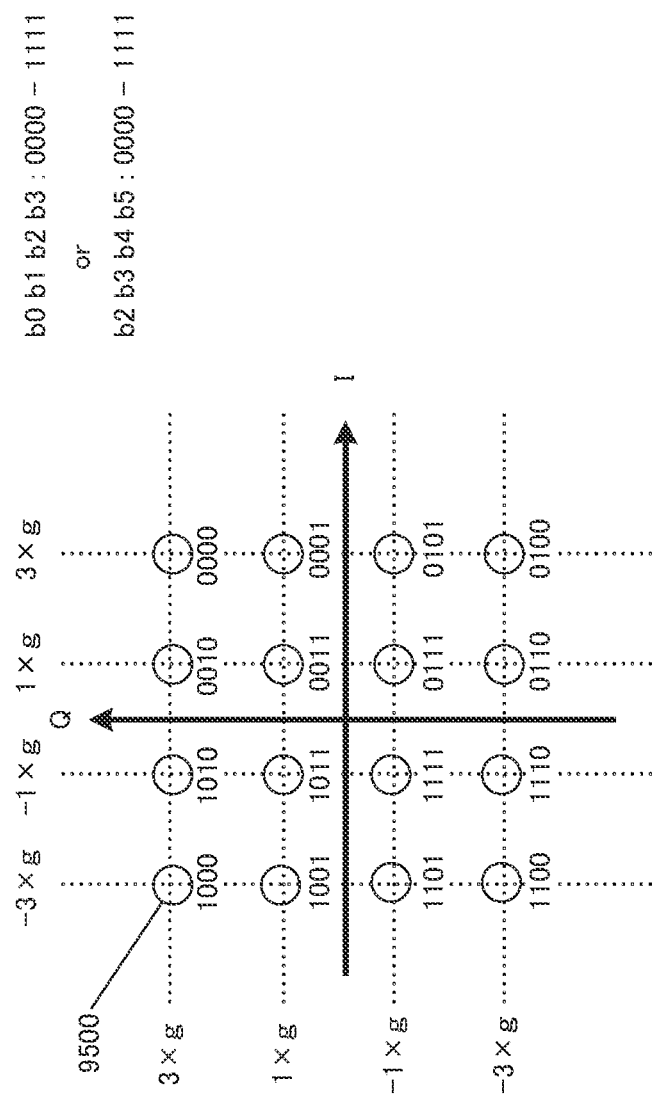
FIG. 95 illustrates an example of signal point distribution for 16-QAM in the I-Q plane.

For example, in FIG. 95 as an example of signal point layout in the I-Q plane for 16QAM, (b2, b3, b4, b5)=(0, 0, 0, 0) is mapped onto (I, Q)=(3×g, 3×g), (b2, b3, b4, b5)=(0, 0, 0, 1) is mapped onto (I, Q)=(3×g, 1×g), (b2, b3, b4, b5)=(0, 0, 1, 0) is mapped onto (I, Q)=(1×g, 3×g), (b2, b3, b4, b5)=(0, 0, 1, 1) is mapped onto (I, Q)=(1×g, 1×g), (b2, b3, b4, b5)=(0, 1, 0, 0) is mapped onto (I, Q)=(3×g, −3×g), (b2, b3, b4, b5)=(1, 1, 1, 0) is mapped onto (I, Q)=(−1×g, −3×g), and (b2, b3, b4, b5)=(1, 1, 1, 1) is mapped onto (I, Q)=(−1×g, −1×g). Note that b2 through b5 shown on the top right of FIG. 95 shows the bits and the arrangement of the numbers shown on the I-Q plane.

Figure 96:
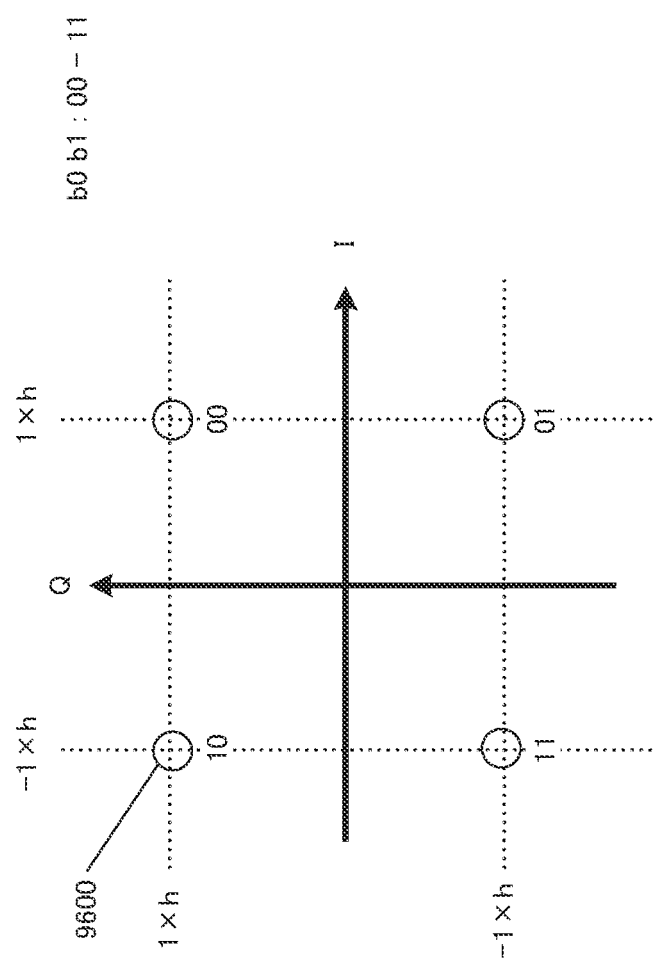
FIG. 96 illustrates an example of signal point distribution for QPSK in the I-Q plane.

Also, in FIG. 96 as an example of signal point layout in the I-Q plane for QPSK, (b0, b1)=(0, 0) is mapped onto (I, Q)=(1×h, 1×h), (b0, b1)=(0, 1) is mapped onto (I, Q)=(1×h, −1×h), (b0, b1)=(1, 0) is mapped onto (I, Q)=(−1×h, 1×h), and (b0, b1)=(1, 1) is mapped onto (I, Q)=(−1×h, −1×h). Note that b0 and b1 shown on the top right of FIG. 96 shows the bits and the arrangement of the numbers shown on the I-Q plane.

Here, assume that the average power of s1 is equal to the average power of s2, i.e. h shown in FIG. 96 is represented by formula 78 and g shown in FIG. 95 is represented by formula 79.

[Math. 78]

$$h = \frac{z}{\sqrt{2}} \qquad \text{(formula 78)}$$

[Math. 79]

$$g = \frac{z}{\sqrt{10}} \qquad \text{(formula 79)}$$

Figure 97:
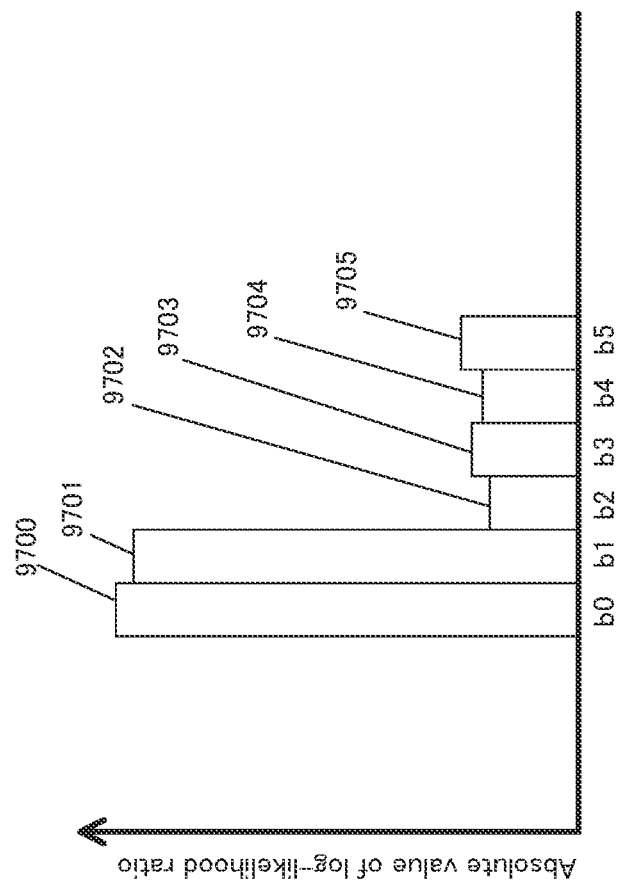
FIG. 97 schematically shows absolute values of a log-likelihood ratio obtained by the reception device.

FIG. 97 shows the log-likelihood ratio obtained by the reception device in this case. FIG. 97 schematically shows absolute values of the log-likelihood ratio for b0 through b5 described above when the reception device obtains the log-likelihood ratio. In FIG. 97, 9700 is the absolute value of the log-likelihood ratio for b0, 9701 is the absolute value of the log-likelihood ratio for b1, 9702 is the absolute value of the log-likelihood ratio for b2, 9703 is the absolute value of the log-likelihood ratio for b3, 9704 is the absolute value of the log-likelihood ratio for b4, and 9705 is the absolute value of the log-likelihood ratio for b5. In this case, as shown in FIG. 97, when the absolute values of the log-likelihood ratio for b0 and b1 transmitted in QPSK are compared with the absolute values of the log-likelihood ratio for b2 through b5 transmitted in 16QAM, the absolute values of the log-likelihood ratio for b0 and b1 are higher than the absolute values of the log-likelihood ratio for b2 through b5. That is, reliability of b0 and b1 in the reception device is higher than the reliability of b2 through b5 in the reception device. This is because of the following reason. When h is represented by formula 79 in FIG. 95, a minimum Euclidian distance between signal points in the I-Q plane for QPSK is as follows.

[Math. 80]

$$\sqrt{2z} \qquad \text{(formula 80)}$$

On the other hand, when h is represented by formula 78 in FIG. 78, a minimum Euclidian distance between signal points in the I-Q plane for 16QAM is as follows.

[Math. 80]

$$\frac{2}{\sqrt{10}} z \qquad \text{(formula 80)}$$

This is the reason.

If the reception device performs error correction decoding (e.g. belief propagation decoding such as a sum-product decoding in a case where the communication system uses LDPC codes) under this situation, due to a difference in reliability that "the absolute values of the log-likelihood ratio for b0 and b1 are higher than the absolute values of the log-likelihood ratio for b2 through b5", a problem that the data reception quality degrades in the reception device by being affected by the absolute values of the log-likelihood ratio for b2 through b5 arises.

Figure 98:
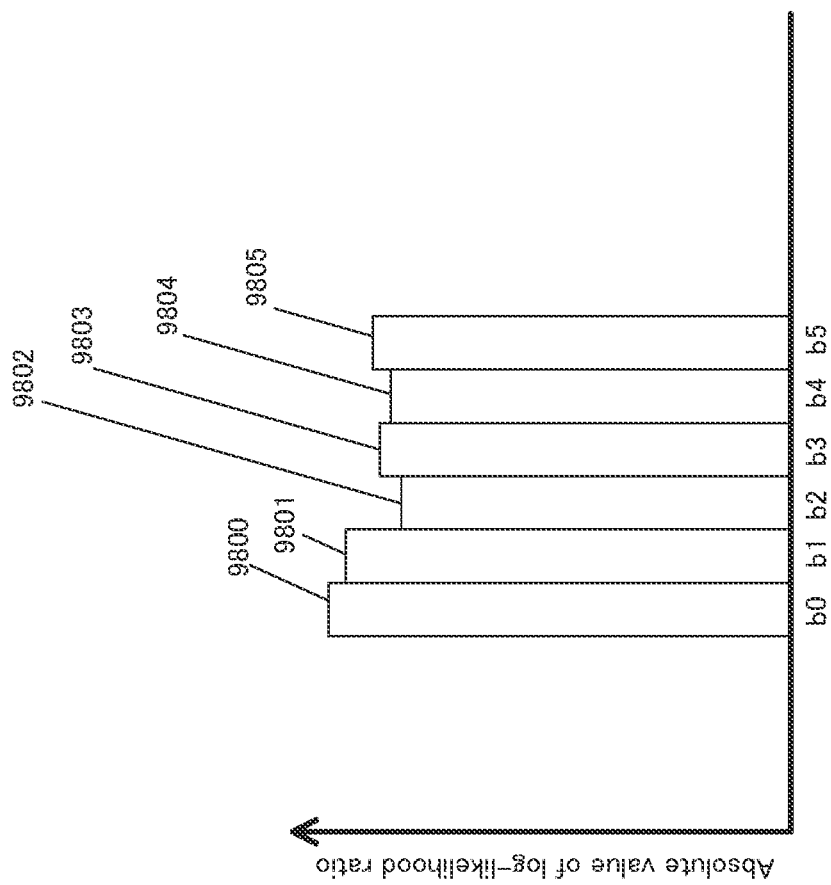
FIG. 98 schematically shows absolute values of a log-likelihood ratio obtained by the reception device.

In order to overcome the problem, the difference between the absolute values of the log-likelihood ratio for b0 and b1 and the absolute values of the log-likelihood ratio for b2 through b5 should be reduced compared with FIG. 97, as shown in FIG. 98.

Figure 99:
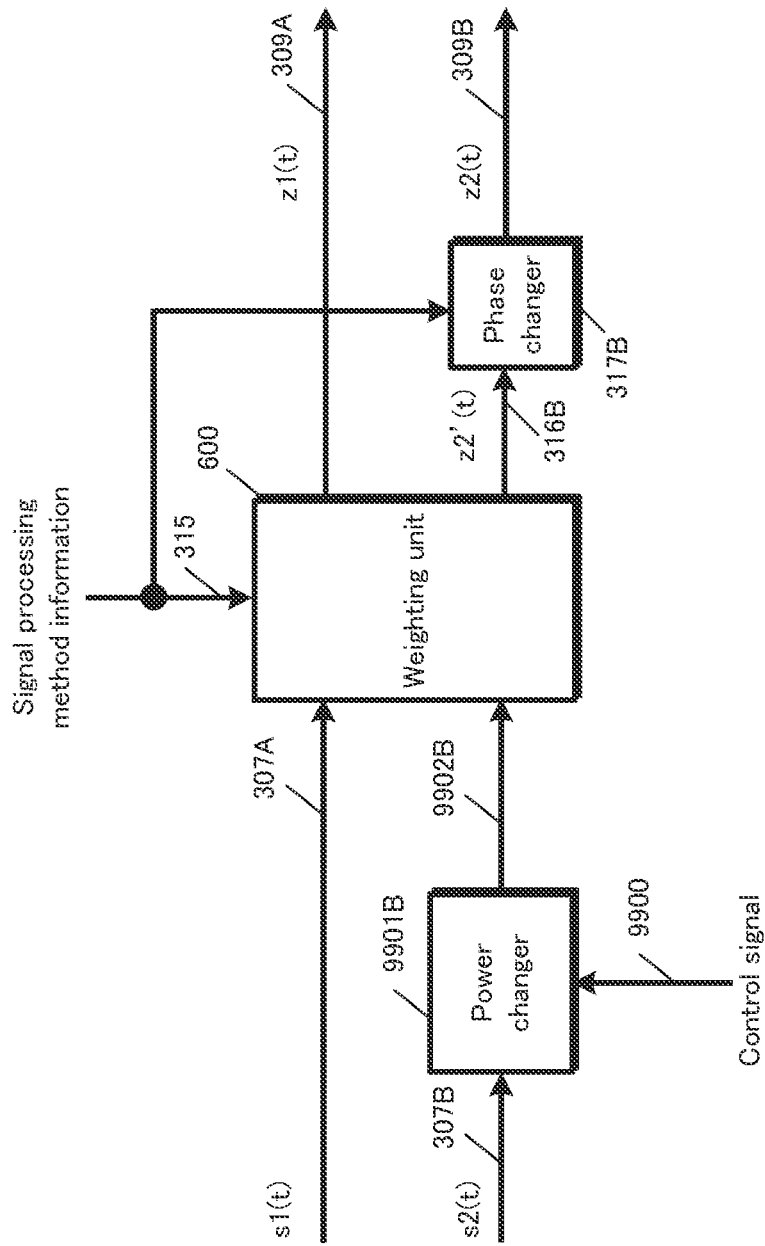
FIG. 99 is an example of a structure of a signal processor pertaining to a weighting unit.
Figure 100:
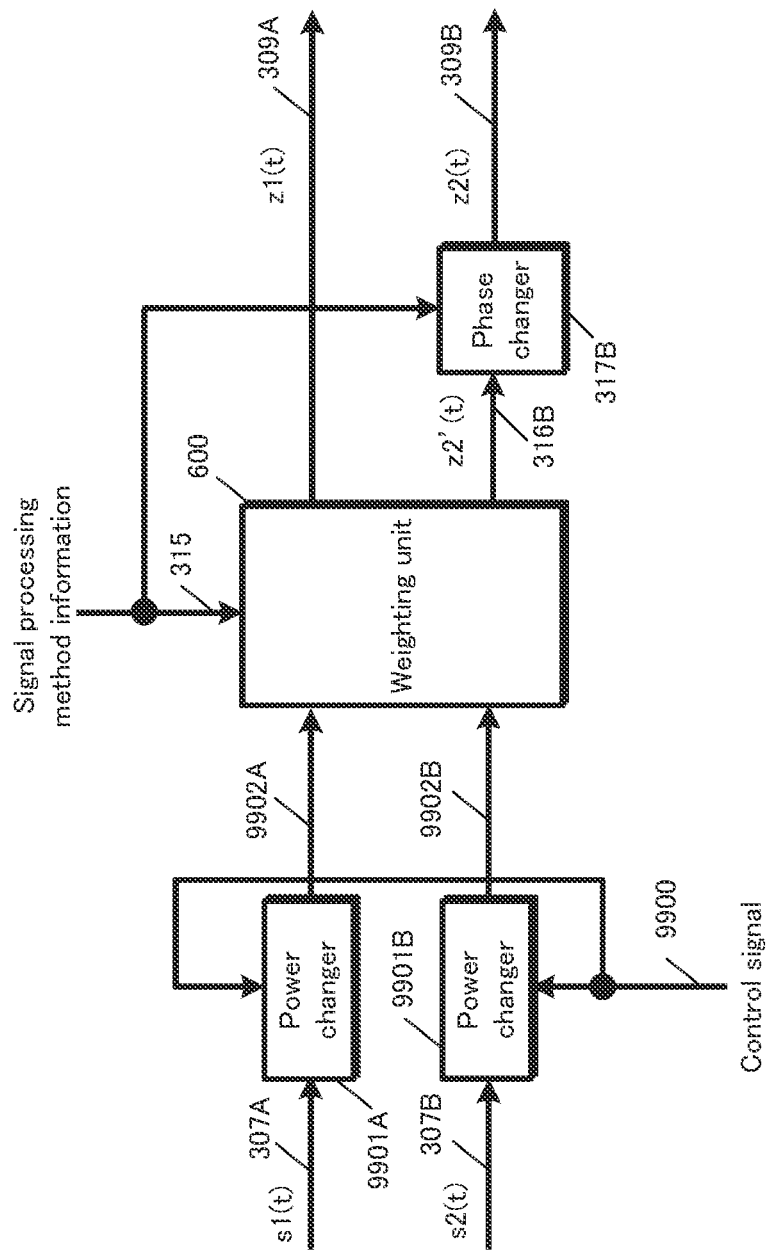
FIG. 100 is an example of a structure of the signal processor pertaining to the weighting unit.

Therefore, it is considered that the average power (average value) of s1 is made to be different from the average power (average value) of s2. FIGS. 99 and 100 each show an example of the structure of the signal processor relating to a power changer (although being referred to as the power changer here, the power changer may be referred to as an amplitude changer or a weight unit) and the weighting (precoding) unit. In FIG. 99, elements that operate in a similar way to FIG. 3 and FIG. 6 bear the same reference signs. Also, in FIG. 100, elements that operate in a similar way to FIG. 3, FIG. 6 and FIG. 99 bear the same reference signs.

The following explains some examples of operations of the power changer.

Example 1

First, an example of the operation is described using FIG. 99. Let s1(t) be the (mapped) baseband signal for the modulation scheme QPSK. The mapping scheme for s1(t) is as shown in FIG. 96, and h is as represented by formula 78. Also, let s2(t) be the (mapped) baseband signal for the modulation scheme 16QAM. The mapping scheme for s2(t) is as shown in FIG. 95, and g is as represented by formula 79. Note that t is time. In the present embodiment, description is made taking the time domain as an example.

The power changer (9901B) receives a (mapped) baseband signal 307B for the modulation scheme 16QAM and a control signal (9900) as input. Letting a value for power change set based on the control signal (9900) be u, the power changer outputs a signal (9902B) obtained by multiplying the (mapped) baseband signal 307B for the modulation scheme 16QAM by u. Let u be a real number, and u>1.0.

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, the following formula is satisfied.

[Math. 82]

$$\begin{pmatrix} z1(t) \\ z2(t) \end{pmatrix} = \begin{pmatrix} 1 & 0 \\ 0 & y(t) \end{pmatrix} F \begin{pmatrix} e^{j0} & 0 \\ 0 & ue^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} 1 & 0 \\ 0 & u \end{pmatrix} \begin{pmatrix} s1(t) \\ s2(t) \end{pmatrix}$$

(formula 82)

Therefore, a ratio of the average power for QPSK to the average power for 16QAM is set to 1:$u^2$. With this structure, the reception device is in a reception condition in which the absolute value of the log-likelihood ratio shown in FIG. 98 is obtained. Therefore, data reception quality is improved in the reception device.

The following describes a case where u in the ratio of the average power for QPSK to the average power for 16QAM 1:$u^2$ is set as shown in the following formula.

[Math. 83]

$u=\sqrt{5}$ (formula 83)=

In this case, the minimum Euclidian distance between signal points in the I-Q plane for QPSK and the minimum Euclidian distance between signal points in the I-Q plane for 16QAM can be the same. Therefore, excellent reception quality can be achieved.

The condition that the minimum Euclidian distances between signal points in the I-Q plane for two different modulation schemes are equalized, however, is a mere example of the scheme of setting the ratio of the average power for QPSK to the average power for 16QAM. For example, according to other conditions such as a code length and a coding rate of an error correction code used for error correction codes, excellent reception quality may be achieved when the value u for power change is set to a value (higher value or lower value) different from the value at which the minimum Euclidian distances between signal points in the I-Q plane for two different modulation schemes are equalized. Considering the processing efficiency, a scheme of setting the value u as shown in the following formula is considered, for example.

[Math. 84]

$u=\sqrt{2}$ (formula 84)

This will be described later in detail.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (9900). The following describes setting of the value u for power change based on the control signal (9900) in order to improve data reception quality in the reception device in detail.

Example 1-1

The following describes a scheme of setting the average power (average values) of s1 and s2 according to a block length (the number of bits constituting one coded block, and is also referred to as the code length) for the error correction coding used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected block length for the error correction codes described above. The power changer (9901B) sets the value u for power change according to the control signal (9900).

The present invention is characterized in that the power changer (9901B) sets the value u for power change according to the selected block length indicated by the control signal (9900). Here, a value for power change set according to a block length X is referred to as $u_{LX}$ For example, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 1-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected coding rate for the error correction codes described above. The power changer (9901B) sets the value u for power change according to the control signal (9900).

The present invention is characterized in that the power changer (9901B) sets the value u for power change according to the selected coding rate indicated by the control signal (9900). Here, a value for power change set according to a coding rate rx is referred to as $u_{rx}$.

For example, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates ½, ⅔ and ¾ are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 1-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Figure 101:
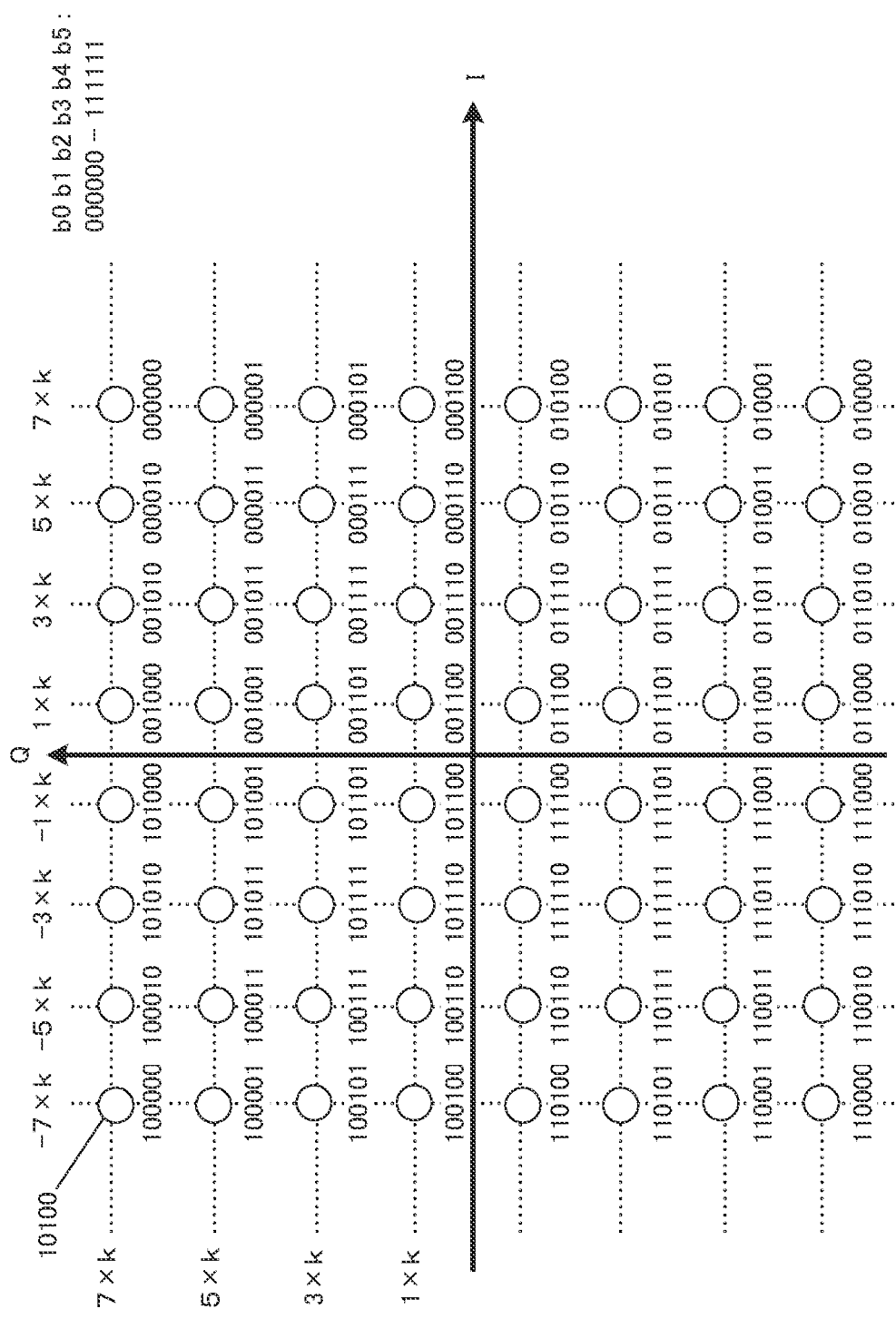
FIG. 101 illustrates an example of signal point distribution for 64-QAM in the I-Q plane.

Here, as an example, a case where the modulation scheme for s1 is fixed to QPSK and the modulation scheme for s2 is changed from 16QAM to 64QAM by the control signal (or can be set to either 16QAM or 64QAM) is considered. Note that, in a case where the modulation scheme for s2(t) is 64QAM, the mapping scheme for s2(t) is as shown in FIG. 101. In FIG. 101, k is represented by the following formula.

[Math. 85]

$$k = \frac{z}{\sqrt{42}} \quad \text{(formula 85)}$$

By performing mapping in this way, the average power obtained when h in FIG. 96 for QPSK is represented by formula 78 becomes equal to the average power obtained when g in FIG. 95 for 16QAM is represented by formula 79. In the mapping in 64QAM, the values I and Q are determined from an input of six bits. In this regard, the mapping 64QAM may be performed similarly to the mapping in QPSK and 16QAM.

That is to say, in FIG. 101 as an example of signal point layout in the I-Q plane for 64QAM, (b0, b1, b2, b3, b4, b5)=(0, 0, 0, 0, 0, 0) is mapped onto (I, Q)=(7×k, 7×k), (b0, b1, b2, b3, b4, b5)=(0, 0, 0, 0, 0, 1) is mapped onto (I, Q)=(7×k, 5×k), (b0, b1, b2, b3, b4, b5)=(0, 0, 0, 0, 1, 0) is mapped onto (I, Q)=(5×k, 7×k), (b0, b1, b2, b3, b4, b5)=(0, 0, 0, 0, 1, 1) is mapped onto (I, Q)=(5×k, 5×k), (b0, b1, b2, b3, b4, b5)=(0, 0, 0, 1, 0, 0) is mapped onto (I, Q)=(7×k, 1×k), (b0, b1, b2, b3, b4, b5)=(1, 1, 1, 1, 1, 0) is mapped onto (I, Q)=(−3×k, −1×k), and (b0, b1, b2, b3, b4, b5)=(1, 1, 1, 1, 1, 1) is mapped onto (I, Q)=(−3×k, −3×k). Note that b0 through b5 shown on the top right of FIG. 101 shows the bits and the arrangement of the numbers shown on the I-Q plane.

In FIG. 99, the power changer 9901B sets such that $u=u_{16}$ when the modulation scheme for s2 is 16QAM, and sets such that $u=u_{64}$ when the modulation scheme for s2 is 64QAM. In this case, due to the relationship between minimum Euclidian distances, by setting such that $u_{16}<u_{64}$, excellent data reception quality is obtained in the reception device when the modulation scheme for s2 is either 16QAM or 64QAM.

Note that, in the above description, the "modulation scheme for s1 is fixed to QPSK". It is also considered that the modulation scheme for s2 is fixed to QPSK. In this case, power change is assumed to be not performed for the fixed modulation scheme (here, QPSK), and to be performed for a plurality of modulation schemes that can be set (here, 16QAM and 64QAM). That is to say, in this case, the transmission device does not have the structure shown in FIG. 99, but has a structure in which the power changer 9901B is eliminated from the structure in FIG. 99 and a power changer is provided to a s1(t)-side. When the fixed modulation scheme (here, QPSK) is set to s2, the following formula 86 is satisfied.

[Math. 86]

$$\begin{pmatrix} z1(t) \\ z2(t) \end{pmatrix} = \begin{pmatrix} 1 & 0 \\ 0 & y(t) \end{pmatrix} F \begin{pmatrix} ue^{j0} & 0 \\ 0 & e^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} u & 0 \\ 0 & 1 \end{pmatrix} \begin{pmatrix} s1(t) \\ s2(t) \end{pmatrix} \quad \text{(formula 86)}$$

When the modulation scheme for s2 is fixed to QPSK and the modulation scheme for s1 is changed from 16QAM to 64QAM (is set to either 16QAM or 64QAM), the relationship $u_{16}<u_{64}$ should be satisfied (note that a multiplied value for power change in 16QAM is $u_{16}$, a multiplied value for power change in 64QAM is $u_{64}$, and power change is not performed in QPSK).

Also, when a set of the modulation scheme for s1 and the modulation scheme for s2 can be set to any one of a set of QPSK and 16QAM, a set of 16QAM and QPSK, a set of QPSK and 64QAM and a set of 64QAM and QPSK, the relationship $u_{16}<u_{64}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (a>b>c) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_b < u_a$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_b < u_a$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_b < u_a$ should be satisfied.

Example 2

The following describes an example of the operation different from that described in Example 1, using FIG. 99. Let s1(t) be the (mapped) baseband signal for the modulation scheme 64QAM. The mapping scheme for s1(t) is as shown in FIG. 101, and k is as represented by formula 85. Also, let s2(t) be the (mapped) baseband signal for the modulation scheme 16QAM. The mapping scheme for s2(t) is as shown in FIG. 95, and g is as represented by formula 79. Note that t is time. In the present embodiment, description is made taking the time domain as an example.

The power changer (9901B) receives a (mapped) baseband signal 307B for the modulation scheme 16QAM and a control signal (9900) as input. Letting a value for power change set based on the control signal (9900) be u, the power changer outputs a signal (9902B) obtained by multiplying the (mapped) baseband signal 307B for the modulation scheme 16QAM by u. Let u be a real number, and u<1.0. Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, the following formula is satisfied.

Therefore, a ratio of the average power for 64QAM to the average power for 16QAM is set to $1:u^2$. With this structure, the reception device is in a reception condition as shown in FIG. 98. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (9900). The following describes setting of the value u for power change based on the control signal (9900) in order to improve data reception quality in the reception device in detail.

Example 2-1

The following describes a scheme of setting the average power (average values) of s1 and s2 according to a block length (the number of bits constituting one coded block, and is also referred to as the code length) for the error correction codes used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected block length for the error correction codes described above. The power changer (9901B) sets the value u for power change according to the control signal (9900).

The present invention is characterized in that the power changer (9901B) sets the value u for power change according to the selected block length indicated by the control signal (9900). Here, a value for power change set according to a block length X is referred to as $u_{LX}$.

For example, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 2-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1($t$) and s2($t$).

The control signal (9900) is a signal indicating the selected coding rate for the error correction codes described above. The power changer (9901B) sets the value u for power change according to the control signal (9900).

The present invention is characterized in that the power changer (9901B) sets the value u for power change according to the selected coding rate indicated by the control signal (9900). Here, a value for power change set according to a coding rate rx is referred to as $u_{rx}$.

For example, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$). Note that, as examples of r1, r2 and r3 described above, coding rates ½, ⅔ and ¾ are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 2-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 64QAM and the modulation scheme for s2 is changed from 16QAM to QPSK by the control signal (or can be set to either 16QAM or QPSK) is considered. In a case where the modulation scheme for s1 is 64QAM, the mapping scheme for s1($t$) is as shown in FIG. 101, and k is represented by formula 85 in FIG. 101. In a case where the modulation scheme for s2 is 16QAM, the mapping scheme for s2($t$) is as shown in FIG. 95, and g is represented by formula 79 in FIG. 95. Also, in a case where the modulation scheme for s2($t$) is QPSK, the mapping scheme for s2($t$) is as shown in FIG. 96, and h is represented by formula 78 in FIG. 96.

By performing mapping in this way, the average power in 16QAM becomes equal to the average power (average value) in QPSK.

In FIG. 99, the power changer 9901B sets such that $u=u_{16}$ when the modulation scheme for s2 is 16QAM, and sets such that $u=u_4$ when the modulation scheme for s2 is QPSK. In this case, due to the relationship between minimum Euclidian distances, by setting such that $u_4<u_{16}$, excellent data reception quality is obtained in the reception device when the modulation scheme for s2 is either 16QAM or QPSK.

Note that, in the above description, the modulation scheme for s1 is fixed to 64QAM. When the modulation scheme for s2 is fixed to 64QAM and the modulation scheme for s1 is changed from 16QAM to QPSK (is set to either 16QAM or QPSK), the relationship $u_4<u_{16}$ should be satisfied (the same considerations should be made as the example 1-3) (note that a multiplied value for power change in 16QAM is $u_{16}$, a multiplied value for power change in QPSK is $u_4$, and power change is not performed in 64QAM). Also, when a set of the modulation scheme for s1 and the modulation scheme for s2 can be set to any one of a set of 64QAM and 16QAM, a set of 16QAM and 64QAM, a set of 64QAM and QPSK and a set of QPSK and 64QAM, the relationship $u_4<u_{16}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 3

The following describes an example of the operation different from that described in Example 1, using FIG. 99.

Let s1(t) be the (mapped) baseband signal for the modulation scheme 16QAM. The mapping scheme for s1(t) is as shown in FIG. 95, and g is as represented by formula 79. Let s2(t) be the (mapped) baseband signal for the modulation scheme 64QAM. The mapping scheme for s2(t) is as shown in FIG. 101, and k is as represented by formula 85. Note that t is time. In the present embodiment, description is made taking the time domain as an example.

The power changer (9901B) receives a (mapped) baseband signal 307B for the modulation scheme 64QAM and a control signal (9900) as input. Letting a value for power change set based on the control signal (9900) be u, the power changer outputs a signal (9902B) obtained by multiplying the (mapped) baseband signal 307B for the modulation scheme 64QAM by u. Let u be a real number, and u>1.0. Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\Theta(t)}$, the following formula is satisfied.

Therefore, a ratio of the average power for 16QAM to the average power for 64QAM is set to 1:$u^2$. With this structure, the reception device is in a reception condition as shown in FIG. 98. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the value u for power change is set based on the control signal (9900). The following describes setting of the value u for power change based on the control signal (9900) in order to improve data reception quality in the reception device in detail.

Example 3-1

The following describes a scheme of setting the average power (average values) of s1 and s2 according to a block length (the number of bits constituting one coded block, and is also referred to as the code length) for the error correction codes used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected block length for the error correction codes described above. The power changer (9901B) sets the value u for power change according to the control signal (9900).

The present invention is characterized in that the power changer (9901B) sets the value u for power change according to the selected block length indicated by the control signal (9900). Here, a value for power change set according to a block length X is referred to as $u_{LX}$ For example, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$. In this case, for example, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied. What is important is that two or more values exist in $u_{L1000}$, $u_{L1500}$ and $u_{L3000}$).

Although the case of three code lengths is taken as an example in the above description, the present invention is not limited to this. The important point is that two or more values for power change exist when there are two or more code lengths that can be set, and the transmission device selects any of the values for power change from among the two or more values for power change when the code length is set, and performs power change.

Example 3-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected coding rate for the error correction codes described above. The power changer (9901B) sets the value u for power change according to the control signal (9900).

The present invention is characterized in that the power changer (9901B) sets the value u for power change according to the selected coding rate indicated by the control signal (9900). Here, a value for power change set according to a coding rate rx is referred to as $u_{rx}$.

For example, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$. In this case, for example, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $u_{r1}=u_{r2}$ may be satisfied. What is important is that two or more values exist in $u_{r1}$, $u_{r2}$ and $u_{r3}$).

Note that, as examples of r1, r2 and r3 described above, coding rates ½, ⅔ and ¾ are considered when the error correction code is the LDPC code.

Although the case of three coding rates is taken as an example in the above description, the present invention is not limited to this. The important point is that two or more values for power change exist when there are two or more coding rates that can be set, and the transmission device selects any of the values for power change from among the two or more values for power change when the coding rate is set, and performs power change.

Example 3-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 16QAM and the modulation scheme for s2 is changed from 64QAM to QPSK by the control signal (or can be set to either 64QAM or QPSK) is considered. In a case where the modulation scheme for s1 is 16QAM, the mapping scheme for s2(t) is as shown in FIG. 95, and g is represented by formula 79 in FIG. 95. In a case where the modulation scheme for s2 is 64QAM, the mapping scheme for s1(t) is as shown in FIG. 101, and k is represented by formula 85 in FIG. 101. Also, in a case where the modulation scheme for s2(t) is QPSK, the mapping scheme for s2(t) is as shown in FIG. 96, and h is represented by formula 78 in FIG. 96.

By performing mapping in this way, the average power in 16QAM becomes equal to the average power in QPSK.

In FIG. 99, the power changer 9901B sets such that $u=u_{64}$ when the modulation scheme for s2 is 64QAM, and sets such that $u=u_4$ when the modulation scheme for s2 is QPSK. In this case, due to the relationship between minimum Euclidian distances, by setting such that $u_4<u_{64}$, excellent data reception quality is obtained in the reception device when the modulation scheme for s2 is either 16QAM or 64QAM.

Note that, in the above description, the modulation scheme for s1 is fixed to 16QAM. When the modulation scheme for s2 is fixed to 16QAM and the modulation scheme for s1 is changed from 64QAM to QPSK (is set to either 64QAM or QPSK), the relationship $u_4<u_{64}$ should be satisfied (the same considerations should be made as the example 1-3) (note that a multiplied value for power change in 64QAM is $u_{64}$, a multiplied value for power change in QPSK is $u_4$, and power change is not performed in 16QAM). Also, when a set of the modulation scheme for s1 and the modulation scheme for s2 can be set to any one of a set of 16QAM and 64QAM, a set of 64QAM and 16QAM, a set of 16QAM and QPSK and a set of QPSK and 16QAM, the relationship $u_4<u_{64}$ should be satisfied.

The following describes a case where the above-mentioned description is generalized.

Let the modulation scheme for s1 be fixed to a modulation scheme C in which the number of signal points in the I-Q plane is c. Also, let the modulation scheme for s2 be set to either a modulation scheme A in which the number of signal points in the I-Q plane is a or a modulation scheme B in which the number of signal points in the I-Q plane is b (c>b>a) (however, let the average power (average value) for s2 in the modulation scheme A be equal to the average power (average value) for s2 in the modulation scheme B).

In this case, a value for power change set when the modulation scheme A is set to the modulation scheme for s2 is $u_a$. Also, a value for power change set when the modulation scheme B is set to the modulation scheme for s2 is $u_b$. In this case, when the relationship $u_a<u_b$ is satisfied, excellent data reception quality is obtained in the reception device.

Power change is assumed to be not performed for the fixed modulation scheme (here, modulation scheme C), and to be performed for a plurality of modulation schemes that can be set (here, modulation schemes A and B). When the modulation scheme for s2 is fixed to the modulation scheme C and the modulation scheme for s1 is changed from the modulation scheme A to the modulation scheme B (is set to either the modulation schemes A or B), the relationship $u_a<u_b$ should be satisfied. Also, when a set of the modulation scheme for s1 and the modulation scheme for s2 can be set to any one of a set of the modulation scheme C and the modulation scheme A, a set of the modulation scheme A and the modulation scheme C, a set of the modulation scheme C and the modulation scheme B and a set of the modulation scheme B and the modulation scheme C, the relationship $u_a<u_b$ should be satisfied.

Example 4

The case where power change is performed for one of the modulation schemes for s1 and s2 has been described above. The following describes a case where power change is performed for both of the modulation schemes for s1 and s2.

An example of the operation is described using FIG. 100. Let s1(t) be the (mapped) baseband signal for the modulation scheme QPSK. The mapping scheme for s1(t) is as shown in FIG. 96, and h is as represented by formula 78. Also, let s2(t) be the (mapped) baseband signal for the modulation scheme 16QAM. The mapping scheme for s2(t) is as shown in FIG. 95, and g is as represented by formula 79. Note that t is time. In the present embodiment, description is made taking the time domain as an example.

The power changer (9901A) receives a (mapped) baseband signal 307A for the modulation scheme QPSK and the control signal (9900) as input. Letting a value for power change set based on the control signal (9900) be v, the power changer outputs a signal (9902A) obtained by multiplying the (mapped) baseband signal 307A for the modulation scheme QPSK by v.

The power changer (9901B) receives a (mapped) baseband signal 307B for the modulation scheme 16QAM and a control signal (9900) as input. Letting a value for power change set based on the control signal (9900) be u, the power changer outputs a signal (9902B) obtained by multiplying the (mapped) baseband signal 307B for the modulation scheme 16QAM by u. Then, let $u=v\times w$ (w>1.0).

Letting the precoding matrix used in the scheme for regularly performing phase change be F[t], formula 87 shown next is satisfied.

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\Theta(t)}$, formula 87 shown next is satisfied.

[Math. 87]

$$\begin{pmatrix} z1(t) \\ z2(t) \end{pmatrix} = \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} = \quad \text{(formula 87)}$$

$$\begin{pmatrix} 1 & 0 \\ 0 & y(t) \end{pmatrix} F \begin{pmatrix} v & 0 \\ 0 & u \end{pmatrix} \begin{pmatrix} s1(t) \\ s2(t) \end{pmatrix} =$$

$$\begin{pmatrix} 1 & 0 \\ 0 & y(t) \end{pmatrix} F \begin{pmatrix} v & 0 \\ 0 & v \times w \end{pmatrix} \begin{pmatrix} s1(t) \\ s2(t) \end{pmatrix}$$

Therefore, a ratio of the average power for QPSK to the average power for 16QAM is set to $v^2:u^2=v^2:v^2 \times w^2=1:w^2$. With this structure, the reception device is in a reception condition as shown in FIG. 98. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (9900). The following describes setting of the values v and u for power change based on the control signal (9900) in order to improve data reception quality in the reception device in detail.

Example 4-1

The following describes a scheme of setting the average power (average values) of s1 and s2 according to a block length (the number of bits constituting one coded block, and is also referred to as the code length) for the error correction codes used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected block length for the error correction codes described above. The power changer (9901B) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected block length indicated by the control signal (9900). Here, values for power change set according to the block length X are referred to as $v_{LX}$ and $u_{LX}$.

For example, when 1000 is selected as the block length, the power changer (9901A) sets a value for power change to $v_{L1000}$. When 1500 is selected as the block length, the power changer (9901A) sets a value for power change to $v_{L1500}$. When 3000 is selected as the block length, the power changer (9901A) sets a value for power change to $V_{L3000}$.

On the other hand, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 4-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected coding rate for the error correction codes described above. The power changer (9901A) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected coding rate indicated by the control signal (9900). Here, values for power change set according to the coding rate rx are referred to as $v_{rx}$ and $u_{rx}$.

For example, when r1 is selected as the coding rate, the power changer (9901A) sets a value for power change to $v_{r1}$. When r2 is selected as the coding rate, the power changer (9901A) sets a value for power change to $v_{r2}$. When r3 is selected as the coding rate, the power changer (9901A) sets a value for power change to $v_{r3}$.

Also, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rX}$ and $u_{rX}$ are set so as to satisfy the ratio of the average power $1:w^2$.

Also, note that, as examples of r1, r2 and r3 described above, coding rates ½, ⅔ and ¾ are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values up, for power change when the coding rate is set, and performs power change. Another important point is that two or more values $v_{rx}$ for power change exist when there are two or more coding rates that can be set, and the transmission device selects any of the values for power change from among the two or more values $v_{rx}$ for power change when the coding rate is set, and performs power change.

Example 4-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to QPSK and the modulation scheme for s2 is changed from 16QAM to 64QAM by the control signal (or can be set to either 16QAM or 64QAM) is considered. In a case where the modulation scheme for s1 is QPSK, the mapping scheme for s1(t) is as shown in FIG. 96, and h is represented by formula 78 in FIG. 96. In a case where the modulation scheme for s2 is 16QAM, the mapping scheme for s2(t) is as shown in FIG. 95, and g is represented by formula 79 in FIG. 95. Also, in a case where the modulation scheme for s2(t) is 64QAM, the mapping scheme for s2(t) is as shown in FIG. 101, and k is represented by formula 85 in FIG. 101.

In FIG. 100, when the modulation scheme for s1 is QPSK and the modulation scheme for s2 is 16QAM, assume that $v=\alpha$ and $u=\alpha \times w_{16}$. In this case, the ratio between the average power of QPSK and the average power of 16QAM is $v^2:u^2=\alpha^2:\alpha^2 \times w_{16}^2=1:w_{16}^2$.

In FIG. 100, when the modulation scheme for s1 is QPSK and the modulation scheme for s2 is 64QAM, assume that $v=\beta$ and $u=\beta \times w_{64}$. In this case, the ratio between the average power of QPSK and the average power of 64QAM is $v:u=\beta^2:\beta^2 \times w_{64}^2=1:w_{64}^2$. In this case, according to the minimum Euclidean distance relationship, the reception device achieves high data reception quality when $1.0<w_{16}<w_{64}$, regardless of whether the modulation scheme for s2 is 16QAM or 64QAM.

Note that although "the modulation scheme for s1 is fixed to QPSK" in the description above, it is possible that "the modulation scheme for s2 is fixed to QPSK". In this case, power change is assumed to be not performed for the fixed modulation scheme (here, QPSK), and to be performed for a plurality of modulation schemes that can be set (here, 16QAM and 64QAM). When the fixed modulation scheme (here, QPSK) is set to s2, the following formula 88 is satisfied.

[Math. 88]

$$\begin{pmatrix} z1(t) \\ z2(t) \end{pmatrix} = \begin{pmatrix} 1 & 0 \\ 0 & y(t) \end{pmatrix} F \begin{pmatrix} ue^{j0} & 0 \\ 0 & ve^{j0} \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} u & 0 \\ 0 & v \end{pmatrix} \begin{pmatrix} s1(t) \\ s2(t) \end{pmatrix} = \begin{pmatrix} 1 & 0 \\ 0 & y(t) \end{pmatrix} F \begin{pmatrix} v \times w & 0 \\ 0 & v \end{pmatrix} \begin{pmatrix} s1(t) \\ s2(t) \end{pmatrix} \quad \text{(formula 88)}$$

Given that, even when "the modulation scheme for s2 is fixed to QPSK and the modulation scheme for s1 is changed from 16QAM to 64QAM (set to either 16QAM or 64QAM)", $1.0<w_{16}<w_{64}$ should be fulfilled. (Note that the value used for the multiplication for the power change in the case of 16QAM is $u=\alpha \times w_m$, the value used for the multiplication for the power change in the case of 64QAM is $u=\beta \times w_{64}$, the value used for the power change in the case of QPSK is $v=\alpha$ when the selectable modulation scheme is 16QAM and $v=\beta$ when the selectable modulation scheme is 64QAM.) Also, when the set of (the modulation scheme for s1, the modulation scheme for s2) is selectable from the sets of (QPSK, 16QAM), (16QAM, QPSK), (QPSK, 64QAM) and (64QAM, QPSK), $1.0<w_{16}<w_{64}$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (a>b>c). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_b < w_a$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_b < w_a$. (If this is the case, as with the description above, when the average power of the modulation scheme C is 1, the average power of the modulation scheme A is $w_a^2$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_b < w_a$.

Example 5

The following describes an example of the operation different from that described in Example 4, using FIG. 100. Let s1(*t*) be the (mapped) baseband signal for the modulation scheme 64QAM. The mapping scheme for s1(*t*) is as shown in FIG. 86, and k is as represented by formula 85. Also, let s2(*t*) be the (mapped) baseband signal for the modulation scheme 16QAM. The mapping scheme for s2(*t*) is as shown in FIG. 95, and g is as represented by formula 79. Note that t is time. In the present embodiment, description is made taking the time domain as an example.

The power changer (9901A) receives a (mapped) baseband signal 307A for the modulation scheme 64QAM and the control signal (9900) as input. Letting a value for power change set based on the control signal (9900) be v, the power changer outputs a signal (9902A) obtained by multiplying the (mapped) baseband signal 307A for the modulation scheme 64QAM by v.

The power changer (9901B) receives a (mapped) baseband signal 307B for the modulation scheme 16QAM and a control signal (9900) as input. Letting a value for power change set based on the control signal (9900) be u, the power changer outputs a signal (9902B) obtained by multiplying the (mapped) baseband signal 307B for the modulation scheme 16QAM by u. Then, let u=v×w (w<1.0).

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 87 shown above is satisfied.

Therefore, a ratio of the average power for 64QAM to the average power for 16QAM is set to $v^2:u^2=v^2:v^2\times w^2=1:w^2$. With this structure, the reception device is in a reception condition as shown in FIG. 98. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (9900). The following describes setting of the values v and u for power change based on the control signal (9900) in order to improve data reception quality in the reception device in detail.

Example 5-1

The following describes a scheme of setting the average power (average values) of s1 and s2 according to a block length (the number of bits constituting one coded block, and is also referred to as the code length) for the error correction codes used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (9900) is a signal indicating the selected block length for the error correction codes described above. The power changer (9901B) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected block length indicated by the control signal (9900). Here, values for power change set according to the block length X are referred to as $v_{LX}$ and $u_{LX}$.

For example, when 1000 is selected as the block length, the power changer (9901A) sets a value for power change to $v_{L1000}$. When 1500 is selected as the block length, the power changer (9901A) sets a value for power change to $v_{L1500}$. When 3000 is selected as the block length, the power changer (9901A) sets a value for power change to $v_{L3000}$.

On the other hand, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1000}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L3000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 5-2

The following describes a scheme of setting the average power (average values) of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1($t$) and s2($t$).

The control signal (9900) is a signal indicating the selected coding rate for the error correction codes described above. The power changer (9901A) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected coding rate indicated by the control signal (9900). Here, values for power change set according to the coding rate rx are referred to as $v_{rx}$ and up.

For example, when r1 is selected as the coding rate, the power changer (9901A) sets a value for power change to $v_{r1}$. When r2 is selected as the coding rate, the power changer (9901A) sets a value for power change to $v_{r2}$. When r3 is selected as the coding rate, the power changer (9901A) sets a value for power change to $v_{r3}$.

Also, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rX}$ and $u_{rX}$ are set so as to satisfy the ratio of the average power $1:w^2$.

Also, note that, as examples of r1, r2 and r3 described above, coding rates ½, ⅔ and ¾ are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values $u_{rx}$ for power change when the coding rate is set, and performs power change. Another important point is that two or more values $v_{rx}$ for power change exist when there are two or more coding rates that can be set, and the transmission device selects any of the values for power change from among the two or more values $v_{rx}$ for power change when the coding rate is set, and performs power change.

Example 5-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 64QAM and the modulation scheme for s2 is changed from 16QAM to QPSK by the control signal (or can be set to either 16QAM or QPSK) is considered. In a case where the modulation scheme for s1 is 64QAM, the mapping scheme for s1($t$) is as shown in FIG. 101, and k is represented by formula 85 in FIG. 101. In a case where the modulation scheme for s2 is 16QAM, the mapping scheme for s2($t$) is as shown in FIG. 95, and g is represented by formula 79 in FIG. 95. Also, in a case where the modulation scheme for s2($t$) is QPSK, the mapping scheme for s2($t$) is as shown in FIG. 96, and h is represented by formula 78 in FIG. 96.

In FIG. 100, when the modulation scheme for s1 is 64QAM and the modulation scheme for s2 is 16QAM, assume that v=a and u=α×$w_{16}$. In this case, the ratio between the average power of 64QAM and the average power of 16QAM is $v^2:u^2=\alpha^2:\alpha^2 \times w_{16}^2 = 1:w_{16}^2$.

In FIG. 100, when the modulation scheme for s1 is 64QAM and the modulation scheme for s2 is QPSK, assume that v=β and u=β×$w_4$. In this case, the ratio between the average power of 64QAM and the average power of QPSK is $v^2:u^2=\beta^2:\beta^2 \times w_4^2 = 1:w_4^2$. In this case, according to the minimum Euclidean distance relationship, the reception device achieves a high data reception quality when $w_4 < w_{16} < 1.0$, regardless of whether the modulation scheme for s2 is 16QAM or QPSK.

Note that although "the modulation scheme for s1 is fixed to 64QAM" in the description above, it is possible that "the modulation scheme for s2 is fixed to 64QAM and the modulation scheme for s1 is changed from 16QAM to QPSK (set to either 16QAM or QPSK)", $w_4 < w_{16} < 1.0$ should be fulfilled. (The same as described in Example 4-3).

(Note that the value used for the multiplication for the power change in the case of 16QAM is $u=\alpha \times w_{16}$, the value used for the multiplication for the power change in the case of QPSK is $u=\beta \times w_4$, the value used for the power change in the case of 64QAM is $v=\alpha$ when the selectable modulation scheme is 16QAM and $v=\beta$ when the selectable modulation scheme is QPSK). Also, when the set of (the modulation scheme for s1, the modulation scheme for s2) is selectable from the sets of (64QAM, 16QAM), (16QAM, 64QAM), (64QAM, QPSK) and (QPSK, 64QAM), $w_4 < w_{16} < 1.0$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b ($c > b > a$). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_a < w_b$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a < w_b$. (If this is the case, as with the description above, when the average power of the modulation scheme is C, the average power of the modulation scheme A is $w_a^2$, and the average power of the modulation scheme B is $w_b^2$.) Also, when the set of (the modulation scheme for s1, the modulation scheme for s2) is selectable from the sets of (the modulation scheme C, the modulation scheme A), (the modulation scheme A, the modulation scheme C), (the modulation scheme C, the modulation scheme B) and (the modulation scheme B, the modulation scheme C), the average powers should fulfill $w_a < w_b$.

Example 6

The following describes an example of the operation different from that described in Example 4, using FIG. 100. Let s1(t) be the (mapped) baseband signal for the modulation scheme 16QAM. The mapping scheme for s1(t) is as shown in FIG. 101, and g is as represented by formula 79. Let s2(t) be the (mapped) baseband signal for the modulation scheme 64QAM. The mapping scheme for s2(t) is as shown in FIG. 101, and k is as represented by formula 85. Note that t is time. In the present embodiment, description is made taking the time domain as an example.

The power changer (9901A) receives a (mapped) baseband signal 307A for the modulation scheme 16QAM and the control signal (9900) as input. Letting a value for power change set based on the control signal (9900) be v, the power changer outputs a signal (9902A) obtained by multiplying the (mapped) baseband signal 307A for the modulation scheme 16QAM by v.

The power changer (9901B) receives a (mapped) baseband signal 307B for the modulation scheme 64QAM and a control signal (9900) as input. Letting a value for power change set based on the control signal (9900) be u, the power changer outputs a signal (9902B) obtained by multiplying the (mapped) baseband signal 307B for the modulation scheme 64QAM by u. Then, let $u=v \times w$ ($w<1.0$).

Letting the precoding matrix used in the scheme for regularly performing phase change on the modulated signal after precoding be F and the phase changing value used for regularly performing phase change be y(t) (y(t) may be imaginary number having the absolute value of 1, i.e. $e^{j\theta(t)}$, formula 87 shown above is satisfied.

Therefore, a ratio of the average power for 64QAM to the average power for 16QAM is set to $v^2:u^2=v^2:v^2 \times w^2=1:w^2$. With this structure, the reception device is in a reception condition as shown in FIG. 98. Therefore, data reception quality is improved in the reception device.

In the conventional technology, transmission power control is generally performed based on feedback information from a communication partner. The present invention is characterized in that the transmission power is controlled regardless of the feedback information from the communication partner in the present embodiment. Detailed description is made on this point.

The above describes that the values v and u for power change are set based on the control signal (9900). The following describes setting of the values v and u for power change based on the control signal (9900) in order to improve data reception quality in the reception device in detail.

Example 6-1

The following describes a scheme of setting the average power (average values) of s1 and s2 according to a block length (the number of bits constituting one coded block, and is also referred to as the code length) for the error correction codes used to generate s1 and s2 when the transmission device supports a plurality of block lengths for the error correction codes.

Examples of the error correction codes include block codes such as Turbo codes or Duo-Binary Turbo codes using tail-biting, LDPC codes, or the like. In many communication systems and broadcasting systems, a plurality of block lengths are supported. Encoded data for which error correction codes whose block length is selected from among the plurality of supported block lengths has been performed is distributed to two systems. The encoded data having been distributed to the two systems is modulated in the modulation scheme for s1 and in the modulation scheme for s2 to generate the (mapped) baseband signals s1(t) and s2(t).

The control signal (9900) is a signal indicating the selected block length for the error correction codes described above. The power changer (9901B) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected block length indicated by the control signal (9900). Here, values for power change set according to the block length X are referred to as $v_{LX}$ and $u_{LX}$.

For example, when 1000 is selected as the block length, the power changer (9901A) sets a value for power change to $v_{L1000}$. When 1500 is selected as the block length, the power changer (9901A) sets a value for power change to $v_{L1500}$. When 3000 is selected as the block length, the power changer (9901A) sets a value for power change to $v_{L3000}$.

On the other hand, when 1000 is selected as the block length, the power changer (9901B) sets a value for power change to $u_{L1000}$. When 1500 is selected as the block length, the power changer (9901B) sets a value for power change to $u_{L1500}$. When 3000 is selected as the block length, the power changer (9901B) sets a value for power change to $u_{L3000}$.

In this case, for example, by setting $v_{L1000}$, $v_{L1500}$ and $v_{L3000}$ so as to be different from one another, a high error correction capability can be achieved for each code length. Similarly, by setting $u_{L1000}$, $u_{L1500}$ and $u_{L3000}$ so as to be different from one another, a high error correction capability can be achieved for each code length. Depending on the set code length, however, the effect might not be obtained even if the value for power change is changed. In such a case, even when the code length is changed, it is unnecessary to change the value for power change (for example, $u_{L1000}=u_{L1500}$ may be satisfied, and $v_{L1000}=v_{L1500}$ may be satisfied. What is important is that two or more values exist in a set of $v_{L1000}$, $v_{L1500}$ and $v_{L3000}$, and that two or more values exist in a set of $u_{L1000}$, $u_{L1500}$ and $u_{L1000}$). Note that, as described above, $v_{LX}$ and $u_{LX}$ are set so as to satisfy the ratio of the average power $1:w^2$.

Although the case of three code lengths is taken as an example in the above description, the present invention is not limited to this. One important point is that two or more values $u_{LX}$ for power change exist when there are two or more code lengths that can be set, and the transmission device selects any of the values for power change from among the two or more values $u_{LX}$ for power change when the code length is set, and performs power change. Another important point is that two or more values $v_{LX}$ for power change exist when there are two or more code lengths that can be set, and the transmission device selects any of the values for power change from among the two or more values $v_{LX}$ for power change when the code length is set, and performs power change.

Example 6-2

The following describes a scheme of setting the average power of s1 and s2 according to a coding rate for the error correction codes used to generate s1 and s2 when the transmission device supports a plurality of coding rates for the error correction codes.

Examples of the error correction codes include block codes such as Turbo codes or Duo-Binary Turbo codes using tail-biting, LDPC codes, or the like. In many communication systems and broadcasting systems, a plurality of coding rates are supported. Encoded data for which error correction codes whose coding rate is selected from among the plurality of supported coding rates has been performed is distributed to two systems. The encoded data having been distributed to the two systems is modulated in the modulation scheme for s1 and in the modulation scheme for s2 to generate the (mapped) baseband signals s1(*t*) and s2(*t*).

The control signal (9900) is a signal indicating the selected coding rate for the error correction codes described above. The power changer (9901A) sets the value v for power change according to the control signal (9900). Similarly, the power changer (9901B) sets the value u for power change according to the control signal (9900).

The present invention is characterized in that the power changers (9901A and 9901B) respectively set the values v and u for power change according to the selected coding rate indicated by the control signal (9900). Here, values for power change set according to the coding rate rx are referred to as $v_{rx}$ and $u_{rx}$.

For example, when r1 is selected as the coding rate, the power changer (9901A) sets a value for power change to $v_{r1}$. When r2 is selected as the coding rate, the power changer (9901A) sets a value for power change to $v_{r2}$. When r3 is selected as the coding rate, the power changer (9901A) sets a value for power change to $v_{r3}$.

Also, when r1 is selected as the coding rate, the power changer (9901B) sets a value for power change to $u_{r1}$. When r2 is selected as the coding rate, the power changer (9901B) sets a value for power change to $u_{r2}$. When r3 is selected as the coding rate, the power changer (9901B) sets a value for power change to $u_{r3}$.

In this case, for example, by setting $v_{r1}$, $v_{r2}$ and $v_{r3}$ so as to be different from one another, a high error correction capability can be achieved for each code length. Similarly, by setting $u_{r1}$, $u_{r2}$ and $u_{r3}$ so as to be different from one another, a high error correction capability can be achieved for each coding rate. Depending on the set coding rate, however, the effect might not be obtained even if the value for power change is changed. In such a case, even when the coding rate is changed, it is unnecessary to change the value for power change (for example, $v_{r1}=v_{r2}$ may be satisfied, and $u_{r1}=u_{r2}$ may be satisfied. What is important is that two or more values exist in a set of $v_{r1}$, $v_{r2}$ and $v_{r3}$, and that two or more values exist in a set of $u_{r1}$, $u_{r2}$ and $u_{r3}$). Note that, as described above, $v_{rx}$ and $u_{rx}$ are set so as to satisfy the ratio of the average power $1:w^2$.

Also, note that, as examples of r1, r2 and r3 described above, coding rates ½, ⅔ and ¾ are considered when the error correction code is the LDPC code.

Although the case of three coding rates is taken as an example in the above description, the present invention is not limited to this. One important point is that two or more values $u_{rx}$ for power change exist when there are two or more coding rates that can be set, and the transmission device selects any of the values for power change from among the two or more values up, for power change when the coding rate is set, and performs power change. Another important point is that two or more values $v_{rX}$ for power change exist when there are two or more coding rates that can be set, and the transmission device selects any of the values for power change from among the two or more values $v_{rX}$ for power change when the coding rate is set, and performs power change.

Example 6-3

In order for the reception device to achieve excellent data reception quality, it is important to implement the following.

The following describes a scheme of setting the average power (average values) of s1 and s2 according to a modulation scheme used to generate s1 and s2 when the transmission device supports a plurality of modulation schemes.

Here, as an example, a case where the modulation scheme for s1 is fixed to 16QAM and the modulation scheme for s2 is changed from 64QAM to QPSK by the control signal (or can be set to either 16QAM or QPSK) is considered. In a case where the modulation scheme for s1 is 16QAM, the mapping scheme for s1(*t*) is as shown in FIG. 95, and g is represented by formula 79 in FIG. 95. In a case where the modulation scheme for s2 is 64QAM, the mapping scheme for s2(t) is as shown in FIG. 101, and k is represented by formula 85 in FIG. 101. Also, in a case where the modulation scheme for s2(t) is QPSK, the mapping scheme for s2(t) is as shown in FIG. 96, and h is represented by formula 78 in FIG. 96.

In FIG. 100, when the modulation scheme for s1 is 16QAM and the modulation scheme for s2 is 64QAM, assume that v=α and u=α×$w_{64}$. In this case, the ratio between the average power of 64QAM and the average power of 16QAM is $v^2:u^2=\alpha^2:\alpha^2 \times w_{64}^2=1:w_{64}^2$.

In FIG. 100, when the modulation scheme for s1 is 16QAM and the modulation scheme for s2 is QPSK, assume that v=β and u=β×$w_4$. In this case, the ratio between the average power of 64QAM and the average power of QPSK is $v^2:u^2=\beta^2:\beta^2 \times w_4^2=1:w_4^2$. In this case, according to the minimum Euclidean distance relationship, the reception device achieves a high data reception quality when $w_4 < w_{64}$, regardless of whether the modulation scheme for s2 is 64QAM or QPSK.

Note that although "the modulation scheme for s1 is fixed to 16QAM" in the description above, it is possible that "the modulation scheme for s2 is fixed to 16QAM and the modulation scheme for s1 is changed from 64QAM to QPSK (set to either 16QAM or QPSK)", $w_4 < w_{64}$ should be fulfilled. (The same as described in Example 4-3). (Note that the value used for the multiplication for the power change in the case of 16QAM is u=α×$w_m$, the value used for the multiplication for the power change in the case of QPSK is u=β×$w_4$, the value used for the power change in the case of 64QAM is v=a when the selectable modulation scheme is 16QAM and v=β when the selectable modulation scheme is QPSK). Also, when the set of (the modulation scheme for s1, the modulation scheme for s2) is selectable from the sets of (16QAM, 64QAM), (64QAM, 16QAM), (16QAM, QPSK) and (QPSK, 16QAM), $w_4 < w_{64}$ should be fulfilled.

The following describes a case where the above-mentioned description is generalized.

For generalization, assume that the modulation scheme for s1 is fixed to a modulation scheme C with which the number of signal points in the I-Q plane is c. Also assume that the modulation scheme for s2 is selectable from a modulation scheme A with which the number of signal points in the I-Q plane is a and a modulation scheme B with which the number of signal points in the I-Q plane is b (c>b>a). In this case, when the modulation scheme for s2 is set to the modulation scheme A, assume that ratio between the average power of the modulation scheme for s1, which is the modulation scheme C, and the average power of the modulation scheme for s2, which is the modulation scheme A, is $1:w_a^2$. Also, when the modulation scheme for s2 is set to the modulation scheme B, assume that ratio between the average power of the modulation scheme for s1, which is the modulation scheme C, and the average power of the modulation scheme for s2, which is the modulation scheme B, is $1:w_b^2$. If this is the case, the reception device achieves a high data reception quality when $w_a < w_b$ is fulfilled.

Note that although "the modulation scheme for s1 is fixed to C" in the description above, even when "the modulation scheme for s2 is fixed to the modulation scheme C and the modulation scheme for s1 is changed from the modulation scheme A to the modulation scheme B (set to either the modulation scheme A or the modulation scheme B), the average powers should fulfill $w_a < w_b$. (If this is the case, as with the description above, when the average power of the modulation scheme is C, the average power of the modulation scheme A is $w_a^2$, and the average power of the modulation scheme B is $w_b^2$.) Also, when the set of (the modulation scheme for s1 and the modulation scheme for s2) is selectable from the sets of (the modulation scheme C and the modulation scheme A), (the modulation scheme A and the modulation scheme C), (the modulation scheme C and the modulation scheme B) and (the modulation scheme B and the modulation scheme C), the average powers should fulfill $w_a < w_b$.

In the present description including "Embodiment 1", and so on, the power consumption by the transmission device can be reduced by setting α=1 in the formula 36 representing the precoding matrices used for the scheme for regularly changing the phase. This is because the average power of z1 and the average power of z2 are the same even when "the average power (average value) of s1 and the average power (average value) of s2 are set to be different when the modulation scheme for s1 and the modulation scheme for s2 are different", and setting α=1 does not result in increasing the PAPR (Peak-to-Average Power Ratio) of the transmission power amplifier provided in the transmission device.

However, even when α≠1, there are some precoding matrices that can be used with the scheme that regularly changes the phase and have limited influence to PAPR. For example, when the precoding matrices represented by formula 36 in Embodiment 1 are used to achieve the scheme for regularly changing the phase, the precoding matrices have limited influence to PAPR even when α≠1.

Operations of the Reception Device

Subsequently, explanation is provided of the operations of the reception device. Explanation of the reception device has already been provided in Embodiment 1 and so on, and the structure of the reception device is illustrated in FIGS. 7, 8, 9, 86, 87 and 88, for instance According to the relation illustrated in FIG. 5, when the transmission device transmits modulated signals as introduced in FIGS. 99 and 100, one relation among the two relations denoted by the two formulas below is satisfied. Note that in the two formulas below, r1(t) and r2(t) indicate reception signals, and h11(t), h12(t), h21(t), and h22(t) indicate channel fluctuation values.

In the case of Example 1, Example 2 and Example 3, the following relationship shown in formula 89 is derived from FIG. 5.

[Math. 89]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} =$$

$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} e^{j0} & 0 \\ 0 & ue^{j0} \end{pmatrix} \begin{pmatrix} s1(t) \\ s2(t) \end{pmatrix} =$$

$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} 1 & 0 \\ 0 & u \end{pmatrix} \begin{pmatrix} s1(t) \\ s2(t) \end{pmatrix} =$$

$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} s1(t) \\ us2(t) \end{pmatrix}$$

(formula 89)

Also, as explained in Example 1, Example 2, and Example 3, the relationship may be as shown in formula 90 below:

[Math. 90]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ue^{j0} & 0 \\ 0 & e^{j0} \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} u & 0 \\ 0 & 1 \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} us1(t) \\ s2(t) \end{pmatrix}$$

(formula 90)

The reception device performs demodulation (detection) (i.e. estimates the bits transmitted by the transmission device) by using the relationships described above (in the same manner as described in Embodiment 1 and so on).

In the case of Example 4, Example 5 and Example 6, the following relationship shown in formula 91 is derived from FIG. 5.

[Math. 90]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ve^{j0} & 0 \\ 0 & ue^{j0} \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v & 0 \\ 0 & v \times w \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} vs1(t) \\ us2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} vs1(t) \\ v \times w \times s2(t) \end{pmatrix}$$

(formula 91)

Also, as explained in Example 3, Example 4, and Example 5, the relationship may be as shown in formula 92 below:

[Math. 92]

$$\begin{pmatrix} r1(t) \\ r2(t) \end{pmatrix} = \begin{pmatrix} h11(t) & h12(t) \\ h21(t) & h22(t) \end{pmatrix} \begin{pmatrix} z1(t) \\ z2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} ue^{j0} & 0 \\ 0 & ve^{j0} \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v \times w & 0 \\ 0 & v \end{pmatrix} \begin{pmatrix} s1(t) \\ s2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} us1(t) \\ vs2(t) \end{pmatrix} =$$
$$\begin{pmatrix} h11(t) & h12(t) \\ h21(t) & h22(t) \end{pmatrix} \begin{pmatrix} 1 & 0 \\ 0 & y(t) \end{pmatrix} F \begin{pmatrix} v \times ws1(t) \\ vs2(t) \end{pmatrix}$$

(formula 92)

The reception device performs demodulation (detection) (i.e. estimates the bits transmitted by the transmission device) by using the relationships described above (in the same manner as described in Embodiment 1 and so on).

Note that although Examples 1 through 6 show the case where the power changer is added to the transmission device, the power change may be performed at the stage of mapping.

As described in Example 1, Example 2, and Example 3, and as particularly shown in formula 89, the mapper 306B in FIG. 3 and FIG. 4 may output u×s2(t), and the power changer may be omitted in such cases. If this is the case, it can be said that the scheme for regularly changing the phase is applied to the signal s1(t) after the mapping and the signal u×s2(t) after the mapping, the modulated signal after precoding.

As described in Example 1, Example 2, and Example 3, and as particularly shown in formula 90, the mapper 306A in FIG. 3 and FIG. 4 may output u×s1(t), and the power changer may be omitted in such cases. If this is the case, it can be said that the scheme for regularly changing the phase is applied to the signal s2(t) after the mapping and the signal u×s1(t) after the mapping, the modulated signal after precoding.

In Example 4, Example 5, and Example 6, as particularly shown in formula 91, the mapper 306A in FIG. 3 and FIG. 4 may output v×s1(t), and the mapper 306B may output u×s2(t), and the power changer may be omitted in such cases. If this is the case, it can be said that the scheme for regularly changing the phase is applied to the signal v×s1(t) after the mapping and the signal u×s2(t) after the mapping, the modulated signals after precoding.

In Example 4, Example 5, and Example 6, as particularly shown in formula 92, the mapper 306A in FIG. 3 and FIG. 4 may output u×s1(t), and the mapper 306B may output v×s2(t), and the power changer may be omitted in such cases. If this is the case, it can be said that the scheme for regularly changing the phase is applied to the signal u×s1(t) after the mapping and the signal v×s2(t) after the mapping, the modulated signals after precoding.

Note that F shown in formulas 89 through 92 denotes precoding matrices used at time t, and y(t) denotes phase changing values. The reception device performs demodulation (detection) by using the relationships between r1(t), r2(t) and s1(t), s2(t) described above (in the same manner as described in Embodiment 1 and so on). However, distortion components, such as noise components, frequency offset, channel estimation error, and the likes are not considered in the formulas described above. Hence, demodulation (detection) is performed with them. Regarding the values u and v that the transmission device uses for performing the power change, the transmission device transmits information about these values, or transmits information of the transmission mode (such as the transmission scheme, the modulation scheme and the error correction scheme) to be used. The reception device detects the values used by the transmission device by acquiring the information, obtains the relationships described above, and performs the demodulation (detection).

In the present embodiment, the switching between the phase changing values is performed on the modulated signal after precoding in the time domain. However, when a multi-carrier transmission scheme such as an OFDM scheme is used, the present invention is applicable to the case where the switching between the phase changing values is performed on the modulated signal after precoding in the frequency domain, as described in other embodiments. If this is the case, t used in the present embodiment is to be replaced with f (frequency ((sub) carrier)).

Accordingly, in the case of performing the switching between the phase changing values on the modulated signal after precoding in the time domain, z1(*t*) and z2(*t*) at the same time point is transmitted from different antennas by using the same (common/shared) frequency. On the other hand, in the case of performing the switching between the phase changing values on the modulated signal after precoding in the frequency domain, z1(*f*) and z2(*f*) at the same (common/shared) frequency is transmitted from different antennas at the same time point.

Also, even in the case of performing switching between the phase changing values on the modulated signal after precoding in the time and frequency domains, the present invention is applicable as described in other embodiments. The scheme pertaining to the present embodiment, which switches between the phase changing values on the modulated signal after precoding, is not limited the scheme which switches between the phase changing values on the modulated signal after precoding as described in the present Description.

Also, assume that processed baseband signals z1(*i*), z2(*i*) (where i represents the order in terms of time or frequency (carrier)) are generated by regular phase change and precoding (it does not matter which is performed first) on baseband signals s1(*i*) and s2(*i*) for two streams. Let the in-phase component I and the quadrature component Q of the processed baseband signal z1(*i*) be $I_1(i)$ and $Q_1(i)$ respectively, and let the in-phase component I and the quadrature component Q of the processed baseband signal z2(*i*) be $I_2(i)$ and $Q_2(i)$ respectively. In this case, the baseband components may be switched, and modulated signals corresponding to the switched baseband signal r1(*i*) and the switched baseband signal r2(*i*) may be transmitted from different antennas at the same time and over the same (common/shared) frequency by transmitting a modulated signal corresponding to the switched baseband signal r1(*i*) from transmit antenna 1 and a modulated signal corresponding to the switched baseband signal r2(*i*) from transmit antenna 2 at the same time and over the same (common/shared) frequency. Baseband components may be switched as follows.

Let the in-phase component and the quadrature component of the switched baseband signal r1(*i*) be $I_1(i)$ and $Q_2(i)$ respectively, and the in-phase component and the quadrature component of the switched baseband signal r2(*i*) be $I_2(i)$ and $Q_1(i)$ respectively.

Let the in-phase component and the quadrature component of the switched baseband signal r1(*i*) be $I_1(i)$ and $I_2(i)$ respectively, and the in-phase component and the quadrature component of the switched baseband signal r2(*i*) be $Q_1(i)$ and $Q_2(i)$ respectively.

Let the in-phase component and the quadrature component of the switched baseband signal r1(*i*) be $I_2(i)$ and $I_1(i)$ respectively, and the in-phase component and the quadrature component of the switched baseband signal r2(*i*) be $Q_1(i)$ and $Q_2(i)$ respectively.

Let the in-phase component and the quadrature component of the switched baseband signal r1(*i*) be $I_1(i)$ and $I_2(i)$ respectively, and the in-phase component and the quadrature component of the switched baseband signal r2(*i*) be $Q_2(i)$ and $Q_1(i)$ respectively.

Let the in-phase component and the quadrature component of the switched baseband signal r1(*i*) be $I_2(i)$ and $I_1(i)$ respectively, and the in-phase component and the quadrature component of the switched baseband signal r2(*i*) be $Q_2(i)$ and $Q_1(i)$ respectively.

Let the in-phase component and the quadrature component of the switched baseband signal r1(*i*) be $I_1(i)$ and $Q_2(i)$ respectively, and the in-phase component and the quadrature component of the switched baseband signal r2(*i*) be $Q_1(i)$ and $I_2(i)$ respectively.

Let the in-phase component and the quadrature component of the switched baseband signal r1(*i*) be $Q_2(i)$ and $I_1(i)$ respectively, and the in-phase component and the quadrature component of the switched baseband signal r2(*i*) be $I_2(i)$ and $Q_1(i)$ respectively.

Let the in-phase component and the quadrature component of the switched baseband signal r1(*i*) be $Q_2(i)$ and $I_1(i)$ respectively, and the in-phase component and the quadrature component of the switched baseband signal r2(*i*) be $Q_1(i)$ and $I_2(i)$ respectively.

Let the in-phase component and the quadrature component of the switched baseband signal r2(*i*) be $I_1(i)$ and $I_2(i)$ respectively, and the in-phase component and the quadrature component of the switched baseband signal r1(*i*) be $Q_1(i)$ and $Q_2(i)$ respectively.

Let the in-phase component and the quadrature component of the switched baseband signal r2(*i*) be $I_2(i)$ and $I_1(i)$ respectively, and the in-phase component and the quadrature component of the switched baseband signal $r_1(i)$ be $Q_1(i)$ and $Q_2(i)$ respectively.

Let the in-phase component and the quadrature component of the switched baseband signal r2(*i*) be $I_1(i)$ and $I_2(i)$ respectively, and the in-phase component and the quadrature component of the switched baseband signal r1(*i*) be $Q_2(i)$ and $Q_1(i)$ respectively.

Let the in-phase component and the quadrature component of the switched baseband signal r2(*i*) be $I_2(i)$ and $I_1(i)$ respectively, and the in-phase component and the quadrature component of the switched baseband signal r1(*i*) be $Q_2(i)$ and $Q_1(i)$ respectively.

Let the in-phase component and the quadrature component of the switched baseband signal r2(*i*) be $I_1(i)$ and $Q_2(i)$ respectively, and the in-phase component and the quadrature component of the switched baseband signal r1(*i*) be $I_2(i)$ and $Q_1(i)$ respectively.

Let the in-phase component and the quadrature component of the switched baseband signal r2(*i*) be $I_1(i)$ and $Q_2(i)$ respectively, and the in-phase component and the quadrature component of the switched baseband signal r1(*i*) be $Q_1(i)$ and $I_2(i)$ respectively.

Let the in-phase component and the quadrature component of the switched baseband signal r2(*i*) be $Q_2(i)$ and $I_1(i)$ respectively, and the in-phase component and the quadrature component of the switched baseband signal r1(*i*) be $I_2(i)$ and $Q_1(i)$ respectively.

Let the in-phase component and the quadrature component of the switched baseband signal r2(*i*) be $Q_2(i)$ and $I_1(i)$ respectively, and the in-phase component and the quadrature component of the switched baseband signal r1(*i*) be $Q_1(i)$ and $I_2(i)$ respectively.

In the above description, signals in two streams are processed and in-phase components and quadrature components of the processed signals are switched, but the present invention is not limited in this way. Signals in more than two streams may be processed, and the in-phase components and quadrature components of the processed signals may be switched.

In addition, the signals may be switched in the following manner. For example,

Let the in-phase component and the quadrature component of the switched baseband signal r1(*i*) be $I_2(i)$ and $Q_2(i)$ respectively, and the in-phase component and the quadrature component of the switched baseband signal r2(*i*) be $I_1(i)$ and $Q_1(i)$ respectively.

Such switching can be achieved by the structure shown in FIG. 55.

In the above-mentioned example, switching between baseband signals at the same time (at the same (common/shared) frequency ((sub)carrier)) has been described, but the present invention is not limited to the switching between baseband signals at the same time. As an example, the following description can be made.

Let the in-phase component and the quadrature component of the switched baseband signal r1($i$) be $I_1$(i+v) and $Q_2$(i+w) respectively, and the in-phase component and the quadrature component of the switched baseband signal r2($i$) be $I_2$(i+w) and $Q_1$(i+v) respectively.

Let the in-phase component and the quadrature component of the switched baseband signal r1($i$) be $I_1$(i+v) and $I_2$(i+w) respectively, and the in-phase component and the quadrature component of the switched baseband signal r2($i$) be $Q_1$(i+v) and $Q_2$(i+w) respectively.

Let the in-phase component and the quadrature component of the switched baseband signal r1($i$) be $I_2$(i+w) and $I_1$(i+v) respectively, and the in-phase component and the quadrature component of the switched baseband signal r2($i$) be $Q_1$(i+v) and $Q_2$(i+w) respectively.

Let the in-phase component and the quadrature component of the switched baseband signal r1($i$) be $I_1$(i+v) and $I_2$(i+w) respectively, and the in-phase component and the quadrature component of the switched baseband signal r2($i$) be $Q_2$(i+w) and $Q_1$(i+v) respectively.

Let the in-phase component and the quadrature component of the switched baseband signal r1($i$) be $I_2$(i+w) and $I_1$(i+v) respectively, and the in-phase component and the quadrature component of the switched baseband signal r2($i$) be $Q_2$(i+w) and $Q_1$(i+v) respectively.

Let the in-phase component and the quadrature component of the switched baseband signal r1($i$) be $I_1$(i+v) and $Q_2$(i+w) respectively, and the in-phase component and the quadrature component of the switched baseband signal r2($i$) be $Q_1$(i+v) and $I_2$(i+w) respectively.

Let the in-phase component and the quadrature component of the switched baseband signal r1($i$) be $Q_2$(i+w) and $I_1$(i+v) respectively, and the in-phase component and the quadrature component of the switched baseband signal r2($i$) be $Q_1$(i+v) and $I_2$(i+w) respectively.

Let the in-phase component and the quadrature component of the switched baseband signal r2($i$) be $I_1$(i+v) and $I_2$(i+w) respectively, and the in-phase component and the quadrature component of the switched baseband signal r1($i$) be $Q_1$(i+v) and $Q_2$(i+w) respectively.

Let the in-phase component and the quadrature component of the switched baseband signal r2($i$) be $I_2$(i+w) and $I_1$(i+v) respectively, and the in-phase component and the quadrature component of the switched baseband signal r1($i$) be $Q_1$(i+v) and $Q_2$(i+w) respectively.

Let the in-phase component and the quadrature component of the switched baseband signal r2($i$) be $I_1$(i+v) and $I_2$(i+w) respectively, and the in-phase component and the quadrature component of the switched baseband signal r1($i$) be $Q_2$(i+w) and $Q_1$(i+v) respectively.

Let the in-phase component and the quadrature component of the switched baseband signal r2($i$) be $I_2$(i+w) and $I_1$(i+v) respectively, and the in-phase component and the quadrature component of the switched baseband signal r1($i$) be $Q_2$(i+w) and $Q_1$(i+v) respectively.

Let the in-phase component and the quadrature component of the switched baseband signal r2($i$) be $I_1$(i+v) and $Q_2$(i+w) respectively, and the in-phase component and the quadrature component of the switched baseband signal r1($i$) be $I_2$(i+w) and $Q_1$(i+v) respectively.

Let the in-phase component and the quadrature component of the switched baseband signal r2($i$) be $I_1$(i+v) and $Q_2$(i+w) respectively, and the in-phase component and the quadrature component of the switched baseband signal r1($i$) be $Q_1$(i+v) and $I_2$(i+w) respectively.

Let the in-phase component and the quadrature component of the switched baseband signal r2($i$) be $Q_2$(i+w) and $I_1$(i+v) respectively, and the in-phase component and the quadrature component of the switched baseband signal r1($i$) be $I_2$(i+w) and $Q_1$(i+v) respectively.

Let the in-phase component and the quadrature component of the switched baseband signal r2($i$) be $Q_2$(i+w) and $I_1$(i+v) respectively, and the in-phase component and the quadrature component of the switched baseband signal r1($i$) be $Q_1$(i+v) and $I_2$(i+w) respectively.

In addition, the signals may be switched in the following manner. For example,

Let the in-phase component and the quadrature component of the switched baseband signal r1($i$) be $I_2$(i+w) and $Q_2$(i+w) respectively, and the in-phase component and the quadrature component of the switched baseband signal r2($i$) be $I_1$(i+v) and $Q_1$(i+w) respectively.

This can also be achieved by the structure shown in FIG. 55.

FIG. 55 illustrates a baseband signal switcher 5502 explaining the above. As shown, of the two processed baseband signals z1($i$) 5501_1 and z2($i$) 5501_2, processed baseband signal z1($i$) 5501_1 has in-phase component $I_1$($i$) and quadrature component $Q_1$($i$), while processed baseband signal z2($i$) 5501_2 has in-phase component $I_2$($i$) and quadrature component $Q_2$($i$). Then, after switching, switched baseband signal r1($i$) 5503_1 has in-phase component $I_{r1}$($i$) and quadrature component $Q_{r1}$($i$), while switched baseband signal r2($i$) 5503_2 has in-phase component $I_{r2}$($i$) and quadrature component $Q_{r2}$($i$). The in-phase component $I_{r1}$($i$) and quadrature component $Q_{r1}$($i$) of switched baseband signal r1($i$) 5503_1 and the in-phase component Ir2($i$) and quadrature component $Q_{r2}$($i$) of switched baseband signal r2($i$) 5503_2 may be expressed as any of the above. Although this example describes switching performed on baseband signals having a common time (common ((sub-)carrier) frequency) and having undergone two types of signal processing, the same may be applied to baseband signals having undergone two types of signal processing but having different time (different ((sub-)carrier) frequencies).

The switching may be performed while regularly changing switching methods.

For example,

At time 0, for switched baseband signal r1(0), the in-phase component may be $I_1$(0) while the quadrature component may be $Q_1$(0), and for switched baseband signal r2(0), the in-phase component may be $I_2$(0) while the quadrature component may be $Q_2$(0);

At time 1, for switched baseband signal r1(1), the in-phase component may be $I_2$(1) while the quadrature component may be $Q_2$(1), and for switched baseband signal r2(1), the in-phase component may be $I_1(1)$ while the quadrature component may be $Q_1(1)$, and so on. In other words, When time is 2k (k is an integer),
for switched baseband signal r1(2k), the in-phase component may be $I_1(2k)$ while the quadrature component may be $Q_1(2k)$, and for switched baseband signal r2(2k), the in-phase component may be $I_2(2k)$ while the quadrature component may be $Q_2(2k)$.

When time is 2k+1 (k is an integer),
for switched baseband signal r1(2k+1), the in-phase component may be $I_2(2k+1)$ while the quadrature component may be $Q_2(2k+1)$, and for switched baseband signal r2(2k+1), the in-phase component may be $I_1(2k+1)$ while the quadrature component may be $Q_1(2k+1)$.

When time is 2k (k is an integer),
for switched baseband signal r1(2k), the in-phase component may be $I_2(2k)$ while the quadrature component may be $Q_2(2k)$, and for switched baseband signal r2(2k), the in-phase component may be $I_1(2k)$ while the quadrature component may be $Q_1(2k)$.

When time is 2k+1 (k is an integer),
for switched baseband signal r1(2k+1), the in-phase component may be $I_1(2k+1)$ while the quadrature component may be $Q_1(2k+1)$, and for switched baseband signal r2(2k+1), the in-phase component may be $I_2(2k+1)$ while the quadrature component may be $Q_2(2k+1)$.

Similarly, the switching may be performed in the frequency domain. In other words, When frequency ((sub) carrier) is 2k (k is an integer),
for switched baseband signal r1(2k), the in-phase component may be $I_1(2k)$ while the quadrature component may be $Q_1(2k)$, and for switched baseband signal r2(2k), the in-phase component may be $I_2(2k)$ while the quadrature component may be $Q_2(2k)$.

When frequency ((sub) carrier) is 2k+1 (k is an integer),
for switched baseband signal r1(2k+1), the in-phase component may be $I_2(2k+1)$ while the quadrature component may be $Q_2(2k+1)$, and for switched baseband signal r2(2k+1), the in-phase component may be $I_1(2k+1)$ while the quadrature component may be $Q_1(2k+1)$.

When frequency ((sub) carrier) is 2k (k is an integer),
for switched baseband signal r1(2k), the in-phase component may be $I_2(2k)$ while the quadrature component may be $Q_2(2k)$, and for switched baseband signal r2(2k), the in-phase component may be $I_1(2k)$ while the quadrature component may be $Q_1(2k)$.

When frequency ((sub) carrier) is 2k+1 (k is an integer),
for switched baseband signal r1(2k+1), the in-phase component may be $I_1(2k+1)$ while the quadrature component may be $Q_1(2k+1)$, and for switched baseband signal r2(2k+1), the in-phase component may be $I_2(2k+1)$ while the quadrature component may be $Q_2(2k+1)$.

(Regarding Cyclic Q Delay)

The following describes the application of the Cyclic Q Delay mentioned throughout the present disclosure. Non-Patent Literature 10 describes the overall concept of Cyclic Q Delay. The following describes a specific example of a generation method for the s1 and s2 signals when Cyclic Q Delay is used.

Figure 102:
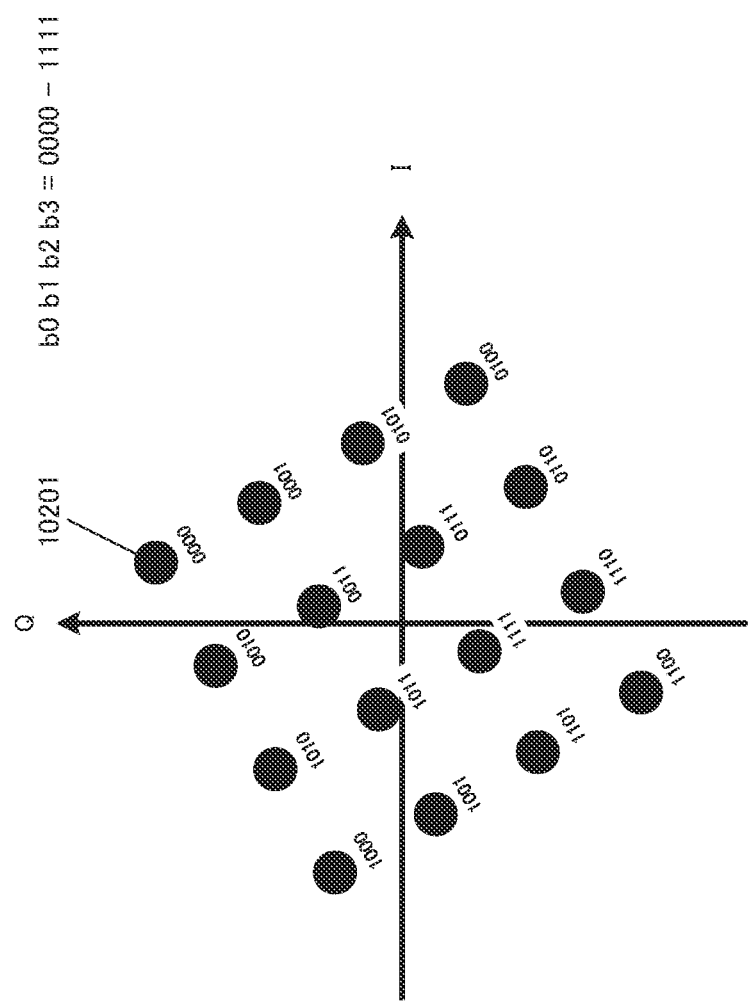
FIG. 102 illustrates an example of signal point distribution for 16-QAM in the I-Q plane.

FIG. 102 illustrates an example of a signal point arrangement in the I-Q plane when the modulation scheme is 16-QAM. As shown, when the input bits are b0, b1, b2, and b3, the bits take on either a value of 0000 or a value of 1111. For example, when the bits b0, b1, b2, and b3 are to be expressed as 0000, then signal point 10201 of FIG. 102 is selected, a value of the in-phase component based on signal point 10201 is taken as the in-phase component of the baseband signal, and a value of the quadrature component based on signal point 10201 is taken as the quadrature component of the baseband signal. When the bits b0, b1, b2, and b3 are to be expressed as a different value, the in-phase component and the quadrature component of the baseband signal are generated similarly.

FIG. 103 illustrates a sample configuration of a signal generator for generating modulated signals s1(t) (where t is time) (alternatively, s1(f), where f is frequency) and s2(t) (alternatively, s2(f)) from (binary) data when the cyclic Q delay is applied.

A mapper 10302 takes data 10301 and a control signal 10306 as input, and performs mapping in accordance with the modulation scheme of the control signal 10306. For example, when 16-QAM is selected as the modulation scheme, mapping is performed as illustrated in FIG. 102. The mapper then outputs an in-phase component 10303_A and a quadrature component 10303_B for the mapped baseband signal. No limitation is intended to the modulation scheme being 16-QAM, and the operations are similar for other modulation schemes.

Here, the data at time 1 corresponding to the bits b0, b1, b2, and b3 from FIG. 102 are respectively indicated as b01, b11, b21, and b31. The mapper 10302 outputs the in-phase component I1 and the quadrature component Q1 for the baseband signal at time 1, according to the data b0, b1, b2, and b3 at time 1. Similarly, another mapper 10302 outputs the in-phase component I2 and the quadrature component Q2 and so on for the baseband signal at time 2.

A memory and signal switcher 10304 takes the in-phase component 10303_A and the quadrature component 10303_B of the baseband signal as input and, in accordance with a control signal 10306, stores the in-phase component 10303_A and the quadrature component 10303_B of the baseband signal, switches the signals, and outputs modulated signal s1(t) (10305_A) and modulated signal s2(t) (10305_B). The generation method for the modulated signals s1(t) and s2(t) is described in detail below.

As described elsewhere in the disclosure, precoding and phase changing are performed on the modulated signal s1(t) and s2(t). Here, as described elsewhere, signal processing involving phase change, power change, signal switching, and so on may be applied at any step. Thus, modulated signals r1(t) and r2(t), respectively obtained by applying the precoding and phase change to the modulated signals s1(t) and s2(t), are transmitted using the same (common) frequency band at the same (common) time.

Although the above description is given with respect to the time domain, s1(t) and s2(t) may be thought of as s1(f) and s2(f) (where f is the (sub-)carrier frequency) when a multi-carrier transmission scheme such as OFDM is employed. In contrast to the modulated signals s1(f) and s2(f), modulated signals r1(f) and r2(f) obtained using a precoding scheme in which the precoding matrix is regularly changed are transmitted at the same (common) time (r1(f) and r2(f) being, of course) signals of the same (common/shared) frequency band). Also, as described above, s1(t) and s2(t) may be treated as s1(t,f) and s2(t,f).

Figure 104:
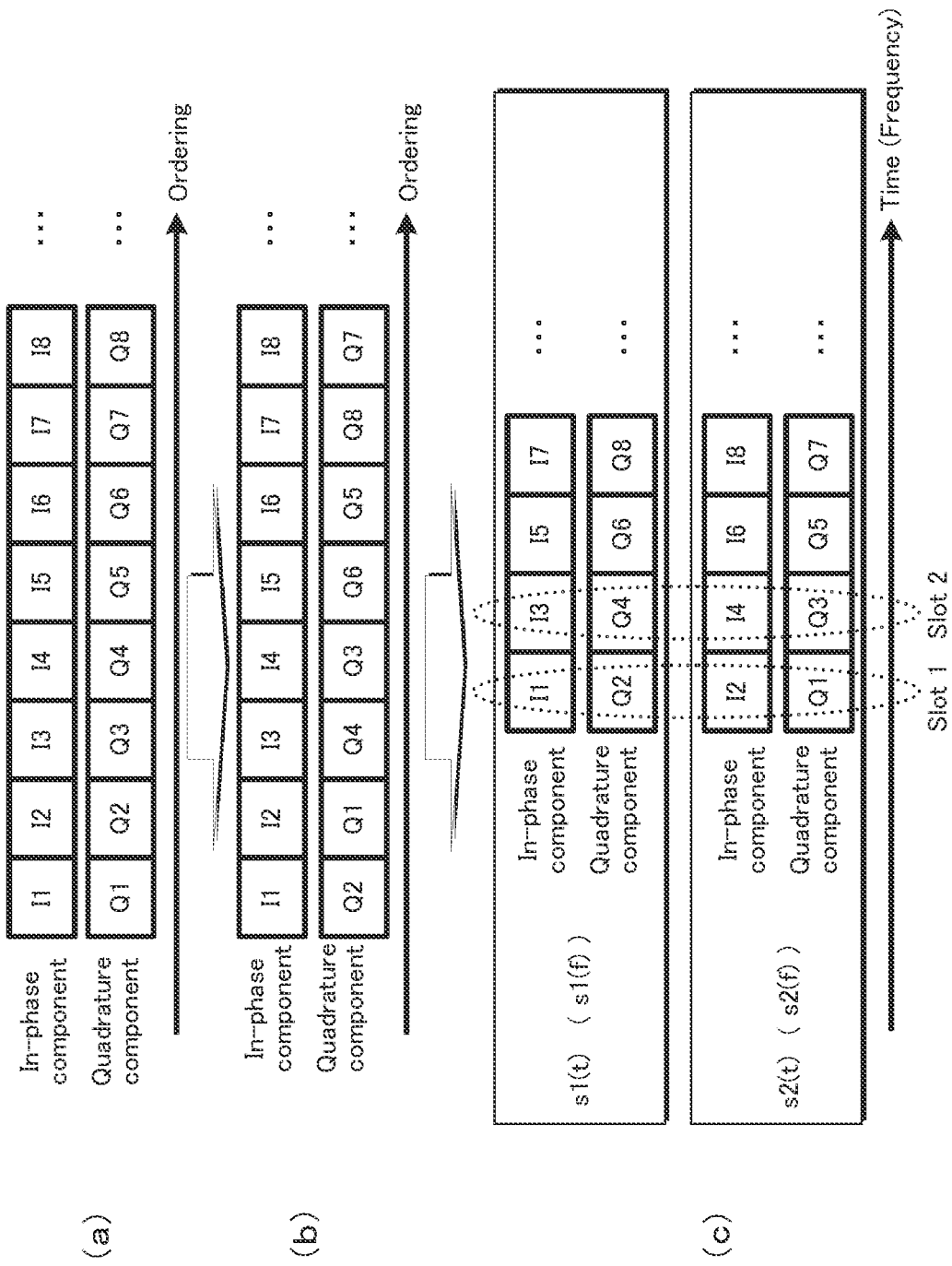
FIG. 104 illustrates a first example of a generation method for $s1(t)$ and $s2(t)$ when cyclic Q delay is used.

The following describes the generation method for modulated signals s1(t) and s2(t). FIG. 104 illustrates a first example of a generation method for s1(t) and s2(t) when a cyclic Q delay is used.

Portion (a) of FIG. 104 indicates the in-phase component and the quadrature component of the baseband signal obtained by the mapper 10302 of FIG. 103. As shown in FIG. 87A and as described with reference to the mapper 10302 of FIG. 103, the mapper 10302 outputs the in-phase component and the quadrature component of the baseband signal such that in-phase component I1 and quadrature component Q1 occur at time 1, in-phase component I2 and quadrature component Q2 occur at time 2, in-phase component I3 and quadrature component Q3 occur at time 3, and so on.

Portion (b) of FIG. 104 illustrates a sample set of in-phase components and quadrature components for the baseband signal when signal switching is performed by the memory and signal switcher 10304 of FIG. 103. As shown, pairs of quadrature components are switched at each of time 1 and time 2, time 3 and time 4, and time 5 and time 6 (i.e., time 2$i$+1 and time 2$i$+2, i being a non-zero positive integer) such that, for example, the components at time 1 and t2 are switched.

Accordingly, given that signal switching is not performed on the in-phase component of the baseband signal, the order thereof is such that in-phase component I1 occurs at time 1, in-phase component I2 occurs at time 2, baseband signal I3 occurs at time 3, and so on.

Then, signal switching is performed within the pairs of quadrature components for the baseband signal. Thus, quadrature component Q2 occurs at time 1, quadrature component Q1 occurs at time 2, quadrature component Q4 occurs at time 3, quadrature component Q3 occurs at time 4, and so on.

Portion (c) of FIG. 104 indicates a sample configuration for modulated signals s1($t$) and s2($t$) before precoding, when the scheme applied involves precoding and phase changing. For example, as shown in portion (c), the baseband signal generated in portion (b) is alternately assigned to s1($t$) and to s2($t$). Thus, the first slot of s1($t$) takes (I1, Q2) and the first slot of s2($t$) takes (I2, Q1). Likewise, the second slot of s1($t$) takes (I3, Q4) and the second slot of s2($t$) takes (I4, Q3). This continues similarly.

Although FIG. 104 describes an example with reference to the time domain, the same applies to the frequency domain (exactly as described above). In such cases, the descriptions pertain to s1($f$) and 2($f$).

Then, N-slot precoded and phase changed modulated signals r1($t$) and r2($t$) are obtained after applying the precoding and phase change to the N-slot modulated signals s1($t$) and s2($t$). This point is described elsewhere in the present disclosure.

Figure 105:
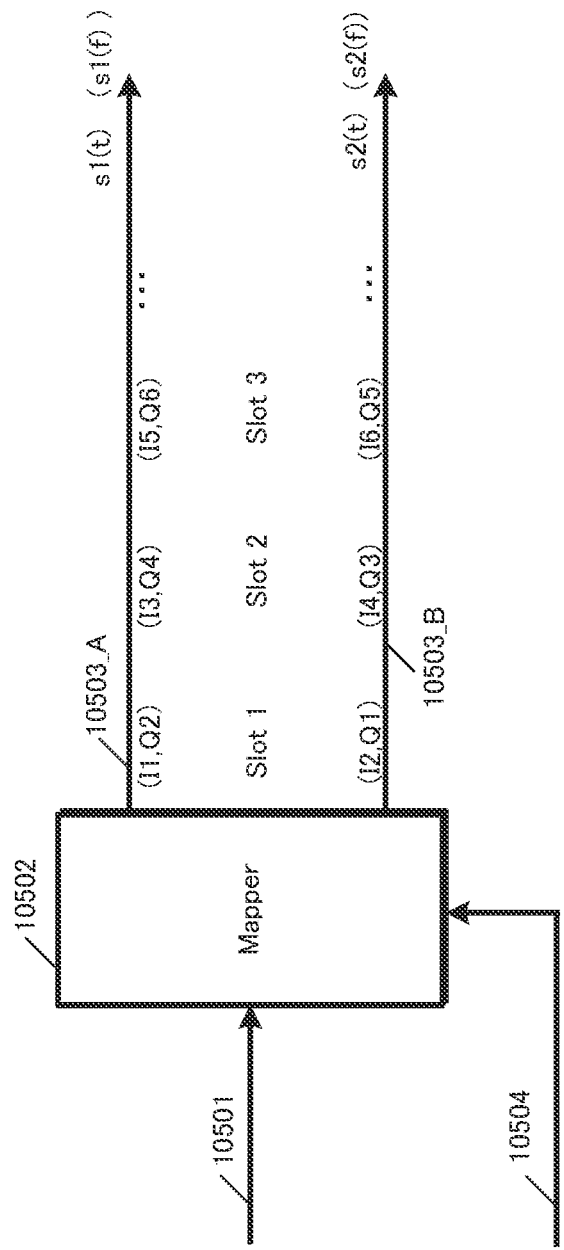
FIG. 105 indicates a sample configuration for a signal generator when cyclic Q delay is applied.

FIG. 105 illustrates a configuration that differs from that of FIG. 103 and is used to obtain the N-slot s1($t$) and s2($t$) from FIG. 104. The mapper 10502 takes data and a control signal 10504 as input and, in accordance with the modulation scheme of the control signal 10504, for example, performs mapping in consideration of the switching from FIG. 104, generates a mapped signal (i.e., in-phase components and quadrature components of the baseband signal) and generates modulated signal s1($t$)(10503_A) and modulated signal s2($t$)(10503_B) from the mapped signal. Modulated signal (s1($t$) (10503_A) is identical to modulated signal 10305_A from FIG. 103, and modulated signal s2($t$) (10503_B) is identical to modulated signal 10305_B from FIG. 103. This is as indicated in portion (c) of FIG. 104. Accordingly, the first slot of modulated signal s1($t$) (10503_A) takes (I1, Q$_2$), the first slot of modulated signal s2($t$) (10503_B) takes (I2, Q$_1$), the second slot of modulated signal s1($t$) (10503_A) takes (I3, Q4), the second slot of modulated signal s2($t$) (10503_B) takes (I4, Q3), and so on.

The generation method for the first slot (I1, Q2) of modulated signal s1($t$) (10503_A) and the first slot (I2, Q1) of modulated signal s2($t$) (10503_B) by the mapper 10502 from FIG. 105 is described below, as a supplement.

The data 10501 indicated in FIG. 105 is made up of time 1 data b01, b11, b21, b31 and of time 2 data b02, b12, b22, b32. The mapper 10502 of FIG. 105 generates I1, Q1, I2, and Q2 as described above using the data b01, b11, b21, b31 and b02, b12, b22, and b32. Thus, the mapper 10502 of FIG. 105 is able to generate the modulated signals s1($t$) and s2($t$) from I1, Q1, I2, and Q2.

Figure 106:
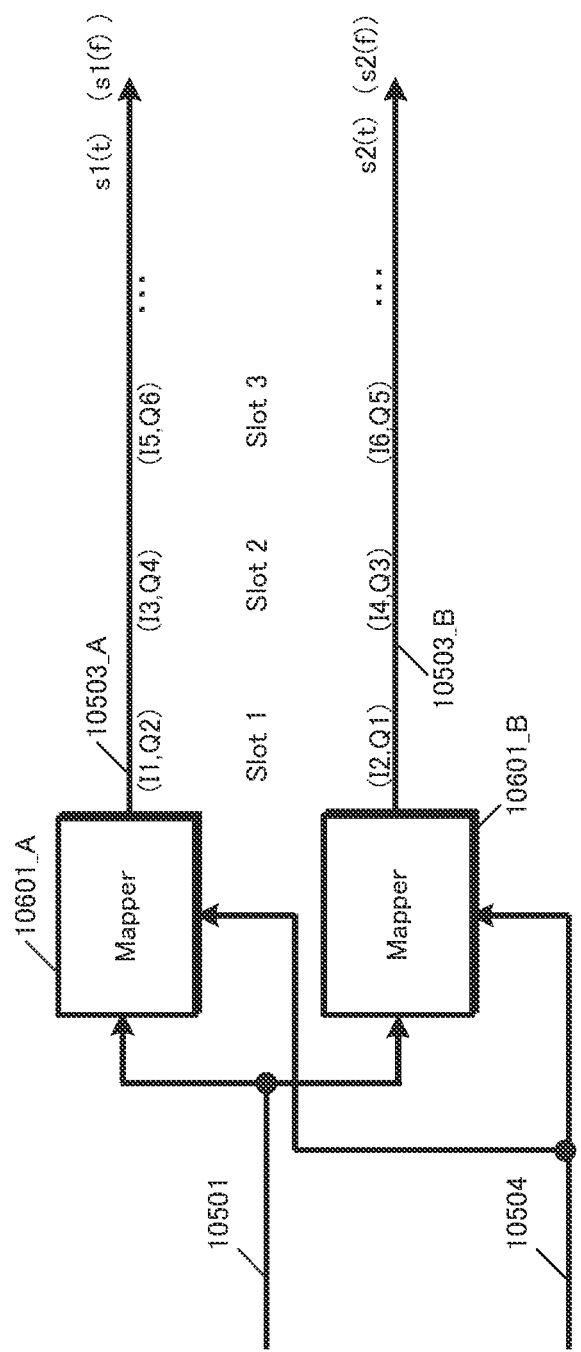
FIG. 106 indicates a sample configuration for a signal generator when cyclic Q delay is applied.

FIG. 106 illustrates a configuration that differs from those of FIGS. 103 and 105 and is used to obtain the N-slot s1($t$) and s2($t$) from FIG. 104. The mapper 10601_A takes data 10501 and a control signal 10504 as input and, in accordance with the modulation scheme of the control signal 10504, for example, performs mapping in consideration of the switching from FIG. 104, generates a mapped signal (i.e., in-phase components and quadrature components of the baseband signal) and generates a modulated signal s1($t$) (10503_A) from the mapped signal. Similarly, the mapper 10601_B takes data 10501 and a control signal 10504 as input and, in accordance with the modulation scheme of the control signal 10504, for example, performs mapping in consideration of the switching from FIG. 104, generates a mapped signal (i.e., in-phase components and quadrature components of the baseband signal) and generates a modulated signal s2($t$) (10503_B) from the mapped signal.

The data 10501 input to the mapper 10601_A and the data 10501 input to the mapper 10601_B are, of course, identical data. Modulated signal s1($t$) (10503_A) is identical to modulated signal 10305_A from FIG. 103, and modulated signal s2($t$) (10503_B) is identical to modulated signal 10305_B from FIG. 6. This is as indicated in portion (c) of FIG. 104. Accordingly, the first slot of modulated signal s1($t$) (10503_A) takes (IL Q2), the first slot of modulated signal s2($t$) (10503_B) takes (I2, Q1), the second slot of modulated signal s1($t$) (10503_A) takes (I3, Q4), the second slot of modulated signal s2($t$) (10503_B) takes (I4, Q3), and so on.

The generation method for the first slot (I1, Q2) of modulated signal s1($t$) (10503_A) by the mapper 10601_A from FIG. 106 is described below, as a supplement. The data 10501 indicated in FIG. 106 are made up of time 1 data b01, b11, b21, b31 and of time 2 data b02, b12, b22, b32. The mapper 10601_A of FIG. 106 generates I1 and Q2 as described above using the data b01, b11, b21, b31 and b02, b12, b22, and b32. The mapper 10601_A of FIG. 106 then generates modulated signal s1($t$) from I1 and Q2.

The generation method for the first slot (I2, Q1) of modulated signal s2($t$) (10503_B) by the mapper 10601_B from FIG. 106 is described below. The data 10501 indicated in FIG. 106 are made up of time 1 data b01, b11, b21, b31 and of time 2 data b02, b12, b22, b32. The mapper 10601_B of FIG. 106 generates I2 and Q1 as described above using the data b01, b11, b21, b31 and b02, b12, b22, and b32. Thus, the mapper 10601_B of FIG. 106 is able to generate modulated signal s2($t$) from I2 and Q1.

Figure 107:
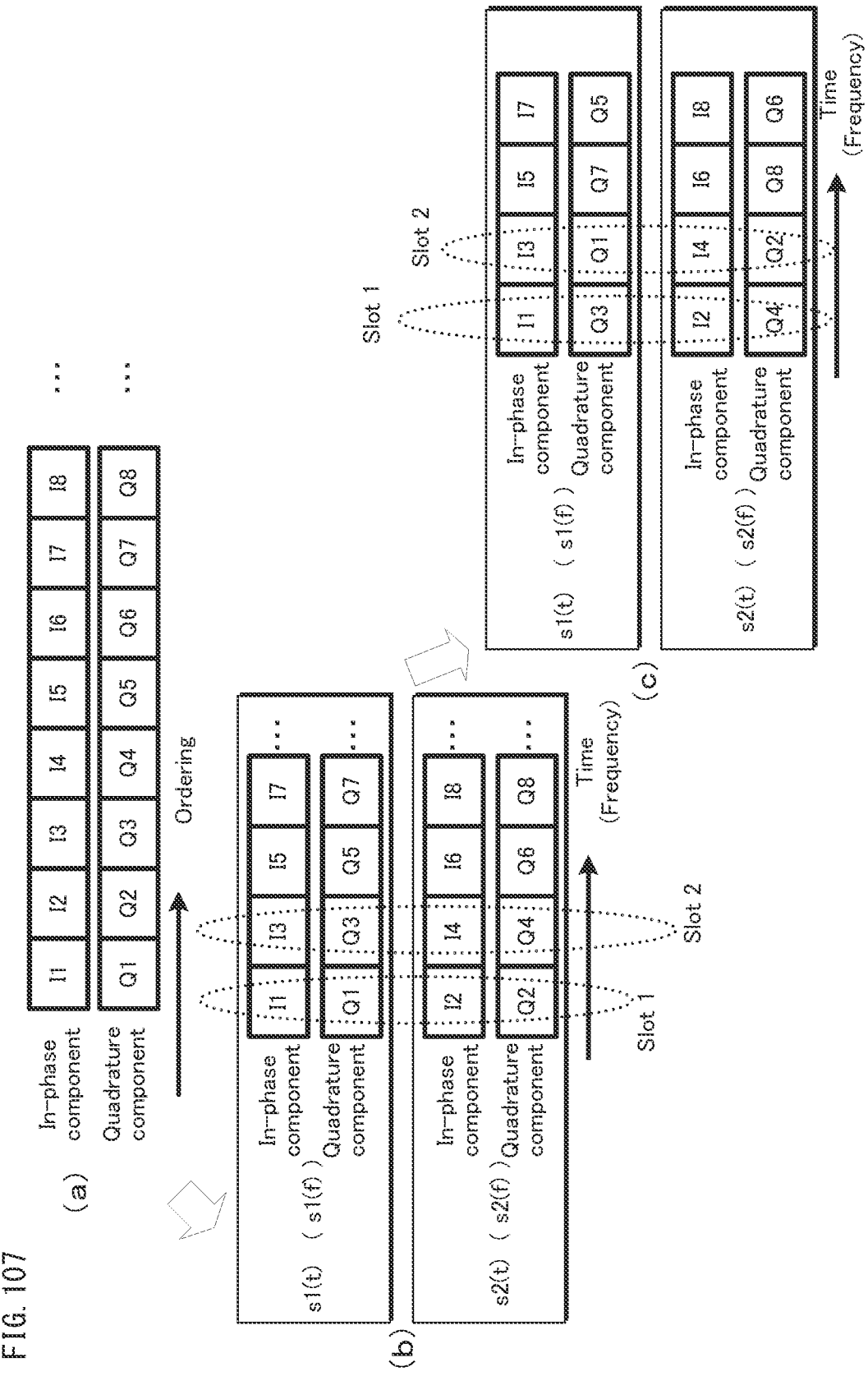
FIG. 107 illustrates a second example of a generation method for $s1(t)$ and $s2(t)$ when cyclic Q delay is used.

Next, FIG. 107 illustrates a second example that differs from the generation method of s1($t$) and s2($t$) from FIG. 104 is given for a case where the cyclic Q delay is used. In FIG. 107, reference signs corresponding to elements found in FIG. 104 are identical (i.e., the in-phase component and quadrature component of the baseband signal).

Portion (a) of FIG. 107 indicates the in-phase component and the quadrature component of the baseband signal obtained by the mapper 10302 of FIG. 103. Portion (a) of FIG. 107 is identical to portion (a) of FIG. 104. Explanations thereof are thus omitted.

Portion (b) of FIG. 107 illustrates the configuration of the in-phase component and the quadrature component of the baseband signals s1($t$) and s2($t$) prior to signal switching. As shown, the baseband signal is allocated to s1(*t*) at times 2*i*+1, and allocated to s2(*t*) at times 2*i*+2 (*i* being a non-zero positive integer).

Portion (c) of FIG. 107 illustrates a sample set of in-phase components and quadrature components for the baseband signal when signal switching is performed by the memory and signal switcher 10304 of FIG. 103. The main point of portion (c) of FIG. 107 (and point of difference from portion (c) of FIG. 104) is that signal switching occurs within s1(*t*) as well as s2(*t*).

Accordingly, in contrast to portion (b) of FIGS. 107, Q1 and Q3 of s1(*t*) are switched in portion (c) of FIG. 107, as are Q5 and Q7. Also, in contrast to portion (b) of FIGS. 107, Q2 and Q4 of s2(*t*) are switched in portion (c) of FIG. 107, as are Q6 and Q8.

Thus, the first slot of s1(*t*) has an in-phase component I1 and a quadrature component Q3, and the first slot of s2(*t*) has an in-phase component I2 and a quadrature component Q4. Also, the second slot of s1(*t*) has an in-phase component I3 and a quadrature component Q1, and the second slot of s2(*t*) has an in-phase component I4 and a quadrature component Q4. The third and fourth slots are as indicated in portion (c) of FIG. 107, and subsequent slots are similar.

Then, N-slot precoded and phase changed modulated signals r1(*t*) and r2(*t*) are obtained after applying the precoding and phase change to the N-slot modulated signals s1(*t*) and s2(*t*). This point is described elsewhere in the present disclosure.

Figure 108:
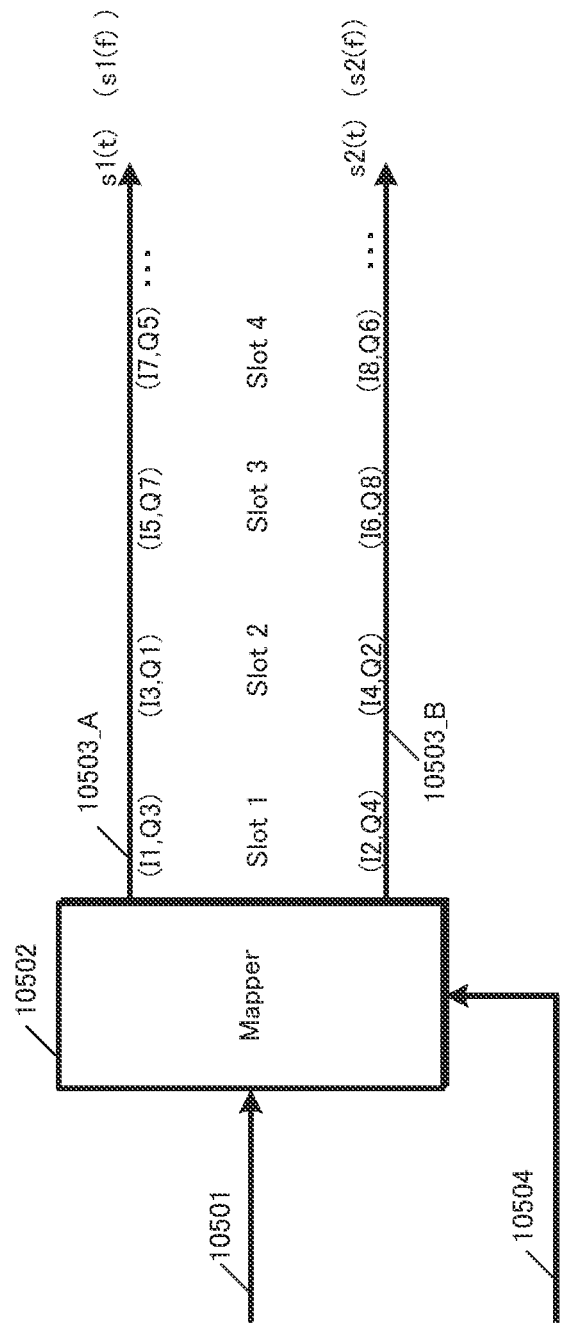
FIG. 108 indicates a sample configuration for a signal generator when cyclic Q delay is applied.

FIG. 108 illustrates a configuration that differs from that of FIG. 103 and is used to obtain the N-slot s1(*t*) and s2(*t*) from FIG. 107. The mapper 10502 takes data 10501 and a control signal 10504 as input and, in accordance with the modulation scheme of the control signal 10504, for example, performs mapping in consideration of the switching from FIG. 107, generates a mapped signal (i.e., in-phase components and quadrature components of the baseband signal) and generates modulated signal s1(*t*)(10503_A) and modulated signal s2(*t*)(10503_B) from the mapped signal. Modulated signal s1(*t*) (10503_A) is identical to modulated signal 10305_A from FIG. 103, and modulated signal s2(*t*) (10503_B) is identical to modulated signal 10305_B from FIG. 6. This is as indicated in portion (c) of FIG. 107. Accordingly, the first slot of modulated signal s1(*t*) (10503_A) takes (I1, Q3), the first slot of modulated signal s2(*t*) (10503_B) takes (I2, Q4), the second slot of modulated signal s1(*t*) (10503_A) takes (I3, Q1), the second slot of modulated signal s2(*t*) (10503_B) takes (I4, Q2), and so on.

The generation method for the first slot (I1, Q3) of modulated signal s1(*t*) (10503_A), the first slot (I2, Q4) of modulated signal s2(*t*) (10503_B), the second slot (I3, Q1) of modulated signal s1(*t*) (10503_A), and the second slot (I4, Q2) of modulated signal s2(*t*) (10503_B) by the mapper 10502 from FIG. 108 is described below, as a supplement.

The data 10501 indicated in FIG. 108 are made up of time 1 data b01, b11, b21, b31, time 2 data b02, b12, b22, b32, time 3 data b03, b13, b23, b33, and time 4 data b04, b14, b24, b34. The mapper 10502 of FIG. 108 generates the aforementioned I1, Q1, I2, Q2, I3, Q3, I4, and Q4 from the data b01, b11, b21, b31, b02, b12, b22, b32, b03, b13, b23, b33, b04, b14, b24, b34. Thus, the mapper 10502 of FIG. 108 is able to generate the modulated signals s1(*t*) and s2(*t*) from I1, Q1, I2, Q2, I3, Q3, I4, and Q4.

FIG. 102 illustrates a configuration that differs from those of FIGS. 103 and 108 and is used to obtain the N-slot s1(*t*) and s2(*t*) from FIG. 107. A distributor 10201 takes data 10501 and the control signal 10504 as input, distributes the data in accordance with the control signal 10504, and outputs first data 10202_A and second data 10202_B. The mapper 10601_A takes the first data 10202_A and the control signal 10504 as input and, in accordance with the modulation scheme of the control signal 10504, for example, performs mapping in consideration of the switching from FIG. 107, generates a mapped signal (i.e., in-phase components and quadrature components of the baseband signal) and generates a modulated signal s1(*t*)(10503_A) from the mapped signal. Similarly, the mapper 10601_B takes second data 10202_B and the control signal 10504 as input and, in accordance with the modulation scheme of the control signal 10504, for example, performs mapping in consideration of the switching from FIG. 107, generates a mapped signal (i.e., in-phase components and quadrature components of the baseband signal) and generates a modulated signal s2(*t*) (10503_B) from the mapped signal.

Accordingly, the first slot of modulated signal s1(*t*) (10503_A) takes (I1, Q3), the first slot of modulated signal s2(*t*) (10503_B) takes (I2, Q4), the second slot of modulated signal s1(*t*) (10503_A) takes (I3, Q1), the second slot of modulated signal s2(*t*) (10503_B) takes (I4, $Q_2$), and so on.

Figure 109:
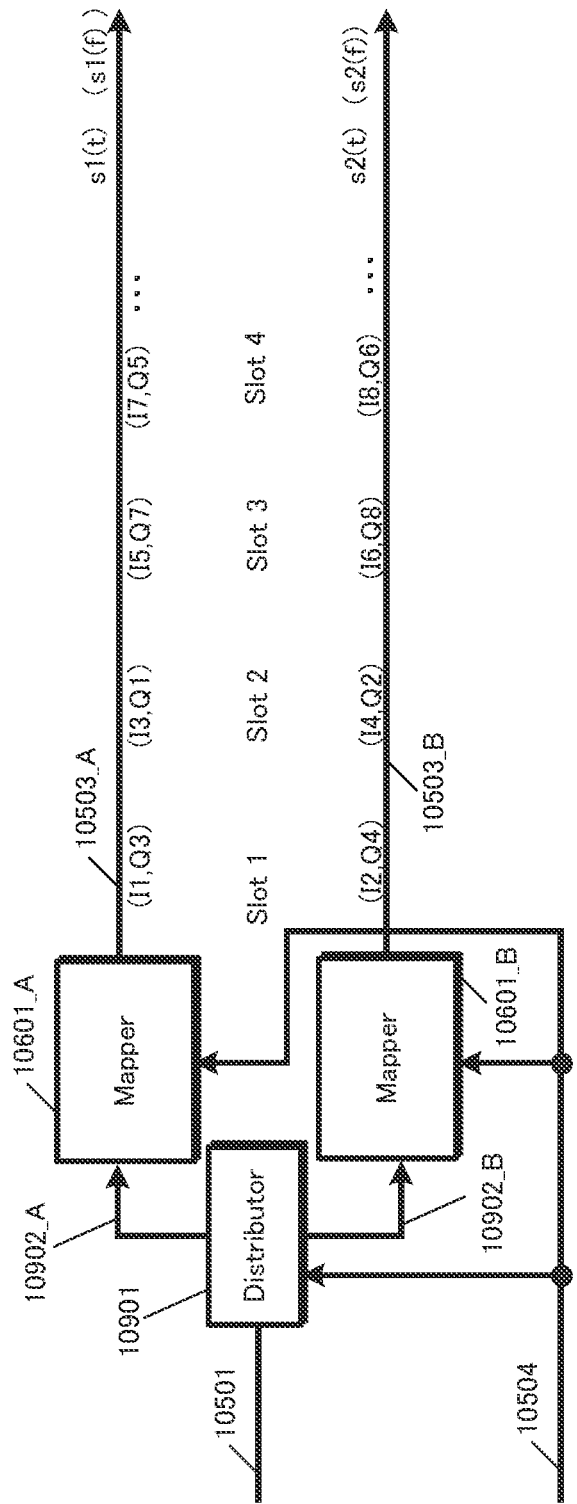
FIG. 109 indicates a sample configuration for a signal generator when cyclic Q delay is applied.

The generation method for the first slot (I1, Q3) of modulated signal s1(*t*) (10503_A) and the first slot (I3, Q1) of modulated signal s2(*t*) (10503_B) by the mapper 10601_A from FIG. 109 is described below, as a supplement. The data 10501 indicated in FIG. 109 are made up of time 1 data b01, b11, b21, b31, time 2 data b02, b12, b22, b32, time 3 data b03, b13, b23, b33, and time 4 data b04, b14, b24, b34. The distributor 10901 outputs the time 1 data b01, b11, b21, b31 and the time 3 data b03, b13, b23, b33, as the first data 10902_A, and outputs the time 2 data b02, b12, b22, b32 and the time 4 data b04, b14, b24, b34 as the second data 10902_B The mapper 10601_A of FIG. 109 generates the first slot as (I1, Q3) and the second slot as (I3, Q1) from the data b01, b11, b21, b31, b03, b13, b23, b33. The third slot and subsequent slots are generated similarly.

The generation method for the first slot (I2, Q4) of modulated signal s2(*t*) (10503_B) and the second slot (I4, Q2) by the mapper 10601_B from FIG. 109 is described below. The mapper 10601_B from FIG. 109 generates the first slot as (I2, Q4) and the second slot as (I4, Q2) from the time 2 data b02, b12, b22, b32 and the time 4 data b04, b14, b24, b34. The third slot and subsequent slots are generated similarly.

Although two methods using cyclic Q delay are described above, when the signals are switched among slot pairs as per FIG. 104, the demodulator (detector) of the reception device is able to constrain the quantity of candidate signal points. This has the merit of reducing the scope of calculation (circuit scope). Also, when the signals are switched within s1(*t*) and s2(*t*), as per FIG. 107, the demodulator (detector) of the reception device encounters a large quantity of candidate signal points. However, time diversity gain (or frequency diversity gain when switching is performed with respect to the frequency domain) is available, which as the merit of enabling further improvements to the data reception quality.

Although the above description uses examples of a 16-QAM modulation scheme, no limitation is intended. The same applies to other modulation schemes, such as QPSK, 8-QAM, 32-QAM, 64-QAM, 128-QAM, 256-QAM and so on.

Also, the cyclic Q delay method is not limited to the two schemes given above. For example, either of the two schemes given above may involve switching either of the quadrature component or the in-phase component of the baseband signal. Also, while the above describes switching performed at two times (e.g., switching the quadrature components of the baseband signal at times 1 and 2), the in-phase components and (or) the quadrature components of the baseband signal may also be switched at a plurality of times. Accordingly, when the in-phase components and quadrature components of the baseband signal are generated and cyclic Q delay is performed as in FIG. 104, then the in-phase component of the baseband signal after cyclic Q delay at time i is Ii, and the quadrature component of the baseband signal after cyclic Q delay at time i is Qj (where i≠j). Alternatively, the in-phase component of the baseband signal after cyclic Q delay at time i is Ij, and the quadrature component of the baseband signal after cyclic Q delay at time i is Qi (where i≠j). Alternatively, the in-phase component of the baseband signal after cyclic Q delay at time i is Ij, and the quadrature component of the baseband signal after cyclic Q delay at time i is Qk (where i≠j, i≠k, j≠k).

The precoding and phase change are then applied to the modulated signals $s1(t)$ (or $s1(f)$, or $s1(t,f)$) and $s2(t)$ (or $s2(f)$ or $s2(t,f)$) obtained by applying the above-described cyclic Q delay. (Here, as described elsewhere, signal processing involving phase change, power change, signal switching, and so on may be applied at any step.) Here, the precoding and phase changing application method used on the modulated signal obtained with the cyclic Q delay may be any of the precoding and phase changing methods described in the present disclosure.

INDUSTRIAL APPLICABILITY

The present invention is widely applicable to wireless systems that transmit different modulated signals from a plurality of antennas, such as an OFDM-MIMO system. Also, the present invention is also applicable in a wired system having multiple connections (e.g., a power line communication system, a fibre-optic system, a digital subscriber line system, and so on) when MIMO transmission is used, and the modulated signals described in the present document are applied. The modulated signals may also be transmitted from a plurality of transmission locations.

REFERENCE SIGNS LIST 302A, 302B Encoders
304A, 304B Interleavers
306A, 306B Mappers
314 Signal processing scheme information generator
308A, 308B Weighting compositors
310A, 310B Wireless units
312A, 312B Antennas
317A, 317B Phase changers
402 Encoder
404 Distributor
504 #1, 504 #2 Transmit antennas
505 #1, 505 #2 Receive antennas
600 Weighting unit
701_X, 701_Y Antennas
703_X, 703_Y Wireless units
705_1 Channel fluctuation estimator
705_2 Channel fluctuation estimator
707_1 Channel fluctuation estimator
707_2 Channel fluctuation estimator
709 Control information decoder
711 Signal processor
803 Inner MIMO detector
805A, 805B Log-likelihood calculators
807A, 807B Deinterleavers
809A, 809B Log-likelihood ratio calculator
811A, 811B Soft-in/soft-out decoders
813A, 813B Interleavers
815 Memory
819 Coefficient generator
901 Soft-in/soft-out decoder
903 Distributor
1201A, 1201B OFDM-related processors
1302A, 1302A Serial-to-parallel converters
1304A, 1304B Reorderers
1306A, 1306B Inverse Fast Fourier Transform units
1308A, 1308B Wireless units

The invention claimed is:

1. A transmission apparatus comprising:
signal processing circuitry configured to:
  generate codeword sequences according to a defined error correction coding scheme;
  generate a first modulated symbol sequence and a second modulated symbol sequence from the codeword sequences according to a first modulation scheme and a second modulation scheme, respectively; and
  perform precoding and phase change on the first modulated symbol sequence and the second modulated symbol sequence to generate a first transmission signal and a second transmission signal, respectively; and
a transmitter configured to transmit, from antennas, the first transmission signal the second transmission signal and a control signal, wherein
the control signal includes first information and second information,
the first information indicates whether (i) a first matrix or (ii) an identity matrix is used to perform the precoding, the first matrix being selected from among different precoding matrices based on the first modulation scheme and the second modulation scheme,
the second information indicates the first modulation scheme and the second modulation scheme, and
the phase change is performed with a phase that changes for each pair of symbols.

2. A reception apparatus comprising:
a receiver configured to receive, via antennas, a first reception signal, a second reception signal and a control signal, the first reception signal and the second reception signal including a first modulated symbol sequence and a second modulated symbol sequence to which a transmission apparatus has applied precoding and phase change; and
signal processing circuitry configured to demodulate the first modulated symbol sequence and the second modulated symbol sequence according to the control signal to generate codeword sequences, and decode the codeword sequences by a decoding scheme corresponding to a defined error correction coding scheme, wherein
the control signal includes first information and second information,
the first information indicates whether (i) a first matrix or (ii) an identity matrix is used to perform the precoding, the first matrix being selected from among different precoding matrices based on the first modulation scheme and the second modulation scheme, the second information indicates the first modulation scheme and the second modulation scheme, and the phase change is performed with a phase that changes for each pair of symbols.

\* \* \* \* \*